US012619345B2

(12) United States Patent
Chen et al.

(10) Patent No.: US 12,619,345 B2
(45) Date of Patent: May 5, 2026

(54) USER INTERFACES RELATED TO TIME

(71) Applicant: Apple Inc., Cupertino, CA (US)

(72) Inventors: Kevin Will Chen, Cupertino, CA (US);
Guillaume Pierre André Barlier,
Sunnyvale, CA (US); Alan C. Dye, San
Francisco, CA (US); Lisa K. Forssell,
Palo Alto, CA (US); JD Gardner, San
Jose, CA (US); Aurelio Guzman, San
Jose, CA (US); Kevin Lynch,
Woodside, CA (US); Jason Rickwald,
Santa Cruz, CA (US); **Christopher
James Romney**, San Jose, CA (US);
Nicolas Scapel, London (GB);
Christopher Wilson, San Francisco,
CA (US)

(73) Assignee: Apple Inc., Cupertino, CA (US)

( * ) Notice: Subject to any disclaimer, the term of this
patent is extended or adjusted under 35
U.S.C. 154(b) by 0 days.

(21) Appl. No.: 18/893,427

(22) Filed: Sep. 23, 2024

(65) Prior Publication Data

US 2025/0044932 A1     Feb. 6, 2025

Related U.S. Application Data

(63) Continuation of application No. 18/220,715, filed on
Jul. 11, 2023, now Pat. No. 12,099,713, which is a
(Continued)

(51) Int. Cl.
G06F 3/0488     (2022.01)
G04G 9/00     (2006.01)
(Continued)

(52) U.S. Cl.
CPC ......... G06F 3/0487 (2013.01); G04G 9/0064
(2013.01); G04G 9/007 (2013.01);
(Continued)

(58) Field of Classification Search
CPC ...................................................... G06F 40/40
See application file for complete search history.

(56) References Cited

U.S. PATENT DOCUMENTS

| 872,200 A | 11/1907 | Rowe |
| 3,148,500 A | 9/1964 | Thomas |
| | (Continued) | |

FOREIGN PATENT DOCUMENTS

| AU | 2010249319 A1 | 6/2012 |
| AU | 2015101019 A4 | 9/2015 |
| | (Continued) | |

OTHER PUBLICATIONS

FF14StartUp, "How to create a character for beginners in FF14 and
recommended races", Available online at: https://ff14startup.net/
character-making-99/, Sep. 20, 2016, 16 pages.
(Continued)

*Primary Examiner* — Nan-Ying Yang
(74) *Attorney, Agent, or Firm* — YHE Law LLP

(57)     ABSTRACT

The present disclosure generally describes user interfaces
related to time. In accordance with embodiments, user
interfaces for displaying and enabling an adjustment of a
displayed time zone are described. In accordance with
embodiments, user interfaces for initiating a measurement of
time are described. In accordance with embodiments, user
interfaces for enabling and displaying a user interface using
a character are described. In accordance with embodiments,
user interfaces for enabling and displaying a user interface
that includes an indication of a current time are described. In
accordance with embodiments, user interfaces for enabling
configuration of a background for a user interface are
described. In accordance with embodiments, user interfaces
for enabling configuration of displayed applications on a
user interface are described.

36 Claims, 74 Drawing Sheets

Related U.S. Application Data continuation of application No. 17/941,962, filed on Sep. 9, 2022, now Pat. No. 11,822,778, which is a continuation of application No. 17/373,163, filed on Jul. 12, 2021, now Pat. No. 11,442,414, which is a continuation of application No. 17/031,654, filed on Sep. 24, 2020, now Pat. No. 11,061,372.

(60) Provisional application No. 63/078,314, filed on Sep. 14, 2020, provisional application No. 63/023,194, filed on May 11, 2020.

(51) Int. Cl.

| | |
|---|---|
| G04G 21/02 | (2010.01) |
| G04G 21/08 | (2010.01) |
| G06F 3/0362 | (2013.01) |
| G06F 3/04817 | (2022.01) |
| G06F 3/04842 | (2022.01) |
| G06F 3/04845 | (2022.01) |
| G06F 3/04847 | (2022.01) |
| G06F 3/0485 | (2022.01) |
| G06F 3/0486 | (2013.01) |
| G06F 3/0487 | (2013.01) |
| G06F 3/04883 | (2022.01) |
| G06T 3/60 | (2006.01) |
| G06T 11/40 | (2006.01) |
| G06T 11/60 | (2006.01) |

(52) U.S. Cl.
CPC ........... *G04G 9/0076* (2013.01); *G04G 21/02* (2013.01); *G04G 21/025* (2013.01); *G04G 21/08* (2013.01); *G06F 3/0362* (2013.01); *G06F 3/04817* (2013.01); *G06F 3/04842* (2013.01); *G06F 3/04845* (2013.01); *G06F 3/04847* (2013.01); *G06F 3/0485* (2013.01); *G06F 3/0486* (2013.01); *G06F 3/0488* (2013.01); *G06F 3/04883* (2013.01); *G06T 3/60* (2013.01); *G06T 11/40* (2013.01); *G06T 11/60* (2013.01); *G06T 2200/24* (2013.01)

(56) References Cited

U.S. PATENT DOCUMENTS

| | | | |
|---|---|---|---|
| 3,633,354 | A | 1/1972 | Stemmler |
| 4,174,606 | A | 11/1979 | Masuda et al. |
| 4,205,628 | A | 6/1980 | Null |
| 4,355,380 | A | 10/1982 | Huguenin et al. |
| 4,597,674 | A | 7/1986 | Thompson, III |
| 4,847,819 | A | 7/1989 | Hong |
| 4,945,521 | A | 7/1990 | Klaus |
| 5,124,959 | A | 6/1992 | Yamazaki et al. |
| 5,208,790 | A | 5/1993 | Sato et al. |
| 5,220,541 | A | 6/1993 | Vuilleumier |
| 5,383,165 | A | 1/1995 | Vaucher |
| 5,455,808 | A | 10/1995 | Grupp et al. |
| 5,487,054 | A | 1/1996 | Capps et al. |
| 5,500,835 | A | 3/1996 | Born |
| 5,508,979 | A | 4/1996 | Eisenegger |
| 5,659,693 | A | 8/1997 | Hansen et al. |
| 5,825,353 | A | 10/1998 | Will |
| 5,845,257 | A | 12/1998 | Fu et al. |
| 5,870,683 | A | 2/1999 | Wells et al. |
| 5,892,519 | A | 4/1999 | Hirai et al. |
| 5,986,655 | A | 11/1999 | Chiu et al. |
| 5,999,195 | A | 12/1999 | Santangeli |
| 6,043,818 | A | 3/2000 | Nakano et al. |
| 6,084,598 | A | 7/2000 | Chekerylla |
| 6,128,012 | A | 10/2000 | Seidensticker et al. |
| 6,160,767 | A | 12/2000 | Ho |
| 6,279,018 | B1 | 8/2001 | Kudrolli et al. |
| 6,297,795 | B1 | 10/2001 | Kato et al. |
| 6,353,449 | B1 | 3/2002 | Gregg et al. |
| 6,359,839 | B1 | 3/2002 | Schenk et al. |
| 6,418,394 | B1 | 7/2002 | Puolakanaho et al. |
| 6,441,824 | B2 | 8/2002 | Hertzfeld et al. |
| 6,449,219 | B1 | 9/2002 | Hepp et al. |
| 6,452,597 | B1 | 9/2002 | Goldberg et al. |
| 6,477,117 | B1 | 11/2002 | Narayanaswami et al. |
| 6,496,780 | B1 | 12/2002 | Harris et al. |
| 6,525,997 | B1 | 2/2003 | Narayanaswami et al. |
| 6,539,243 | B1 | 3/2003 | Kimura et al. |
| 6,539,343 | B1 | 3/2003 | Zhao et al. |
| 6,549,218 | B1 | 4/2003 | Gershony et al. |
| 6,556,222 | B1 | 4/2003 | Narayanaswami |
| 6,621,524 | B1 | 9/2003 | Iijima et al. |
| 6,690,623 | B1 | 2/2004 | Maano |
| 6,728,533 | B2 | 4/2004 | Ishii et al. |
| 6,806,893 | B1 | 10/2004 | Kolawa et al. |
| 6,809,724 | B1 | 10/2004 | Shiraishi et al. |
| 6,871,076 | B2 | 3/2005 | Samn et al. |
| 7,036,025 | B2 | 4/2006 | Hunter |
| 7,113,809 | B2 | 9/2006 | Noesgaard et al. |
| 7,180,524 | B1 | 2/2007 | Axelrod |
| 7,203,380 | B2 | 4/2007 | Chiu et al. |
| 7,227,976 | B1 | 6/2007 | Jung et al. |
| 7,257,254 | B2 | 8/2007 | Tunney et al. |
| 7,302,650 | B1 | 11/2007 | Allyn et al. |
| 7,378,954 | B2 | 5/2008 | Wendt et al. |
| 7,479,949 | B2 | 1/2009 | Jobs et al. |
| 7,515,509 | B2 | 4/2009 | Klein et al. |
| 7,515,903 | B1 | 4/2009 | Cast |
| 7,593,755 | B2 | 9/2009 | Colando et al. |
| 7,619,615 | B1 | 11/2009 | Donoghue et al. |
| 7,637,204 | B2 | 12/2009 | Sumser et al. |
| 7,716,057 | B2 | 5/2010 | Horvitz |
| 7,751,285 | B1 | 7/2010 | Cain et al. |
| 7,773,460 | B2 | 8/2010 | Holt |
| 7,840,668 | B1 | 11/2010 | Sylvain et al. |
| 7,843,769 | B2 | 11/2010 | Ishida et al. |
| 7,898,542 | B1 | 3/2011 | Yu et al. |
| 7,907,476 | B2 | 3/2011 | Lee |
| 7,908,554 | B1 | 3/2011 | Blattner |
| 8,041,968 | B2 | 10/2011 | Tupman |
| 8,046,617 | B2 | 10/2011 | Fleck et al. |
| 8,059,491 | B1 | 11/2011 | Hennings-Kampa |
| 8,156,060 | B2 | 4/2012 | Borzestowski et al. |
| 8,169,438 | B1 | 5/2012 | Baraff et al. |
| D661,612 | S | 6/2012 | Hsu et al. |
| 8,234,218 | B2 | 7/2012 | Robinson et al. |
| 8,238,876 | B2 | 8/2012 | Teng et al. |
| 8,245,143 | B2 | 8/2012 | Yach et al. |
| 8,280,979 | B2 | 10/2012 | Kunz et al. |
| 8,295,546 | B2 | 10/2012 | Craig et al. |
| 8,364,855 | B2 | 1/2013 | James et al. |
| 8,390,628 | B2 | 3/2013 | Harding et al. |
| 8,405,663 | B2 | 3/2013 | Wikkerink et al. |
| 8,423,089 | B2 | 4/2013 | Song et al. |
| 8,462,997 | B2 | 6/2013 | Soldan et al. |
| 8,504,008 | B1 | 8/2013 | Gossweiler et al. |
| 8,506,396 | B1 | 8/2013 | Snyder et al. |
| 8,595,649 | B2 | 11/2013 | Sherrard et al. |
| 8,635,475 | B2 | 1/2014 | Lin et al. |
| 8,725,842 | B1 | 5/2014 | Al-Nasser |
| 8,768,648 | B2 | 7/2014 | Panther et al. |
| 8,775,844 | B1 | 7/2014 | Peterson |
| 8,847,903 | B2 | 9/2014 | Stokes et al. |
| 8,854,925 | B1 | 10/2014 | Lee et al. |
| 8,896,652 | B2 | 11/2014 | Ralston |
| 8,924,894 | B1 | 12/2014 | Yaksick et al. |
| 8,938,394 | B1 | 1/2015 | Faaborg et al. |
| 8,948,819 | B2 | 2/2015 | Yun et al. |
| 8,963,894 | B2 | 2/2015 | Klassen et al. |
| 9,041,764 | B2 | 5/2015 | Wang et al. |
| 9,070,092 | B2 | 6/2015 | Shieh et al. |
| 9,082,314 | B2 | 7/2015 | Tsai |
| 9,094,576 | B1 | 7/2015 | Karakotsios |
| 9,141,270 | B1 | 9/2015 | Stuart et al. |
| 9,152,211 | B2 | 10/2015 | Gunn et al. |
| 9,152,212 | B2 | 10/2015 | Gunn |
| 9,153,031 | B2 | 10/2015 | El-Saban et al. |

(56)　　　　　References Cited

U.S. PATENT DOCUMENTS

| | | | |
|---|---|---|---|
| 9,171,268 B1 | 10/2015 | Penilla et al. |
| 9,173,052 B2 | 10/2015 | Hauser et al. |
| 9,197,738 B2 | 11/2015 | Peev et al. |
| 9,207,837 B2 | 12/2015 | Paretti et al. |
| 9,230,241 B1 | 1/2016 | Singh et al. |
| 9,230,355 B1 | 1/2016 | Ahuja et al. |
| 9,237,855 B2 | 1/2016 | Hong et al. |
| 9,239,605 B1 | 1/2016 | Nanda et al. |
| 9,245,177 B2 | 1/2016 | Perez |
| 9,246,961 B2 | 1/2016 | Walkin et al. |
| 9,259,615 B2 | 2/2016 | Weast et al. |
| 9,264,660 B1 | 2/2016 | Petterson et al. |
| 9,292,310 B2 | 3/2016 | Chaudhri et al. |
| 9,298,257 B2 | 3/2016 | Hwang et al. |
| 9,298,263 B2 | 3/2016 | Geisner et al. |
| 9,349,414 B1 | 5/2016 | Furment et al. |
| 9,369,537 B1 | 6/2016 | Mathew et al. |
| 9,377,762 B2 | 6/2016 | Hoobler et al. |
| 9,411,506 B1 | 8/2016 | Marra et al. |
| 9,436,269 B2 | 9/2016 | Yang |
| 9,448,685 B1 | 9/2016 | Somin et al. |
| 9,448,708 B1 | 9/2016 | Bennett et al. |
| 9,459,781 B2 | 10/2016 | Kocienda et al. |
| 9,461,876 B2 | 10/2016 | Van Dusen et al. |
| 9,542,070 B2 | 1/2017 | Xu et al. |
| 9,542,422 B2 | 1/2017 | Duggal et al. |
| 9,547,425 B2 | 1/2017 | Kocienda et al. |
| 9,557,806 B2 | 1/2017 | Väyrynen |
| 9,568,891 B2 | 2/2017 | Adams et al. |
| 9,582,165 B2 | 2/2017 | Wilson et al. |
| 9,594,354 B1 | 3/2017 | Kahn et al. |
| 9,600,178 B2 | 3/2017 | Yun et al. |
| 9,602,559 B1 | 3/2017 | Barros et al. |
| 9,606,695 B2 | 3/2017 | Matas |
| 9,625,987 B1 | 4/2017 | Lapenna et al. |
| 9,628,416 B2 | 4/2017 | Henderson |
| 9,638,730 B2 * | 5/2017 | Umamoto ............... G01R 11/00 |
| 9,686,497 B1 | 6/2017 | Terry |
| 9,753,436 B2 | 9/2017 | Ely et al. |
| 9,756,172 B2 | 9/2017 | Piemonte et al. |
| 9,760,976 B2 | 9/2017 | Kameyama |
| 9,786,084 B1 | 10/2017 | Bhat et al. |
| 9,794,397 B2 | 10/2017 | Min et al. |
| 9,839,363 B2 | 12/2017 | Albert |
| 9,939,872 B2 | 4/2018 | Graham et al. |
| 9,948,589 B2 | 4/2018 | Gonnen et al. |
| 9,949,697 B2 | 4/2018 | Iscoe et al. |
| 10,019,599 B1 | 7/2018 | Moran et al. |
| 10,062,133 B1 | 8/2018 | Mishra et al. |
| 10,095,385 B2 | 10/2018 | Walkin et al. |
| 10,139,218 B2 | 11/2018 | Matsushita |
| 10,268,432 B2 | 4/2019 | Kyung |
| 10,270,983 B1 | 4/2019 | Van Os et al. |
| 10,282,078 B2 | 5/2019 | Choi |
| 10,289,265 B2 | 5/2019 | Kulkarni |
| 10,304,347 B2 | 5/2019 | Wilson et al. |
| 10,317,977 B2 | 6/2019 | Yang |
| 10,325,416 B1 | 6/2019 | Scapel et al. |
| 10,325,417 B1 | 6/2019 | Scapel et al. |
| 10,341,612 B2 | 7/2019 | Imaoka |
| 10,356,070 B2 | 7/2019 | Cha et al. |
| 10,356,136 B2 | 7/2019 | Van Wie et al. |
| 10,375,313 B1 | 8/2019 | Van Os et al. |
| 10,376,153 B2 | 8/2019 | Tzvieli et al. |
| 10,379,719 B2 | 8/2019 | Scapel et al. |
| 10,410,434 B1 | 9/2019 | Scapel et al. |
| 10,459,887 B1 | 10/2019 | Dvortsov et al. |
| 10,489,508 B2 | 11/2019 | Zhai et al. |
| 10,505,726 B1 | 12/2019 | Andon et al. |
| 10,521,091 B2 | 12/2019 | Anzures et al. |
| 10,521,948 B2 | 12/2019 | Rickwald et al. |
| 10,580,221 B2 | 3/2020 | Scapel et al. |
| 10,620,590 B1 | 4/2020 | Guzman et al. |
| 10,628,985 B2 | 4/2020 | Mishra et al. |
| 10,643,246 B1 | 5/2020 | Suprasadachandran Pillai |
| 10,657,695 B2 | 5/2020 | Chand et al. |
| 10,659,405 B1 | 5/2020 | Chang et al. |
| 10,684,592 B2 | 6/2020 | Chang et al. |
| 10,698,575 B2 | 6/2020 | Walkin et al. |
| 10,708,545 B2 | 7/2020 | Rivard et al. |
| 10,721,711 B2 | 7/2020 | Kirov et al. |
| 10,761,702 B2 | 9/2020 | Block et al. |
| 10,788,797 B1 | 9/2020 | Guzman et al. |
| 10,789,753 B2 | 9/2020 | Miller et al. |
| 10,796,480 B2 | 10/2020 | Chen et al. |
| 10,798,035 B2 | 10/2020 | Lewis et al. |
| 10,807,005 B2 | 10/2020 | Dugan et al. |
| 10,810,409 B2 | 10/2020 | Bacivarov et al. |
| 10,811,055 B1 | 10/2020 | Kimber et al. |
| 10,817,981 B1 | 10/2020 | Belkin |
| 10,845,968 B2 | 11/2020 | Scapel et al. |
| 10,852,905 B1 | 12/2020 | Guzman et al. |
| 10,855,910 B2 | 12/2020 | Tano et al. |
| 10,861,548 B2 | 12/2020 | Widjaja |
| 10,878,782 B1 | 12/2020 | Guzman et al. |
| 10,902,661 B1 | 1/2021 | Mourkogiannis et al. |
| 10,908,559 B1 | 2/2021 | Guzman et al. |
| 10,936,345 B1 | 3/2021 | Guzman et al. |
| 11,009,833 B2 | 5/2021 | Essery |
| 11,023,090 B2 | 6/2021 | Xu et al. |
| 11,050,873 B2 | 6/2021 | Kim et al. |
| 11,061,372 B1 | 7/2021 | Chen et al. |
| 11,107,261 B2 | 8/2021 | Scapel et al. |
| 11,188,190 B2 | 11/2021 | Blackstock et al. |
| 11,380,077 B2 | 7/2022 | Scapel et al. |
| 11,435,887 B1 | 9/2022 | Mirho et al. |
| 11,682,182 B2 | 6/2023 | Scapel et al. |
| 11,694,590 B2 | 7/2023 | Connor et al. |
| 11,729,339 B2 | 8/2023 | Morii |
| 11,798,246 B2 | 10/2023 | Lee et al. |
| 11,847,949 B2 | 12/2023 | Huang et al. |
| 12,033,296 B2 | 7/2024 | Scapel et al. |
| 2001/0019330 A1 | 9/2001 | Bickmore et al. |
| 2001/0043514 A1 | 11/2001 | Kita et al. |
| 2001/0050689 A1 | 12/2001 | Park |
| 2002/0054066 A1 | 5/2002 | Kikinis et al. |
| 2002/0054157 A1 | 5/2002 | Hayashi et al. |
| 2002/0054541 A1 | 5/2002 | Hall et al. |
| 2002/0059623 A1 | 5/2002 | Rodriguez et al. |
| 2002/0081976 A1 | 6/2002 | Fujisawa et al. |
| 2002/0098857 A1 | 7/2002 | Ishii |
| 2002/0099452 A1 | 7/2002 | Kawai |
| 2002/0131331 A1 | 9/2002 | Molander et al. |
| 2002/0135581 A1 | 9/2002 | Russell et al. |
| 2003/0002391 A1 | 1/2003 | Biggs et al. |
| 2003/0027621 A1 | 2/2003 | Libby et al. |
| 2003/0067497 A1 | 4/2003 | Pichon et al. |
| 2003/0107603 A1 | 6/2003 | Clapper |
| 2003/0135769 A1 | 7/2003 | Loughran |
| 2003/0140309 A1 | 7/2003 | Saito et al. |
| 2003/0157983 A1 * | 8/2003 | Kobayashi .............. A63F 13/92 |
| | | 463/31 |
| 2003/0164847 A1 | 9/2003 | Zaima et al. |
| 2003/0169306 A1 | 9/2003 | Makipaa et al. |
| 2003/0206170 A1 | 11/2003 | Bickmore et al. |
| 2003/0214885 A1 | 11/2003 | Powell et al. |
| 2003/0229900 A1 | 12/2003 | Reisman |
| 2004/0001105 A1 | 1/2004 | Chew et al. |
| 2004/0017733 A1 | 1/2004 | Sullivan |
| 2004/0021699 A1 | 2/2004 | Fildebrandt et al. |
| 2004/0027396 A1 | 2/2004 | Lection |
| 2004/0047244 A1 | 3/2004 | Iino et al. |
| 2004/0066710 A1 | 4/2004 | Yuen et al. |
| 2004/0075699 A1 | 4/2004 | Franchi et al. |
| 2004/0075700 A1 | 4/2004 | Liu et al. |
| 2004/0083474 A1 | 4/2004 | McKinlay et al. |
| 2004/0168107 A1 | 8/2004 | Sharp et al. |
| 2004/0179039 A1 | 9/2004 | Blattner et al. |
| 2004/0181771 A1 | 9/2004 | Anonsen et al. |
| 2004/0192332 A1 | 9/2004 | Samn |
| 2004/0203342 A1 | 10/2004 | Sibecas et al. |
| 2004/0218472 A1 | 11/2004 | Narayanaswami et al. |
| 2004/0225966 A1 | 11/2004 | Besharat et al. |
| 2004/0243547 A1 | 12/2004 | Chhatrapati et al. |

(56)　　　　　References Cited

U.S. PATENT DOCUMENTS

| | | |
|---|---|---|
| 2004/0266491 A1 | 12/2004 | Howard et al. |
| 2005/0041667 A1 | 2/2005 | Miller et al. |
| 2005/0052446 A1 | 3/2005 | Plut |
| 2005/0066325 A1 | 3/2005 | Mori et al. |
| 2005/0094492 A1 | 5/2005 | Rosevear et al. |
| 2005/0122543 A1 | 6/2005 | Walker |
| 2005/0124389 A1 | 6/2005 | Yang |
| 2005/0139852 A1 | 6/2005 | Chen et al. |
| 2005/0156873 A1 | 7/2005 | Walter et al. |
| 2005/0174216 A1 | 8/2005 | Lintell |
| 2005/0188856 A1 | 9/2005 | Sumser et al. |
| 2005/0190653 A1 | 9/2005 | Chen |
| 2005/0195173 A1 | 9/2005 | McKay |
| 2005/0198319 A1 | 9/2005 | Chan et al. |
| 2005/0200611 A1 | 9/2005 | Goto et al. |
| 2005/0240786 A1 | 10/2005 | Ranganathan |
| 2005/0248574 A1 | 11/2005 | Ashtekar et al. |
| 2005/0257042 A1 | 11/2005 | Sierra et al. |
| 2005/0261031 A1 | 11/2005 | Seo et al. |
| 2005/0278757 A1 | 12/2005 | Grossman et al. |
| 2006/0007785 A1 | 1/2006 | Fernandez et al. |
| 2006/0010435 A1 | 1/2006 | Jhanwar et al. |
| 2006/0020904 A1 | 1/2006 | Aaltonen et al. |
| 2006/0035628 A1 | 2/2006 | Miller et al. |
| 2006/0046684 A1 | 3/2006 | Kameyama |
| 2006/0085765 A1 | 4/2006 | Peterson et al. |
| 2006/0087502 A1 | 4/2006 | Karidis et al. |
| 2006/0092770 A1 | 5/2006 | Demas |
| 2006/0123362 A1 | 6/2006 | Keely |
| 2006/0166708 A1 | 7/2006 | Kim et al. |
| 2006/0188144 A1 | 8/2006 | Sasaki et al. |
| 2006/0214935 A1 | 9/2006 | Boyd et al. |
| 2006/0239640 A1 | 10/2006 | Watanabe et al. |
| 2006/0242259 A1 | 10/2006 | Vallabh et al. |
| 2006/0277118 A1 | 12/2006 | Keohane et al. |
| 2006/0277469 A1 | 12/2006 | Chaudhri et al. |
| 2006/0294465 A1 | 12/2006 | Ronen et al. |
| 2007/0003915 A1 | 1/2007 | Templeman |
| 2007/0004451 A1 | 1/2007 | C. Anderson |
| 2007/0006096 A1 | 1/2007 | Kim et al. |
| 2007/0021153 A1 | 1/2007 | Novak |
| 2007/0024614 A1 | 2/2007 | Tam et al. |
| 2007/0052851 A1 | 3/2007 | Ochs et al. |
| 2007/0055947 A1 | 3/2007 | Ostojic et al. |
| 2007/0057775 A1 | 3/2007 | O'Reilly et al. |
| 2007/0094330 A1 | 4/2007 | Russell et al. |
| 2007/0101279 A1 | 5/2007 | Chaudhri et al. |
| 2007/0113181 A1 | 5/2007 | Blattner et al. |
| 2007/0146344 A1 | 6/2007 | Martin et al. |
| 2007/0152979 A1 | 7/2007 | Jobs et al. |
| 2007/0168863 A1 | 7/2007 | Blattner et al. |
| 2007/0171091 A1 | 7/2007 | Nisenboim et al. |
| 2007/0192718 A1 | 8/2007 | Voorhees et al. |
| 2007/0211042 A1 | 9/2007 | Kim et al. |
| 2007/0213955 A1 | 9/2007 | Ishida et al. |
| 2007/0226653 A1 | 9/2007 | Moore et al. |
| 2007/0236475 A1 | 10/2007 | Wherry |
| 2007/0239754 A1 | 10/2007 | Schnitman et al. |
| 2007/0239801 A1 | 10/2007 | Lee et al. |
| 2007/0250772 A1 | 10/2007 | Milosevski |
| 2007/0260984 A1 | 11/2007 | Marks et al. |
| 2007/0261537 A1 | 11/2007 | Eronen et al. |
| 2007/0279190 A1 | 12/2007 | Lugt et al. |
| 2007/0287140 A1 | 12/2007 | Liebowitz |
| 2008/0005599 A1 | 1/2008 | Theocharous et al. |
| 2008/0005734 A1 | 1/2008 | Kendra et al. |
| 2008/0052242 A1 | 2/2008 | Merritt et al. |
| 2008/0071885 A1 | 3/2008 | Hardy et al. |
| 2008/0082930 A1 | 4/2008 | Omernick et al. |
| 2008/0095470 A1 | 4/2008 | Chao et al. |
| 2008/0098031 A1 | 4/2008 | Ducharme |
| 2008/0127268 A1 | 5/2008 | Bergeron et al. |
| 2008/0130421 A1 | 6/2008 | Akaiwa et al. |
| 2008/0143729 A1 | 6/2008 | Wyatt et al. |
| 2008/0150959 A1 | 6/2008 | Marui et al. |
| 2008/0151700 A1 | 6/2008 | Inoue et al. |
| 2008/0158232 A1 | 7/2008 | Shuster |
| 2008/0167834 A1 | 7/2008 | Herz et al. |
| 2008/0168396 A1 | 7/2008 | Matas et al. |
| 2008/0174606 A1 | 7/2008 | Rengarajan et al. |
| 2008/0186808 A1 | 8/2008 | Lee |
| 2008/0192021 A1 | 8/2008 | Lim et al. |
| 2008/0195961 A1 | 8/2008 | Bae et al. |
| 2008/0201438 A1 | 8/2008 | Mandre et al. |
| 2008/0201647 A1 | 8/2008 | Lagerstedt et al. |
| 2008/0215240 A1 | 9/2008 | Howard et al. |
| 2008/0246778 A1 | 10/2008 | Ham et al. |
| 2008/0247519 A1 | 10/2008 | Abella et al. |
| 2008/0250315 A1 | 10/2008 | Eronen et al. |
| 2008/0270934 A1 | 10/2008 | Firebaugh et al. |
| 2008/0298571 A1 | 12/2008 | Kurtz et al. |
| 2009/0005882 A1 | 1/2009 | Boyer et al. |
| 2009/0007017 A1 | 1/2009 | Anzures et al. |
| 2009/0011821 A1 | 1/2009 | Griswold et al. |
| 2009/0012988 A1 | 1/2009 | Brown |
| 2009/0016168 A1 | 1/2009 | Smith |
| 2009/0016492 A1 | 1/2009 | Tsuchiya |
| 2009/0017800 A1 | 1/2009 | Middleton |
| 2009/0027337 A1 | 1/2009 | Hildreth |
| 2009/0031240 A1 | 1/2009 | Hildreth |
| 2009/0044113 A1 | 2/2009 | Jones et al. |
| 2009/0051327 A1 | 2/2009 | Bohne |
| 2009/0058821 A1 | 3/2009 | Chaudhri et al. |
| 2009/0059730 A1 | 3/2009 | Lyons et al. |
| 2009/0066817 A1 | 3/2009 | Sakamaki |
| 2009/0068984 A1 | 3/2009 | Burnett |
| 2009/0070675 A1 | 3/2009 | Li |
| 2009/0077497 A1 | 3/2009 | Cho et al. |
| 2009/0143114 A1 | 6/2009 | Vargas et al. |
| 2009/0144173 A1 | 6/2009 | Mo et al. |
| 2009/0144639 A1 | 6/2009 | Nims et al. |
| 2009/0146962 A1 | 6/2009 | Ahonen et al. |
| 2009/0158173 A1 | 6/2009 | Palahnuk et al. |
| 2009/0164923 A1 | 6/2009 | Ovi et al. |
| 2009/0178007 A1 | 7/2009 | Matas et al. |
| 2009/0178008 A1 | 7/2009 | Herz et al. |
| 2009/0183080 A1 | 7/2009 | Thakkar et al. |
| 2009/0198581 A1 | 8/2009 | Lidestri |
| 2009/0199130 A1 | 8/2009 | Tsern et al. |
| 2009/0201297 A1 | 8/2009 | Johansson |
| 2009/0202114 A1 | 8/2009 | Morin et al. |
| 2009/0216691 A1 | 8/2009 | Borzestowski et al. |
| 2009/0233650 A1 | 9/2009 | Hosono |
| 2009/0249247 A1 | 10/2009 | Tseng et al. |
| 2009/0251484 A1 | 10/2009 | Zhao et al. |
| 2009/0253516 A1 | 10/2009 | Hartmann et al. |
| 2009/0254859 A1 | 10/2009 | Arrasvuori et al. |
| 2009/0254862 A1 | 10/2009 | Viginisson et al. |
| 2009/0259958 A1 | 10/2009 | Ban |
| 2009/0262088 A1 | 10/2009 | Moll-Carrillo et al. |
| 2009/0264116 A1 | 10/2009 | Thompson et al. |
| 2009/0271705 A1 | 10/2009 | Sheng et al. |
| 2009/0279392 A1 | 11/2009 | Scott et al. |
| 2009/0284389 A1 | 11/2009 | Klassen et al. |
| 2009/0287470 A1 | 11/2009 | Farnsworth et al. |
| 2009/0297022 A1 | 12/2009 | Pettigrew et al. |
| 2009/0300146 A1 | 12/2009 | Park et al. |
| 2009/0300513 A1 | 12/2009 | Nims et al. |
| 2009/0300525 A1 | 12/2009 | Jolliff et al. |
| 2009/0300598 A1 | 12/2009 | Choi |
| 2009/0305732 A1 | 12/2009 | Marcellino et al. |
| 2009/0312059 A1 | 12/2009 | Pratt et al. |
| 2009/0319467 A1 | 12/2009 | Berg et al. |
| 2009/0325701 A1 | 12/2009 | Andres Del Valle |
| 2009/0327886 A1 | 12/2009 | Whytock et al. |
| 2009/0327897 A1 | 12/2009 | Serpico et al. |
| 2010/0009747 A1 | 1/2010 | Reville et al. |
| 2010/0015774 A1 | 1/2010 | Shimamune et al. |
| 2010/0016771 A1 | 1/2010 | Jardine et al. |
| 2010/0026640 A1 | 2/2010 | Kim et al. |
| 2010/0030660 A1 | 2/2010 | Edwards |
| 2010/0060586 A1 | 3/2010 | Pisula et al. |
| 2010/0062905 A1 | 3/2010 | Rottler et al. |
| 2010/0064255 A1 | 3/2010 | Rottler et al. |

(56)                 References Cited

U.S. PATENT DOCUMENTS

| | | |
|---|---|---|
| 2010/0069035 A1 | 3/2010 | Johnson |
| 2010/0081473 A1 | 4/2010 | Chatterjee et al. |
| 2010/0085203 A1 | 4/2010 | Kahn et al. |
| 2010/0088597 A1 | 4/2010 | Shin et al. |
| 2010/0097375 A1 | 4/2010 | Tadaishi et al. |
| 2010/0100841 A1 | 4/2010 | Shin et al. |
| 2010/0107070 A1 | 4/2010 | Devineni et al. |
| 2010/0110082 A1 | 5/2010 | Myrick et al. |
| 2010/0123915 A1 | 5/2010 | Kashimoto |
| 2010/0124152 A1 | 5/2010 | Lee |
| 2010/0124941 A1 | 5/2010 | Cho |
| 2010/0146437 A1 | 6/2010 | Woodcock et al. |
| 2010/0146463 A1 | 6/2010 | Cho et al. |
| 2010/0149573 A1 | 6/2010 | Pat et al. |
| 2010/0153847 A1 | 6/2010 | Fama |
| 2010/0156833 A1 | 6/2010 | Kim et al. |
| 2010/0157742 A1 | 6/2010 | Relyea et al. |
| 2010/0167712 A1 | 7/2010 | Stallings et al. |
| 2010/0169801 A1 | 7/2010 | Blattner et al. |
| 2010/0188426 A1 | 7/2010 | Ohmori et al. |
| 2010/0203968 A1 | 8/2010 | Gill et al. |
| 2010/0205563 A1 | 8/2010 | Haapsaari et al. |
| 2010/0211899 A1 | 8/2010 | Fujioka |
| 2010/0217657 A1 | 8/2010 | Gazdzinski et al. |
| 2010/0218089 A1 | 8/2010 | Chao et al. |
| 2010/0223563 A1 | 9/2010 | Green |
| 2010/0225495 A1 | 9/2010 | Marui |
| 2010/0225773 A1 | 9/2010 | Lee |
| 2010/0226213 A1 | 9/2010 | Drugge |
| 2010/0235726 A1 | 9/2010 | Ording et al. |
| 2010/0243516 A1 | 9/2010 | Martin et al. |
| 2010/0248688 A1 | 9/2010 | Teng et al. |
| 2010/0257469 A1 | 10/2010 | Kim et al. |
| 2010/0277470 A1 | 11/2010 | Margolis |
| 2010/0281374 A1 | 11/2010 | Schulz et al. |
| 2010/0289723 A1 | 11/2010 | London |
| 2010/0302138 A1 | 12/2010 | Poot et al. |
| 2010/0309149 A1 | 12/2010 | Blumenberg et al. |
| 2010/0317410 A1 | 12/2010 | Song et al. |
| 2011/0000968 A1 | 1/2011 | Phillips et al. |
| 2011/0003665 A1 | 1/2011 | Burton et al. |
| 2011/0004835 A1 | 1/2011 | Yanchar et al. |
| 2011/0007174 A1 | 1/2011 | Bacivarov et al. |
| 2011/0007611 A1 | 1/2011 | Kato et al. |
| 2011/0022294 A1 | 1/2011 | Apley |
| 2011/0025719 A1 | 2/2011 | Yanase et al. |
| 2011/0026368 A1 | 2/2011 | Relyea |
| 2011/0029870 A1 | 2/2011 | May et al. |
| 2011/0047014 A1 | 2/2011 | De |
| 2011/0061010 A1 | 3/2011 | Wasko et al. |
| 2011/0070924 A1 | 3/2011 | Kim et al. |
| 2011/0071818 A1 | 3/2011 | Jiang |
| 2011/0072394 A1 | 3/2011 | Victor et al. |
| 2011/0074807 A1 | 3/2011 | Inada et al. |
| 2011/0076992 A1 | 3/2011 | Chou et al. |
| 2011/0078624 A1 | 3/2011 | Missig et al. |
| 2011/0080411 A1 | 4/2011 | Wikkerink et al. |
| 2011/0083111 A1 | 4/2011 | Forutanpour et al. |
| 2011/0098928 A1 | 4/2011 | Hoffman et al. |
| 2011/0109540 A1 | 5/2011 | Milne et al. |
| 2011/0115721 A1 | 5/2011 | Li et al. |
| 2011/0119610 A1 | 5/2011 | Hackborn et al. |
| 2011/0138329 A1 | 6/2011 | Wells et al. |
| 2011/0151415 A1 | 6/2011 | Darling et al. |
| 2011/0157046 A1 | 6/2011 | Lee et al. |
| 2011/0166777 A1 | 7/2011 | Chavakula |
| 2011/0173221 A1 | 7/2011 | Ahiakpor et al. |
| 2011/0179372 A1 | 7/2011 | Moore et al. |
| 2011/0181521 A1 | 7/2011 | Reid et al. |
| 2011/0182151 A1 | 7/2011 | Geyer et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202834 A1 | 8/2011 | Mandryk et al. |
| 2011/0202883 A1 | 8/2011 | Oh et al. |
| 2011/0205851 A1 | 8/2011 | Harris |
| 2011/0218765 A1 | 9/2011 | Rogers et al. |
| 2011/0221755 A1 | 9/2011 | Geisner et al. |
| 2011/0230986 A1 | 9/2011 | Lafortune et al. |
| 2011/0234152 A1 | 9/2011 | Frossen et al. |
| 2011/0237221 A1 | 9/2011 | Prakash et al. |
| 2011/0239115 A1 | 9/2011 | Williams et al. |
| 2011/0248992 A1 | 10/2011 | Van et al. |
| 2011/0249073 A1 | 10/2011 | Cranfill et al. |
| 2011/0249078 A1 | 10/2011 | Abuan et al. |
| 2011/0252344 A1 | 10/2011 | Van |
| 2011/0256848 A1 | 10/2011 | Bok et al. |
| 2011/0261079 A1 | 10/2011 | Ingrassia et al. |
| 2011/0275940 A1 | 11/2011 | Nims et al. |
| 2011/0281342 A1 | 11/2011 | Porsch et al. |
| 2011/0296324 A1 | 12/2011 | Goossens et al. |
| 2011/0304632 A1 | 12/2011 | Evertt et al. |
| 2011/0304685 A1 | 12/2011 | Khedouri et al. |
| 2011/0306421 A1 | 12/2011 | Nishimoto et al. |
| 2011/0316858 A1 | 12/2011 | Shen et al. |
| 2011/0320938 A1 | 12/2011 | Schorsch et al. |
| 2012/0001922 A1 | 1/2012 | Escher et al. |
| 2012/0013552 A1 | 1/2012 | Ahn |
| 2012/0017180 A1 | 1/2012 | Flik et al. |
| 2012/0023131 A1 | 1/2012 | Downey et al. |
| 2012/0028707 A1 | 2/2012 | Raitt et al. |
| 2012/0036220 A1 | 2/2012 | Dare et al. |
| 2012/0047447 A1 | 2/2012 | Haq |
| 2012/0054651 A1 | 3/2012 | Tsai |
| 2012/0059787 A1 | 3/2012 | Brown et al. |
| 2012/0062470 A1 | 3/2012 | Chang et al. |
| 2012/0069028 A1 | 3/2012 | Bouguerra |
| 2012/0075328 A1 | 3/2012 | Goossens |
| 2012/0077554 A1 | 3/2012 | Ahn et al. |
| 2012/0079375 A1 | 3/2012 | Ogino et al. |
| 2012/0079378 A1 | 3/2012 | Goossens |
| 2012/0084729 A1 | 4/2012 | Lin et al. |
| 2012/0092383 A1 | 4/2012 | Hysek et al. |
| 2012/0110438 A1 | 5/2012 | Peraza et al. |
| 2012/0113762 A1 | 5/2012 | Frost |
| 2012/0116550 A1 | 5/2012 | Hoffman et al. |
| 2012/0117507 A1 | 5/2012 | Tseng et al. |
| 2012/0124499 A1 | 5/2012 | Tsai et al. |
| 2012/0150327 A1 | 6/2012 | Altman et al. |
| 2012/0154156 A1 | 6/2012 | Kuntzel |
| 2012/0174029 A1 | 7/2012 | Bastide et al. |
| 2012/0182226 A1 | 7/2012 | Tuli |
| 2012/0197523 A1 | 8/2012 | Kirsch |
| 2012/0206452 A1 | 8/2012 | Geisner et al. |
| 2012/0210263 A1 | 8/2012 | Perry et al. |
| 2012/0212495 A1 | 8/2012 | Butcher et al. |
| 2012/0218201 A1 | 8/2012 | Tamas et al. |
| 2012/0231849 A1 | 9/2012 | Yamashita et al. |
| 2012/0243735 A1 | 9/2012 | Wu et al. |
| 2012/0254804 A1 | 10/2012 | Sheha et al. |
| 2012/0254810 A1 | 10/2012 | Heck et al. |
| 2012/0256967 A1 | 10/2012 | Baldwin et al. |
| 2012/0288139 A1 | 11/2012 | Singhar |
| 2012/0293686 A1 | 11/2012 | Karn et al. |
| 2012/0297346 A1 | 11/2012 | Hoffknecht et al. |
| 2012/0299945 A1 | 11/2012 | Aarabi |
| 2012/0304084 A1 | 11/2012 | Kim et al. |
| 2012/0309520 A1 | 12/2012 | Evertt et al. |
| 2012/0314047 A1 | 12/2012 | Kasahara et al. |
| 2012/0319984 A1 | 12/2012 | Borovsky et al. |
| 2012/0319985 A1 | 12/2012 | Moore et al. |
| 2012/0320081 A1 | 12/2012 | Kim et al. |
| 2012/0323933 A1 | 12/2012 | He et al. |
| 2012/0324390 A1 | 12/2012 | Tao et al. |
| 2013/0007665 A1 | 1/2013 | Chaudhri et al. |
| 2013/0019175 A1 | 1/2013 | Kotler et al. |
| 2013/0021236 A1 | 1/2013 | Bender et al. |
| 2013/0027412 A1 | 1/2013 | Roddy |
| 2013/0030892 A1 | 1/2013 | Liu et al. |
| 2013/0038759 A1 | 2/2013 | Jo et al. |
| 2013/0044072 A1 | 2/2013 | Kobayashi et al. |
| 2013/0044080 A1 | 2/2013 | Chiang |
| 2013/0050263 A1 | 2/2013 | Khoe et al. |
| 2013/0055147 A1 | 2/2013 | Vasudev et al. |

(56) References Cited

U.S. PATENT DOCUMENTS

| | | |
|---|---|---|
| 2013/0057566 A1 | 3/2013 | Kriese et al. |
| 2013/0063084 A1 | 3/2013 | Tilvis et al. |
| 2013/0063383 A1 | 3/2013 | Anderssonreimer et al. |
| 2013/0067407 A1 | 3/2013 | Dehmann |
| 2013/0069893 A1 | 3/2013 | Brinda et al. |
| 2013/0076757 A1 | 3/2013 | Pritting |
| 2013/0080287 A1 | 3/2013 | Currie et al. |
| 2013/0082965 A1 | 4/2013 | Wada et al. |
| 2013/0101164 A1 | 4/2013 | Leclerc et al. |
| 2013/0107674 A1 | 5/2013 | Gossweiler et al. |
| 2013/0111550 A1 | 5/2013 | Naveh et al. |
| 2013/0111579 A1 | 5/2013 | Newman et al. |
| 2013/0113956 A1 | 5/2013 | Anderson et al. |
| 2013/0116967 A1 | 5/2013 | Akcasu et al. |
| 2013/0121119 A1* | 5/2013 | Umamoto ............... G04G 21/02 |
| | | 368/223 |
| 2013/0132888 A1 | 5/2013 | Tijssen |
| 2013/0135315 A1 | 5/2013 | Bares et al. |
| 2013/0141371 A1 | 6/2013 | Hallford et al. |
| 2013/0141513 A1 | 6/2013 | Setton et al. |
| 2013/0143512 A1 | 6/2013 | Hernandez et al. |
| 2013/0147825 A1 | 6/2013 | Martin et al. |
| 2013/0147933 A1 | 6/2013 | Kulas et al. |
| 2013/0157646 A1 | 6/2013 | Ferren et al. |
| 2013/0159900 A1 | 6/2013 | Pendharkar |
| 2013/0160141 A1 | 6/2013 | Tseng et al. |
| 2013/0170324 A1 | 7/2013 | Tu et al. |
| 2013/0185813 A1 | 7/2013 | Shim et al. |
| 2013/0191785 A1 | 7/2013 | Wu et al. |
| 2013/0194378 A1 | 8/2013 | Brown |
| 2013/0198210 A1 | 8/2013 | Lee et al. |
| 2013/0201104 A1 | 8/2013 | Ptucha et al. |
| 2013/0205194 A1 | 8/2013 | Decker et al. |
| 2013/0215044 A1 | 8/2013 | Ahn et al. |
| 2013/0222271 A1 | 8/2013 | Alberth et al. |
| 2013/0225152 A1 | 8/2013 | Matthews et al. |
| 2013/0232443 A1 | 9/2013 | Ryu et al. |
| 2013/0234964 A1 | 9/2013 | Kim et al. |
| 2013/0238686 A1 | 9/2013 | O'Donoghue et al. |
| 2013/0239060 A1 | 9/2013 | Kang et al. |
| 2013/0239063 A1 | 9/2013 | Ubillos et al. |
| 2013/0254705 A1 | 9/2013 | Mooring et al. |
| 2013/0286161 A1 | 10/2013 | Lv et al. |
| 2013/0290905 A1 | 10/2013 | Luvogt et al. |
| 2013/0293686 A1 | 11/2013 | Blow et al. |
| 2013/0305189 A1 | 11/2013 | Kim |
| 2013/0314204 A1 | 11/2013 | Ho et al. |
| 2013/0316763 A1 | 11/2013 | Kader |
| 2013/0318437 A1 | 11/2013 | Jung et al. |
| 2013/0318466 A1 | 11/2013 | Estrada et al. |
| 2013/0322218 A1 | 12/2013 | Burkhardt et al. |
| 2013/0326418 A1 | 12/2013 | Utsuki et al. |
| 2013/0332721 A1 | 12/2013 | Chaudhri et al. |
| 2013/0332856 A1 | 12/2013 | Sanders et al. |
| 2013/0342730 A1 | 12/2013 | Lee et al. |
| 2013/0345978 A1 | 12/2013 | Lush et al. |
| 2013/0345980 A1 | 12/2013 | Van Os et al. |
| 2014/0013414 A1 | 1/2014 | Bruck et al. |
| 2014/0013945 A1 | 1/2014 | Tanaka et al. |
| 2014/0022183 A1 | 1/2014 | Ayoub et al. |
| 2014/0037109 A1 | 2/2014 | Ban |
| 2014/0043329 A1 | 2/2014 | Wang et al. |
| 2014/0043367 A1 | 2/2014 | Sakaino et al. |
| 2014/0047389 A1 | 2/2014 | Aarabi |
| 2014/0047525 A1 | 2/2014 | Bonhoff |
| 2014/0055495 A1 | 2/2014 | Kim et al. |
| 2014/0055554 A1 | 2/2014 | Du et al. |
| 2014/0058812 A1 | 2/2014 | Bender et al. |
| 2014/0059493 A1 | 2/2014 | Kim |
| 2014/0063049 A1 | 3/2014 | Armstrong-Muntner |
| 2014/0068755 A1 | 3/2014 | King et al. |
| 2014/0074570 A1 | 3/2014 | Hope et al. |
| 2014/0075004 A1 | 3/2014 | Van Dusen et al. |
| 2014/0078144 A1 | 3/2014 | Berriman et al. |
| 2014/0080465 A1 | 3/2014 | Cho |
| 2014/0082533 A1 | 3/2014 | Kelley et al. |
| 2014/0086123 A1 | 3/2014 | Deivasigamani et al. |
| 2014/0092101 A1 | 4/2014 | Lee et al. |
| 2014/0094224 A1 | 4/2014 | Lozovoy et al. |
| 2014/0101169 A1 | 4/2014 | Kurata et al. |
| 2014/0115488 A1 | 4/2014 | Hackborn |
| 2014/0125620 A1 | 5/2014 | Panther et al. |
| 2014/0126336 A1 | 5/2014 | Goeller et al. |
| 2014/0129959 A1 | 5/2014 | Battles et al. |
| 2014/0135631 A1 | 5/2014 | Brumback et al. |
| 2014/0137013 A1 | 5/2014 | Matas |
| 2014/0139454 A1 | 5/2014 | Mistry et al. |
| 2014/0139637 A1 | 5/2014 | Mistry et al. |
| 2014/0143671 A1 | 5/2014 | Kovalick |
| 2014/0143678 A1 | 5/2014 | Mistry et al. |
| 2014/0143693 A1 | 5/2014 | Goossens et al. |
| 2014/0143737 A1 | 5/2014 | Mistry et al. |
| 2014/0157189 A1 | 6/2014 | Morita |
| 2014/0157321 A1 | 6/2014 | Kurita et al. |
| 2014/0164907 A1 | 6/2014 | Jung et al. |
| 2014/0168217 A1 | 6/2014 | Kim et al. |
| 2014/0171132 A1 | 6/2014 | Ziemianska et al. |
| 2014/0173439 A1 | 6/2014 | Gutierrez et al. |
| 2014/0173517 A1 | 6/2014 | Chaudhri et al. |
| 2014/0179272 A1 | 6/2014 | Zhang et al. |
| 2014/0189578 A1 | 7/2014 | Shuttleworth et al. |
| 2014/0189584 A1 | 7/2014 | Weng et al. |
| 2014/0195476 A1 | 7/2014 | Sxhmidt |
| 2014/0200691 A1 | 7/2014 | Lee et al. |
| 2014/0201655 A1 | 7/2014 | Mahaffey et al. |
| 2014/0210708 A1 | 7/2014 | Simmons et al. |
| 2014/0210801 A1 | 7/2014 | Li |
| 2014/0218371 A1 | 8/2014 | Du et al. |
| 2014/0229752 A1 | 8/2014 | Lee et al. |
| 2014/0244009 A1 | 8/2014 | Mestas |
| 2014/0244165 A1 | 8/2014 | Bells et al. |
| 2014/0245161 A1 | 8/2014 | Yuen et al. |
| 2014/0245177 A1 | 8/2014 | Maklouf et al. |
| 2014/0250374 A1 | 9/2014 | Ohki et al. |
| 2014/0250391 A1 | 9/2014 | Jong et al. |
| 2014/0253487 A1 | 9/2014 | Bezinge et al. |
| 2014/0258935 A1 | 9/2014 | Nishida et al. |
| 2014/0267303 A1 | 9/2014 | Larkin et al. |
| 2014/0267618 A1 | 9/2014 | Esteban et al. |
| 2014/0276244 A1 | 9/2014 | Kamyar |
| 2014/0282103 A1 | 9/2014 | Jerry |
| 2014/0282153 A1 | 9/2014 | Christiansen et al. |
| 2014/0282207 A1 | 9/2014 | Wouhaybi et al. |
| 2014/0282254 A1 | 9/2014 | Feiereisen et al. |
| 2014/0289660 A1 | 9/2014 | Min |
| 2014/0293755 A1 | 10/2014 | Geiser et al. |
| 2014/0300635 A1 | 10/2014 | Suzuki |
| 2014/0302834 A1 | 10/2014 | Jones |
| 2014/0304664 A1 | 10/2014 | Lee et al. |
| 2014/0310350 A1 | 10/2014 | Borggaard et al. |
| 2014/0310618 A1 | 10/2014 | Venkatesh |
| 2014/0310643 A1 | 10/2014 | Karmanenko et al. |
| 2014/0317543 A1 | 10/2014 | Kim |
| 2014/0317555 A1 | 10/2014 | Choi et al. |
| 2014/0325384 A1 | 10/2014 | Kobayashi |
| 2014/0325408 A1 | 10/2014 | Leppanen et al. |
| 2014/0328151 A1 | 11/2014 | Serber |
| 2014/0331314 A1 | 11/2014 | Fujioka |
| 2014/0333671 A1 | 11/2014 | Phang et al. |
| 2014/0336808 A1 | 11/2014 | Taylor et al. |
| 2014/0342792 A1 | 11/2014 | Markus |
| 2014/0344723 A1 | 11/2014 | Malik et al. |
| 2014/0344820 A1 | 11/2014 | Kumar |
| 2014/0344862 A1 | 11/2014 | Cho et al. |
| 2014/0344951 A1 | 11/2014 | Brewer |
| 2014/0347275 A1 | 11/2014 | Jung et al. |
| 2014/0351720 A1 | 11/2014 | Yin |
| 2014/0358012 A1 | 12/2014 | Richards et al. |
| 2014/0359124 A1 | 12/2014 | Adimatyam et al. |
| 2014/0359477 A1 | 12/2014 | Chen |
| 2014/0362091 A1 | 12/2014 | Bouaziz et al. |
| 2014/0362105 A1 | 12/2014 | Kocienda et al. |
| 2014/0362195 A1 | 12/2014 | Ng-Thow-Hing et al. |
| 2014/0365956 A1 | 12/2014 | Karunamuni et al. |

(56)         References Cited

U.S. PATENT DOCUMENTS

| | | | |
|---|---|---|---|
| 2014/0368601 A1 | 12/2014 | Decharms |
| 2014/0371887 A1 | 12/2014 | Hoffman et al. |
| 2014/0380229 A1 | 12/2014 | Volodin et al. |
| 2015/0011204 A1 | 1/2015 | Seo et al. |
| 2015/0015500 A1 | 1/2015 | Lee et al. |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0026615 A1 | 1/2015 | Choi et al. |
| 2015/0033192 A1 | 1/2015 | Bohannon et al. |
| 2015/0035825 A1 | 2/2015 | Zhou et al. |
| 2015/0036883 A1 | 2/2015 | Deri et al. |
| 2015/0037545 A1 | 2/2015 | Sun |
| 2015/0042571 A1 | 2/2015 | Lombardi et al. |
| 2015/0043046 A1 | 2/2015 | Iwamoto |
| 2015/0049033 A1 | 2/2015 | Kim et al. |
| 2015/0052461 A1 | 2/2015 | Sullivan et al. |
| 2015/0052462 A1 | 2/2015 | Kulkarni |
| 2015/0055197 A1 | 2/2015 | Romanoff et al. |
| 2015/0058651 A1 | 2/2015 | Choi et al. |
| 2015/0058754 A1 | 2/2015 | Rauh |
| 2015/0061988 A1 | 3/2015 | Galu, Jr. |
| 2015/0062052 A1 | 3/2015 | Bernstein et al. |
| 2015/0062130 A1 | 3/2015 | Ho |
| 2015/0067596 A1 | 3/2015 | Brown et al. |
| 2015/0070378 A1 | 3/2015 | Kriese et al. |
| 2015/0071043 A1 | 3/2015 | Kubota |
| 2015/0077502 A1 | 3/2015 | Jordan et al. |
| 2015/0078621 A1 | 3/2015 | Choi et al. |
| 2015/0081474 A1 | 3/2015 | Kostka et al. |
| 2015/0082193 A1 | 3/2015 | Wallace et al. |
| 2015/0082446 A1 | 3/2015 | Flowers et al. |
| 2015/0083970 A1 | 3/2015 | Koh et al. |
| 2015/0091896 A1 | 4/2015 | Tarquini et al. |
| 2015/0100621 A1 | 4/2015 | Pan |
| 2015/0105125 A1 | 4/2015 | Min et al. |
| 2015/0106221 A1 | 4/2015 | Tapley et al. |
| 2015/0106752 A1 | 4/2015 | Yang |
| 2015/0110419 A1 | 4/2015 | Xu et al. |
| 2015/0111558 A1 | 4/2015 | Yang |
| 2015/0112700 A1 | 4/2015 | Sublett et al. |
| 2015/0113468 A1 | 4/2015 | Clark |
| 2015/0117162 A1 | 4/2015 | Tsai et al. |
| 2015/0118657 A1 | 4/2015 | Shrake et al. |
| 2015/0128042 A1 | 5/2015 | Churchill et al. |
| 2015/0128078 A1 | 5/2015 | Oh et al. |
| 2015/0143234 A1 | 5/2015 | Norris, III |
| 2015/0149899 A1 | 5/2015 | Bernstein et al. |
| 2015/0149927 A1 | 5/2015 | Walkin et al. |
| 2015/0160806 A1 | 6/2015 | Fey et al. |
| 2015/0160812 A1 | 6/2015 | Yuan et al. |
| 2015/0160856 A1 | 6/2015 | Jang et al. |
| 2015/0163210 A1 | 6/2015 | Meyers et al. |
| 2015/0172438 A1 | 6/2015 | Yang |
| 2015/0185703 A1 | 7/2015 | Tanaka |
| 2015/0185995 A1 | 7/2015 | Shoemaker et al. |
| 2015/0194137 A1 | 7/2015 | Wyatt |
| 2015/0205509 A1 | 7/2015 | Scriven et al. |
| 2015/0207922 A1 | 7/2015 | Kobayashi et al. |
| 2015/0208115 A1 | 7/2015 | Kutsumi et al. |
| 2015/0213604 A1 | 7/2015 | Li et al. |
| 2015/0217163 A1 | 8/2015 | Amis et al. |
| 2015/0220265 A1 | 8/2015 | Takahashi |
| 2015/0220299 A1 | 8/2015 | Kim et al. |
| 2015/0228048 A1 | 8/2015 | Heo et al. |
| 2015/0248235 A1 | 9/2015 | Offenberg et al. |
| 2015/0253736 A1 | 9/2015 | Watterson |
| 2015/0253740 A1 | 9/2015 | Nishijima et al. |
| 2015/0254396 A1 | 9/2015 | Tamura et al. |
| 2015/0254875 A1 | 9/2015 | Zhang |
| 2015/0261284 A1 | 9/2015 | Lee et al. |
| 2015/0277545 A1 | 10/2015 | Flowers et al. |
| 2015/0281145 A1 | 10/2015 | Ji |
| 2015/0286372 A1 | 10/2015 | Swindell et al. |
| 2015/0286391 A1 | 10/2015 | Jacobs et al. |
| 2015/0301506 A1 | 10/2015 | Koumaiha |
| 2015/0301608 A1 | 10/2015 | Nagaraju et al. |
| 2015/0302624 A1 | 10/2015 | Burke |
| 2015/0312182 A1 | 10/2015 | Langholz |
| 2015/0312184 A1 | 10/2015 | Langholz et al. |
| 2015/0312185 A1 | 10/2015 | Langholz et al. |
| 2015/0317147 A1 | 11/2015 | Nachimuthu et al. |
| 2015/0317945 A1 | 11/2015 | Andress et al. |
| 2015/0331589 A1 | 11/2015 | Kawakita |
| 2015/0334075 A1 | 11/2015 | Wang et al. |
| 2015/0339261 A1 | 11/2015 | Jha et al. |
| 2015/0346694 A1 | 12/2015 | Hoobler et al. |
| 2015/0346824 A1 | 12/2015 | Chen et al. |
| 2015/0350141 A1 | 12/2015 | Yang et al. |
| 2015/0355830 A1 | 12/2015 | Chaudhri et al. |
| 2015/0365892 A1 | 12/2015 | Ma et al. |
| 2015/0366518 A1 | 12/2015 | Sampson |
| 2015/0370469 A1 | 12/2015 | Leong et al. |
| 2015/0370529 A1 | 12/2015 | Zambetti et al. |
| 2015/0378592 A1 | 12/2015 | Kim |
| 2015/0379476 A1 | 12/2015 | Chaudhri et al. |
| 2016/0004393 A1 | 1/2016 | Faaborg et al. |
| 2016/0005211 A1 | 1/2016 | Sarkis et al. |
| 2016/0006987 A1 | 1/2016 | Li et al. |
| 2016/0019360 A1 | 1/2016 | Pahwa et al. |
| 2016/0022202 A1 | 1/2016 | Peterson et al. |
| 2016/0027420 A1 | 1/2016 | Eronen |
| 2016/0030844 A1 | 2/2016 | Nair et al. |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0041597 A1 | 2/2016 | Graham et al. |
| 2016/0044091 A1 | 2/2016 | Doumet |
| 2016/0044442 A1 | 2/2016 | Pacelli et al. |
| 2016/0048161 A1 | 2/2016 | Carceroni et al. |
| 2016/0048283 A1 | 2/2016 | Yang et al. |
| 2016/0049106 A1 | 2/2016 | Connell et al. |
| 2016/0050169 A1 | 2/2016 | Ben Atar et al. |
| 2016/0054710 A1 | 2/2016 | Jo et al. |
| 2016/0054892 A1 | 2/2016 | Kim et al. |
| 2016/0058336 A1 | 3/2016 | Blahnik et al. |
| 2016/0058337 A1 | 3/2016 | Blahnik et al. |
| 2016/0062450 A1 | 3/2016 | Han et al. |
| 2016/0062540 A1 | 3/2016 | Yang et al. |
| 2016/0062541 A1 | 3/2016 | Anzures et al. |
| 2016/0062570 A1 | 3/2016 | Dascola et al. |
| 2016/0062572 A1 | 3/2016 | Yang et al. |
| 2016/0062582 A1 | 3/2016 | Wilson et al. |
| 2016/0062589 A1 | 3/2016 | Wan et al. |
| 2016/0062630 A1 | 3/2016 | Anzures et al. |
| 2016/0073034 A1 | 3/2016 | Mukherjee et al. |
| 2016/0085397 A1 | 3/2016 | Jain |
| 2016/0086387 A1 | 3/2016 | Os et al. |
| 2016/0091867 A1 | 3/2016 | Mansour et al. |
| 2016/0092035 A1 | 3/2016 | Crocker et al. |
| 2016/0092043 A1 | 3/2016 | Missig et al. |
| 2016/0098137 A1 | 4/2016 | Kim et al. |
| 2016/0103427 A1 | 4/2016 | Westra et al. |
| 2016/0132200 A1 | 5/2016 | Walkin et al. |
| 2016/0134840 A1 | 5/2016 | McCulloch |
| 2016/0142763 A1 | 5/2016 | Kim et al. |
| 2016/0150215 A1 | 5/2016 | Chen et al. |
| 2016/0163084 A1 | 6/2016 | Corazza et al. |
| 2016/0165037 A1 | 6/2016 | Youn et al. |
| 2016/0165038 A1 | 6/2016 | Lim et al. |
| 2016/0166197 A1 | 6/2016 | Venkatraman et al. |
| 2016/0170731 A1 | 6/2016 | Maddern et al. |
| 2016/0179353 A1 | 6/2016 | Iskander |
| 2016/0180568 A1 | 6/2016 | Bullivant et al. |
| 2016/0187995 A1 | 6/2016 | Rosewall |
| 2016/0188179 A1 | 6/2016 | Roh |
| 2016/0188181 A1 | 6/2016 | Smith |
| 2016/0189328 A1 | 6/2016 | Vranjes et al. |
| 2016/0191511 A1 | 6/2016 | Tijerina et al. |
| 2016/0192324 A1 | 6/2016 | Zhang et al. |
| 2016/0197773 A1 | 7/2016 | Pandrangi et al. |
| 2016/0205244 A1 | 7/2016 | Dvortsov |

(56) References Cited

U.S. PATENT DOCUMENTS

| | | |
|---|---|---|
| 2016/0210934 A1 | 7/2016 | Halfman et al. |
| 2016/0217601 A1 | 7/2016 | Tsuda et al. |
| 2016/0226926 A1 | 8/2016 | Singh et al. |
| 2016/0227121 A1 | 8/2016 | Matsushita |
| 2016/0247309 A1 | 8/2016 | Li et al. |
| 2016/0259413 A1 | 9/2016 | Anzures et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259656 A1 | 9/2016 | Sumner et al. |
| 2016/0261675 A1 | 9/2016 | Block et al. |
| 2016/0266548 A1 | 9/2016 | Akiyama |
| 2016/0267067 A1 | 9/2016 | Mays et al. |
| 2016/0275724 A1 | 9/2016 | Adeyoola et al. |
| 2016/0283094 A1 | 9/2016 | Choi |
| 2016/0284123 A1 | 9/2016 | Hare et al. |
| 2016/0299679 A1 | 10/2016 | Park et al. |
| 2016/0313869 A1 | 10/2016 | Jang et al. |
| 2016/0320756 A1 | 11/2016 | Lee et al. |
| 2016/0323507 A1 | 11/2016 | Chong et al. |
| 2016/0327911 A1 | 11/2016 | Eim et al. |
| 2016/0327915 A1 | 11/2016 | Katzer et al. |
| 2016/0328875 A1 | 11/2016 | Fang et al. |
| 2016/0332025 A1 | 11/2016 | Repka |
| 2016/0342327 A1 | 11/2016 | Chi et al. |
| 2016/0357151 A1 | 12/2016 | Block et al. |
| 2016/0357282 A1 | 12/2016 | Block et al. |
| 2016/0357354 A1 | 12/2016 | Chen et al. |
| 2016/0357386 A1 | 12/2016 | Choi |
| 2016/0357413 A1 | 12/2016 | Block et al. |
| 2016/0358311 A1 | 12/2016 | Chen et al. |
| 2016/0370974 A1 | 12/2016 | Stenneth |
| 2016/0378067 A1 | 12/2016 | Bishop |
| 2017/0003659 A1 | 1/2017 | Nakanishi |
| 2017/0004798 A1 | 1/2017 | Park et al. |
| 2017/0011210 A1 | 1/2017 | Cheong et al. |
| 2017/0018289 A1 | 1/2017 | Morgenstern |
| 2017/0032554 A1 | 2/2017 | O'Donovan et al. |
| 2017/0039535 A1 | 2/2017 | Park et al. |
| 2017/0040001 A1 | 2/2017 | Zhang et al. |
| 2017/0045993 A1 | 2/2017 | Oh et al. |
| 2017/0046024 A1 | 2/2017 | Dascola et al. |
| 2017/0046052 A1 | 2/2017 | Lee et al. |
| 2017/0046065 A1 | 2/2017 | Zeng et al. |
| 2017/0053542 A1 | 2/2017 | Wilson et al. |
| 2017/0061635 A1 | 3/2017 | Petrovich et al. |
| 2017/0061934 A1 | 3/2017 | Shin |
| 2017/0068407 A1 | 3/2017 | Wilson et al. |
| 2017/0075305 A1 | 3/2017 | Ryu et al. |
| 2017/0075316 A1 | 3/2017 | Berdinis et al. |
| 2017/0080346 A1 | 3/2017 | Abbas |
| 2017/0082983 A1 | 3/2017 | Katzer et al. |
| 2017/0083086 A1 | 3/2017 | Mazur et al. |
| 2017/0085887 A1 | 3/2017 | Rosewarne et al. |
| 2017/0105081 A1 | 4/2017 | Jin et al. |
| 2017/0109011 A1 | 4/2017 | Jiang |
| 2017/0111616 A1 | 4/2017 | Li et al. |
| 2017/0123571 A1 | 5/2017 | Huang et al. |
| 2017/0123640 A1 | 5/2017 | Wilson et al. |
| 2017/0124751 A1 | 5/2017 | Ross et al. |
| 2017/0127354 A1 | 5/2017 | Garland et al. |
| 2017/0131886 A1 | 5/2017 | Kim et al. |
| 2017/0134321 A1 | 5/2017 | Ushio et al. |
| 2017/0140214 A1 | 5/2017 | Matas et al. |
| 2017/0149795 A1 | 5/2017 | Day, II |
| 2017/0160898 A1 | 6/2017 | Lee et al. |
| 2017/0164292 A1 | 6/2017 | Santamaria et al. |
| 2017/0164888 A1 | 6/2017 | Matsuda et al. |
| 2017/0176950 A1 | 6/2017 | Jung et al. |
| 2017/0178287 A1 | 6/2017 | Anderson |
| 2017/0186399 A1 | 6/2017 | Moritani et al. |
| 2017/0193684 A1 | 7/2017 | Du et al. |
| 2017/0206095 A1 | 7/2017 | Gibbs et al. |
| 2017/0209766 A1 | 7/2017 | Riley et al. |
| 2017/0212648 A1 | 7/2017 | Choi et al. |
| 2017/0220212 A1 | 8/2017 | Yang et al. |
| 2017/0230236 A1 | 8/2017 | Kim et al. |
| 2017/0236298 A1 | 8/2017 | Vetter |
| 2017/0236497 A1 | 8/2017 | Huitema et al. |
| 2017/0243508 A1 | 8/2017 | Cheng et al. |
| 2017/0255169 A1 | 9/2017 | Lee et al. |
| 2017/0257426 A1 | 9/2017 | Wilbur et al. |
| 2017/0266494 A1 | 9/2017 | Crankson et al. |
| 2017/0269715 A1 | 9/2017 | Kim et al. |
| 2017/0269792 A1 | 9/2017 | Xu et al. |
| 2017/0277136 A1 | 9/2017 | Minami et al. |
| 2017/0285916 A1 | 10/2017 | Xu et al. |
| 2017/0286614 A1 | 10/2017 | Morris et al. |
| 2017/0286913 A1 | 10/2017 | Liu et al. |
| 2017/0287312 A1 | 10/2017 | Schofield et al. |
| 2017/0294174 A1 | 10/2017 | Albadawi et al. |
| 2017/0300013 A1 | 10/2017 | Satou et al. |
| 2017/0322658 A1 | 11/2017 | Lee et al. |
| 2017/0322711 A1 | 11/2017 | Robinson et al. |
| 2017/0323266 A1 | 11/2017 | Seo |
| 2017/0325196 A1 | 11/2017 | Cho et al. |
| 2017/0329477 A1 | 11/2017 | Sachidanandam et al. |
| 2017/0336926 A1 | 11/2017 | Chaudhri et al. |
| 2017/0336928 A1 | 11/2017 | Chaudhri et al. |
| 2017/0337554 A1 | 11/2017 | Mokhasi et al. |
| 2017/0354845 A1 | 12/2017 | Williams et al. |
| 2017/0357329 A1 | 12/2017 | Park et al. |
| 2017/0357358 A1 | 12/2017 | Teutschler et al. |
| 2017/0357413 A1 | 12/2017 | Green |
| 2017/0357426 A1 | 12/2017 | Wilson et al. |
| 2017/0357427 A1 | 12/2017 | Wilson et al. |
| 2017/0357495 A1 | 12/2017 | Crane et al. |
| 2017/0371394 A1 | 12/2017 | Chan et al. |
| 2018/0004404 A1 | 1/2018 | Delfino et al. |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0034867 A1 | 2/2018 | Zahn et al. |
| 2018/0039232 A1 | 2/2018 | Abramov et al. |
| 2018/0047200 A1 | 2/2018 | O'Hara et al. |
| 2018/0052428 A1 | 2/2018 | Abramov |
| 2018/0059903 A1 | 3/2018 | Lim et al. |
| 2018/0061308 A1 | 3/2018 | Bae et al. |
| 2018/0067633 A1 | 3/2018 | Wilson et al. |
| 2018/0074462 A1 | 3/2018 | Helder et al. |
| 2018/0074693 A1 | 3/2018 | Jones et al. |
| 2018/0081515 A1 | 3/2018 | Block et al. |
| 2018/0088537 A1 | 3/2018 | Murai |
| 2018/0088733 A1 | 3/2018 | Syed et al. |
| 2018/0088787 A1 | 3/2018 | Bereza et al. |
| 2018/0088797 A1 | 3/2018 | McAtee et al. |
| 2018/0091732 A1 | 3/2018 | Wilson et al. |
| 2018/0095649 A1 | 4/2018 | Valdivia et al. |
| 2018/0097925 A1 | 4/2018 | Ryu et al. |
| 2018/0114543 A1 | 4/2018 | Novikoff |
| 2018/0120927 A1 | 5/2018 | Ma et al. |
| 2018/0121060 A1 | 5/2018 | Jeong et al. |
| 2018/0131878 A1 | 5/2018 | Charlton et al. |
| 2018/0136810 A1 | 5/2018 | Martin et al. |
| 2018/0143748 A1 | 5/2018 | Ahmed et al. |
| 2018/0150212 A1 | 5/2018 | Chen et al. |
| 2018/0150443 A1 | 5/2018 | Singleton |
| 2018/0157452 A1 | 6/2018 | Nelson et al. |
| 2018/0165862 A1 | 6/2018 | Sawaki |
| 2018/0165863 A1 | 6/2018 | Kubo et al. |
| 2018/0174550 A1 | 6/2018 | Zhang et al. |
| 2018/0181078 A1 | 6/2018 | Imamura |
| 2018/0181381 A1 | 6/2018 | Michaely et al. |
| 2018/0188925 A1 | 7/2018 | Na et al. |
| 2018/0189549 A1 | 7/2018 | Inomata |
| 2018/0191944 A1 | 7/2018 | Carbonell et al. |
| 2018/0205675 A1 | 7/2018 | Koo et al. |
| 2018/0246635 A1 | 8/2018 | Baer et al. |
| 2018/0246639 A1 | 8/2018 | Han et al. |
| 2018/0260080 A1 | 9/2018 | Cho |

(56) References Cited

U.S. PATENT DOCUMENTS

| | | |
|---|---|---|
| 2018/0261183 A1 | 9/2018 | Gou et al. |
| 2018/0268589 A1 | 9/2018 | Grant |
| 2018/0275739 A1 | 9/2018 | Minami et al. |
| 2018/0275750 A1 | 9/2018 | Zeng |
| 2018/0288560 A1 | 10/2018 | Naik et al. |
| 2018/0316783 A1 | 11/2018 | Ye et al. |
| 2018/0321842 A1 | 11/2018 | Lee et al. |
| 2018/0324353 A1 | 11/2018 | Kim et al. |
| 2018/0329587 A1 | 11/2018 | Ko et al. |
| 2018/0335927 A1 | 11/2018 | Anzures et al. |
| 2018/0335929 A1 | 11/2018 | Scapel et al. |
| 2018/0335930 A1 | 11/2018 | Scapel et al. |
| 2018/0336715 A1 | 11/2018 | Rickwald et al. |
| 2018/0341389 A1 | 11/2018 | Kim et al. |
| 2018/0343023 A1 | 11/2018 | Park et al. |
| 2018/0348844 A1 | 12/2018 | Lingutla et al. |
| 2018/0349795 A1 | 12/2018 | Boyle et al. |
| 2018/0352435 A1 | 12/2018 | Donley et al. |
| 2018/0364648 A1 | 12/2018 | Chi et al. |
| 2018/0366068 A1 | 12/2018 | Liu et al. |
| 2018/0374429 A1 | 12/2018 | Nakamura |
| 2019/0018445 A1 | 1/2019 | Watanabe et al. |
| 2019/0050045 A1 | 2/2019 | Jha et al. |
| 2019/0058827 A1 | 2/2019 | Park et al. |
| 2019/0069244 A1 | 2/2019 | Jeon et al. |
| 2019/0072909 A1 | 3/2019 | Misaki et al. |
| 2019/0079576 A1 | 3/2019 | Liu et al. |
| 2019/0088018 A1 | 3/2019 | Shenton et al. |
| 2019/0096106 A1 | 3/2019 | Shapiro et al. |
| 2019/0101869 A1 | 4/2019 | Lee et al. |
| 2019/0114038 A1 | 4/2019 | Geiger et al. |
| 2019/0121300 A1 | 4/2019 | Peterson et al. |
| 2019/0121523 A1 | 4/2019 | Block et al. |
| 2019/0139207 A1 | 5/2019 | Jeong et al. |
| 2019/0158735 A1 | 5/2019 | Wilson et al. |
| 2019/0160378 A1 | 5/2019 | Fajt et al. |
| 2019/0163142 A1 | 5/2019 | Chang et al. |
| 2019/0180221 A1 | 6/2019 | Greenberger et al. |
| 2019/0181078 A1 | 6/2019 | Yamamoto et al. |
| 2019/0182749 A1 | 6/2019 | Breaux et al. |
| 2019/0212707 A1 | 7/2019 | Minami et al. |
| 2019/0213037 A1 | 7/2019 | Kim et al. |
| 2019/0235748 A1 | 8/2019 | Seol et al. |
| 2019/0237003 A1 | 8/2019 | Cao et al. |
| 2019/0250813 A1 | 8/2019 | Block et al. |
| 2019/0266807 A1 | 8/2019 | Lee et al. |
| 2019/0268771 A1 | 8/2019 | Seo et al. |
| 2019/0279520 A1 | 9/2019 | Wilson et al. |
| 2019/0281154 A1 | 9/2019 | Choi et al. |
| 2019/0302972 A1 | 10/2019 | Kline et al. |
| 2019/0310761 A1 | 10/2019 | Agarawala et al. |
| 2019/0324404 A1 | 10/2019 | Olwal |
| 2019/0324620 A1 | 10/2019 | Gu et al. |
| 2019/0339847 A1 | 11/2019 | Scapel et al. |
| 2019/0339860 A1 | 11/2019 | Chen et al. |
| 2019/0340348 A1 | 11/2019 | Yu et al. |
| 2019/0342507 A1 | 11/2019 | Dye et al. |
| 2019/0347868 A1 | 11/2019 | Scapel et al. |
| 2019/0349469 A1 | 11/2019 | Skogen et al. |
| 2020/0042311 A1 | 2/2020 | Shin |
| 2020/0045245 A1 | 2/2020 | Van Os et al. |
| 2020/0050332 A1 | 2/2020 | Yang et al. |
| 2020/0068095 A1 | 2/2020 | Nabetani |
| 2020/0073122 A1 | 3/2020 | Rothkopf et al. |
| 2020/0089302 A1 | 3/2020 | Kim et al. |
| 2020/0110522 A1 | 4/2020 | Zambetti et al. |
| 2020/0110946 A1 | 4/2020 | Kline et al. |
| 2020/0125037 A1 | 4/2020 | Jo et al. |
| 2020/0133206 A1 | 4/2020 | Jo et al. |
| 2020/0175485 A1 | 6/2020 | Knock |
| 2020/0226848 A1 | 7/2020 | Van Os et al. |
| 2020/0228646 A1 | 7/2020 | Hotes et al. |
| 2020/0234481 A1 | 7/2020 | Scapel et al. |
| 2020/0234508 A1 | 7/2020 | Shaburov et al. |
| 2020/0242228 A1 | 7/2020 | Farraro et al. |
| 2020/0249632 A1 | 8/2020 | Olwal et al. |
| 2020/0264567 A1 | 8/2020 | Ok et al. |
| 2020/0285851 A1 | 9/2020 | Lin et al. |
| 2020/0319348 A1 | 10/2020 | Oshita et al. |
| 2020/0327862 A1 | 10/2020 | Sinha et al. |
| 2020/0342144 A1 | 10/2020 | Alameh et al. |
| 2020/0348827 A1 | 11/2020 | Wilson et al. |
| 2020/0356063 A1 | 11/2020 | Guzman et al. |
| 2020/0356224 A1 | 11/2020 | Wilson |
| 2020/0356242 A1 | 11/2020 | Wilson et al. |
| 2020/0356252 A1 | 11/2020 | Ko et al. |
| 2020/0356687 A1 | 11/2020 | Salzman et al. |
| 2020/0359204 A1 | 11/2020 | Hawkins et al. |
| 2020/0379413 A1 | 12/2020 | Chen et al. |
| 2020/0380103 A1 | 12/2020 | Hosoda |
| 2020/0380768 A1 | 12/2020 | Harris et al. |
| 2020/0380781 A1 | 12/2020 | Barlier et al. |
| 2020/0408521 A1 | 12/2020 | Lyons et al. |
| 2020/0410763 A1 | 12/2020 | Hare et al. |
| 2020/0412975 A1 | 12/2020 | Al Majid et al. |
| 2021/0005003 A1 | 1/2021 | Chong et al. |
| 2021/0042028 A1 | 2/2021 | Block et al. |
| 2021/0048929 A1 | 2/2021 | Agnoli et al. |
| 2021/0056769 A1 | 2/2021 | Scapel et al. |
| 2021/0058351 A1 | 2/2021 | Viklund et al. |
| 2021/0065448 A1 | 3/2021 | Goodrich et al. |
| 2021/0065454 A1 | 3/2021 | Goodrich et al. |
| 2021/0073007 A1 | 3/2021 | Guzman et al. |
| 2021/0089136 A1 | 3/2021 | Hossain et al. |
| 2021/0096703 A1 | 4/2021 | Anzures et al. |
| 2021/0099568 A1 | 4/2021 | Depue et al. |
| 2021/0099761 A1 | 4/2021 | Zhang |
| 2021/0132780 A1 | 5/2021 | Kyung |
| 2021/0149694 A1 | 5/2021 | Guzman et al. |
| 2021/0152505 A1 | 5/2021 | Baldwin et al. |
| 2021/0168108 A1 | 6/2021 | Antmen et al. |
| 2021/0201732 A1 | 7/2021 | Ranjan et al. |
| 2021/0216654 A1 | 7/2021 | Ko et al. |
| 2021/0264656 A1 | 8/2021 | Barlier et al. |
| 2021/0287274 A1 | 9/2021 | Nguyen et al. |
| 2021/0287343 A1 | 9/2021 | Kaida |
| 2021/0294438 A1 | 9/2021 | Yang et al. |
| 2021/0311609 A1 | 10/2021 | Dandoko |
| 2021/0335055 A1 | 10/2021 | Scapel et al. |
| 2021/0349426 A1 | 11/2021 | Chen et al. |
| 2021/0349427 A1 | 11/2021 | Chen et al. |
| 2021/0349583 A1 | 11/2021 | Guzman et al. |
| 2021/0349611 A1 | 11/2021 | Chen et al. |
| 2021/0349612 A1 | 11/2021 | Triverio |
| 2021/0349741 A1 | 11/2021 | Guzman et al. |
| 2021/0375042 A1 | 12/2021 | Chen et al. |
| 2021/0390753 A1 | 12/2021 | Scapel et al. |
| 2022/0070385 A1 | 3/2022 | Van Os et al. |
| 2022/0084279 A1 | 3/2022 | Lindmeier et al. |
| 2022/0091567 A1 | 3/2022 | Minami et al. |
| 2022/0124140 A1 | 4/2022 | Okina et al. |
| 2022/0134234 A1 | 5/2022 | Sachson et al. |
| 2022/0157184 A1 | 5/2022 | Wilson et al. |
| 2022/0184309 A1 | 6/2022 | Rosinko et al. |
| 2022/0198984 A1 | 6/2022 | Connor et al. |
| 2022/0214785 A1 | 7/2022 | Giv |
| 2022/0221964 A1 | 7/2022 | Ko et al. |
| 2022/0229537 A1 | 7/2022 | Chen et al. |
| 2022/0236867 A1 | 7/2022 | Chen et al. |
| 2022/0244782 A1 | 8/2022 | Robert et al. |
| 2022/0262080 A1 | 8/2022 | Burton et al. |
| 2022/0276780 A1 | 9/2022 | Ko et al. |
| 2022/0342514 A1 | 10/2022 | Chao et al. |
| 2022/0392132 A1 | 12/2022 | Sepulveda et al. |
| 2023/0004270 A1 | 1/2023 | Chen et al. |
| 2023/0004406 A1 | 1/2023 | Hu et al. |
| 2023/0008229 A1 | 1/2023 | Chen et al. |
| 2023/0035532 A1 | 2/2023 | Chen et al. |
| 2023/0043249 A1 | 2/2023 | Van Os et al. |
| 2023/0071987 A1 | 3/2023 | Zeng et al. |
| 2023/0078153 A1 | 3/2023 | Yang et al. |
| 2023/0082876 A1 | 3/2023 | Guzman et al. |
| 2023/0229283 A1 | 7/2023 | Long et al. |
| 2023/0236547 A1 | 7/2023 | Chen et al. |

(56)  References Cited

U.S. PATENT DOCUMENTS

| | | | |
|---|---|---|---|
| 2023/0236549 A1 | 7/2023 | Guzman et al. |
| 2023/0236550 A1 | 7/2023 | Chen et al. |
| 2023/0282146 A1 | 9/2023 | Connor et al. |
| 2023/0283884 A1 | 9/2023 | Van Os et al. |
| 2023/0343053 A1 | 10/2023 | Scapel et al. |
| 2023/0350564 A1 | 11/2023 | Chen et al. |
| 2023/0379573 A1 | 11/2023 | Wilson et al. |
| 2024/0012536 A1 | 1/2024 | Chen et al. |
| 2024/0029334 A1 | 1/2024 | Sepulveda et al. |
| 2024/0036717 A1 | 2/2024 | Triverio |
| 2024/0045578 A1 | 2/2024 | Chen et al. |
| 2024/0053878 A1 | 2/2024 | Wilson et al. |
| 2024/0077937 A1 | 3/2024 | Rickwald et al. |
| 2024/0134664 A1 | 4/2024 | Chen et al. |
| 2024/0144626 A1 | 5/2024 | Van Os et al. |
| 2024/0152253 A1 | 5/2024 | Guzman et al. |
| 2024/0192845 A1 | 6/2024 | Block et al. |
| 2024/0231854 A9 | 7/2024 | Chen et al. |
| 2024/0248515 A1 | 7/2024 | Chen et al. |
| 2024/0259676 A1 | 8/2024 | Wilson et al. |
| 2024/0264721 A1 | 8/2024 | Wilson |
| 2024/0419214 A1 | 12/2024 | Chen et al. |
| 2025/0024134 A1 | 1/2025 | Van Os et al. |
| 2025/0037398 A1 | 1/2025 | Scapel et al. |
| 2025/0103132 A1 | 3/2025 | Rickwald et al. |
| 2025/0165134 A1 | 5/2025 | Wilson et al. |
| 2025/0166330 A1 | 5/2025 | Van Os et al. |
| 2025/0231531 A1 | 7/2025 | Da Silva Valente Soares et al. |
| 2025/0272938 A1 | 8/2025 | Scapel et al. |
| 2025/0341955 A1 | 11/2025 | Triverio et al. |
| 2025/0348194 A1 | 11/2025 | Chen et al. |

FOREIGN PATENT DOCUMENTS

| | | | |
|---|---|---|---|
| AU | 2015101639 A4 | 12/2015 |
| AU | 2017100683 B4 | 1/2018 |
| AU | 2015297035 B2 | 6/2018 |
| AU | 2020239749 A1 | 11/2021 |
| CA | 2356232 A1 | 3/2002 |
| CA | 2781636 A1 | 7/2010 |
| CA | 2729388 A1 | 9/2011 |
| CA | 2800123 C | 7/2016 |
| CA | 2986980 A1 | 5/2019 |
| CH | 707412 A2 | 6/2014 |
| CN | 1083229 A | 3/1994 |
| CN | 1337638 A | 2/2002 |
| CN | 1397904 A | 2/2003 |
| CN | 2602404 Y | 2/2004 |
| CN | 1536511 A | 10/2004 |
| CN | 1610866 A | 4/2005 |
| CN | 1997957 A | 7/2007 |
| CN | 101055646 A | 10/2007 |
| CN | 101059756 A | 10/2007 |
| CN | 101329707 A | 12/2008 |
| CN | 101382438 A | 3/2009 |
| CN | 100492288 C | 5/2009 |
| CN | 101505320 A | 8/2009 |
| CN | 101566919 A | 10/2009 |
| CN | 101620494 A | 1/2010 |
| CN | 101627349 A | 1/2010 |
| CN | 101627361 A | 1/2010 |
| CN | 101692681 A | 4/2010 |
| CN | 101702112 A | 5/2010 |
| CN | 101742053 A | 6/2010 |
| CN | 101819486 A | 9/2010 |
| CN | 101939740 A | 1/2011 |
| CN | 101943883 A | 1/2011 |
| CN | 101981987 A | 2/2011 |
| CN | 102035990 A | 4/2011 |
| CN | 102075727 A | 5/2011 |
| CN | 102142149 A | 8/2011 |
| CN | 102271241 A | 12/2011 |
| CN | 102298797 A | 12/2011 |
| CN | 102375690 A | 3/2012 |
| CN | 102430244 A | 5/2012 |
| CN | 102446435 A | 5/2012 |
| CN | 102447873 A | 5/2012 |
| CN | 102455860 A | 5/2012 |
| CN | 202217134 U | 5/2012 |
| CN | 102622085 A | 8/2012 |
| CN | 102681648 A | 9/2012 |
| CN | 102687176 A | 9/2012 |
| CN | 102750070 A | 10/2012 |
| CN | 102800045 A | 11/2012 |
| CN | 102854979 A | 1/2013 |
| CN | 102984342 A | 3/2013 |
| CN | 103154954 A | 6/2013 |
| CN | 103191557 A | 7/2013 |
| CN | 103399480 A | 11/2013 |
| CN | 103399750 A | 11/2013 |
| CN | 103516894 A | 1/2014 |
| CN | 103544920 A | 1/2014 |
| CN | 103562832 A | 2/2014 |
| CN | 103562841 A | 2/2014 |
| CN | 103607660 A | 2/2014 |
| CN | 103649897 A | 3/2014 |
| CN | 103703438 A | 4/2014 |
| CN | 103902165 A | 7/2014 |
| CN | 103914238 A | 7/2014 |
| CN | 103927190 A | 7/2014 |
| CN | 103947190 A | 7/2014 |
| CN | 103973899 A | 8/2014 |
| CN | 203773233 U | 8/2014 |
| CN | 104115503 A | 10/2014 |
| CN | 104182741 A | 12/2014 |
| CN | 104246793 A | 12/2014 |
| CN | 104270597 A | 1/2015 |
| CN | 104281405 A | 1/2015 |
| CN | 104376160 A | 2/2015 |
| CN | 104487929 A | 4/2015 |
| CN | 104501043 A | 4/2015 |
| CN | 104580576 A | 4/2015 |
| CN | 104737114 A | 6/2015 |
| CN | 104753762 A | 7/2015 |
| CN | 104869346 A | 8/2015 |
| CN | 104898402 A | 9/2015 |
| CN | 104952063 A | 9/2015 |
| CN | 105100462 A | 11/2015 |
| CN | 105139438 A | 12/2015 |
| CN | 105190700 A | 12/2015 |
| CN | 105204931 A | 12/2015 |
| CN | 105260049 A | 1/2016 |
| CN | 105264479 A | 1/2016 |
| CN | 105286843 A | 2/2016 |
| CN | 105302468 A | 2/2016 |
| CN | 105335087 A | 2/2016 |
| CN | 105388966 A | 3/2016 |
| CN | 105389078 A | 3/2016 |
| CN | 105389107 A | 3/2016 |
| CN | 105391937 A | 3/2016 |
| CN | 105453016 A | 3/2016 |
| CN | 105574378 A | 5/2016 |
| CN | 105607858 A | 5/2016 |
| CN | 105611215 A | 5/2016 |
| CN | 105611275 A | 5/2016 |
| CN | 105653031 A | 6/2016 |
| CN | 205608658 U | 9/2016 |
| CN | 106056848 A | 10/2016 |
| CN | 106303690 A | 1/2017 |
| CN | 106486044 A | 3/2017 |
| CN | 106598201 A | 4/2017 |
| CN | 106605201 A | 4/2017 |
| CN | 106792147 A | 5/2017 |
| CN | 106814886 A | 6/2017 |
| CN | 106909064 A | 6/2017 |
| CN | 107239101 A | 10/2017 |
| CN | 107257951 A | 10/2017 |
| CN | 107430489 A | 12/2017 |
| CN | 107533356 A | 1/2018 |
| CN | 107561904 A | 1/2018 |
| CN | 107643677 A | 1/2018 |
| CN | 107710135 A | 2/2018 |
| CN | 107797657 A | 3/2018 |
| CN | 107870560 A | 4/2018 |

(56) References Cited

FOREIGN PATENT DOCUMENTS

| | | | |
|---|---|---|---|
| CN | 107924113 | A | 4/2018 |
| CN | 107944397 | A | 4/2018 |
| CN | 108255049 | A | 7/2018 |
| CN | 108885795 | A | 11/2018 |
| CN | 109196469 | A | 1/2019 |
| CN | 109313655 | A | 2/2019 |
| CN | 109690445 | A | 4/2019 |
| CN | 110471582 | B | 10/2021 |
| CN | 113795815 | A | 12/2021 |
| DE | 202017105858 | U1 | 3/2018 |
| DK | 201670652 | A1 | 12/2017 |
| EP | 0579093 | A1 | 1/1994 |
| EP | 0831629 | A2 | 3/1998 |
| EP | 1215867 | A2 | 6/2002 |
| EP | 1429291 | A1 | 6/2004 |
| EP | 1592212 | A1 | 11/2005 |
| EP | 1659504 | A2 | 5/2006 |
| EP | 1674889 | A1 | 6/2006 |
| EP | 1674977 | A2 | 6/2006 |
| EP | 1736931 | A2 | 12/2006 |
| EP | 1750242 | A2 | 2/2007 |
| EP | 1832969 | A2 | 9/2007 |
| EP | 1855170 | A2 | 11/2007 |
| EP | 1988432 | A1 | 11/2008 |
| EP | 2120115 | A2 | 11/2009 |
| EP | 2175367 | A2 | 4/2010 |
| EP | 2194508 | A1 | 6/2010 |
| EP | 2204702 | A1 | 7/2010 |
| EP | 2290922 | A1 | 3/2011 |
| EP | 2312512 | A1 | 4/2011 |
| EP | 2360902 | A2 | 8/2011 |
| EP | 2394711 | A1 | 12/2011 |
| EP | 2413577 | A2 | 2/2012 |
| EP | 2416563 | A2 | 2/2012 |
| EP | 2423810 | A1 | 2/2012 |
| EP | 2426902 | A1 | 3/2012 |
| EP | 2600215 | A1 | 6/2013 |
| EP | 2629483 | A1 | 8/2013 |
| EP | 2738640 | A2 | 6/2014 |
| EP | 2742404 | A2 | 6/2014 |
| EP | 2942932 | A1 | 11/2015 |
| EP | 2955591 | A2 | 12/2015 |
| EP | 2990887 | A2 | 3/2016 |
| EP | 2993602 | A1 | 3/2016 |
| EP | 3026636 | A1 | 6/2016 |
| EP | 3047884 | A1 | 7/2016 |
| EP | 3051525 | A1 | 8/2016 |
| EP | 3056949 | A1 | 8/2016 |
| EP | 3079044 | A1 | 10/2016 |
| EP | 3101958 | A1 | 12/2016 |
| EP | 3152643 | A1 | 4/2017 |
| EP | 3190563 | A1 | 7/2017 |
| EP | 3211587 | A1 | 8/2017 |
| EP | 2556665 | B1 | 8/2018 |
| EP | 3376342 | A1 | 9/2018 |
| EP | 3401770 | A1 | 11/2018 |
| EP | 3465408 | B1 | 8/2020 |
| EP | 3896560 | A1 | 10/2021 |
| EP | 3175344 | B1 | 1/2022 |
| EP | 3455696 | B1 | 10/2023 |
| GB | 2306020 | A | 4/1997 |
| GB | 2475669 | A | 6/2011 |
| JP | 49-134364 | A | 12/1974 |
| JP | 53-31170 | A | 3/1978 |
| JP | 56-621 | A | 1/1981 |
| JP | 5-90390 | U | 3/1993 |
| JP | 3007616 | U | 2/1995 |
| JP | 8-110955 | A | 4/1996 |
| JP | 8-285964 | A | 11/1996 |
| JP | 9-9072 | A | 1/1997 |
| JP | 9-251084 | A | 9/1997 |
| JP | 10-143636 | A | 5/1998 |
| JP | 10-506472 | A | 6/1998 |
| JP | 10-293860 | A | 11/1998 |
| JP | 11-109066 | A | 4/1999 |
| JP | 11-160470 | A | 6/1999 |
| JP | 11-232013 | A | 8/1999 |
| JP | 11-312159 | A | 11/1999 |
| JP | 2000-76460 | A | 3/2000 |
| JP | 2000-162349 | A | 6/2000 |
| JP | 3062531 | B2 | 7/2000 |
| JP | 2000-241199 | A | 9/2000 |
| JP | 2001-119453 | A | 4/2001 |
| JP | 2001-144884 | A | 5/2001 |
| JP | 2001-147282 | A | 5/2001 |
| JP | 2001-273064 | A | 10/2001 |
| JP | 2001-313886 | A | 11/2001 |
| JP | 2001-318852 | A | 11/2001 |
| JP | 2002-507718 | A | 3/2002 |
| JP | 200273486 | A | 3/2002 |
| JP | 2002-251238 | A | 9/2002 |
| JP | 2002-271451 | A | 9/2002 |
| JP | 2003-9404 | A | 1/2003 |
| JP | 2003-121568 | A | 4/2003 |
| JP | 2003-219217 | A | 7/2003 |
| JP | 2003-233616 | A | 8/2003 |
| JP | 2003-296246 | A | 10/2003 |
| JP | 2004-28918 | A | 1/2004 |
| JP | 2004-177148 | A | 6/2004 |
| JP | 2004-184396 | A | 7/2004 |
| JP | 2005-521890 | A | 7/2005 |
| JP | 2005-227581 | A | 8/2005 |
| JP | 2005-339017 | A | 12/2005 |
| JP | 2006-69296 | A | 3/2006 |
| JP | 2006-71582 | A | 3/2006 |
| JP | 2006-101505 | A | 4/2006 |
| JP | 2006-102327 | A | 4/2006 |
| JP | 2006-520053 | A | 8/2006 |
| JP | 2006-242717 | A | 9/2006 |
| JP | 2006-284365 | A | 10/2006 |
| JP | 2006-293340 | A | 10/2006 |
| JP | 2007-243275 | A | 9/2007 |
| JP | 2007-528240 | A | 10/2007 |
| JP | 2008-175800 | A | 7/2008 |
| JP | 2009-95030 | A | 4/2009 |
| JP | 2009-147889 | A | 7/2009 |
| JP | 2009-217612 | A | 9/2009 |
| JP | 2009-229106 | A | 10/2009 |
| JP | 2009-293960 | A | 12/2009 |
| JP | 2010-60355 | A | 3/2010 |
| JP | 2010-124181 | A | 6/2010 |
| JP | 2010-257051 | A | 11/2010 |
| JP | 2011-515726 | A | 5/2011 |
| JP | 2011-517810 | A | 6/2011 |
| JP | 3168099 | U | 6/2011 |
| JP | 2011-159172 | A | 8/2011 |
| JP | 2011-525648 | A | 9/2011 |
| JP | 2011-209887 | A | 10/2011 |
| JP | 2011-217000 | A | 10/2011 |
| JP | 2012-18569 | A | 1/2012 |
| JP | 2012-32306 | A | 2/2012 |
| JP | 2012-38292 | A | 2/2012 |
| JP | 2012-53642 | A | 3/2012 |
| JP | 2012-505478 | A | 3/2012 |
| JP | 2012-78982 | A | 4/2012 |
| JP | 2012-109778 | A | 6/2012 |
| JP | 2012-147432 | A | 8/2012 |
| JP | 2012-159781 | A | 8/2012 |
| JP | 2012-517630 | A | 8/2012 |
| JP | 2012-203537 | A | 10/2012 |
| JP | 2012-203832 | A | 10/2012 |
| JP | 2012-247283 | A | 12/2012 |
| JP | 2012531607 | A | 12/2012 |
| JP | 2013-3671 | A | 1/2013 |
| JP | 2013-29925 | A | 2/2013 |
| JP | 2013-92989 | A | 5/2013 |
| JP | 2013-97760 | A | 5/2013 |
| JP | 2013-101528 | A | 5/2013 |
| JP | 2013-526099 | A | 6/2013 |
| JP | 2013-146557 | A | 8/2013 |
| JP | 2013-232230 | A | 11/2013 |
| JP | 2014-35766 | A | 2/2014 |
| JP | 2014-112404 | A | 6/2014 |
| JP | 5530320 | B2 | 6/2014 |

(56) References Cited

FOREIGN PATENT DOCUMENTS

| | | | |
|---|---|---|---|
| JP | 2014-123197 | A | 7/2014 |
| JP | 2014-143575 | A | 8/2014 |
| JP | 2014-519126 | A | 8/2014 |
| JP | 2014-206817 | A | 10/2014 |
| JP | 2014-216868 | A | 11/2014 |
| JP | 2014-222439 | A | 11/2014 |
| JP | 5630676 | B2 | 11/2014 |
| JP | 2015-504619 | A | 2/2015 |
| JP | 2015-198334 | A | 11/2015 |
| JP | 2015-210587 | A | 11/2015 |
| JP | 2016-13151 | A | 1/2016 |
| JP | 2016-508631 | A | 3/2016 |
| JP | 2016-136324 | A | 7/2016 |
| JP | 2017-37599 | A | 2/2017 |
| JP | 2017-50003 | A | 3/2017 |
| JP | 2017-54195 | A | 3/2017 |
| JP | 2017-111083 | A | 6/2017 |
| JP | 2017-521804 | A | 8/2017 |
| JP | 2017-527026 | A | 9/2017 |
| JP | 2017-527917 | A | 9/2017 |
| JP | 2017-531225 | A | 10/2017 |
| JP | 2017-531230 | A | 10/2017 |
| JP | 2017-534934 | A | 11/2017 |
| JP | 6240301 | B1 | 11/2017 |
| JP | 6266736 | B1 | 1/2018 |
| JP | 2018-50279 | A | 3/2018 |
| JP | 2018-514838 | A | 6/2018 |
| JP | 2018-106365 | A | 7/2018 |
| JP | 2018-113544 | A | 7/2018 |
| JP | 2018-116067 | A | 7/2018 |
| JP | 2018-152073 | A | 9/2018 |
| JP | 2019-16251 | A | 1/2019 |
| JP | 2019-145108 | A | 8/2019 |
| JP | 2019-164825 | A | 9/2019 |
| JP | 2019-532400 | A | 11/2019 |
| JP | 2020-17285 | A | 1/2020 |
| JP | 2020-56745 | A | 4/2020 |
| JP | 2020-194555 | A | 12/2020 |
| KR | 10-2004-0009115 | A | 1/2004 |
| KR | 10-2004-0046272 | A | 6/2004 |
| KR | 10-2004-0107489 | A | 12/2004 |
| KR | 10-2005-0086630 | A | 8/2005 |
| KR | 20-0425314 | Y1 | 9/2006 |
| KR | 10-2007-0025292 | A | 3/2007 |
| KR | 10-0810379 | B1 | 3/2008 |
| KR | 10-2008-0050336 | A | 6/2008 |
| KR | 10-2008-0058246 | A | 6/2008 |
| KR | 10-0864578 | B1 | 10/2008 |
| KR | 10-2009-0112132 | A | 10/2009 |
| KR | 10-2010-0025846 | A | 3/2010 |
| KR | 10-2010-0025853 | A | 3/2010 |
| KR | 10-2010-0086052 | A | 7/2010 |
| KR | 10-2011-0013653 | A | 2/2011 |
| KR | 10-2011-0028581 | A | 3/2011 |
| KR | 10-2011-0093729 | A | 8/2011 |
| KR | 10-2012-0003537 | A | 1/2012 |
| KR | 10-2012-0026004 | A | 3/2012 |
| KR | 10-2012-0113252 | A | 10/2012 |
| KR | 10-2012-0132134 | A | 12/2012 |
| KR | 10-2013-0109466 | A | 10/2013 |
| KR | 10-1352713 | B1 | 1/2014 |
| KR | 10-2014-0025552 | A | 3/2014 |
| KR | 10-2014-0033088 | A | 3/2014 |
| KR | 10-2014-0049340 | A | 4/2014 |
| KR | 10-2014-0064687 | A | 5/2014 |
| KR | 10-2014-0074824 | A | 6/2014 |
| KR | 10-2015-0008996 | A | 1/2015 |
| KR | 10-2015-0024899 | A | 3/2015 |
| KR | 10-2015-0038711 | A | 4/2015 |
| KR | 10-2015-0067197 | A | 6/2015 |
| KR | 10-2015-0081140 | A | 7/2015 |
| KR | 10-1540544 | B1 | 7/2015 |
| KR | 10-2015-0093090 | A | 8/2015 |
| KR | 10-2015-0140212 | A | 12/2015 |
| KR | 10-1587115 | B1 | 1/2016 |
| KR | 10-2016-0016910 | A | 2/2016 |
| KR | 10-2016-0026314 | A | 3/2016 |
| KR | 10-2016-0047891 | A | 5/2016 |
| KR | 10-2016-0063058 | A | 6/2016 |
| KR | 10-1655078 | B1 | 9/2016 |
| KR | 10-2016-0146942 | A | 12/2016 |
| KR | 10-2017-0006761 | A | 1/2017 |
| KR | 10-2017-0032471 | A | 3/2017 |
| KR | 10-2017-0076452 | A | 7/2017 |
| KR | 10-2017-0081391 | A | 7/2017 |
| KR | 10-2017-0082698 | A | 7/2017 |
| KR | 10-2017-0107572 | A | 9/2017 |
| KR | 10-2017-0112267 | A | 10/2017 |
| KR | 10-2017-0112406 | A | 10/2017 |
| KR | 10-2017-0117306 | A | 10/2017 |
| KR | 10-2017-0130417 | A | 11/2017 |
| KR | 10-2017-0139621 | A | 12/2017 |
| KR | 10-2018-0011581 | A | 2/2018 |
| KR | 10-2018-0017227 | A | 2/2018 |
| KR | 10-2018-0046206 | A | 5/2018 |
| KR | 10-1875907 | B1 | 7/2018 |
| KR | 10-2018-0108531 | A | 10/2018 |
| KR | 10-2019-0020850 | A | 3/2019 |
| KR | 10-2019-0071285 | A | 6/2019 |
| KR | 10-2019-0114034 | A | 10/2019 |
| SG | 130285 | A1 | 4/2007 |
| TW | 498240 | B | 8/2002 |
| TW | 546942 | B | 8/2003 |
| TW | 200512616 | A | 4/2005 |
| TW | 200850058 | A | 12/2008 |
| TW | 200915698 | A | 4/2009 |
| TW | I348803 | B | 9/2011 |
| TW | D144158 | S1 | 12/2011 |
| TW | 201232486 | A | 8/2012 |
| TW | 201419115 | A | 5/2014 |
| TW | 10-2338576 | B1 | 12/2021 |
| WO | 98/40795 | A1 | 9/1998 |
| WO | 01/69387 | A2 | 9/2001 |
| WO | 01/71433 | A1 | 9/2001 |
| WO | 02/054157 | A1 | 7/2002 |
| WO | 03/048872 | A1 | 6/2003 |
| WO | 03/085460 | A2 | 10/2003 |
| WO | 2004/010672 | A2 | 1/2004 |
| WO | 2004/079530 | A2 | 9/2004 |
| WO | 2006/012343 | A2 | 2/2006 |
| WO | 2006/112641 | A1 | 10/2006 |
| WO | 2006/131780 | A1 | 12/2006 |
| WO | 2007/018881 | A2 | 2/2007 |
| WO | 2007/120981 | A2 | 10/2007 |
| WO | 2008/086302 | A1 | 7/2008 |
| WO | 2008/114491 | A1 | 9/2008 |
| WO | 2009/053775 | A1 | 4/2009 |
| WO | 2009/073607 | A2 | 6/2009 |
| WO | 2009/114239 | A1 | 9/2009 |
| WO | 2009/123428 | A2 | 10/2009 |
| WO | 2009/133710 | A1 | 11/2009 |
| WO | 2009/146857 | A2 | 12/2009 |
| WO | 2010/017627 | A1 | 2/2010 |
| WO | 2011/000893 | A1 | 1/2011 |
| WO | 2011/062871 | A2 | 5/2011 |
| WO | 2011/084860 | A2 | 7/2011 |
| WO | 2011/099819 | A2 | 8/2011 |
| WO | 2011/127309 | A1 | 10/2011 |
| WO | 2011/128416 | A2 | 10/2011 |
| WO | 2012/021507 | A2 | 2/2012 |
| WO | 2012/033708 | A1 | 3/2012 |
| WO | 2012/161434 | A2 | 11/2012 |
| WO | 2012/166976 | A2 | 12/2012 |
| WO | 2012/170354 | A2 | 12/2012 |
| WO | 2012/170446 | A2 | 12/2012 |
| WO | 2013/051048 | A1 | 4/2013 |
| WO | 2013/082325 | A1 | 6/2013 |
| WO | 2013/093558 | A1 | 6/2013 |
| WO | 2013/097139 | A1 | 7/2013 |
| WO | 2013/103570 | A1 | 7/2013 |
| WO | 2013/120851 | A1 | 8/2013 |
| WO | 2013/136548 | A1 | 9/2013 |
| WO | 2013/152453 | A1 | 10/2013 |
| WO | 2013/152454 | A1 | 10/2013 |

(56) References Cited

FOREIGN PATENT DOCUMENTS

| | | | |
|---|---|---|---|
| WO | 2013/152455 | A1 | 10/2013 |
| WO | 2013/169842 | A2 | 11/2013 |
| WO | 2013/169846 | A1 | 11/2013 |
| WO | 2013/169849 | A1 | 11/2013 |
| WO | 2013/169875 | A2 | 11/2013 |
| WO | 2013/169882 | A2 | 11/2013 |
| WO | 2013/189058 | A1 | 12/2013 |
| WO | 2014/053063 | A1 | 4/2014 |
| WO | 2014/078114 | A1 | 5/2014 |
| WO | 2014/081181 | A1 | 5/2014 |
| WO | 2014/088475 | A1 | 6/2014 |
| WO | 2014/094199 | A1 | 6/2014 |
| WO | 2014/105274 | A1 | 7/2014 |
| WO | 2014/105278 | A1 | 7/2014 |
| WO | 2014/113987 | A1 | 7/2014 |
| WO | 2014/161429 | A1 | 10/2014 |
| WO | 2014/189197 | A1 | 11/2014 |
| WO | 2014/200730 | A1 | 12/2014 |
| WO | 2014/200734 | A1 | 12/2014 |
| WO | 2015/023419 | A1 | 2/2015 |
| WO | 2015/029313 | A1 | 3/2015 |
| WO | 2015/034960 | A1 | 3/2015 |
| WO | 2015/065402 | A1 | 5/2015 |
| WO | 2015/084891 | A1 | 6/2015 |
| WO | 2015/144209 | A1 | 10/2015 |
| WO | 2015/163536 | A1 | 10/2015 |
| WO | 2015/183756 | A1 | 12/2015 |
| WO | 2015/187458 | A1 | 12/2015 |
| WO | 2016/022203 | A1 | 2/2016 |
| WO | 2016/022204 | A1 | 2/2016 |
| WO | 2016/022205 | A1 | 2/2016 |
| WO | 2016/022496 | A2 | 2/2016 |
| WO | 2016/025395 | A2 | 2/2016 |
| WO | 2016/032076 | A1 | 3/2016 |
| WO | 2016/036218 | A1 | 3/2016 |
| WO | 2016/036427 | A1 | 3/2016 |
| WO | 2016/036522 | A2 | 3/2016 |
| WO | 2016/042926 | A1 | 3/2016 |
| WO | 2016/045005 | A1 | 3/2016 |
| WO | 2016/057062 | A1 | 4/2016 |
| WO | 2016/064435 | A1 | 4/2016 |
| WO | 2016/099097 | A1 | 6/2016 |
| WO | 2016/101124 | A1 | 6/2016 |
| WO | 2016/101131 | A1 | 6/2016 |
| WO | 2016/101132 | A1 | 6/2016 |
| WO | 2016/144385 | A1 | 9/2016 |
| WO | 2016/144563 | A1 | 9/2016 |
| WO | 2016/144577 | A1 | 9/2016 |
| WO | 2016/144975 | A2 | 9/2016 |
| WO | 2016/144977 | A1 | 9/2016 |
| WO | 2016/145129 | A1 | 9/2016 |
| WO | 2016/161556 | A1 | 10/2016 |
| WO | 2016/200587 | A1 | 12/2016 |
| WO | 2016/204936 | A1 | 12/2016 |
| WO | 2017/030646 | A1 | 2/2017 |
| WO | 2017/062621 | A1 | 4/2017 |
| WO | 2017/077751 | A1 | 5/2017 |
| WO | 2017/153771 | A1 | 9/2017 |
| WO | 2017/173319 | A1 | 10/2017 |
| WO | 2017/201326 | A1 | 11/2017 |
| WO | 2017/213439 | A1 | 12/2017 |
| WO | 2017/213777 | A1 | 12/2017 |
| WO | 2017/213899 | A1 | 12/2017 |
| WO | 2017/213937 | A1 | 12/2017 |
| WO | 2017/218193 | A1 | 12/2017 |
| WO | 2018/006053 | A1 | 1/2018 |
| WO | 2018/048700 | A1 | 3/2018 |
| WO | 2018/049430 | A2 | 3/2018 |
| WO | 2018/057272 | A1 | 3/2018 |
| WO | 2018/209152 | A1 | 11/2018 |
| WO | 2018/212802 | A1 | 11/2018 |
| WO | 2018/213451 | A1 | 11/2018 |
| WO | 2019/200350 | A1 | 10/2019 |
| WO | 2019/216997 | A1 | 11/2019 |
| WO | 2019/216999 | A1 | 11/2019 |
| WO | 2019/217086 | A2 | 11/2019 |
| WO | 2019/217249 | A2 | 11/2019 |
| WO | 2020/226927 | A1 | 11/2020 |
| WO | 2021/050190 | A1 | 3/2021 |

OTHER PUBLICATIONS

Maruberi, "[App Introduction] #3 Luxambra (Selecting the game to play with Hotman next after Maruberi)", Available online at: https://www.youtube.com/watch?v=e4ukNZ-1OrY, Jun. 22, 2014, 2 pages.

Minority_14, "The Ultimate Beautiful Holo Stopwatch: Ultimate Stopwatch & Timer", Available online at: https://sspai.com/post/21699, Mar. 1, 2013, 4 pages.

Corrected Notice of Allowance received for U.S. Appl. No. 18/536,089, mailed on May 5, 2025, 3 pages.

Non-Final Office Action received for U.S. Appl. No. 18/375,309, mailed on Apr. 23, 2025, 21 pages.

Notice of Allowance received for U.S. Appl. No. 18/382,248, mailed on Apr. 30, 2025, 9 pages.

Office Action received for Chinese Patent Application No. 201910691865.X, mailed on Apr. 14, 2025, 14 pages (5 pages of English Translation and 9 pages of Official Copy).

Office Action received for Chinese Patent Application No. 202110369265.9, mailed on Mar. 27, 2025, 16 pages (4 pages of English Translation and 12 pages of Official Copy).

"[B612] Addition of facial recognition bear/cat stamps and AR background function having moving sparkles or hearts", Available Online at: <URL, htpps://apptopi.jp/2017/01/22/b612>, Jan. 22, 2017, 11 pages.

Advisory Action received for U.S. Appl. No. 14/841,606, mailed on Feb. 28, 2019, 3 pages.

Advisory Action received for U.S. Appl. No. 13/082,035, mailed on Jun. 19, 2015, 5 pages.

Advisory Action received for U.S. Appl. No. 13/082,035, mailed on Oct. 23, 2013, 3 pages.

Advisory Action received for U.S. Appl. No. 14/815,898, mailed on Aug. 30, 2016, 3 pages.

Advisory Action received for U.S. Appl. No. 14/846,511, mailed on Oct. 22, 2019, 5 pages.

Advisory Action received for U.S. Appl. No. 14/846,511, mailed on Sep. 19, 2018, 8 pages.

Advisory Action received for U.S. Appl. No. 15/405,122, mailed on Apr. 18, 2022, 5 pages.

Advisory Action received for U.S. Appl. No. 15/421,865, mailed on Apr. 16, 2020, 7 pages.

Advisory Action received for U.S. Appl. No. 15/554,204, mailed on Mar. 12, 2020, 3 pages.

Advisory Action received for U.S. Appl. No. 16/259,771, mailed on Feb. 26, 2020, 3 pages.

Advisory Action received for U.S. Appl. No. 16/259,771, mailed on Jul. 14, 2020, 6 pages.

Advisory Action received for U.S. Appl. No. 16/389,722, mailed on Jun. 9, 2023, 4 pages.

Advisory Action received for U.S. Appl. No. 16/389,722, mailed on Mar. 9, 2021, 5 pages.

Advisory Action received for U.S. Appl. No. 16/582,020, mailed on Aug. 3, 2020, 4 pages.

Advisory Action received for U.S. Appl. No. 16/861,651, mailed on Jul. 29, 2022, 4 pages.

Advisory Action received for U.S. Appl. No. 16/935,002, mailed on May 6, 2022, 3 pages.

Advisory Action received for U.S. Appl. No. 16/943,737, mailed on Jun. 1, 2022, 6 pages.

Advisory Action received for U.S. Appl. No. 17/031,765, mailed on Dec. 12, 2022, 7 pages.

Advisory Action received for U.S. Appl. No. 17/031,765, mailed on Nov. 13, 2023, 5 pages.

Advisory Action received for U.S. Appl. No. 17/093,408, mailed on Jun. 5, 2023, 4 pages.

Advisory Action received for U.S. Appl. No. 17/158,936, mailed on Jul. 24, 2023, 4 pages.

(56) References Cited

OTHER PUBLICATIONS

Advisory Action received for U.S. Appl. No. 17/947,530, mailed on Oct. 13, 2023, 3 pages.
"AdyClock—Night Alarm Clock", App for android, Google play store page: https://web.archive.org/web/20130924223153/https://play.google.com/store/apps/details?id=com.adyclock&hl=en, Sep. 24, 2013, 2 pages.
Airshow, "Airshow App for Mobile Devices", 2012, 4 pages.
Ali et al., "Facial Expression Recognition Using Human to Animated-Character Expression Translation", Oct. 12, 2019, 8 pages.
Andro, Dollar, "Huawei Watch GT Always on Mode Update is finally here!", Online Availabe at: https://www.youtube.com/watch?v=AJw_FIAf7v4, Jun. 6, 2019, 4 pages.
Android Central, "BeWeather weather app for Android", Available online at: <https://www.youtube.com/watch?v=G2EY2K-XkSI>, Sep. 1, 2011, 1 page.
Android Central, "Changing the watchface on your Android Wear device", Retrieved from: https://www.youtube.com/watch?v=YYwFe2K_qil, Jul. 2, 2014, 4 pages.
Android Tips, "Create a Minimal Lock Screen With WidgetLocker", Online Available at: http://appstap192.blogspot.com/2012/01/create-minimal-lock-screen-with.html, Jan. 18, 2012, 6 pages.
Androidika, "Butterfly 3D Live Wallpaper 1.0 APK", Available at: <http://net-suckga-ilauncher2.apk-dl.com/butterfly-3d-live-wallpaper>, Feb. 26, 2013, 7 pages.
AOD too dim. I've answered my own question to help others, Online Available: https://forums.androidcentral.com/samsung-galaxy-s9-s9-plus/874444-aod-too-dim-ive-answered-my-own-question-help-others.html, 11, 2018, 3 pages.
Applicant-Initiated Interview Summary received for U.S. Appl. No. 14/846,511, mailed on Apr. 20, 2020, 4 pages.
Applicant-Initiated Interview Summary received for U.S. Appl. No. 16/259,771, mailed on May 5, 2020, 10 pages.
Applicant-Initiated Interview Summary received for U.S. Appl. No. 16/389,722, mailed on Jul. 7, 2020, 5 pages.
Applicant-Initiated Interview Summary received for U.S. Appl. No. 16/582,020, mailed on Jul. 9, 2021, 4 pages.
Applicant-Initiated Interview Summary received for U.S. Appl. No. 16/582,020, mailed on Jul. 14, 2020, 5 pages.
Applicant-Initiated Interview Summary received for U.S. Appl. No. 16/582,020, mailed on Mar. 25, 2020, 5 pages.
Applicant-Initiated Interview Summary received for U.S. Appl. No. 16/584,445, mailed on Mar. 17, 2020, 5 pages.
Applicant-Initiated Interview Summary received for U.S. Appl. No. 16/585,399, mailed on Mar. 25, 2020, 3 pages.
Applicant-Initiated Interview Summary received for U.S. Appl. No. 17/031,671, mailed on Aug. 2, 2021, 5 pages.
Applicant-Initiated Interview Summary received for U.S. Appl. No. 17/031,671, mailed on Jun. 13, 2022, 7 pages.
Applicant-Initiated Interview Summary received for U.S. Appl. No. 17/031,671, mailed on Nov. 8, 2021, 5 pages.
Applicant-Initiated Interview Summary received for U.S. Appl. No. 17/546,630, mailed on May 22, 2023, 4 pages.
Applicant-Initiated Interview Summary received for U.S. Appl. No. 17/681,584, mailed on Mar. 24, 2023, 2 pages.
Applicant-Initiated Interview Summary received for U.S. Appl. No. 17/746,807, mailed on Jun. 9, 2023, 2 pages.
Applicant-Initiated Interview Summary received for U.S. Appl. No. 17/746,807, mailed on Mar. 31, 2023, 2 pages.
Applicant-Initiated Interview Summary received for U.S. Appl. No. 13/082,035, mailed on Apr. 4, 2013, 3 pages.
Applicant-Initiated Interview Summary received for U.S. Appl. No. 13/082,035, mailed on Aug. 1, 2016, 3 pages.
Applicant-Initiated Interview Summary received for U.S. Appl. No. 13/082,035, mailed on Jan. 29, 2015, 3 pages.
Applicant-Initiated Interview Summary received for U.S. Appl. No. 13/082,035, mailed on Oct. 30, 2013, 3 pages.
Applicant-Initiated Interview Summary received for U.S. Appl. No. 14/866,560, mailed on Jan. 30, 2019, 3 pages.

Applicant-Initiated Interview Summary received for U.S. Appl. No. 14/866,560, mailed on Jul. 26, 2018, 3 pages.
Applicant-Initiated Interview Summary received for U.S. Appl. No. 14/866,560, mailed on May 14, 2019, 4 pages.
Applicant-Initiated Interview Summary received for U.S. Appl. No. 14/866,560, mailed on Oct. 21, 2019, 3 pages.
Applicant-Initiated Interview Summary received for U.S. Appl. No. 15/405,122, mailed on Dec. 22, 2020, 5 pages.
Applicant-Initiated Interview Summary received for U.S. Appl. No. 15/405,122, mailed on Jul. 7, 2021, 4 pages.
Applicant-Initiated Interview Summary received for U.S. Appl. No. 15/405,122, mailed on Mar. 1, 2022, 4 pages.
Applicant-Initiated Interview Summary received for U.S. Appl. No. 15/405,122, mailed on May 21, 2020, 5 pages.
Applicant-Initiated Interview Summary received for U.S. Appl. No. 15/421,865, mailed on Dec. 15, 2020, 6 pages.
Applicant-Initiated Interview Summary received for U.S. Appl. No. 15/421,865, mailed on Feb. 3, 2020, 5 pages.
Applicant-Initiated Interview Summary received for U.S. Appl. No. 15/421,865, mailed on Feb. 28, 2022, 5 pages.
Applicant-Initiated Interview Summary received for U.S. Appl. No. 15/421,865, mailed on Jun. 30, 2021, 6 pages.
Applicant-Initiated Interview Summary received for U.S. Appl. No. 15/421,865, mailed on Oct. 3, 2023, 6 pages.
Applicant-Initiated Interview Summary received for U.S. Appl. No. 15/554,204, mailed on Jan. 31, 2020, 3 pages.
Applicant-Initiated Interview Summary received for U.S. Appl. No. 15/554,204, mailed on Oct. 11, 2019, 5 pages.
Applicant-Initiated Interview Summary received for U.S. Appl. No. 15/798,235, mailed on Feb. 3, 2020, 3 pages.
Applicant-Initiated Interview Summary received for U.S. Appl. No. 16/259,771, mailed on Apr. 18, 2022, 2 pages.
Applicant-Initiated Interview Summary received for U.S. Appl. No. 16/389,722, mailed on Feb. 11, 2021, 4 pages.
Applicant-Initiated Interview Summary received for U.S. Appl. No. 16/389,722, mailed on Feb. 18, 2022, 5 pages.
Applicant-Initiated Interview Summary received for U.S. Appl. No. 16/389,722, mailed on May 31, 2023, 4 pages.
Applicant-Initiated Interview Summary received for U.S. Appl. No. 16/389,722, mailed on Nov. 4, 2022, 4 pages.
Applicant-Initiated Interview Summary received for U.S. Appl. No. 16/389,722, mailed on Sep. 7, 2021, 4 pages.
Applicant-Initiated Interview Summary received for U.S. Appl. No. 16/401,934, mailed on Feb. 23, 2021, 8 pages.
Applicant-Initiated Interview Summary received for U.S. Appl. No. 16/418,786, mailed on Mar. 30, 2021, 4 pages.
Applicant-Initiated Interview Summary received for U.S. Appl. No. 16/418,786, mailed on May 9, 2022, 2 pages.
Applicant-Initiated Interview Summary received for U.S. Appl. No. 16/418,786, mailed on Sep. 23, 2022, 2 pages.
Applicant-Initiated Interview Summary received for U.S. Appl. No. 16/519,850, mailed on Jun. 26, 2020, 4 pages.
Applicant-Initiated Interview Summary received for U.S. Appl. No. 16/584,281, mailed on Mar. 9, 2020, 5 pages.
Applicant-Initiated Interview Summary received for U.S. Appl. No. 16/584,281, mailed on Sep. 14, 2020, 6 pages.
Applicant-Initiated Interview Summary received for U.S. Appl. No. 16/585,714, mailed on Jul. 20, 2020, 5 pages.
Applicant-Initiated Interview Summary received for U.S. Appl. No. 16/585,721, mailed on Aug. 31, 2020, 5 pages.
Applicant-Initiated Interview Summary received for U.S. Appl. No. 16/585,721, mailed on Mar. 13, 2020, 5 pages.
Applicant-Initiated Interview Summary received for U.S. Appl. No. 16/599,433, mailed on Apr. 20, 2021, 7 pages.
Applicant-Initiated Interview Summary received for U.S. Appl. No. 16/659,507, mailed on Nov. 17, 2020, 3 pages.
Applicant-Initiated Interview Summary received for U.S. Appl. No. 16/663,062, mailed on Dec. 18, 2020, 3 pages.
Applicant-Initiated Interview Summary received for U.S. Appl. No. 16/833,436, mailed on Jan. 27, 2022, 2 pages.
Applicant-Initiated Interview Summary received for U.S. Appl. No. 16/833,436, mailed on Jul. 1, 2021, 2 pages.

(56) References Cited

OTHER PUBLICATIONS

Applicant-Initiated Interview Summary received for U.S. Appl. No. 16/861,651, mailed on Dec. 29, 2021, 5 pages.

Applicant-Initiated Interview Summary received for U.S. Appl. No. 16/861,651, mailed on Mar. 25, 2021, 6 pages.

Applicant-Initiated Interview Summary received for U.S. Appl. No. 16/861,651, mailed on Sep. 3, 2021, 5 pages.

Applicant-Initiated Interview Summary received for U.S. Appl. No. 16/935,002, mailed on Sep. 21, 2021, 4 pages.

Applicant-Initiated Interview Summary received for U.S. Appl. No. 16/943,737, mailed on Apr. 29, 2022, 6 pages.

Applicant-Initiated Interview Summary received for U.S. Appl. No. 16/943,737, mailed on Sep. 7, 2021, 4 pages.

Applicant-Initiated Interview Summary received for U.S. Appl. No. 16/997,588, mailed on Jan. 29, 2021, 3 pages.

Applicant-Initiated Interview Summary received for U.S. Appl. No. 16/997,588, mailed on May 12, 2021, 2 pages.

Applicant-Initiated Interview Summary received for U.S. Appl. No. 17/031,654, mailed on Feb. 1, 2021, 2 pages.

Applicant-Initiated Interview Summary received for U.S. Appl. No. 17/031,671, mailed on Dec. 9, 2022, 5 pages.

Applicant-Initiated Interview Summary received for U.S. Appl. No. 17/031,671, mailed on May 23, 2023, 3 pages.

Applicant-Initiated Interview Summary received for U.S. Appl. No. 17/031,765, mailed on Apr. 17, 2023, 4 pages.

Applicant-Initiated Interview Summary received for U.S. Appl. No. 17/031,765, mailed on Dec. 15, 2021, 4 pages.

Applicant-Initiated Interview Summary received for U.S. Appl. No. 17/031,765, mailed on May 3, 2023, 6 pages.

Applicant-Initiated Interview Summary received for U.S. Appl. No. 17/031,765, mailed on May 23, 2022, 5 pages.

Applicant-Initiated Interview Summary received for U.S. Appl. No. 17/031,765, mailed on Nov. 16, 2022, 5 pages.

Applicant-Initiated Interview Summary received for U.S. Appl. No. 17/031,765, mailed on Oct. 31, 2023, 5 pages.

Applicant-Initiated Interview Summary received for U.S. Appl. No. 17/031,765, mailed on Sep. 22, 2021, 5 pages.

Applicant-Initiated Interview Summary received for U.S. Appl. No. 17/041,350, mailed on Aug. 18, 2021, 2 pages.

Applicant-Initiated Interview Summary received for U.S. Appl. No. 17/041,350, mailed on Feb. 2, 2022, 2 pages.

Applicant-Initiated Interview Summary received for U.S. Appl. No. 17/068,386, mailed on Apr. 24, 2023, 2 pages.

Applicant-Initiated Interview Summary received for U.S. Appl. No. 17/068,386, mailed on Jan. 13, 2022, 2 pages.

Applicant-Initiated Interview Summary received for U.S. Appl. No. 17/068,386, mailed on Sep. 21, 2021, 2 pages.

Applicant-Initiated Interview Summary received for U.S. Appl. No. 17/078,896, mailed on Apr. 25, 2022, 2 pages.

Applicant-Initiated Interview Summary received for U.S. Appl. No. 17/093,408, mailed on Jan. 5, 2023, 3 pages.

Applicant-Initiated Interview Summary received for U.S. Appl. No. 17/093,408, mailed on Jul. 1, 2022, 3 pages.

Applicant-Initiated Interview Summary received for U.S. Appl. No. 17/093,408, mailed on Mar. 1, 2022, 3 pages.

Applicant-Initiated Interview Summary received for U.S. Appl. No. 17/093,408, mailed on May 10, 2023, 3 pages.

Applicant-Initiated Interview Summary received for U.S. Appl. No. 17/093,408, mailed on May 25, 2023, 2 pages.

Applicant-Initiated Interview Summary received for U.S. Appl. No. 17/158,936, mailed on Dec. 28, 2022, 4 pages.

Applicant-Initiated Interview Summary received for U.S. Appl. No. 17/317,042, mailed on Apr. 29, 2022, 2 pages.

Applicant-Initiated Interview Summary received for U.S. Appl. No. 17/341,839, mailed on Apr. 29, 2022, 2 pages.

Applicant-Initiated Interview Summary received for U.S. Appl. No. 17/341,839, mailed on Sep. 16, 2022, 2 pages.

Applicant-Initiated Interview Summary received for U.S. Appl. No. 17/370,505, mailed on Oct. 17, 2022, 4 pages.

Applicant-Initiated Interview Summary received for U.S. Appl. No. 17/373,163, mailed on Apr. 11, 2022, 2 pages.

Applicant-Initiated Interview Summary received for U.S. Appl. No. 17/461,014, mailed on Feb. 21, 2023, 3 pages.

Applicant-Initiated Interview Summary received for U.S. Appl. No. 17/546,630, mailed on Aug. 9, 2023, 4 pages.

Applicant-Initiated Interview Summary received for U.S. Appl. No. 17/556,165, mailed on Oct. 28, 2022, 4 pages.

Applicant-Initiated Interview Summary received for U.S. Appl. No. 17/591,184, mailed on Feb. 27, 2023, 2 pages.

Applicant-Initiated Interview Summary received for U.S. Appl. No. 17/591,184, mailed on Jun. 28, 2023, 2 pages.

Applicant-Initiated Interview Summary received for U.S. Appl. No. 17/591,184, mailed on Sep. 23, 2022, 2 pages.

Applicant-Initiated Interview Summary received for U.S. Appl. No. 17/681,584, mailed on Jun. 6, 2023, 2 pages.

Applicant-Initiated Interview Summary received for U.S. Appl. No. 17/713,005, mailed on Feb. 29, 2024, 2 pages.

Applicant-Initiated Interview Summary received for U.S. Appl. No. 17/713,016, mailed on Feb. 14, 2023, 4 pages.

Applicant-Initiated Interview Summary received for U.S. Appl. No. 17/717,275, mailed on Sep. 26, 2023, 6 pages.

Applicant-Initiated Interview Summary received for U.S. Appl. No. 17/738,940, mailed on Mar. 7, 2023, 4 pages.

Applicant-Initiated Interview Summary received for U.S. Appl. No. 17/746,807, mailed on May 21, 2024, 2 pages.

Applicant-Initiated Interview Summary received for U.S. Appl. No. 17/746,807, mailed on Nov. 3, 2023, 2 pages.

Applicant-Initiated Interview Summary received for U.S. Appl. No. 17/941,962, mailed on May 30, 2023, 2 pages.

Applicant-Initiated Interview Summary received for U.S. Appl. No. 17/947,530, mailed on Jun. 14, 2023, 2 pages.

Applicant-Initiated Interview Summary received for U.S. Appl. No. 17/947,530, mailed on Sep. 19, 2023, 2 pages.

Applicant-Initiated Interview Summary received for U.S. Appl. No. 17/948,578, mailed on Apr. 11, 2023, 3 pages.

Applicant-Initiated Interview Summary received for U.S. Appl. No. 17/949,081, mailed on Apr. 28, 2023, 2 pages.

Applicant-Initiated Interview Summary received for U.S. Appl. No. 17/949,081, mailed on Sep. 8, 2023, 2 pages.

Applicant-Initiated Interview Summary received for U.S. Appl. No. 18/138,634, mailed on Feb. 9, 2024, 4 pages.

Applicant-Initiated Interview Summary received for U.S. Appl. No. 18/196,345, mailed on Apr. 8, 2024, 4 pages.

Applicant-Initiated Interview Summary received for U.S. Appl. No. 18/197,242, mailed on Feb. 22, 2024, 2 pages.

Applivgames, ""Super Mario Run" Stickers for iMessage: Free Delivery Started!", Available online at: <https://games.app-liv.jp/archives/178627>, Sep. 13, 2016, 3 pages.

Avdonin, Nikita, "Astroviewer 3D", Available at: https:jjwww.youtube.comjwatch?v=zY0tslx3JHY/>, Nov. 5, 2013, 2 pages.

Baar, Marius, "Fitbit Ace—Unboxing, Setup and 24 Hour Test", YouTube [online] [video], Retrieved from: <https://youtu.be/ekvkfqOyrls>. See especially 4:44., Oct. 24, 2018, 3 pages.

Barbosa, Jonathan, "Weather Clock 2.1 for Android", APKPure, Online Available at: https://apkpure.com/weather-clock/com.urbandroid.wclock, Oct. 15, 2015, 3 pages.

Big Phil TV, "Gear S3 Watch faces with great always on display (A O D)", Available online at: https://www.youtube.com/watch?v=2cxMnrMiGU8, Apr. 5, 2017, 3 pages.

Board Opinion received for Chinese Patent Application No. 201911199054.4, mailed on May 10, 2024, 24 pages.

Bogdanov, Alexei, "SKMEI 1016", XP054977588, Available online at <URL: https://www.youtube.com/watch?v=E4q4Fug05Fw>, Jun. 21, 2014, 2 pages.

Brief Communication Regarding Oral Proceedings received for European Patent Application No. 15730925.3, mailed on Feb. 18, 2020, 7 pages.

Brief Communication Regarding Oral Proceedings received for European Patent Application No. 17206177.2, mailed on Nov. 21, 2019, 5 pages.

(56) References Cited

OTHER PUBLICATIONS

Brief Communication Regarding Oral Proceedings received for European Patent Application No. 17810723.1, mailed on Nov. 11, 2022, 11 pages.
Brief Communication Regarding Oral Proceedings received for European Patent Application No. 19172407.9, mailed on Nov. 9, 2020, 1 page.
Brief Communication Regarding Oral Proceedings received for European Patent Application No. 19172407.9, mailed on Nov. 20, 2020, 2 pages.
Brief Communication Regarding Oral Proceedings received for European Patent Application No. 19181242.9, mailed on Oct. 5, 2022, 4 pages.
Cancellation of Oral Proceedings received for European Patent Application No. 17206177.2, mailed on Dec. 4, 2019, 2 pages.
Carretero et al., "Preserving Avatar Genuineness in Different Display Media", Mobile Networks and Applications, Kluwer Academic Publishers, BO, vol. 13, No. 6, Jul. 15, 2008, pp. 627-634.
Castellini, Rick, "Google Earth", Retrieved from <https://www.youtube.com/watch?v=bgjMSBXsFZQ>, How to Use Google Earth for Beginners, Feb. 12, 2013, 3 pages.
Cengic, Suad, "Samsung Gear S3—Display Always on! Cool!", Available online at: https://www.youtube.com/watch?v=ceeDinbPwOY, Mar. 10, 2017, 3 pages.
Certificate of Examination received for Australian Patent Application No. 2019100420, mailed on Jul. 3, 2019, 2 pages.
Certificate of Examination received for Australian Patent Application No. 2019100497, mailed on Jul. 29, 2019, 2 pages.
Certificate of Examination received for Australian Patent Application No. 2019100794, mailed on Dec. 19, 2019, 2 pages.
Certificate of Examination received for Australian Patent Application No. 2019101019, mailed on Nov. 12, 2019, 2 pages.
Certificate of Examination received for Australian Patent Application No. 2019101667, mailed on Mar. 20, 2020, 2 pages.
Certificate of Examination received for Australian Patent Application No. 2020100189, mailed on May 12, 2020, 2 pages.
Certificate of Examination received for Australian Patent Application No. 2020100675, mailed on Jun. 30, 2020, 2 pages.
Certificate of Examination received for Australian Patent Application No. 2020101043, mailed on Dec. 22, 2020, 2 pages.
Certificate of Examination received for Australian Patent Application No. 2020101715, mailed on Oct. 6, 2020, 2 pages.
Certificate of Examination received for Australian Patent Application No. 2020102158, on Jun. 8, 2021, 2 pages.
Clark, Josh, "Designing Great iPhone Apps", O'Reilly Japan Co. O'Reilly Tim, vol. 1, May 24, 2012, 5 pages.
Communication for Board of Appeal received for European Patent Application No. 19204230.7, mailed on Feb. 16, 2024, 1 page.
Communication for Board of Appeal received for European Patent Application No. 19724959.2, mailed on Sep. 27, 2023, 14 pages.
Contents Pocket, "Line Stamp Information", Available online at: <https://web.archive.org/web/20150404080541/http://contents-pocket.net/linestamp.html>, Apr. 2015, 2 pages.
Corrected Notice of Allowance received for U.S. Appl. No. 14/815,879, mailed on Jul. 13, 2017, 3 pages.
Corrected Notice of Allowance received for U.S. Appl. No. 14/815,879, mailed on Jul. 28, 2017, 3 pages.
Corrected Notice of Allowance received for U.S. Appl. No. 14/815,879, mailed on Sep. 21, 2017, 2 pages.
Corrected Notice of Allowance received for U.S. Appl. No. 15/183,663, mailed on Feb. 25, 2019, 3 pages.
Corrected Notice of Allowance received for U.S. Appl. No. 15/183,663, mailed on Mar. 27, 2019, 2 pages.
Corrected Notice of Allowance received for U.S. Appl. No. 15/355,956, mailed on Jan. 3, 2020, 2 pages.
Corrected Notice of Allowance received for U.S. Appl. No. 15/554,204, mailed on Aug. 19, 2020, 3 pages.
Corrected Notice of Allowance received for U.S. Appl. No. 15/713,490, mailed on May 1, 2019, 2 pages.

Corrected Notice of Allowance received for U.S. Appl. No. 15/798,257, mailed on Aug. 26, 2019, 2 pages.
Corrected Notice of Allowance received for U.S. Appl. No. 15/798,257, mailed on Jul. 9, 2019, 2 pages.
Corrected Notice of Allowance received for U.S. Appl. No. 15/798,257, mailed on Jun. 12, 2019, 2 pages.
Corrected Notice of Allowance received for U.S. Appl. No. 16/142,288, mailed on Jul. 30, 2019, 5 pages.
Corrected Notice of Allowance received for U.S. Appl. No. 16/143,097, mailed on Nov. 8, 2019, 3 pages.
Corrected Notice of Allowance received for U.S. Appl. No. 16/401,934, mailed on Dec. 23, 2021, 3 pages.
Corrected Notice of Allowance received for U.S. Appl. No. 16/401,934, mailed on Feb. 28, 2022, 3 pages.
Corrected Notice of Allowance received for U.S. Appl. No. 16/418,786, mailed on Jan. 5, 2022, 3 pages.
Corrected Notice of Allowance received for U.S. Appl. No. 16/418,786, mailed on Jun. 23, 2022, 2 pages.
Corrected Notice of Allowance received for U.S. Appl. No. 16/519,850, mailed on Nov. 2, 2020, 5 pages.
Corrected Notice of Allowance received for U.S. Appl. No. 16/519,850, mailed on Sep. 8, 2020, 5 pages.
Corrected Notice of Allowance received for U.S. Appl. No. 16/582,020, mailed on Aug. 11, 2021, 2 pages.
Corrected Notice of Allowance received for U.S. Appl. No. 16/599,433, mailed on Aug. 13, 2021, 5 pages.
Corrected Notice of Allowance received for U.S. Appl. No. 16/599,433, mailed on Oct. 14, 2021, 3 pages.
Corrected Notice of Allowance received for U.S. Appl. No. 16/663,062, mailed on Apr. 14, 2021, 2 pages.
Corrected Notice of Allowance received for U.S. Appl. No. 16/663,062, mailed on Jul. 21, 2021, 2 pages.
Corrected Notice of Allowance received for U.S. Appl. No. 16/861,651, mailed on Jan. 18, 2024, 3 pages.
Corrected Notice of Allowance received for U.S. Appl. No. 16/935,002, mailed on Jul. 17, 2023, 5 pages.
Corrected Notice of Allowance received for U.S. Appl. No. 16/935,002, mailed on Mar. 2, 2023, 2 pages.
Corrected Notice of Allowance received for U.S. Appl. No. 16/935,002, mailed on Mar. 28, 2023, 2 pages.
Corrected Notice of Allowance received for U.S. Appl. No. 17/041,350, mailed on Apr. 4, 2022, 3 pages.
Corrected Notice of Allowance received for U.S. Appl. No. 17/041,350, mailed on Mar. 15, 2022, 3 pages.
Corrected Notice of Allowance received for U.S. Appl. No. 17/068,386, mailed on May 20, 2024, 2 pages.
Corrected Notice of Allowance received for U.S. Appl. No. 17/091,460, mailed on Feb. 16, 2022, 6 pages.
Corrected Notice of Allowance received for U.S. Appl. No. 17/091,460, mailed on Feb. 25, 2022, 6 pages.
Corrected Notice of Allowance received for U.S. Appl. No. 17/093,408, mailed on Sep. 13, 2023, 2 pages.
Corrected Notice of Allowance received for U.S. Appl. No. 17/093,408, mailed on Sep. 20, 2023, 3 pages.
Corrected Notice of Allowance received for U.S. Appl. No. 17/341,839, mailed on Oct. 26, 2022, 2 pages.
Corrected Notice of Allowance received for U.S. Appl. No. 17/370,505, mailed on Apr. 4, 2023, 5 pages.
Corrected Notice of Allowance received for U.S. Appl. No. 17/370,505, mailed on Apr. 28, 2023, 5 pages.
Corrected Notice of Allowance received for U.S. Appl. No. 17/370,505, mailed on Mar. 8, 2023, 5 pages.
Corrected Notice of Allowance received for U.S. Appl. No. 17/373,163, mailed on Jul. 15, 2022, 5 pages.
Corrected Notice of Allowance received for U.S. Appl. No. 17/373,163, mailed on Jun. 27, 2022, 5 pages.
Corrected Notice of Allowance received for U.S. Appl. No. 17/515,143, mailed on Mar. 29, 2023, 2 pages.
Corrected Notice of Allowance received for U.S. Appl. No. 17/525,664, mailed on Apr. 11, 2023, 2 pages.
Corrected Notice of Allowance received for U.S. Appl. No. 17/525,664, mailed on Feb. 23, 2023, 2 pages.

(56) References Cited

OTHER PUBLICATIONS

Corrected Notice of Allowance received for U.S. Appl. No. 17/525,664, mailed on May 17, 2023, 2 pages.
Corrected Notice of Allowance received for U.S. Appl. No. 17/525,664, mailed on Nov. 3, 2022, 2 pages.
Corrected Notice of Allowance received for U.S. Appl. No. 17/738,940, mailed on Jan. 24, 2024, 3 pages.
Corrected Notice of Allowance received for U.S. Appl. No. 17/941,962, mailed on Apr. 14, 2023, 6 pages.
Corrected Notice of Allowance received for U.S. Appl. No. 17/941,962, mailed on Aug. 3, 2023, 2 pages.
Corrected Notice of Allowance received for U.S. Appl. No. 17/949,081, mailed on Apr. 24, 2024, 3 pages.
Corrected Notice of Allowance received for U.S. Appl. No. 18/138,634, mailed on May 2, 2024, 5 pages.
Corrected Notice of Allowance received for U.S. Appl. No. 18/138,634, mailed on May 20, 2024, 5 pages.
Corrected Notice of Allowance received for U.S. Appl. No. 18/197,242, mailed on Apr. 4, 2024, 2 pages.
Corrected Notice of Allowance received for U.S. Appl. No. 18/197,242, mailed on Mar. 18, 2024, 2 pages.
Corrected Notice of Allowance received for U.S. Appl. No. 18/197,242, mailed on Mar. 27, 2024, 2 pages.
Corrected Notice of Allowance received for U.S. Appl. No. 18/197,242, mailed on May 15, 2024, 2 pages.
Corrected Notice of Allowance received for U.S. Appl. No. 18/220,715, mailed on Apr. 8, 2024, 2 pages.
Corrected Notice of Allowance received for U.S. Appl. No. 18/220,715, mailed on Apr. 25, 2024, 2 pages.
Corrected Notice of Allowance received for U.S. Appl. No. 18/220,715, mailed on Jul. 23, 2024, 2 pages.
Corrected Notice of Allowance received for U.S. Appl. No. 18/220,715, mailed on Jun. 24, 2024, 2 pages.
Cyr, Jim, "Apple Watch—Customize Modular Watch Face", available online at: https://www.youtube.com/watch?v=02W93HbKIK8, May 13, 2015, 2 pages.
Dan, "Get This Look: 'Minimal' Zooper Widget", Online Available at: https://www.androidguys.com/featured/customize/get-look-minimal-zooper-widget/, Mar. 7, 2014, 2 pages.
Decision on Acceptance received for Australian Patent Application No. 2015298710, mailed on Jul. 19, 2019, 18 pages.
Decision on Acceptance received for Australian Patent Application No. 2018201089, mailed on Apr. 20, 2021, 28 pages.
Decision on Appeal received for Korean Patent Application No. 10-2021-7002582, mailed on May 13, 2022, 29 pages.
Decision on Appeal received for U.S. Appl. No. 14/815,890, mailed on Nov. 24, 2020, 13 pages.
Decision on Appeal received for U.S. Appl. No. 14/846,511, mailed on Dec. 29, 2021, 20 pages.
Decision on Appeal received for U.S. Appl. No. 15/405,122, mailed on Dec. 12, 2023, 18 pages.
Decision on Appeal received for U.S. Appl. No. 16/259,771, mailed on Aug. 19, 2021, 12 pages.
Decision on Appeal received for U.S. Appl. No. 16/259,771, mailed on Feb. 8, 2024, 18 pages.
Decision on Appeal received for U.S. Appl. No. 16/861,651, mailed on Sep. 1, 2023, 14 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.
Decision to Grant Received for Danish Patent Application No. PA201770397, mailed on Feb. 6, 2018, 2 pages.
Decision to Grant received for Danish Patent Application No. PA201770791, mailed on Jul. 7, 2020, 2 pages.
Decision to Grant received for Danish Patent Application No. PA201870372, mailed on Jun. 17, 2020, 2 pages.
Decision to Grant received for Danish Patent Application No. PA201870375, mailed on Jul. 24, 2019, 2 pages.

Decision to Grant received for Danish Patent Application No. PA201870377, mailed on May 14, 2019, 2 pages.
Decision to Grant received for Danish Patent Application No. PA201970596, mailed on Feb. 26, 2021, 2 pages.
Decision to Grant received for Danish Patent Application No. PA201970597, mailed on Aug. 19, 2021, 2 pages.
Decision to Grant received for Danish Patent Application No. PA202070609, mailed on May 3, 2021, 2 pages.
Decision to Grant received for European Patent Application No. 15730925.3, mailed on Dec. 9, 2021, 2 pages.
Decision to Grant received for European Patent Application No. 15747595.5, mailed on Jul. 16, 2020, 2 pages.
Decision to Grant received for European Patent Application No. 16762356.0, mailed on Apr. 26, 2022, 2 pages.
Decision to Grant received for European Patent Application No. 17206177.2, mailed on Aug. 6, 2020, 2 pages.
Decision to Grant received for European Patent Application No. 17810723.1, mailed on Sep. 21, 2023, 2 pages.
Decision to Grant received for European Patent Application No. 19172407.9, mailed on Jun. 17, 2021, 2 pages.
Decision to Grant received for European Patent Application No. 19181242.9, mailed on Mar. 23, 2023, 3 pages.
Decision to Grant received for European Patent Application No. 20168021.2, mailed on Feb. 3, 2022, 2 pages.
Decision to Grant received for European Patent Application No. 20185974.1, mailed on Aug. 19, 2022, 3 pages.
Decision to Grant received for European Patent Application No. 20729346.5, mailed on Nov. 16, 2023, 2 pages.
Decision to Grant received for European Patent Application No. 20761084.1, mailed on Jul. 27, 2023, 4 pages.
Decision to Grant received for European Patent Application No. 21169911.1, mailed on Jun. 29, 2023, 3 pages.
Decision to Grant received for European Patent Application No. 21177569.7, mailed on Apr. 6, 2023, 3 pages.
Decision to Grant received for European Patent Application No. 22173249.8, mailed on Dec. 14, 2023, 2 pages.
Decision to Grant received for Japanese Patent Application No. 2018-182607, mailed on Apr. 13, 2022, 3 pages.
Decision to Grant received for Japanese Patent Application No. 2020-193703, mailed on Aug. 10, 2021, 3 pages.
Decision to Grant received for Japanese Patent Application No. 2021-166686, mailed on Apr. 20, 2023, 2 pages.
Decision to Grant received for Japanese Patent Application No. 2023-083816, mailed on Aug. 9, 2023, 2 pages.
Decision to Grant received for Japanese Patent Application No. 2023-146062, mailed on Nov. 13, 2023, 2 pages.
Decision to Refuse received for European Patent Application No. 15730924.6, mailed on Mar. 15, 2019, 12 pages.
Decision to Refuse received for European Patent Application No. 17853657.9, mailed on Feb. 2, 2024, 17 pages.
Decision to Refuse received for European Patent Application No. 19204230.7, mailed on Feb. 4, 2022, 15 pages.
Decision to Refuse received for European Patent Application No. 19212057.4, mailed on Feb. 5, 2024, 18 pages.
Decision to Refuse received for European Patent Application No. 19724959.2, mailed on Jun. 22, 2021, 13 pages.
Decision to Refuse received for European Patent Application No. 20172197.4, mailed on Nov. 7, 2023, 10 pages.
Decision to Refuse received for Japanese Patent Application No. 2020-159824, mailed on Sep. 30, 2022, 6 pages.
"Deluxe Moon—Guide", available online at: https://web.archive.org/web/20130520161057/http://www.lifewaresolutions.com/deluxe_moon_guide_ip.html, May 20, 2013, 5 pages.
"Digital alarm clock app for Android", Goggle play store digital alarm clock description page, Mar. 25, 2015, 3 pages.
Droid Life, "20+ Galaxy S9, S9+ Tips and Tricks", Available Online at: https://www.youtube.com/watch?v=sso0mYTfV6w, Mar. 22, 2018, pp. 1-33.
Droid Life, "How to: Use Always-on Apps with Android Wear", Available online at: https://www.youtube.com/watch?v=_-xYB9EBTaA, Jun. 26, 2015, 3 pages.

(56)     References Cited

OTHER PUBLICATIONS

Ebpman Tech Reviews, "LG G3 Tips: How to customize the clock face", Available online at: https://www.youtube.com/watch?v=evraMWFb1fY, Jul. 25, 2014, 1 page.
Elecont, "Weather clock—hourly forecast description", Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.
Enterbrain, "No. 5 Create your own Avatar Mii Studio", vol. 26, No. 11, p. 138, Feb. 24, 2011, 4 pages.
"Ergonomic requirements for office work with visual display terminals (VDTs)", Part 13: User guidance, International Standard ISO, Zuerich, CH, vol. 9241-13, Jul. 15, 1998, 40 pages.
European Search Report received for European Patent Application No. 17206177.2, mailed on Apr. 30, 2018, 4 pages.
European Search Report received for European Patent Application No. 19172407.9, mailed on Oct. 9, 2019, 4 pages.
European Search Report received for European Patent Application No. 19181242.9, mailed on Nov. 27, 2019, 4 pages.
European Search Report received for European Patent Application No. 20168021.2, mailed on Jul. 8, 2020, 4 pages.
European Search Report received for European Patent Application No. 20172197.4, mailed on Jul. 28, 2020, 4 pages.
Evgenyevich, Sergey, "Earth & Moon in HD Gyro 3D", Available at <https://www.youtube.com/watch?v=IRwNcaSYrls/>, Dec. 1, 2013, 2 pages.
Examiner's Answer to Appeal Brief received for U.S. Appl. No. 14/815,890, mailed on Mar. 20, 2020, 16 pages.
Examiner's Answer to Appeal Brief received for U.S. Appl. No. 14/846,511, mailed on Jun. 14, 2021, 15 pages.
Examiner's Answer to Appeal Brief received for U.S. Appl. No. 15/405,122, mailed on Jan. 11, 2023, 16 pages.
Examiner's Answer to Appeal Brief received for U.S. Appl. No. 16/259,771, mailed on May 26, 2023, 23 pages.
Examiner's Answer to Appeal Brief received for U.S. Appl. No. 16/259,771, mailed on Oct. 23, 2020, 15 pages.
Examiner's Answer to Appeal Brief received for U.S. Appl. No. 16/389,722, mailed on Feb. 2, 2024, 8 pages.
Examiner's Answer to Appeal Brief received for U.S. Appl. No. 16/861,651, mailed on Jan. 18, 2023, 16 pages.
Examiner's Answer to Appeal Brief received for U.S. Appl. No. 16/943,737, mailed on Feb. 2, 2024, 15 pages.
Examiner's Answer to Appeal Brief received for U.S. Appl. No. 17/031,671, mailed on Dec. 8, 2023, 16 pages.
Examiner's Answer to Appeal Brief received for U.S. Appl. No. 17/461,014, mailed on Jan. 29, 2024, 13 pages.
Examiner's Answer to Appeal Brief received for U.S. Appl. No. 17/947,530, mailed on May 21, 2024, 34 pages.
Examiner's Pre-Review Report received for Japanese Patent Application No. 2019-215503, mailed on Aug. 20, 2021, 15 pages.
Extended European Search Report received for European Patent Application No. 16762356.0, mailed on Nov. 9, 2018, 10 pages.
Extended European Search Report received for European Patent Application No. 16837432.0, mailed on Mar. 11, 2019, 10 pages.
Extended European Search Report received for European Patent Application No. 17810723.1, mailed on Nov. 12, 2019, 9 pages.
Extended European Search Report received for European Patent Application No. 17853657.9, mailed on May 28, 2020, 9 pages.
Extended European Search Report received for European Patent Application No. 19204230.7, mailed on Feb. 21, 2020, 7 pages.
Extended European Search Report received for European Patent Application No. 19212057.4, mailed on Feb. 27, 2020, 8 pages.
Extended European Search Report received for European Patent Application No. 20185974.1, mailed on Oct. 28, 2020, 7 pages.
Extended European Search Report received for European Patent Application No. 21169911.1, mailed on Sep. 20, 2021, 9 pages.
Extended European Search Report received for European Patent Application No. 21177569.7, mailed on Sep. 20, 2021, 8 pages.

Extended European Search Report received for European Patent Application No. 22154034.7, mailed on May 11, 2022, 14 pages.
Extended European Search Report received for European Patent Application No. 22173249.8, mailed on Aug. 19, 2022, 15 pages.
Extended European Search Report received for European Patent Application No. 22188724.3, mailed on Mar. 2, 2023, 14 pages.
Extended European Search Report received for European Patent Application No. 23168077.8, mailed on Jul. 11, 2023, 12 pages.
Extended European Search Report received for European Patent Application No. 23201849.9, mailed on Oct. 26, 2023, 9 pages.
Extended European Search Report received for European Patent Application No. 23216484.8, mailed on Feb. 28, 2024, 9 pages.
Extended European Search Report received for European Patent Application No. 24150496.8, mailed on Mar. 14, 2024, 8 pages.
Fedko, Daria, "AR Hair Styles", Online Available at <https://www.youtube.com/watch?v=FrS6tHRbFE0>, Jan. 24, 2017, 2 pages.
Feist, Jonathan, "Android customization—how to create a custom clock widget using Zooper Widget", Available Online at: https://www.androidauthority.com/zooper-widget-clock-366476/, May 15, 2014, 10 pages.
Feldman, Ari, "Excerpts from: Designing Arcade Computer Game Graphics", Available online at: http://www.phatcode.net/res/269/files/dacgg.pdf, Jan. 1, 2001, 35 pages.
Final Office Action received for U.S. Appl. No. 13/082,035, mailed on Apr. 16, 2015, 24 pages.
Final Office Action received for U.S. Appl. No. 13/082,035, mailed on Aug. 15, 2013, 24 pages.
Final Office Action received for U.S. Appl. No. 14/815,890, mailed on Feb. 26, 2018, 20 pages.
Final Office Action received for U.S. Appl. No. 14/815,890, mailed on May 14, 2019, 22 pages.
Final Office Action received for U.S. Appl. No. 14/815,890, mailed on Nov. 21, 2016, 18 pages.
Final Office Action received for U.S. Appl. No. 14/815,898, mailed on Jun. 9, 2016, 19 pages.
Final Office Action received for U.S. Appl. No. 14/821,667, mailed on Apr. 26, 2018, 13 pages.
Final Office Action received for U.S. Appl. No. 14/841,606, mailed on Sep. 7, 2018, 34 pages.
Final Office Action received for U.S. Appl. No. 14/846,511 mailed on May 10, 2018, 21 pages.
Final Office Action received for U.S. Appl. No. 14/846,511, mailed on Aug. 11, 2020, 25 pages.
Final Office Action received for U.S. Appl. No. 14/846,511, mailed on Jun. 5, 2019, 24 pages.
Final Office Action received for U.S. Appl. No. 14/866,560, mailed on Oct. 9, 2018, 22 pages.
Final Office Action received for U.S. Appl. No. 15/405,122, mailed on Jan. 21, 2020, 36 pages.
Final Office Action received for U.S. Appl. No. 15/405,122, mailed on Nov. 5, 2021, 45 pages.
Final Office Action received for U.S. Appl. No. 15/421,865, mailed on Dec. 2, 2019, 19 pages.
Final Office Action received for U.S. Appl. No. 15/421,865, mailed on Jul. 12, 2022, 27 pages.
Final Office Action received for U.S. Appl. No. 15/421,865, mailed on Mar. 7, 2024, 27 pages.
Final Office Action received for U.S. Appl. No. 15/421,865, mailed on Mar. 19, 2021, 20 pages.
Final Office Action received for U.S. Appl. No. 15/554,204, mailed on Oct. 31, 2019, 22 pages.
Final Office Action received for U.S. Appl. No. 15/798,235, mailed on Oct. 9, 2018, 45 pages.
Final Office Action received for U.S. Appl. No. 15/798,235, mailed on Oct. 18, 2019, 25 pages.
Final Office Action received for U.S. Appl. No. 15/881,544, mailed on Jan. 29, 2019, 14 pages.
Final Office Action received for U.S. Appl. No. 16/116,221, mailed on Mar. 22, 2019, 35 pages.
Final Office Action received for U.S. Appl. No. 16/259,771, mailed on Aug. 12, 2022, 25 pages.
Final Office Action received for U.S. Appl. No. 16/259,771, mailed on Nov. 18, 2019, 13 pages.

(56) References Cited

OTHER PUBLICATIONS

Final Office Action received for U.S. Appl. No. 16/389,722, mailed on Dec. 6, 2021, 19 pages.

Final Office Action received for U.S. Appl. No. 16/389,722, mailed on Dec. 8, 2020, 18 pages.

Final Office Action received for U.S. Appl. No. 16/389,722, mailed on Mar. 17, 2023, 14 pages.

Final Office Action received for U.S. Appl. No. 16/401,934, mailed on Jun. 14, 2021, 30 pages.

Final Office Action received for U.S. Appl. No. 16/418,786, mailed on Jan. 13, 2021, 14 pages.

Final Office Action received for U.S. Appl. No. 16/582,020, mailed on Apr. 28, 2020, 31 pages.

Final Office Action received for U.S. Appl. No. 16/584,281, mailed on Apr. 15, 2020, 26 pages.

Final Office Action received for U.S. Appl. No. 16/585,721, mailed on Apr. 1, 2020, 28 pages.

Final Office Action received for U.S. Appl. No. 16/833,436, mailed on Sep. 21, 2021, 29 pages.

Final Office Action received for U.S. Appl. No. 16/861,651, mailed on Apr. 20, 2021, 14 pages.

Final Office Action received for U.S. Appl. No. 16/861,651, mailed on Jan. 26, 2022, 16 pages.

Final Office Action received for U.S. Appl. No. 16/935,002, mailed on Jan. 5, 2022, 25 pages.

Final Office Action received for U.S. Appl. No. 16/943,737, mailed on Feb. 4, 2022, 24 pages.

Final Office Action received for U.S. Appl. No. 16/997,588, mailed on Mar. 30, 2021, 23 pages.

Final Office Action received for U.S. Appl. No. 17/031,671, mailed on Nov. 15, 2022, 27 pages.

Final Office Action received for U.S. Appl. No. 17/031,671, mailed on Sep. 7, 2021, 27 pages.

Final Office Action received for U.S. Appl. No. 17/031,765, mailed on Oct. 29, 2021, 34 pages.

Final Office Action received for U.S. Appl. No. 17/031,765, mailed on Sep. 1, 2023, 37 pages.

Final Office Action received for U.S. Appl. No. 17/031,765, mailed on Sep. 12, 2022, 37 pages.

Final Office Action received for U.S. Appl. No. 17/041,350, mailed on Sep. 17, 2021, 25 pages.

Final Office Action received for U.S. Appl. No. 17/068,386, mailed on Mar. 3, 2022, 29 pages.

Final Office Action received for U.S. Appl. No. 17/068,386, mailed on May 8, 2023, 23 pages.

Final Office Action received for U.S. Appl. No. 17/093,408, mailed on Mar. 2, 2023, 51 pages.

Final Office Action received for U.S. Appl. No. 17/093,408, mailed on May 18, 2022, 41 pages.

Final Office Action received for U.S. Appl. No. 17/158,936, mailed on Apr. 7, 2023, 18 pages.

Final Office Action received for U.S. Appl. No. 17/341,839, mailed on Jul. 18, 2022, 15 pages.

Final Office Action received for U.S. Appl. No. 17/461,014, mailed on Apr. 6, 2023, 24 pages.

Final Office Action received for U.S. Appl. No. 17/546,630, mailed on Jun. 27, 2023, 31 pages.

Final Office Action received for U.S. Appl. No. 17/591,184, mailed on Dec. 23, 2022, 10 pages.

Final Office Action received for U.S. Appl. No. 17/681,584, mailed on Apr. 20, 2023, 15 pages.

Final Office Action received for U.S. Appl. No. 17/713,005, mailed on Apr. 30, 2024, 22 pages.

Final Office Action received for U.S. Appl. No. 17/713,016, mailed on Mar. 15, 2023, 6 pages.

Final Office Action received for U.S. Appl. No. 17/746,807, mailed on Apr. 26, 2023, 16 pages.

Final Office Action received for U.S. Appl. No. 17/746,807, mailed on Feb. 20, 2024, 24 pages.

Final Office Action received for U.S. Appl. No. 17/947,530, mailed on Jul. 13, 2023, 17 pages.

Final Office Action received for U.S. Appl. No. 17/949,081, mailed on Jun. 5, 2023, 23 pages.

Final Office Action received for U.S. Appl. No. 14/815,879, mailed on Mar. 24, 2016, 46 pages.

First Action Interview received for U.S. Appl. No. 14/815,890, mailed on Aug. 12, 2016, 3 pages.

"Fitbit surge Fitness Watch", Manual version 1.0, May 7, 2015, 48 pages.

Flatlinevertigo, "Black Desert Online: Intro to Hair Customization", Online Available at: <https://www.youtube.com/watch?v=9MCbfd_eMEg>, Sep. 9, 2015, 3 pages.

Fuchphone Extras, "LG G Watch—Designs | Watch Faces", Available online at: https://www.youtube.com/watch?v=yqxzqdi_MSE, Jul. 27, 2014, 1 page.

Fuchphone Extras, "Samsung Gear Live—Designs | Watch Faces", Available online at: https://www.youtube.com/watch?v=fFjtVAxyimE, Jul. 26, 2014, 1 page.

Fukuda, Kazuhiro, "Xperia Z1 Perfect Manual", Sotec Co. Ltd., No. 1, Nov. 15, 2013, pp. 217-218.

Gadget Hacks, "Get a Contextually-Aware Wallpaper for Android [How-To]", Online Available at: https://www.youtube.com/watch?v=KpdelkltyoA&t=136s, Aug. 5, 2016, 2 pages.

Gao et al., "Automatic Unpaired Shape Deformation Transfer", ACM Transactions on Graphics, Online available at: https://doi.org/10.1145/3272127.3275028, 2018, 11 pages.

Gauging Gadgets, "How to Customize Watch Faces—Garmin Venu Tutorial", Online Available at: https://www.youtube.com/watch?v=dxajKKulaP0, Jan. 7, 2020, 14 pages.

Gazer, "iPhone 4S Super Manual", Shuwa System Co. Saito Kazukuni, vol. 1, Jun. 6, 2013, 7 pages.

Geary, David, "Programming HTML5 Canvas", O'Reilly Japan, Inc., No. 1, Jul. 23, 2014, pp. 327-330.

Geek, "How to Put the Day of the Week into the Windows Taskbar Clock", available online at: https://www.howtogeek.com/194103/how-to-put-the-day-of-the-week-into-the-windows-taskbar-clock/, 2014, 3 pages.

"Google Earth 7.0.1.8244", retrieved from the Internet: http://dl.google.com/dl/earth/client/ge7/release_7_0_1/googleearth-win-bundle-7.0.1.8244.exe, Oct. 29, 2012, 1 page.

"Google Earth on Android—AndroidCentral.com", Available online at:—https://www.youtube.com/watch?v=1WxN1RunrE4, Feb. 22, 2010, 1 page.

Google, "Android User's Guide", Retrieved from the Internet: https://static.googleusercontent.com/media/www.google.com/en//help/hc/pdfs/mobile/AndroidUsersGuide-30-100.pdf, Feb. 23, 2011, 140 pages.

Gottabemobile, "How to Change Watch Faces on Android Wear", available online at URL: https://www.youtube.com/watch?v=B8iRGkGq6a8, Jul. 9, 2014, 4 pages.

Hayakawa, Atsushi, "An On-Line Wear Club", Mac People, ASCII Corp, Japan, vol. 8, No. 20., Oct. 15, 2002, 4 pages.

"Here are Warez Files: Eve Online Character Creator", Online Available at: <http://theherearewarezfiles.blogspot.com/2014/03/eve-online-character-creator-download.html>, Mar. 3, 2014, 7 pages.

Hoffman, Chris, "5+ Cool Uses for Android's Daydream Mode", retrieved from—https://www.howtogeek.com/170990/5-cool-uses-for-androids-daydream-mode, Jul. 12, 2017, 8 pages.

Ilovex, "Stripe Generator, a tool that makes it easy to create striped materials", Online available at: https://www.ilovex.co.jp/blog/system/webconsulting/stripe-generator.html, May 2, 2012, 3 pages.

"Instruction Manual", Detailed version, KDDI Corporation, No. 1, vol. 1, Jun. 2014, 4 pages.

Intention to Grant received for Danish Patent Application No. PA201570496, mailed on Feb. 17, 2016, 6 pages.

Intention to Grant received for Danish Patent Application No. PA201770397, mailed on Aug. 18, 2017, 7 pages.

Intention to Grant received for Danish Patent Application No. PA201770791, mailed on Feb. 19, 2020, 2 pages.

Intention to Grant received for Danish Patent Application No. PA201870372, mailed on Feb. 13, 2020, 2 pages.

(56)                    References Cited

OTHER PUBLICATIONS

Intention to Grant received for Danish Patent Application No. PA201870375, mailed on Jun. 3, 2019, 2 pages.
Intention to Grant received for Danish Patent Application No. PA201870375, mailed on Mar. 26, 2019, 2 pages.
Intention to Grant received for Danish Patent Application No. PA201870377, mailed on Mar. 26, 2019, 2 pages.
Intention to Grant received for Danish Patent Application No. PA201970596, mailed on Dec. 1, 2020, 2 pages.
Intention to Grant received for Danish Patent Application No. PA201970597, mailed on Apr. 20, 2021, 2 pages.
Intention to Grant received for Danish Patent Application No. PA202070609, mailed on Jan. 14, 2021, 2 pages.
Intention to Grant received for Danish Patent Application No. PA202070623, mailed on Jul. 20, 2022, 2 pages.
Intention to Grant received for European Patent Application No. 15730925.3, mailed on Aug. 16, 2021, 10 pages.
Intention to Grant received for European Patent Application No. 15730925.3, mailed on May 28, 2020, 10 pages.
Intention to Grant received for European Patent Application No. 15747595.5, mailed on Feb. 17, 2020, 8 pages.
Intention to Grant received for European Patent Application No. 16762356.0, mailed on Dec. 23, 2021, 8 pages.
Intention to Grant received for European Patent Application No. 16837432.0, mailed on Apr. 14, 2023, 8 pages.
Intention to Grant received for European Patent Application No. 17206177.2, mailed on Feb. 24, 2020, 8 pages.
Intention to Grant received for European Patent Application No. 17810723.1, mailed on Dec. 16, 2022, 9 pages.
Intention to Grant received for European Patent Application No. 17810723.1, mailed on Jun. 12, 2023, 9 pages.
Intention to Grant received for European Patent Application No. 19172407.9, mailed on Feb. 11, 2021, 9 pages.
Intention to Grant received for European Patent Application No. 19181242.9, mailed on Nov. 17, 2022, 9 pages.
Intention to Grant received for European Patent Application No. 19181242.9, mailed on Oct. 28, 2021, 16 pages.
Intention to Grant received for European Patent Application No. 20168021.2, mailed on Apr. 15, 2021, 8 pages.
Intention to Grant received for European Patent Application No. 20168021.2, mailed on Sep. 20, 2021, 8 pages.
Intention to Grant received for European Patent Application No. 20185974.1, mailed on Apr. 28, 2022, 8 pages.
Intention to Grant received for European Patent Application No. 20729346.5, mailed on Jul. 10, 2023, 9 pages.
Intention to Grant received for European Patent Application No. 20730136.7, mailed on Mar. 1, 2024, 9 pages.
Intention to Grant received for European Patent Application No. 20761084.1, mailed on Mar. 27, 2023, 10 pages.
Intention to Grant received for European Patent Application No. 21169911.1, mailed on Mar. 6, 2023, 9 pages.
Intention to Grant received for European Patent Application No. 21177569.7, mailed on Oct. 27, 2022, 8 pages.
Intention to Grant received for European Patent Application No. 21728746.5, mailed on Jul. 12, 2024, 10 pages.
Intention to Grant received for European Patent Application No. 21729171.5, mailed on Apr. 19, 2024, 9 pages.
Intention to Grant received for European Patent Application No. 22173249.8, mailed on Oct. 2, 2023, 9 pages.
International Preliminary Report on Patentability received for PCT Patent Application No. PCT/US2016/037686, mailed on Mar. 1, 2018, 12 pages.
International Preliminary Report on Patentability received for PCT Patent Application No. PCT/US2011/031616, mailed on Oct. 18, 2012, 6 pages.
International Preliminary Report on Patentability received for PCT Patent Application No. PCT/US2015/034604, mailed on Feb. 16, 2017, 21 pages.

International Preliminary Report on Patentability received for PCT Patent Application No. PCT/US2015/034606, mailed on Feb. 16, 2017, 11 pages.
International Preliminary Report on Patentability received for PCT Patent Application No. PCT/US2015/034607, mailed on Feb. 16, 2017, 18 pages.
International Preliminary Report on Patentability received for PCT Patent Application No. PCT/US2015/044473, mailed on Mar. 2, 2017, 20 pages.
International Preliminary Report on Patentability received for PCT Patent Application No. PCT/US2015/044485, mailed on Mar. 2, 2017, 20 pages.
International Preliminary Report on Patentability received for PCT Patent Application No. PCT/US2015/053353, mailed on Sep. 21, 2017, 15 pages.
International Preliminary Report on Patentability received for PCT Patent Application No. PCT/US2015/054223, mailed on Dec. 14, 2017, 18 pages.
International Preliminary Report on Patentability received for PCT Patent Application No. PCT/US2016/021403, mailed on Sep. 21, 2017, 21 pages.
International Preliminary Report on Patentability received for PCT Patent Application No. PCT/US2016/035090, mailed on Dec. 14, 2017, 14 pages.
International Preliminary Report on Patentability received for PCT Patent Application No. PCT/US2017/034834, mailed on Dec. 20, 2018, 9 pages.
International Preliminary Report on Patentability received for PCT Patent Application No. PCT/US2017/049795, mailed on Apr. 4, 2019, 16 pages.
International Preliminary Report on Patentability received for PCT Patent Application No. PCT/US2018/032164, mailed on Nov. 21, 2019, 11 pages.
International Preliminary Report on Patentability received for PCT Patent Application No. PCT/US2019/023793, mailed on Nov. 19, 2020, 12 pages.
International Preliminary Report on Patentability received for PCT Patent Application No. PCT/US2019/024067, mailed on Nov. 19, 2020, 12 pages.
International Preliminary Report on Patentability received for PCT Patent Application No. PCT/US2019/030770, mailed on Nov. 19, 2020, 14 pages.
International Preliminary Report on Patentability received for PCT Patent Application No. PCT/US2020/014176, mailed on Jul. 29, 2021, 9 pages.
International Preliminary Report on Patentability received for PCT Patent Application No. PCT/US2020/030079, mailed on Nov. 18, 2021, 12 pages.
International Preliminary Report on Patentability received for PCT Patent Application No. PCT/US2020/031536, mailed on Nov. 18, 2021, 11 pages.
International Preliminary Report on Patentability received for PCT Patent Application No. PCT/US2020/031575, mailed on Nov. 18, 2021, 9 pages.
International Preliminary Report on Patentability received for PCT Patent Application No. PCT/US2020/045814, mailed on Mar. 17, 2022, 12 pages.
International Preliminary Report on Patentability received for PCT Patent Application No. PCT/US2021/031096, mailed on Nov. 24, 2022, 11 pages.
International Preliminary Report on Patentability received for PCT Patent Application No. PCT/US2021/031212, mailed on Nov. 24, 2022, 16 pages.
International Preliminary Report on Patentability received for PCT Patent Application No. PCT/US2021/031669, mailed on Nov. 24, 2022, 12 pages.
International Preliminary Report on Patentability received for PCT Patent Application No. PCT/US2022/029279, mailed on Nov. 23, 2023, 11 pages.
International Search Report and Written Opinion received for PCT Patent Application No. PCT/US2015/034604, mailed on Nov. 9, 2015, 30 pages.

(56) References Cited

OTHER PUBLICATIONS

International Search Report and Written Opinion received for PCT Patent Application No. PCT/US2017/049795, mailed on Dec. 27, 2017, 26 pages.
International Search Report and Written Opinion received for PCT Patent Application No. PCT/US2011/031616, mailed on Aug. 30, 2011, 8 pages.
International Search Report and Written Opinion received for PCT Patent Application No. PCT/US2015/034606, mailed on Dec. 2, 2015, 17 pages.
International Search Report and Written Opinion received for PCT Patent Application No. PCT/US2015/044473, mailed on Feb. 12, 2016, 24 pages.
International Search Report and Written Opinion received for PCT Patent Application No. PCT/US2015/044485, mailed on Feb. 9, 2016, 27 pages.
International Search Report and Written Opinion received for PCT Patent Application No. PCT/US2015/053353, mailed on May 9, 2016, 21 pages.
International Search Report and Written Opinion received for PCT Patent Application No. PCT/US2015/054223, mailed on Jul. 6, 2016, 25 pages.
International Search Report and Written Opinion received for PCT Patent Application No. PCT/US2016/021403, mailed on May 12, 2016, 23 pages.
International Search Report and Written Opinion received for PCT Patent Application No. PCT/US2016/035090, mailed on Oct. 4, 2016, 17 pages.
International Search Report and Written Opinion received for PCT Patent Application No. PCT/US2016/037686, mailed on Sep. 9, 2016, 19 pages.
International Search Report and Written Opinion received for PCT Patent Application No. PCT/US2017/034834, mailed on Aug. 23, 2017, 10 pages.
International Search Report and Written Opinion received for PCT Patent Application No. PCT/US2018/032164, mailed on Oct. 18, 2018, 16 pages.
International Search Report and Written Opinion received for PCT Patent Application No. PCT/US2019/023793, mailed on Aug. 27, 2019, 17 pages.
International Search Report and Written Opinion received for PCT Patent Application No. PCT/US2019/024067, mailed on Oct. 9, 2019, 18 pages.
International Search Report and Written Opinion received for PCT Patent Application No. PCT/US2019/030770, mailed on Oct. 31, 2019, 23 pages.
International Search Report and Written Opinion received for PCT Patent Application No. PCT/US2020/014176, mailed on Mar. 26, 2020, 12 pages.
International Search Report and Written Opinion received for PCT Patent Application No. PCT/US2020/030079, mailed on Sep. 4, 2020, 18 pages.
International Search Report and Written Opinion received for PCT Patent Application No. PCT/US2020/031536, mailed on Sep. 23, 2020, 16 pages.
International Search Report and Written Opinion received for PCT Patent Application No. PCT/US2020/031575, mailed on Aug. 20, 2020, 14 pages.
International Search Report and Written Opinion received for PCT Patent Application No. PCT/US2020/045814, mailed on Jan. 20, 2021, 16 pages.
International Search Report and Written Opinion received for PCT Patent Application No. PCT/US2021/031096, mailed on Oct. 13, 2021, 16 pages.
International Search Report and Written Opinion received for PCT Patent Application No. PCT/US2021/031212, mailed on Sep. 21, 2021, 21 pages.
International Search Report and Written Opinion received for PCT Patent Application No. PCT/US2021/031669, mailed on Oct. 13, 2021, 17 pages.

International Search Report and Written Opinion received for PCT Patent Application No. PCT/US2022/026371, mailed on Oct. 12, 2022, 16 pages.
International Search Report and Written Opinion received for PCT Patent Application No. PCT/US2022/029279, mailed on Nov. 9, 2022, 16 pages.
International Search Report and Written Opinion received for PCT Patent Application No. PCT/US2023/011151, mailed on Jul. 5, 2023, 20 pages.
International Search Report and Written Opinion received for PCT Patent Application No. PCT/US2023/031979, mailed on Mar. 12, 2024, 16 pages.
International Search Report and Written Opinion received for PCT Patent Application No. PCT/US2023/032899, mailed on Feb. 26, 2024, 22 pages.
International Search Report and Written Opinion received for PCT Patent Application No. PCT/US2015/034607, mailed on Dec. 1, 2015, 23 pages.
Internet Blog Post, "[PC] Pre-Customization of Black Desert's Characters", Online Available at: <https://blog.naver.com/hsh6051/220209813968>, Dec. 14, 2014, 41 pages.
Inventerium, "Tropical Fish 14", Available online at: https://www.turbosquid.com/3d-models/tropical-fish-3d-model/388510, Feb. 4, 2008, 2 pages.
Invitation to Additional Fees and Partial International Search Report received for PCT Patent Application No. PCT/US2015/034604, mailed on Sep. 4, 2015, 6 pages.
Invitation to Additional Fees and Partial International Search Report received for PCT Patent Application No. PCT/US2015/034606, mailed on Sep. 9, 2015, 6 pages.
Invitation to Pay Additional Fees received for European Patent Application No. 15747595.5, mailed on Feb. 9, 2018, 6 pages.
Invitation to Pay Additional Fees and Partial International Search Report received for PCT Patent Application No. PCT/US2022/029279, mailed on Sep. 15, 2022, 9 pages.
Invitation to Pay Additional Fees and Partial International Search Report received for PCT Patent Application No. PCT/US2023/011151, mailed on May 12, 2023, 13 pages.
Invitation to Pay Additional Fees and Partial International Search Report received for PCT Patent Application No. PCT/US2023/031979, mailed on Jan. 19, 2024, 9 pages.
Invitation to Pay Additional Fees and Partial International Search Report received for PCT Patent Application No. PCT/US2023/032899, mailed on Jan. 3, 2024, 14 pages.
Invitation to Pay Additional Fees received for PCT Patent Application No. PCT/US2015/034607, mailed on Sep. 30, 2015, 4 pages.
Invitation to Pay Additional Fees received for PCT Patent Application No. PCT/US2015/044473, mailed on Nov. 3, 2015, 5 pages.
Invitation to Pay Additional Fees received for PCT Patent Application No. PCT/US2015/044485, mailed on Nov. 3, 2015, 7 pages.
Invitation to Pay Additional Fees received for PCT Patent Application No. PCT/US2015/053353, mailed on Jan. 21, 2016, 7 pages.
Invitation to Pay Additional Fees received for PCT Patent Application No. PCT/US2015/054223, mailed on Mar. 9, 2016, 9 pages.
Invitation to Pay Additional Fees received for PCT Patent Application No. PCT/US2016/035090, mailed on Jul. 15, 2016, 2 pages.
Invitation to Pay Additional Fees received for PCT Patent Application No. PCT/US2017/049795, mailed on Nov. 3, 2017, 3 pages.
Invitation to Pay Additional Fees received for PCT Patent Application No. PCT/US2018/032164, mailed on Aug. 21, 2018, 10 pages.
Invitation to Pay Additional Fees received for PCT Patent Application No. PCT/US2019/023793, mailed on Jul. 5, 2019, 11 pages.
Invitation to Pay Additional Fees received for PCT Patent Application No. PCT/US2019/024067, mailed on Jul. 16, 2019, 13 pages.
Invitation to Pay Additional Fees received for PCT Patent Application No. PCT/US2019/030770, mailed on Jul. 26, 2019, 12 pages.
Invitation to Pay Additional Fees received for PCT Patent Application No. PCT/US2020/030079, mailed on Jul. 14, 2020, 12 pages.
Invitation to Pay Additional Fees received for PCT Patent Application No. PCT/US2020/031536, mailed on Jul. 31, 2020, 9 pages.

(56) References Cited

OTHER PUBLICATIONS

Invitation to Pay Additional Fees received for PCT Patent Application No. PCT/US2020/045814, mailed on Nov. 18, 2020, 11 pages.

Invitation to Pay Additional Fees received for PCT Patent Application No. PCT/US2021/031096, mailed on Aug. 19, 2021, 8 pages.

Invitation to Pay Additional Fees received for PCT Patent Application No. PCT/US2021/031212, mailed on Jul. 28, 2021, 19 pages.

Invitation to Pay Additional Fees received for PCT Patent Application No. PCT/US2021/031669, mailed on Aug. 19, 2021, 9 pages.

Invitation to Pay Additional Fees received for PCT Patent Application No. PCT/US2022/026371, mailed on Aug. 18, 2022, 9 pages.

Invitation to Pay Search Fees received for European Patent Application No. 19724959.2, mailed on Feb. 25, 2020, 3 pages.

Invitation to Pay Search Fees received for European Patent Application No. 20730136.7, mailed on Jul. 1, 2022, 4 pages.

Invitation to Pay Search Fees received for European Patent Application No. 20761084.1, mailed on Dec. 7, 2021, 3 pages.

Jahpizzie, "Brightness on Lock Screen", Online Available at: https://www.reddit.com/r/galaxys10/comments/b4d5fb/brightness_on_lock_screen/, 2019, 1 page.

Jean, "Our Pact Parental Control Review", Available online at: https://www.bewebsmart.com/parental-controls/our-pact-parental-control-review/, Jun. 25, 2016, 25 pages.

Jurick et al., "iPhone Hacks", Tips & Tools for Unlocking the Power of Your iPhone & iPod touch, Online:URL: https://api.pageplace.de/preview/DT0400.9780596550974_A23629666/preview-9780596550974_A23629666.pdf >, Apr. 2009, 49 pages.

Kasai, Yoshino, "Apple Watch Absolute Basics—Season 3—The key is to customize the dial", Mynavi Corporation, Online Available at: https://news.mynavi.jp/article/20171104-apple_watch/, Nov. 4, 2017, 5 pages.

Kenney, Briley, "How to Customize a Smartwatch and other Personalization Questions", Available online at: <https://smartwatches.org/learn/customize-smartwatch/>, Jan. 23, 2014, 3 pages.

"Kidizoom Smartwatch", Available online at <URL: https://www.vtechnl.com/media/downloads/Kidizoom-Smart-Watch.pdf>, Jun. 24, 2014, 23 pages.

Koti, Kotresh, "Colour with Asian Paints.A Mobail App by Android Application—2018", Available Online at <https://www.youtube.com/watch?v=M6EIO7ErYd0&feature=youtu.be&t=81>, May 6, 2018, 2 pages.

Kozak, Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.

Kyoko, Makino, "How to Make a Lookalike Face Icon for Your Friend", ASCII, Japan Weekly, ASCII Media Works Inc., vol. 24, pp. 90-93, Jul. 17, 2014, 7 pages.

Lang, Brian, "How to Audio & Video Chat with Multiple Users at the Same Time in Groups", Snapchat 101, Online Available at: <https://smartphones.gadgethacks.com/how-to/snapchat-101-audio-video-chat-with-multiple-users-same-time-groups-0184113/>, Apr. 17, 2018, 4 pages.

Lee et al., "PASS: Reducing Redundant Notifications between a Smartphone and a Smartwatch for Energy Saving", IEEE Transactions on Mobile Computing, vol. 19, No. 11, Jul. 23, 2019, pp. 2656-2669.

Lein et al., "Patternizer", Available online at: https://patternizer.com/, Apr. 2016, 5 pages.

"Link to Wayback Machine with link to Google Play showing different layouts of complications associated with a clock face", available online at < https://play.google.com/store/apps/details?id=com.levelup.beautifulwidgets.free&hl=da >, Sep. 9, 2013, 6 pages.

"Living Earth", available at: http;//www.livingcarthapp.com/, 2014, 6 pages.

"Looking for a Launcher That Changes the Default Homescreen or Widgets Based on Wifi, Location, or Other Context", Online Available at: https://www.reddit.com/r/androidapps/comments/35lu90/looking_for_a_launcher_that_changes_the_default/, 2015, 2 pages.

Lyons, Kent, "Smartwatch Innovation: Exploring a Watch—First Model", Pervasive Computing, Jan. 2016, pp. 10-13.

Minutes of Oral Proceedings received for European Patent Application No. 15730924.6, mailed on Mar. 13, 2019, 4 pages.

Minutes of Oral Proceedings received for European Patent Application No. 15730925.3, mailed on May 26, 2020, 11 pages.

Minutes of Oral Proceedings received for European Patent Application No. 16762356.0, mailed on Dec. 17, 2021, 5 pages.

Minutes of the Oral Proceedings received for European Patent Application No. 17810723.1, mailed on Dec. 9, 2022, 7 pages.

Minutes of the Oral Proceedings received for European Patent Application No. 19181242.9, mailed on Dec. 15, 2020, 6 pages.

Minutes of the Oral Proceedings received for European Patent Application No. 19204230.7, mailed on Feb. 2, 2022, 9 pages.

Minutes of the Oral Proceedings received for European Patent Application No. 19212057.4, mailed on Jan. 31, 2024, 6 pages.

Minutes of the Oral Proceedings received for European Patent Application No. 19724959.2, mailed on Jun. 14, 2021, 6 pages.

Minutes of the Oral Proceedings received for European Patent Application No. 20172197.4, mailed on Oct. 27, 2023, 7 pages.

Minutes of the Oral Proceedings received for European Patent Application No. 20729346.5, mailed on Jul. 4, 2023, 6 pages.

Mitsuru, Takeuchi, "Face Shape Selection for Automatic Avatar Generation", 13th Annual Conference Proceedings of Virtual Reality Society of Japan tournament Papers [DVD-ROM], The Virtual Reality Society of Japan, Sep. 24, 2008, 7 pages.

"MS Excel 2013", Jan. 29, 2013, 2 pages.

My Mate Vince, "Setting up the Fitbit Alta HR Activity Tracker on Apple iOS", Online available at: <https://youtu.be/FdwRF4lfvFc>, Jun. 18, 2017, 3 pages.

Nerdtalk, "The Best Android Clock Widgets", available at: https://www.youtube.com/watch?v=E1bAprWByfU, Apr. 25, 2011, 1 page.

Neurotechnology, "Sentimask SDK", Available at: https://www.neurotechnology.com/sentimask.html, Apr. 22, 2018, 5 pages.

"New, but unsigned—Easy StopWatch for Symbian", XP55393563, Available online at <http://www.allaboutsymbian.com/flow/item/19490_New_but_unsigned-Easy_StopWatc.php>, Mar. 15, 2014, 15 pages.

"Night Display (Alarm Clock) App", Google Play Store Night Display (Alarm Clock) Description page, available at <https://web.archive.org/web/20141007124222/https://play.google.com/store/apps/details?id=com.srk.nighttimedisplay&hl=en>, Oct. 7, 2014, pp. 1-3.

Noh et al., "Expression Cloning", Proceedings of the 28th annual conference on Computer Graphics and Interactive Techniques, ACM SIGGRAPH, Los Angeles, CA, USA, Aug. 12-17, 2001, 12 pages.

Non-Final Office Action received for U.S. Appl. No. 14/815,890, mailed on Jun. 6, 2017, 19 pages.

Non-Final Office Action received for U.S. Appl. No. 14/815,890, mailed on Oct. 19, 2015, 5 pages.

Non-Final Office Action received for U.S. Appl. No. 15/881,544, mailed on Jun. 7, 2018, 15 pages.

Non-Final Office Action received for U.S. Appl. No. 15/421,865, mailed on Mar. 21, 2019, 18 pages.

Non-Final Office Action received for U.S. Appl. No. 15/554,204, mailed on Apr. 17, 2019, 19 pages.

Non-Final Office Action received for U.S. Appl. No. 13/082,035, mailed on Apr. 21, 2016, 25 pages.

Non-Final Office Action received for U.S. Appl. No. 13/082,035, mailed on Dec. 19, 2012, 19 pages.

Non-Final Office Action received for U.S. Appl. No. 13/082,035, mailed on Sep. 11, 2014, 23 pages.

Non-Final Office Action received for U.S. Appl. No. 14/815,879, mailed on Dec. 15, 2016, 33 pages.

Non-Final Office Action received for U.S. Appl. No. 14/815,890, mailed on Dec. 18, 2018, 21 pages.

Non-Final Office Action received for U.S. Appl. No. 14/821,667, mailed on Feb. 4, 2019, 13 pages.

Non-Final Office Action received for U.S. Appl. No. 14/821,667, mailed on Jul. 14, 2017, 12 pages.

Non-Final Office Action received for U.S. Appl. No. 14/839,889, mailed on Mar. 7, 2017, 26 pages.

(56) References Cited

OTHER PUBLICATIONS

Non-Final Office Action received for U.S. Appl. No. 14/841,606, mailed on Dec. 7, 2017, 30 pages.

Non-Final Office Action received for U.S. Appl. No. 14/841,606, mailed on May 8, 2019, 28 pages.

Non-Final Office Action received for U.S. Appl. No. 14/846,511 mailed on Jan. 7, 2020, 25 pages.

Non-Final Office Action received for U.S. Appl. No. 14/846,511 mailed on Oct. 27, 2017, 15 pages.

Non-Final Office Action received for U.S. Appl. No. 14/866,560, mailed on Apr. 19, 2018, 10 pages.

Non-Final Office Action received for U.S. Appl. No. 14/866,560, mailed on Apr. 30, 2019, 23 pages.

Non-Final Office Action received for U.S. Appl. No. 15/183,663, mailed on Jul. 9, 2018, 13 pages.

Non-Final Office Action received for U.S. Appl. No. 15/355,956, mailed on May 31, 2019, 32 pages.

Non-Final Office Action received for U.S. Appl. No. 15/405,122, mailed on Apr. 2, 2021, 35 pages.

Non-Final Office Action received for U.S. Appl. No. 15/405,122, mailed on May 31, 2019, 43 pages.

Non-Final Office Action received for U.S. Appl. No. 15/405,122, mailed on Sep. 24, 2020, 30 pages.

Non-Final Office Action received for U.S. Appl. No. 15/421,865, mailed on Dec. 29, 2021, 23 pages.

Non-Final Office Action received for U.S. Appl. No. 15/421,865, mailed on Jul. 11, 2023, 32 pages.

Non-Final Office Action received for U.S. Appl. No. 15/421,865, mailed on Oct. 7, 2020, 20 pages.

Non-Final Office Action received for U.S. Appl. No. 15/798,235, mailed on Apr. 24, 2019, 25 pages.

Non-Final Office Action received for U.S. Appl. No. 15/798,235, mailed on Mar. 14, 2018, 58 pages.

Non-Final Office Action received for U.S. Appl. No. 16/116,221, mailed on Nov. 13, 2018, 27 pages.

Non-Final Office Action received for U.S. Appl. No. 16/142,288, mailed on Nov. 20, 2018, 15 pages.

Non-Final Office Action received for U.S. Appl. No. 16/142,305, mailed on Nov. 23, 2018, 32 pages.

Non-Final Office Action received for U.S. Appl. No. 16/142,328, mailed on Nov. 8, 2018, 18 pages.

Non-Final Office Action received for U.S. Appl. No. 16/143,097, mailed on Feb. 28, 2019, 17 pages.

Non-Final Office Action received for U.S. Appl. No. 16/259,771, mailed on Jan. 25, 2022, 20 pages.

Non-Final Office Action received for U.S. Appl. No. 16/259,771, mailed on May 8, 2019, 11 pages.

Non-Final Office Action received for U.S. Appl. No. 16/389,722, mailed on Apr. 3, 2020, 15 pages.

Non-Final Office Action received for U.S. Appl. No. 16/389,722, mailed on Jul. 7, 2022, 16 pages.

Non-Final Office Action received for U.S. Appl. No. 16/389,722, mailed on Jun. 3, 2021, 17 pages.

Non-Final Office Action received for U.S. Appl. No. 16/401,934, mailed on Dec. 11, 2020, 26 pages.

Non-Final Office Action received for U.S. Appl. No. 16/418,786, mailed on Apr. 24, 2020, 16 pages.

Non-Final Office Action received for U.S. Appl. No. 16/418,786, mailed on Aug. 1, 2022, 18 pages.

Non-Final Office Action received for U.S. Appl. No. 16/418,786, mailed on Mar. 28, 2022, 14 pages.

Non-Final Office Action received for U.S. Appl. No. 16/418,786, mailed on Oct. 4, 2021, 10 pages.

Non-Final Office Action received for U.S. Appl. No. 16/519,850, mailed on Mar. 23, 2020, 8 pages.

Non-Final Office Action received for U.S. Appl. No. 16/582,020, mailed on Apr. 5, 2021, 29 pages.

Non-Final Office Action received for U.S. Appl. No. 16/582,020, mailed on Jan. 13, 2020, 39 pages.

Non-Final Office Action received for U.S. Appl. No. 16/584,281, mailed on Dec. 10, 2019, 23 pages.

Non-Final Office Action received for U.S. Appl. No. 16/584,445, mailed on Dec. 26, 2019, 19 pages.

Non-Final Office Action received for U.S. Appl. No. 16/585,399, mailed on Jan. 23, 2020, 28 pages.

Non-Final Office Action received for U.S. Appl. No. 16/585,714, mailed on Apr. 16, 2020, 18 pages.

Non-Final Office Action received for U.S. Appl. No. 16/585,721, mailed on Dec. 27, 2019, 25 pages.

Non-Final Office Action received for U.S. Appl. No. 16/599,433, mailed on Jan. 28, 2021, 16 pages.

Non-Final Office Action received for U.S. Appl. No. 16/659,507, mailed on Oct. 7, 2020, 16 pages.

Non-Final Office Action received for U.S. Appl. No. 16/663,062, mailed on Oct. 28, 2020, 14 pages.

Non-Final Office Action received for U.S. Appl. No. 16/833,436, mailed on Mar. 29, 2021, 27 pages.

Non-Final Office Action received for U.S. Appl. No. 16/861,651, mailed on Nov. 27, 2020, 11 pages.

Non-Final Office Action received for U.S. Appl. No. 16/861,651, mailed on Sep. 30, 2021, 16 pages.

Non-Final Office Action received for U.S. Appl. No. 16/935,002, mailed on Jun. 25, 2021, 20 pages.

Non-Final Office Action received for U.S. Appl. No. 16/943,737, mailed on Jun. 25, 2021, 18 pages.

Non-Final Office Action received for U.S. Appl. No. 16/943,737, mailed on Mar. 28, 2023, 28 pages.

Non-Final Office Action received for U.S. Appl. No. 16/997,588, mailed on Dec. 14, 2020, 21 pages.

Non-Final Office Action received for U.S. Appl. No. 17/031,654, mailed on Nov. 19, 2020, 12 pages.

Non-Final Office Action received for U.S. Appl. No. 17/031,671, mailed on Apr. 1, 2022, 32 pages.

Non-Final Office Action received for U.S. Appl. No. 17/031,671, mailed on Apr. 30, 2021, 27 pages.

Non-Final Office Action received for U.S. Appl. No. 17/031,671, mailed on Mar. 17, 2023, 34 pages.

Non-Final Office Action received for U.S. Appl. No. 17/031,765, mailed on Jun. 28, 2021, 32 pages.

Non-Final Office Action received for U.S. Appl. No. 17/031,765, mailed on Mar. 28,2023, 31 pages.

Non-Final Office Action received for U.S. Appl. No. 17/031,765, mailed on Mar. 29, 2022, 33 pages.

Non-Final Office Action received for U.S. Appl. No. 17/041,350, mailed on Jun. 10, 2021, 24 pages.

Non-Final Office Action received for U.S. Appl. No. 17/068,386, mailed on Jan. 30, 2023, 20 pages.

Non-Final Office Action received for U.S. Appl. No. 17/068,386, mailed on Jul. 15, 2021, 16 pages.

Non-Final Office Action received for U.S. Appl. No. 17/068,386, mailed on Oct. 28, 2021, 20 pages.

Non-Final Office Action received for U.S. Appl. No. 17/091,460, mailed on Sep. 10, 2021, 10 pages.

Non-Final Office Action received for U.S. Appl. No. 17/093,408, mailed on Dec. 8, 2021, 37 pages.

Non-Final Office Action received for U.S. Appl. No. 17/093,408, mailed on Sep. 14, 2022, 46 pages.

Non-Final Office Action received for U.S. Appl. No. 17/158,936, mailed on Nov. 30, 2022, 17 pages.

Non-Final Office Action received for U.S. Appl. No. 17/317,042, mailed on Nov. 10, 2021, 13 pages.

Non-Final Office Action received for U.S. Appl. No. 17/341,839, mailed on Mar. 17, 2022, 14 pages.

Non-Final Office Action received for U.S. Appl. No. 17/370,505, mailed on Jul. 6, 2022, 14 pages.

Non-Final Office Action received for U.S. Appl. No. 17/373,163, mailed on Jan. 27, 2022, 14 pages.

Non-Final Office Action received for U.S. Appl. No. 17/461,014, mailed on Dec. 7, 2022, 22 pages.

Non-Final Office Action received for U.S. Appl. No. 17/546,630, mailed on Mar. 30, 2023, 41 pages.

(56)　　　　References Cited

OTHER PUBLICATIONS

Non-Final Office Action received for U.S. Appl. No. 17/556,165, mailed on Sep. 7, 2022, 15 pages.
Non-Final Office Action received for U.S. Appl. No. 17/591,184, mailed on Apr. 21, 2023, 15 pages.
Non-Final Office Action received for U.S. Appl. No. 17/591,184, mailed on Aug. 4, 2022, 18 pages.
Non-Final Office Action received for U.S. Appl. No. 17/681,584, mailed on Jan. 18, 2023, 12 pages.
Non-Final Office Action received for U.S. Appl. No. 17/713,005, mailed on Jan. 19, 2024, 17 pages.
Non-Final Office Action received for U.S. Appl. No. 17/713,016, mailed on Oct. 27, 2022, 25 pages.
Non-Final Office Action received for U.S. Appl. No. 17/717,275, mailed on Jul. 3, 2023, 10 pages.
Non-Final Office Action received for U.S. Appl. No. 17/738,940, mailed on Dec. 22, 2022, 31 pages.
Non-Final Office Action received for U.S. Appl. No. 17/746,807, mailed on Feb. 2, 2023, 14 pages.
Non-Final Office Action received for U.S. Appl. No. 17/746,807, mailed on Jul. 20, 2023, 14 pages.
Non-Final Office Action received for U.S. Appl. No. 17/947,530, mailed on Mar. 31, 2023, 14 pages.
Non-Final Office Action received for U.S. Appl. No. 17/948,578, mailed on Feb. 2, 2023, 13 pages.
Non-Final Office Action received for U.S. Appl. No. 17/949,081, mailed on Feb. 27, 2023, 19 pages.
Non-Final Office Action received for U.S. Appl. No. 18/138,634, mailed on Jan. 16, 2024, 14 pages.
Non-Final Office Action received for U.S. Appl. No. 18/196,345, mailed on Jan. 23, 2024, 17 pages.
Non-Final Office Action received for U.S. Appl. No. 18/197,242, mailed on Dec. 7, 2023, 24 pages.
Non-Final Office Action received for U.S. Appl. No. 18/241,802, mailed on May 17, 2024, 57 pages.
Non-Final Office Action received for U.S. Appl. No. 14/846,511, mailed on Nov. 30, 2018, 22 pages.
Non-Final Office Action received for U.S. Appl. No. 14/815,879, mailed on Nov. 6, 2015, 35 pages.
Non-Final Office Action received for U.S. Appl. No. 14/815,898, mailed on Dec. 1, 2015, 22 pages.
Non-Final Office Action received for U.S. Appl. No. 14/815,907, mailed on Jan. 12, 2016, 22 pages.
Non-Final Office Action received for U.S. Appl. No. 14/815,909, mailed on Nov. 27, 2015, 12 pages.
Non-Final Office Action received for U.S. Appl. No. 17/078,896, mailed on Dec. 24, 2021, 17 pages.
Notice of Acceptance received for Australian Patent Application No. 2015298710, mailed on Oct. 8, 2019, 3 pages.
Notice of Acceptance received for Australian Patent Application No. 2016229847, mailed on Sep. 12, 2018, 3 pages.
Notice of Acceptance received for Australian Patent Application No. 2017277813, mailed on Jun. 16, 2020, 3 pages.
Notice of Acceptance received for Australian Patent Application No. 2017330212, mailed on Apr. 28, 2020, 3 pages.
Notice of Acceptance received for Australian Patent Application No. 2018201089, mailed on May 28, 2021, 3 pages.
Notice of Acceptance received for Australian Patent Application No. 2018279037, mailed on May 13, 2020, 3 pages.
Notice of Acceptance received for Australian Patent Application No. 2019208225, mailed on Jan. 21, 2021, 3 pages.
Notice of Acceptance received for Australian Patent Application No. 2019265357, mailed on Dec. 24, 2020, 3 pages.
Notice of Acceptance received for Australian Patent Application No. 2019266049, mailed on Nov. 24, 2020, 3 pages.
Notice of Acceptance received for Australian Patent Application No. 2019267413, mailed on Nov. 23, 2021, 3 pages.
Notice of Acceptance received for Australian Patent Application No. 2020204506, mailed on Apr. 8, 2021, 3 pages.

Notice of Acceptance received for Australian Patent Application No. 2020213402, mailed on Sep. 21, 2020, 3 pages.
Notice of Acceptance received for Australian Patent Application No. 2020239670, mailed on Jul. 2, 2021, 3 pages.
Notice of Acceptance received for Australian Patent Application No. 2020239749, mailed on May 27, 2022, 3 pages.
Notice of Acceptance received for Australian Patent Application No. 2020239774, mailed on Jan. 5, 2022, 3 pages.
Notice of Acceptance received for Australian Patent Application No. 2020250323, mailed on Feb. 28, 2022, 3 pages.
Notice of Acceptance received for Australian Patent Application No. 2020269232, mailed on Dec. 16, 2021, 3 pages.
Notice of Acceptance received for Australian Patent Application No. 2020294208, mailed on Mar. 2, 2022, 3 pages.
Notice of Acceptance received for Australian Patent Application No. 2020309093, mailed on Jul. 8, 2021, 3 pages.
Notice of Acceptance received for Australian Patent Application No. 2021201295, mailed on May 10, 2022, 3 pages.
Notice of Acceptance received for Australian Patent Application No. 2021202254, mailed on Nov. 16, 2022, 3 pages.
Notice of Acceptance received for Australian Patent Application No. 2021202797, mailed on May 9, 2022, 3 pages.
Notice of Acceptance received for Australian Patent Application No. 2021202834, mailed on Jul. 15, 2021, 3 pages.
Notice of Acceptance received for Australian Patent Application No. 2021202836, mailed on Jun. 25, 2021, 3 pages.
Notice of Acceptance received for Australian Patent Application No. 2021203216, mailed on Jul. 26, 2022, 3 pages.
Notice of Acceptance received for Australian Patent Application No. 2021245228, mailed on Oct. 4, 2022, 3 pages.
Notice of Acceptance received for Australian Patent Application No. 2021250863, mailed on Jan. 13, 2023, 3 pages.
Notice of Acceptance received for Australian Patent Application No. 2022200965, mailed on May 11, 2023, 3 pages.
Notice of Acceptance received for Australian Patent Application No. 2022201419, mailed on May 31, 2023, 3 pages.
Notice of Acceptance received for Australian Patent Application No. 2022202292, mailed on Jul. 6, 2022, 3 pages.
Notice of Acceptance received for Australian Patent Application No. 2022202583, mailed on Aug. 7, 2023, 3 pages.
Notice of Acceptance received for Australian Patent Application No. 2022203957, mailed on Sep. 27, 2023, 3 pages.
Notice of Acceptance received for Australian Patent Application No. 2022215297, mailed on Sep. 26, 2022, 3 pages.
Notice of Acceptance received for Australian Patent Application No. 2022218607, mailed on Mar. 7, 2024, 3 pages.
Notice of Acceptance received for Australian Patent Application No. 2022220279, mailed on Sep. 27, 2022, 3 pages.
Notice of Acceptance received for Australian Patent Application No. 2022235622, mailed on Sep. 13, 2023, 3 pages.
Notice of Acceptance received for Australian Patent Application No. 2022235634, mailed on Nov. 2, 2023, 3 pages.
Notice of Acceptance received for Australian Patent Application No. 2023200039, mailed on Aug. 31, 2023, 3 pages.
Notice of Acceptance received for Australian Patent Application No. 2023201250, mailed on Nov. 21, 2023, 3 pages.
Notice of Acceptance received for Australian Patent Application No. 2023201920, mailed on Feb. 9, 2024, 3 pages.
Notice of Allowance received for Chinese Patent Application No. 201510479088.4, mailed on Jan. 21, 2021, 2 pages.
Notice of Allowance received for Chinese Patent Application No. 201510481525.6, mailed on May 27, 2019, 2 pages.
Notice of Allowance received for Chinese Patent Application No. 201510483268.X, mailed on Nov. 6, 2019, 2 pages.
Notice of Allowance received for Chinese Patent Application No. 201510483305.7, mailed on Jan. 8, 2019, 3 pages.
Notice of Allowance received for Chinese Patent Application No. 201510484514.3, mailed on Jun. 6, 2019, 2 pages.
Notice of Allowance received for Chinese Patent Application No. 201520594249.X, mailed on Jul. 12, 2016, 4 pages.
Notice of Allowance received for Chinese Patent Application No. 201680013193.1, mailed on May 7, 2021, 5 pages.

(56)　　　　　　References Cited

OTHER PUBLICATIONS

Notice of Allowance received for Chinese Patent Application No. 201680047983.1, mailed on Apr. 28, 2021, 3 pages.

Notice of Allowance received for Chinese Patent Application No. 201780033973.7, mailed on Jul. 7, 2021, 5 pages.

Notice of Allowance received for Chinese Patent Application No. 201780058426.4, mailed on Jun. 30, 2023, 2 pages.

Notice of Allowance received for Chinese Patent Application No. 201810037665.8, mailed on Jul. 9, 2019, 4 pages.

Notice of Allowance received for Chinese Patent Application No. 201910315328.5, mailed on Aug. 24, 2022, 4 pages.

Notice of Allowance received for Chinese Patent Application No. 201910379481.4, mailed on Nov. 9, 2020, 6 pages.

Notice of Allowance received for Chinese Patent Application No. 201910692978.1, mailed on Feb. 4, 2021, 6 pages.

Notice of Allowance received for Chinese Patent Application No. 201910906898.1, mailed on Oct. 28, 2021, 4 pages.

Notice of Allowance received for Chinese Patent Application No. 201910924197.0, mailed on Apr. 5, 2023, 3 pages.

Notice of Allowance received for Chinese Patent Application No. 201911202668.3, mailed on Feb. 4, 2021, 5 pages.

Notice of Allowance received for Chinese Patent Application No. 201911219525.3, mailed on Sep. 29, 2020, 2 pages.

Notice of Allowance received for Chinese Patent Application No. 202110194015.6, mailed on Mar. 9, 2022, 6 pages.

Notice of Allowance received for Chinese Patent Application No. 202110454541.1, mailed on May 31, 2022, 6 pages.

Notice of Allowance received for Chinese Patent Application No. 202110820692.4, mailed on Nov. 16, 2022, 2 pages.

Notice of Allowance received for Chinese Patent Application No. 202111457936.3, mailed on Nov. 7, 2022, 4 pages.

Notice of Allowance received for Chinese Patent Application No. 202211612876.2, mailed on Oct. 30, 2023, 4 pages.

Notice of Allowance received for Chinese Patent Application No. 202310124087.2, mailed on Jan. 25, 2024, 4 pages.

Notice of Allowance received for Danish Patent Application No. PA201570495, mailed on Feb. 22, 2017, 1 page.

Notice of Allowance received for Danish Patent Application No. PA201570496, mailed on Apr. 18, 2016, 2 pages.

Notice of Allowance received for Danish Patent Application No. PA202070623, mailed on Sep. 20, 2022, 2 pages.

Notice of Allowance received for Japanese Patent Application No. 2017-505450, mailed on Mar. 9, 2018, 10 pages.

Notice of Allowance received for Japanese Patent Application No. 2017-505842, mailed on Mar. 16, 2020, 4 pages.

Notice of Allowance received for Japanese Patent Application No. 2017-505847, mailed on May 20, 2019, 4 pages.

Notice of Allowance received for Japanese Patent Application No. 2017-545918, mailed on Jul. 22, 2019, 4 pages.

Notice of Allowance received for Japanese Patent Application No. 2018-074971, mailed on Apr. 23, 2019, 4 pages.

Notice of Allowance received for Japanese Patent Application No. 2018-184254, mailed on Jun. 15, 2020, 5 pages.

Notice of Allowance received for Japanese Patent Application No. 2018-537840, mailed on Mar. 19, 2020, 4 pages.

Notice of Allowance received for Japanese Patent Application No. 2019-096219, mailed on Jun. 26, 2020, 4 pages.

Notice of Allowance received for Japanese Patent Application No. 2019-151358, mailed on Jan. 22, 2021, 4 pages.

Notice of Allowance received for Japanese Patent Application No. 2019-215503, mailed on Aug. 26, 2022, 3 pages.

Notice of Allowance received for Japanese Patent Application No. 2019-511767, mailed on Mar. 30, 2020, 4 pages.

Notice of Allowance received for Japanese Patent Application No. 2020-074878, mailed on May 28, 2021, 4 pages.

Notice of Allowance received for Japanese Patent Application No. 2020-120086, mailed on Nov. 15, 2021, 5 pages.

Notice of Allowance received for Japanese Patent Application No. 2020-124605, mailed on Dec. 5, 2022, 4 pages.

Notice of Allowance received for Japanese Patent Application No. 2020-159823, mailed on Jul. 24, 2023, 23 pages.

Notice of Allowance received for Japanese Patent Application No. 2020-159825, mailed on Mar. 25, 2022, 5 pages.

Notice of Allowance received for Japanese Patent Application No. 2020-551465, mailed on Jun. 28, 2021, 4 pages.

Notice of Allowance received for Japanese Patent Application No. 2020-562622, mailed on Aug. 26, 2022, 4 pages.

Notice of Allowance received for Japanese Patent Application No. 2021-023661, mailed on Apr. 10, 2023, 4 pages.

Notice of Allowance received for Japanese Patent Application No. 2021-092483, mailed on Sep. 30, 2022, 4 pages.

Notice of Allowance received for Japanese Patent Application No. 2021-105941, mailed on Jul. 4, 2022, 4 pages.

Notice of Allowance received for Japanese Patent Application No. 2021-122610, mailed on Aug. 5, 2022, 4 pages.

Notice of Allowance received for Japanese Patent Application No. 2021-153573, mailed on Feb. 17, 2023, 4 pages.

Notice of Allowance received for Japanese Patent Application No. 2021-565837, mailed on May 16, 2022, 4 pages.

Notice of Allowance received for Japanese Patent Application No. 2022-096730, mailed on Jun. 5, 2023, 4 pages.

Notice of Allowance received for Japanese Patent Application No. 2022-124069, mailed on May 20, 2024, 4 pages.

Notice of Allowance received for Japanese Patent Application No. 2022-139320, mailed on Jan. 6, 2023, 4 pages.

Notice of Allowance received for Japanese Patent Application No. 2022-152693, mailed on Feb. 5, 2024, 4 pages.

Notice of Allowance received for Japanese Patent Application No. 2022-512865, mailed on Oct. 3, 2022, 4 pages.

Notice of Allowance received for Korean Patent Application No. 10-2017-7005939, mailed on Mar. 30, 2018, 5 pages.

Notice of Allowance received for Korean Patent Application No. 10-2018-7018904, mailed on Jun. 26, 2020, 4 pages.

Notice of Allowance received for Korean Patent Application No. 10-2018-7022101, mailed on Oct. 14, 2019, 4 pages.

Notice of Allowance received for Korean Patent Application No. 10-2019-7005369, mailed on Oct. 26, 2020, 4 pages.

Notice of Allowance received for Korean Patent Application No. 10-2019-7029673, mailed on Aug. 3, 2021, 3 pages.

Notice of Allowance received for Korean Patent Application No. 10-2020-0123852, mailed on Mar. 9, 2023, 7 pages.

Notice of Allowance received for Korean Patent Application No. 10-2020-0123852, mailed on Nov. 28, 2022, 7 pages.

Notice of Allowance received for Korean Patent Application No. 10-2020-0123857, mailed on Feb. 21, 2023, 6 pages.

Notice of Allowance received for Korean Patent Application No. 10-2020-0123887, mailed on Nov. 28, 2022, 7 pages.

Notice of Allowance received for Korean Patent Application No. 10-2020-7001340, mailed on May 10, 2021, 5 pages.

Notice of Allowance received for Korean Patent Application No. 10-2020-7026036, mailed on Jul. 26, 2021, 4 pages.

Notice of Allowance received for Korean Patent Application No. 10-2020-7028759, mailed on Oct. 19, 2021, 4 pages.

Notice of Allowance received for Korean Patent Application No. 10-2020-7031855, mailed on Mar. 22,2021, 5 pages.

Notice of Allowance received for Korean Patent Application No. 10-2020-7032147, mailed on May 12, 2021, 5 pages.

Notice of Allowance received for Korean Patent Application No. 10-2021-7002597, mailed on Feb. 25, 2021, 5 pages.

Notice of Allowance received for Korean Patent Application No. 10-2021-7013453, mailed on Aug. 11, 2021, 5 pages.

Notice of Allowance received for Korean Patent Application No. 10-2021-7013454, mailed on Aug. 12, 2021, 4 pages.

Notice of Allowance received for Korean Patent Application No. 10-2021-7019525, mailed on Jul. 13, 2021, 5 pages.

Notice of Allowance received for Korean Patent Application No. 10-2021-7023617, mailed on Dec. 21, 2021, 6 pages.

Notice of Allowance received for Korean Patent Application No. 10-2021-7025301, mailed on Mar. 16, 2022, 4 pages.

Notice of Allowance received for Korean Patent Application No. 10-2021-7034748, mailed on Jan. 27, 2022, 6 pages.

(56)          References Cited

OTHER PUBLICATIONS

Notice of Allowance received for Korean Patent Application No. 10-2021-7036016, mailed on Sep. 28, 2022, 7 pages.
Notice of Allowance received for Korean Patent Application No. 10-2021-7036246, mailed on Mar. 2, 2022, 5 pages.
Notice of Allowance received for Korean Patent Application No. 10-2021-7036678, mailed on Mar. 7, 2022, 5 pages.
Notice of Allowance received for Korean Patent Application No. 10-2022-7001721, mailed on Feb. 28, 2022, 5 pages.
Notice of Allowance received for Korean Patent Application No. 10-2022-7002829, mailed on Feb. 12, 2022, 6 pages.
Notice of Allowance received for Korean Patent Application No. 10-2022-7003364, mailed on Jul. 28, 2023, 7 pages.
Notice of Allowance received for Korean Patent Application No. 10-2022-7009437, mailed on Jun. 22, 2023, 7 pages.
Notice of Allowance received for Korean Patent Application No. 10-2022-7014529, mailed on Dec. 13, 2022, 8 pages.
Notice of Allowance received for Korean Patent Application No. 10-2022-7016421, mailed on May 25, 2022, 6 pages.
Notice of Allowance received for Korean Patent Application No. 10-2022-7019034, mailed on Feb. 1, 2024, 7 pages.
Notice of Allowance received for Korean Patent Application No. 10-2022-7019205, mailed on Jan. 5, 2023, 8 pages.
Notice of Allowance received for Korean Patent Application No. 10-2022-7029729, mailed on Nov. 9, 2023, 8 pages.
Notice of Allowance received for Korean Patent Application No. 10-2022-7044515, mailed on Feb. 19, 2024, 7 pages.
Notice of Allowance received for Korean Patent Application No. 10-2023-0064928, mailed on Sep. 22, 2023, 7 pages.
Notice of Allowance received for Korean Patent Application No. 10-2023-7033642, mailed on Apr. 18, 2024, 7 pages.
Notice of Allowance received for Taiwanese Patent Application No. 104124962, mailed on Jul. 27, 2017, 3 pages.
Notice of Allowance received for Taiwanese Patent Application No. 104124963, mailed on Sep. 28, 2017, 5 pages.
Notice of Allowance received for Taiwanese Patent Application No. 104124995, mailed on Jul. 27, 2017, 3 pages.
Notice of Allowance received for Taiwanese Patent Application No. 104124997, mailed on Jun. 16, 2017, 5 pages.
Notice of Allowance received for Taiwanese Patent Application No. 104124998, mailed on Mar. 31, 2017, 3 pages.
Notice of Allowance received for Taiwanese Patent Application No. 104134740, mailed on Dec. 8, 2016, 5 pages.
Notice of Allowance received for U.S. Appl. No. 13/082,035, mailed on Oct. 5, 2016, 9 pages.
Notice of Allowance received for U.S. Appl. No. 14/815,879, mailed on Jun. 26, 2017, 8 pages.
Notice of Allowance received for U.S. Appl. No. 14/815,890, mailed on Feb. 12, 2021, 8 pages.
Notice of Allowance received for U.S. Appl. No. 14/815,898, mailed on Dec. 5, 2016, 3 pages.
Notice of Allowance received for U.S. Appl. No. 14/815,898, mailed on Oct. 24, 2016, 14 pages.
Notice of Allowance received for U.S. Appl. No. 14/815,907, mailed on Jul. 28, 2016, 9 pages.
Notice of Allowance received for U.S. Appl. No. 14/815,907, mailed on Nov. 30, 2016, 2 pages.
Notice of Allowance received for U.S. Appl. No. 14/815,909, mailed on Jun. 9, 2016, 3 pages.
Notice of Allowance received for U.S. Appl. No. 14/815,909, mailed on May 3, 2016, 12 pages.
Notice of Allowance received for U.S. Appl. No. 14/815,909, mailed on May 20, 2016, 2 pages.
Notice of Allowance received for U.S. Appl. No. 14/815,909, mailed on Sep. 6, 2016, 2 pages.
Notice of Allowance received for U.S. Appl. No. 14/821,667, mailed on Jun. 12, 2019, 9 pages.
Notice of Allowance received for U.S. Appl. No. 14/839,889, mailed on Oct. 30, 2017, 16 pages.
Notice of Allowance received for U.S. Appl. No. 14/866,560, mailed on Nov. 15, 2019, 9 pages.
Notice of Allowance received for U.S. Appl. No. 15/183,663, mailed on Jan. 17, 2019, 6 pages.
Notice of Allowance received for U.S. Appl. No. 15/355,956, mailed on Nov. 22, 2019, 29 pages.
Notice of Allowance received for U.S. Appl. No. 15/421,865, mailed on Apr. 15, 2024, 12 pages.
Notice of Allowance received for U.S. Appl. No. 15/554,204, mailed on Jul. 13, 2020, 10 pages.
Notice of Allowance received for U.S. Appl. No. 15/713,490, mailed on Mar. 20, 2019, 15 pages.
Notice of Allowance received for U.S. Appl. No. 15/798,235, mailed on Apr. 1, 2020, 8 pages.
Notice of Allowance received for U.S. Appl. No. 15/798,235, mailed on Sep. 22, 2020, 8 pages.
Notice of Allowance received for U.S. Appl. No. 15/798,257, mailed on May 22, 2019, 14 pages.
Notice of Allowance received for U.S. Appl. No. 15/881,544, mailed on Jun. 26, 2019, 6 pages.
Notice of Allowance received for U.S. Appl. No. 15/881,544, mailed on Nov. 7, 2019, 5 pages.
Notice of Allowance received for U.S. Appl. No. 16/110,514, mailed on Apr. 29, 2019, 9 pages.
Notice of Allowance received for U.S. Appl. No. 16/110,514, mailed on Mar. 13, 2019, 11 pages.
Notice of Allowance received for U.S. Appl. No. 16/116,221, mailed on Nov. 22, 2019, 13 pages.
Notice of Allowance received for U.S. Appl. No. 16/116,221, mailed on Sep. 20, 2019, 13 pages.
Notice of Allowance received for U.S. Appl. No. 16/142,288, mailed on Jun. 24, 2019, 10 pages.
Notice of Allowance received for U.S. Appl. No. 16/142,288, mailed on Mar. 27, 2019, 9 pages.
Notice of Allowance received for U.S. Appl. No. 16/142,288, mailed on May 1, 2019, 4 pages.
Notice of Allowance received for U.S. Appl. No. 16/142,305, mailed on Apr. 3, 2019, 5 pages.
Notice of Allowance received for U.S. Appl. No. 16/142,305, mailed on May 1, 2019, 2 pages.
Notice of Allowance received for U.S. Appl. No. 16/142,328, mailed on Apr. 5, 2019, 7 pages.
Notice of Allowance received for U.S. Appl. No. 16/143,097, mailed on Aug. 29, 2019, 23 pages.
Notice of Allowance received for U.S. Appl. No. 16/143,201, mailed on Feb. 8, 2019, 9 pages.
Notice of Allowance received for U.S. Appl. No. 16/143,201, mailed on Nov. 28, 2018, 14 pages.
Notice of Allowance received for U.S. Appl. No. 16/401,934, mailed on Feb. 2, 2022, 8 pages.
Notice of Allowance received for U.S. Appl. No. 16/401,934, mailed on Nov. 1, 2021, 11 pages.
Notice of Allowance received for U.S. Appl. No. 16/418,786, mailed on Dec. 9, 2021, 9 pages.
Notice of Allowance received for U.S. Appl. No. 16/418,786, mailed on Jun. 14, 2022, 9 pages.
Notice of Allowance received for U.S. Appl. No. 16/418,786, mailed on Nov. 22, 2022, 6 pages.
Notice of Allowance received for U.S. Appl. No. 16/519,850, mailed on Aug. 26, 2020, 8 pages.
Notice of Allowance received for U.S. Appl. No. 16/582,020, mailed on Jul. 27, 2021, 29 pages.
Notice of Allowance received for U.S. Appl. No. 16/584,281, mailed on Nov. 18, 2020, 8 pages.
Notice of Allowance received for U.S. Appl. No. 16/584,281, mailed on Sep. 29, 2020, 5 pages.
Notice of Allowance received for U.S. Appl. No. 16/584,445, mailed on Apr. 17, 2020, 9 pages.
Notice of Allowance received for U.S. Appl. No. 16/584,445, mailed on Jul. 23, 2020, 8 pages.
Notice of Allowance received for U.S. Appl. No. 16/584,445, mailed on Jun. 24, 2020, 5 pages.

(56) References Cited

OTHER PUBLICATIONS

Notice of Allowance received for U.S. Appl. No. 16/584,445, mailed on May 29, 2020, 5 pages.

Notice of Allowance received for U.S. Appl. No. 16/584,445, mailed on Oct. 21, 2020, 6 pages.

Notice of Allowance received for U.S. Appl. No. 16/585,366, mailed on Jan. 2, 2020, 6 pages.

Notice of Allowance received for U.S. Appl. No. 16/585,399, mailed on Jul. 21, 2020, 9 pages.

Notice of Allowance received for U.S. Appl. No. 16/585,714, mailed on Jan. 8, 2021, 8 pages.

Notice of Allowance received for U.S. Appl. No. 16/585,714, mailed on Jan. 27, 2021, 2 pages.

Notice of Allowance received for U.S. Appl. No. 16/585,714, mailed on Sep. 25, 2020, 15 pages.

Notice of Allowance received for U.S. Appl. No. 16/585,721, mailed on Oct. 30, 2020, 9 pages.

Notice of Allowance received for U.S. Appl. No. 16/585,721, mailed on Sep. 30, 2020, 15 pages.

Notice of Allowance received for U.S. Appl. No. 16/599,433, mailed on May 14, 2021, 11 pages.

Notice of Allowance received for U.S. Appl. No. 16/599,433, mailed on Oct. 4, 2021, 13 pages.

Notice of Allowance received for U.S. Appl. No. 16/659,507, mailed on Feb. 24, 2021, 7 pages.

Notice of Allowance received for U.S. Appl. No. 16/663,062, mailed on Jul. 13, 2021, 7 pages.

Notice of Allowance received for U.S. Appl. No. 16/663,062, mailed on Mar. 24, 2021, 8 pages.

Notice of Allowance received for U.S. Appl. No. 16/833,436, mailed on Jul. 7, 2022, 8 pages.

Notice of Allowance received for U.S. Appl. No. 16/833,436, mailed on Sep. 8, 2022, 8 pages.

Notice of Allowance received for U.S. Appl. No. 16/861,651, mailed on Jan. 9, 2024, 6 pages.

Notice of Allowance received for U.S. Appl. No. 16/867,002, mailed on Aug. 20, 2021, 12 pages.

Notice of Allowance received for U.S. Appl. No. 16/867,002, mailed on Mar. 1, 2022, 7 pages.

Notice of Allowance received for U.S. Appl. No. 16/935,002, mailed on Feb. 15, 2023, 15 pages.

Notice of Allowance received for U.S. Appl. No. 16/935,002, mailed on Jun. 28, 2023, 8 pages.

Notice of Allowance received for U.S. Appl. No. 16/997,588, mailed on Mar. 18, 2022, 9 pages.

Notice of Allowance received for U.S. Appl. No. 16/997,588, mailed on Sep. 30, 2021, 12 pages.

Notice of Allowance received for U.S. Appl. No. 17/031,654, mailed on Feb. 10, 2021, 9 pages.

Notice of Allowance received for U.S. Appl. No. 17/031,654, mailed on May 27, 2021, 8 pages.

Notice of Allowance received for U.S. Appl. No. 17/031,765, mailed on Apr. 2, 2024, 34 pages.

Notice of Allowance received for U.S. Appl. No. 17/041,350, mailed on Feb. 24, 2022, 6 pages.

Notice of Allowance received for U.S. Appl. No. 17/068,386, mailed on Apr. 29, 2024, 13 pages.

Notice of Allowance received for U.S. Appl. No. 17/068,386, mailed on Dec. 13, 2023, 12 pages.

Notice of Allowance received for U.S. Appl. No. 17/078,896, mailed on May 13, 2022, 8 pages.

Notice of Allowance received for U.S. Appl. No. 17/087,845, mailed on Mar. 3, 2022, 9 pages.

Notice of Allowance received for U.S. Appl. No. 17/087,845, mailed on Oct. 28, 2021, 9 pages.

Notice of Allowance received for U.S. Appl. No. 17/091,460, mailed on Apr. 28, 2022, 9 pages.

Notice of Allowance received for U.S. Appl. No. 17/091,460, mailed on Feb. 4, 2022, 10 pages.

Notice of Allowance received for U.S. Appl. No. 17/091,460, mailed on May 23, 2022, 9 pages.

Notice of Allowance received for U.S. Appl. No. 17/093,408, mailed on Aug. 30, 2023, 59 pages.

Notice of Allowance received for U.S. Appl. No. 17/317,042, mailed on Jul. 26, 2022, 12 pages.

Notice of Allowance received for U.S. Appl. No. 17/317,042, mailed on Nov. 9, 2022, 10 pages.

Notice of Allowance received for U.S. Appl. No. 17/341,839, mailed on Dec. 2, 2022, 6 pages.

Notice of Allowance received for U.S. Appl. No. 17/341,839, mailed on Oct. 5, 2022, 5 pages.

Notice of Allowance received for U.S. Appl. No. 17/370,505, mailed on Feb. 2, 2023, 8 pages.

Notice of Allowance received for U.S. Appl. No. 17/373,163, mailed on Jul. 27, 2022, 8 pages.

Notice of Allowance received for U.S. Appl. No. 17/373,163, mailed on May 11, 2022, 8 pages.

Notice of Allowance received for U.S. Appl. No. 17/515,143, mailed on Dec. 16, 2022, 11 pages.

Notice of Allowance received for U.S. Appl. No. 17/515,143, mailed on Mar. 13, 2023, 10 pages.

Notice of Allowance received for U.S. Appl. No. 17/525,664, mailed on Apr. 26, 2023, 10 pages.

Notice of Allowance received for U.S. Appl. No. 17/525,664, mailed on Feb. 14, 2023, 10 pages.

Notice of Allowance received for U.S. Appl. No. 17/525,664, mailed on Oct. 27, 2022, 11 pages.

Notice of Allowance received for U.S. Appl. No. 17/556,165, mailed on Feb. 21, 2023, 12 pages.

Notice of Allowance received for U.S. Appl. No. 17/591,184, mailed on Feb. 22, 2023, 5 pages.

Notice of Allowance received for U.S. Appl. No. 17/713,016, mailed on Apr. 18, 2023, 10 pages.

Notice of Allowance received for U.S. Appl. No. 17/713,016, mailed on Aug. 4, 2023, 7 pages.

Notice of Allowance received for U.S. Appl. No. 17/717,275, mailed on Dec. 26, 2023, 8 pages.

Notice of Allowance received for U.S. Appl. No. 17/736,925, mailed on Apr. 24, 2023, 10 pages.

Notice of Allowance received for U.S. Appl. No. 17/736,925, mailed on Aug. 3, 2023, 9 pages.

Notice of Allowance received for U.S. Appl. No. 17/738,940, mailed on Jun. 22, 2023, 9 pages.

Notice of Allowance received for U.S. Appl. No. 17/738,940, mailed on Oct. 2, 2023, 9 pages.

Notice of Allowance received for U.S. Appl. No. 17/941,962, mailed on Jul. 3, 2023, 9 pages.

Notice of Allowance received for U.S. Appl. No. 17/941,962, mailed on Mar. 10, 2023, 11 pages.

Notice of Allowance received for U.S. Appl. No. 17/941,962, mailed on May 3, 2023, 10 pages.

Notice of Allowance received for U.S. Appl. No. 17/948,578, mailed on Aug. 23, 2023, 10 pages.

Notice of Allowance received for U.S. Appl. No. 17/949,081, mailed on Apr. 12, 2024, 8 pages.

Notice of Allowance received for U.S. Appl. No. 17/971,456, mailed on Jun. 26, 2023, 9 pages.

Notice of Allowance received for U.S. Appl. No. 18/138,634, mailed on Apr. 18, 2024, 9 pages.

Notice of Allowance received for U.S. Appl. No. 18/197,242, mailed on Mar. 6, 2024, 11 pages.

Notice of Allowance received for U.S. Appl. No. 18/220,715, mailed on Jun. 13, 2024, 10 pages.

Notice of Allowance received for U.S. Appl. No. 18/220,715, mailed on Mar. 7, 2024, 11 pages.

Notice of Hearing received for Indian Patent Application No. 201814036470, mailed on Feb. 7, 2024, 4 pages.

Notice of Hearing received for Indian Patent Application No. 201814036472, mailed on May 9, 2024, 2 pages.

"Nova Launcher—Lock Screen Edit", Online Available at: https://forums.androidcentral.com/ask-question/835057-nova-launcher-lock-screen-edit.html, Sep. 2017, 2 pages.

(56)　　　　References Cited

OTHER PUBLICATIONS

Nova, "Tour of the Solar System", Retrieved fro <http://www.pbs.org/wgbh/nova/space/tour-solar-system.html>, May 24, 2013, 14 pages.

Obara, Yuuta, "iPhone Application Selection for Univesity Students", Shuwa System Co. Saito Kazukuni, vol. 1, May 16, 2013, 4 pages.

Octoba, "Just Install It—Utilizing Method for Android Application Business", ASCII Media Works Co. Takano Kiyoshi, vol. 1, Apr. 25, 2013, 6 pages.

Office Action and Search Report received for Danish Patent Application No. PA201970598, mailed on Jan. 28, 2020, 6 pages.

Office Action received for Australian Patent Application No. 2015101020, mailed on Oct. 26, 2015, 8 pages.

Office Action received for Danish Patent Application No. PA201570499, mailed on Nov. 1, 2017, 6 pages.

Office Action received for European Patent Application No. 15730924.6, mailed on Dec. 12, 2017, 8 pages.

Office Action received for Australian Patent Application No. 2015101019, issued on Oct. 14, 2015, 3 pages.

Office Action received for Australian Patent Application No. 2015101019, issued on Apr. 7, 2016, 4 pages.

Office Action received for Australian Patent Application No. 2015101021, issued on Apr. 26, 2016, 4 pages.

Office Action received for Australian Patent Application No. 2015101021, issued on Oct. 28, 2015, 10 pages.

Office Action received for Australian Patent Application No. 2015298710, mailed on Apr. 13, 2017, 3 pages.

Office Action received for Australian Patent Application No. 2015298710, mailed on Feb. 15, 2017, 2 pages.

Office Action received for Australian Patent Application No. 2015298710, mailed on Nov. 6, 2018, 4 pages.

Office Action received for Australian Patent Application No. 2015298710, mailed on Sep. 24, 2018, 4 pages.

Office Action received for Australian Patent Application No. 2016100411, mailed on Jun. 10, 2016, 3 pages.

Office Action received for Australian Patent Application No. 2016100476, mailed on Jun. 9, 2016, 4 pages.

Office Action received for Australian Patent Application No. 2016100765, issued on Aug. 5, 2016, 2 pages.

Office Action received for Australian Patent Application No. 2016100765, mailed on Dec. 16, 2016, 3 pages.

Office Action received for Australian Patent Application No. 2016229847, mailed on Jul. 3, 2018, 4 pages.

Office Action received for Australian Patent Application No. 2017277813, mailed on Jun. 11, 2019, 3 pages.

Office Action received for Australian Patent Application No. 2017277813, mailed on Mar. 20, 2020, 4 pages.

Office Action received for Australian Patent Application No. 2017330212, mailed on Feb. 21, 2020, 2 pages.

Office Action received for Australian Patent Application No. 2018201089, mailed on Jul. 23, 2020, 4 pages.

Office Action received for Australian Patent Application No. 2018201089, mailed on Oct. 11, 2019, 4 pages.

Office Action received for Australian Patent Application No. 2018206770, mailed on Apr. 30, 2019, 4 pages.

Office Action received for Australian Patent Application No. 2018206770, mailed on Jul. 16, 2019, 5 pages.

Office Action received for Australian Patent Application No. 2018206770, mailed on Jul. 25, 2018, 5 pages.

Office Action received for Australian Patent Application No. 2018206770, mailed on Mar. 5, 2019, 3 pages.

Office Action received for Australian Patent Application No. 2018279037, mailed on Jan. 17, 2020, 4 pages.

Office Action received for Australian Patent Application No. 2018279037, mailed on Jun. 18, 2019, 5 pages.

Office Action received for Australian Patent Application No. 2019100794, mailed on Oct. 3, 2019, 4 pages.

Office Action received for Australian Patent Application No. 2019208225, mailed on Dec. 21, 2020, 3 pages.

Office Action received for Australian Patent Application No. 2019208225, mailed on Mar. 20, 2020, 3 pages.

Office Action received for Australian Patent Application No. 2019267413, mailed on Jun. 29, 2021, 3 pages.

Office Action received for Australian Patent Application No. 2020100189, mailed on Apr. 1, 2020, 3 pages.

Office Action received for Australian Patent Application No. 2020101043, mailed on Aug. 14, 2020, 5 pages.

Office Action received for Australian Patent Application No. 2020101043, mailed on Oct. 30, 2020, 4 pages.

Office Action received for Australian Patent Application No. 2020102158, mailed on Apr. 27, 2021, 5 pages.

Office Action received for Australian Patent Application No. 2020102158, mailed on Dec. 8, 2020, 9 pages.

Office Action received for Australian Patent Application No. 2020204506, mailed on Dec. 7, 2020, 6 pages.

Office Action received for Australian Patent Application No. 2020239670, mailed on Mar. 3, 2021, 4 pages.

Office Action received for Australian Patent Application No. 2020239749, mailed on Jan. 21, 2022, 4 pages.

Office Action received for Australian Patent Application No. 2020239749, mailed on Jul. 16, 2021, 5 pages.

Office Action received for Australian Patent Application No. 2020239774, mailed on Jun. 28, 2021, 8 pages.

Office Action received for Australian Patent Application No. 2020239774, mailed on Oct. 5, 2021, 3 pages.

Office Action received for Australian Patent Application No. 2020250323, mailed on Dec. 14, 2021, 2 pages.

Office Action received for Australian Patent Application No. 2020294208, mailed on Dec. 17, 2021, 2 pages.

Office Action received for Australian Patent Application No. 2020309093, mailed on Jan. 21, 2021, 3 pages.

Office Action received for Australian Patent Application No. 2021201295, mailed on Jan. 14, 2022, 3 pages.

Office Action received for Australian Patent Application No. 2021202254, mailed on Jun. 20, 2022, 2 pages.

Office Action received for Australian Patent Application No. 2021202797, mailed on Feb. 4, 2022, 5 pages.

Office Action received for Australian Patent Application No. 2021202834, mailed on May 28, 2021, 2 pages.

Office Action received for Australian Patent Application No. 2021203216, mailed on Mar. 7, 2022, 8 pages.

Office Action received for Australian Patent Application No. 2021245228, mailed on Aug. 31, 2022, 2 pages.

Office Action received for Australian Patent Application No. 2021250863, mailed on Oct. 6, 2022, 6 pages.

Office Action received for Australian Patent Application No. 2022200965, mailed on Feb. 14, 2023, 4 pages.

Office Action received for Australian Patent Application No. 2022201419, mailed on Mar. 20, 2023, 3 pages.

Office Action received for Australian Patent Application No. 2022202292, mailed on May 10, 2022, 2 pages.

Office Action received for Australian Patent Application No. 2022202583, mailed on Mar. 24, 2023, 4 pages.

Office Action received for Australian Patent Application No. 2022203957, mailed on May 12, 2023, 5 pages.

Office Action received for Australian Patent Application No. 2022218607, mailed on Apr. 14, 2023, 3 pages.

Office Action received for Australian Patent Application No. 2022218607, mailed on Jun. 30, 2023, 4 pages.

Office Action received for Australian Patent Application No. 2022218607, mailed on Oct. 10, 2023, 4 pages.

Office Action received for Australian Patent Application No. 2022235622, mailed on Jun. 27, 2023, 3 pages.

Office Action received for Australian Patent Application No. 2022235622, mailed on May 22, 2023, 2 pages.

Office Action received for Australian Patent Application No. 2022235634, mailed on May 25, 2023, 4 pages.

Office Action received for Australian Patent Application No. 2022287595, mailed on Jul. 20, 2023, 3 pages.

Office Action received for Australian Patent Application No. 2023200039, mailed on Jul. 4, 2023, 2 pages.

(56) References Cited

OTHER PUBLICATIONS

Office Action received for Australian Patent Application No. 2023201250, mailed on Sep. 11, 2023, 3 pages.

Office Action received for Australian Patent Application No. 2023201920, mailed on Nov. 10, 2023, 2 pages.

Office Action received for Australian Patent Application No. 2023282284, mailed on Jan. 19, 2024, 6 pages.

Office Action received for Australian Patent Application No. 2015101019, mailed on Feb. 12, 2016, 4 pages.

Office Action received for Chinese Patent Application No. 201520595384.6, mailed on Mar. 25, 2016, 3 pages.

Office Action received for Chinese Patent Application No. 201510479088.4, mailed on Apr. 22, 2020, 7 pages.

Office Action received for Chinese Patent Application No. 201510479088.4, mailed on Mar. 12, 2018, 20 pages.

Office Action received for Chinese Patent Application No. 201510479088.4, mailed on May 7, 2019, 6 pages.

Office Action received for Chinese Patent Application No. 201510481525.6, mailed on Aug. 29, 2018, 10 pages.

Office Action received for Chinese Patent Application No. 201510481525.6, mailed on Nov. 29, 2017, 9 pages.

Office Action received for Chinese Patent Application No. 201510483268.X, mailed on Apr. 16, 2019, 6 pages.

Office Action received for Chinese Patent Application No. 201510483268.X, mailed on Dec. 1, 2017, 11 pages.

Office Action received for Chinese Patent Application No. 201510483268.X, mailed on Oct. 19, 2018, 10 pages.

Office action received for Chinese Patent Application No. 201510483305.7, mailed on Aug. 31, 2018, 10 pages.

Office action received for Chinese Patent Application No. 201510483305.7, mailed on Dec. 1, 2017, 13 pages.

Office Action received for Chinese Patent Application No. 201510484514.3, mailed on Apr. 4, 2018, 12 pages.

Office Action received for Chinese Patent Application No. 201510484514.3, mailed on Dec. 24, 2018, 13 pages.

Office Action received for Chinese Patent Application No. 201520594249.X, mailed on Mar. 25, 2016, 3 pages.

Office Action received for Chinese Patent Application No. 201520595384.6, mailed on Dec. 30, 2016, 2 pages.

Office Action received for Chinese Patent Application No. 201520595384.6, mailed on Jul. 22, 2016, 3 pages.

Office Action received for Chinese Patent Application No. 201520595385.0, mailed on Dec. 30, 2016, 2 pages.

Office Action received for Chinese Patent Application No. 201520595385.0, mailed on Jul. 22, 2016, 3 pages.

Office Action received for Chinese Patent Application No. 201520595385.0, mailed on Mar. 25, 2016, 3 pages.

Office Action Received for Chinese Patent Application No. 201520595408.8, mailed on Dec. 9, 2015, 4 pages.

Office Action Received for Chinese Patent Application No. 201520595408.8, mailed on Dec. 30, 2016, 2 pages.

Office Action received for Chinese Patent Application No. 201520595408.8, mailed on Jul. 25, 2016, 3 pages.

Office Action received for Chinese Patent Application No. 201520595408.8, mailed on Mar. 25, 2016, 3 pages.

Office Action received for Chinese Patent Application No. 201520595538.1, mailed on Dec. 30, 2016, 2 pages.

Office Action received for Chinese Patent Application No. 201520595538.1, mailed on Jul. 22, 2016, 3 pages.

Office Action received for Chinese Patent Application No. 201520595538.1, mailed on Mar. 25, 2016, 3 pages.

Office Action received for Chinese Patent Application No. 201680013193.1, mailed on Feb. 1, 2021, 8 pages.

Office Action received for Chinese Patent Application No. 201680013193.1, mailed on Mar. 25, 2020, 21 pages.

Office Action received for Chinese Patent Application No. 201680013193.1, mailed on Sep. 7, 2020, 6 pages.

Office Action received for Chinese Patent Application No. 201680047983.1, mailed on Feb. 1, 2021, 6 pages.

Office Action received for Chinese Patent Application No. 201680047983.1, mailed on Jul. 1, 2020, 6 pages.

Office Action received for Chinese Patent Application No. 201680047983.1, mailed on Mar. 18, 2019, 18 pages.

Office Action received for Chinese Patent Application No. 201680047983.1, mailed on Nov. 28, 2019, 9 pages.

Office Action received for Chinese Patent Application No. 201780033973.7, mailed on Jan. 22, 2021, 27 pages.

Office Action received for Chinese Patent Application No. 201780058426.4, mailed on Dec. 2, 2022, 11 pages.

Office Action received for Chinese Patent Application No. 201810037665.8, mailed on Dec. 7, 2018, 10 pages.

Office Action received for Chinese Patent Application No. 201910315328.5, mailed on Nov. 30, 2021, 21 pages.

Office Action received for Chinese Patent Application No. 201910379481.4, mailed on Mar. 2, 2020, 18 pages.

Office Action received for Chinese Patent Application No. 201910691865.X, mailed on Aug. 4, 2021, 10 pages.

Office Action received for Chinese Patent Application No. 201910691865.X, mailed on Feb. 4, 2021, 16 pages.

Office Action received for Chinese Patent Application No. 201910691865.X, mailed on Jul. 8, 2020, 17 pages.

Office Action received for Chinese Patent Application No. 201910691872.X, mailed on Jun. 3, 2020, 10 pages.

Office Action received for Chinese Patent Application No. 201910691872.X, mailed on Jun. 23, 2021, 10 pages.

Office Action received for Chinese Patent Application No. 201910691872.X, mailed on Mar. 24, 2021, 19 pages.

Office Action received for Chinese Patent Application No. 201910691872.X, mailed on Nov. 10, 2021, 16 pages.

Office Action received for Chinese Patent Application No. 201910692978.1, mailed on Apr. 3, 2020, 19 pages.

Office Action received for Chinese Patent Application No. 201910692978.1, mailed on Nov. 4, 2020, 4 pages.

Office Action received for Chinese Patent Application No. 201910906898.1, mailed on Jun. 23, 2021, 6 pages.

Office Action received for Chinese Patent Application No. 201910906898.1, mailed on Sep. 9, 2020, 8 pages.

Office Action received for Chinese Patent Application No. 201910924197.0, mailed on Nov. 30, 2022, 13 pages.

Office Action received for Chinese Patent Application No. 201911199054.4, mailed on Jan. 20, 2021, 19 pages.

Office Action received for Chinese Patent Application No. 201911199054.4, mailed on Jul. 3, 2020, 15 pages.

Office Action received for Chinese Patent Application No. 201911199054.4, mailed on Jun. 10, 2021, 13 pages.

Office Action received for Chinese Patent Application No. 201911202668.3, mailed on Aug. 4, 2020, 13 pages.

Office Action received for Chinese Patent Application No. 201911219525.3, mailed on Jul. 10, 2020, 7 pages.

Office Action received for Chinese Patent Application No. 201980030338.2, mailed on Feb. 7, 2024, 20 pages.

Office Action received for Chinese Patent Application No. 202010330318.1, mailed on Jul. 13, 2021, 12 pages.

Office Action received for Chinese Patent Application No. 202010330318.1, mailed on Mar. 31, 2021, 13 pages.

Office Action received for Chinese Patent Application No. 202010330318.1, mailed on Nov. 19, 2020, 18 pages.

Office Action received for Chinese Patent Application No. 202110194015.6, mailed on Sep. 28, 2021, 13 pages.

Office Action received for Chinese Patent Application No. 202110453180.9, mailed on Dec. 26, 2022, 13 pages.

Office Action received for Chinese Patent Application No. 202110453180.9, mailed on Jun. 16, 2022, 14 pages.

Office Action received for Chinese Patent Application No. 202110453180.9, mailed on Nov. 8, 2021, 21 pages.

Office Action received for Chinese Patent Application No. 202110454541.1, mailed on Oct. 20, 2021, 19 pages.

Office Action received for Chinese Patent Application No. 202110530629.7, mailed on Mar. 14, 2024, 13 pages.

Office Action received for Chinese Patent Application No. 202110783860.7, mailed on Mar. 10, 2022, 15 pages.

(56) References Cited

OTHER PUBLICATIONS

Office Action received for Chinese Patent Application No. 202110783860.7, mailed on Nov. 15, 2022, 8 pages.

Office Action received for Chinese Patent Application No. 202110820692.4, mailed on Mar. 15, 2022, 18 pages.

Office Action received for Chinese Patent Application No. 202110831819.2, mailed on Apr. 16, 2024, 6 pages.

Office Action received for Chinese Patent Application No. 202110957983.8, mailed on Dec. 27, 2023, 23 pages.

Office Action received for Chinese Patent Application No. 202110957983.8, mailed on May 13, 2024, 18 pages.

Office Action received for Chinese Patent Application No. 202111457936.3, mailed on Jul. 5, 2022, 18 pages.

Office Action received for Chinese Patent Application No. 202310124087.2, mailed on Sep. 9, 2023, 24 pages.

Office Action received for Chinese Patent Application No. 202311634654.5, mailed on Apr. 28, 2024, 19 pages.

Office Action Received for Chinese Patent Application No. 201520594249.X, mailed on Dec. 9, 2015, 4 pages.

Office Action Received for Chinese Patent Application No. 201520595384.6, mailed on Dec. 9, 2015, 4 pages.

Office Action Received for Chinese Patent Application No. 201520595385.0, mailed on Dec. 9, 2015, 4 pages.

Office Action Received for Chinese Patent Application No. 201520595538.1, mailed on Dec. 9, 2015, 4 pages.

Office Action received for Danish Patent Application No. PA201570495, mailed on Dec. 9, 2016, 2 pages.

Office Action received for Danish Patent Application No. PA201570495, mailed on May 4, 2016, 8 pages.

Office Action received for Danish Patent Application No. PA201570495, mailed on Oct. 29, 2015, 7 pages.

Office Action received for Danish Patent Application No. PA201570497, mailed on Feb. 21, 2017, 3 pages.

Office Action received for Danish Patent Application No. PA201570497, mailed on May 17, 2016, 6 pages.

Office Action received for Danish Patent Application No. PA201570497, mailed on Nov. 15, 2016, 2 pages.

Office Action received for Danish Patent Application No. PA201570497, mailed on Oct. 24, 2017, 2 pages.

Office Action received for Danish Patent Application No. PA201570498, mailed on Feb. 6, 2017, 2 pages.

Office Action received for Danish Patent Application No. PA201570498, mailed on Jun. 2, 2016, 8 pages.

Office Action received for Danish Patent Application No. PA201570498, mailed on Oct. 26, 2017, 5 pages.

Office Action received for Danish Patent Application No. PA201570498, mailed on Oct. 30, 2015, 7 pages.

Office Action received for Danish Patent Application No. PA201570499, mailed on Feb. 14, 2017, 2 pages.

Office Action received for Danish Patent Application No. PA201570499, mailed on Jun. 16, 2016, 8 pages.

Office Action received for Danish Patent Application No. PA201570499, mailed on Jun. 19, 2018, 4 pages.

Office Action received for Danish Patent Application No. PA201570499, mailed on Nov. 3, 2015, 7 pages.

Office Action received for Danish Patent Application No. PA201570768, mailed on Sep. 13, 2016, 8 pages.

Office Action received for Danish Patent Application No. PA201570770, mailed on Apr. 7, 2017, 7 pages.

Office Action received for Danish Patent Application No. PA201570770, mailed on Mar. 17, 2016, 9 pages.

Office Action received for Danish Patent Application No. PA201570770, mailed on Sep. 12, 2016, 6 pages.

Office Action received for Danish Patent Application No. PA201770791, mailed on Jan. 31, 2018, 8 pages.

Office Action received for Danish Patent Application No. PA201770791, mailed on Jul. 13, 2018, 2 pages.

Office Action received for Danish Patent Application No. PA201770791, mailed on Jun. 11, 2019, 3 pages.

Office Action received for Danish Patent Application No. PA201870366, mailed on Aug. 22, 2019, 3 pages.

Office Action received for Danish Patent Application No. PA201870366, mailed on Dec. 12, 2018, 3 pages.

Office Action received for Danish Patent Application No. PA201870367, mailed on Dec. 20, 2018, 5 pages.

Office Action received for Danish Patent Application No. PA201870368, mailed on Dec. 20, 2018, 5 pages.

Office Action received for Danish Patent Application No. PA201870368, mailed on Oct. 1, 2019, 6 pages.

Office Action received for Danish Patent Application No. PA201870372, mailed on Aug. 20, 2019, 2 pages.

Office Action received for Danish Patent Application No. PA201870372, mailed on Jan. 31, 2019, 4 pages.

Office Action received for Danish Patent Application No. PA201870374, mailed on Feb. 6, 2019, 5 pages.

Office Action received for Danish Patent Application No. PA201870374, mailed on Jun. 17, 2019, 5 pages.

Office Action received for Danish Patent Application No. PA201870375, mailed on Jan. 31, 2019, 4 pages.

Office Action received for Danish Patent Application No. PA201870377, mailed on Jan. 31, 2019, 4 pages.

Office Action received for Danish Patent Application No. PA201970596, mailed on May 6, 2020, 4 pages.

Office Action received for Danish Patent Application No. PA201970597, mailed on Oct. 29, 2020, 4 pages.

Office Action received for Danish Patent Application No. PA201970598, mailed on Apr. 15, 2021, 6 pages.

Office Action received for Danish Patent Application No. PA201970598, mailed on Oct. 9, 2020, 4 pages.

Office Action received for Danish Patent Application No. PA201970599, mailed on Jan. 23, 2020, 6 pages.

Office Action received for Danish Patent Application No. PA201970599, mailed on Mar. 1, 2021, 4 pages.

Office Action received for Danish Patent Application No. PA201970599, mailed on May 27, 2020, 4 pages.

Office Action received for Danish Patent Application No. PA202070609, mailed on Dec. 10, 2020, 8 pages.

Office Action received for Danish Patent Application No. PA202070610, mailed on Jun. 18, 2021, 8 pages.

Office Action received for Danish Patent Application No. PA202070610, mailed on Mar. 14, 2022, 7 pages.

Office Action received for Danish Patent Application No. PA202070623, mailed on Aug. 24, 2021, 3 pages.

Office Action received for Danish Patent Application No. PA202070623, mailed on May 23, 2022, 3 pages.

Office Action received for Danish Patent Application No. PA202070624, mailed on Feb. 4, 2022, 4 pages.

Office Action received for Danish Patent Application No. PA202070624, mailed on Jun. 16, 2021, 5 pages.

Office Action received for Danish Patent Application No. PA202070625, mailed on Feb. 8, 2022, 2 pages.

Office Action received for Danish Patent Application No. PA202070625, mailed on Jun. 16, 2021, 3 pages.

Office Action received for Danish Patent Application No. PA202070625, mailed on Sep. 23, 2022, 4 pages.

Office Action received for Danish Patent Application No. PA201570496, mailed on Oct. 29, 2015, 6 pages.

Office Action received for Danish Patent Application No. PA201570497, mailed on Oct. 30, 2015, 6 pages.

Office Action received for European Patent Application No. 15730925.3, mailed on Apr. 12, 2018, 8 pages.

Office Action received for European Patent Application No. 15747595.5, mailed on Apr. 15, 2019, 4 pages.

Office Action received for European Patent Application No. 15747595.5, mailed on Jun. 27, 2018, 8 pages.

Office Action received for European Patent Application No. 16762356.0, mailed on Dec. 11, 2020, 7 pages.

Office Action received for European Patent Application No. 16837432.0, mailed on Jan. 10, 2020, 7 pages.

Office Action received for European Patent Application No. 16837432.0, mailed on Jan. 27, 2021, 7 pages.

(56) References Cited

OTHER PUBLICATIONS

Office Action received for European Patent Application No. 17206177.2, mailed on May 15, 2018, 6 pages.

Office Action received for European Patent Application No. 17810723.1, mailed on Jul. 9, 2021, 8 pages.

Office Action received for European Patent Application No. 17853657.9, mailed on Apr. 1, 2021, 6 pages.

Office Action received for European Patent Application No. 19172407.9, mailed on Oct. 18, 2019, 7 pages.

Office Action received for European Patent Application No. 19181242.9, mailed on Dec. 6, 2019, 9 pages.

Office Action received for European Patent Application No. 19204230.7, mailed on Sep. 28, 2020, 6 pages.

Office Action received for European Patent Application No. 19212057.4, mailed on Mar. 9, 2021, 6 pages.

Office Action received for European Patent Application No. 19724959.2, mailed on Apr. 23, 2020, 10 pages.

Office Action received for European Patent Application No. 19724997.2, mailed on Oct. 27, 2022, 5 pages.

Office Action received for European Patent Application No. 20168021.2, mailed on Jul. 22, 2020, 8 pages.

Office Action received for European Patent Application No. 20172197.4, mailed on Aug. 5, 2020, 6 pages.

Office Action received for European Patent Application No. 20172197.4, mailed on Jul. 8, 2021, 5 pages.

Office Action received for European Patent Application No. 20704768.9, mailed on Mar. 24, 2023, 8 pages.

Office Action received for European Patent Application No. 20729346.5, mailed on Jan. 17, 2022, 8 pages.

Office Action received for European Patent Application No. 20729346.5, mailed on Jul. 28, 2022, 9 pages.

Office Action received for European Patent Application No. 20730136.7, mailed on Jan. 19, 2023, 4 pages.

Office Action received for European Patent Application No. 20730136.7, mailed on Jun. 27, 2023, 5 pages.

Office Action received for European Patent Application No. 20730136.7, mailed on Nov. 3, 2023, 5 pages.

Office Action received for European Patent Application No. 20730136.7, mailed on Oct. 6, 2022, 11 pages.

Office Action received for European Patent Application No. 20761084.1, mailed on Dec. 14, 2022, 5 pages.

Office Action received for European Patent Application No. 20761084.1, mailed on May 9, 2022, 9 pages.

Office Action received for European Patent Application No. 21169911.1, mailed on Dec. 1, 2022, 4 pages.

Office Action received for European Patent Application No. 21169911.1, mailed on Jun. 3, 2022, 5 pages.

Office Action received for European Patent Application No. 21177569.7, mailed on Jun. 9, 2022, 5 pages.

Office Action received for European Patent Application No. 21728746.5, mailed on Aug. 21, 2023, 4 pages.

Office Action received for European Patent Application No. 21728746.5, mailed on Jan. 11, 2024, 4 pages.

Office Action received for European Patent Application No. 21729171.5, mailed on Oct. 31, 2023, 5 pages.

Office Action received for European Patent Application No. 22154034.7, mailed on Feb. 19, 2024, 8 pages.

Office Action received for European Patent Application No. 22154034.7, mailed on May 26, 2023, 10 pages.

Office Action received for European Patent Application No. 22729905.4, mailed on Mar. 22, 2024, 8 pages.

Office Action received for European Patent Application No. 23168077.8, mailed on Apr. 25, 2024, 7 pages.

Office Action received for European Patent Application No. 15730925.3, mailed on Feb. 27, 2019, 5 pages.

Office Action received for German Patent Application No. 112015003083.2, mailed on Mar. 9, 2018, 12 pages.

Office Action received for Indian Patent Application No. 201814036470, mailed on Feb. 26, 2021, 7 pages.

Office Action received for Indian Patent Application No. 201814036472, mailed on Jul. 8, 2021, 8 pages.

Office Action received for Indian Patent Application No. 202015008746, mailed on Mar. 6, 2023, 7 pages.

Office Action received for Indian Patent Application No. 202015008747, mailed on Mar. 15, 2023, 10 pages.

Office Action received for Indian Patent Application No. 202017041557, mailed on Dec. 8, 2021, 8 pages.

Office Action received for Indian Patent Application No. 202017048447, mailed on Sep. 5, 2022, 6 pages.

Office Action received for Indian Patent Application No. 202118025047, mailed on Apr. 26, 2022, 6 pages.

Office Action received for Indian Patent Application No. 202215026045, mailed on Mar. 31, 2023, 8 pages.

Office Action received for Indian Patent Application No. 202215026505, mailed on Feb. 8, 2023, 9 pages.

Office Action received for Japanese Patent Application No. 2017-505450, mailed on Jun. 20, 2017, 8 pages.

Office Action received for Japanese Patent Application No. 2017-505842, mailed on Feb. 22, 2019, 11 pages.

Office Action received for Japanese Patent Application No. 2017-505842, mailed on Sep. 9, 2019, 7 pages.

Office Action received for Japanese Patent Application No. 2017-505847, mailed on Feb. 12, 2019, 13 pages.

Office Action received for Japanese Patent Application No. 2017-545918, mailed on Sep. 14, 2018, 12 pages.

Office Action received for Japanese Patent Application No. 2018-074971, mailed on Jan. 28, 2019, 6 pages.

Office Action received for Japanese Patent Application No. 2018-182607, mailed on Apr. 6, 2020, 6 pages.

Office Action received for Japanese Patent Application No. 2018-182607, mailed on Jul. 20, 2020, 5 pages.

Office Action received for Japanese Patent Application No. 2018-182607, mailed on Sep. 8, 2021, 7 pages.

Office Action received for Japanese Patent Application No. 2018-184254, mailed on Mar. 2, 2020, 8 pages.

Office Action received for Japanese Patent Application No. 2018-537840, mailed on Jul. 8, 2019, 15 pages.

Office Action received for Japanese Patent Application No. 2019-151358, mailed on Oct. 2, 2020, 5 pages.

Office Action received for Japanese Patent Application No. 2019-215503, mailed on Feb. 5, 2021, 12 pages.

Office Action received for Japanese Patent Application No. 2019-215503, mailed on Jul. 3, 2020, 12 pages.

Office Action received for Japanese Patent Application No. 2020-074878, mailed on Sep. 7, 2020, 13 pages.

Office Action received for Japanese Patent Application No. 2020-120086, mailed on May 21, 2021, 6 pages.

Office Action received for Japanese Patent Application No. 2020-120086, mailed on Nov. 20, 2020, 6 pages.

Office Action received for Japanese Patent Application No. 2020-124605, mailed on Dec. 17, 2021, 2 pages.

Office Action received for Japanese Patent Application No. 2020-124605, mailed on May 13, 2022, 6 pages.

Office Action received for Japanese Patent Application No. 2020-124605, mailed on Sep. 3, 2021, 5 pages.

Office Action received for Japanese Patent Application No. 2020-159823, mailed on Aug. 15, 2022, 6 pages.

Office Action received for Japanese Patent Application No. 2020-159823, mailed on Dec. 23, 2021, 8 pages.

Office Action received for Japanese Patent Application No. 2020-159824, mailed on Dec. 17, 2021, 13 pages.

Office Action received for Japanese Patent Application No. 2020-159825, mailed on Dec. 10, 2021, 4 pages.

Office Action received for Japanese Patent Application No. 2020-193703, mailed on Apr. 19, 2021, 4 pages.

Office Action received for Japanese Patent Application No. 2020-562622, mailed on Jan. 7, 2022, 13 pages.

Office Action received for Japanese Patent Application No. 2021-023661, mailed on Feb. 25, 2022, 6 pages.

Office Action received for Japanese Patent Application No. 2021-023661, mailed on Oct. 3, 2022, 8 pages.

(56) References Cited

OTHER PUBLICATIONS

Office Action received for Japanese Patent Application No. 2021-092483, mailed on Apr. 1, 2022, 8 pages.
Office Action received for Japanese Patent Application No. 2021-153573, mailed on Oct. 17, 2022, 4 pages.
Office Action received for Japanese Patent Application No. 2021-166686, mailed on Oct. 3, 2022, 3 pages.
Office Action received for Japanese Patent Application No. 2022-124069, mailed on Feb. 2, 2024, 6 pages.
Office Action received for Japanese Patent Application No. 2022-124069, mailed on Sep. 29, 2023, 8 pages.
Office Action received for Japanese Patent Application No. 2022-152693, mailed on Oct. 27, 2023, 6 pages.
Office Action received for Japanese Patent Application No. 2022-170806, mailed on May 13, 2024, 4 pages.
Office Action received for Japanese Patent Application No. 2022-170806, mailed on Nov. 17, 2023, 14 pages.
Office Action received for Japanese Patent Application No. 2022-194369, mailed on Mar. 15, 2024, 11 pages.
Office Action received for Japanese Patent Application No. 2022-205934, mailed on Mar. 11, 2024, 4 pages.
Office Action received for Japanese Patent Application No. 2023-077331, mailed on May 31, 2024, 4 pages.
Office Action received for Japanese Patent Application No. 2023-559823, mailed on Mar. 4, 2024, 6 pages.
Office Action received for Korean Patent Application No. 10-2017-7005939, mailed on Jun. 30, 2017, 6 pages.
Office Action received for Korean Patent Application No. 10-2017-7024570, mailed on Jul. 10, 2019, 6 pages.
Office Action received for Korean Patent Application No. 10-2017-7024570, mailed on Sep. 28, 2018, 14 pages.
Office Action received for Korean Patent Application No. 10-2018-7018904, mailed on Aug. 20, 2019, 8 pages.
Office Action received for Korean Patent Application No. 10-2018-7022101, mailed on Feb. 14, 2019, 15 pages.
Office Action received for Korean Patent Application No. 10-2018-7022101, mailed on Jul. 9, 2019, 10 pages.
Office Action received for Korean Patent Application No. 10-2019-7005369, mailed on Mar. 13, 2020, 12 pages.
Office Action received for Korean Patent Application No. 10-2019-7029673, mailed on Apr. 8, 2021, 7 pages.
Office Action received for Korean Patent Application No. 10-2019-7029673, mailed on Nov. 5, 2019, 10 pages.
Office Action received for Korean Patent Application No. 10-2019-7029673, mailed on Sep. 3, 2020, 9 pages.
Office Action received for Korean Patent Application No. 10-2020-0123852, mailed on Jun. 9, 2022, 10 pages.
Office Action received for Korean Patent Application No. 10-2020-0123857, mailed on Dec. 16, 2022, 8 pages.
Office Action received for Korean Patent Application No. 10-2020-0123857, mailed on Jun. 9, 2022, 12 pages.
Office Action received for Korean Patent Application No. 10-2020-0123887, mailed on Jun. 9, 2022, 5 pages.
Office Action received for Korean Patent Application No. 10-2020-7001340, mailed on Mar. 26, 2021, 13 pages.
Office Action received for Korean Patent Application No. 10-2020-7001340, mailed on Sep. 24, 2020, 19 pages.
Office Action received for Korean Patent Application No. 10-2020-7026036, mailed on Dec. 7, 2020, 8 pages.
Office Action received for Korean Patent Application No. 10-2020-7028759, mailed on Jun. 29, 2021, 12 pages.
Office Action received for Korean Patent Application No. 10-2020-7031855, mailed on Nov. 24, 2020, 6 pages.
Office Action received for Korean Patent Application No. 10-2020-7032147, mailed on Feb. 16, 2021, 6 pages.
Office Action received for Korean Patent Application No. 10-2020-7032187, mailed on Jun. 10, 2022, 16 pages.
Office Action received for Korean Patent Application No. 10-2021-7002582, mailed on Apr. 16, 2021, 13 pages.

Office Action received for Korean Patent Application No. 10-2021-7002582, mailed on Oct. 29, 2021, 6 pages.
Office Action received for Korean Patent Application No. 10-2021-7013453, mailed on Jun. 5, 2021, 6 pages.
Office Action received for Korean Patent Application No. 10-2021-7013454, mailed on Jun. 5, 2021, 6 pages.
Office Action received for Korean Patent Application No. 10-2021-7025301, mailed on Oct. 15, 2021, 5 pages.
Office Action received for Korean Patent Application No. 10-2021-7036016, mailed on Nov. 10, 2021, 13 pages.
Office Action received for Korean Patent Application No. 10-2021-7036246, mailed on Nov. 26, 2021, 5 pages.
Office Action received for Korean Patent Application No. 10-2021-7036678, mailed on Dec. 22, 2021, 6 pages.
Office Action received for Korean Patent Application No. 10-2022-7003364, mailed on Apr. 22, 2022, 14 pages.
Office Action received for Korean Patent Application No. 10-2022-7003364, mailed on Dec. 26, 2022, 8 pages.
Office Action received for Korean Patent Application No. 10-2022-7009437, mailed on Nov. 30, 2022, 6 pages.
Office Action received for Korean Patent Application No. 10-2022-7019034, mailed on Sep. 18, 2023, 6 pages.
Office Action received for Korean Patent Application No. 10-2022-7019205, mailed on Sep. 21, 2022, 6 pages.
Office Action received for Korean Patent Application No. 10-2022-7044515, mailed on Aug. 21, 2023, 11 pages.
Office Action received for Korean Patent Application No. 10-2023-0064928, mailed on Jun. 9, 2023, 6 pages.
Office Action received for Korean Patent Application No. 10-2023-7008379, mailed on Nov. 13, 2023, 15 pages.
Office Action received for Korean Patent Application No. 10-2023-7008854, mailed on Nov. 15, 2023, 6 pages.
Office Action received for Korean Patent Application No. 10-2023-7011744, mailed on May 15, 2023, 11 pages.
Office Action received for Korean Patent Application No. 10-2023-7032383, mailed on Feb. 5, 2024, 16 pages.
Office Action received for Korean Patent Application No. 10-2023-7033642, mailed on Dec. 4, 2023, 5 pages.
Office Action received for Korean Patent Application No. 10-2024-7004853, mailed on Mar. 4, 2024, 6 pages.
Office Action received for Korean Patent Application No. 10-2024-7014705, mailed on May 17, 2024, 10 pages.
Office Action received for Netherlands Patent Application No. 2015245, mailed on Jan. 24, 2017, 11 pages.
Office Action received for Netherlands Patent Application No. 2015239, mailed on Oct. 28, 2016, 13 pages.
Office Action Received for Taiwanese Patent Application No. 104124962, issued on Nov. 29, 2016, 6 pages.
Office Action received for Taiwanese Patent Application No. 104124998, mailed on Nov. 29, 2016, 6 pages.
Office Action received for Taiwanese Patent Application No. 100111887, mailed on Oct. 7, 2013, 23 pages.
Office Action received for Taiwanese Patent Application No. 104124963, mailed on Jan. 5, 2017, 11 pages.
Office Action received for Taiwanese Patent Application No. 104124995, issued on Dec. 1, 2016, 6 pages.
Office Action received for Taiwanese Patent Application No. 104124997, issued on Dec. 8, 2016, 12 pages.
Office Action received for Taiwanese Patent Application No. 104126627, issued on Nov. 29, 2016, 9 pages.
Office Action received for Taiwanese Patent Application No. 104126627, mailed on Aug. 30, 2018, 22 pages.
Office Action received for Taiwanese Patent Application No. 104126627, mailed on Dec. 20, 2018, 4 pages.
Office Action received for Taiwanese Patent Application No. 104126627, mailed on Oct. 16, 2017, 7 pages.
Office Action received for Taiwanese Patent Application No. 104132636, issued on Dec. 13, 2018, 26 pages.
Office Action received for Taiwanese Patent Application No. 104132636, issued on Mar. 23, 2017, 25 pages.
Office Action received for Taiwanese Patent Application No. 104132636, issued on Oct. 31, 2017, 10 pages.

(56) References Cited

OTHER PUBLICATIONS

Omar, Romero, "Sony Smartwatch 2 Custom Watchfaces Tutorial", Retrieved From: <https://www.youtube.com/watch?v=8odbxqwSQR8>, May 1, 2014, 2 pages.

"Online Alarm Clock", https://web.archive.org/web/20150505081746/http://www.online-stopwatch.com/online-alarm-clock, May 5, 2015, 2 pages.

Pavlakos et al., "Expressive Body Capture: 3D Hands, Face, and Body from a Single Image", In Proceedings of the IEEE/CVF conference on computer vision and pattern recognition 2019, online available at https://arxiv.org/abs/1904.05866, 2019, pp. 10975-10985.

PC World, "How to make AR Emojis on the Samsung Galaxy S9", You Tube, Available Online: https://www.youtube.com/watch?v=8wQICfulkz0, Feb. 25, 2018, 2 pages.

"Pentax K20D Operating Manual", http://www.ricoh-imaging.eu/en/operating-manuals-download.html, Pentax Corporation, 2008, pp. 173-174.

Phandroid, "New Android Wear Wrist Gestures in Marshmallow", Available online at: https://www.youtube.com/watch?v=0WhKuklpQ9A, Feb. 11, 2016, 3 pages.

Phlam Dev, "Clockwork Tomato Presentation", Retrieved from the Internet: URL: https://www.youtube.com/watch?v=2IQDx9REn0E, Apr. 29, 2016, 6 pages.

Phonebuff, "Hybrid Stopwatch & Timer Android App Review", Available Online at: https://www.youtube.com/watch?v=B43oCFPiWvY, Apr. 4, 2012, 7 pages.

Poppinga et al., "Sensor-Based Identification of Opportune Moments for Triggering Notifications", IEEE CS, Mar. 14, 2014, pp. 22-29.

Pradhan et al., "Understanding and Managing Notifications", IEEE INFOCOM 2017—IEEE Conference on Computer Communications, May 1, 2017, 9 pages.

Pre-Appeal Review Report received for Japanese Patent Application No. 2018-182607, mailed on Jan. 21, 2021, 4 pages.

Pre-Appeal Review Report received for Japanese Patent Application No. 2020-159823, mailed on Jan. 12, 2023, 4 pages.

Pre-Interview First Office Action received for U.S. Appl. No. 14/815,890, mailed on May 26, 2016, 4 pages.

"Programmatically download APK from google play store", Retrieved from the Internet: https://stackoverflow.com/questions/13703982/program maticallydownload-apk-from-google-play-store/13704021#13704021, Dec. 10, 2012, 2 pages.

Pumarola et al., "GANimation: Anatomically-aware Facial Animation from a Single Image", Proceedings of the European Conference on Computer Vision (ECCV), Jul. 24, 2018, 16 pages.

Pyun et al., "An Example-Based Approach for Facial Expression Cloning", SIGGRAPH Symposium on Computer Animation, The Eurographics Association (2003), 2003, 10 pages.

Record of Oral Hearing received for U.S. Appl. No. 14/815,890, mailed on Nov. 20, 2020, 18 pages.

Record of Oral Hearing received for U.S. Appl. No. 15/405,122, mailed on Sep. 12, 2023, 20 pages.

Record of Oral Hearing received for U.S. Appl. No. 16/259,771, mailed on Aug. 4, 2021, 15 pages.

Record of Oral Hearing received for U.S. Appl. No. 16/259,771, mailed on Feb. 4, 2024, 15 pages.

Record of Oral Hearing received for U.S. Appl. No. 16/861,651, mailed on Sep. 5, 2023, 16 pages.

Rehman, A, "Install Android 4.2 Gesture-Based Keyboard & Clock App on Jelly Bean 4.1 or Higher", Excerpts From, Available online at <http://www.addictivetips.com/android/install-android-4-2-keyboard-clock-app-apk-on-jelly-bean-4-1-x/>, Nov. 3, 2012, 4 pages.

Restriction Requirement received for U.S. Appl. No. 14/815,890, mailed on Feb. 22, 2016, 5 pages.

Restriction Requirement received for U.S. Appl. No. 17/949,081, mailed on Dec. 2, 2022, 6 pages.

Restriction Requirement received for U.S. Appl. No. 17/949,081, mailed on Jan. 3, 2023, 6 pages.

Result of Consultation received for European Patent Application No. 16762356.0, mailed on Nov. 29, 2021, 3 pages.

Result of Consultation received for European Patent Application No. 17810723.1, mailed on Nov. 30, 2022, 3 pages.

Result of Consultation received for European Patent Application No. 19172407.9, mailed on Nov. 5, 2020, 17 pages.

Result of Consultation received for European Patent Application No. 19204230.7, mailed on Nov. 16, 2020, 3 pages.

Result of Consultation received for European Patent Application No. 19204230.7, mailed on Sep. 24, 2020, 5 pages.

Result of Consultation received for European Patent Application No. 19724959.2, mailed on Sep. 4, 2020, 3 pages.

Result of Consultation received for European Patent Application No. 20172197.4, mailed on Oct. 6, 2023, 6 pages.

Result of Consultation received for European Patent Application No. 20185974.1, mailed on Apr. 4, 2022, 4 pages.

Result of Consultation received for European Patent Application No. 20729346.5, mailed on Jun. 21, 2023, 3 pages.

Result of Consultation received for European Patent Application No. 15730925.3, mailed on Nov. 24, 2020, 4 pages.

Result of Consultation received for European Patent Application No. 19181242.9, mailed on Dec. 1, 2020, 12 pages.

Rosa et al., "Stripe Generator—a Free Tool for the Web Design Community", Available online at: http://www.stripegenerator.com/, Mar. 28, 2019, 10 pages.

Rowinski, Dan, "Why the All-In-One Smartwatch Isn't Happening Any Time Soon", Online available at:—https://web.archive.org/web/20140123074218if_/https://readwrite.com/2014/01/20/smartwatch-wearable-fitness-remote-control/, Jan. 20, 2014, 6 pages.

Rozario, Hamlin, "How to Edit Photos on iPhone & iPad", Online Available at: https://osxdaily.com/2020/01/23/how-to-edit-photos-on-iphone-ipad/, Jan. 23, 2020, 10 pages.

Search Report and Opinion received for Danish Patent Application No. PA201870366, mailed on Aug. 27, 2018, 9 pages.

Search Report and Opinion received for Danish Patent Application No. PA201870367, mailed on Aug. 27, 2018, 9 pages.

Search Report and Opinion received for Danish Patent Application No. PA201870368, mailed on Sep. 6, 2018, 7 pages.

Search Report and Opinion received for Danish Patent Application No. PA201870372, mailed on Sep. 14, 2018, 8 pages.

Search Report and Opinion received for Danish Patent Application No. PA201870372, mailed on Sep. 17, 2018, 10 pages.

Search Report and Opinion received for Danish Patent Application No. PA201870374, mailed on Aug. 27, 2018, 9 pages.

Search Report and Opinion received for Danish Patent Application No. PA201870375, mailed on Aug. 23, 2018, 8 pages.

Search Report and Opinion received for Danish Patent Application No. PA201870377, mailed on Sep. 4, 2018, 8 pages.

Search Report and Opinion received for Danish Patent Application No. PA201970596, mailed on Dec. 4, 2019, 11 pages.

Search Report and Opinion received for Danish Patent Application No. PA201970597, mailed on Dec. 18, 2019, 10 pages.

Search Report and Opinion received for Danish Patent Application No. PA201970598, mailed on Oct. 31, 2019, 9 pages.

Search Report and Opinion received for Danish Patent Application No. PA201970599, mailed on Nov. 8, 2019, 12 pages.

Search Report and Opinion received for Danish Patent Application No. PA202070610, mailed on Jan. 8, 2021, 9 pages.

Search Report and Opinion received for Danish Patent Application No. PA202070623, mailed on Dec. 21, 2020, 9 pages.

Search Report and Opinion received for Danish Patent Application No. PA202070624, mailed on Dec. 10, 2020, 10 pages.

Search Report and Opinion received for Danish Patent Application No. PA202070625, mailed on Dec. 17, 2020, 9 pages.

Search Report and Opinion received for Netherlands Patent Application No. 2015232, mailed on Jan. 25, 2017, 9 pages.

Search Report and Opinion received for Netherlands Patent Application No. 2015242, issued on Jul. 4, 2017, 20 pages.

Search Report and Opinion received for Netherlands Patent Application No. 2018531, issued on Jul. 27, 2017, 14 pages.

Search Report received for Danish Patent Application No. 201570768, mailed on Mar. 17, 2016, 11 pages.

Search Report received for Netherlands Patent Application No. 2015236, mailed on Apr. 21, 2021, 19 pages.

(56) References Cited

OTHER PUBLICATIONS

Shiota, Shinji, "Windows 7 Dojo", Weekly ASCII, Ascii Mediaworks Inc., vol. 798, Aug. 31, 2010, 3 pages.
Singh, Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 80 pages.
Slashgear, "Samsung AR Emoji demo on the Galaxy S9", Available Online at <https://www.youtube.com/watch?v=GQwNKzY4C9Y>, Feb. 25, 2018, 3 pages.
Smartwatch Ticks, "Wallpaper for Android based Smart Watches", Online Available at: https://www.youtube.com/watch?v=EwfbR7hB40, Jun. 24, 2015, 2 pages.
Smartwatch, "App Earth Space HD Live Wallpaper APK for Smart Watch", Version 1.7, Android version 2.2, Aug. 27, 2013, 1 page.
"Solar Walk Free", Vito Technology, Jun. 19, 2014, 9 pages.
"Sony Smartwatch 2 update—new feartures and watchface creator!!! New!!!", Online available at: https://www.youtube.com/watch?v=k3jjBv7QZSk, May 8, 2014, 3 pages.
Sony, "Live View_ micro display", Extended User Guide, Aug. 2010, 27 pages.
Sony, "Sony SmartWatch", User Guide, Dec. 2011, 18 pages.
Spears, Ann, "dimming screen before/instead of screensaver?", retrieved from—https://discussions.apple.com/thread/339700, Jan. 28, 2006, 1 page.
Spellburst, "The Sims 3: Create a Sim With Me | #2—Dark Fairy + Full CC List!", Available online at: <https://www.youtube.com/watch?v=Dy_5g9B-wkA>, Oct. 9, 2017, 2 pages.
Stateoftech, "Samsung Galaxy Gear Tips—Installing and Customizing Clock Faces", Online available at: https://www.youtube.com/watch?v=p2GzpL3xlUo, Dec. 12, 2013, 3 pages.
Stateoftech, "Samsung Galaxy Gear Tips—Change the Clock Face", Retrieved from: https://www.youtube.com/watch?v=GOom7AZUAjY, Dec. 11, 2013, 2 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 16762356.0, mailed on May 10, 2021, 10 pages.
Summons to Attend Oral Proceedings received for European Patent Application No. 17206177.2, mailed on Jun. 3, 2019, 8 pages.
Summons to Attend Oral Proceedings received for European Patent Application No. 17810723.1, mailed on Jul. 5, 2022, 8 pages.
Summons to Attend Oral Proceedings received for European Patent Application No. 17853657.9, mailed on May 2, 2023, 8 pages.
Summons to Attend Oral Proceedings received for European Patent Application No. 19172407.9, mailed on Jun. 24, 2020, 14 pages.
Summons to Attend Oral Proceedings received for European Patent Application No. 19181242.9, mailed on Jun. 16, 2020, 12 pages.
Summons to Attend Oral Proceedings received for European Patent Application No. 19181242.9, mailed on May 19, 2022, 7 pages.
Summons to Attend Oral Proceedings received for European Patent Application No. 19204230.7, mailed on May 25, 2021, 10 pages.
Summons to Attend Oral Proceedings received for European Patent Application No. 19212057.4, mailed on Apr. 19, 2023, 9 pages.
Summons to Attend Oral Proceedings received for European Patent Application No. 19724959.2, mailed on Feb. 1, 2021, 9 pages.
Summons to Attend Oral Proceedings received for European Patent Application No. 19724959.2, mailed on Mar. 31, 2021, 3 pages.
Summons to Attend Oral Proceedings received for European Patent Application No. 20172197.4, mailed on Apr. 14, 2023, 8 pages.
Summons to Attend Oral Proceedings received for European Patent Application No. 20729346.5, mailed on Jan. 23, 2023, 11 pages.
Summons to Oral Proceedings received for European Patent Application No. 19204230.7, mailed on Feb. 19, 2024, 2 pages.
Summons to Oral Proceedings received for European Patent Application No. 19724959.2, mailed on Jul. 14, 2023, 6 pages.
Sun Set, "Sun Set solar image clock", Available at <https://web.archive.orgjweb/20140719005410/http://www.sunsetclock.com/>, 2013, 5 pages.

Supplemental Notice of Allowance received for U.S. Appl. No. 14/815,890, mailed on Mar. 10, 2021, 2 pages.
Supplemental Notice of Allowance received for U.S. Appl. No. 15/713,490, mailed on May 30, 2019, 2 pages.
Supplemental Notice of Allowance received for U.S. Appl. No. 16/143,201, mailed on Dec. 13, 2018, 2 pages.
Supplemental Notice of Allowance received for U.S. Appl. No. 16/143,201, mailed on Dec. 19, 2018, 2 pages.
Supplemental Notice of Allowance received for U.S. Appl. No. 16/143,201, mailed on Jan. 10, 2019, 2 pages.
Supplemental Notice of Allowance received for U.S. Appl. No. 16/585,399, mailed on Aug. 26, 2020, 2 pages.
Supplemental Notice of Allowance received for U.S. Appl. No. 16/833,436, mailed on Jul. 14, 2022, 2 pages.
Supplemental Notice of Allowance received for U.S. Appl. No. 16/867,002, mailed on Mar. 16, 2022, 2 pages.
Supplemental Notice of Allowance received for U.S. Appl. No. 16/867,002, mailed on Sep. 9, 2021, 2 pages.
Supplemental Notice of Allowance received for U.S. Appl. No. 16/997,588, mailed on Apr. 20, 2022, 4 pages.
Supplemental Notice of Allowance received for U.S. Appl. No. 16/997,588, mailed on Oct. 22, 2021, 4 pages.
Supplemental Notice of Allowance received for U.S. Appl. No. 17/031,765, mailed on Apr. 9, 2024, 2 pages.
Supplemental Notice of Allowance received for U.S. Appl. No. 17/031,765, mailed on Apr. 19, 2024, 3 pages.
Supplemental Notice of Allowance received for U.S. Appl. No. 17/031,765, mailed on May 2, 2024, 3 pages.
Supplemental Notice of Allowance received for U.S. Appl. No. 17/971,456, mailed on Dec. 4, 2023, 2 pages.
Supplemental Notice of Allowance received for U.S. Appl. No. 17/971,456, mailed on Oct. 16, 2023, 5 pages.
Takahashi et al., "Neural network modeling of altered facial expression recognition in autism spectrum disorders based on predictive processing framework", Scientific reports, Online available at: https://www.nature.com/articles/s41598-021-94067-x, Jul. 26, 2021, 14 pages.
Talkandroid, "Android Wear walkthrough", Available online at: https://www.youtube.com/watch?v=4xntpZac4sw, Jun. 30, 2014, 1 page.
Tech With Brett, "How to Create Your AR Emoji on the Galaxy S9 and S9+", Available online at: <https://www.youtube.com/watch?v=HHMdcBpC8MQ>, Mar. 16, 2018, 5 pages.
Techcloud, "How to Create Custom Watch Face for Samsung Galaxy Gear Smartwatch just in Few Seconds", Online available at: ttps://www.youtube.com/watch?v=6rO-_SREDjQ, Oct. 9, 2013, 3 pages.
"The Simply Alarm app for Pebble", available online at <https://web.archive.org/web/20150517070400>/http://www.rebootsramblings.ca/n/sahhelp/https://www.youtube.com/watch?v=IVp1scQPw08, May 17, 2015, 1 page.
Theunlockr, "Galaxy Watch Complete Walkthrough: The Best Watch They've Made So Far", Available online at: https://www.youtube.com/watch?v=xiEClfe1SN4, Sep. 11, 2018, 27 pages.
Theunlockr, "How to Change the Watch Face on the Galaxy Gear", Online available at: https://www.youtube.com/watch?v=Z7EBG5aBiZg, Jan. 3, 2014, 3 pages.
Tsuchihashi et al., "Generation of Caricatures by Automatic Selection of Templates for Shapes and Placement of Facial Parts", Technical Report of the Institute of Image Information and Television Engineers, Japan, The Institute of Image Information and Television Engineers, vol. 33, No. 11, pp. 77-80., Feb. 8, 2009, 7 pages.
Tweedie, Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
"UIKit User Interface Catalog: Page Controls", Available online at: https://web.archive.org/web/20140703123442/https://developer.apple.com/library/ios/documentation/userexperience/conceptual/UIKitUICatalog/UIPageControl.html, Dec. 16, 2013, 4 pages.

(56)　　　　　References Cited

OTHER PUBLICATIONS

Vidstube, "Bitmoji Clockface on Fitbit Versa Sense/Versa 3/Versa 2", Available online at: <https://www.youtube.com/watch?v=4V_xDnSLeHE>, Retrieved on Dec. 3, 2020, Jun. 30, 2019, 1 page.
Viticci, Frederico, "Checking Time Zones with Living Earth—MacStories", Available at <https://www.macstories.net/reviews/checking-time-zones-with-living-earth/>, Dec. 11, 2013, pp. 1-5.
Wade, Cliff, "Get the Most Out of Nova Launcher: Changing Icon Sizes", Online Available at: https://www.androidguys.com/tips-tools/get-nova-launcher-changing-icon-sizes/, Nov. 16, 2015, 6 pages.
Wade, Cliff, "Get the Most Out of Nova Launcher: Customizing the Dock (Contest Included)", Online Available at: https://www.androidguys.com/tips-tools/get-nova-launcher-customizing-dockcontest-included/, Dec. 1, 2015, 5 pages.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M-I-C-K-E-Y, M-O-U-S-E. Mickey Mouse ", Online Available at: https://forums.watchuseek.com/f2/watch-every-father-needs-m-i-c-k-e-y-m-o-u-s-e-mickey-mouse-855069.html, 2013, 3 pages.
Wearablezone, "How to Set Up Your Fitbit Profile", Online available at:—<https://youtu.be/jsWPtcDWiJM>, Jun. 6, 2016, 3 pages.
Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Woolsey, Amanda, "How to Customize the Clock on the Apple Watch", Available online at: <https://www.youtube.com/watch?v=t-3Bckdd9B4>, Retrieved on Dec. 11, 2020, Apr. 25, 2015, 1 page.
Xdream, "TickTalk Video User Manual", YouTube [online] [video], Online available at: <https://youtu.be/jYhq3DwmVzo>, Mar. 17, 2017, 3 pages.
Zelgadis, "Reuse Animations—Synfig Animation Studio", Available online at: https://wiki.synfig.org/index.php?title=Doc:Reuse_Animations&oldid=18173, May 20, 2013, 5 pages.
Zephyrnix, "Steam's In-Game Home menu", Online Available at: <https://www.youtube.com/watch?v=jLoRFiPkcUw>, see 0;00-1;06., Feb. 15, 2011, 3 pages.
Zhang et al., "Facial Expression Retargeting from Human to Avatar Made Easy", IEEE Transactions on Visualization and Computer Graphics, Aug. 2020, 14 pages.
Zhao et al., "An Event-related Potential Comparison of Facial Expression Processing between Cartoon and Real Faces", Online available at: https://www.biorxiv.org/content/10.1101/333898v2, Jun. 18, 2018, 31 pages.
Zollhöfer et al., "State of the Art on Monocular 3D Face Reconstruction, Tracking, and Applications", In Computer graphics forum May 2018 (vol. 37, No. 2), online available at https://studios.disneyresearch.com/wp-content/uploads/2019/03/State-of-the-Art-on-Monocular-3D-Face-Reconstruction-Tracking-and-Applications-1.pdf., 2018, 28 pages.
Zukerman, Erez, "6 Beautiful, Interesting & Versatile Timer Apps [Android]", available at: http://www.makeuseof.com/tag/beautiful-interesting-versatile-timer-apps-android/, May 18, 2012, 5 pages.
ZY News, "Generate Cartoon Face within Three Seconds, You are the New-generation Expression Emperor", Online available at: <http://inews.ifeng.com/48551936/news.shtml>, Apr. 22, 2016, 3 pages.
Examiner-Initiated Interview Summary received for U.S. Appl. No. 17/031,671, mailed on Jan. 6, 2025, 2 pages.
Non-Final Office Action received for U.S. Appl. No. 18/677,585, mailed on Dec. 27, 2024, 14 pages.

Office Action received for Australian Patent Application No. 2023285697, mailed on Dec. 16, 2024, 2 pages.
Applicant-Initiated Interview Summary received for U.S. Appl. No. 17/946,993, mailed on May 29, 2025, 4 pages.
Applicant-Initiated Interview Summary received for U.S. Appl. No. 18/370,831, mailed on May 30, 2025, 4 pages.
Applicant-Initiated Interview Summary received for U.S. Appl. No. 18/583,787, mailed on May 28, 2025, 2 pages.
Corrected Notice of Allowance received for U.S. Appl. No. 17/461,014, mailed on May 28, 2025, 2 pages.
Corrected Notice of Allowance received for U.S. Appl. No. 18/378,470, mailed on May 29, 2025, 2 pages.
Corrected Notice of Allowance received for U.S. Appl. No. 18/536,089, mailed on May 28, 2025, 2 pages.
Non-Final Office Action received for U.S. Appl. No. 18/368,521, mailed on Jun. 2, 2025, 30 pages.
Notice of Allowance received for U.S. Appl. No. 16/943,737, mailed on Jun. 3, 2025, 6 pages.
Office Action received for Chinese Patent Application No. 202110481400.9, mailed on Apr. 23, 2025, 24 pages (14 pages of English Translation and 10 pages of Official Copy).
Office Action received for Indian Patent Application No. 202315036344, mailed on May 22, 2025, 8 pages.
Final Office Action received for U.S. Appl. No. 18/375,309, mailed on Dec. 4, 2024, 18 pages.
Intention to Grant received for European Patent Application No. 21728746.5, mailed on Dec. 6, 2024, 8 pages.
Notice of Allowance received for Chinese Patent Application No. 202010697187.0, mailed on Nov. 18, 2024, 6 pages (1 page of English Translation and 5 pages of Official Copy).
Notice of Allowance received for Chinese Patent Application No. 202110369363.2, mailed on Nov. 22, 2024, 4 pages (1 page of English Translation and 3 pages of Official Copy).
Notice of Allowance received for Japanese Patent Application No. 2023-077331, mailed on Nov. 29, 2024, 4 pages (1 page of English Translation and 3 pages of Official Copy).
Notice of Allowance received for U.S. Appl. No. 18/241,802, mailed on Dec. 4, 2024, 12 pages.
Office Action received for Australian Patent Application No. 2023285972, mailed on Nov. 27, 2024, 4 pages.
Summons to Attend Oral Proceedings received for German Patent Application No. 112015003083.2, mailed on Oct. 28, 2024, 7 pages (3 pages of English Translation and 4 pages of Official Copy).
Applicant-Initiated Interview Summary received for U.S. Appl. No. 18/196,345, mailed on Apr. 4, 2025, 4 pages.
Corrected Notice of Allowance received for U.S. Appl. No. 18/677,585, mailed on Apr. 7, 2025, 5 pages.
Decision to Grant received for European Patent Application No. 22729905.4, mailed on Mar. 27, 2025, 4 pages.
International Preliminary Report on Patentability received for PCT Patent Application No. PCT/US2023/031979, mailed on Mar. 20, 2025, 11 pages.
Office Action received for European Patent Application No. 23201849.9, mailed on Apr. 2, 2025, 6 pages.
Record of Oral Hearing received for U.S. Appl. No. 17/947,530, mailed on Mar. 27, 2025, 14 pages.
Decision on Appeal received for U.S. Appl. No. 17/031,671, mailed on Nov. 1, 2024, 24 pages.
Notice of Allowance received for Chinese Patent Application No. 202110369341.6, mailed on Nov. 4, 2024, 4 pages (1 page of English Translation and 3 pages of Official Copy).
Notice of Allowance received for Chinese Patent Application No. 202110530629.7, mailed on Oct. 28, 2024, 2 pages (1 page of English Translation and 1 page of Official Copy).
Notice of Allowance received for Chinese Patent Application No. 202110831819.2, mailed on Oct. 28, 2024, 4 pages (1 page of English Translation and 3 pages of Official Copy).
Notice of Allowance received for U.S. Appl. No. 17/746,807, mailed on Nov. 14, 2024, 6 pages.
Notice of Allowance received for U.S. Appl. No. 18/407,241, mailed on Nov. 14, 2024, 8 pages.

(56)          References Cited

OTHER PUBLICATIONS

Office Action received for Chinese Patent Application No. 202110367834.6, mailed on Nov. 4, 2024, 10 pages (5 pages of English Translation and 5 pages of Official Copy).

Intention to Grant received for European Patent Application No. 22154034.7, mailed on Jun. 12, 2025, 8 pages.

Non-Final Office Action received for U.S. Appl. No. 17/713,005, mailed on Jun. 11, 2025, 27 pages.

Office Action received for Chinese Patent Application No. 201910691872.X, mailed on May 15, 2025, 18 pages (10 pages of English Translation and 8 pages of Official Copy).

Office Action received for Chinese Patent Application No. 202080009772.5, mailed on Apr. 30, 2025, 23 pages (14 pages of English Translation and 9 pages of Official Copy).

Applicant-Initiated Interview Summary received for U.S. Appl. No. 18/618,920, mailed on Apr. 22, 2025, 6 pages.

Decision to Grant received for European Patent Application No. 19724997.2, mailed on Apr. 10, 2025, 4 pages.

Extended European Search Report received for European Patent Application No. 24215123.1, mailed on Apr. 8, 2025, 9 pages.

Intention to Grant received for European Patent Application No. 23168077.8, mailed on Apr. 7, 2025, 9 pages.

International Preliminary Report on Patentability received for PCT Patent Application No. PCT/US2023/032899, mailed on Mar. 27, 2025, 16 pages.

Notice of Acceptance received for Australian Patent Application No. 2023219926, mailed on Apr. 7, 2025, 3 pages.

Notice of Acceptance received for Australian Patent Application No. 2024201007, mailed on Apr. 7, 2025, 3 pages.

Notice of Allowance received for U.S. Appl. No. 17/461,014, mailed on Apr. 17, 2025, 7 pages.

Advisory Action received for U.S. Appl. No. 17/713,005, mailed on Jul. 19, 2024, 3 pages.

Applicant-Initiated Interview Summary received for U.S. Appl. No. 17/713,005, mailed on Jun. 18, 2024, 2 pages.

Applicant-Initiated Interview Summary received for U.S. Appl. No. 18/196,345, mailed on Sep. 16, 2024, 4 pages.

Applicant-Initiated Interview Summary received for U.S. Appl. No. 18/241,802, mailed on Jul. 17, 2024, 6 pages.

Applicant-Initiated Interview Summary received for U.S. Appl. No. 18/375,309, mailed on Sep. 27, 2024, 2 pages.

Board Decision received for Chinese Patent Application No. 201911199054.4, mailed on Sep. 25, 2024, 40 pages (17 pages of English Translation and 23 pages of Official Copy).

Communication for Board of Appeal received for European Patent Application No. 19204230.7, mailed on Jun. 18, 2024, 15 pages.

Corrected Notice of Allowance received for U.S. Appl. No. 18/197,242, mailed on Jul. 22, 2024, 2 pages.

Corrected Notice of Allowance received for U.S. Appl. No. 18/230,465, mailed on Oct. 9, 2024, 2 pages.

Corrected Notice of Allowance received for U.S. Appl. No. 18/230,465, mailed on Oct. 17, 2024, 2 pages.

Corrected Notice of Allowance received for U.S. Appl. No. 18/241,802, mailed on Oct. 22, 2024, 9 pages.

Decision to Grant received for European Patent Application No. 21729171.5, mailed on Aug. 29, 2024, 3 pages.

Extended European Search Report received for European Patent Application No. 24194707.6, mailed on Sep. 18, 2024, 8 pages.

FF14Startup, "How to create a character for beginners in FF14 and recommended races", Available online at: https://ff14startup.net/character-making-99/, Sep. 20, 2016, 16 pages (Official Copy only) {See Communication Under Rule 37 CFR § 1.98(a) (3)}.

Intention to Grant received for European Patent Application No. 19724997.2, mailed on Jul. 25, 2024, 9 pages.

Intention to Grant received for European Patent Application No. 20730136.7, mailed on Jul. 15, 2024, 8 pages.

International Preliminary Report on Patentability received for PCT Patent Application No. PCT/US2023/011151, mailed on Aug. 8, 2024, 13 pages.

Invitation to Pay Search Fees received for European Patent Application No. 21727979.3, mailed on Jul. 10, 2024, 4 pages.

Kafai et al., "Your Second Selves: Player-Designed Avatars", Games and Culture, May 23, 2010, 21 pages.

Maruberi, "[App Introduction] #3 Luxambra (Selecting the game to play with Hotman next after Maruberi)", Available online at: https://www.youtube.com/watch?v=e4ukNZ-1OrY, Jun. 22, 2014, 2 pages (Official Copy only) {See Communication Under Rule 37 CFR § 1.98(a) (3)}.

Minority_14, "The Ultimate Beautiful Holo Stopwatch: Ultimate Stopwatch & Timer", Available online at: https://sspai.com/post/21699, Mar. 1, 2013, 4 pages (Official Copy only) {See Communication Under Rule 37 CFR § 1.98(a) (3)}.

Non-Final Office Action received for U.S. Appl. No. 18/196,345, mailed on Jul. 16, 2024, 14 pages.

Non-Final Office Action received for U.S. Appl. No. 18/230,465, mailed on Aug. 15, 2024, 37 pages.

Non-Final Office Action received for U.S. Appl. No. 18/375,309, mailed on Jul. 29, 2024, 19 pages.

Non-Final Office Action received for U.S. Appl. No. 18/382,248, mailed on Sep. 28, 2024, 43 pages.

Non-Final Office Action received for U.S. Appl. No. 18/407,241, mailed on Oct. 1, 2024, 9 pages.

Non-Final Office Action received for U.S. Appl. No. 18/536,089, mailed on Aug. 15, 2024, 12 pages.

Notice of Acceptance received for Australian Patent Application No. 2023229597, mailed on Oct. 8, 2024, 3 pages.

Notice of Acceptance received for Australian Patent Application No. 2023282284, mailed on Jul. 18, 2024, 3 pages.

Notice of Allowance received for Chinese Patent Application No. 201980030338.2, mailed on Oct. 12, 2024, 2 pages (1 page of English Translation and 1 page of Official Copy).

Notice of Allowance received for Chinese Patent Application No. 202110369386.3, mailed on Jul. 9, 2024, 5 pages (1 page of English Translation and 4 pages of Official Copy).

Notice of Allowance received for Chinese Patent Application No. 202110369387.8, mailed on Aug. 30, 2024, 2 pages (1 page of English Translation and 1 page of Official Copy).

Notice of Allowance received for Japanese Patent Application No. 2022-170806, mailed on Aug. 9, 2024, 4 pages (1 page of English Translation and 3 pages of Official Copy).

Notice of Allowance received for Japanese Patent Application No. 2022-205934, mailed on Jun. 10, 2024, 4 pages (1 page of English Translation and 3 pages of Official Copy).

Notice of Allowance received for Japanese Patent Application No. 2023-043407, mailed on Jul. 26, 2024, 4 pages (1 page of English Translation and 3 pages of Official Copy).

Notice of Allowance received for Japanese Patent Application No. 2023-559823, mailed on Aug. 19, 2024, 5 pages (1 page of English Translation and 4 pages of Official Copy).

Notice of Allowance received for Korean Patent Application No. 10-2023-0189466, mailed on Jul. 22, 2024, 8 pages (2 pages of English Translation and 6 pages of Official Copy).

Notice of Allowance received for Korean Patent Application No. 10-2023-7008379, mailed on Jun. 12, 2024, 7 pages (2 pages of English Translation and 5 pages of Official Copy).

Notice of Allowance received for Korean Patent Application No. 10-2023-7008854, mailed on Jul. 26, 2024, 8 pages (2 pages of English Translation and 6 pages of Official Copy).

Notice of Allowance received for Korean Patent Application No. 10-2023-7032383, mailed on Aug. 29, 2024, 10 pages (2 pages of English Translation and 8 pages of Official Copy).

Notice of Allowance received for U.S. Appl. No. 15/421,865, mailed on Sep. 30, 2024, 6 pages.

Notice of Allowance received for U.S. Appl. No. 17/746,807, mailed on Jul. 3, 2024, 23 pages.

Notice of Allowance received for U.S. Appl. No. 18/197,242, mailed on Jul. 10, 2024, 12 pages.

Notice of Allowance received for U.S. Appl. No. 18/197,242, mailed on Oct. 17, 2024, 12 pages.

Notice of Allowance received for U.S. Appl. No. 18/230,465, mailed on Sep. 16, 2024, 5 pages.

(56)          References Cited

OTHER PUBLICATIONS

Notice of Allowance received for U.S. Appl. No. 18/241,802, mailed on Oct. 8, 2024, 11 pages.
Office Action received for Australian Patent Application No. 2023219926, mailed on Aug. 24, 2024, 5 pages.
Office Action received for Australian Patent Application No. 2023229597, mailed on Jul. 30, 2024, 3 pages.
Office Action received for Australian Patent Application No. 2023285972, mailed on Aug. 19, 2024, 2 pages.
Office Action received for Chinese Patent Application No. 202010697187.0, mailed on Jul. 25, 2024, 16 pages (5 pages of English Translation and 11 pages of Official Copy).
Office Action received for Chinese Patent Application No. 202080009772.5, mailed on Aug. 17, 2024, 28 pages (15 pages of English Translation and 13 pages of Official Copy).
Office Action received for Chinese Patent Application No. 202110368426.2, mailed on Aug. 23, 2024, 17 pages (8 pages of English Translation and 9 pages of Official Copy).
Office Action received for Chinese Patent Application No. 202110369265.9, mailed on Jul. 31, 2024, 18 pages (6 pages of English Translation and 12 pages of Official Copy).
Office Action received for Chinese Patent Application No. 202110369341.6, mailed on Jul. 24, 2024, 11 pages (5 pages of English Translation and 6 pages of Official Copy).
Office Action received for Chinese Patent Application No. 202110369363.2, mailed on Jul. 9, 2024, 14 pages (6 pages of English Translation and 8 pages of Official Copy).
Office Action received for Chinese Patent Application No. 202110369387.8, mailed on Jul. 2, 2024, 10 pages (4 pages of English Translation and 6 pages of Official Copy).
Office Action received for Chinese Patent Application No. 202110831819.2, mailed on Aug. 17, 2024, 11 pages (5 pages of English Translation and 6 pages of Official Copy).
Office Action received for Chinese Patent Application No. 202110957983.8, mailed on Jul. 6, 2024, 17 pages (11 pages of English Translation and 6 pages of Official Copy).
Office Action received for Chinese Patent Application No. 202311634654.5, mailed on Sep. 18, 2024, 14 pages (8 pages of English Translation and 6 pages of Official Copy).
Office Action received for European Patent Application No. 21727979.3, mailed on Sep. 26, 2024, 11 pages.
Office Action received for European Patent Application No. 22154034.7, mailed on Oct. 11, 2024, 8 pages.
Office Action received for Indian Patent Application No. 202218027229, mailed on Jun. 13, 2024, 8 pages.
Office Action received for Japanese Patent Application No. 2022-194369, mailed on Sep. 20, 2024, 5 pages (2 pages of English Translation and 3 pages of Official Copy).
Office Action received for Japanese Patent Application No. 2023-104475, mailed on Sep. 17, 2024, 6 pages (3 pages of English Translation and 3 pages of Official Copy).
Office Action received for Japanese Patent Application No. 2023-559823, mailed on Jun. 10, 2024, 6 pages (3 pages of English Translation and 3 pages of Official Copy).
Office Action received for Korean Patent Application No. 10-2023-7037034, mailed on Jul. 22, 2024, 23 pages (11 pages of English Translation and 12 pages of Official Copy).
Record of Oral Hearing received for U.S. Appl. No. 17/031,671, mailed on Aug. 27, 2024, 17 pages.
Supplemental Notice of Allowance received for U.S. Appl. No. 15/421,865, mailed on Jun. 20, 2024, 3 pages.
Tait, Matthew, "Changing watch style and functionality to match fashion products", XP093201600, Available online at: https://www.tdcommons.org/cgi/viewcontent.cgi?params=/context/dpubs_series/article/2049/&path_info=Changing_watch_style_and_functionality_to_match_fashion_products.pdf, Dec. 13, 2017, 7 pages.
WPShopmart, "Top 20 Creative Animated Login Form in HTML & CSS", https://youtu.be/TDqT-7BnkD8?si=-R69GDvfR_IGrh2H, Dec. 6, 2019, 3 pages.

Applicant-Initiated Interview Summary received for U.S. Appl. No. 18/618,920, mailed on Jan. 17, 2025, 6 pages.
Final Office Action received for U.S. Appl. No. 18/196,345, mailed on Jan. 10, 2025, 15 pages.
Lafayette Pierre-Antoine, "The 'icon' URI scheme", draft-lafayette-icon-uri-scheme-01, Online available at: https://www.ietf.org/archive/id/draft-lafayette-icon-uri-scheme-01.html, 2010, 7 pages.
Nikoletseas et al., "Decentralizing and Adding Portability to an IoT Test-bed through Smartphones", IEEE International Conference on Distributed Computing in Sensor Systems, online available at: https://ieeexplore.ieee.org/stamp/stamp.jsp?tp=&arnumber=6846177, 2014, pp. 281-286.
Notice of Allowance received for Chinese Patent Application No. 202110367834.6, mailed on Jan. 2, 2025, 4 pages (1 page of English Translation and 3 pages of Official Copy).
Notice of Allowance received for Japanese Patent Application No. 2024-144411, mailed on Jan. 6, 2025, 4 pages (1 page of English Translation and 3 pages of Official Copy).
Notice of Allowance received for U.S. Appl. No. 18/378,470, mailed on Jan. 15, 2025, 40 pages.
Office Action received for Australian Patent Application No. 2024200956, mailed on Jan. 10, 2025, 6 pages.
Office Action received for Chinese Patent Application No. 202110367769.7, mailed on Dec. 27, 2024, 22 pages (7 pages of English Translation and 15 pages of Official Copy).
Xuetao Yang, "WP7 version of the desktop clock literary style Metro Time trial", Online available at: https://tech.sina.com.cn/s/s/2012-02-24/09216764878.shtml, Feb. 24, 2012, 10 pages (6 pages of English Translation and 4 pages of Official Copy).
Corrected Notice of Allowance received for U.S. Appl. No. 18/378,470, mailed on Jan. 23, 2025, 2 pages.
Decision on Appeal received for U.S. Appl. No. 17/461,014, mailed on Feb. 4, 2025, 12 pages.
Notice of Allowance received for U.S. Appl. No. 17/031,671, mailed on Jan. 29, 2025, 37 pages.
Office Action received for Chinese Patent Application No. 202110369265.9, mailed on Dec. 27, 2024, 16 pages (5 pages of English Translation and 11 pages of Official Copy).
Applicant-Initiated Interview Summary received for U.S. Appl. No. 18/375,309, mailed on Feb. 28, 2025, 4 pages.
Corrected Notice of Allowance received for U.S. Appl. No. 17/746,807, mailed on Feb. 26, 2025, 3 pages.
Decision on Appeal received for U.S. Appl. No. 16/389,722, mailed on Mar. 4, 2025, 18 pages.
Decisien on Appeal received for U.S. Appl. No. 16/943,737, mailed on Mar. 4, 2025, 10 pages.
Examiner's Answer to Appeal Brief received for U.S. Appl. No. 17/713,005, mailed on Feb. 25, 2025, 14 pages.
Extended European Search Report received for European Patent Application No. 24212853.6, mailed on Feb. 24, 2025, 9 pages.
Final Office Action received for U.S. Appl. No. 18/618,920, mailed on Feb. 19, 2025, 12 pages.
Intention to Grant received for European Patent Application No. 22154034.7, mailed on Feb. 28, 2025, 9 pages.
Non-Final Office Action received for U.S. Appl. No. 18/583,787, mailed on Mar. 5, 2025, 16 pages.
Notice of Allowance received for Korean Patent Application No. 10-2023-0189486, mailed on Feb. 17, 2025, 10 pages (2 pages of English Translation and 8 pages of Official Copy).
Notice of Allowance received for U.S. Appl. No. 18/536,089, mailed on Feb. 20, 2025, 7 pages.
Notice of Allowance received for U.S. Appl. No. 18/677,585, mailed on Mar. 5, 2025, 9 pages.
Office Action received for European Patent Application No. 24194707.6, mailed on Feb. 24, 2025, 4 pages.
Record of Oral Hearing received for U.S. Appl. No. 16/389,722, mailed on Feb. 26, 2025, 15 pages.
Record of Oral Hearing received for U.S. Appl. No. 16/943,737, mailed on Feb. 24, 2025, 22 pages.
Record of Oral Hearing received for U.S. Appl. No. 17/461,014, mailed on Feb. 12, 2025, 17 pages.
Supplemental Notice of Allowance received for U.S. Appl. No. 17/031,671, mailed on Feb. 27, 2025, 3 pages.

(56) References Cited

OTHER PUBLICATIONS

Corrected Notice of Allowance received for U.S. Appl. No. 17/031,671, mailed on Mar. 19, 2025, 3 pages.

Corrected Notice of Allowance received for U.S. Appl. No. 18/536,089, mailed on Mar. 19, 2025, 2 pages.

Dyna, Logix, "Smart Stand up reminder for Wear OS (and Android Wear 2.x / 1.x)", Available online at: <https://www.youtube.com/watch?v=dQdMEZ6tJLY>, Apr. 4, 2017, 2 pages.

Extended European Search Report received for European Patent Application No. 24216681.7, mailed on Mar. 4, 2025, 8 pages.

GregglesTV, "Google Photos How to Share Albums With Android and iOS Users", Online Available at: https://www.youtube.com/watch?v=vty3c3DgDnl, Dec. 18, 2015, 3 pages.

Non-Final Office Action received for U.S. Appl. No. 17/946,993, mailed on Mar. 12, 2025, 21 pages.

Office Action received for European Patent Application No. 23216484.8, mailed on Mar. 13, 2025, 7 pages.

Office Action received for Japanese Patent Application No. 2024-034095, mailed on Mar. 7, 2025, 8 pages (4 pages of English Translation and 4 pages of Official Copy).

Decision to Grant received for European Patent Application No. 21728746.5, mailed on Feb. 6, 2025, 4 pages.

Notice of Allowance received for Korean Patent Application No. 10-2024-7014705, mailed on Jan. 22, 2025, 7 pages (2 pages of English Translation and 5 pages of Official Copy).

Office Action received for Australian Patent Application No. 2023285972, mailed on Feb. 12, 2025, 4 pages.

Office Action received for Australian Patent Application No. 2024201007, mailed on Feb. 7, 2025, 2 pages.

Office Action received for European Patent Application No. 23705794.8, mailed on Feb. 12, 2025, 8 pages.

Office Action received for Japanese Patent Application No. 2023-210355, mailed on Feb. 4, 2025, 6 pages (3 pages of English Translation and 3 pages of Official Copy).

Supplemental Notice of Allowance received for U.S. Appl. No. 17/031,671, mailed on Feb. 12, 2025, 4 pages.

VS Media,"Selfie Camera App "B612" and "SNOW" Collaborate with Doraemon the Movie: Nobita's Antarctic Adventure", Available online at: https://vsmedia.info/2017/03/03/b612_snow_doraemon, Mar. 3, 2017, 2 pages (Official copy only). {See Communication Under Rule 37 CFR § 1.98(a) (3)}.

Corrected Notice of Allowance received for U.S. Appl. No. 18/382,248, mailed on May 16, 2025, 2 pages.

Corrected Notice of Allowance received for U.S. Appl. No. 18/677,585, mailed on May 7, 2025, 5 pages.

Non-Final Office Action received for U.S. Appl. No. 18/618,920, mailed on May 20, 2025, 14 pages.

Notice of Allowance received for U.S. Appl. No. 18/378,470, mailed on May 20, 2025, 41 pages.

Notice of Allowance received for U.S. Appl. No. 18/677,585, mailed on May 19, 2025, 8 pages.

Applicant-Initiated Interview Summary received for U.S. Appl. No. 18/382,248, mailed on Apr. 1, 2025, 2 pages.

Corrected Notice of Allowance received for U.S. Appl. No. 18/241,802, mailed on Mar. 28, 2025, 9 pages.

Corrected Notice of Allowance received for U.S. Appl. No. 18/677,585, mailed on Mar. 31, 2025, 5 pages.

Decision on Appeal received for U.S. Appl. No. 17/947,530, mailed on Mar. 21, 2025, 16 pages.

Non-Final Office Action received for U.S. Appl. No. 18/370,831, mailed on Mar. 28, 2025, 7 pages.

Non-Final Office Action received for U.S. Appl. No. 18/375,448, mailed on Mar. 20, 2025, 16 pages.

Notice of Allowance received for Chinese Patent Application No. 202110368164.X, mailed on Mar. 13, 2025, 4 pages (1 page of English Translation and 3 pages of Official Copy).

Notice of Allowance received for Chinese Patent Application No. 202110368460.X, mailed on Mar. 13, 2025, 4 pages (1 page of English Translation and 3 pages of Official Copy).

Office Action received for Chinese Patent Application No. 202010330318.1, mailed on Mar. 6, 2025, 27 pages (15 pages of English Translation and 12 pages of Official Copy).

Office Action received for Chinese Patent Application No. 22020339009772.5, mailed on Feb. 15, 2025, 24 pages (13 pages of English Translation and 11 pages of Official Copy).

Office Action received far Chinese Patent Application No. 202110368426.2, mailed on Feb. 24, 2025, 9 pages (5 pages of English Translation and 4 pages of Official Copy).

Summons to Attend Oral Preceedings received for European Patent Applicaticn No. 20704768.9, mailed on Mar. 17, 2025, 9 pages.

Shaqtech,"The FitBit Charge HR hands-on", Available Online at: https://www.youtube.com/watch?v=uWo04yzJpdg, Sep. 19, 2015, 6 pages.

Applicant-Initiated Interview Summary received for U.S. Appl. No. 18/536,089, mailed on Nov. 4, 2024, 3 pages.

Corrected Notice of Allowance received for U.S. Appl. No. 18/197,242, mailed on Nov. 6, 2024, 2 pages.

Corrected Notice of Allowance received for U.S. Appl. No. 18/230,465, mailed on Nov. 5, 2024, 2 pages.

Corrected Notice of Allowance received for U.S. Appl. No. 18/230,465, mailed on Oct. 24, 2024, 2 pages.

Non-Final Office Action received for U.S. Appl. No. 18/618,920, mailed on Nov. 5, 2024, 17 pages.

Office Action received for Chinese Patent Application No. 202110367769.7, mailed on Sep. 30, 2024, 21 pages (6 pages of English Translation and 15 pages of Official Copy).

Final Office Action received for U.S. Appl. No. 18/382,248, mailed on Dec. 18, 2024, 52 pages.

Intention to Grant received for European Patent Application No. 19724997.2, mailed on Dec. 3, 2024, 8 pages.

Notice of Allowance received for Japanese Patent Application No. 2023-104475, mailed on Dec. 13, 2024, 4 pages (1 page of English Translation and 3 pages of Official Copy).

Office Action received for Australian Patent Application No. 2023219926, mailed on Dec. 3, 2024, 4 pages.

Office Action received for Chinese Patent Application No. 202110368164.X, mailed on Nov. 15, 2024, 27 pages (6 pages of English Translation and 21 pages of Official Copy).

Office Action received for Chinese Patent Application No. 202110368460.X, mailed on Nov. 9, 2024, 11 pages (5 pages of English Translation and 6 pages of Official Copy).

Office Action received for Japanese Patent Application No. 2024-144411, mailed on Nov. 25, 2024, 4 pages (2 pages of English Translation and 2 pages of Official Copy).

Decision to Grant received for European Patent Application No. 20730136.7, mailed on Nov. 28, 2024, 3 pages.

Intention to Grant received for European Patent Application No. 22729905.4, mailed on Nov. 14, 2024, 9 pages.

Notice of Allowance received for Korean Patent Application No. 10-2023-0189466, mailed on Nov. 5, 2024, 10 pages (2 pages of English Translation and 8 pages of Official Copy).

Notice of Allowance received for Korean Patent Application No. 10-2024-7004853, mailed on Nov. 14, 2024, 8 pages (2 pages of English Translation and 6 pages of Official Copy).

Office Action received for European Patent Application No. 23168077.8, mailed on Nov. 21, 2024, 8 pages.

Applicant-Initiated Interview Summary received for U.S. Appl. No. 18/623,712, mailed on Oct. 23, 2025, 2 pages.

Extended European Search Report received for European Patent Application No. 25194400.5, mailed on Oct. 20, 2025, 10 pages.

Final Office Action received for U.S. Appl. No. 18/618,920, mailed on Nov. 4, 2025, 16 pages.

Non-Final Office Action received for U.S. Appl. No. 18/583,787, mailed on Nov. 5, 2025, 17 pages.

Notice of Allowance received for U.S. Appl. No. 17/713,005, mailed on Oct. 28, 2025, 9 pages.

Notice of Allowance received for U.S. Appl. No. 17/946,993, mailed on Nov. 4, 2025, 5 pages.

Office Action received for Australian Patent Application No. 2024204249, mailed on Oct. 22, 2025, 4 pages.

Applicant-Initiated Interview Summary received for U.S. Appl. No. 17/713,005, mailed on Sep. 23, 2025, 4 pages.

(56) References Cited

OTHER PUBLICATIONS

Applicant-Initiated Interview Summary received for U.S. Appl. No. 18/368,521, mailed on Aug. 12, 2025, 5 pages.

Applicant-Initiated Interview Summary received for U.S. Appl. No. 18/375,448, mailed on Jul. 23, 2025, 4 pages.

Applicant-Initiated Interview Summary received for U.S. Appl. No. 18/583,787, mailed on Jul. 18, 2025, 2 pages.

Applicant-Initiated Interview Summary received for U.S. Appl. No. 18/618,920, mailed on Aug. 28, 2025, 6 pages.

Board Decision received for Chinese Patent Application No. 202110368426.2, mailed on Jul. 2, 2025, 2 pages (1 page of English Translation and 1 page of Official Copy).

Corrected Notice of Allowance received for U.S. Appl. No. 17/031,671, mailed on Aug. 18, 2025, 3 pages.

Corrected Notice of Allowance received for U.S. Appl. No. 18/368,521, mailed on Sep. 30, 2025, 2 pages.

Decision to Grant received for European Patent Application No. 23168077.8, mailed on Aug. 21, 2025, 4 pages.

Extended European Search Report received for European Patent Application No. 25164661.8, mailed on Jul. 28, 2025, 9 pages.

"How to use B612 with pictures! A Selfie App that makes your photo look better than SNOW", Online available at: https://www.kaoru-blog.com/entry/b612-how, Oct. 22, 2017, 28 pages (Official Copy Only). {See Communication under Rule 37 CFR § 1.98(a) (3)}.

International Search Report and Written Opinion received for PCT Patent Application No. PCT/US2025/011749, mailed on Jun. 23, 2025, 20 pages.

Invitation to Pay Additional Fees and Partial International Search Report received for PCT Patent Application No. PCT/US2025/011749, mailed on Apr. 29, 2025, 13 pages.

Non-Final Office Action received for U.S. Appl. No. 18/623,712, mailed on Oct. 1, 2025, 9 pages.

Notice of Acceptance received for Australian Patent Application No. 2025205217, mailed on Sep. 5, 2025, 3 pages.

Notice of Allowance received for Chinese Patent Application No. 202110368426.2, mailed on Jul. 7, 2025, 4 pages (1 page of English Translation and 3 pages of Official Copy).

Notice of Allowance received for Japanese Patent Application No. 2022-194369, mailed on Jul. 7, 2025, 3 pages (1 page of English Translation and 2 pages of Official Copy).

Notice of Allowance received for Japanese Patent Application No. 2024-034095, mailed on Jul. 25, 2025, 4 pages (1 page of English Translation and 3 pages of Official Copy).

Notice of Allowance received for U.S. Appl. No. 16/943,737, mailed on Aug. 25, 2025, 5 pages.

Notice of Allowance received for U.S. Appl. No. 17/031,671, mailed on Aug. 6, 2025, 7 pages.

Notice of Allowance received for U.S. Appl. No. 17/461,014, mailed on Aug. 12, 2025, 8 pages.

Notice of Allowance received for U.S. Appl. No. 17/946,993, mailed on Jul. 8, 2025, 5 pages.

Notice of Allowance received for U.S. Appl. No. 18/196,345, mailed on Jul. 7, 2025, 13 pages.

Notice of Allowance received for U.S. Appl. No. 18/368,521, mailed on Aug. 28, 2025, 8 pages.

Notice of Allowance received for U.S. Appl. No. 18/370,831, mailed on Aug. 11, 2025, 7 pages.

Notice of Allowance received for U.S. Appl. No. 18/382,248, mailed on Sep. 10, 2025, 9 pages.

Office Action received for Australian Patent Application No. 2023285972, mailed on Aug. 18, 2025, 4 pages.

Office Action received for Australian Patent Application No. 2024200956, mailed on Aug. 20, 2025, 7 pages.

Office Action received for Australian Patent Application No. 2024204249, mailed on Aug. 13, 2025, 6 pages.

Office Action received for Chinese Patent Application No. 202411593986.8, mailed on Aug. 2, 2025, 10 pages (5 pages of English Translation and 5 pages of Official Copy).

Office Action received for European Patent Application No. 22188724.3, mailed on Jul. 24, 2025, 10 pages.

Office Action received for European Patent Application No. 23705794.8, mailed on Aug. 20, 2025, 5 pages.

Office Action received for European Patent Application No. 24194707.6, mailed on Sep. 23, 2025, 4 pages.

Office Action received for Japanese Patent Application No. 2023-210355, mailed on Aug. 18, 2025, 6 pages (3 pages of English Translation and 3 pages of Official Copy).

Office Action received for Japanese Patent Application No. 2024-098958, mailed on Jul. 11, 2025, 11 pages (5 pages of English Translation and 6 pages of Official Copy).

Office Action received for Japanese Patent Application No. 2024-110376, mailed on Jul. 18, 2025, 6 pages (3 pages of English Translation and 3 pages of Official Copy).

Office Action received for Japanese Patent Application No. 2024-152389, mailed on Aug. 25, 2025, 12 pages (6 pages of English Translation and 6 pages of Official Copy).

Office Action received for Japanese Patent Application No. 2024-156798, mailed on Aug. 15, 2025, 10 pages (5 pages of English Translation and 5 pages of Official Copy).

Supplemental Notice of Allowance received for U.S. Appl. No. 17/946,993, mailed on Jul. 22, 2025, 2 pages.

Supplemental Notice of Allowance received for U.S. Appl. No. 17/946,993, mailed on Sep. 19, 2025, 2 pages.

Supplemental Notice of Allowance received for U.S. Appl. No. 18/196,345, mailed on Jul. 15, 2025, 2 pages.

Corrected Notice of Allowance received for U.S. Appl. No. 16/943,737, mailed on Jun. 20, 2025, 3 pages.

Final Office Action received for U.S. Appl. No. 18/583,787, mailed on Jun. 18, 2025, 16 pages.

Notice of Allowance received for Korean Patent Application No. 10-2023-7037034, mailed on May 28, 2025, 7 pages (2 pages of English Translation and 5 pages of Official Copy).

Office Action received for Australian Patent Application No. 2023285972, mailed on Jun. 19, 2025, 6 pages.

Brief Communication Regarding Oral Proceedings received for European Patent Application No. 20704768.9, mailed on Oct. 9, 2025, 9 pages.

Office Action received for European Patent Application No. 24150496.8, mailed on Oct. 6, 2025, 5 pages.

Decision to Refuse received for European Patent Application No. 20704768.9, mailed on Nov. 10, 2025, 14 pages.

Ex Parte Quayle Action received for U.S. Appl. No. 18/972,738, mailed on Nov. 18, 2025, 8 pages.

Examiner's Answer to Appeal Brief received for U.S. Appl. No. 18/375,309, mailed on Nov. 21, 2025, 9 pages.

Office Action received for Japanese Patent Application No. 2024-110376, mailed on Oct. 27, 2025, 5 pages (2 pages of English Translation and 3 pages of Official Copy).

* cited by examiner

Portable Multifunction Device 100

210     212

208

Speaker 111     Optical Sensor 164     Proximity Sensor 166

200

206

210 is SIM card slot
212 is headphone jack

208

202

Touch Screen 112

Contact Intensity Sensor(s) 165

Tactile Output Generator(s) 167

203

Microphone 113     Home 204     Accelerometer(s) 168

External Port 124

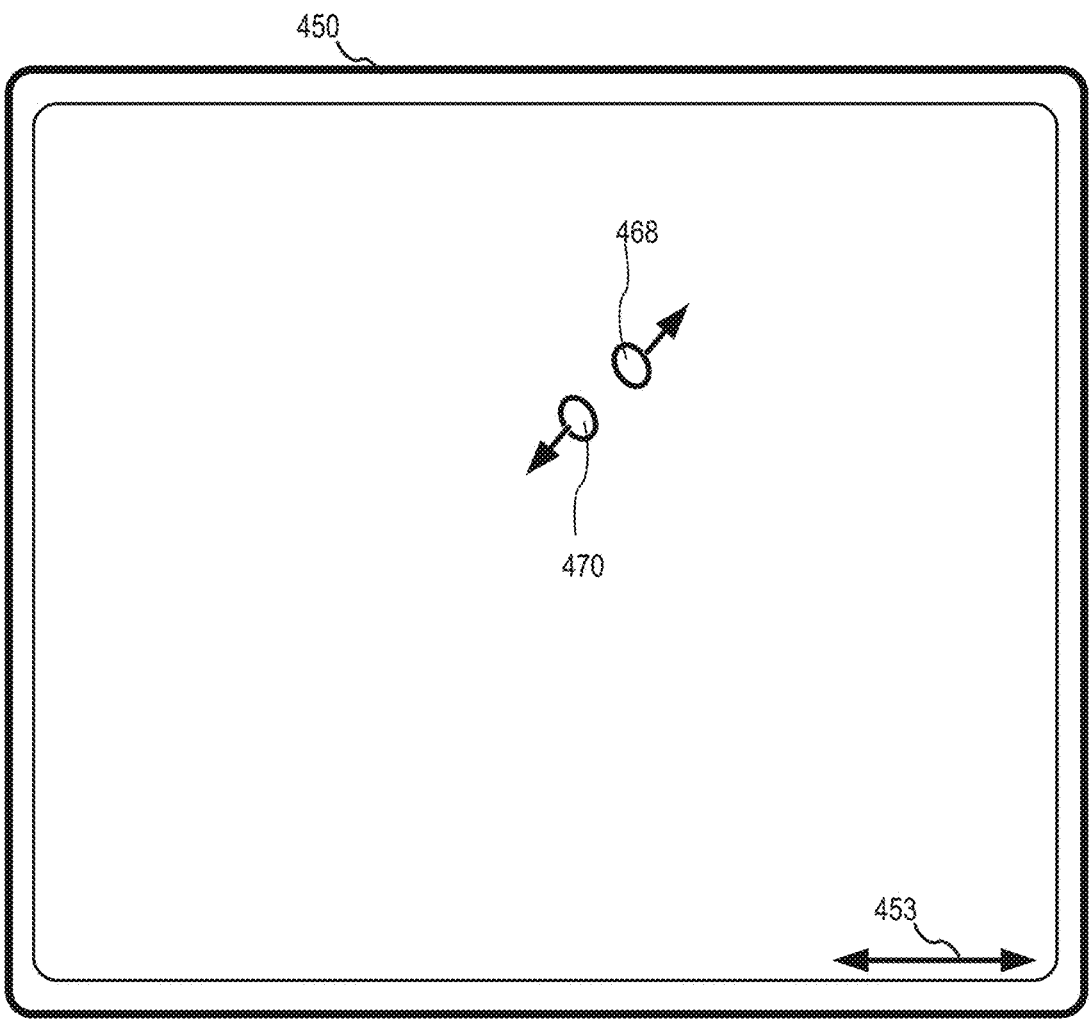
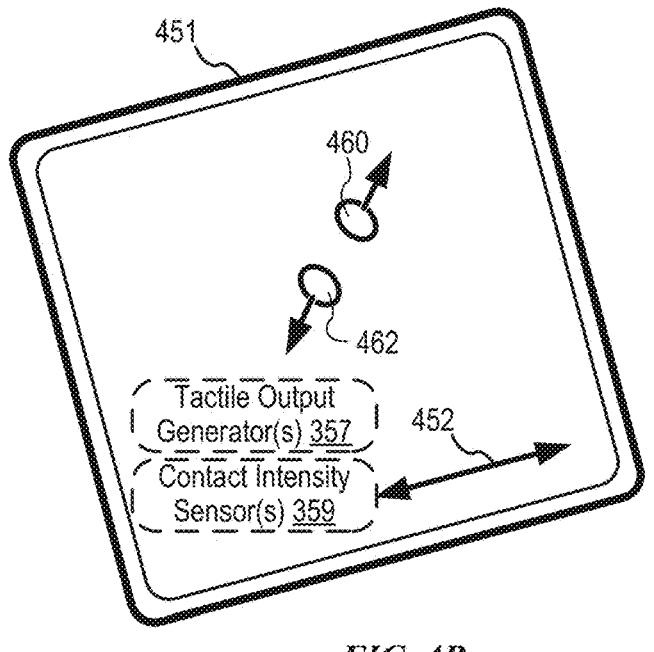
*FIG. 4B*

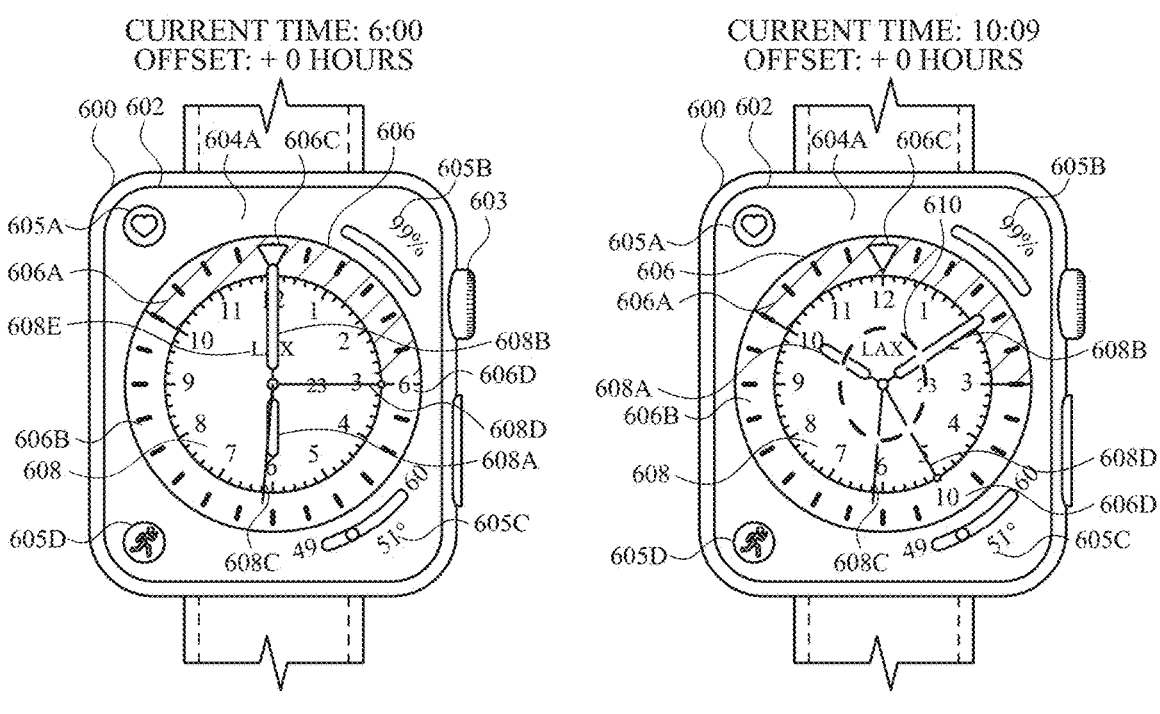
FIG. 6A          FIG. 6B
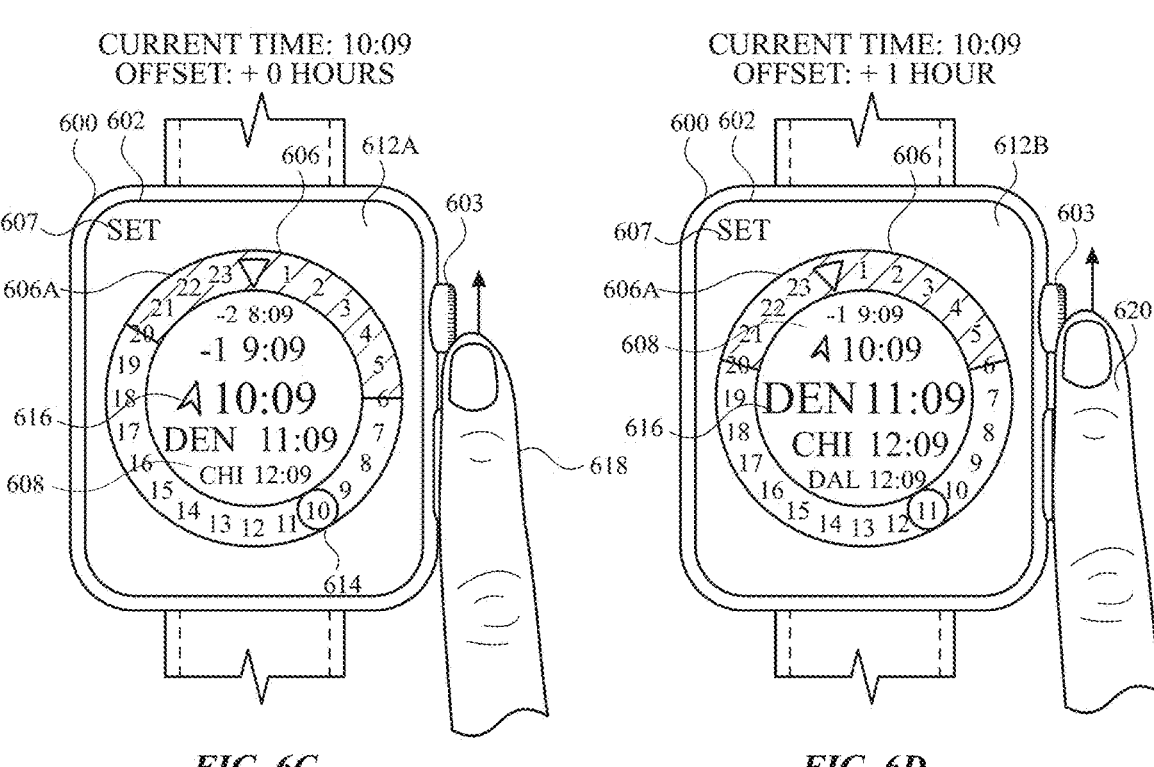
FIG. 6C          FIG. 6D

700

702
Display, via the display generation component, a watch user interface, wherein displaying the watch user interface includes concurrently displaying:

704
A first analog dial and a first time indicator that indicates a current time in a first time zone on the first analog dial.

706
A second analog dial and a second time indicator that indicates a current time in a second time zone on the second analog dial, wherein the second analog dial is displayed at a first orientation relative to the first analog dial

708
After displaying the watch user interface with the first analog dial and the second analog dial that is displayed at a first orientation relative to the first analog dial:

710
Receive, via the one or more input devices, a request to change a time zone associated with the second analog dial.

712
Receiving the request to change the time zone associated with the second analog dial includes detecting, via the one or more input devices, user input directed to a location on the watch user interface.

714
Receiving the request to change the time zone associated with the second analog dial includes detecting, via the one or more input devices, rotational input of a rotatable input mechanism.

*FIG. 7A*

716
In response to receiving the request to change the time zone associated with the second analog dial:

718
Change the time zone associated with the second analog dial to a third time zone that is different from the first time zone.

720
While the second analog dial is associated with the third time zone:

722
Display, via the display generation component, the watch user interface, wherein displaying the watch user interface includes concurrently displaying:

724
The first analog dial and the first time indicator indicating a current time in the first time zone on the first analog dial.

726
The second analog dial and the second time indicator indicating a current time in the third time zone on the second analog dial, wherein the second analog dial is displayed at a second orientation relative to the first analog dial.

728
Display, in the second analog dial, a numerical indication of an hour of the current time in the third time zone without displaying, in the second analog dial, a numerical indication of any other hour.

*FIG. 7B*

730
The watch user interface includes a text indication of a location associated with the second analog dial.

732
The second analog dial includes:

734
A first portion that corresponds to daytime in the time zone associated with the second analog dial, wherein the first portion includes a first visual characteristic.

736
A second portion that corresponds to nighttime in the time zone associated with the second analog dial, wherein the second portion includes a second visual characteristic different from the first visual characteristic.

*FIG. 7C*

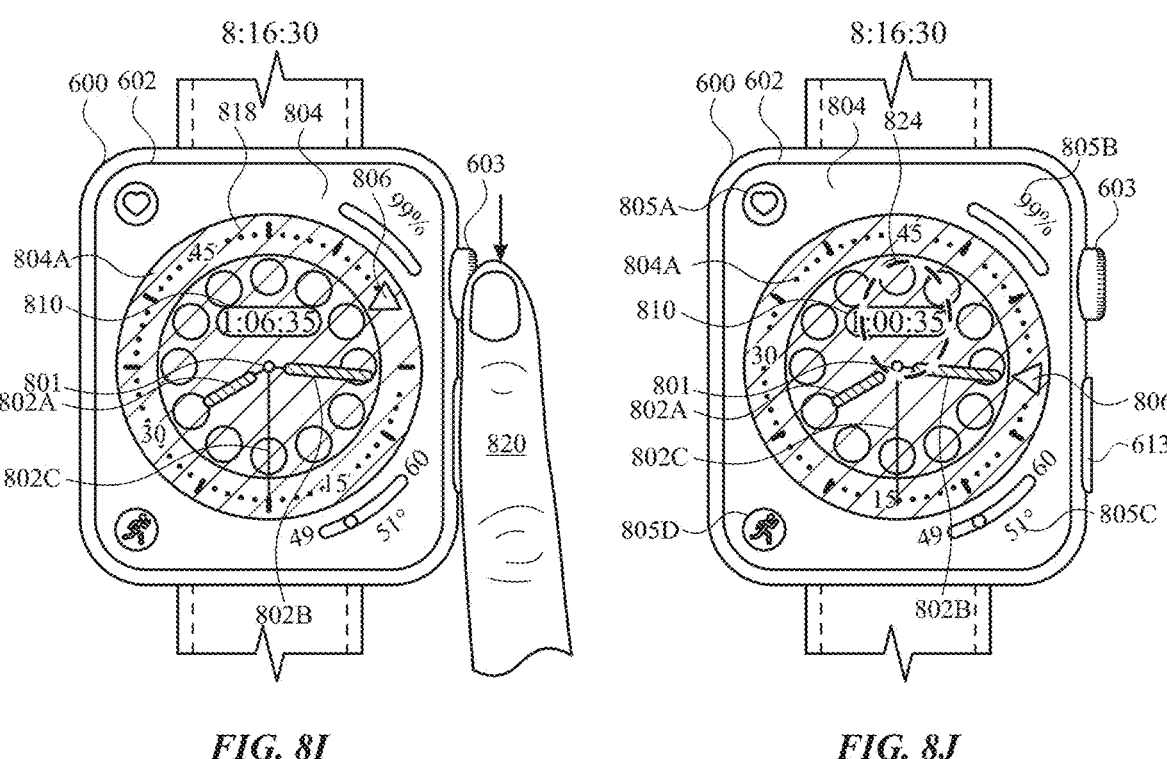
*FIG. 8I*                *FIG. 8J*
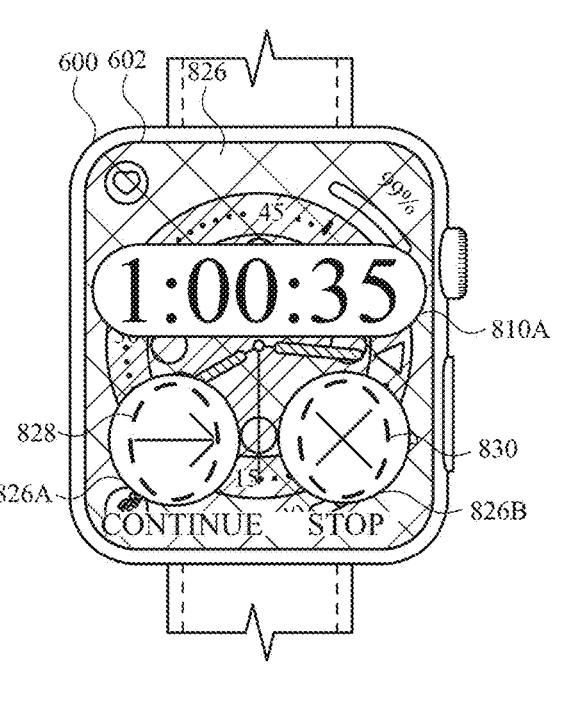
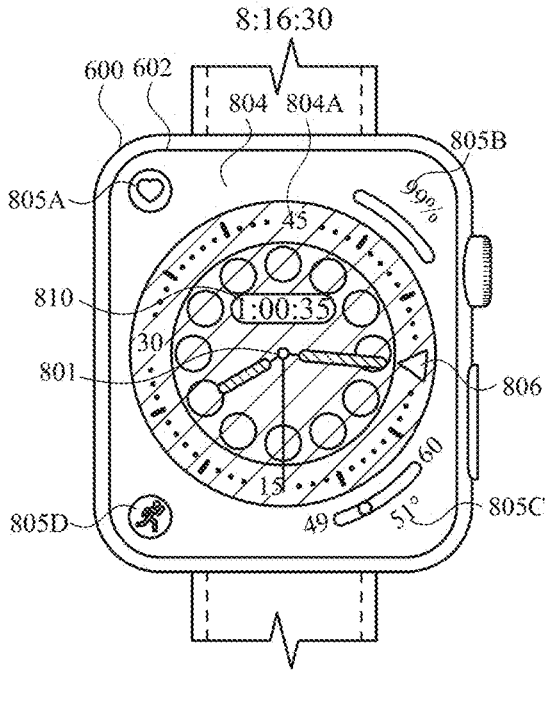
*FIG. 8K*                *FIG. 8L*

Figure 9A:
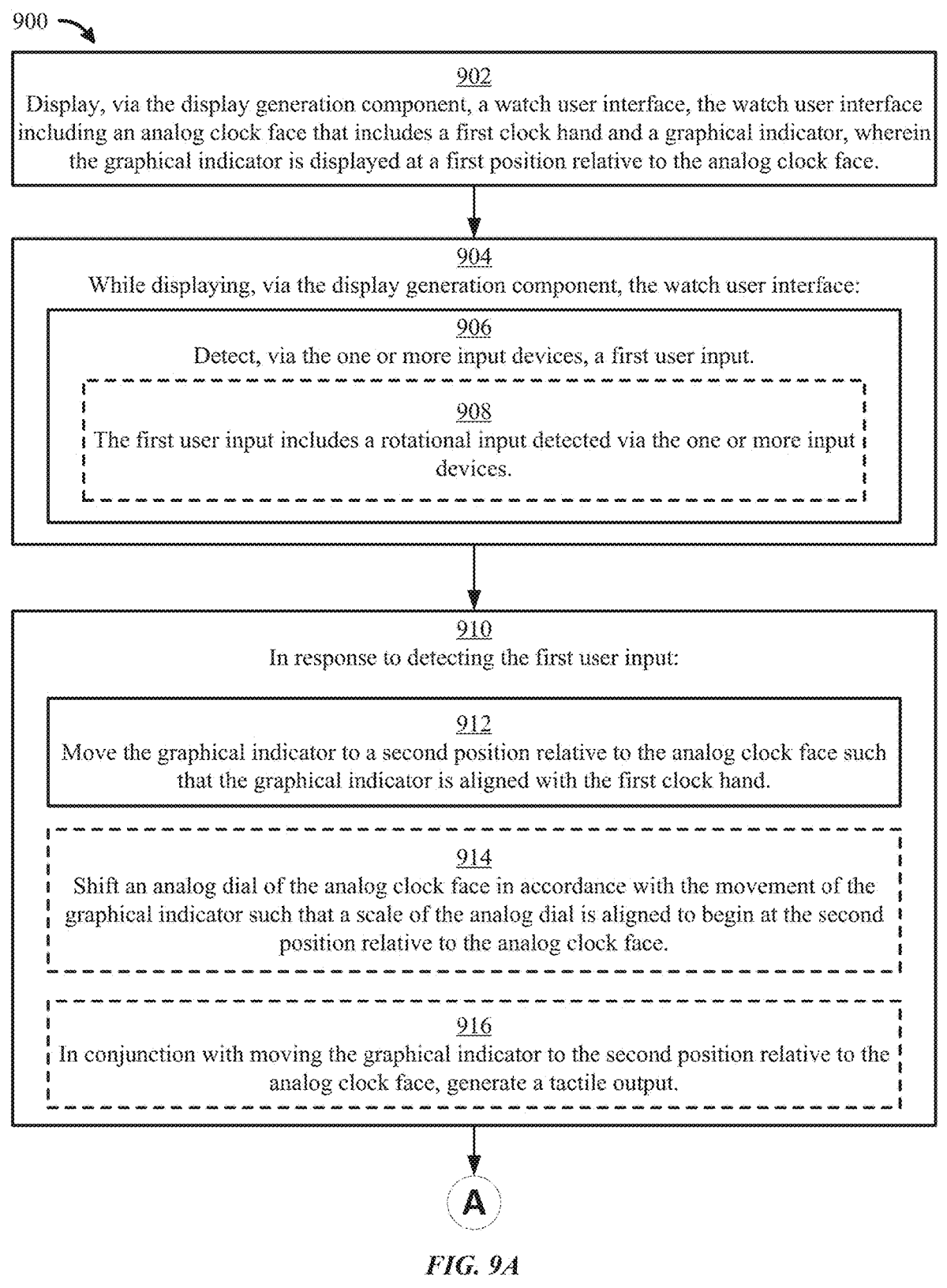

900

902
Display, via the display generation component, a watch user interface, the watch user interface including an analog clock face that includes a first clock hand and a graphical indicator, wherein the graphical indicator is displayed at a first position relative to the analog clock face.

904
While displaying, via the display generation component, the watch user interface:

906
Detect, via the one or more input devices, a first user input.

908
The first user input includes a rotational input detected via the one or more input devices.

910
In response to detecting the first user input:

912
Move the graphical indicator to a second position relative to the analog clock face such that the graphical indicator is aligned with the first clock hand.

914
Shift an analog dial of the analog clock face in accordance with the movement of the graphical indicator such that a scale of the analog dial is aligned to begin at the second position relative to the analog clock face.

916
In conjunction with moving the graphical indicator to the second position relative to the analog clock face, generate a tactile output.

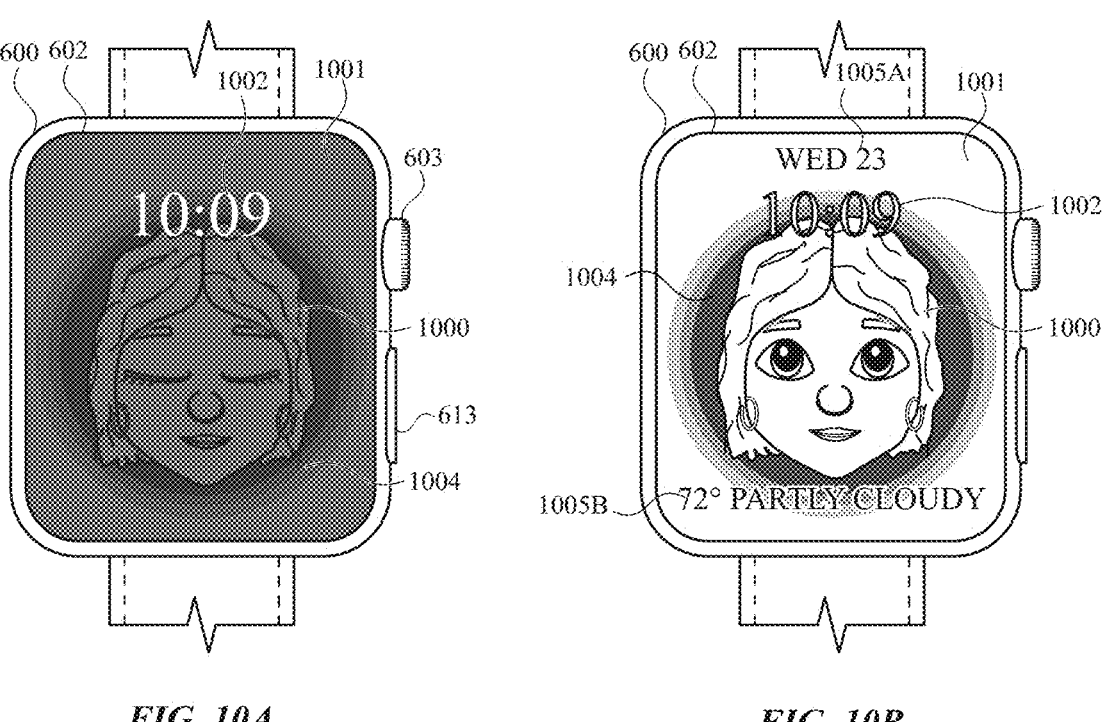
FIG. 10A            FIG. 10B
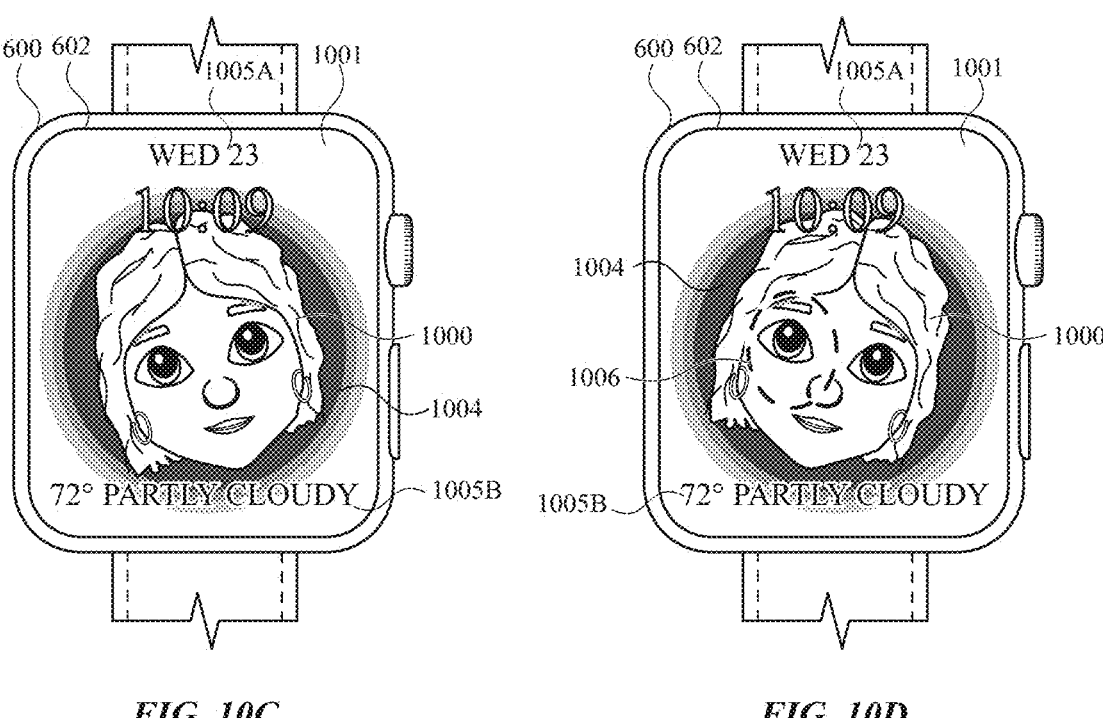
FIG. 10C            FIG. 10D

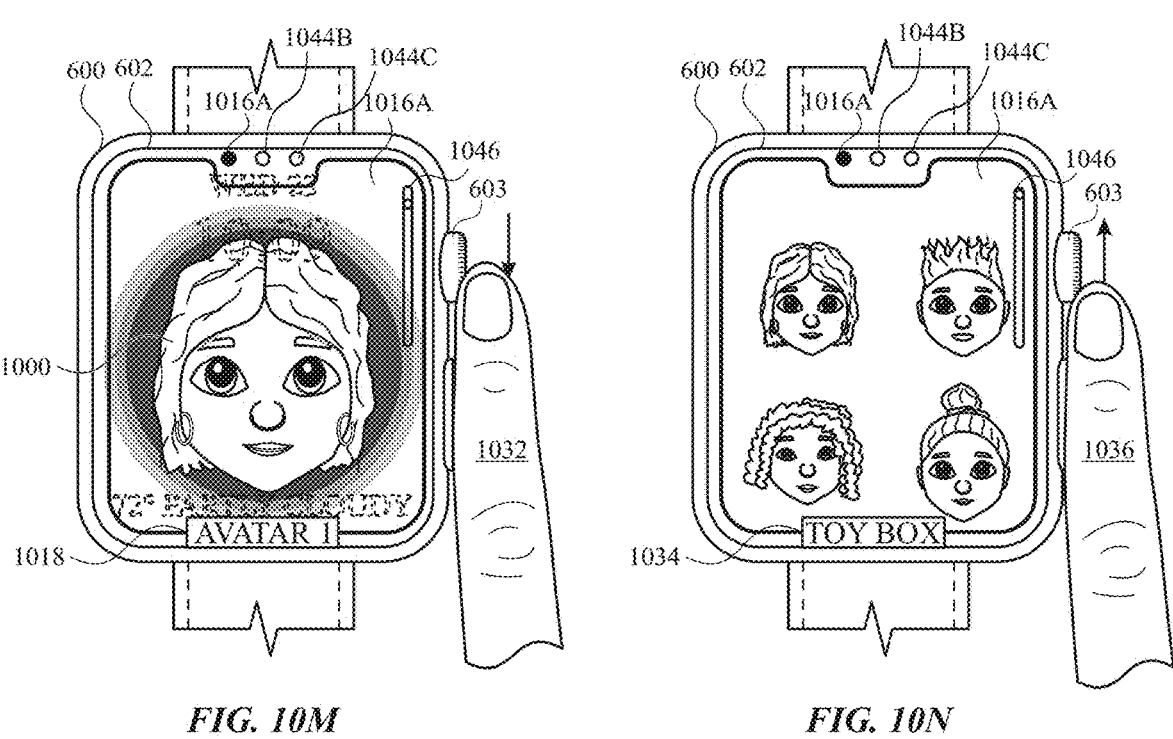
FIG. 10M                    FIG. 10N
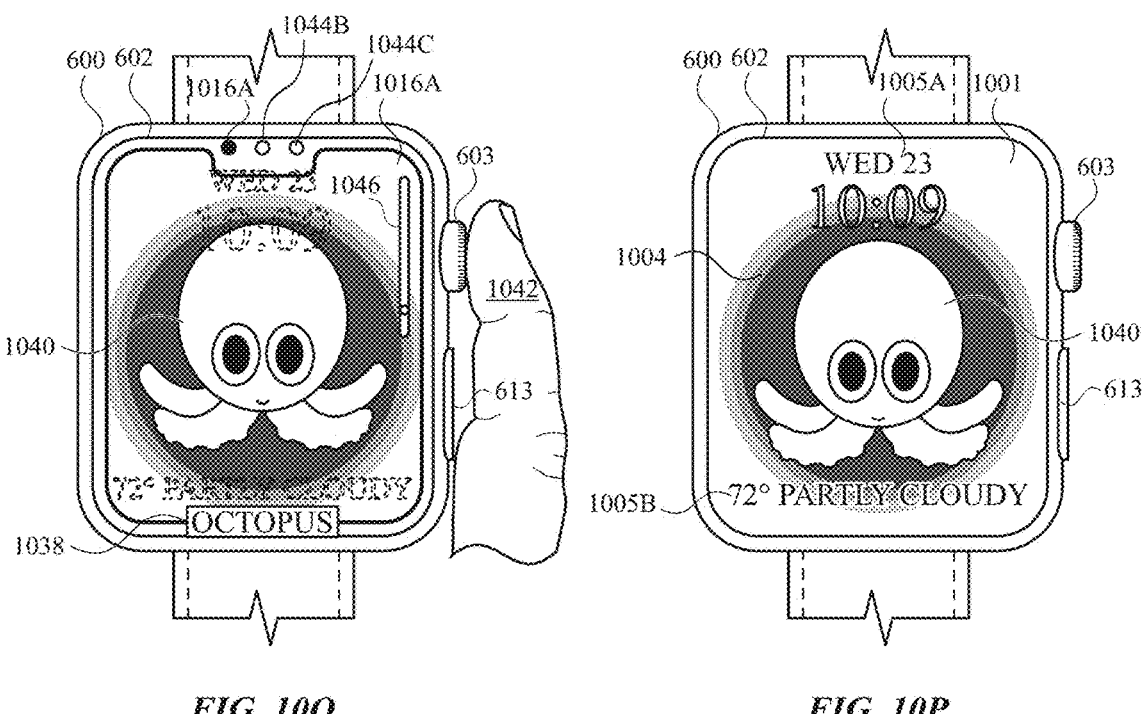
FIG. 10O                    FIG. 10P

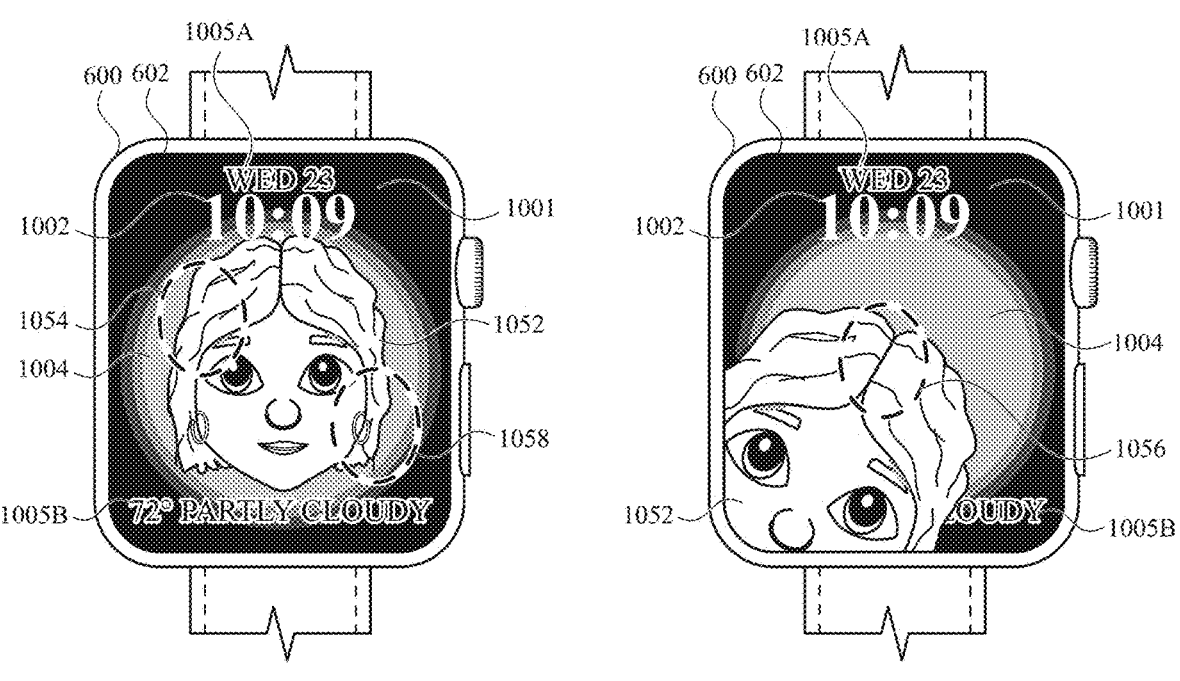
FIG. 10U                    FIG. 10V
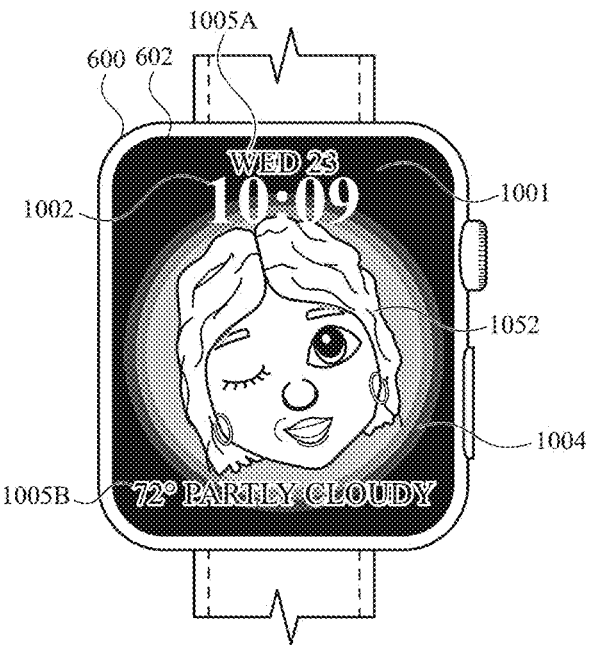
FIG. 10W

1100

---

1102

At a first time, display concurrently in a user interface displayed via the display generation component:

---

1104

An indication of time.

---

1106

A graphical representation of a first character, wherein displaying the graphical representation of the first character includes:

---

1108

In accordance with a determination that the computer system is in a first activity state, displaying the graphical representation of the first character in a first visual state that corresponds to the first activity state of the computer system.

---

1110

In accordance with a determination that the computer system is in a second activity state that is different from the first activity state, displaying the graphical representation of the first character in a second visual state, different from the first visual state, that corresponds to the second activity state of the computer system.

---

*FIG. 11A*

1112
At a second time, after the first time, display, concurrently in the user interface:

1114
The indication of time.

1116
A graphical representation of a second character, wherein displaying the graphical representation of the second character includes:

1118
In accordance with a determination that the computer system is in the first activity state, displaying the graphical representation of the second character in the first visual state that corresponds to the first activity state of the computer system.

1120
In accordance with a determination that the computer system is in the second activity state that is different from the first activity state, displaying the graphical representation of the second character in the second visual state, different from the first visual state, that corresponds to the second activity state of the computer system.

*FIG. 11B*

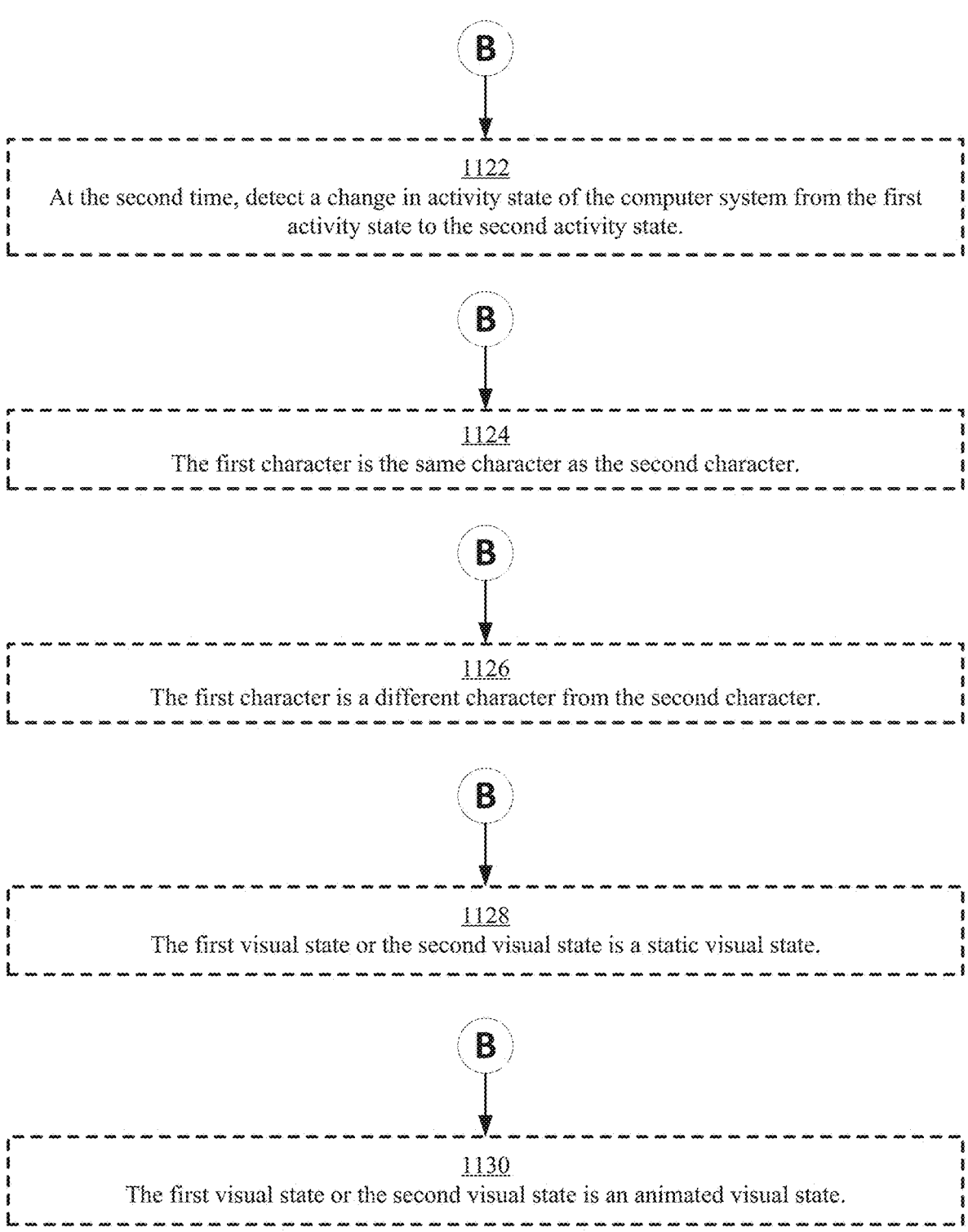

1122
At the second time, detect a change in activity state of the computer system from the first
activity state to the second activity state.

1124
The first character is the same character as the second character.

1126
The first character is a different character from the second character.

1128
The first visual state or the second visual state is a static visual state.

1130
The first visual state or the second visual state is an animated visual state.

*FIG. 11C*

1132
At the second time, detect a change in activity state of the computer system from the first activity state to the second activity state.

1134
In response to detecting the change in activity state of the computer system from the first activity state to the second activity state:

> 1136
> Display, in the user interface, the graphical representation of the second character.

> 1138
> Cease to display, in the user interface, the graphical representation of the first character, wherein the second character is different from the first character.

> 1140
> Decrease a brightness of a portion of the user interface that included the graphical element.

1142
At a third time, detect a change in activity state of the computer system from the second activity state to the first activity state.

1144
In response to detecting the change in activity state of the computer system from the second activity state to the first activity state, maintain display, in the user interface, of the graphical representation of the second character, wherein the graphical representation of the second character includes an animated visual state.

*FIG. 11D*

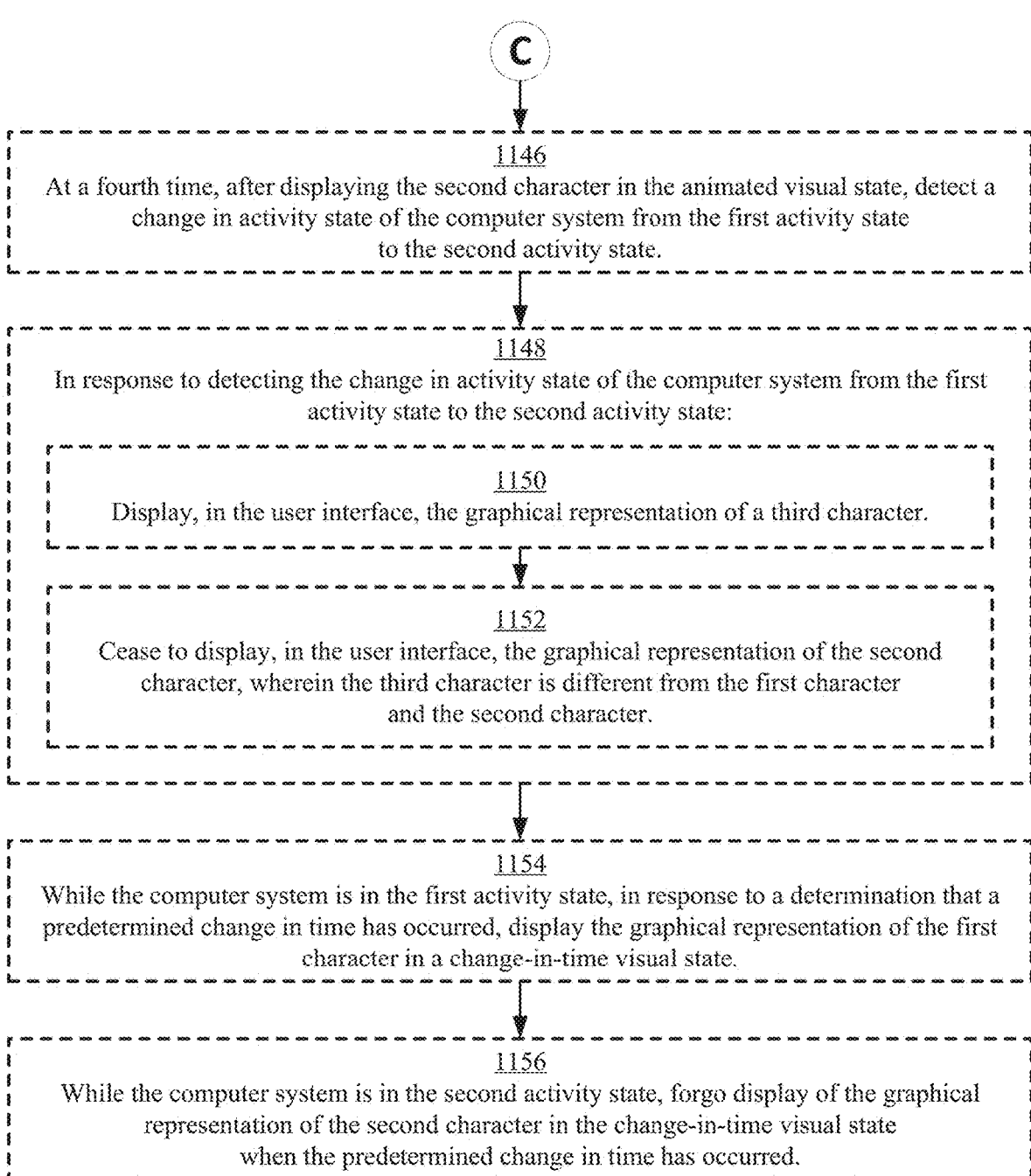

1146
At a fourth time, after displaying the second character in the animated visual state, detect a change in activity state of the computer system from the first activity state to the second activity state.

1148
In response to detecting the change in activity state of the computer system from the first activity state to the second activity state:

1150
Display, in the user interface, the graphical representation of a third character.

1152
Cease to display, in the user interface, the graphical representation of the second character, wherein the third character is different from the first character and the second character.

1154
While the computer system is in the first activity state, in response to a determination that a predetermined change in time has occurred, display the graphical representation of the first character in a change-in-time visual state.

1156
While the computer system is in the second activity state, forgo display of the graphical representation of the second character in the change-in-time visual state when the predetermined change in time has occurred.

*FIG. 11E*

1184
Display, via the display generation component, a fifth user interface for selecting between a first set of characters that includes a plurality of user-customizable virtual avatars and a graphical representation of a second set of characters that includes two or more predetermined characters that are not available in the first set of characters.

1186
While displaying the third user interface, detect an input corresponding to selection of the first set of characters or the second set of characters.

1188
In accordance with a determination that the input corresponds to selection of the first set of characters, concurrently display, in the user interface:

1190
The indication of time.

1192
A graphical representation of a currently selected character from the first set of characters, wherein the currently selected character is automatically changed between different characters in the first set of characters when predetermined criteria are met.

1194
In accordance with a determination that the input corresponds to selection of the second set of characters, concurrently display, in the user interface:

1196
The indication of time.

1198
A graphical representation of a currently selected character from the second set of characters, wherein the currently selected character is automatically changed between different characters in the second set of characters when the predetermined criteria are met.

*FIG. 11H*

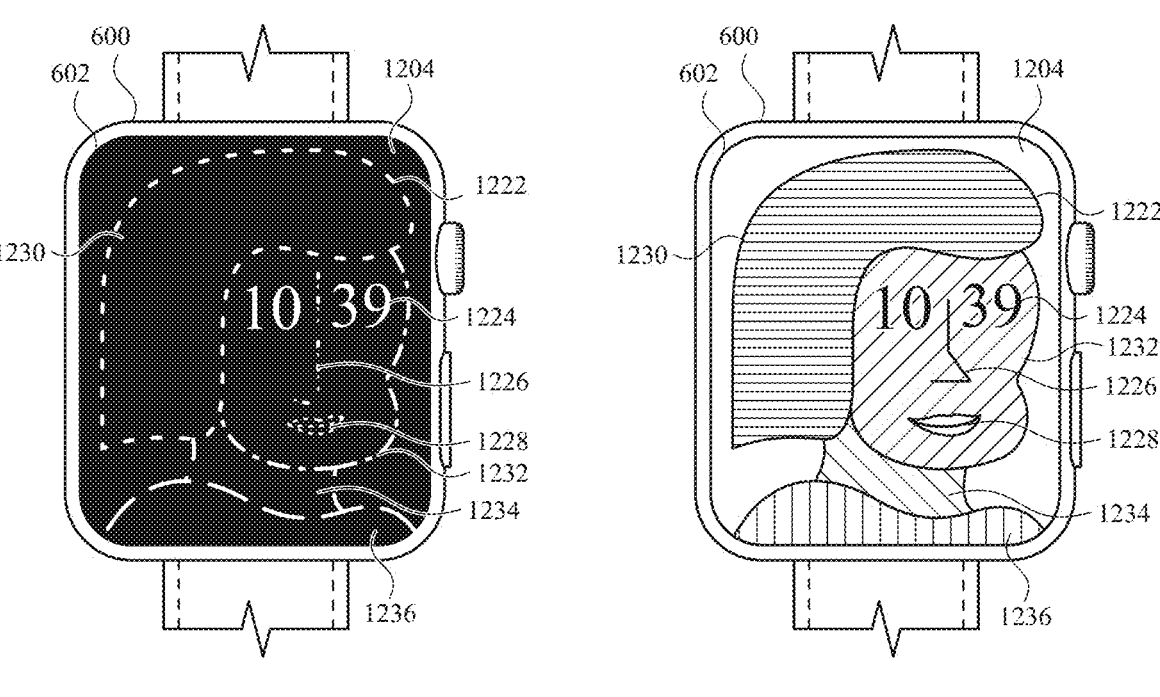
FIG. 12E                    FIG. 12F
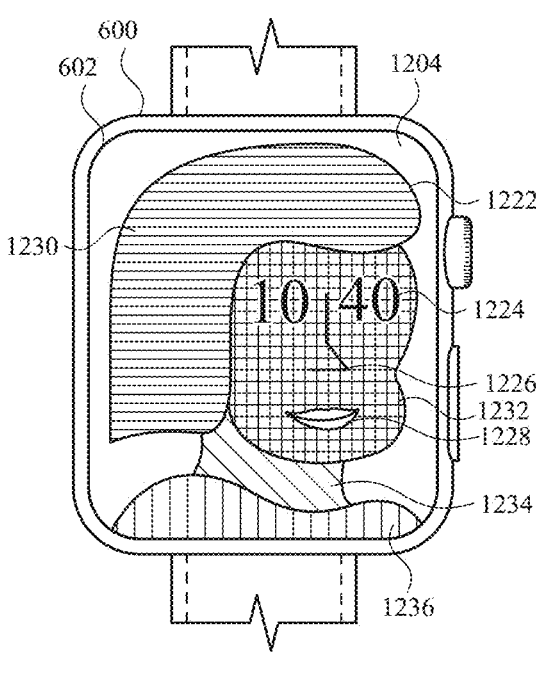
FIG. 12G

1300

1302
Display, via the display generation component, a time user interface that includes a representation of a first face having a first facial feature and a second facial feature.

1304
The first facial feature of the first face indicates a current time.

1306
The second facial feature of the first face has a first visual characteristic.

1308
While displaying the representation of the first face:

1310
Detect the satisfaction of a predetermined criteria for changing an appearance of the time user interface.

1312
The predetermined criteria for changing the appearance of the time user interface includes a criterion that is satisfied when a predetermined time has elapsed.

1314
The predetermined criteria for changing the appearance of the time user interface includes a criterion that is satisfied when a predefined movement has been detected.

1316
The predetermined criteria for changing the appearance of the time user interface includes a criterion that is satisfied when a change in state of the computer system has been detected.

<u>1318</u>
In response to detecting the satisfaction of the predetermined criteria for changing an appearance of the time user interface:

<u>1320</u>
Cease to display the representation of the first face.

<u>1322</u>
Display a representation of a second face having a first facial feature and a second facial feature.

<u>1324</u>
The representation of the second face is different from the representation of the first face.

<u>1326</u>
The first facial feature of the second face indicates a current time.

<u>1328</u>
The second facial feature of the second face has a second visual characteristic different from the first visual characteristic.

<u>1330</u>
Ceasing to display the representation of the first face and displaying the representation of the second face includes displaying a gradual transition from the first face to the second face that includes transitioning the second facial feature of the first face from having the first visual characteristic through a plurality of intermediate states to a final state in which the second facial feature of the second face has the second visual characteristic.

*FIG. 13B*

1332
The second face includes a primary color scheme, and the second visual characteristic for the second facial feature of the second face is a second color that is based on the primary color scheme.

1334
The second facial feature of the second face is selected from the group consisting of: hair, facial outline, nose, eyes, neck, and shoulders.

1336
The second visual characteristic for the second facial feature of the first face is a third color, and the second visual characteristic for the second facial feature of the second face is a fourth color different from the third color, wherein the fourth color is programmatically selected, without user input, from a plurality of available colors by the computer system.

*FIG. 13C*

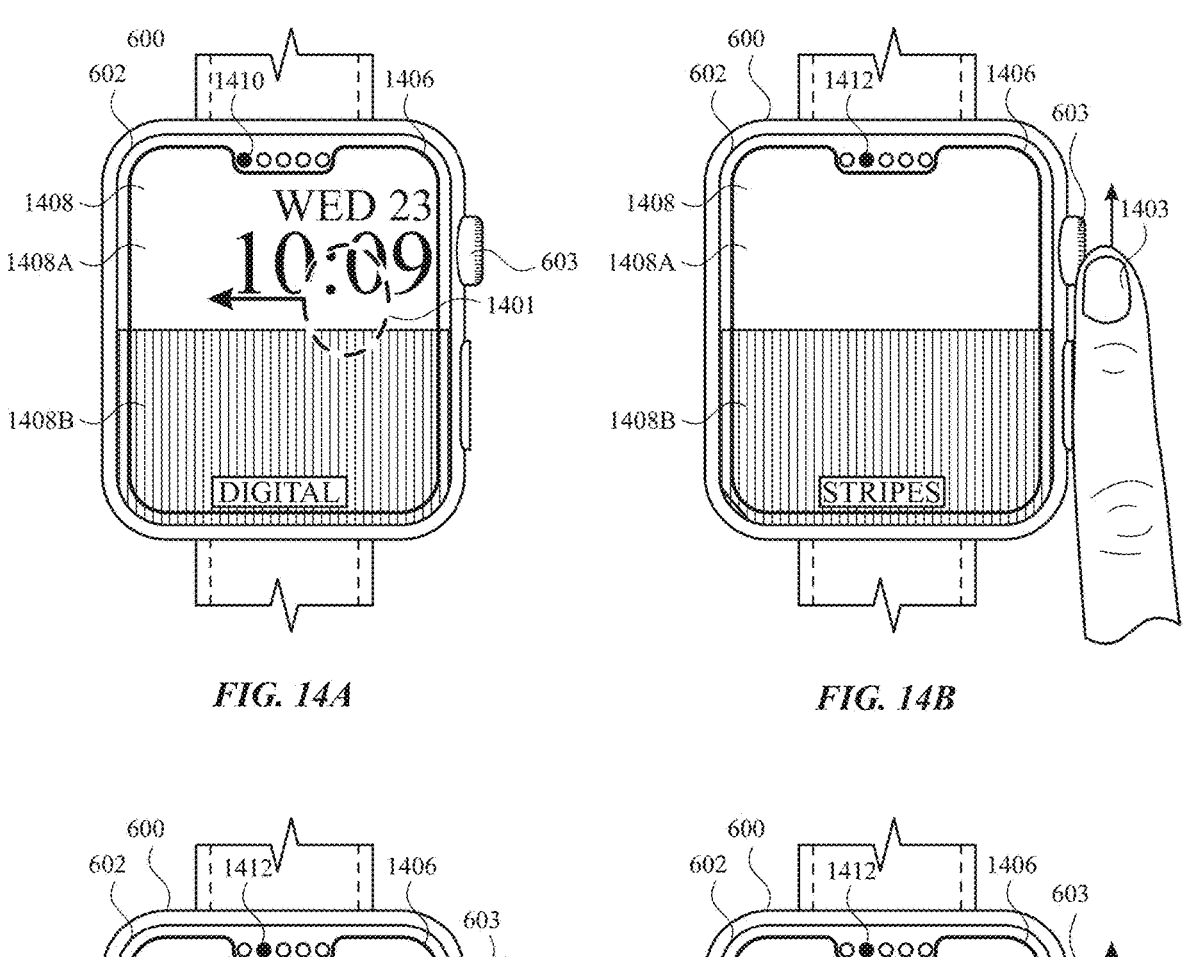
FIG. 14A
FIG. 14B
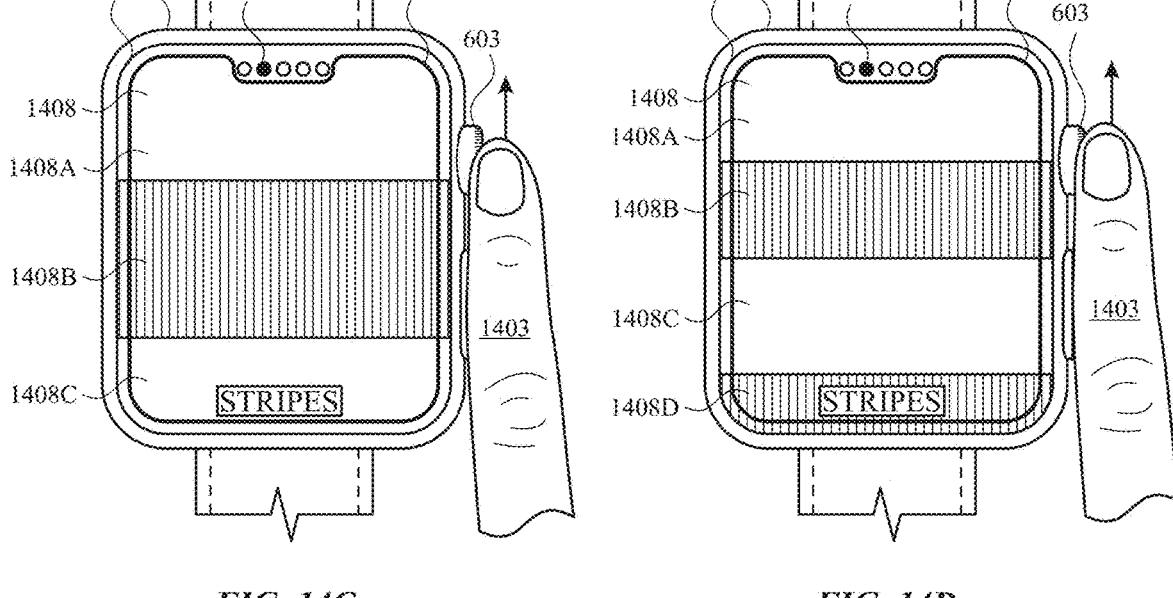
FIG. 14C
FIG. 14D

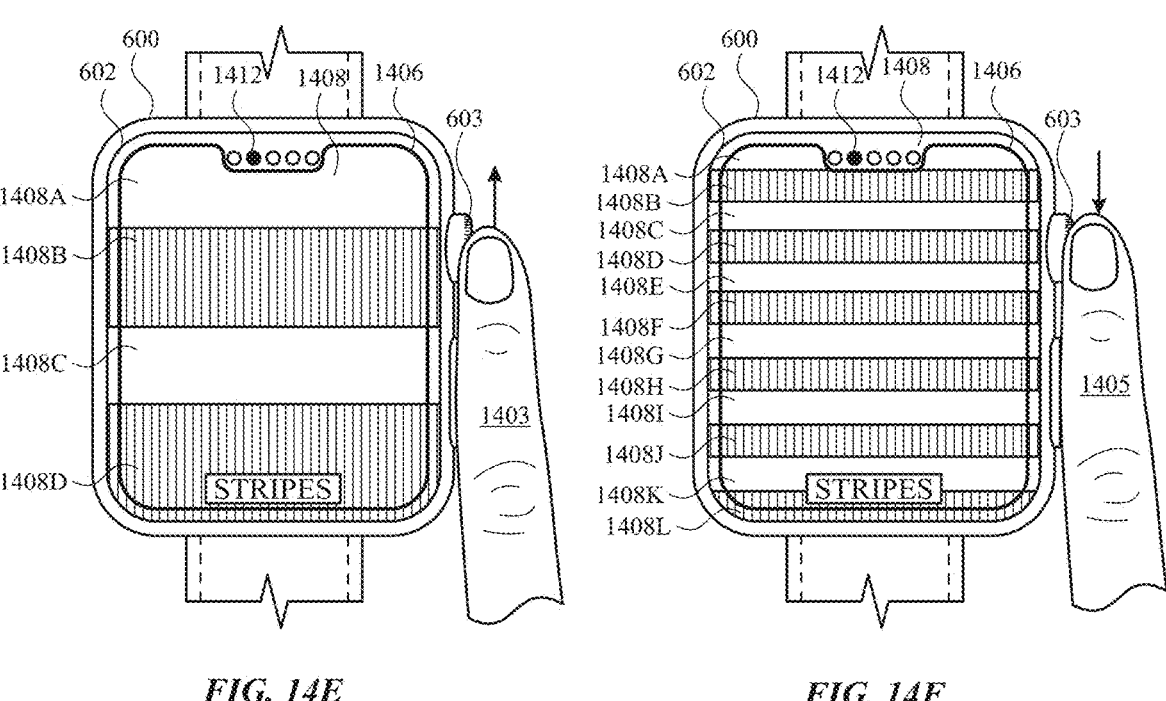
FIG. 14E
FIG. 14F
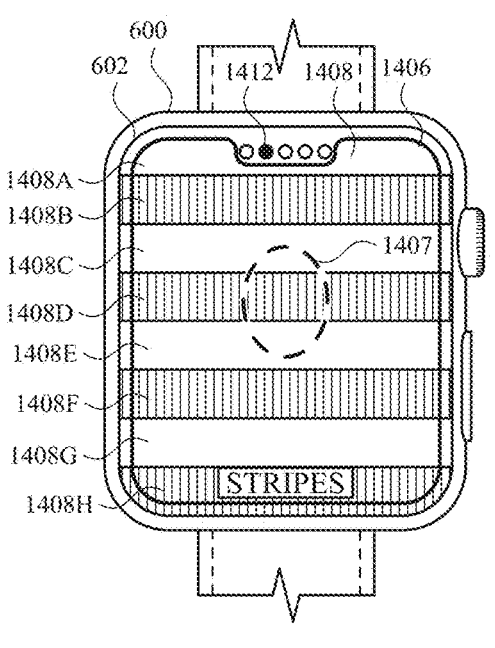
FIG. 14G
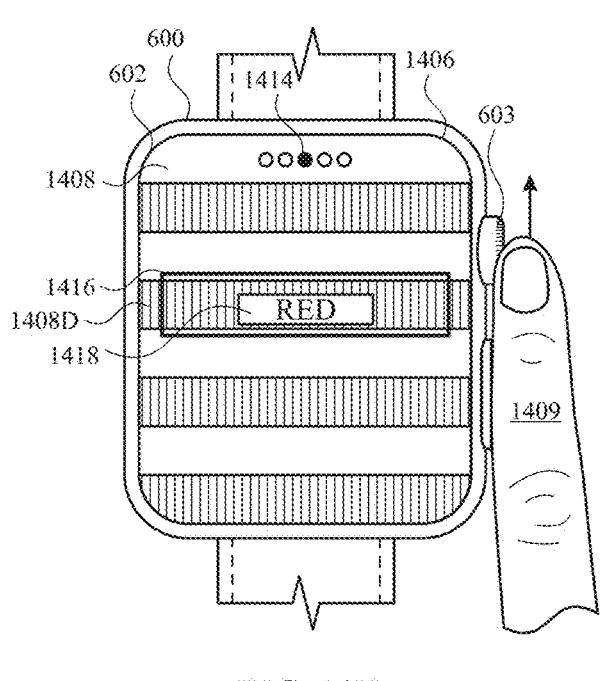
FIG. 14H

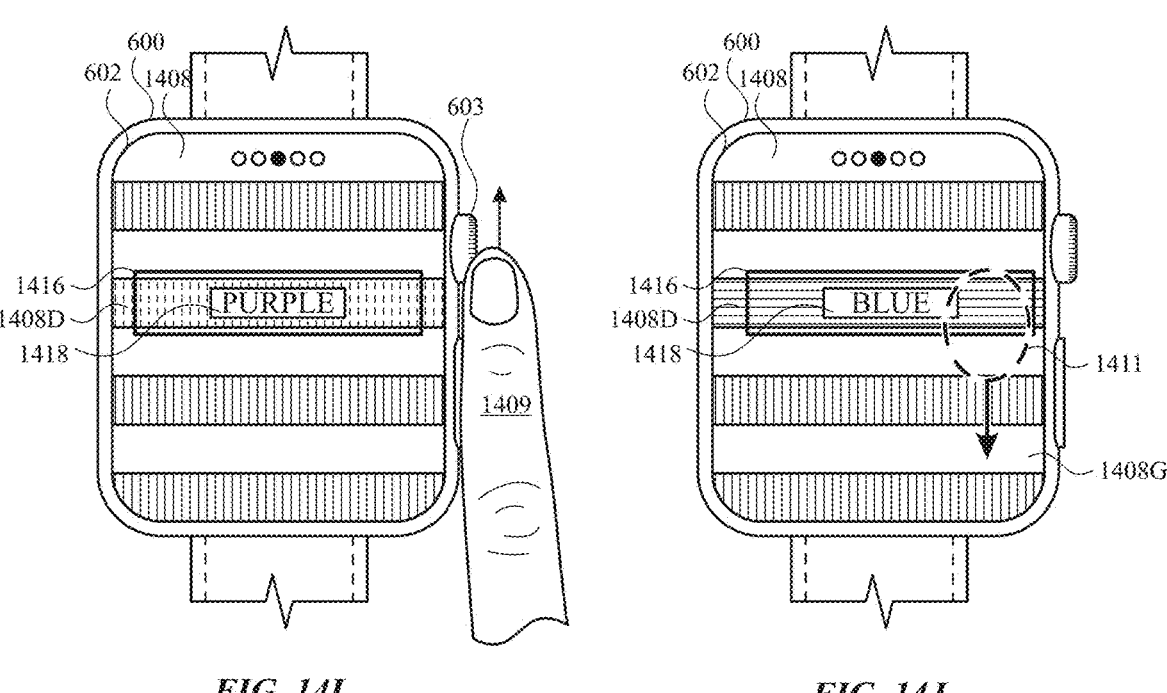
FIG. 14I                          FIG. 14J
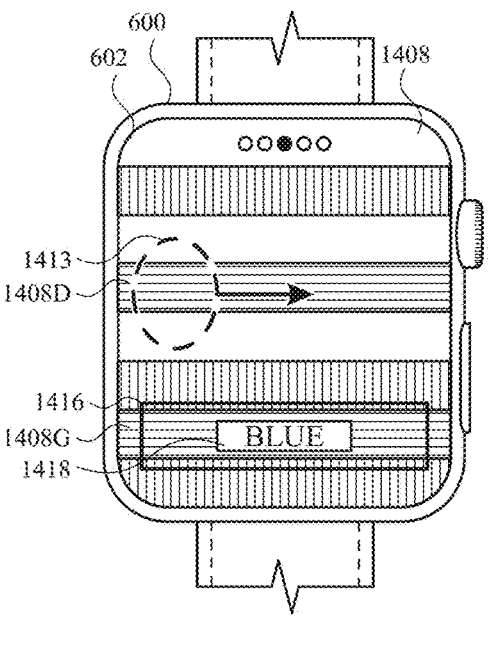
FIG. 14K
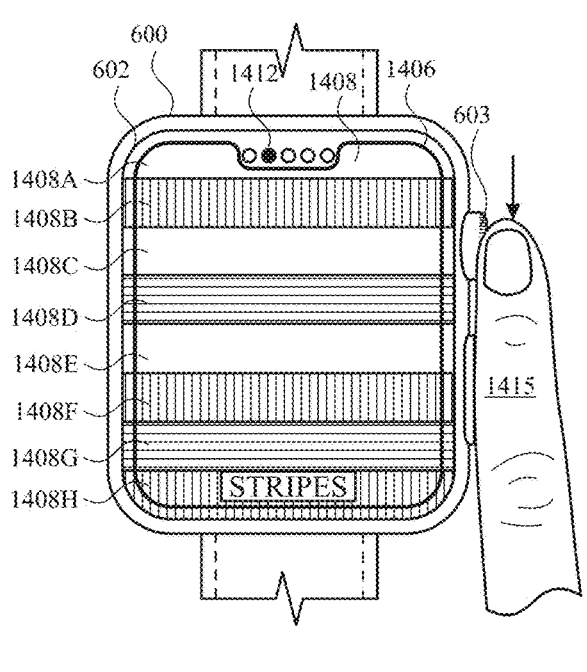
FIG. 14L

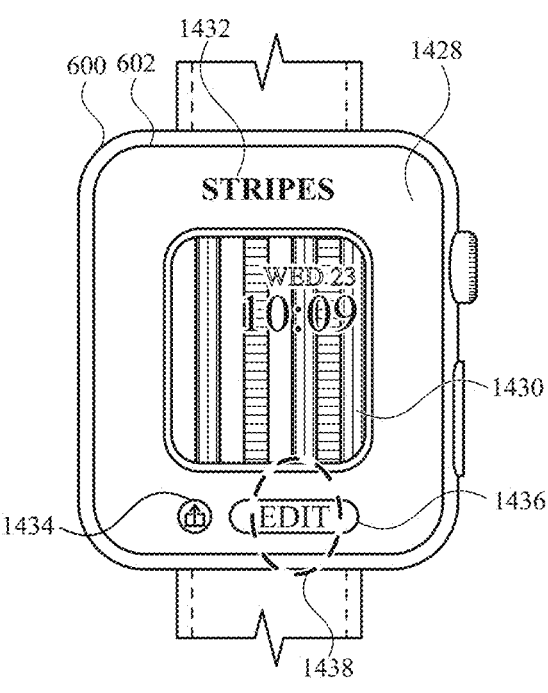
FIG. 14S
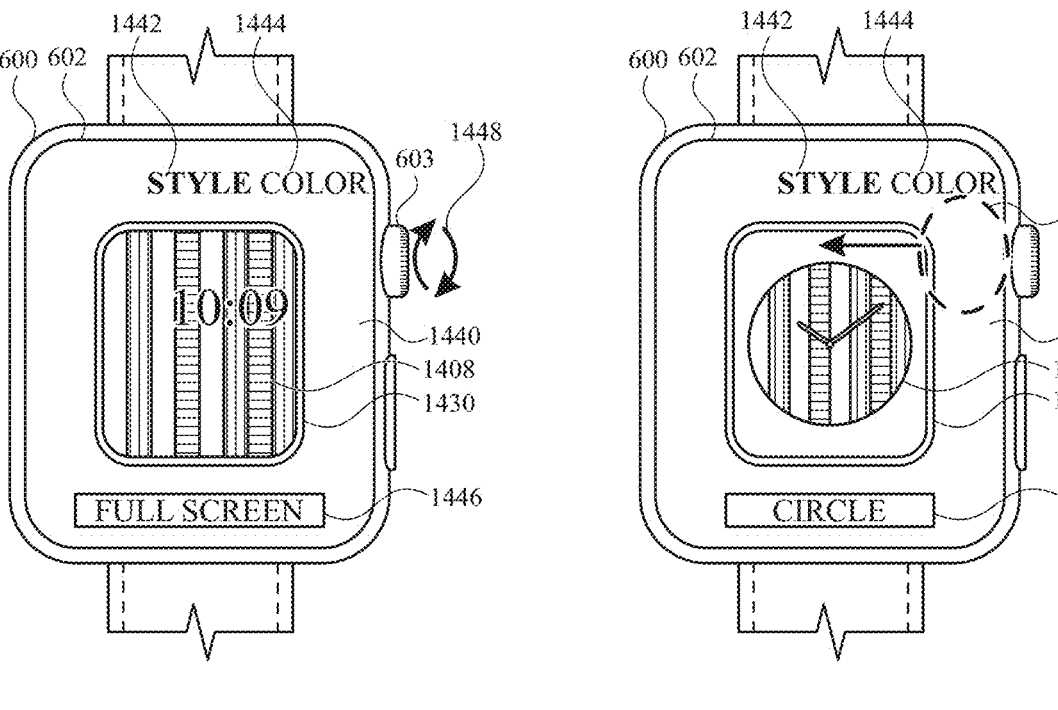
FIG. 14T          FIG. 14U

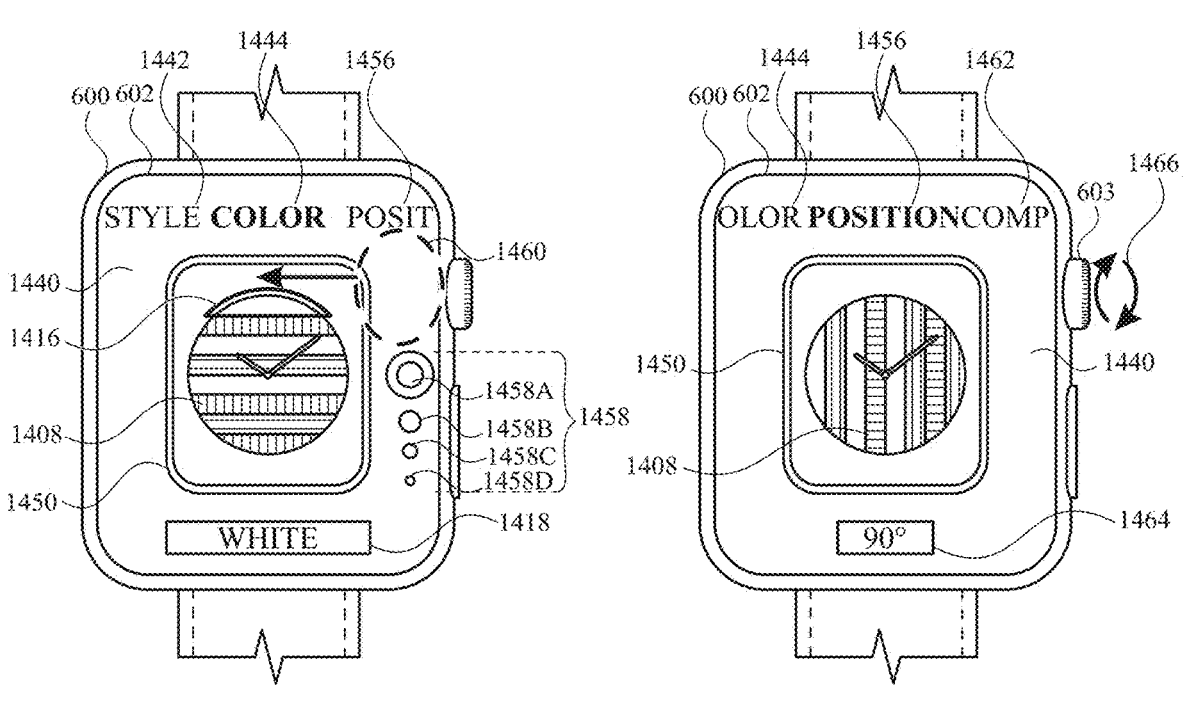
FIG. 14V           FIG. 14W
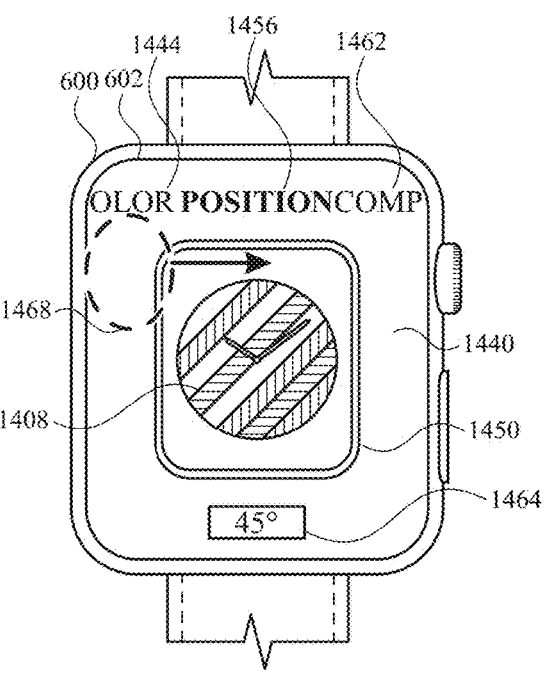
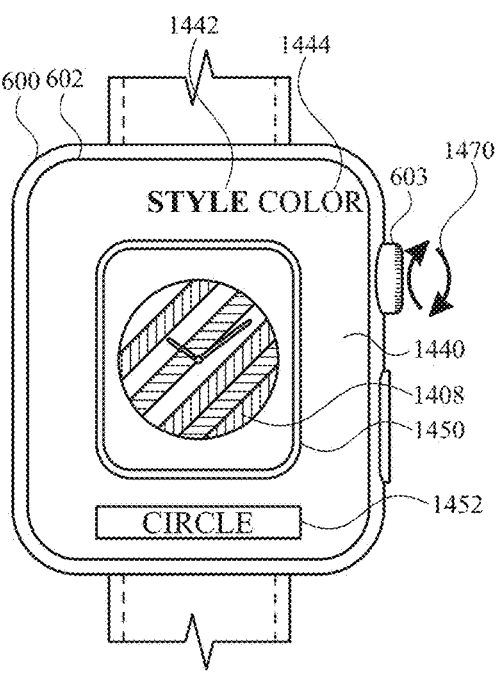
FIG. 14X           FIG. 14Y

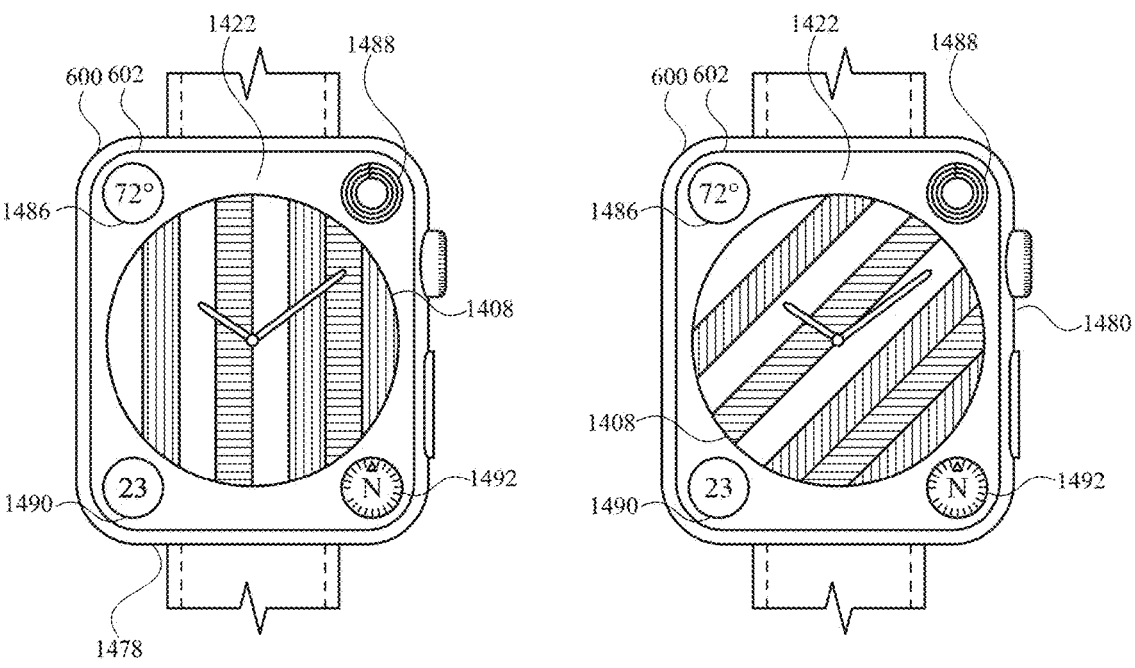
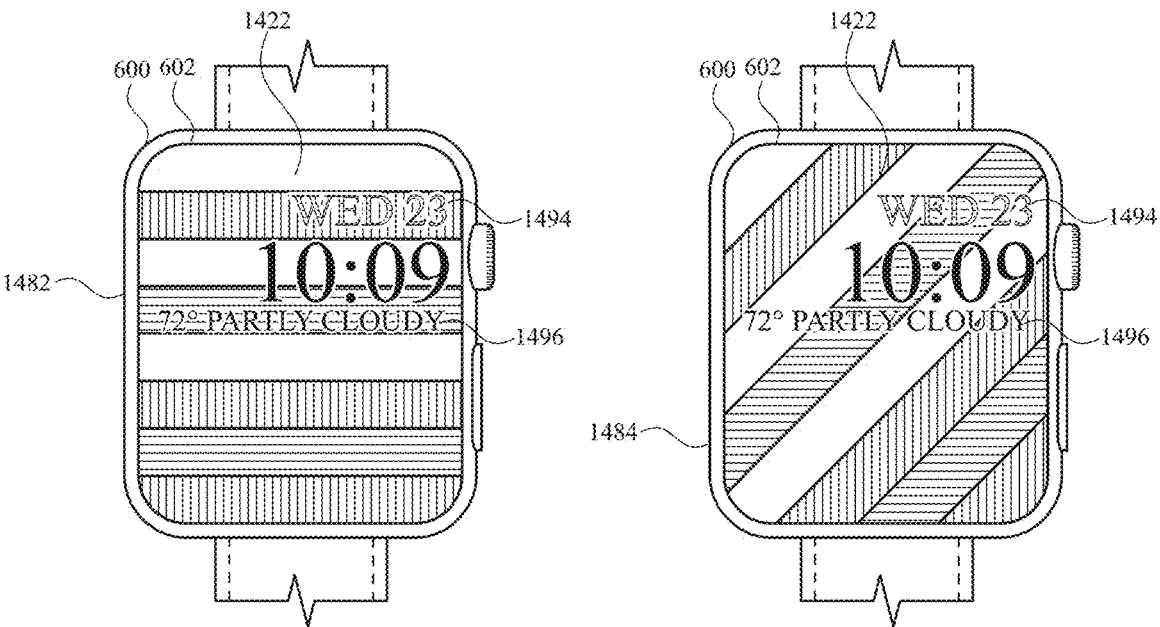
_FIG. 14AD_

1500

---

1502
Display, via the display generation component, an editing user interface for editing a background of a user interface.

> 1504
> The user interface includes content overlaid on the background

> 1506
> The editing user interface includes a representation of the background of the user interface that includes a first number of stripes that is greater than one.

> 1508
> The user interface is a watch user interface.

> 1510
> The content is an indication of a current time or current date.

---

1512
While displaying the editing user interface:

> 1514
> Detect, via the one or more input devices, a first user input.

> 1516
> Display, in the editing user interface, a user interface for editing a number of stripes of the representation of the background of the user interface, wherein the user interface for editing the number of stripes includes the representation of the background of the user interface.

1518
In response to detecting the first user input:

1520
In accordance with a determination that the first user input corresponds to a first type of input, display, in the user interface, a representation of an updated background with a second number of stripes that is greater than the first number of stripes.

1522
The first number of stripes are arranged in a first visual pattern of stripes of different colors and the second number of stripes are arranged in the first visual pattern of stripes of different colors.

1524
In accordance with a determination that the first user input corresponds to a second type of input different from the first type of input, display, in the user interface, the representation of the updated background with a third number of stripes that is less than the first number of stripes.

1526
Detect, via the one or more input devices, a second user input.

1528
In response to detecting the second user input:

1530
Display, via the display generation component, the user interface with the updated background.

*FIG. 15B*

1532
While displaying the representation of the updated background with the third number of stripes, wherein the third number of stripes are arranged in a second visual pattern of stripes of different colors:

1534
Detect, via the one or more input devices, a third user input.

1536
In response to detecting the third user input:

1538
Display, in the user interface, the representation of the updated background with the first number of stripes, wherein the first number of stripes are arranged in the second visual pattern of stripes of different colors.

1540
While displaying the user interface, receive a request to display a watch face with a first arrangement of stripes.

1542
In response to the request to display the watch face:

1544
In accordance with a determination that the first arrangement of stripes is displayed within a first boundary, display the first arrangement of stripes with a first width.

1546
In accordance with a determination that the first arrangement of stripes is displayed within a second boundary that is different from the first boundary, display the first arrangement of stripes with a second width that is different from the first width.

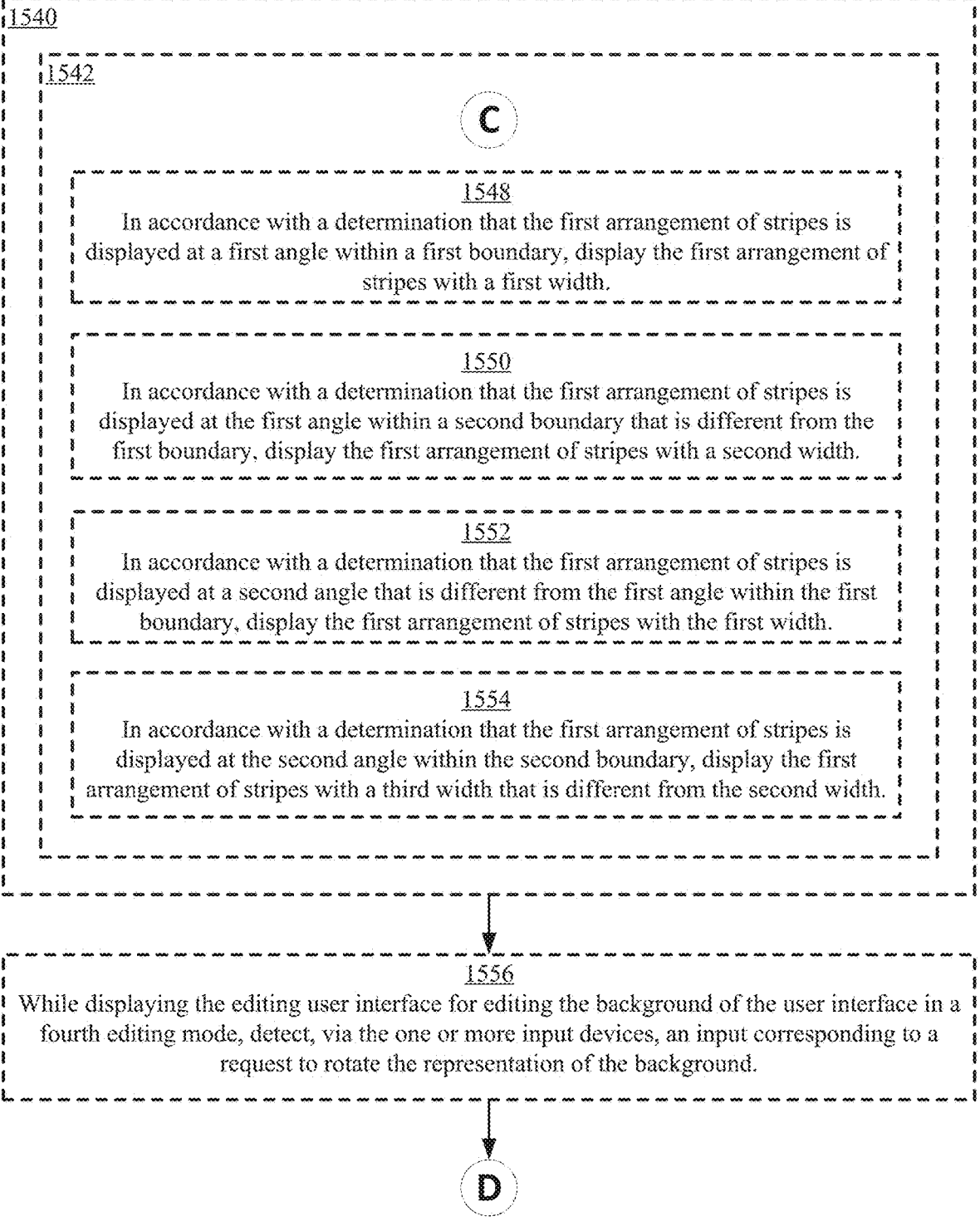

1540

1542

C

1548
In accordance with a determination that the first arrangement of stripes is displayed at a first angle within a first boundary, display the first arrangement of stripes with a first width.

1550
In accordance with a determination that the first arrangement of stripes is displayed at the first angle within a second boundary that is different from the first boundary, display the first arrangement of stripes with a second width.

1552
In accordance with a determination that the first arrangement of stripes is displayed at a second angle that is different from the first angle within the first boundary, display the first arrangement of stripes with the first width.

1554
In accordance with a determination that the first arrangement of stripes is displayed at the second angle within the second boundary, display the first arrangement of stripes with a third width that is different from the second width.

1556
While displaying the editing user interface for editing the background of the user interface in a fourth editing mode, detect, via the one or more input devices, an input corresponding to a request to rotate the representation of the background.

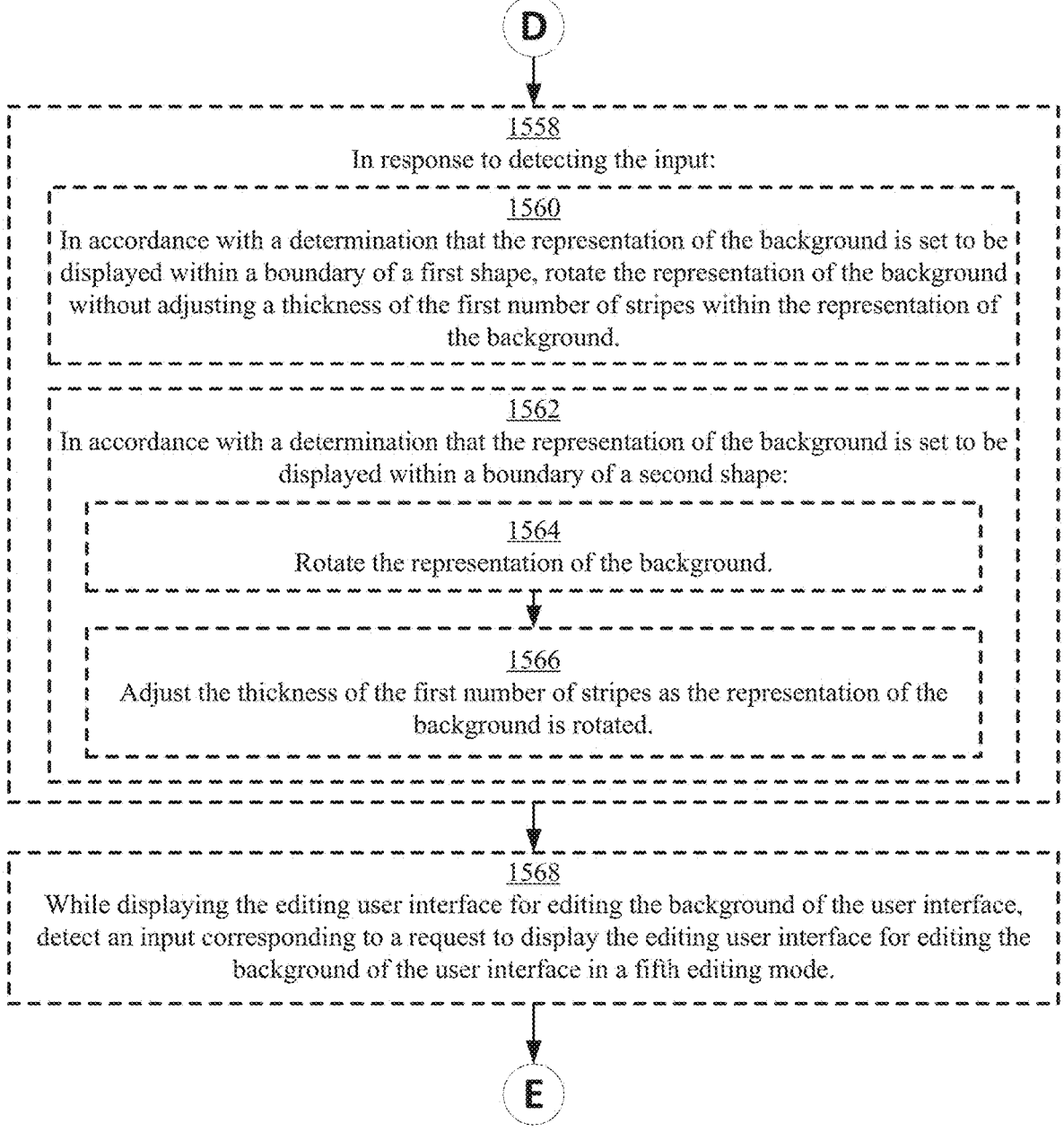

D

1558
In response to detecting the input:

1560
In accordance with a determination that the representation of the background is set to be displayed within a boundary of a first shape, rotate the representation of the background without adjusting a thickness of the first number of stripes within the representation of the background.

1562
In accordance with a determination that the representation of the background is set to be displayed within a boundary of a second shape:

1564
Rotate the representation of the background.

1566
Adjust the thickness of the first number of stripes as the representation of the background is rotated.

1568
While displaying the editing user interface for editing the background of the user interface, detect an input corresponding to a request to display the editing user interface for editing the background of the user interface in a fifth editing mode.

1570
In response to detecting the input, display, via the display generation component, the editing user interface for editing the background of the user interface in the fifth editing mode, wherein the editing user interface for editing the background of the user interface in the fifth editing mode includes:

1572
In accordance with a determination that the representation of the background is in a first position:

1574
Rotate the representation of the background to a second position.

1576
Display the representation of the background in the second position in the editing user interface for editing the background of the user interface in the fifth editing mode.

1578
In accordance with a determination that the representation of the background is in the second position, maintain display of the representation of the background in the second position in the editing user interface for editing the background of the user interface in the fifth editing mode.

*FIG. 15F*

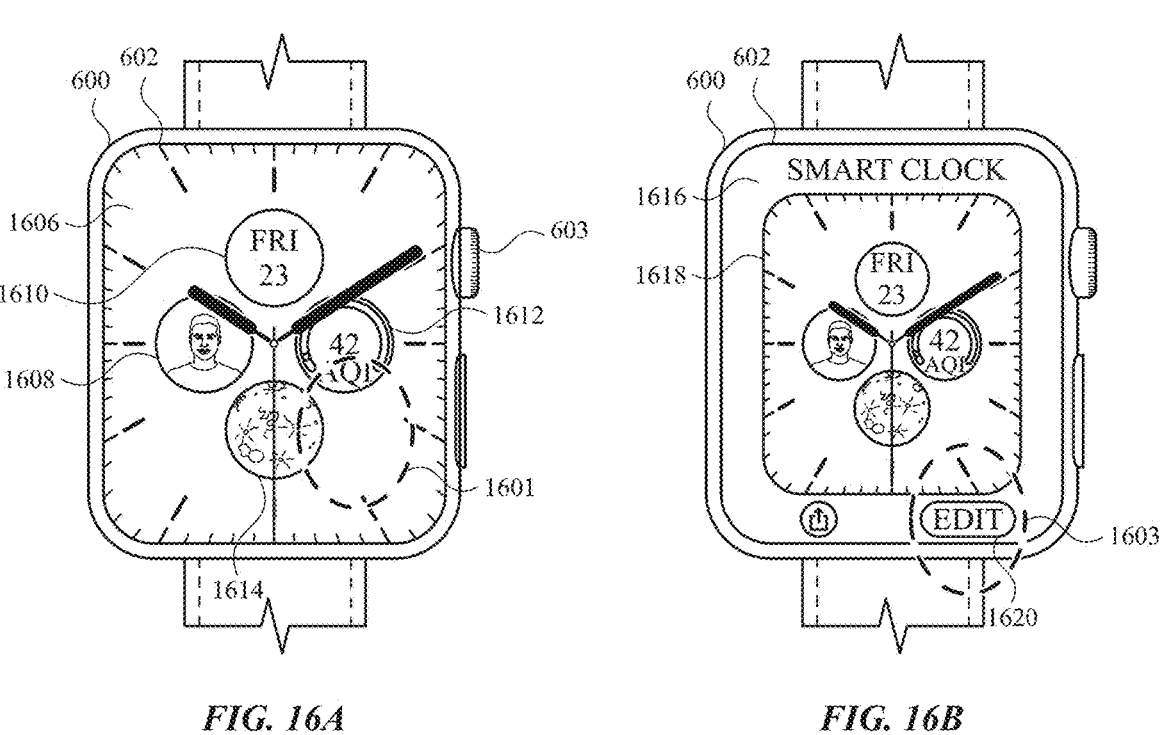
FIG. 16A               FIG. 16B
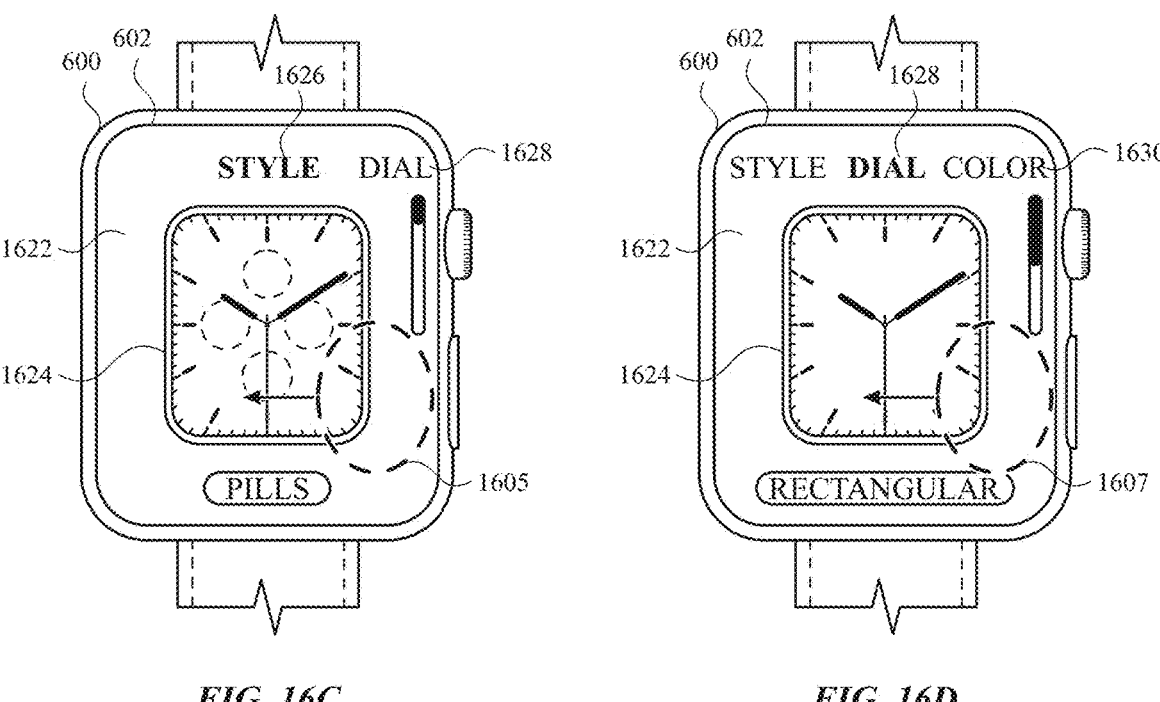
FIG. 16C               FIG. 16D

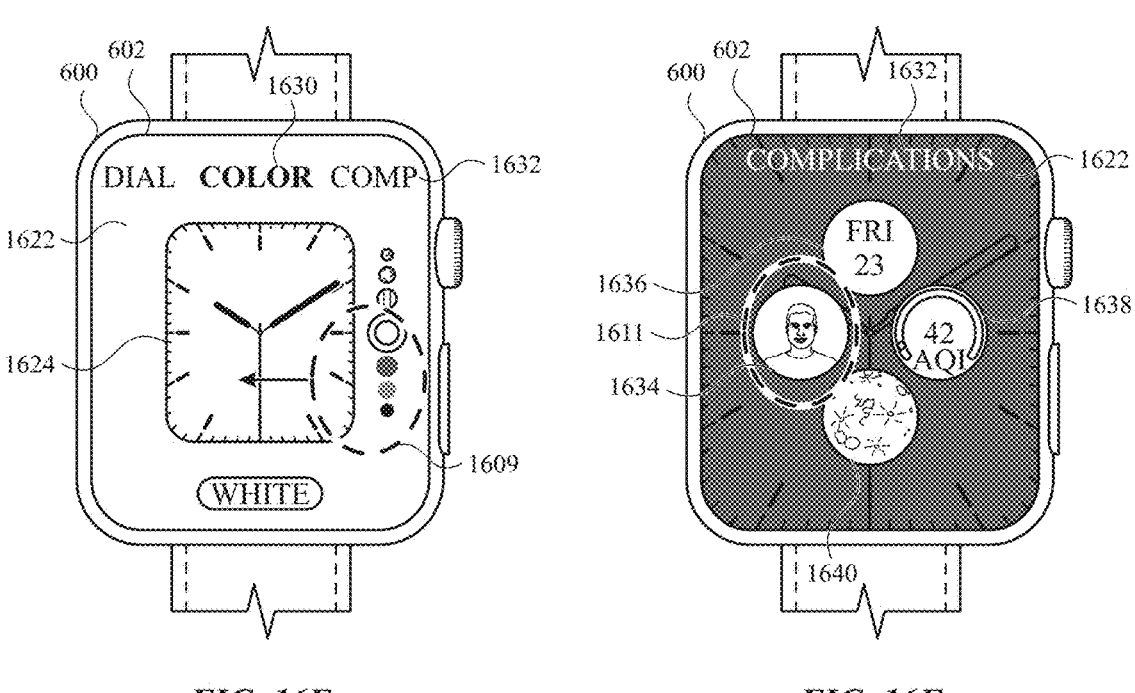
*FIG. 16E*           *FIG. 16F*
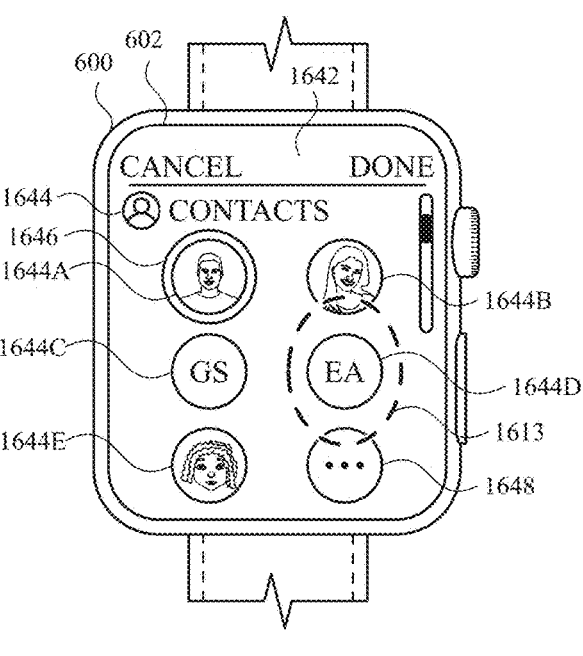
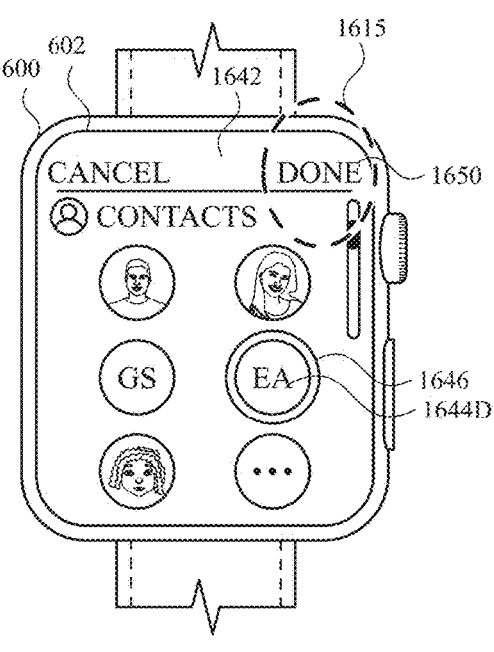
*FIG. 16G*           *FIG. 16H*

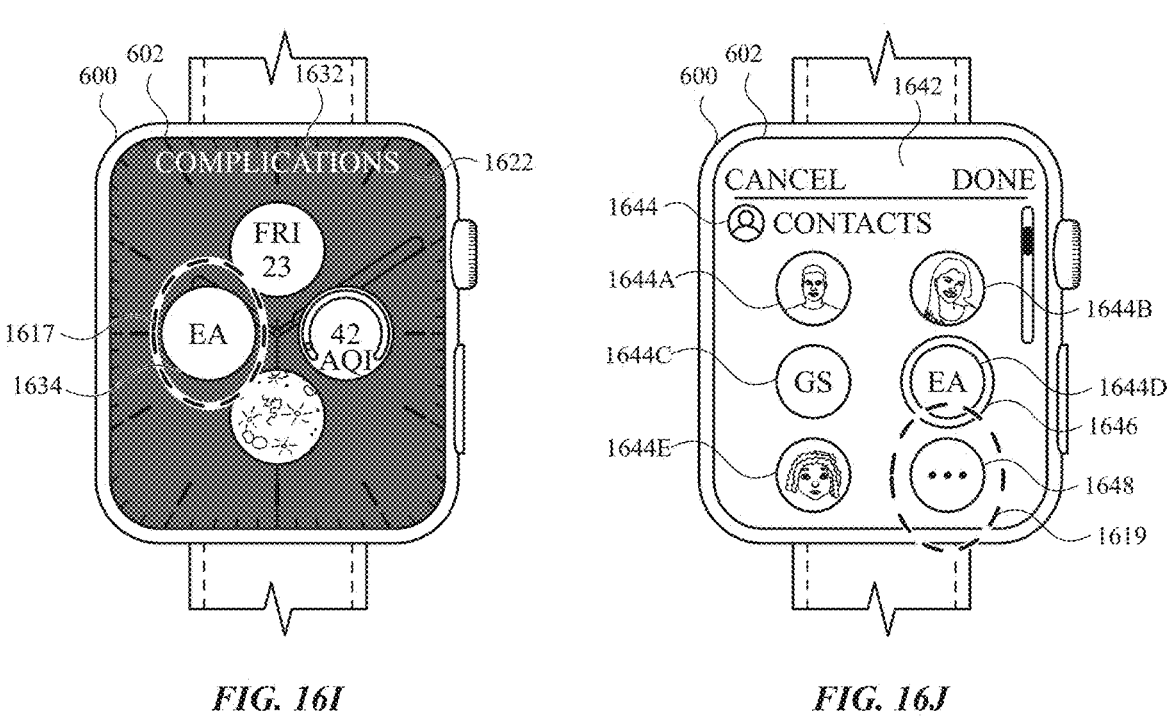
FIG. 16I             FIG. 16J
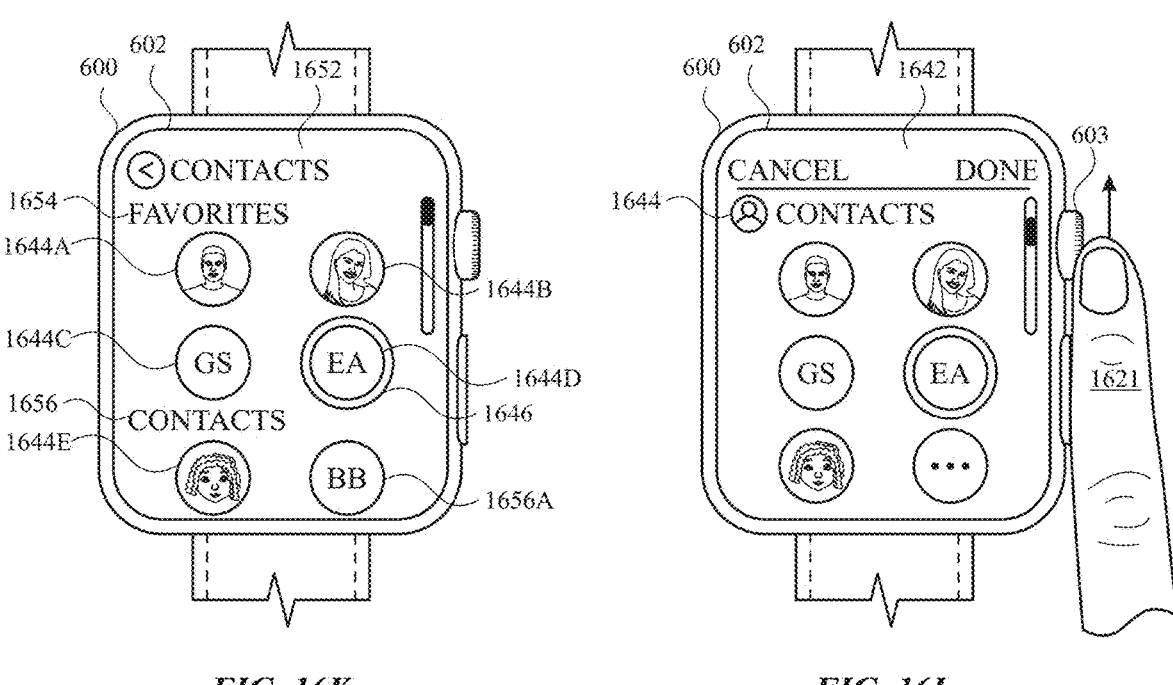
FIG. 16K             FIG. 16L

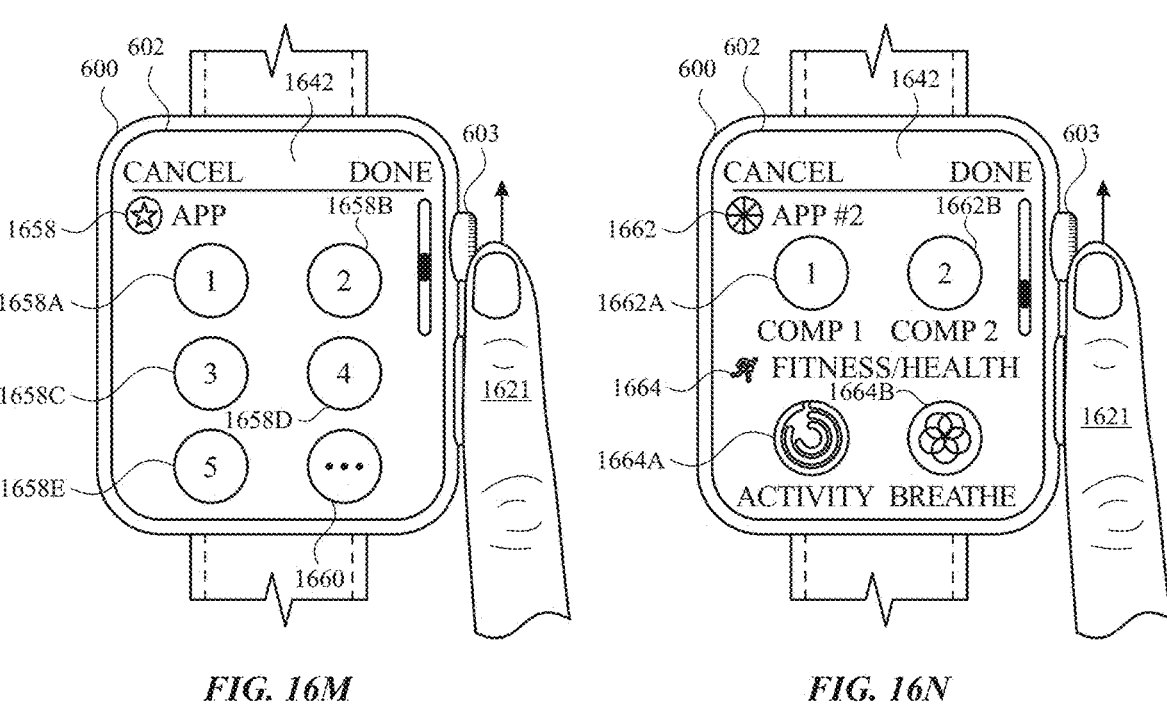
*FIG. 16M*              *FIG. 16N*
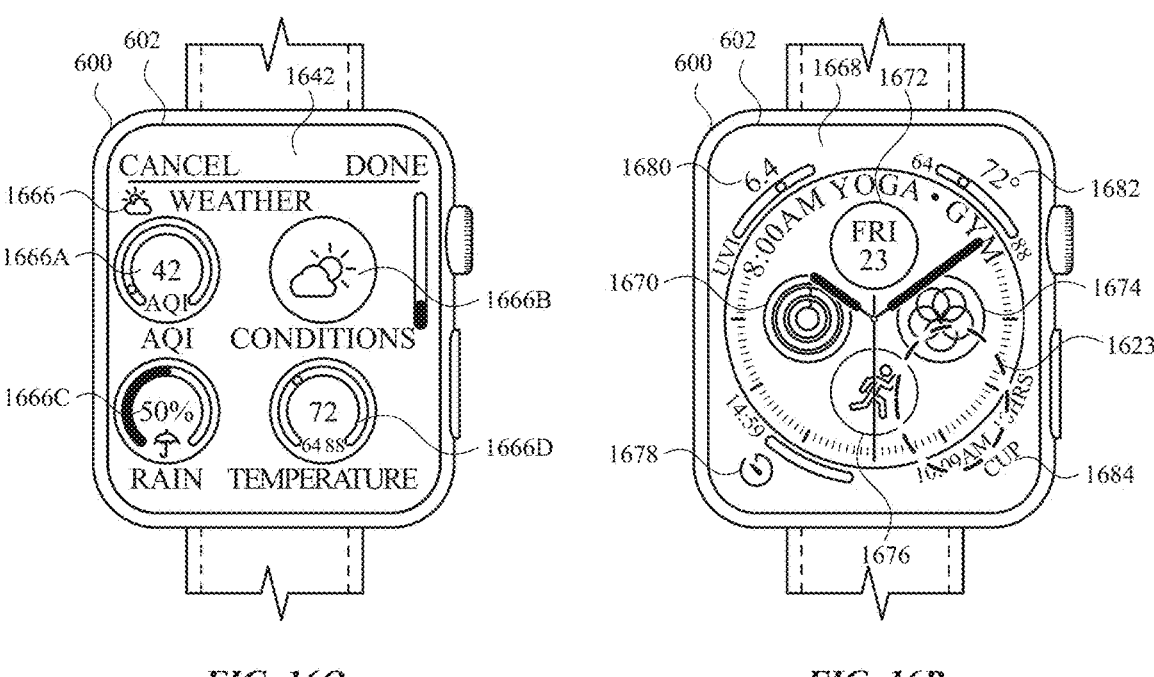
*FIG. 16O*              *FIG. 16P*

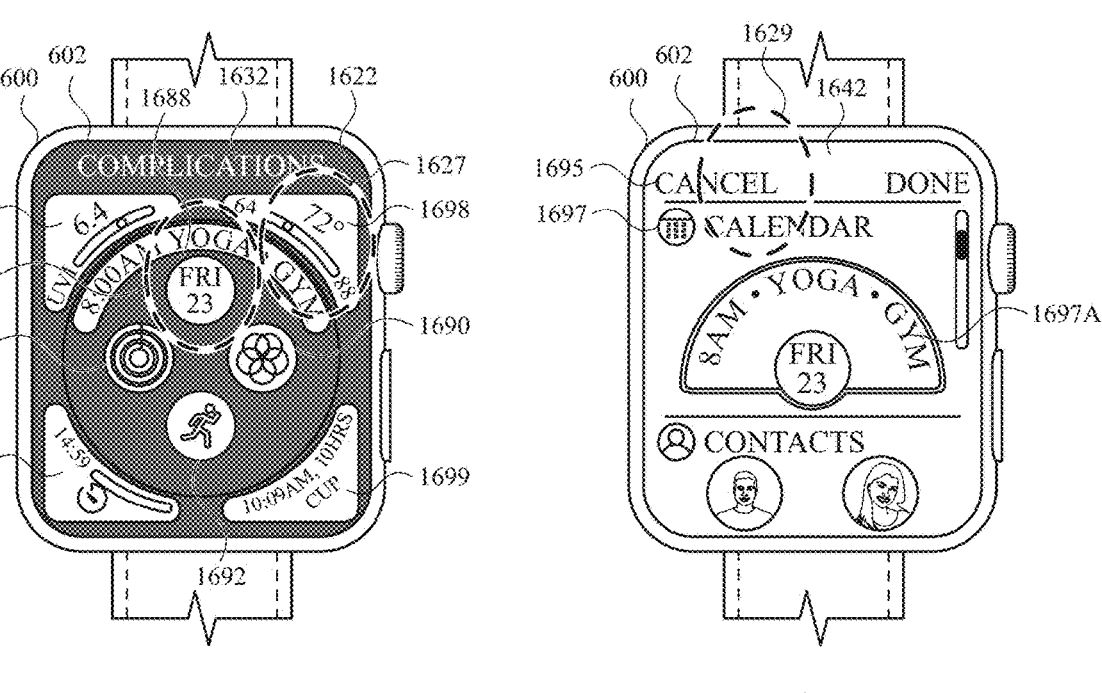
*FIG. 16Q*
*FIG. 16R*
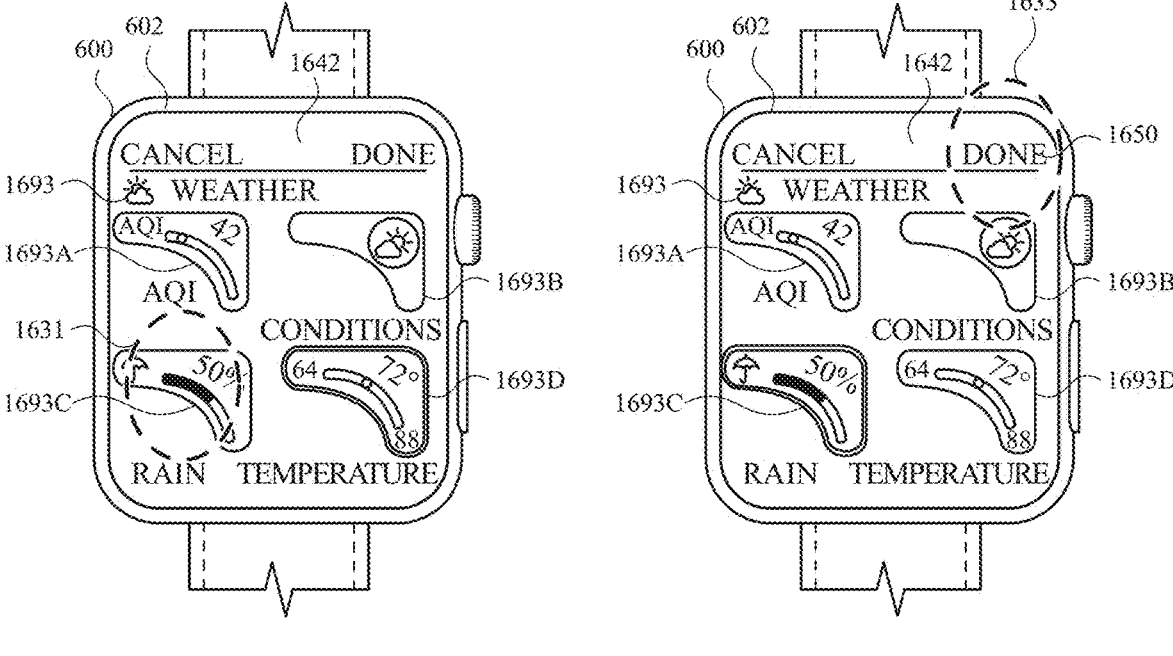
*FIG. 16S*
*FIG. 16T*

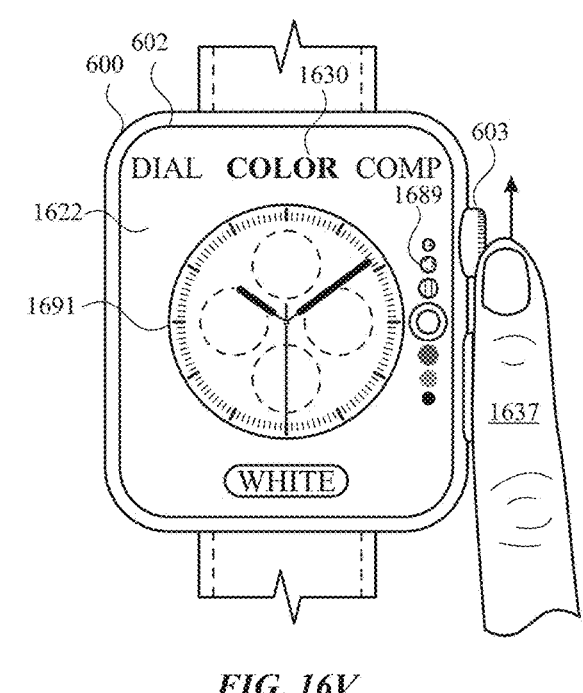
FIG. 16U
FIG. 16V
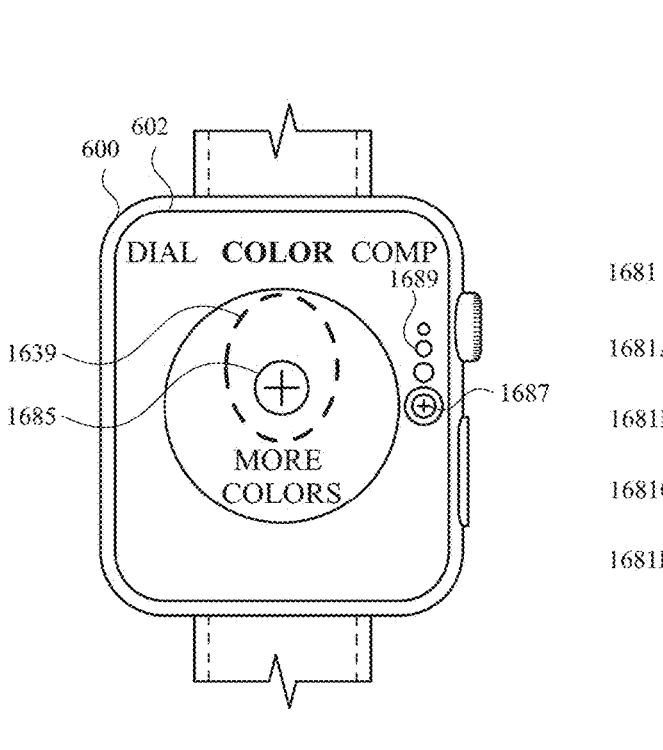
FIG. 16W
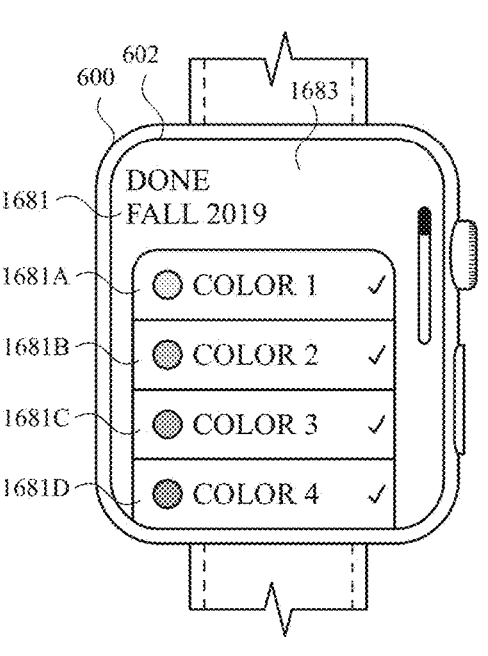
FIG. 16X

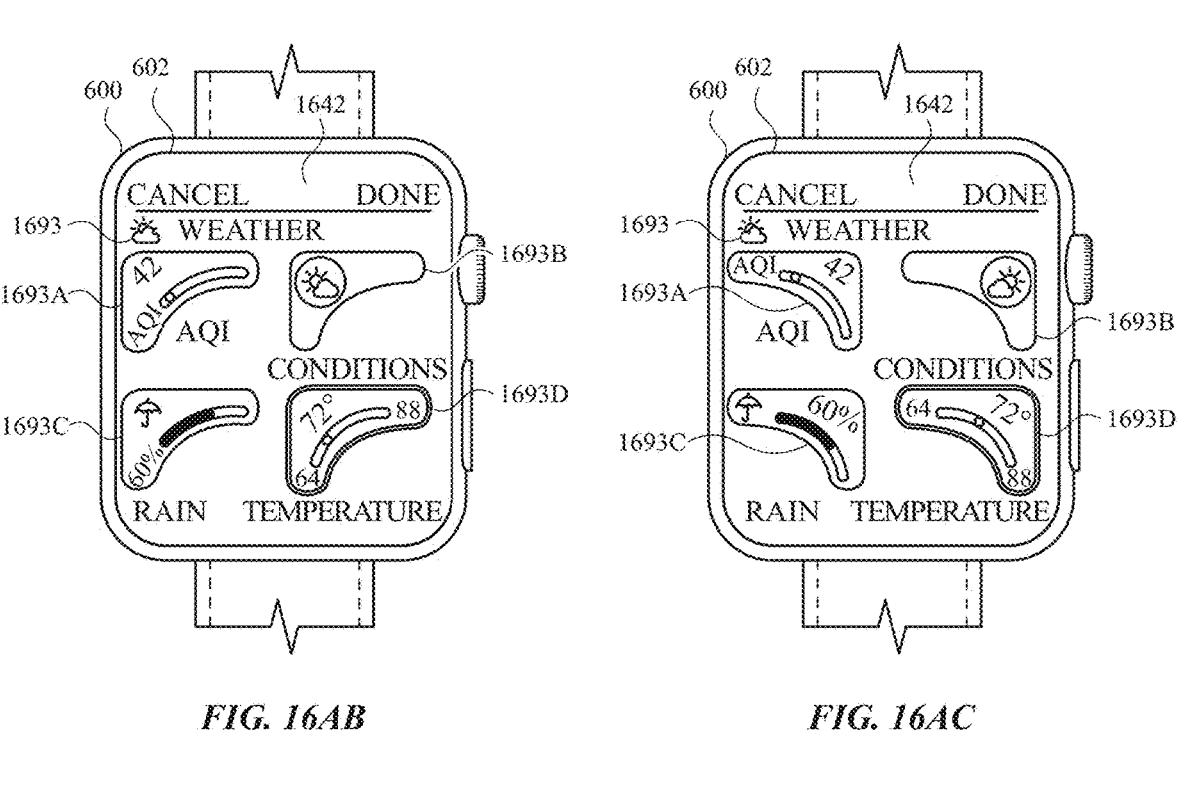
FIG. 16AB          FIG. 16AC
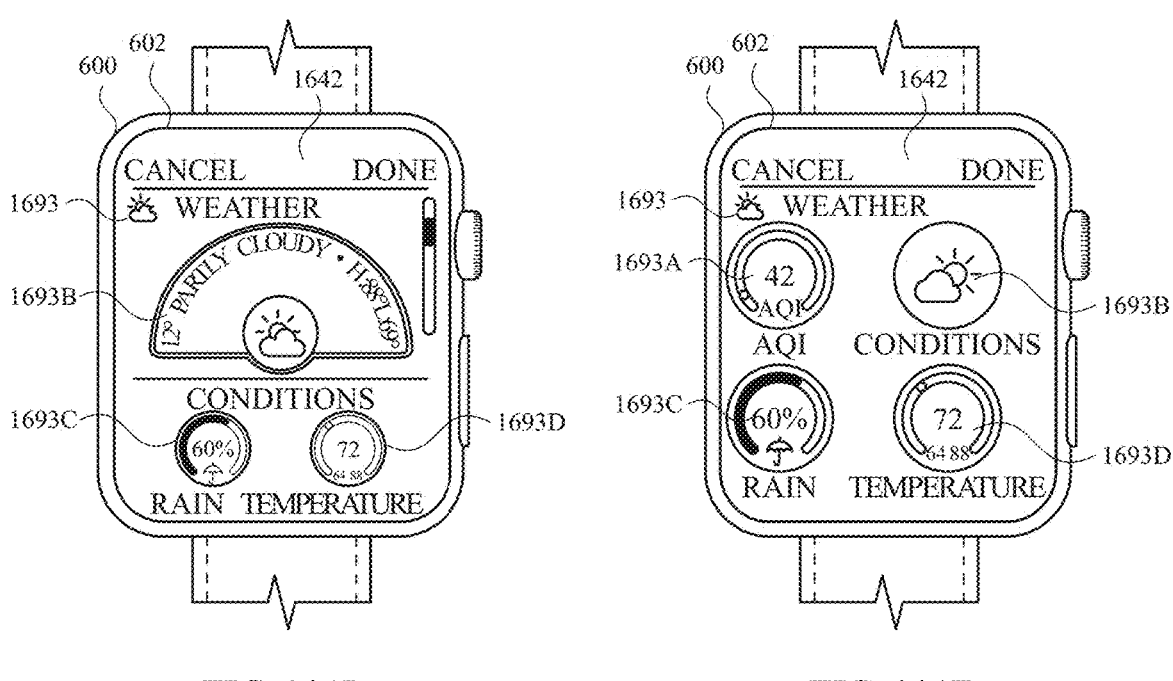
FIG. 16AD          FIG. 16AE

1700

1702
Display, via the display generation component, a watch face editing user interface, wherein the watch face editing user interface includes a representation of a layout of a watch user interface including a time region for displaying a current time and one or more complication regions for displaying complications of the watch user interface.

1704
While displaying the watch face editing user interface:

1706
Detect, via the one or more input devices, a first input directed to a complication region of the one or more complication regions.

1708
In response to detecting the first input directed to the complication region of the one or more complication regions:

1710
Display a complication selection user interface, wherein displaying the complication selection user interface includes concurrently displaying:

1712
An indication of a first application.

1714
A first complication preview corresponding to a first complication that is configured to display, on the watch user interface, a first set of information obtained from the first application, wherein the first complication preview includes a graphical representation of the first complication displaying the first set of information.

1734

1736

1740
A third complication preview corresponding to a third complication that is configured to display, on the watch user interface, a third set of information obtained from the second application, wherein the third complication preview includes a graphical representation of the third complication displaying the third set of information.

1742
A fourth complication preview corresponding to a fourth complication that is configured to display, on the watch user interface, a fourth set of information, different from the third set of information, obtained from the second application, wherein the fourth complication preview includes a graphical representation of the fourth complication displaying the fourth set of information.

1744
Navigating through the complication selection user interface further includes ceasing display of the first complication preview corresponding to the first complication and the second complication preview corresponding to the second complication.

1746
The indication of the first application, the first complication preview, and the second complication preview are displayed in a first region of the complication selection user interface and the indication of the second application, the third complication preview, and the fourth complication preview are displayed in a second region of the complication selection user interface different from the first region.

*FIG. 17D*

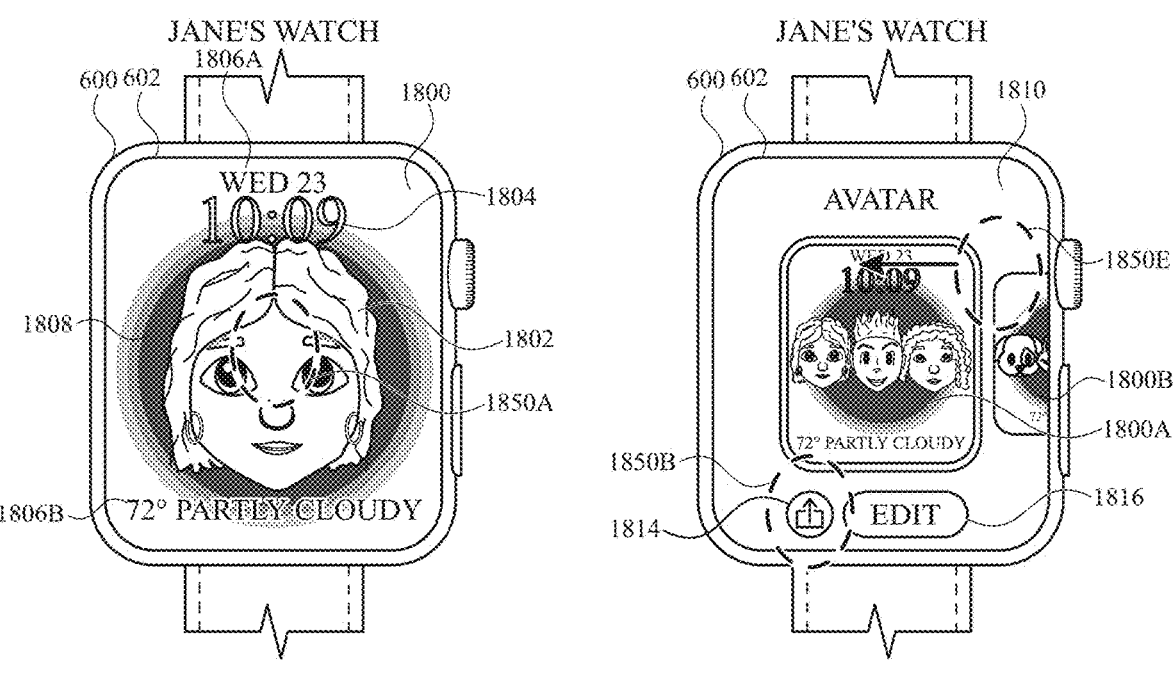
FIG. 18A
FIG. 18B
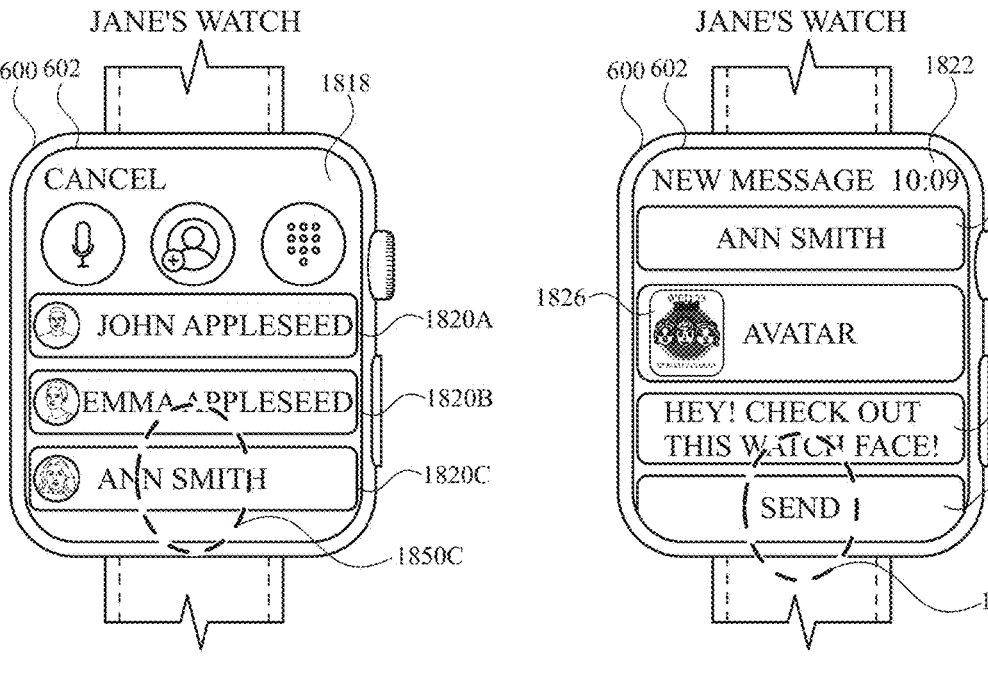
FIG. 18C
FIG. 18D

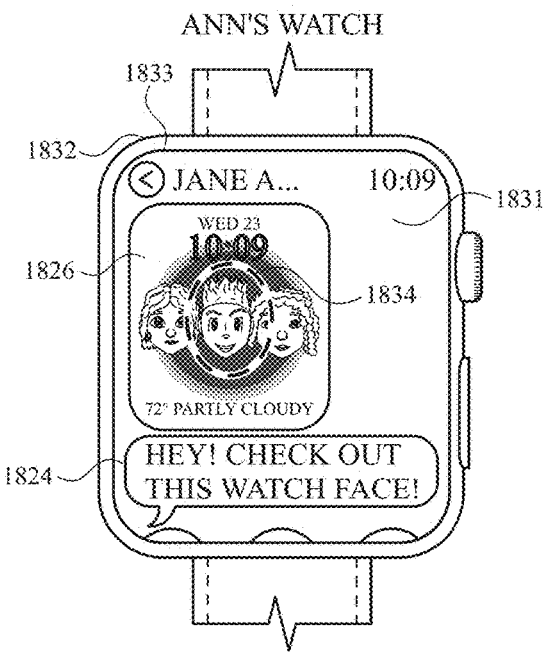
*FIG. 18E*
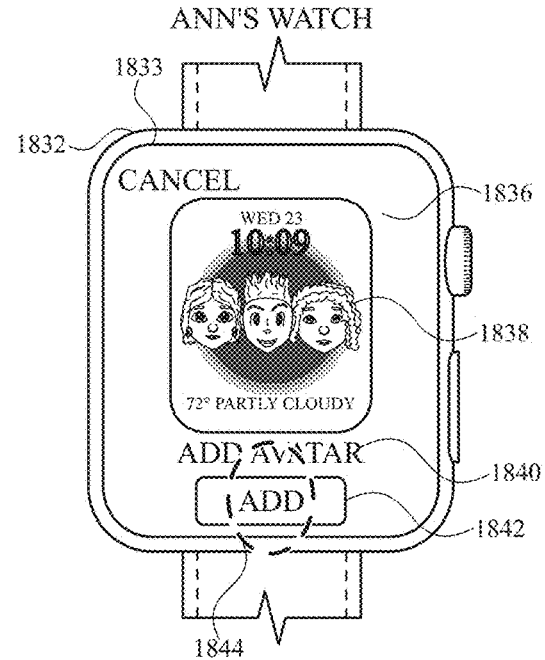
*FIG. 18F*
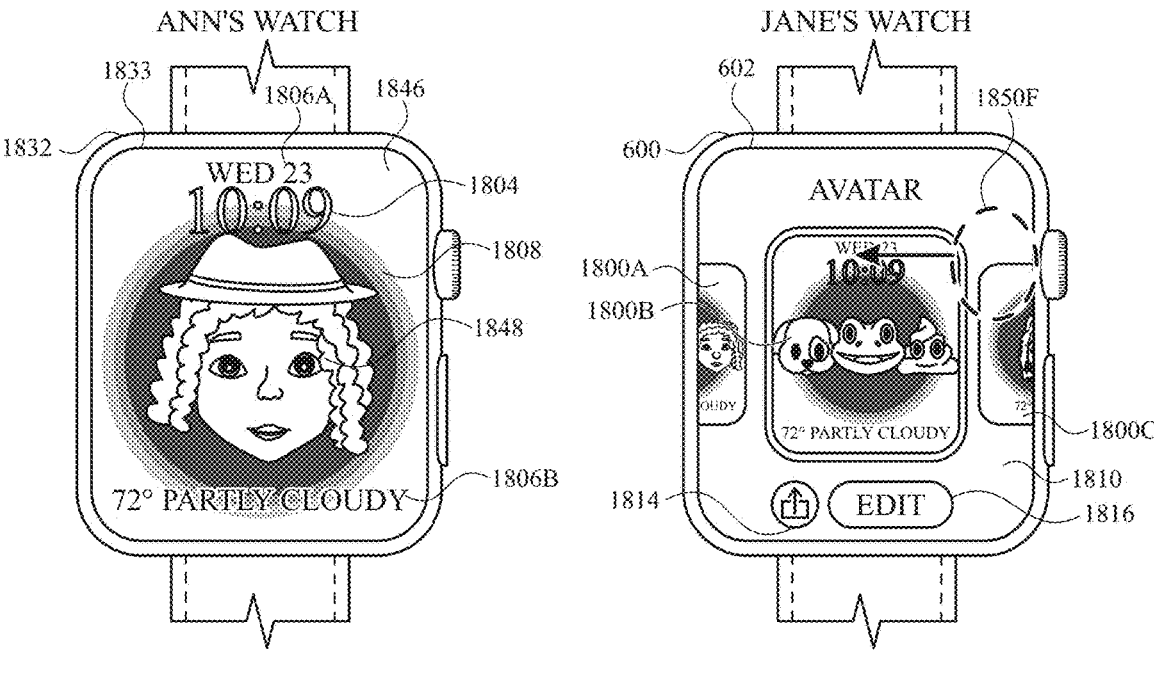
*FIG. 18G*          *FIG. 18H*

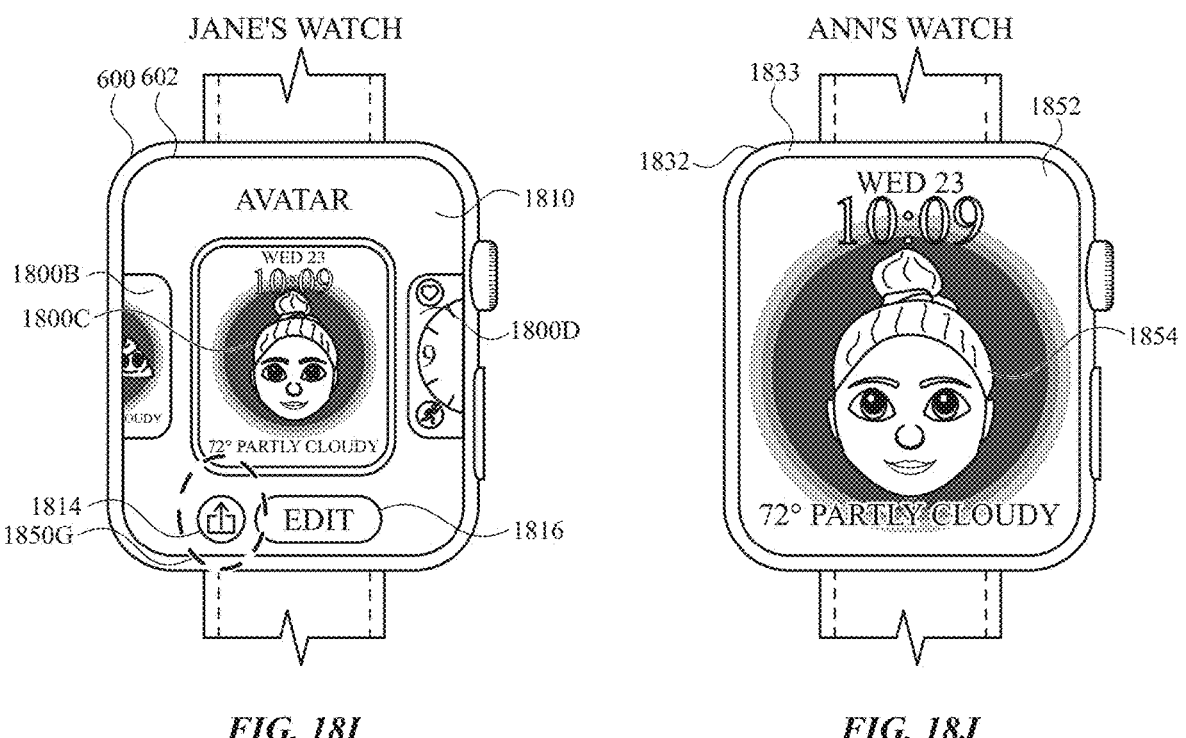
FIG. 18I            FIG. 18J

1900

1902
Display, via the display generation component, a representation of a watch face user interface that is associated with one or more graphical representations of respective characters.

1904
While displaying the representation of the watch face user interface, detect an input corresponding to a request to share the watch face user interface with an external device.

1906
In response to detecting the input, initiating a process for sharing the watch face user interface with the external device, wherein:

1908
In accordance with a determination that the watch face user interface is associated with less than a threshold number of graphical representations of respective characters, the process for sharing the watch face user interface with the external device includes sharing one or more characteristics of the watch face user interface including transmitting a representation of one or more of the one or more graphical representations of respective characters associated with the watch face user interface.

1910
In accordance with a determination that the watch face user interface is associated with greater than or equal to the threshold number of graphical representations of respective characters, the process for sharing the watch face user interface with the external device includes sharing one or more characteristics of the watch face user interface without transmitting a representation of the one or more graphical representations of respective characters associated with the watch user interface.

1912
While displaying the representation of the watch face user interface, detect a sequence of one or more inputs corresponding to a request to edit the watch face user interface.

*FIG. 19A*

---

1914
In response to detecting the sequence of one or more inputs, display, via the display generation component, a first user interface for selecting between a first set of characters that includes a plurality of user-customizable virtual avatars and a graphical representation of a second set of characters that includes two or more predetermined characters that are not available in the first set of characters.

---

1916
While displaying the first user interface, detect a third input corresponding to selection of the first set of characters or the second set of characters.

---

1918
In accordance with a determination that the third input corresponds to selection of the first set of characters, display the representation of the watch face user interface including a first graphical representation of a currently selected character from the first set of characters.

---

1920
In accordance with a determination that the input corresponds to selection of the second set of characters, display the representation of the watch face user interface including a second graphical representation of a currently selected character from the second set of characters.

---

1922
While displaying the representation of the watch face user interface, detect a fourth input corresponding to a request to edit the watch face user interface.

---

1924
After detecting the fourth input, display, via the display generation component, a second user interface that includes a plurality of selectable characters.

---

*FIG. 19B*

USER INTERFACES RELATED TO TIME

CROSS-REFERENCE TO RELATED APPLICATIONS

This application is a continuation of U.S. application Ser. No. 18/220,715, filed Jul. 11, 2023, entitled "USER INTERFACES RELATED TO TIME", which is a continuation of U.S. application Ser. No. 17/941,962, now U.S. Pat. No. 11,822,778, filed Sep. 9, 2022, entitled "USER INTER-FACES RELATED TO TIME", which is a continuation of U.S. application Ser. No. 17/373,163, filed Jul. 12, 2021, now U.S. Pat. No. 11,442,414, entitled "USER INTER-FACES RELATED TO TIME", which is a continuation of U.S. application Ser. No. 17/031,654, filed Sep. 24, 2020, now U.S. Pat. No. 11,061,372, entitled "USER INTER-FACES RELATED TO TIME", which claims priority to U.S. Provisional Application Ser. No. 63/023,194, filed May 11, 2020, entitled "USER INTERFACES RELATED TO TIME", and U.S. Provisional Application Ser. No. 63/078, 314, filed Sep. 14, 2020, entitled "USER INTERFACES RELATED TO TIME." All of these applications are incorporated by reference herein in their entirety.

FIELD

The present disclosure relates generally to computer user interfaces, and more specifically to techniques for managing user interfaces related to time.

BACKGROUND

User interfaces can be displayed on an electronic device. A user of the electronic device can interact with the electronic device via the displayed user interface. User interfaces can enable one or more operations to be performed on the electronic device.

BRIEF SUMMARY

Some techniques for managing user interfaces related to time using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides devices with faster, more efficient methods and interfaces for managing user interfaces related to time. Such methods and interfaces optionally complement or replace other methods for managing user interfaces related to time. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component and one or more input devices is described. The method comprises: displaying, via the display generation component, a watch user interface, wherein displaying the watch user interface includes concurrently displaying: a first analog dial and a first time indicator that indicates a current time in a first time zone on the first analog dial, and a second analog dial and a second time indicator that indicates a current time in a second time zone on the second analog dial, wherein the second analog dial is displayed at a first orientation relative to the first analog dial; after displaying the watch user interface with the first analog dial and the second analog dial that is displayed at a first orientation relative to the first analog dial, receiving, via the one or more input devices, a request to change a time zone associated with the second analog dial; in response to receiving the request to change the time zone associated with the second analog dial, changing the time zone associated with the second analog dial to a third time zone that is different from the first time zone; and while the second analog dial is associated with the third time zone, displaying, via the display generation component, the watch user interface, wherein displaying the watch user interface includes concurrently displaying: the first analog dial and the first time indicator indicating a current time in the first time zone on the first analog dial, and the second analog dial and the second time indicator indicating a current time in the third time zone on the second analog dial, wherein the second analog dial is displayed at a second orientation relative to the first analog dial.

In accordance with some embodiments, a non-transitory computer-readable storage medium storing one or more programs configured to be executed by one or more processors of a computer system that is in communication with a display generation component and one or more input devices is described. The one or more programs include instructions for: displaying, via the display generation component, a watch user interface, wherein displaying the watch user interface includes concurrently displaying: a first analog dial and a first time indicator that indicates a current time in a first time zone on the first analog dial, and a second analog dial and a second time indicator that indicates a current time in a second time zone on the second analog dial, wherein the second analog dial is displayed at a first orientation relative to the first analog dial; after displaying the watch user interface with the first analog dial and the second analog dial that is displayed at a first orientation relative to the first analog dial, receiving, via the one or more input devices, a request to change a time zone associated with the second analog dial; in response to receiving the request to change the time zone associated with the second analog dial, changing the time zone associated with the second analog dial to a third time zone that is different from the first time zone; and while the second analog dial is associated with the third time zone, displaying, via the display generation component, the watch user interface, wherein displaying the watch user interface includes concurrently displaying: the first analog dial and the first time indicator indicating a current time in the first time zone on the first analog dial, and the second analog dial and the second time indicator indicating a current time in the third time zone on the second analog dial, wherein the second analog dial is displayed at a second orientation relative to the first analog dial.

In accordance with some embodiments, a transitory computer-readable storage medium storing one or more programs configured to be executed by one or more processors of a computer system that is in communication with a display generation component and one or more input devices is described. The one or more programs include instructions for: displaying, via the display generation component, a watch user interface, wherein displaying the watch user interface includes concurrently displaying: a first analog dial and a first time indicator that indicates a current time in a first time zone on the first analog dial, and a second analog dial and a second time indicator that indicates a current time in a second time zone on the second analog dial, wherein the second analog dial is displayed at a first orientation relative to the first analog dial; after displaying the watch user interface with the first analog dial and the second analog dial that is displayed at a first orientation relative to the first analog dial, receiving, via the one or more input devices, a request to change a time zone associated with the second analog dial; in response to receiving the request to change the time zone associated with the second analog dial, changing the time zone associated with the second analog dial to a third time zone that is different from the first time zone; and while the second analog dial is associated with the third time zone, displaying, via the display generation component, the watch user interface, wherein displaying the watch user interface includes concurrently displaying: the first analog dial and the first time indicator indicating a current time in the first time zone on the first analog dial, and the second analog dial and the second time indicator indicating a current time in the third time zone on the second analog dial, wherein the second analog dial is displayed at a second orientation relative to the first analog dial.

In accordance with some embodiments, a computer system comprising a display generation component, one or more input devices, one or more processors, and memory storing one or more programs configured to be executed by the one or more processors is described. The one or more programs including instructions for: displaying, via the display generation component, a watch user interface, wherein displaying the watch user interface includes concurrently displaying: a first analog dial and a first time indicator that indicates a current time in a first time zone on the first analog dial, and a second analog dial and a second time indicator that indicates a current time in a second time zone on the second analog dial, wherein the second analog dial is displayed at a first orientation relative to the first analog dial; after displaying the watch user interface with the first analog dial and the second analog dial that is displayed at a first orientation relative to the first analog dial, receiving, via the one or more input devices, a request to change a time zone associated with the second analog dial; in response to receiving the request to change the time zone associated with the second analog dial, changing the time zone associated with the second analog dial to a third time zone that is different from the first time zone; and while the second analog dial is associated with the third time zone, displaying, via the display generation component, the watch user interface, wherein displaying the watch user interface includes concurrently displaying: the first analog dial and the first time indicator indicating a current time in the first time zone on the first analog dial, and the second analog dial and the second time indicator indicating a current time in the third time zone on the second analog dial, wherein the second analog dial is displayed at a second orientation relative to the first analog dial.

In accordance with some embodiments, a computer system is described. The computer system comprises: a display generation component; one or more input devices; and means for displaying, via the display generation component, a watch user interface, wherein displaying the watch user interface includes concurrently displaying: a first analog dial and a first time indicator that indicates a current time in a first time zone on the first analog dial, and a second analog dial and a second time indicator that indicates a current time in a second time zone on the second analog dial, wherein the second analog dial is displayed at a first orientation relative to the first analog dial; means for, after displaying the watch user interface with the first analog dial and the second analog dial that is displayed at a first orientation relative to the first analog dial, receiving, via the one or more input devices, a request to change a time zone associated with the second analog dial; means for, in response to receiving the request to change the time zone associated with the second analog dial, changing the time zone associated with the second analog dial to a third time zone that is different from the first time zone; and means for, while the second analog dial is associated with the third time zone, displaying, via the display generation component, the watch user interface, wherein displaying the watch user interface includes concurrently displaying: the first analog dial and the first time indicator indicating a current time in the first time zone on the first analog dial, and the second analog dial and the second time indicator indicating a current time in the third time zone on the second analog dial, wherein the second analog dial is displayed at a second orientation relative to the first analog dial.

In accordance with some embodiments, a method performed at a computer system that is in communication with a display generation component and one or more input devices is described. The method comprises: displaying, via the display generation component, a watch user interface, the watch user interface including an analog clock face that includes a first clock hand and a graphical indicator, wherein the graphical indicator is displayed at a first position relative to the analog clock face; while displaying the watch user interface, detecting, via the one or more input devices, a first user input; in response to detecting the first user input, moving the graphical indicator to a second position relative to the analog clock face such that the graphical indicator is aligned with the first clock hand; and while the graphical indicator is displayed at the second position relative to the analog clock face, displaying a graphical indication of a time that has elapsed from a time when the first user input was detected to a current time.

In accordance with some embodiments, a non-transitory computer-readable storage medium storing one or more programs configured to be executed by one or more processors of a computer system that is in communication with a display generation component and one or more input devices is described. The one or more programs include instructions for: displaying, via the display generation component, a watch user interface including an analog clock face that includes a first clock hand and a graphical indicator, wherein the graphical indicator is displayed at a first position relative to the analog clock face; while displaying the watch user interface, detecting, via the one or more input devices, a first user input; in response to detecting the first user input, moving the graphical indicator to a second position relative to the analog clock face such that the graphical indicator is aligned with the first clock hand; and while the graphical indicator is displayed at the second position relative to the analog clock face, displaying a graphical indication of a time that has elapsed from a time when the first user input was detected to a current time.

In accordance with some embodiments, a transitory computer-readable storage medium storing one or more programs configured to be executed by one or more processors of a computer system that is in communication with a display generation component and one or more input devices is described. The one or more programs include instructions for: displaying, via the display generation component, a watch user interface including an analog clock face that includes a first clock hand and a graphical indicator, wherein the graphical indicator is displayed at a first position relative to the analog clock face; while displaying the watch user interface, detecting, via the one or more input devices, a first user input; in response to detecting the first user input, moving the graphical indicator to a second position relative to the analog clock face such that the graphical indicator is aligned with the first clock hand; and while the graphical indicator is displayed at the second position relative to the analog clock face, displaying a graphical indication of a time that has elapsed from a time when the first user input was detected to a current time.

In accordance with some embodiments, a computer system comprising a display generation component, one or more input devices, one or more processors, and memory storing one or more programs configured to be executed by the one or more processors is described. The one or more programs including instructions for: displaying, via the display generation component, a watch user interface, the watch user interface including an analog clock face that includes a first clock hand and a graphical indicator, wherein the graphical indicator is displayed at a first position relative to the analog clock face; while displaying the watch user interface, detecting, via the one or more input devices, a first user input; in response to detecting the first user input, moving the graphical indicator to a second position relative to the analog clock face such that the graphical indicator is aligned with the first clock hand; and while the graphical indicator is displayed at the second position relative to the analog clock face, displaying a graphical indication of a time that has elapsed from a time when the first user input was detected to a current time.

In accordance with some embodiments, a computer system is described. The computer system comprises: a display generation component; one or more input devices; means for displaying, via the display generation component, a watch user interface, the watch user interface including an analog clock face that includes a first clock hand and a graphical indicator, wherein the graphical indicator is displayed at a first position relative to the analog clock face; means for, while displaying the watch user interface, detecting, via the one or more input devices, a first user input; means for, in response to detecting the first user input, moving the graphical indicator to a second position relative to the analog clock face such that the graphical indicator is aligned with the first clock hand; and means for, while the graphical indicator is displayed at the second position relative to the analog clock face, displaying a graphical indication of a time that has elapsed from a time when the first user input was detected to a current time.

In accordance with some embodiments, a method performed at a computer system that is in communication with a display generation component is described. The method comprises: at a first time, displaying, concurrently in a user interface displayed via the display generation component: an indication of time, and a graphical representation of a first character, wherein displaying the graphical representation of the first character includes: in accordance with a determination that the computer system is in a first activity state, displaying the graphical representation of the first character in a first visual state that corresponds to the first activity state of the computer system; and in accordance with a determination that the computer system is in a second activity state that is different from the first activity state, displaying the graphical representation of the first character in a second visual state, different from the first visual state, that corresponds to the second activity state of the computer system; and at a second time, after the first time, displaying, concurrently in the user interface: the indication of time, and a graphical representation of a second character, wherein displaying the graphical representation of the second character includes: in accordance with a determination that the computer system is in the first activity state, displaying the graphical representation of the second character in the first visual state that corresponds to the first activity state of the computer system; and in accordance with a determination that the computer system is in the second activity state that is different from the first activity state, displaying the graphical representation of the second character in the second visual state, different from the first visual state, that corresponds to the second activity state of the computer system.

In accordance with some embodiments, a non-transitory computer-readable storage medium storing one or more programs configured to be executed by one or more processors of a computer system that is in communication with a display generation component is described. The one or more programs include instructions for: at a first time, displaying, concurrently in a user interface displayed via the display generation component: an indication of time, and a graphical representation of a first character, wherein displaying the graphical representation of the first character includes: in accordance with a determination that the computer system is in a first activity state, displaying the graphical representation of the first character in a first visual state that corresponds to the first activity state of the computer system; and in accordance with a determination that the computer system is in a second activity state that is different from the first activity state, displaying the graphical representation of the first character in a second visual state, different from the first visual state, that corresponds to the second activity state of the computer system; and at a second time, after the first time, displaying, concurrently in the user interface: the indication of time, and a graphical representation of a second character, wherein displaying the graphical representation of the second character includes: in accordance with a determination that the computer system is in the first activity state, displaying the graphical representation of the second character in the first visual state that corresponds to the first activity state of the computer system; and in accordance with a determination that the computer system is in the second activity state that is different from the first activity state, displaying the graphical representation of the second character in the second visual state, different from the first visual state, that corresponds to the second activity state of the computer system.

In accordance with some embodiments, a transitory computer-readable storage medium storing one or more programs configured to be executed by one or more processors of a computer system that is in communication with a display generation component is described. The one or more programs include instructions for: at a first time, displaying, concurrently in a user interface displayed via the display generation component: an indication of time, and a graphical representation of a first character, wherein displaying the graphical representation of the first character includes: in accordance with a determination that the computer system is in a first activity state, displaying the graphical representation of the first character in a first visual state that corresponds to the first activity state of the computer system; and in accordance with a determination that the computer system is in a second activity state that is different from the first activity state, displaying the graphical representation of the first character in a second visual state, different from the first visual state, that corresponds to the second activity state of the computer system; and at a second time, after the first time, displaying, concurrently in the user interface: the indication of time, and a graphical representation of a second character, wherein displaying the graphical representation of the second character includes: in accordance with a determination that the computer system is in the first activity state, displaying the graphical representation of the second character in the first visual state that corresponds to the first activity state of the computer system; and in accordance with a determination that the computer system is in the second activity state that is different from the first activity state, displaying the graphical representation of the second character in the second visual state, different from the first visual state, that corresponds to the second activity state of the computer system.

In accordance with some embodiments, a computer system comprising a display generation component; one or more processors; and memory storing one or more programs configured to be executed by the one or more processors is described. The one or more programs include instructions for: at a first time, displaying, concurrently in a user interface displayed via the display generation component: an indication of time, and a graphical representation of a first character, wherein displaying the graphical representation of the first character includes: in accordance with a determination that the computer system is in a first activity state, displaying the graphical representation of the first character in a first visual state that corresponds to the first activity state of the computer system; and in accordance with a determination that the computer system is in a second activity state that is different from the first activity state, displaying the graphical representation of the first character in a second visual state, different from the first visual state, that corresponds to the second activity state of the computer system; and at a second time, after the first time, displaying, concurrently in the user interface: the indication of time, and a graphical representation of a second character, wherein displaying the graphical representation of the second character includes: in accordance with a determination that the computer system is in the first activity state, displaying the graphical representation of the second character in the first visual state that corresponds to the first activity state of the computer system; and in accordance with a determination that the computer system is in the second activity state that is different from the first activity state, displaying the graphical representation of the second character in the second visual state, different from the first visual state, that corresponds to the second activity state of the computer system.

In accordance with some embodiments, a computer system is described. The computer system comprises: a display generation component; means for, at a first time, displaying, concurrently in a user interface displayed via the display generation component: an indication of time, and a graphical representation of a first character, wherein displaying the graphical representation of the first character includes: in accordance with a determination that the computer system is in a first activity state, displaying the graphical representation of the first character in a first visual state that corresponds to the first activity state of the computer system; and in accordance with a determination that the computer system is in a second activity state that is different from the first activity state, displaying the graphical representation of the first character in a second visual state, different from the first visual state, that corresponds to the second activity state of the computer system; and means for, at a second time, after the first time, displaying, concurrently in the user interface: the indication of time, and a graphical representation of a second character, wherein displaying the graphical representation of the second character includes: in accordance with a determination that the computer system is in the first activity state, displaying the graphical representation of the second character in the first visual state that corresponds to the first activity state of the computer system; and in accordance with a determination that the computer system is in the second activity state that is different from the first activity state, displaying the graphical representation of the second character in the second visual state, different from the first visual state, that corresponds to the second activity state of the computer system.

In accordance with some embodiments, a method performed at a computer system that is in communication with a display generation component is described. The method comprises: displaying, via the display generation component, a time user interface that includes a representation of a first face having a first facial feature and a second facial feature, wherein: the first facial feature of the first face indicates a current time, and the second facial feature of the first face has a first visual characteristic; while displaying the representation of the first face, detecting the satisfaction of a predetermined criteria for changing an appearance of the time user interface; and in response to detecting the satisfaction of the predetermined criteria for changing an appearance of the time user interface, ceasing to display the representation of the first face and displaying a representation of a second face having a first facial feature and a second facial feature, wherein: the representation of the second face is different from the representation of the first face, the first facial feature of the second face indicates a current time, the second facial feature of the second face has a second visual characteristic different from the first visual characteristic, and ceasing to display the representation of the first face and displaying the representation of the second face includes displaying a gradual transition from the first face to the second face that includes transitioning the second facial feature of the first face from having the first visual characteristic through a plurality of intermediate states to a final state in which the second facial feature of the second face has the second visual characteristic.

In accordance with some embodiments, a non-transitory computer-readable storage medium storing one or more programs configured to be executed by one or more processors of a computer system that is in communication with a display generation component is described. The one or more programs include instructions for: displaying, via the display generation component, a time user interface that includes a representation of a first face having a first facial feature and a second facial feature, wherein: the first facial feature of the first face indicates a current time, and the second facial feature of the first face has a first visual characteristic; while displaying the representation of the first face, detecting the satisfaction of a predetermined criteria for changing an appearance of the time user interface; and in response to detecting the satisfaction of the predetermined criteria for changing an appearance of the time user interface, ceasing to display the representation of the first face and displaying a representation of a second face having a first facial feature and a second facial feature, wherein: the representation of the second face is different from the representation of the first face, the first facial feature of the second face indicates a current time, the second facial feature of the second face has a second visual characteristic different from the first visual characteristic, and ceasing to display the representation of the first face and displaying the representation of the second face includes displaying a gradual transition from the first face to the second face that includes transitioning the second facial feature of the first face from having the first visual characteristic through a plurality of intermediate states to a final state in which the second facial feature of the second face has the second visual characteristic.

In accordance with some embodiments, a transitory computer-readable storage medium storing one or more programs configured to be executed by one or more processors of a computer system that is in communication with a display generation component is described. The one or more programs include instructions for: displaying, via the display generation component, a time user interface that includes a representation of a first face having a first facial feature and a second facial feature, wherein: the first facial feature of the first face indicates a current time, and the second facial feature of the first face has a first visual characteristic; while displaying the representation of the first face, detecting the satisfaction of a predetermined criteria for changing an appearance of the time user interface; and in response to detecting the satisfaction of the predetermined criteria for changing an appearance of the time user interface, ceasing to display the representation of the first face and displaying a representation of a second face having a first facial feature and a second facial feature, wherein: the representation of the second face is different from the representation of the first face, the first facial feature of the second face indicates a current time, the second facial feature of the second face has a second visual characteristic different from the first visual characteristic, and ceasing to display the representation of the first face and displaying the representation of the second face includes displaying a gradual transition from the first face to the second face that includes transitioning the second facial feature of the first face from having the first visual characteristic through a plurality of intermediate states to a final state in which the second facial feature of the second face has the second visual characteristic.

In accordance with some embodiments, a computer system comprising a display generation component, one or more processors, and memory storing one or more programs configured to be executed by the one or more processors is described. The one or more programs including instructions for: displaying, via the display generation component, a time user interface that includes a representation of a first face having a first facial feature and a second facial feature, wherein: the first facial feature of the first face indicates a current time, and the second facial feature of the first face has a first visual characteristic; while displaying the representation of the first face, detecting the satisfaction of a predetermined criteria for changing an appearance of the time user interface; and in response to detecting the satisfaction of the predetermined criteria for changing an appearance of the time user interface, ceasing to display the representation of the first face and displaying a representation of a second face having a first facial feature and a second facial feature, wherein: the representation of the second face is different from the representation of the first face, the first facial feature of the second face indicates a current time, the second facial feature of the second face has a second visual characteristic different from the first visual characteristic, and ceasing to display the representation of the first face and displaying the representation of the second face includes displaying a gradual transition from the first face to the second face that includes transitioning the second facial feature of the first face from having the first visual characteristic through a plurality of intermediate states to a final state in which the second facial feature of the second face has the second visual characteristic.

In accordance with some embodiments, a computer system is described. The computer system comprises: a display generation component; means for displaying, via the display generation component, a time user interface that includes a representation of a first face having a first facial feature and a second facial feature, wherein: the first facial feature of the first face indicates a current time, and the second facial feature of the first face has a first visual characteristic; means for, while displaying the representation of the first face, detecting the satisfaction of a predetermined criteria for changing an appearance of the time user interface; and means for, in response to detecting the satisfaction of the predetermined criteria for changing an appearance of the time user interface, ceasing to display the representation of the first face and displaying a representation of a second face having a first facial feature and a second facial feature, wherein: the representation of the second face is different from the representation of the first face, the first facial feature of the second face indicates a current time, the second facial feature of the second face has a second visual characteristic different from the first visual characteristic, and ceasing to display the representation of the first face and displaying the representation of the second face includes displaying a gradual transition from the first face to the second face that includes transitioning the second facial feature of the first face from having the first visual characteristic through a plurality of intermediate states to a final state in which the second facial feature of the second face has the second visual characteristic.

In accordance with some embodiments, a method performed at a computer system that is in communication with a display generation component and one or more input devices is described. The method comprises: displaying, via the display generation component, an editing user interface for editing a background of a user interface, wherein: the user interface includes content overlaid on the background, and the editing user interface includes a representation of the background of the user interface that includes a first number of stripes that is greater than one; while displaying the editing user interface, detecting, via the one or more input devices, a first user input; in response to detecting the first user input: in accordance with a determination that the first user input corresponds to a first type of input, displaying, in the user interface, a representation of an updated background with a second number of stripes that is greater than the first number of stripes; and in accordance with a determination that the first user input corresponds to a second type of input different from the first type of input, displaying, in the user interface, the representation of the updated background with a third number of stripes that is less than the first number of stripes; detecting, via the one or more input devices, a second user input; and in response to detecting the second user input, displaying, via the display generation component, the user interface with the updated background.

In accordance with some embodiments, a non-transitory computer-readable storage medium storing one or more programs configured to be executed by one or more processors of a computer system that is in communication with a display generation component and one or more input devices is described. The one or more programs include instructions for: displaying, via the display generation component, an editing user interface for editing a background of a user interface, wherein: the user interface includes content overlaid on the background, and the editing user interface includes a representation of the background of the user interface that includes a first number of stripes that is greater than one; while displaying the editing user interface, detecting, via the one or more input devices, a first user input; in response to detecting the first user input: in accordance with a determination that the first user input corresponds to a first type of input, displaying, in the user interface, a representation of an updated background with a second number of stripes that is greater than the first number of stripes; and in accordance with a determination that the first user input corresponds to a second type of input different from the first type of input, displaying, in the user interface, the representation of the updated background with a third number of stripes that is less than the first number of stripes; detecting, via the one or more input devices, a second user input; and in response to detecting the second user input, displaying, via the display generation component, the user interface with the updated background.

In accordance with some embodiments, a transitory computer-readable storage medium storing one or more programs configured to be executed by one or more processors of a computer system that is in communication with a display generation component and one or more input devices is described. The one or more programs include instructions for: displaying, via the display generation component, an editing user interface for editing a background of a user interface, wherein: the user interface includes content overlaid on the background, and the editing user interface includes a representation of the background of the user interface that includes a first number of stripes that is greater than one; while displaying the editing user interface, detecting, via the one or more input devices, a first user input; in response to detecting the first user input: in accordance with a determination that the first user input corresponds to a first type of input, displaying, in the user interface, a representation of an updated background with a second number of stripes that is greater than the first number of stripes; and in accordance with a determination that the first user input corresponds to a second type of input different from the first type of input, displaying, in the user interface, the representation of the updated background with a third number of stripes that is less than the first number of stripes; detecting, via the one or more input devices, a second user input; and in response to detecting the second user input, displaying, via the display generation component, the user interface with the updated background.

In accordance with some embodiments, a computer system comprising a display generation component, one or more input devices, one or more processors, and memory storing one or more programs configured to be executed by the one or more processors is described. The one or more programs include instructions for: displaying, via the display generation component, an editing user interface for editing a background of a user interface, wherein: the user interface includes content overlaid on the background, and the editing user interface includes a representation of the background of the user interface that includes a first number of stripes that is greater than one; while displaying the editing user interface, detecting, via the one or more input devices, a first user input; in response to detecting the first user input: in accordance with a determination that the first user input corresponds to a first type of input, displaying, in the user interface, a representation of an updated background with a second number of stripes that is greater than the first number of stripes; and in accordance with a determination that the first user input corresponds to a second type of input different from the first type of input, displaying, in the user interface, the representation of the updated background with a third number of stripes that is less than the first number of stripes; detecting, via the one or more input devices, a second user input; and in response to detecting the second user input, displaying, via the display generation component, the user interface with the updated background.

In accordance with some embodiments, a computer system is described. The computer system comprises: a display generation component; one or more input devices; means for displaying, via the display generation component, an editing user interface for editing a background of a user interface, wherein: the user interface includes content overlaid on the background, and the editing user interface includes a representation of the background of the user interface that includes a first number of stripes that is greater than one; means for, while displaying the editing user interface, detecting, via the one or more input devices, a first user input; means for, in response to detecting the first user input: in accordance with a determination that the first user input corresponds to a first type of input, displaying, in the user interface, a representation of an updated background with a second number of stripes that is greater than the first number of stripes; and in accordance with a determination that the first user input corresponds to a second type of input different from the first type of input, displaying, in the user interface, the representation of the updated background with a third number of stripes that is less than the first number of stripes; means for detecting, via the one or more input devices, a second user input; and means for, in response to detecting the second user input, displaying, via the display generation component, the user interface with the updated background.

In accordance with some embodiments, a method performed at a computer system that is in communication with a display generation component and one or more input devices is described. The method comprises: displaying, via the display generation component, a watch face editing user interface, wherein the watch face editing user interface includes a representation of a layout of a watch user interface including a time region for displaying a current time and one or more complication regions for displaying complications on the watch user interface; while displaying the watch face editing user interface, detecting, via the one or more input devices, a first input directed to a complication region of the one or more complication regions; and in response to detecting the first input directed to the complication region of the one or more complication regions, displaying a complication selection user interface, wherein displaying the complication selection user interface includes concurrently displaying: an indication of a first application, a first complication preview corresponding to a first complication that is configured to display, on the watch user interface, a first set of information obtained from the first application, wherein the first complication preview includes a graphical representation of the first complication displaying the first set of information, and a second complication preview corresponding to a second complication that is configured to display, on the watch user interface, a second set of information, different from the first set of information, obtained from the first application, wherein the second complication preview includes a graphical representation of the second complication displaying the second set of information; while displaying the complication selection user interface, detecting, via the one or more input devices, a second input directed to selecting a respective complication preview; and in response to detecting the second input directed to selecting the respective complication preview, displaying, via the display generation component, a representation of the watch user interface with a representation of a selected complication corresponding to the respective complication preview displayed at the first complication region of the watch user interface, wherein: in accordance with a determination that the respective complication preview is the first complication preview, the first complication is displayed in the first complication region of the watch user interface; and in accordance with a determination that the respective complication preview is the second complication preview, the second complication is displayed in the first complication region of the watch user interface.

In accordance with some embodiments, a non-transitory computer-readable storage medium storing one or more programs configured to be executed by one or more processors of a computer system that is in communication with a display generation component and one or more input devices is described. The one or more programs include instructions for: displaying, via the display generation component, a watch face editing user interface, wherein the watch face editing user interface includes a representation of a layout of a watch user interface including a time region for displaying a current time and one or more complication regions for displaying complications on the watch user interface; while displaying the watch face editing user interface, detecting, via the one or more input devices, a first input directed to a complication region of the one or more complication regions; and in response to detecting the first input directed to the complication region of the one or more complication regions, displaying a complication selection user interface, wherein displaying the complication selection user interface includes concurrently displaying: an indication of a first application, a first complication preview corresponding to a first complication that is configured to display, on the watch user interface, a first set of information obtained from the first application, wherein the first complication preview includes a graphical representation of the first complication displaying the first set of information, and a second complication preview corresponding to a second complication that is configured to display, on the watch user interface, a second set of information, different from the first set of information, obtained from the first application, wherein the second complication preview includes a graphical representation of the second complication displaying the second set of information; while displaying the complication selection user interface, detecting, via the one or more input devices, a second input directed to selecting a respective complication preview; and in response to detecting the second input directed to selecting the respective complication preview, displaying, via the display generation component, a representation of the watch user interface with a representation of a selected complication corresponding to the respective complication preview displayed at the first complication region of the watch user interface, wherein: in accordance with a determination that the respective complication preview is the first complication preview, the first complication is displayed in the first complication region of the watch user interface; and in accordance with a determination that the respective complication preview is the second complication preview, the second complication is displayed in the first complication region of the watch user interface.

In accordance with some embodiments, a transitory computer-readable storage medium storing one or more programs configured to be executed by one or more processors of a computer system that is in communication with a display generation component and one or more input devices is described. The one or more programs include instructions for: displaying, via the display generation component, a watch face editing user interface, wherein the watch face editing user interface includes a representation of a layout of a watch user interface including a time region for displaying a current time and one or more complication regions for displaying complications on the watch user interface; while displaying the watch face editing user interface, detecting, via the one or more input devices, a first input directed to a complication region of the one or more complication regions; and in response to detecting the first input directed to the complication region of the one or more complication regions, displaying a complication selection user interface, wherein displaying the complication selection user interface includes concurrently displaying: an indication of a first application, a first complication preview corresponding to a first complication that is configured to display, on the watch user interface, a first set of information obtained from the first application, wherein the first complication preview includes a graphical representation of the first complication displaying the first set of information, and a second complication preview corresponding to a second complication that is configured to display, on the watch user interface, a second set of information, different from the first set of information, obtained from the first application, wherein the second complication preview includes a graphical representation of the second complication displaying the second set of information; while displaying the complication selection user interface, detecting, via the one or more input devices, a second input directed to selecting a respective complication preview; and in response to detecting the second input directed to selecting the respective complication preview, displaying, via the display generation component, a representation of the watch user interface with a representation of a selected complication corresponding to the respective complication preview displayed at the first complication region of the watch user interface, wherein: in accordance with a determination that the respective complication preview is the first complication preview, the first complication is displayed in the first complication region of the watch user interface; and in accordance with a determination that the respective complication preview is the second complication preview, the second complication is displayed in the first complication region of the watch user interface.

In accordance with some embodiments, a computer system comprising a display generation component, one or more input devices, one or more processors, and memory storing one or more programs configured to be executed by the one or more processors is described. The one or more programs include instructions for: displaying, via the display generation component, a watch face editing user interface, wherein the watch face editing user interface includes a representation of a layout of a watch user interface including a time region for displaying a current time and one or more complication regions for displaying complications on the watch user interface; while displaying the watch face editing user interface, detecting, via the one or more input devices, a first input directed to a complication region of the one or more complication regions; and in response to detecting the first input directed to the complication region of the one or more complication regions, displaying a complication selection user interface, wherein displaying the complication selection user interface includes concurrently displaying: an indication of a first application, a first complication preview corresponding to a first complication that is configured to display, on the watch user interface, a first set of information obtained from the first application, wherein the first complication preview includes a graphical representation of the first complication displaying the first set of information, and a second complication preview corresponding to a second complication that is configured to display, on the watch user interface, a second set of information, different from the first set of information, obtained from the first application, wherein the second complication preview includes a graphical representation of the second complication displaying the second set of information; while displaying the complication selection user interface, detecting, via the one or more input devices, a second input directed to selecting a respective complication preview; and in response to detecting the second input directed to selecting the respective complication preview, displaying, via the display generation component, a representation of the watch user interface with a representation of a selected complication corresponding to the respective complication preview displayed at the first complication region of the watch user interface, wherein: in accordance with a determination that the respective complication preview is the first complication preview, the first complication is displayed in the first complication region of the watch user interface; and in accordance with a determination that the respective complication preview is the second complication preview, the second complication is displayed in the first complication region of the watch user interface.

In accordance with some embodiments, a computer system is described. The computer system comprises: a display generation component; one or more input devices; means for displaying, via the display generation component, a watch face editing user interface, wherein the watch face editing user interface includes a representation of a layout of a watch user interface including a time region for displaying a current time and one or more complication regions for displaying complications on the watch user interface; means for, while displaying the watch face editing user interface, detecting, via the one or more input devices, a first input directed to a complication region of the one or more complication regions; and means for, in response to detecting the first input directed to the complication region of the one or more complication regions, displaying a complication selection user interface, wherein displaying the complication selection user interface includes concurrently displaying: an indication of a first application, a first complication preview corresponding to a first complication that is configured to display, on the watch user interface, a first set of information obtained from the first application, wherein the first complication preview includes a graphical representation of the first complication displaying the first set of information, and a second complication preview corresponding to a second complication that is configured to display, on the watch user interface, a second set of information, different from the first set of information, obtained from the first application, wherein the second complication preview includes a graphical representation of the second complication displaying the second set of information; means for, while displaying the complication selection user interface, detecting, via the one or more input devices, a second input directed to selecting a respective complication preview; and means for, in response to detecting the second input directed to selecting the respective complication preview, displaying, via the display generation component, a representation of the watch user interface with a representation of a selected complication corresponding to the respective complication preview displayed at the first complication region of the watch user interface, wherein: in accordance with a determination that the respective complication preview is the first complication preview, the first complication is displayed in the first complication region of the watch user interface; and in accordance with a determination that the respective complication preview is the second complication preview, the second complication is displayed in the first complication region of the watch user interface.

In accordance with some embodiments, a method performed at a computer system that is in communication with a display generation component is described. The method comprises: displaying, via the display generation component, a representation of a watch face user interface that is associated with one or more graphical representations of respective characters; while displaying the representation of the watch face user interface, detecting an input corresponding to a request to share the watch face user interface with an external device; in response to detecting the input, initiating a process for sharing the watch face user interface with the external device, wherein: in accordance with a determination that the watch face user interface is associated with less than a threshold number of graphical representations of respective characters, the process for sharing the watch face user interface with the external device includes sharing one or more characteristics of the watch face user interface including transmitting a representation of one or more of the one or more graphical representations of respective characters associated with the watch face user interface; and in accordance with a determination that the watch face user interface is associated with greater than or equal to the threshold number of graphical representations of respective characters, the process for sharing the watch face user interface with the external device includes sharing one or more characteristics of the watch face user interface without transmitting a representation of the one or more graphical representations of respective characters associated with the watch user interface.

In accordance with some embodiments, a non-transitory computer-readable storage medium storing one or more programs configured to be executed by one or more processors of a computer system that is in communication with a display generation component is described. The one or more programs include instructions for: displaying, via the display generation component, a representation of a watch face user interface that is associated with one or more graphical representations of respective characters; while displaying the representation of the watch face user interface, detecting an input corresponding to a request to share the watch face user interface with an external device; in response to detecting the input, initiating a process for sharing the watch face user interface with the external device, wherein: in accordance with a determination that the watch face user interface is associated with less than a threshold number of graphical representations of respective characters, the process for sharing the watch face user interface with the external device includes sharing one or more characteristics of the watch face user interface including transmitting a representation of one or more of the one or more graphical representations of respective characters associated with the watch face user interface; and in accordance with a determination that the watch face user interface is associated with greater than or equal to the threshold number of graphical representations of respective characters, the process for sharing the watch face user interface with the external device includes sharing one or more characteristics of the watch face user interface without transmitting a representation of the one or more graphical representations of respective characters associated with the watch user interface.

In accordance with some embodiments, a transitory computer-readable storage medium storing one or more programs configured to be executed by one or more processors of a computer system that is in communication with a display generation component is described. The one or more programs include instructions for: displaying, via the display generation component, a representation of a watch face user interface that is associated with one or more graphical representations of respective characters; while displaying the representation of the watch face user interface, detecting an input corresponding to a request to share the watch face user interface with an external device; in response to detecting the input, initiating a process for sharing the watch face user interface with the external device, wherein: in accordance with a determination that the watch face user interface is associated with less than a threshold number of graphical representations of respective characters, the process for sharing the watch face user interface with the external device includes sharing one or more characteristics of the watch face user interface including transmitting a representation of one or more of the one or more graphical representations of respective characters associated with the watch face user interface; and in accordance with a determination that the watch face user interface is associated with greater than or equal to the threshold number of graphical representations of respective characters, the process for sharing the watch face user interface with the external device includes sharing one or more characteristics of the watch face user interface without transmitting a representation of the one or more graphical representations of respective characters associated with the watch user interface.

In accordance with some embodiments, a computer system comprising a display generation component, one or more processors, and memory storing one or more programs configured to be executed by the one or more processors is described. The one or more programs include instructions for: displaying, via the display generation component, a representation of a watch face user interface that is associated with one or more graphical representations of respective characters; while displaying the representation of the watch face user interface, detecting an input corresponding to a request to share the watch face user interface with an external device; in response to detecting the input, initiating a process for sharing the watch face user interface with the external device, wherein: in accordance with a determination that the watch face user interface is associated with less than a threshold number of graphical representations of respective characters, the process for sharing the watch face user interface with the external device includes sharing one or more characteristics of the watch face user interface including transmitting a representation of one or more of the one or more graphical representations of respective characters associated with the watch face user interface; and in accordance with a determination that the watch face user interface is associated with greater than or equal to the threshold number of graphical representations of respective characters, the process for sharing the watch face user interface with the external device includes sharing one or more characteristics of the watch face user interface without transmitting a representation of the one or more graphical representations of respective characters associated with the watch user interface.

In accordance with some embodiments, a computer system is described. The computer system comprises: a display generation component; means for displaying, via the display generation component, a representation of a watch face user interface that is associated with one or more graphical representations of respective characters; means, while displaying the representation of the watch face user interface, for detecting an input corresponding to a request to share the watch face user interface with an external device; in response to detecting the input, means for initiating a process for sharing the watch face user interface with the external device, wherein: in accordance with a determination that the watch face user interface is associated with less than a threshold number of graphical representations of respective characters, the process for sharing the watch face user interface with the external device includes sharing one or more characteristics of the watch face user interface including transmitting a representation of one or more of the one or more graphical representations of respective characters associated with the watch face user interface; and in accordance with a determination that the watch face user interface is associated with greater than or equal to the threshold number of graphical representations of respective characters, the process for sharing the watch face user interface with the external device includes sharing one or more characteristics of the watch face user interface without transmitting a representation of the one or more graphical representations of respective characters associated with the watch user interface.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing user interfaces related to time, thereby increasing the effectiveness, efficiency, and user satisfaction with such computer systems (e.g., electronic devices). Such methods and interfaces may complement or replace other methods for managing user interfaces related to time.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6A-6H illustrate exemplary user interfaces for displaying and enabling an adjustment of a displayed time zone, in accordance with some embodiments.

FIGS. 7A-7C are a flow diagram illustrating methods of displaying and enabling an adjustment of a displayed time zone, in accordance with some embodiments.

FIGS. 8A-8M illustrate exemplary user interfaces for initiating a measurement of time, in accordance with some embodiments.

FIGS. 9A-9B are a flow diagram illustrating methods of initiating a measurement of time, in accordance with some embodiments.

FIGS. 11A-11H are a flow diagram illustrating methods of enabling and displaying a user interface using a character, in accordance with some embodiments.

FIGS. 12A-12G illustrate exemplary user interfaces for enabling and displaying an indication of a current time, in accordance with some embodiments.

FIGS. 13A-13C are a flow diagram illustrating methods of enabling and displaying an indication of a current time, in accordance with some embodiments.

FIGS. 15A-15F are a flow diagram illustrating methods of enabling configuration of a background for a user interface, in accordance with some embodiments.

FIGS. 17A-17D are a flow diagram illustrating methods of enabling configuration of a user interface, in accordance with some embodiments.

FIGS. 18A-18J illustrate exemplary user interfaces for sharing a configuration of a user interface with an external device, in accordance with some embodiments.

FIGS. 19A-19C are a flow diagram illustrating methods for sharing a configuration of a user interface with an external device, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing user interfaces related to time. For example, there is a need for devices that enable an intuitive and efficient method for adjusting and displaying a time zone. For another example, there is a need for devices that enable an intuitive and efficient method for initiating and providing a measurement of time. For another example, there is a need for devices that provide an indication of a current time in a compelling manner. For another example, there is a need for devices that enable adjustments and modifications to a background and/or applications of a user interface in an intuitive and efficient manner. Such techniques can reduce the cognitive burden on a user who accesses user interfaces related to time on a device, thereby enhancing productivity. Further, such techniques can reduce processor and battery power otherwise wasted on redundant user inputs.

Figure 19C:
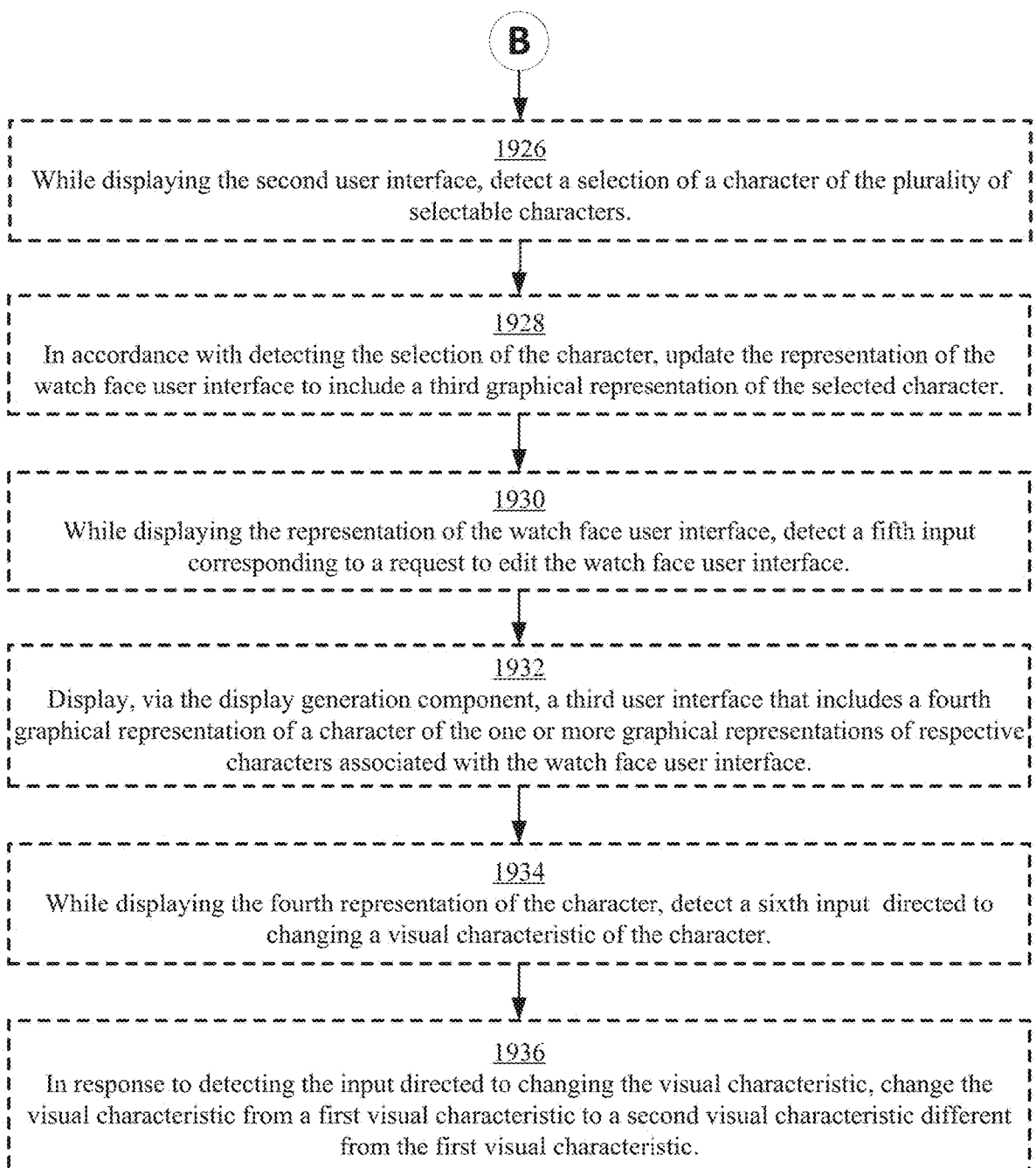

Below, FIGS. 1A-1B, 2, 3, 4A-4B, and 5A-5B provide a description of exemplary devices for performing the techniques for managing event notifications. FIGS. 6A-6H illustrate exemplary user interfaces for displaying and enabling an adjustment of a displayed time zone, in accordance with some embodiments. FIGS. 7A-7C are a flow diagram illustrating methods of displaying and enabling an adjustment of a displayed time zone, in accordance with some embodiments. The user interfaces in FIGS. 6A-6H are used to illustrate the processes described below, including the processes in FIGS. 7A-7C. FIGS. 8A-8M illustrate exemplary user interfaces for initiating a measurement of time, in accordance with some embodiments. FIGS. 9A-9B are a flow diagram illustrating methods of initiating a measurement of time, in accordance with some embodiments. The user interfaces in FIGS. 8A-8M are used to illustrate the processes described below, including the processes in FIGS. 9A-9B. FIGS. 10A-10AC illustrate exemplary user interfaces for enabling and displaying a user interface using a character, in accordance with some embodiments. FIGS. 11A-11H are a flow diagram illustrating methods of enabling and displaying a user interface using a character, in accordance with some embodiments. The user interfaces in FIGS. 10A-10AC are used to illustrate the processes described below, including the processes in FIGS. 11A-11H. FIGS. 12A-12G illustrate exemplary user interfaces for enabling and displaying an indication of a current time, in accordance with some embodiments. FIGS. 13A-13C are a flow diagram illustrating methods of enabling and displaying an indication of a current time, in accordance with some embodiments. The user interfaces in FIGS. 12A-12G are used to illustrate the processes described below, including the processes in FIGS. 13A-13C. FIGS. 14A-14AD illustrate exemplary user interfaces for enabling configuration of a background for a user interface, in accordance with some embodiments. FIGS. 15A-15F are a flow diagram illustrating methods of enabling configuration of a background for a user interface, in accordance with some embodiments. The user interfaces in FIGS. 14A-14AD are used to illustrate the processes described below, including the processes in FIGS. 15A-15F. FIGS. 16A-16AE illustrate exemplary user interfaces for enabling configuration of a user interface, in accordance with some embodiments. FIGS. 17A-17D are a flow diagram illustrating methods of enabling configuration of a user interface, in accordance with some embodiments. The user interfaces in FIGS. 16A-16AE are used to illustrate the processes described below, including the processes in FIGS. 17A-17D. FIGS. 18A-18J illustrate exemplary user interfaces for sharing a configuration of a user interface with an external device, in accordance with some embodiments. FIGS. 19A-19C are a flow diagram illustrating methods for sharing a configuration of a user interface with an external device, in accordance with some embodiments. The user interfaces in FIGS. 18A-18J are used to illustrate the processes described below, including the processes in FIGS. 19A-19C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
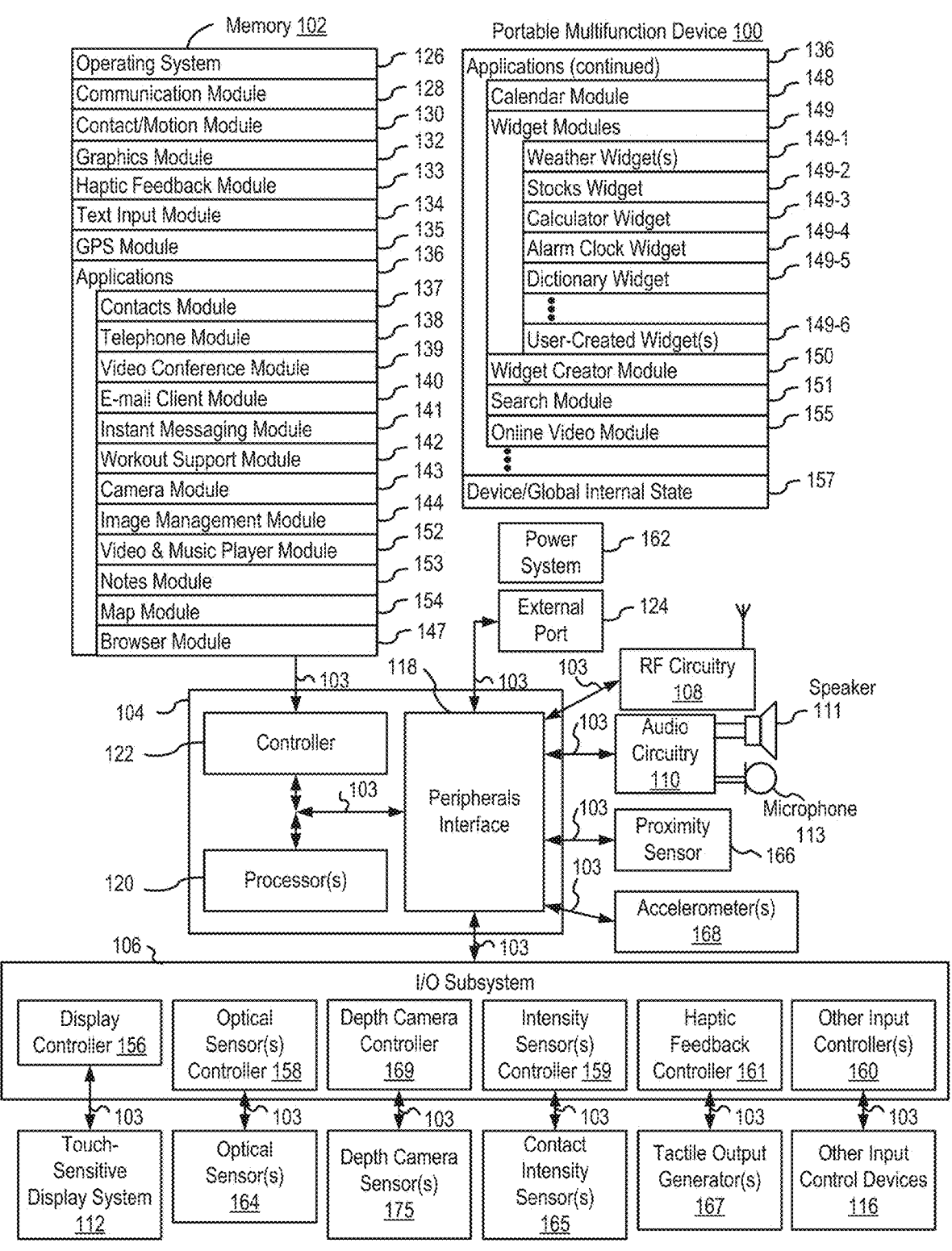
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both cars) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
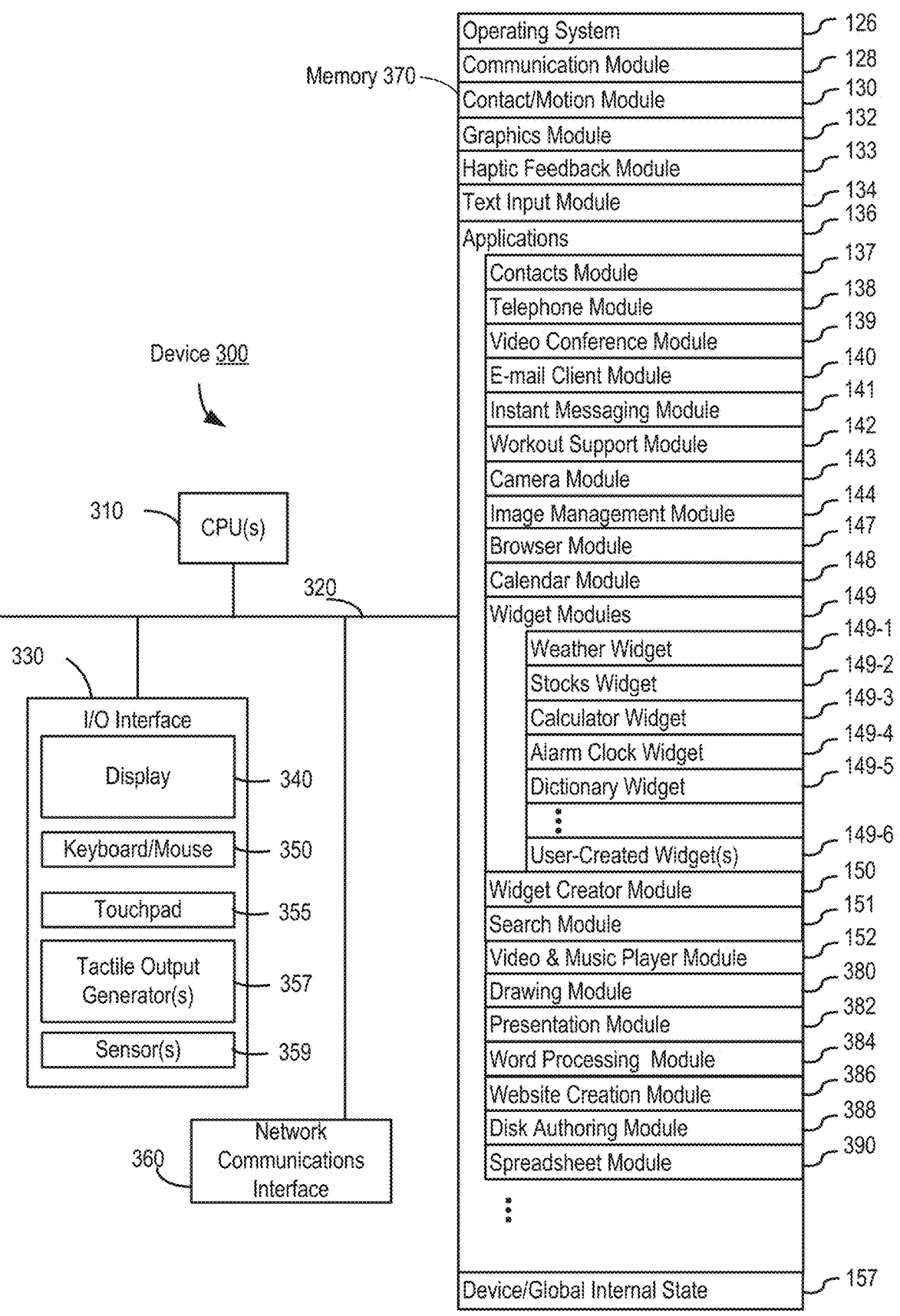
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);

Telephone module 138;

Video conference module 139;

E-mail client module 140;

Instant messaging (IM) module 141;

Workout support module 142;

Camera module 143 for still and/or video images;

Image management module 144;

Video player module;

Music player module;

Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
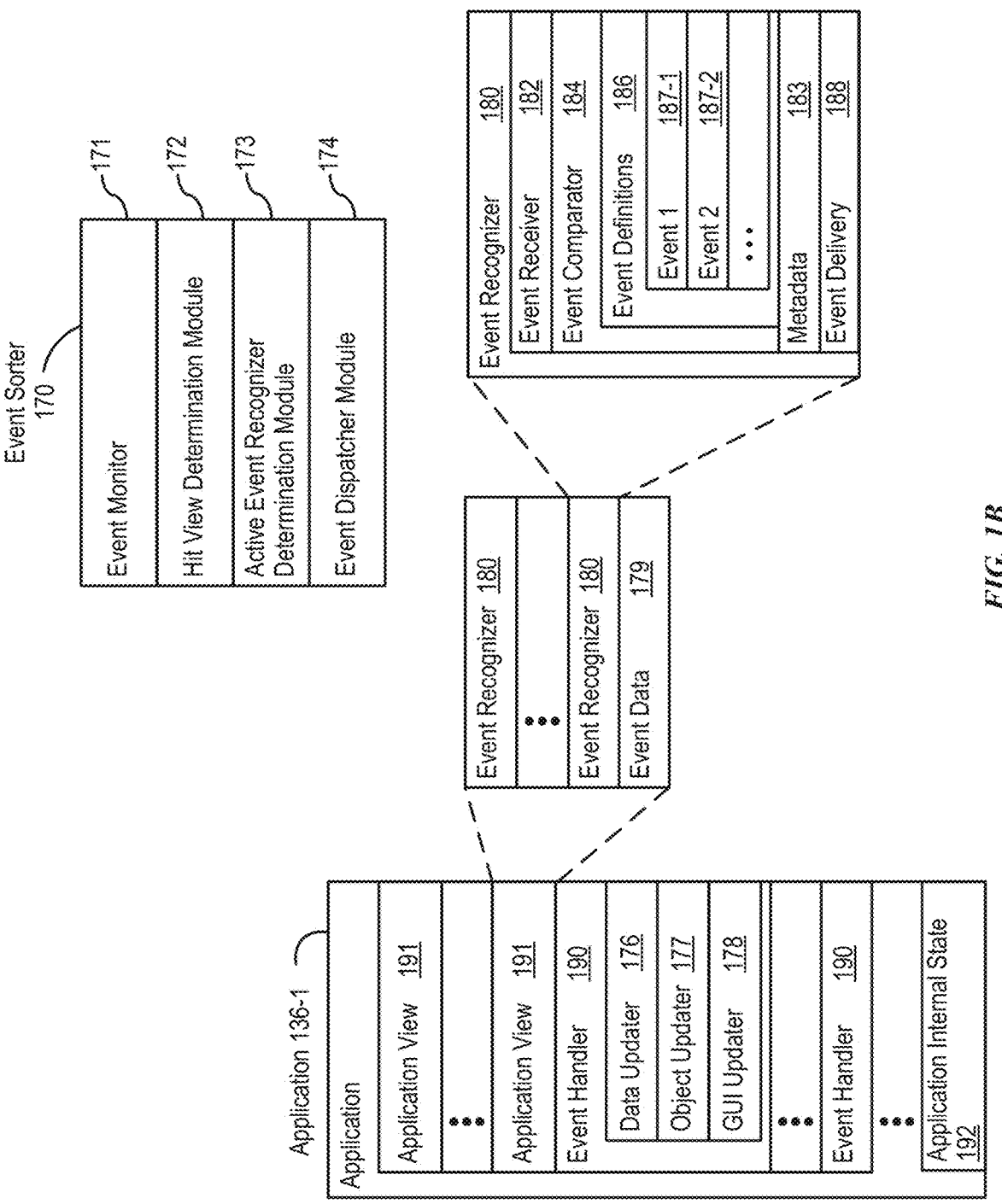
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
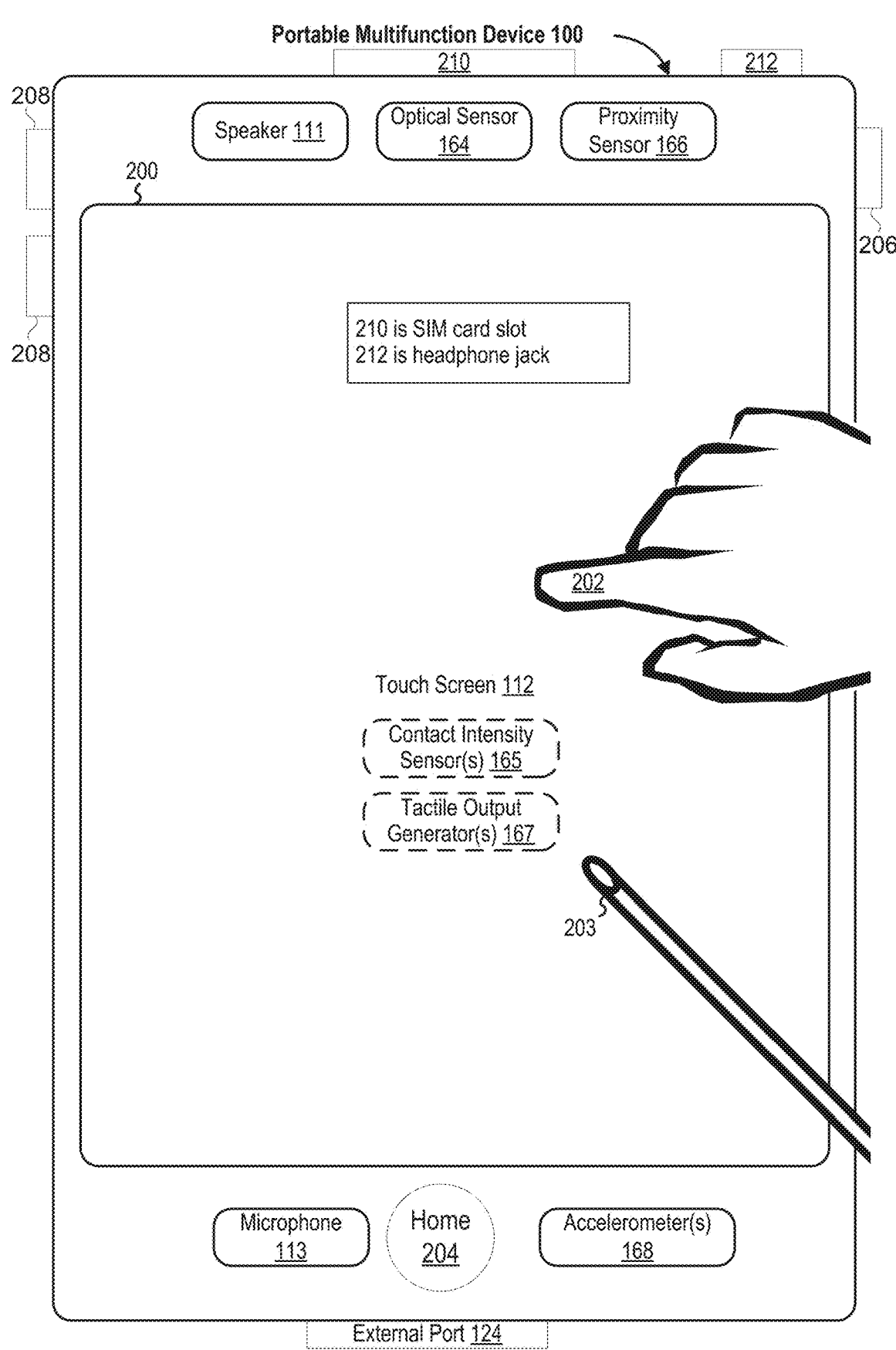
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
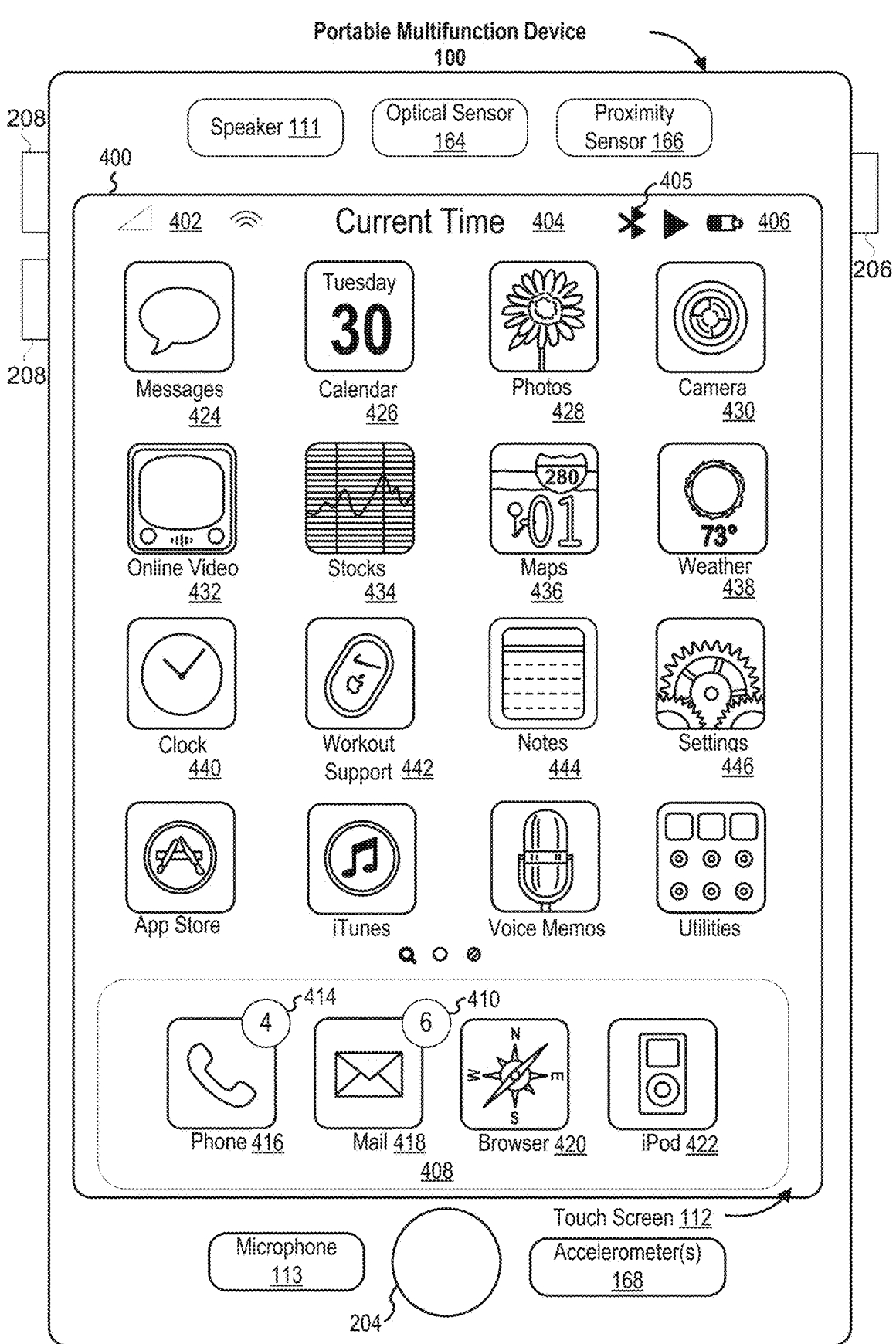
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., contacts 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
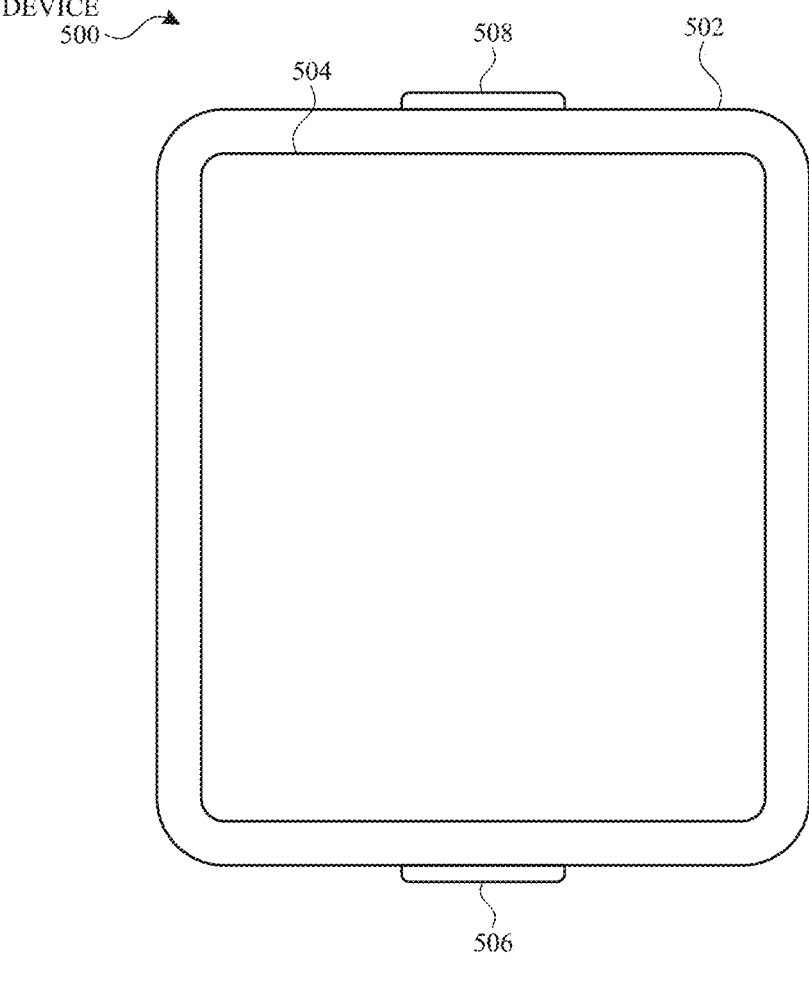
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/

040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
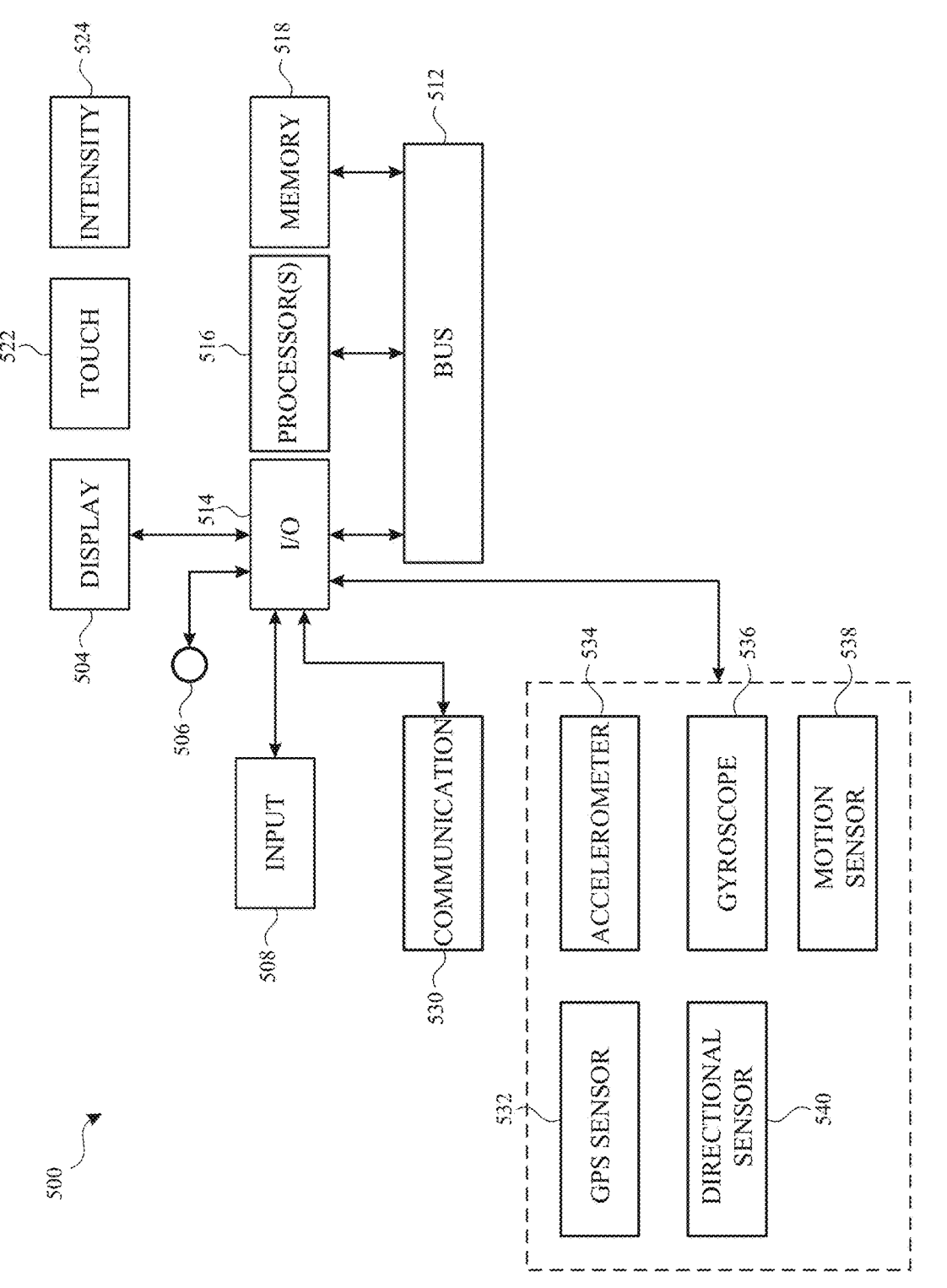
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIGS. 7A-7C), 900 (FIGS. 9A-9B), 1100 (FIGS. 11A-11H), 1300 (FIGS. 13A-13C), 1500 (FIGS. 15A-15F), 1700 (FIGS. 17A-17D), and 1900 (FIGS. 19A-19C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

Attention is now directed towards embodiments of user interfaces ("UI") and associated processes that are implemented on an electronic device, such as portable multifunction device 100, device 300, or device 500.

FIGS. 6A-6H illustrate exemplary user interfaces for displaying and enabling an adjustment of a displayed time zone, in accordance with some embodiments. The user interfaces in these figures are used to illustrate the processes described below, including the processes in FIGS. 7A-7C.

In FIG. 6A, device 600 displays watch user interface 604A, which includes first analog dial 608 concurrently displayed with second analog dial 606. Hour hand 608A, minute hand 608B, and seconds hand 608C indicate the hour, minute, and second (respectively) of a current time in a first time zone on first analog dial 608. First analog dial 608 represents a period of 12 hours (e.g., hour hand 608A will make a full rotation every 12 hours). Clock hand 608D indicates a current time in a second time zone on second analog dial 606. Second analog dial 606 represents a period of 24 hours (e.g., clock hand 608D will make a full rotation every 24 hours). Marker 606C indicates the position of midnight on second analog dial 606 (e.g., clock hand 608D will point to marker 606C at midnight in the second time zone). Time zone indicator 608E displays a textual indication ("LAX", representing Los Angeles) of the time zone associated with second analog dial 606 (e.g., an abbreviation of a geographic location within the time zone associated with second analog dial 606).

In FIG. 6A, second analog dial 606 is a ring that surrounds first analog dial 608 and has a first orientation relative to first analog dial 608. Second analog dial 606 is oriented such that midnight on second analog dial 606 is aligned with the 12 o'clock hour on first analog dial 608. First analog dial 608 and second analog dial 606 are associated with respective time zones. Watch user interface 604A includes time zone indicator 608E of the time zone associated with second analog dial 606 (e.g., a location in the time zone associated with the second analog dial 606).

In FIG. 6A, first analog dial 608 and second analog dial 606 are associated with the same time zone, a first time zone, and the time indicator associated with each dial (e.g., hour hand 608A, minute hand 608B, and/or seconds hand 608C for first analog dial 608, and clock hand 608D for second analog dial 608) indicates the same time (the current time in the first time zone). In FIG. 6A, the first time zone is the Pacific time zone, and the current time in the Pacific time zone is 6:00 AM. Hour hand 608A and minute hand 608B indicate 6:00 AM on first analog dial 608, and clock hand 608D indicates 6:00 AM on second analog dial 606.

In FIG. 6A, second analog dial 606 includes tick marks, representing the positions on second analog dial 606 corresponding to respective hours, and current hour indicator 606D, which includes a numerical indicator of the hour of the current time in the time zone associated with second analog dial 606 (e.g., second analog dial 606 includes a single numerical indicator only for the hour of the current time). In some embodiments, current hour indicator 606D is displayed only if the time zone associated with second analog dial 606 is different from the time zone associated with first analog dial 608. In some embodiments, second analog dial 606 includes numerical indicators at all hour positions or at two or more, but less than all, hour positions.

Second analog dial 606 includes first portion 606A, which corresponds to nighttime in the time zone associated with the second analog dial, and second portion 606B (e.g., the portion of second analog dial 606 that is not included in first portion 606A), which corresponds to daytime in the time zone associated with the second analog dial. First portion 606A and second portion 606B have different visual characteristics (e.g., different color, brightness, transparency, or pattern). The boundary between first portion 606A and second portion 606B that is in the clockwise direction from midnight marker 606C corresponds to a sunrise time (approximately at the 6 o'clock hour position), and the boundary between first portion 606A and second portion 606B that is in the counter-clockwise direction from midnight marker 606C corresponds to the sunset time (approximately at the 8 o'clock hour position). In FIG. 6A, the size (e.g., angular extent) of first portion 606A is smaller than the size of second portion 606B, which indicates that nighttime is shorter than daytime.

In some embodiments, the size and/or position (e.g., the angular extent and/or angular position) of first portion 606A and second portion 606B on second analog dial 606 depends on the time zone, time of year, and/or a geographic location associated with the time zone (e.g., first portion 606A representing nighttime is smaller when it is summer in a location associated with the selected time zone than when it is winter in the same location). In some embodiments, first portion 606A and second portion 606B are displayed differently when second analog dial 606 is associated with a first location in a first time zone than they are when second analog dial 606 is associated with a second location (e.g., a location different from the first location) in the first time zone (e.g., the same time zone). For example, since sunrise and sunset are later in Cleveland than they are in New York City (due to Cleveland being to the west of New York City, even though they are in the same time zone), first portion 606A and second portion 606B are displayed differently when second analog dial 606 is associated with Cleveland than when second analog dial 606 is associated with New York City (e.g., for Cleveland, first portion 606A and second portion 606B are rotated clockwise relative to marker 606C compared to their position for New York City). Similarly, since daytime is longer (e.g., sunrise is earlier and sunset is later) during the summer in Seattle than in San Diego (due to Seattle being at a higher latitude than San Diego, even though they are in the same time zone), first portion 606B and second portion 606A are displayed differently when second analog dial 606 is associated with Seattle than when second analog dial 606 is associated with San Diego (e.g., during summer in Seattle and San Diego, first portion 606A has a smaller angular extent and second portion 606B has a larger angular extend for Seattle as compared to the angular extent for San Diego). Similarly, first portion 606A and second portion 606B are displayed accordingly based on the time of year for a particular location (e.g., first portion 606A representing nighttime has a larger angular extent in winter than in summer, for a particular location).

FIG. 6B illustrates device 600 displaying watch user interface 604A at a different time (10:09 AM Pacific time) compared to FIG. 6A, as indicated by the position of hour hand 608A and minute hand 608B relative to first analog dial 608, and the position of clock hand 608D relative to second analog dial 606. Current hour indicator 606D is displayed at the 10 o'clock hour on second analog dial 606 according to the current time associated with second analog dial 606, and a tick mark is displayed at the 6 o'clock hour on second analog dial 606, where current hour indicator 606D was located in FIG. 6A when the current time was 6:00 AM.

Device 600 receives (e.g., detects) a request to change the time zone associated with second analog dial 606. In some embodiments, the request includes a sequence of one or more inputs (e.g., one or more of inputs 610, 618, 620, or 622). In FIG. 6B, device 600 receives (e.g., detects) input 610 (e.g., a gesture, a tap on display 602). In some embodiments, input 610 includes a rotation of rotatable input mechanism 603. In some embodiments, rotatable input mechanism 603 is physically connected to device 600 (e.g., to a housing of device 600). In some embodiments, rotatable input mechanism 603 has an axis of rotation that is parallel to a surface of display 602 (e.g., rotatable input mechanism 603 is attached to a side of device 600 that is perpendicular to a surface of display 602).

In response to receiving input 610, device 600 displays watch user interface 612A shown in FIG. 6C. Watch user interface 612A provides a user interface for changing the time zone associated with second analog dial 606.

In watch user interface 612A, second analog dial 606 includes numerical hour indicators at the positions on second analog dial 606 corresponding to respective hours (e.g., the tick marks shown in FIG. 6B are replaced with the numerals shown in FIG. 6C). Display of marker 606C is maintained. Watch user interface 612 includes visual indication 614 of the current time in the time zone associated with second analog dial 606. In FIG. 6C, visual indication 614 includes a circle around the respective numerical hour indicator corresponding to the hour of the current time in the time zone associated with second analog dial 606. In some embodiments, visual indicator 614 includes highlighting of the respective numerical hour indicator and/or display of the respective numerical indicator with a different visual characteristic (e.g., style, color, size, font) than the other numerical hour indicators.

Watch user interface 612A includes time zone selection element 616, which displays a designated time zone option corresponding to the time zone associated with the second analog dial. In the embodiment illustrated in FIGS. 6B-6C, time zone selection element 616 replaces the display of first analog dial 608 (e.g., device 600 ceases display of first analog dial 608 and displays time zone selection element 616) and complications 605A-605D are replaced with affordance 607 (e.g., device 600 ceases display of complications 605A-605D and displays affordance 607). In some embodiments, device 600 displays complications 605A-605D in watch user interface 612A. In some embodiments, device 600 does not display affordance 607 in watch user interface 612A.

In the embodiment illustrated in FIG. 6D, time zone selection element includes a list of selectable time zone options arranged according to the difference in time (also referred to as the offset) between the current time in the time zone associated with first analog dial 608 (or the time zone in which device 600 is located) and the respective time zone option. The time zone option corresponding to the time zone associated with second analog dial 606 is designated by being visually distinguished (e.g., placed in focus, emphasized, outlined, displayed without displaying other time zone options, highlighted in a different color than other time zone options, displayed brighter than or with less transparency than other time zone options). In the embodiment illustrated in FIG. 6D, the time zone option corresponding to the time zone associated with second analog dial 606 is visually distinguished by being displayed in the center of time zone selection element 616 and at a larger size than the other time zone options. In some embodiments, the time zone options show the current time in the corresponding time zone and an identifier of the time zone (referred to as a time zone identifier). For example, in FIG. 6C, the option for the Mountain time zone includes the current time in the Mountain time zone (11:09) and text (DEN) indicating a location (Denver) within the Mountain time zone. The style of the time zone identifier can depend on the option. For example, if a particular geographic location is designated for the option (e.g., via a system setting or by a user), then the time zone identifier includes text representing the particular geographic location; if the option corresponds to the time zone in which device 600 is located, then the time zone identifier includes a "current location" symbol (e.g., the arrow to the left of 10:09 in FIG. 6C); and if no particular geographic location is designated for the time zone option and the time zone option does not correspond to the location of device 600, then the time zone identifier includes a numerical indicator of the offset (e.g., since no geographic location is designated for the time zone adjacent to the West of the Pacific time zone, which has a current time of 9:09 corresponding to an offset of one hour behind, the time zone indicator includes the numerical indicator "−1"). In some embodiments, the time zone identifier indicates the offset of the time zone option compared to Coordinated Universal Time (UTC) or Greenwich Mean Time (GMT).

While displaying watch user interface 612A, device 600 receives (e.g., detects) input 618. In FIG. 6C, input 618 includes a rotation of rotatable input mechanism 603. In some embodiments, input 618 includes a gesture (e.g., a vertical swipe on display 602). In response to receiving input 618, device 600 displays watch user interface 612B shown in FIG. 6D. Watch user interface 612B designates a different time zone option compared to FIG. 6C (e.g., device 600 changes the designated time zone option in response to input 618). In FIG. 6D, the list of options in time zone selection element 616 has been shifted (e.g., scrolled) compared to FIG. 6C to designate a different time zone (Mountain time), and second analog dial 606 is displayed at a different orientation (e.g., rotated) relative to time zone selection element 616, as compared to FIG. 6C, to correspond to the designated time zone option. In some embodiments, device 600 displays an animated rotation of second analog dial 606 and/or an animated scrolling or rotation of the list of options in time zone selection element 616 in response to receiving input 618. The change in second analog dial 606 corresponds to the change in time zone selection element 616 such that the hour indicated by visual indication 614 in second analog dial 606 corresponds to the hour of the current time associated with the designated time zone option (DEN 11:09). In FIG. 6D, second analog dial 606 is rotated counter-clockwise $\frac{1}{24}^{th}$ of a complete rotation (e.g., one hour) such that the hour numeral for the 11 o'clock hour is indicated by visual indication 614 (e.g., visual indication 614 maintains the same position while second analog dial 606 is rotated counter-clockwise).

In the embodiment illustrated in FIGS. 6C-6D, second analog dial 606 is rotated around an axis that is normal to a surface of display 602 and passes through the center of second analog dial 606; the list of time zone options is displayed such that the time zone options appear to rotate about an axis that is perpendicular to the axis of rotation of second analog dial 606 (e.g., the time zone options appear to rotate about an axis that is parallel to an axis of rotation of rotatable input mechanism 603; the time zone options appear to move at least partly in a direction normal to (e.g., toward and away from) a surface of display 602, in addition to moving vertically on display 602).

In some embodiments, device 600 changes the offset by an amount that is based on (e.g., proportional to) a magnitude, speed, and/or direction of input 618 (e.g., an amount of rotation of rotatable input mechanism 603; a distance of a gesture). For example, the list of time zone options is scrolled by an amount proportional to the magnitude of input 618, and second analog dial 606 is rotated by an amount proportional to the magnitude of input 618.

In some embodiments, device 600 changes the offset based on a direction of input 618 (e.g., a direction of rotation of rotatable input mechanism 603; a direction of a gesture). For example, device 600 increases the offset (e.g., moves to a time zone option is that is further ahead in time) in response to an input in a first direction (e.g., a clockwise rotation, an upward gesture), and decreases the offset (e.g., moves to a times zone option that is further behind in time) in response to an input in a second direction (e.g., a direction opposite the first direction, a counter-clockwise rotation, a downward gesture).

Figure 6E:
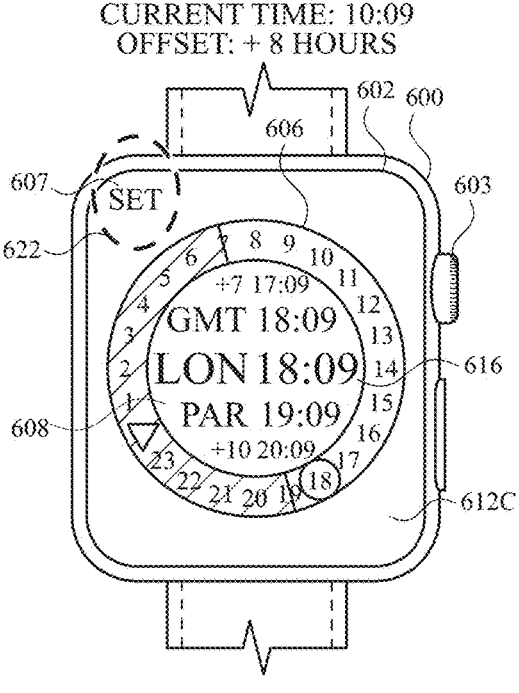

In FIG. 6D, device 600 receives (e.g., detects) input 620 (e.g., a gesture, a rotation of rotatable input mechanism 603). In FIG. 6D, input 620 includes a rotation of rotatable input mechanism 603. In some embodiments, input 620 is a continuation of input 618 (e.g., further rotation of rotatable input mechanism 603). In response to input 620, device 600 displays watch user interface 612C shown in FIG. 6E. Watch user interface 612C designates the time zone option corresponding to the time zone that is eight hours ahead of the time zone associated with first analog dial 608 (or the time zone in which device 600 is located), corresponding to an offset of +8 hours. In the example illustrated in FIG. 6E, the designated time zone option corresponds to the time zone in which London (LON) is located, where the current time is 6:09 PM (18:09 in 24-hour time). Second analog dial 606 is positioned to correspond to the designated time zone option such the numerical indicator for the 18 o'clock hour is indicated by visual indication 614 (e.g., visual indication 614 maintains the same position while second analog dial 606 is rotated counter-clockwise from the orientation shown in FIG. 6D). As the time zone option is changed, first portion 606A and second portion 606B are displayed (e.g., updated) according to the designated option (e.g., to represent daytime and nighttime based on the geographic location and time of year for the selected option, as described above). For example, first portion 606A and second portion 606B indicate sunrise and sunset times of approximately 6 AM and 8 PM, respectively, for Los Angeles in FIG. 6C, whereas they indicate sunrise and sunset times of 7 AM and 7 PM, respectively, for London in FIG. 6E.

In FIG. 6E, device 600 receives (e.g., detects) input 622. In the embodiment illustrated in FIG. 6E, input 622 includes a tap on an affordance (e.g., "SET" affordance 607) on display 602. In some embodiments, input 622 includes a press of rotatable and depressible input mechanism 603. In some embodiments, input 622 includes a contact on display 602 (e.g., a contact anywhere on display 602, a contact at a location outside of second analog dial 606, a tap on time zone selection element 616).

In response to input 622, device 600 associates the time zone option designated in FIG. 6E (e.g., the time zone option that is designated at the time of input 622) with second analog dial 606 (e.g., in response to input 622, device 600 sets the time zone associated with second analog dial 606 to the time zone corresponding to the time zone option that is designated at the time of input 622).

Figure 6F:
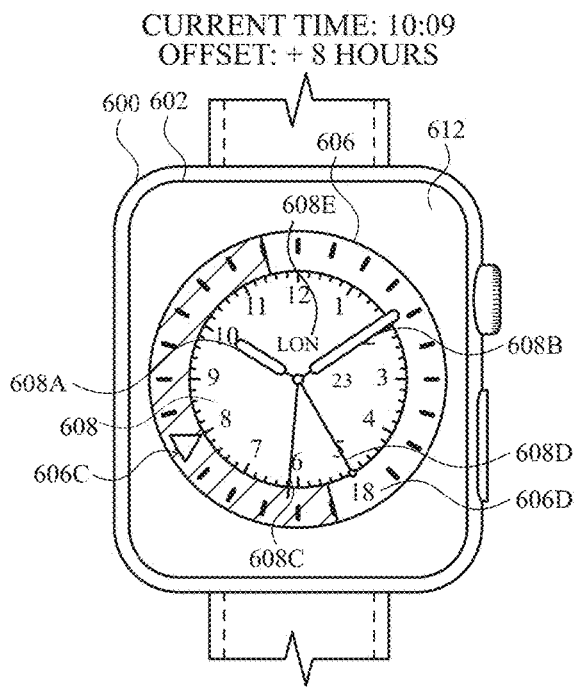
Figure 6G:
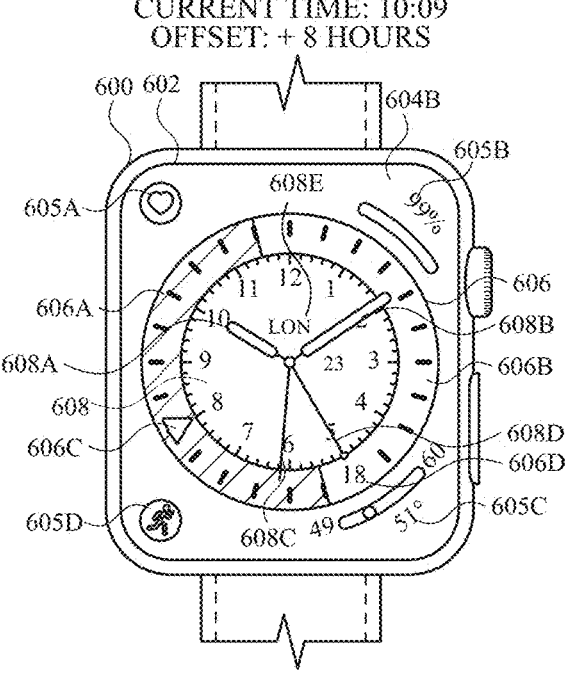

In response to input 622, device 600 displays an animation, an embodiment of which is illustrated in FIGS. 6F-6G, resulting in display of watch user interface 604B. In some embodiments, device 600 displays watch user interface 604B in response to input 622 without the animation illustrated by FIGS. 6F-6G or with an animation different from the animation illustrated by FIGS. 6F-6G.

As shown in FIG. 6F, device 600 ceases to display affordance 607 and time zone selection element 616, and displays first analog dial 608, hour hand 608A, minute hand 608B, and clock hand 608D. In FIG. 6F, compared to watch user interface 612C, second analog dial 606 includes tick marks indicating the positions of respective hours, and marker 606C, similar to the appearance of second analog dial 606 in FIGS. 6A-6B. In some embodiments, the numerical hour indicators shown in FIG. 6E fade out and the tick marks shown in FIG. 6F fade in. In FIG. 6G, complications 605A-605D are displayed (e.g., all at the same time, one at a time, while the tick marks are displayed, after the tick marks are displayed).

Watch user interface 604B is similar to watch user interface 604A, except that second analog dial 606 is displayed at a different orientation relative to first analog dial 608, clock hand 608D indicates, on second analog dial 606, the current time in the time zone selected in FIGS. 6C-6E, and current hour indicator 606D indicates the hour of the current time in the time zone selected in FIGS. 6C-6E. The orientation of second analog dial 606 relative to first analog dial 608 corresponds to the offset between the time zone associated with second analog dial 606 and the time zone associated with first analog dial 608. In watch user interface 604B, time zone indicator 608E displays a textual indication ("LON") of the time zone associated with second analog dial 606 (e.g., an abbreviation of a geographic location within the time zone associated with second analog dial 606).

In some embodiments, the position of clock hand 608D relative to first analog dial 608 indicates the current time in the time zone associated with first analog dial 608, regardless of the orientation of second analog dial 606 relative to first analog dial 608 (e.g., clock hand 608D indicates the current time in the time zone associated with first analog dial 608 as if first analog dial 608 represented a 24-hour period of time; clock hand 608D points to the 12 o'clock hour on first analog dial 608 at midnight in the time zone associated with first analog dial 608 and points to the 3 o'clock hour on first analog dial 608 at 6:00 AM in the time zone associated with first analog dial 608).

Figure 6H:
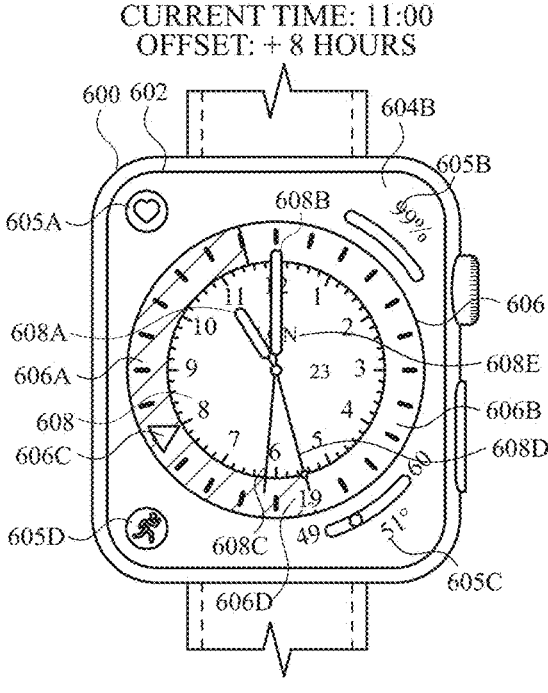

Turning to FIG. 6H, watch user interface 604B is displayed at a different (e.g., later) time compared to FIG. 6G. In FIG. 6H, the current time in the time zone associated with first analog dial 608 is 11:00 AM, as indicated by hour hand 608A and minute hand 608B. The corresponding current time in the time zone associated with second analog dial 606 is 7:00 PM (19:00 in 24-hour time). Second analog dial 606 has the same orientation relative to first analog dial 608 as in FIG. 6G (e.g., the orientation of second analog dial 606 relative to first analog dial 608 remains the same (e.g., is maintained) as time advances as long as the time zone associated with second analog dial 606 is not changed). Clock hand 608D indicates the current time in the time zone associated with second analog dial 606 by being positioned at the location on the second analog dial representing 19:00. Compared to watch user interface 604B in FIG. 6G, clock hand 608D is rotated clockwise (e.g., clock hand 608D advances clockwise at a rate of $\frac{1}{24}^{th}$ of a full rotation per hour) and current hour indicator 606D is displayed at the 19 o'clock position instead of the 18 o'clock position. In some embodiments, current hour indicator 606D advances to the next adjacent hour position at the top of an hour (e.g., when the current time changes from 18:59 to 19:00).

FIGS. 7A-7C are a flow diagram illustrating methods of displaying and enabling an adjustment of a displayed time zone, in accordance with some embodiments. Method 700 is performed at a computer system (e.g., 100, 300, 500, 600) (e.g., a smart device, such as a smartphone or a smartwatch; a mobile device) that is in communication with a display generation component and one or more input devices (e.g., including a touch-sensitive surface that is integrated with the display generation component; a mechanical input device; a rotatable input device; a rotatable and depressible input device; a microphone). Some operations in method 700 are, optionally, combined, the orders of some operations are, optionally, changed, and some operations are, optionally, omitted.

As described below, method 700 provides an intuitive way for managing user interfaces related to time. The method reduces the cognitive burden on a user for managing user interfaces related to time, thereby creating a more efficient human-machine interface. For battery-operated computing devices, enabling a user to manage user interfaces related to time faster and more efficiently conserves power and increases the time between battery charges.

The computer system (e.g., 600) displays (702), via the display generation component (e.g., 602), a watch user interface (e.g., 604A) (e.g., showing one or more times via an analog clock), wherein displaying the watch user interface includes concurrently displaying a first analog dial (e.g., 608) (e.g., a 12-hour dial) and a first time indicator (e.g., 608A or 608B) (e.g., an hour hand or an hour hand and a minute hand) that indicates a current time in a first time zone on the first analog dial (e.g., the current time; the time of the current time zone) (704), and a second analog dial (e.g., 606) (e.g., a 24-hour dial) and a second time indicator (e.g., 608D) (e.g., an hour hand) that indicates a current time in a second time zone on the second analog dial, wherein the second analog dial is displayed at a first orientation relative to the first analog dial (e.g., based on the difference between the first time zone and the second time zone) (706).

In some embodiments, the same time is indicated on both the first analog dial and the second analog dial. In some embodiments, the second time indicator is displayed in a different color and/or shape than the first time indicator. In some embodiments, the second analog dial surrounds the outside of the first analog dial. In some embodiments, the second analog dial includes a graphical indicator (e.g., 606C) (e.g., a marker; a triangular marker) of the midnight mark (e.g., the 24-hour mark of the 24-hour dial). Concurrently displaying the first analog dial that indicates the current time in the first time zone and the second analog dial that indicates the current time in the second time zone enables a user quickly and easily view current times for different time zones with a reduced number of inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

After displaying the watch user interface (e.g., 604A) with the first analog dial (e.g., 608) and the second analog dial (e.g., 606) that is displayed at a first orientation relative to the first analog dial (708), the computer system (e.g., 600) receives (710), via the one or more input devices (e.g., 610, 618, 620) to change a time zone associated with the second analog dial (e.g., a time zone that is shown/represented via the second analog dial).

In response to receiving the request (e.g., 610, 618, 620) to change the time zone associated with the second analog dial (e.g., 606) (716), the computer system (e.g., 600) changes (718) the time zone associated with the second analog dial to a third time zone that is different from the first time zone.

While the second analog dial (e.g., 606) is associated with (e.g., set to) the third time zone (720), the computer system (e.g., 600) displays (722), via the display generation component (e.g., 602), the watch user interface (e.g., 604A).

Displaying the watch user interface (e.g., 604A) includes concurrently displaying the first analog dial (e.g., 608) and the first time indicator (e.g., 608A or 608B) indicating a current time in the first time zone (e.g., the first time; the first time plus the amount of time that has passed since detecting the user input and rotating the second analog dial) on the first analog dial (724), and the second analog dial (e.g., 606) and the second time indicator (e.g., 608D) indicating a current time in the third time zone on the second analog dial, wherein the second analog dial is displayed at a second orientation relative to the first analog dial (e.g., based on the difference between the first time zone and the third time zone) (726). Displaying the current time in the third time zone on the second analog dial with the second analog dial being displayed at a second orientation relative to the first analog dial enables a user to efficiently view the current time at the third time zone relative to the current time at the first time zone. Providing additional features on a user interface without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first analog dial (e.g., 608) represents a period of 12 hours, the first time indicator (e.g., 608A or 608B) includes at least a first clock hand (e.g., an hour hand) that indicates, on the first analog dial, the current time in the first time zone (e.g., the position of the first clock hand relative to the first analog dial indicates the current time in the first time zone), the second analog dial (e.g., 606) represents a period of 24 hours, and the second time indicator (e.g., 608D) includes a second clock hand (e.g., an alternative hour hand) that indicates, on the second analog dial, the current time in the time zone associated with the second analog dial (e.g., the position of the second clock relative to the second analog dial indicates the current time in the time zone associated with the second analog dial). Providing the first analog dial that represents a period of 12 hours and the second analog dial that represents a period of 24 hours enables a user to easily distinguish between the two analog dials, thereby enhancing the operability of the device and making the user-device interface more efficient (e.g., by helping the user to more easily read or view displayed content) which, additionally, reduces power usage and improves battery life of the device by enabling the user to use the device more quickly and efficiently.

In some embodiments, while the second analog dial (e.g., 606) is associated with (e.g., set to) the third time zone (720), wherein the third time zone is different from the first time zone (e.g., the first analog dial and the second analog dial are indicating current times at different time zones), the computer system (e.g., 600) displays (728), in the second analog dial, a numerical indication (e.g., 606D) of an hour of the current time in the third time zone without displaying, in the second analog dial, a numerical indication of any other hour. In some embodiments, while the second analog dial is associated with (e.g., set to) the third time zone, wherein the third time zone is different from the first time zone (e.g., the first analog dial and the second analog dial are indicating current times at different time zones), the computer system displays, in the second analog dial, a numerical indication of an hour of the current time in the third time zone and numerical indications of a subset of (e.g., but not all of) other hours (e.g., one or more hours before and/or after the current hour, but not all 24 hours).

In some embodiments, the watch user interface (e.g., 604A) includes a text indication (e.g., 608E; a name; an abbreviation of the name) of a location (e.g., city; country; geographic region) associated with the second analog dial (e.g., 606) (730). Including the text indication of the location associated with the second analog dial in the watch user interface enables a user to easily identify the time zone displayed via the second analog dial, thereby enhancing the operability of the device and making the user-device interface more efficient (e.g., by helping the user to more easily read or view displayed content) which, additionally, reduces power usage and improves battery life of the device by enabling the user to use the device more quickly and efficiently.

In some embodiments, the second analog dial (e.g., 606) includes (732) a first portion (e.g., 606B) that corresponds to daytime in the time zone (e.g., represented by portion 606B in FIGS. 6A-6B and 6G-6H) associated with the second analog dial (e.g., the daytime hours; beginning at a point in the second analog dial (e.g., a first boundary between portion 606B and 606A in FIGS. 6A-6B and 6G-6H) corresponding to a sunrise time and ending at a point in the second analog dial (e.g., a second boundary between portion 606B and 606A in FIGS. 6A-6B and 6G-6H) corresponding to the sunset time), wherein the first portion includes a first visual characteristic (e.g., a first color; a first brightness/dimness level) (734), and a second portion (e.g., 606A) (e.g., the remaining portion of the second analog dial other than the first portion) that corresponds to nighttime in the time zone (e.g., represented by portion 606A in FIGS. 6A-6B and 6G-6H) associated with the second analog dial (e.g., the nighttime hours; beginning at the point in the second analog dial corresponding to the sunset time and ending at the point in the second analog dial corresponding to the sunrise time), wherein the second portion includes a second visual characteristic different from the first visual characteristic (e.g., a second color; a second brightness/dimness level) (736). Providing the first portion that corresponds to daytime and the second portion that corresponds to nighttime in the time zone associated with the second analog dial provides information about daytime/nighttime hours at the time zone associated with the second analog dial in an intuitive manner. Providing improved feedback enhances the operability of the device and makes the user-device interface more efficient (e.g., by helping the user to more easily read or view displayed content) which, additionally, reduces power usage and improves battery life of the device by enabling the user to use the device more quickly and efficiently.

In some embodiments, a first position in the second analog dial (e.g., 606) (e.g., the point in the second analog dial corresponding to the sunrise time) that corresponds to a beginning point for the first portion (e.g., 606B) and an ending point for the second portion (e.g., 606A) and a second position in the second analog dial (e.g., the point in the second analog dial corresponding to the sunset time) that corresponds to an ending point for the first portion and a beginning point for the second portion are determined (e.g., automatically) based on geographic location (e.g., the location (e.g., city; region) corresponding to the respective time zone) and time of year (e.g., the current month; the current season).

In some embodiments, receiving the request (e.g., 610, 618, 620) to change the time zone associated with the second analog dial (e.g., 606) includes detecting, via the one or more input devices (e.g., a touch-sensitive surface integrated with the display generation component), user input (e.g., 610) (e.g., touch input) directed to a location (e.g., the center region) on the watch user interface (e.g., 604A) (712). In some embodiments, the request is received while the computer system (e.g., 600) is displaying or causing display of, via the display generation component (e.g., 602), the watch user interface, and receiving the request does not require access of a menu or a dedicated editing mode to edit the second analog dial. In some embodiments, changing (e.g., shifting; rotating) the second analog dial does not cause a change to other aspects or features of the watch user interface (e.g., the first analog dial; the first indication of time; displayed watch complications).

In some embodiments, receiving the request (e.g., 610, 618, 620) to change the time zone associated with the second analog dial (e.g., 606) includes detecting, via the one or more input devices (e.g., a rotatable input device; a rotatable and depressible input device), rotational input (e.g., 618, 620) (e.g., in clockwise direction; in a counter-clockwise direction) of a rotatable input mechanism (e.g., 603) (714).

In some embodiments, changing the time zone associated with the second analog dial (e.g., 606) to a third time zone (e.g., the time zone corresponding to "LON" in FIGS. 6E-6H) that is different from the first time zone (e.g., the current time zone associated with first analog dial 608 in FIGS. 6A-6B) includes (e.g., in accordance with detecting an input (e.g., 618, 620) directed to rotating the second analog dial (e.g., while detecting the input directed to rotating the second analog dial)) rotating (e.g., where the rotation is displayed (e.g., as an animation) while an input (e.g., a rotational input on the rotatable input device; a touch input such as a swipe or pinch input) is being received), about a first rotational axis, the second analog dial (e.g., 606) to a respective orientation relative to the first analog dial (e.g., 608) (e.g., while the first analog dial is not rotated) (e.g., from the orientation of the second analog dial relative to the first analog dial as in FIG. 6C to the orientation of the second analog dial relative to the first analog dial as in FIG. 6E), wherein the first rotational axis is perpendicular to a surface of the display generation component (e.g., 602). In some embodiments, the first rotational axis goes through a center of the display generation component (e.g., 602). In some embodiments, the first rotational axis is perpendicular to an axis of rotation of the input directed to rotating the second analog dial. Rotating the second analog dial about the first rotational axis, where the first rotational axis is perpendicular to a surface of the display generation component, when changing the time zone associated with the second analog dial provides visual feedback of the time zone being changed in an intuitive manner. Providing improved feedback enhances the operability of the device and makes the user-device interface more efficient (e.g., by helping the user to more easily read or view displayed content) which, additionally, reduces power usage and improves battery life of the device by enabling the user to use the device more quickly and efficiently.

In some embodiments, in accordance with a determination that the input (e.g., a rotational input on the rotatable input device; a touch input such as a swipe or pinch input) directed to rotating the second analog dial is in a first direction (e.g., a clockwise direction), the computer system (e.g., 600) rotates the second analog dial (e.g., 606) in the first direction (e.g., the clockwise direction) about a first rotational axis (e.g., a first axis going through the center of the watch user interface/display generation component and is perpendicular to the display generation component).

In some embodiments, in accordance with a determination that the input (e.g., a rotational input on the rotatable input device (e.g., 603); a touch input such as a swipe or pinch input) directed to rotating the second analog dial (e.g., 606) is in a second direction (e.g., counter-clockwise direction) (e.g., an input that is in the opposite direction to inputs 618 and 620 in FIGS. 6C-6D, the computer system (e.g., 600) rotates the second analog dial (e.g., 606) in the second direction (e.g., the counter-clockwise direction) about the first rotational axis.

In some embodiments, the rotational axis of the detected input (e.g., a rotational input; a touch input (e.g., a two-finger twisting input)) is perpendicular to the first rotational axis for rotation of the second analog dial (e.g., 606). In some embodiments, the rotational axis of the detected input (e.g., a rotational input; a touch input) is parallel to the first rotational axis for rotation of the second analog dial. In some embodiments, the amount of rotation (e.g., amount of angle of rotation) of the second dial corresponds to (e.g., is directly proportional to) a magnitude of the user input (e.g., an angular magnitude of a rotation of the rotatable input device).

In some embodiments, while (e.g., and only while) the second analog dial (e.g., 606) is being rotated, the computer system (e.g., 600) displays or causes display of, in the second analog dial, numbers corresponding to each time mark (e.g., each hour mark) in the second analog dial.

In some embodiments, changing the time zone associated with the second analog dial (e.g., 606) to a third time zone (e.g., the time zone corresponding to "LON" in FIGS. 6E-6H) that is different from the first time zone (e.g., the current time zone associated with first analog dial 608 in FIGS. 6A-6B) includes (e.g., in accordance with detecting an input (e.g., 618, 620) directed to rotating a rotatable user interface element (e.g., 616) (e.g., while detecting the input directed to rotating the rotatable user interface element)) rotating, about a second rotational axis, the rotatable user interface element (e.g., as shown via rotation of time zone selection element 616 in FIGS. 6C-6E) (e.g., while concurrently rotating the second analog dial (e.g., 606) to reflect the changing time zone), wherein the second rotational axis is parallel with a surface of the display generation component (e.g., 602). In some embodiments, the second rotational axis is perpendicular to the first rotational axis. Rotating the rotatable user interface element (e.g., while concurrently rotating the second analog dial to reflect the changing time zone) about the second rotational axis, where the second rotational axis is parallel with a surface of the display generation component, when changing the time zone associated with the second analog dial provides visual feedback of the time zone being changed in an intuitive manner. Providing improved feedback enhances the operability of the device and makes the user-device interface more efficient (e.g., by helping the user to more easily read or view displayed content) which, additionally, reduces power usage and improves battery life of the device by enabling the user to use the device more quickly and efficiently.

In some embodiments, in accordance with a determination that the input (e.g., 618, 620) (e.g., a rotational input on the rotatable input device; a touch input such as a swipe or pinch input) directed to rotating the rotatable user interface element (e.g., 616) is in a first direction (e.g., a clockwise direction), the computer system (e.g., 600) rotates the rotatable user interface element in the first direction (e.g., the clockwise direction) about a second rotational axis (e.g., a second axis that is parallel with the display generation component). In some embodiments, in accordance with a determination that the input (e.g., a rotational input on the rotatable input device; a touch input such as a swipe or pinch input) directed to rotating the rotatable user interface element is in a second direction (e.g., counter-clockwise direction), the computer system rotates the second analog dial in the second direction (e.g., the counter-clockwise direction) about the second rotational axis.

In some embodiments, the rotational input is directed via a rotatable input device (e.g., 603) for which the rotational axis is parallel to the second rotational axis for rotation of the rotatable user interface element (e.g., 616).

In some embodiments, time zone options that can be selected from the rotatable user interface element (e.g., 616) include cities/countries/regions (e.g., shown with abbreviations) (e.g., as shown via time zone selection element 616 in FIGS. 6C-6E). In some embodiments, time zone options that can be selected from the rotatable user interface element include numerical offsets (e.g., both plus and minus) (e.g., the top two time zone options shown in time zone selection element 616 in FIG. 6C) from the current time zone (e.g., the first time zone) corresponding to the time zone of the physical location of the computer system (e.g., 600) (e.g., the center time zone shown in time zone selection element 616 in FIG. 6C), where the offsets indicate the time difference between a respective different time zone and the current time zone (and where the offset is zero if there is no difference between the time zones).

In some embodiments, the one or more input devices include a rotatable input device (e.g., 603) (e.g., a rotatable and depressible input device), and wherein changing the time zone associated with the second analog dial (e.g., 606) to a third time zone that is different from the first time zone includes changing the time zone associated with the second analog dial to the third time zone in response to detecting, via the rotatable input device, a rotational input (e.g., 618 or 620) (e.g., in a clockwise direction or a counter-clockwise direction). Changing the time zone associated with the second analog dial in response to detecting, via the rotatable input device, the rotational input provides an intuitive method for a user to navigate through available time zone and select a different time zone. Providing improved control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with changing the time zone associated with the second analog dial (e.g., 606) to a third time zone that is different from the first time zone, the computer system (e.g., 600) adjusts, in the second analog dial, a visual indication of daytime (e.g., 606B) (e.g., daytime hours; the time between sunrise and sunset) to indicate daytime at the third time zone (e.g., instead of at the second time zone), wherein adjusting the visual indication of daytime to indicate daytime at the third time zone includes transitioning from visually distinguishing (e.g., using a first color; a first shade) a first portion of the second analog dial (e.g., 606B in FIG. 6B) (from the remaining portion of the second analog dial) to visually distinguishing a second portion of the second analog dial (e.g., 606B in FIG. 6D) (from the remaining portion of the second analog dial), the second portion of the second analog dial corresponding to the visual indication of daytime at the third time zone. In some embodiments, the visual indication of daytime includes the portion of the second analog dial corresponding to the daytime hours being shown (e.g., colored; brightened or dimmed) with a first visual characteristic while the remaining portion (e.g., 606A) of the second analog dial that does not correspond to the daytime hours is not shown with the first visual characteristic. In some embodiments, the portion (e.g., 606B) of the second analog dial corresponding to the daytime hours is of a first size and the remaining portion (e.g., 606A) of the second analog dial that do not correspond to the daytime hours are of a second size that is different from the first size. Adjusting the visual indication of daytime (e.g., daytime hours; the time between sunrise and sunset) to indicate daytime at the new time zone in the second analog dial when the time zone is changed provides information about the different daytime/nighttime hours at the new time zone in an intuitive manner. Providing improved feedback enhances the operability of the device and makes the user-device interface more efficient (e.g., by helping the user to more easily read or view displayed content) which, additionally, reduces power usage and improves battery life of the device by enabling the user to use the device more quickly and efficiently.

In some embodiments, even within the same time zone, the portion of the second analog dial corresponding to the daytime hours (e.g., 606B) and the remaining portion of the second analog dial that do not correspond to the daytime hours (e.g., 606A) can change (e.g., because different regions/locations within the same time zone can have different daytime hours). In some embodiments, at a first location (e.g., a first city; a first region) (e.g., "CHI" as shown via time zone selection element 616 in FIG. 6D) within a respective time zone, the portion of the second analog dial corresponding to the daytime hours has the first size (e.g., size of 606B in FIGS. 6A-6B) and the remaining portion of the second analog dial that do not correspond to the daytime hours has the second size (e.g., size of 606A in FIGS. 6A-6B) different from the first size. In some embodiments, at a second location (e.g., a second city; a second region) (e.g., "DAL" as shown via rotatable user interface element in FIG. 6D) within the respective time zone, the portion of the second analog dial corresponding to the daytime hours has a third size different form the first size and the remaining portion of the second analog dial that do not correspond to the daytime hours has a fourth size different from the second size.

In some embodiments, receiving the request (e.g., 610, 618, 620) to change the time zone associated with the second analog dial (e.g., 606) includes receiving a selection of (e.g., via a (e.g., rotatable) user interface element (e.g., 616) displayed in the watch user interface (e.g., 604A) that includes a plurality of selectable time zone options) a geographic location (e.g., a country; a geographic region) in the third time zone. In some embodiments, in response to receiving the selection of the geographic location in the third time zone, in accordance with a determination that the geographic location corresponds to a first location in the third time zone (e.g., a first city within the third time zone), the computer system (e.g., 600) displays, in the second analog dial (e.g., 606), a visual indication (e.g., via a different visual characteristic; via a different shade; via a different color) of daytime (e.g., 606B in FIG. 6B)) (e.g., daytime hours; the time between sunrise and sunset) at a first position within the second analog dial (which indicates daytime hours at the first location in the third time zone). In some embodiments, in response to receiving the selection of the geographic location in the third time zone, in accordance with a determination that the geographic location corresponds to a second location in the third time zone (e.g., a second city within the third time zone), the computer system displays, in the second analog dial, the visual indication (e.g., via a different visual characteristic; via a different shade; via a different color) of daytime (e.g., 606B in FIG. 6D) (e.g., daytime hours; the time between sunrise and sunset) at a second position within the second analog dial (which indicates daytime hours at the second location in the third time zone). In some embodiments, the visual indication of daytime at the first location is a different size/length and/or encompasses (e.g., covers) a different portion of the second analog dial than the visual indication of daytime at the second location (e.g., because the amount of daytime is different between the first location and the second location). Adjusting the visual indication of daytime (e.g., daytime hours; the time between sunrise and sunset) to indicate daytime at the new time zone in the second analog dial when the time zone is changed provides information about the different daytime/nighttime hours at the new time zone in an intuitive manner. Providing improved feedback enhances the operability of the device and makes the user-device interface more efficient (e.g., by helping the user to more easily read or view displayed content) which, additionally, reduces power usage and improves battery life of the device by enabling the user to use the device more quickly and efficiently.

In some embodiments, changing the time zone associated with the second analog dial (e.g., 606) to the third time zone includes changing a numerical indicator (e.g., 606D) (e.g., in the second analog dial) corresponding to the current time indicated by the second time indicator (e.g., 608D) from a first value (e.g., the hour number for a first hour) corresponding to the current time at the second time zone to a second value (e.g., the hour number for a second hour) corresponding to the current time at the third time zone. Changing the numerical indicator corresponding to the current time indicated by the second time indicator to the second value corresponding to the current time at the third time zone enables a user to quickly and easily identify the current time at the third time zone when the time zone is first changed. Providing improved feedback enhances the operability of the device and makes the user-device interface more efficient (e.g., by helping the user to more easily read or view displayed content) which, additionally, reduces power usage and improves battery life of the device by enabling the user to use the device more quickly and efficiently.

In some embodiments, in response to receiving the request (e.g., 610, 618, 620) to change the time zone associated with the second analog dial (e.g., 606), the computer system (e.g., 600) displays, in the watch user interface (e.g., 604A) (e.g., inside the second analog dial; in place of the first analog dial), a (e.g., rotatable) user interface element (e.g., 616) that includes a plurality of (e.g., list of; a rotatable list of) selectable time zone options, wherein the plurality of selectable time zone options are arranged (e.g., ordered) based on an amount of time offset (e.g., plus/minus a certain number of hours) between the first time zone and respective time zone options of the plurality of selectable time zone options. Displaying the user interface element that includes a plurality of (e.g., list of; a rotatable list of) selectable time zone options, where the plurality of selectable time zone options are arranged (e.g., ordered) based on an amount of time offset enables a user to efficiently navigate (e.g., scroll) through the selectable time zone options as the time zone options are arranged in an intuitive manner. Providing improved control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of selectable time zone options (e.g., shown via 616) includes a first time zone option corresponding to a designated geographic location (e.g., a first city; a first country; a first geographic region (e.g., a saved time zone; a favorite time zone; a time zone that is selected and/or stored in a world clock application)), and wherein the displayed first time zone option includes a text indication (e.g., an abbreviation) of the designated geographic location, and a second time zone option that does not correspond to a designated geographic location (e.g., a time zone that is not saved, favorited, or otherwise stored or selected in a world clock application or a different application), wherein the displayed second time zone option includes a numerical indication (e.g., a plus or minus number) of a respective amount of time offset (e.g., plus/minus a certain number of hours) between the second time zone and a time zone corresponding to the second time zone option.

In some embodiments, the plurality of selectable time zone options (e.g., shown via 616) include a third time zone option corresponding to a first geographic location (e.g., a first city; a first country; a first geographic region), wherein the first geographic location corresponds to a first time zone (e.g., a saved time zone; a favorited time zone; a time zone that is selected and/or stored in a world clock application), wherein the displayed first time zone option includes a text indication (e.g., an abbreviation) of the first geographic location, and a fourth time zone option corresponding to a second geographic location different from the first physical location, wherein the second geographic location corresponds to the first time zone, and wherein the fourth time zone option includes a text indication (e.g., an abbreviation) of the second geographic location.

In some embodiments, in response to receiving the request (e.g., 610, 618, 620) to change the time zone associated with the second analog dial, the computer system (e.g., 600) displays, via the display generation component (e.g., 602), the watch user interface (e.g., 604A), wherein displaying the watch user interface includes concurrently displaying a selectable user interface object (e.g., 607; a confirmation affordance; a "set" or "done" option) for confirming the change in time zone for the second analog dial (e.g., 606). In some embodiments, the computer system detects, via the one or more input devices (e.g., a touch-sensitive surface integrated with the display generation component), activation (e.g., selection) (e.g., 622) of the selectable user interface object. In some embodiments, in response to detecting the activation of the selectable user interface object, the computer system sets the second analog dial and the second time indicator (e.g., 608D) to indicate the current time in the third time zone on the second analog dial (e.g., and ceasing display of the selectable user interface object).

Note that details of the processes described above with respect to method 700 (e.g., FIGS. 7A-7C) are also applicable in an analogous manner to the methods described below. For example, method 900 optionally includes one or more of the characteristics of the various methods described above with reference to method 700. For example, a watch user interface as described with reference to FIGS. 6A-6H can include and be used to perform a counting operation as described with reference to FIGS. 8A-8M. For another example, method 1100 optionally includes one or more of the characteristics of the various methods described above with reference to method 700. For example, a device can use as a watch user interface either a user interface that includes an indication of time and a graphical representation of a character as described with reference to FIGS. 10A-10AC or a watch user interface as described with reference to FIGS. 6A-6H. For another example, method 1300 optionally includes one or more of the characteristics of the various methods described above with reference to method 700. For example, a device can use as a watch user interface either a time user interface as described with reference to FIGS. 12A-12G or a watch user interface as described with reference to FIGS. 6A-6H. For another example, method 1500 optionally includes one or more of the characteristics of the various methods described above with reference to method 700. For example, a background of a watch user interface as described with reference to FIGS. 6A-6H can be created or edited via the process for updating a background as described with reference to FIGS. 14A-14AD. For another example, method 1700 optionally includes one or more of the characteristics of the various methods described above with reference to method 700. For example, the process for changing one or more complications of a watch user interface as described with reference to FIGS. 16A-16AE can be used to change one or more complications of a watch user interface as described with reference to FIGS. 6A-6H. For brevity, these details are not repeated below.

FIGS. 8A-8M illustrate exemplary user interfaces for initiating a measurement of time, in accordance with some embodiments. The user interfaces in these figures are used to illustrate the processes described below, including the processes in FIGS. 9A-9B.

Figure 8A:
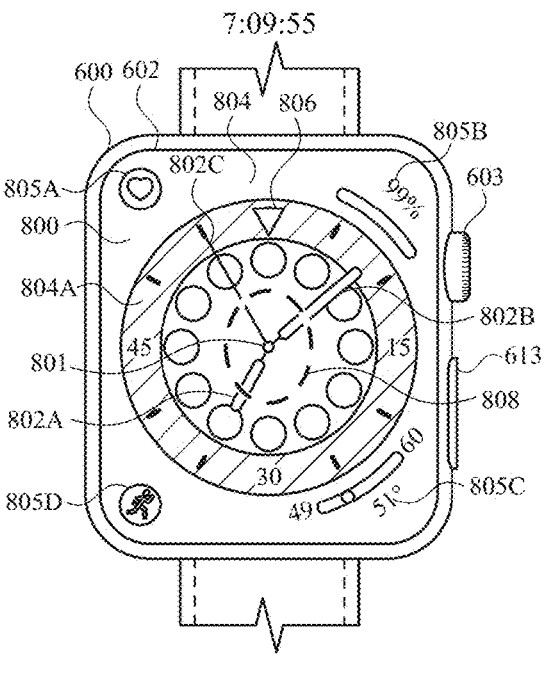
Figure 9B:
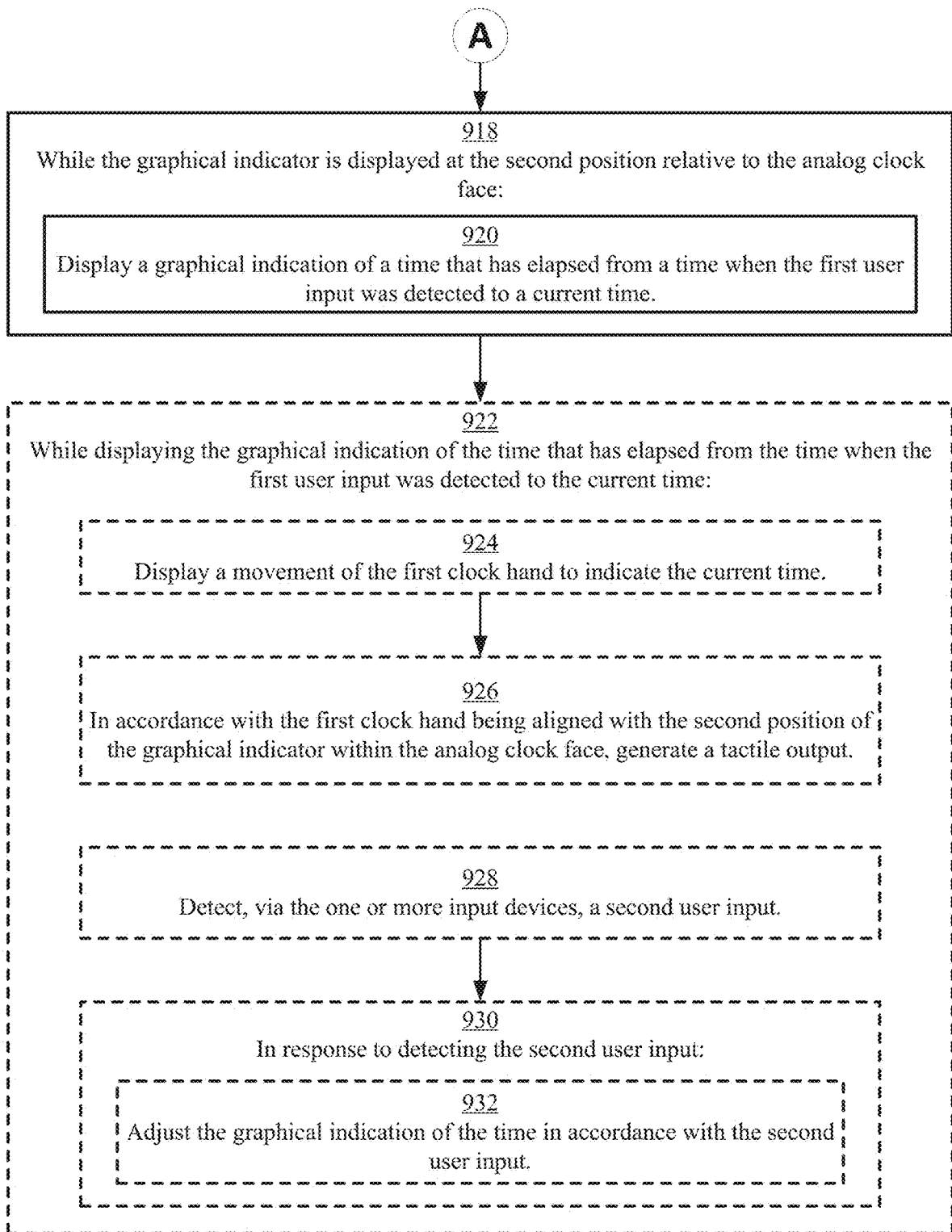

FIG. 8A illustrates device 600 displaying watch user interface 800, which includes analog clock face 804, hour hand 802A, minute hand 802B, and seconds hand 802C. Analog clock face 804 includes bezel 804A (e.g., a ring representing a 12-hour period of time with respect to hour hand 802A and a 60-minute period of time with respect to minute hand 802B) and graphical indicator 806. In some embodiments, bezel 804A includes graphical indicator 806 (e.g., graphical indicator 806 is fixed to a position of bezel 804A). In some embodiments, graphical indicator 806 is independent from at least some portion of bezel 804A (e.g., graphical indicator 806 can be displayed independently from at least some portion of bezel 804A or change position relative to at least some portion of bezel 804A).

In FIG. 8A, minute hand 802B has a length such that it at least partially overlaps (e.g., extends into) bezel 804A. Bezel 804A has visual indicators (e.g., tick marks, numerals) around bezel 804A (e.g., at 12 evenly-spaced positions), including graphical indicator 806. In FIG. 8A, bezel 804A and graphical indicator 806 are displayed at respective orientations relative to analog clock face 804. The 12 o'clock (or zero minutes) position of bezel 804A is aligned with the 12 o'clock position of analog clock face 804 (e.g., the position vertically upward from origin 801), and graphical indicator 806 is positioned at the 12 o'clock (or zero minutes) position with respect to bezel 804A and the 12 o'clock position with respect to analog clock face 804.

In FIG. 8A, device 600 receives (e.g., detects) input 808. In the embodiment illustrated in FIG. 8A, input 808 includes a gesture (e.g., a tap on display 602). In some embodiments, input 808 includes a rotation of rotatable input mechanism 603 or a press of a button (e.g., a press of rotatable and depressible input mechanism 603 or hardware button 613). In some embodiments, input 808 can be anywhere on display 602. In some embodiments, input 808 must correspond to selection of analog clock face 804 (e.g., a location on display 602 inside the outer boundary of bezel 804A). For example, in response to an input on analog clock face 804, device 600 performs a first function (e.g., rotates bezel 804A and starts counter 810 as described below); and in response to an input that is not on analog clock face 804, device 600 performs a different function (e.g., if the input is on one of complications 805A-805D, device 600 launches an application corresponding to the selected complication) or no function at all.

Figure 8B:
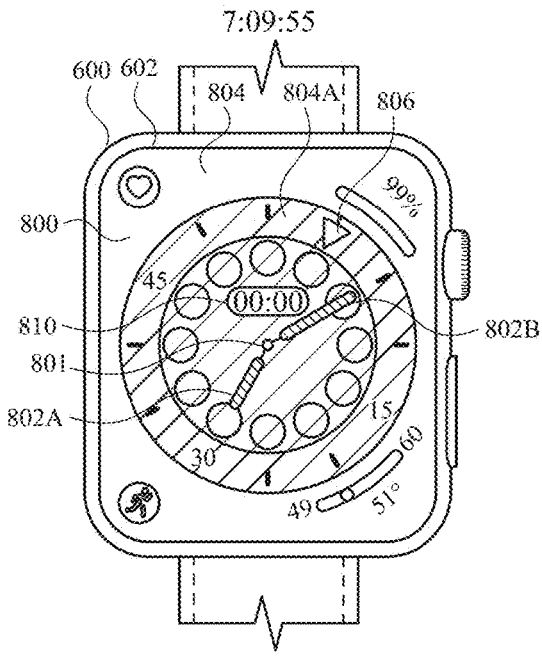
Figure 8C:
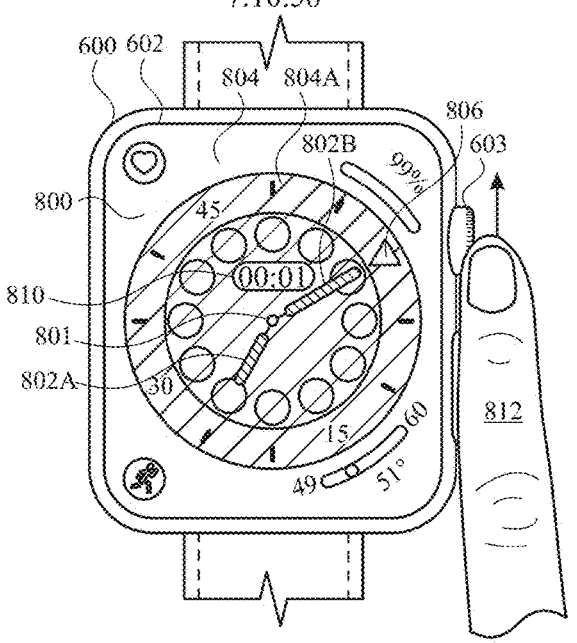

In response to input 808, device 600 displays watch user interface 800 as shown in FIGS. 8B-8C. In FIG. 8B, device 600 displays counter 810 and, compared to FIG. 8A, the length of minute hand 802B is shortened (e.g., such that minute hand 802B does not overlap bezel 804A), bezel 804A and graphical indicator 806 are rotated clockwise, and a visual characteristic (e.g., fill color, fill pattern, outline color, brightness, transparency) of hour hand 802A and minute hand 802B is changed. Counter 810 is an example of a graphical indication of time (e.g., the time that has elapsed since device 600 received input 808).

In FIG. 8C, bezel 804A and graphical indicator 806 are displayed at positions (e.g., orientations) relative to analog clock face 804 such that graphical indicator 806 is aligned with minute hand 802B (e.g., graphical indicator 806 snaps into alignment with minute hand 802B in response to receiving input 808), and counter 810 is updated to show that one second has elapsed (e.g., since device 600 received input 808, since graphical indicator 806 became aligned with minute hand 802B). In FIG. 8C, the length of minute hand 802B is displayed (e.g., remains) such that minute hand 802B does not overlap bezel 804A.

In some embodiments, device 600 automatically aligns graphical indicator 806 with minute hand 802B in response to receiving input 808 (e.g., a user does not have to provide input to adjust the position of graphical indicator 806 to align it with minute hand 802B; inputs of different magnitude (e.g., amount of rotation of rotatable input mechanism 603; a duration or spatial length of input 808 (e.g., angular extent of a twist gesture)) result in alignment of graphical indicator 806 with minute hand 802B). For example, in response to receiving a single tap on analog clock face 804, device 600 aligns graphical indicator 806 with minute hand 802B (e.g., by rotating bezel 804A) without further user input. In some embodiments, device 600 generates a tactile output when graphical indicator reaches minute hand 802B (e.g., in conjunction with minute hand 802B reaching).

In some embodiments, the transition from FIG. 8A to FIG. 8C is animated (e.g., device 600 displays an animation of bezel 804A rotating until graphical indicator 806 is aligned with minute hand 802B). In some embodiments, device 600 displays bezel 804 in the orientation shown in FIG. 8C, with graphical indicator 806 aligned with minute hand 802B in response to receiving input 808 without an animation or without display of the intermediate state illustrated by FIG. 8B. As time passes (e.g., without further input), bezel 804A and graphical indicator 806 remain stationary relative to analog clock face 804 while the hands of clock face 804 progress to indicate the current time and counter 810 continues to update according to the elapsed time.

In the embodiment illustrated in FIGS. 8A-8C, device 600 begins counter 810 in response to receiving input 808. In some embodiments, in response to receiving input 816, device 600 device does not start counter 810 (e.g., device 600 aligns graphical indicator 806 with minute hand 802B and displays counter 810, but does not start counter 810 (e.g., counter 810 maintains a time of zero) until further input is received).

In FIG. 8C, device 600 receives (e.g., detects) input 812. As shown in FIG. 8C, input 812 includes a rotation of rotatable input mechanism 603 in a first direction (e.g., clockwise). In some embodiments, input 812 includes a gesture (e.g., a touch gesture on display 602).

Figure 8D:
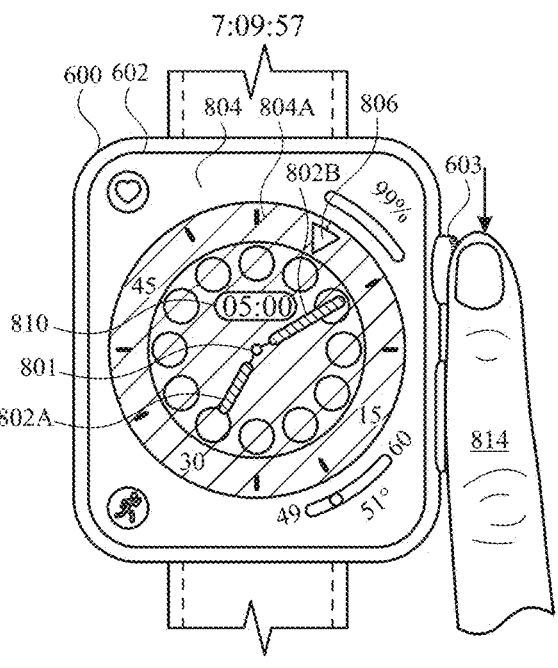

In response to receiving input 812, device 600 rotates bezel 804A relative to clock face 804 and changes the time displayed by counter 810 in accordance with input 812, as shown in FIG. 8D. In some embodiments, the direction in which bezel 804A is rotated is based on the direction of input 812. In some embodiments, the amount of rotation of bezel 804 is based on (e.g., proportional to, directly proportional to) an amount, speed, and/or direction of rotation of input 812. The time displayed by counter 810 is changed based on the change in position of bezel 804 to correspond to the position of bezel 804A relative to minute hand 802B. In FIG. 8D, bezel 804A is rotated counter-clockwise by an amount equivalent to five minutes (where one full rotation of bezel 804A is equivalent to 60 minutes) and the display of counter 810 is changed to show 5:00.

In some embodiments, bezel 804A is rotated, and counter 810 is updated accordingly, as input is received (e.g., bezel 804A and counter 810 are updated continually as rotatable input mechanism 603 is rotated). For example, in FIG. 8D, device 600 receives (e.g., detects) input 814 corresponding to a rotation of rotatable input mechanism 603 in a direction opposite of the direction of input 812. In response to receiving input 814, device 600 moves bezel 804A such that graphical indicator 806 is in alignment with minute hand 802B and updates counter 810 accordingly.

Figure 8E:
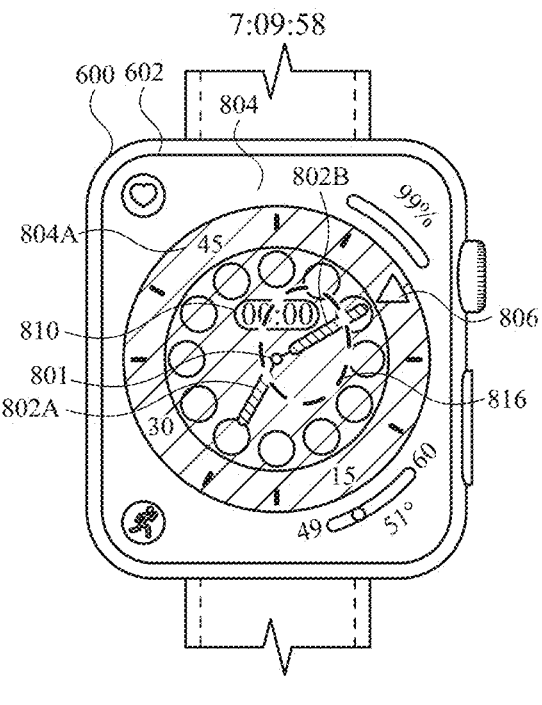
Figure 8F:
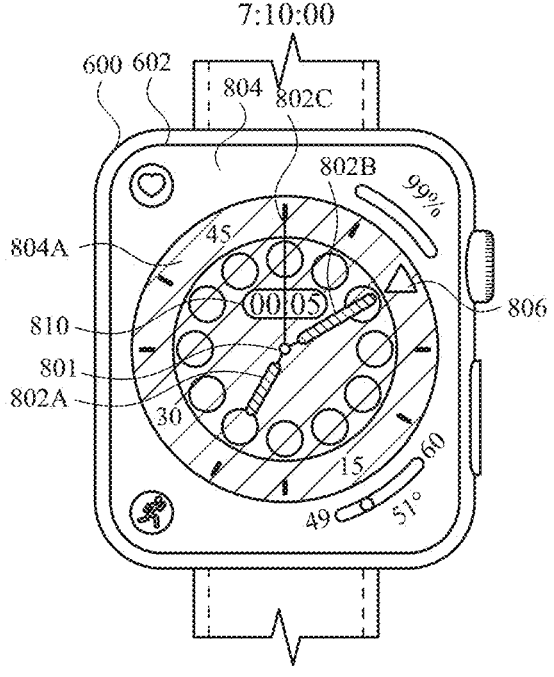

Alternatively, in response to input 808, device 600 displays watch user interface 800 as shown in FIG. 8E. In FIG. 8E, device 600 displays counter 810 and, similar to as in FIGS. 8B-8D, the length of minute hand 802B is shortened, bezel 804A and graphical indicator 806 are rotated clockwise such that, relative to analog clock face 804, graphical indicator 806 is aligned with minute hand 802B (e.g., graphical indicator 806 snaps into alignment with minute hand 802B in response to receiving input 808), and a visual characteristic (e.g., fill color, fill pattern, outline color, brightness, transparency) of hour hand 802A and minute hand 802B is changed. Alternatively to FIGS. 8B-8D, counter 810 does not start in response to receiving input 808.

In FIG. 8E, while displaying watch user interface 800 including counter 810 that not started ((e.g., counter 810 maintains a time of zero) and graphical indicator 806 is aligned with minute hand 802B, device 600 receives (e.g., detects) an input 816. As shown in FIG. 8C, input 816 includes a gesture (e.g., a touch gesture on display 602). In some embodiments, input 816 includes a press input directed to rotatable input mechanism 603.

In FIG. 8E, in response to receiving input 816, device 600 starts counter 810. In some embodiments, after aligning graphical indicator 806 with minute hand 802B (e.g., by rotating bezel 804A) and displaying counter 810 in response to receiving input 808, if device 600 does not receive further input (e.g., a confirmation input, a tap, a button press) within a threshold amount of time (e.g., a non-zero amount of time, 1 second, 2 seconds, 3 seconds, 5 seconds), device 600 displays (e.g., reverts to) watch user interface 800 as displayed in FIG. 8A (e.g., bezel 804A and graphical indicator 806 are displayed in the orientation relative to clock face 804 shown in FIG. 8A and counter 810 is not displayed (e.g., device 600 ceases display of counter 810)).

Figure 8G:
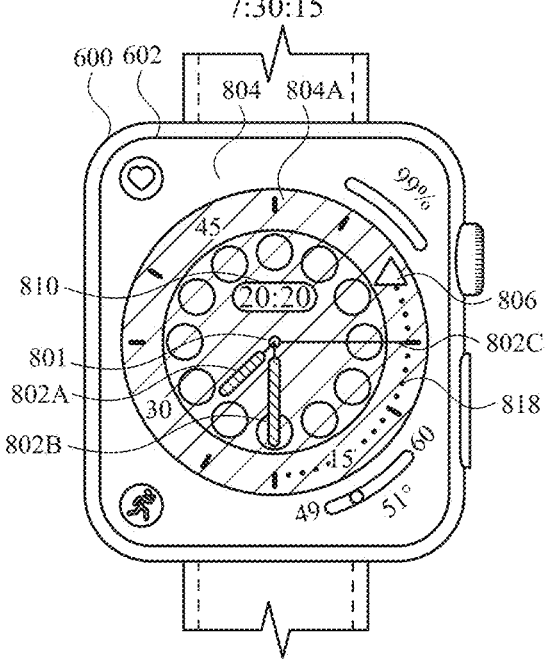

Turning to FIG. 8G, watch user interface 800 is displayed at a later time, where 20 minutes and 20 seconds have elapsed, as indicated by counter 810. FIG. 8G illustrates that as minute hand 802B moves according to the passage of time, device 600 maintains the orientation of bezel 804A and displays tick marks at the minute positions on bezel 804A (e.g., between the existing 5-minute interval marks) clockwise from graphical indicator 806 to minute hand 802B.

Figure 8H:
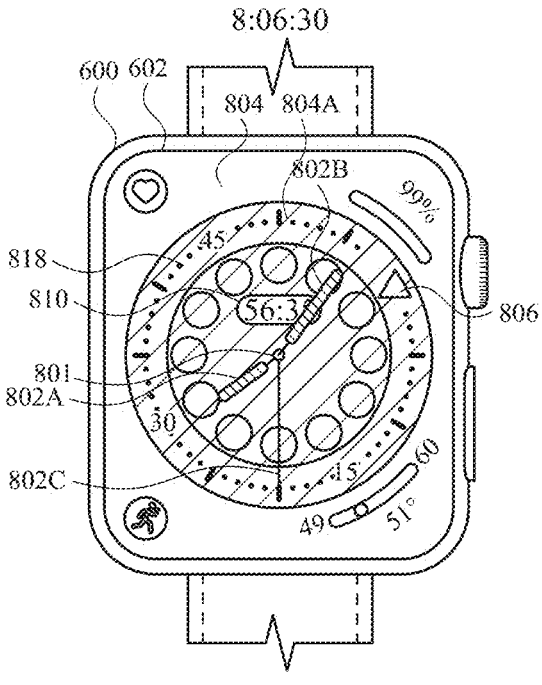

FIG. 8H shows watch user interface 800 at a later time, where 56 minutes and 35 seconds have elapsed, as indicated by counter 810. At this time, minute hand 802B has not made a full rotation around clock face 804 relative to the position of graphical indicator 806. In FIG. 8I, one hour, six minutes, and 35 seconds have elapsed (as indicated by counter 810). Minute hand 802B has made more than a full rotation around clock face 804 and passed graphical indicator 806. Once minute hand 802B makes a full rotation and passes graphical indicator 806, device 600 removes tick marks from the minute positions on bezel 804A from graphical indicator 806 to minute hand 802B. Removing the tick marks after minute hand 802B has passed graphical indicator 806 indicates to the user that minute hand 802B has made a full rotation.

In FIG. 8I, device 600 receives (e.g., detects) input 820. In the embodiment shown in FIG. 8I, input 820 includes a rotation of rotatable input mechanism 603. In some embodiments, input 820 includes a gesture (e.g., a touch gesture on display 602). In response to receiving input 820, device 600 rotates bezel 804A clockwise, until graphical indicator 806 is almost aligned with minute hand 802B, and updates counter 810 accordingly, as shown in FIG. 8J. In response to receiving input 820, device 600 maintains display of the tick marks at the minute positions on bezel 804A between the 5-minute interval marks. The time on counter 810 is adjusted by an amount of time that is based on the magnitude, speed, and/or direction of input 820 (e.g., the amount of rotation of rotatable input mechanism 603) and the corresponding amount of rotation of bezel 804A (e.g., device 600 does not reset counter 810 to zero in response to input 820). In some embodiments, if input 820 causes an amount of clockwise rotation of bezel 804A such that graphical indicator 806 passes minute hand 802B (e.g., the elapsed time or offset between graphical indicator 806 and minute hand 802B is reduced to less than 59 minutes), device 600 removes tick marks from the minute positions on bezel 804A in the counter-clockwise direction from graphical indicator 806 to minute hand 802B.

In FIG. 8J, device 600 receives (e.g., detects) input 824. In the embodiment illustrated in FIG. 8J, input 824 includes a tap gesture on a location of display 602 corresponding to counter 810. In some embodiments, input 824 includes a rotation of rotatable input mechanism 603 or a press of a button (e.g., a press of rotatable and depressible input mechanism 603 or hardware button 613). In some embodiments, input 824 can be anywhere on display 602. In some embodiments, input 808 must correspond to selection of analog clock face 804 (e.g., a location on display 602 inside the outer boundary of bezel 804A). For example, in response to an input on analog clock face 804, device 600 performs a first function (e.g., displays watch user interface 826 in FIG. 8K as described below); and in response to an input that is not on analog clock face 804, device 600 performs a different function (e.g., if the input is on one of complications 805A-805D, device 600 launches an application corresponding to the selected complication) or no function at all.

In response to receiving input 824, device 600 displays watch user interface 826 shown in FIG. 8K. Watch user interface 826 includes graphical indication of time 810A (e.g., an enlarged version of counter 810), continue affordance 826A, and stop affordance 826B. In some embodiments, graphical indication of time 810A shows a static indication of the elapsed time on counter 810 when input 824 was received. In some embodiments, graphical indication of time 810A updates to show the currently elapsed time (e.g., graphical indication of time 810A continues to progress from the time on counter 810 when input 824 was received). In some embodiments, device 600 pauses counter 810 in response to receiving input 824. In some embodiments, device 600 continues counter 810 in response to receiving input 824. In some embodiments, in response to receiving input 824, device 600 ceases display of clock face 804 and/or complications 805A-805D. In some embodiments, device 600 displays graphical indication of time 810A, continue affordance 826A, and stop affordance 826B overlaid on watch user interface 824. In some embodiments, in response to receiving input 824, device 600 at least partially obscures (e.g., blurs or greys out) watch user interface 824.

In some embodiments, in response to receiving input 824, device 600 resets the user interface (e.g., displays watch user interface 800 as shown in FIG. 8A indicating the current time, or resets counter 810 to zero and aligns graphical indicator 806 with the current position of minute hand 802B). In some embodiments, if input 824 is a first type of input (e.g., a single tap on counter 810, then device 600 displays watch user interface 826 as shown in FIG. 8K; and if input 824 is a second type of input (e.g., a double tap on counter 810), then device 600 resets the user interface.

FIG. 8K shows input 828 corresponding to selection of continue affordance 826A (e.g., a tap at a location on display 602 corresponding to continue affordance 826A) and input 830 corresponding to selection of stop affordance 826B (e.g., a tap at a location on display 602 corresponding to stop affordance 826B).

As shown in FIG. 8L, in response to receiving input 828, device 600 returns to the watch user interface that was displayed at the time of receiving input 824 and continues to update counter 810 (e.g., device 600 ceases to display continue affordance 826A, stop affordance 826B, and graphical indication of time 810A (e.g., reduces the enlarged version of counter 810 to its previous size)).

Figure 8M:
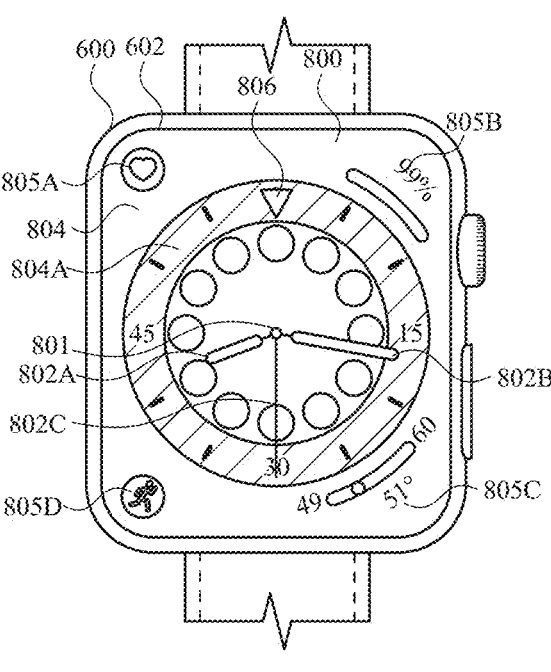

As shown in FIG. 8M, in response to receiving input 830, device 600 returns to watch user interface 800 (e.g., device 600 ceases to display continue affordance 826A, stop affordance 826B, and graphical indication of time 810A), in which bezel 804A and graphical indicator 806 are aligned with the 12 o'clock position of clock face 804, counter 810 is not displayed, no tick marks are displayed between the 5-minute intervals of bezel 804, and hour hand 802A and minute hand 802B are displayed with the visual characteristics shown in FIG. 8A (e.g., instead of the visual characteristics shown in FIGS. 8B-8J).

FIGS. 9A-9B are a flow diagram illustrating methods of initiating a measurement of time, in accordance with some embodiments. Method 900 is performed at a computer system (e.g., 100, 300, 500, 600) (e.g., a smart device, such as a smartphone or a smartwatch; a mobile device) that is in communication with a display generation component and one or more input devices (e.g., including a touch-sensitive surface that is integrated with the display generation component; a mechanical input device; a rotatable input device; a rotatable and depressible input device; a microphone). Some operations in method 900 are, optionally, combined, the orders of some operations are, optionally, changed, and some operations are, optionally, omitted.

As described below, method 900 provides an intuitive way for managing user interfaces related to time. The method reduces the cognitive burden on a user for managing user interfaces related to time, thereby creating a more efficient human-machine interface. For battery-operated computing devices, enabling a user to manage user interfaces related to time faster and more efficiently conserves power and increases the time between battery charges.

The computer system (e.g., 600) displays (902), via the display generation component (e.g., 602), a watch user interface (e.g., 800) (e.g., showing a clock with a hour hand and a minute hand), the watch user interface including an analog clock face (e.g., 804) that includes a first clock hand (e.g., 802B) (e.g., the minute hand of the clock) and a graphical indicator (e.g., 806) (e.g., a marker (e.g., a triangular marker)), wherein the graphical indicator is displayed at a first position relative to the analog clock face (e.g., along/within a dial region surrounding the clock). In some embodiments, the graphical indicator is initially not aligned with the first clock hand along the boundary. In some embodiments, the graphical indicator is initially displayed at the top-center position along the boundary.

While displaying, via the display generation component (e.g., 602), the watch user interface (e.g., 800) (904), the computer system (e.g., 600) detects (906), via the one or more input devices (e.g., via a first input device (e.g., 602 or 603) (e.g., a touch-sensitive surface; a touch-sensitive display; a rotatable input device; a rotatable and depressible input device; a mechanical input device)), a first user input (e.g., 808). In some embodiments, the first user input is an input of a first type (e.g., a rotational input on the first input device; a scrolling input on the first input device or a tap input on a touch-sensitive surface such as a touchscreen display).

In response to detecting the first user input (e.g., 808) (910), the computer system (e.g., 600) moves (912) the graphical indicator (e.g., 806) to a second position relative to the analog clock face (e.g., 804) such that the graphical indicator is aligned with the first clock hand (e.g., 802B) (e.g., such that the graphical indicator is pointing to or marking the position of the first clock hand; such that the graphical indicator is at the outer end of the first clock hand). Moving the graphical indicator to the second position relative to the analog clock face such that the graphical indicator is aligned with the first clock hand in response to detecting the first user input provides visual feedback of the initiation of a feature (e.g., initiation of a time counter) and a starting point of the initiated feature (e.g., the starting time for the counter) in an intuitive manner. Providing improved feedback enhances the operability of the device and makes the user-device interface more efficient (e.g., by helping the user to more easily read or view displayed content) which, additionally, reduces power usage and improves battery life of the device by enabling the user to use the device more quickly and efficiently.

While the graphical indicator (e.g., 806) is displayed at the second position relative to the analog clock face (e.g., 804) (918), the computer system (e.g., 600) displays (920) a graphical indication of a time (e.g., 810) (e.g., a time counter; a digital counter) that has elapsed from a time when the first user input (e.g., 808) (e.g., the input moving the graphical indicator to a second position relative to the analog clock face such that the graphical indicator is aligned with the first clock hand) was detected to a current time. In some embodiments, the graphical indication of the time that has elapsed is displayed within the analog clock face in the watch user interface (e.g., 800). Displaying the graphical indication of a time that has elapsed from the time when the first user input while the graphical indicator is displayed at the second position relative to the analog clock face enables a user to quickly and easily recognize that the time has been initiated and the time that has elapsed. Providing improved feedback enhances the operability of the device and makes the user-device interface more efficient (e.g., by helping the user to more easily read or view displayed content) which, additionally, reduces power usage and improves battery life of the device by enabling the user to use the device more quickly and efficiently. Initiating a time counter (e.g., displayed via the graphical indication of a time) in response to the first user input enables a user to initiate the time counter in a quick and efficient manner. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Alternatively, in some embodiments, in response to detecting the first user input (e.g., 808), the computer system (e.g., 600) displays or causes display of the graphical indicator (e.g., 806) to a second position (e.g., position of 806 in FIG. 8C from position of 806 in FIG. 8A) relative to the analog clock face (e.g., 804) and displays the graphical indication of the time (e.g., 810), where the graphical indication of the time is shown at an initial state (e.g., "00:00") without yet indicating an elapsed time. In some embodiments, while the graphical indication of the time is shown at the initial state, the computer system detects, via the one or more input devices (e.g., via a second input device, such as a touch-sensitive surface that is integrated with the display generation component (e.g., 602)), a second user input (e.g., corresponding to an activation/selection of the graphical indication of the time). In some embodiments, the second user input is an input of a second type (e.g., a touch input on a touch-sensitive surface that is integrated with the display generation component) that is different from the first type. In some embodiments, in response to detecting the second user input, the computer system displays or causes display of, in the graphical indication of the time, the time that has elapsed from the time when the first user input was detected to the current time.

In some embodiments, in response to detecting the first user input (e.g., 808) (910), the computer system (e.g., 600) shifts (e.g., rotates) (914) an analog dial (e.g., 804A) (e.g., including indications of time positions (e.g., 00:00/12:00 position, 3:00/15:00 position, 6:00/18:00 position, 9:00/21:00 position; 0 minute position, 15 minute position, 30 minute position, 45 minute position)) of the analog clock face (e.g., 804) in accordance with the movement of the graphical indicator (e.g., 806) (e.g., a marker (e.g., a triangular marker)) such that a scale of the analog dial is aligned to begin at (e.g., the 00:00/12:00 position/0 minute position of the analog dial is aligned to) the second position relative to the analog clock face. Shifting (e.g., rotating) the analog dial in accordance with the movement of the graphical indicator such that a scale of the analog dial is aligned to begin at the second position relative to the analog clock face provides visual feedback of the starting position of the time counter in an intuitive manner. Providing improved feedback enhances the operability of the device and makes the user-device interface more efficient (e.g., by helping the user to more easily read or view displayed content) which, additionally, reduces power usage and improves battery life of the device by enabling the user to use the device more quickly and efficiently.

In some embodiments, the first user input (e.g., 808) includes a rotational input detected via the one or more input devices (e.g., a first input device (e.g., 603) (e.g., a rotatable input device; a rotatable and depressible input device)) (908). In some embodiments, moving the graphical indicator (e.g., 806) in response to detecting the first user input includes snapping the graphical indicator to the second position relative to the analog clock face (e.g., 804) such that the graphical indicator is aligned with the first clock hand (e.g., 802B).

In some embodiments, in response to the first input (e.g., 808) (910), in conjunction with moving the graphical indicator (e.g., 806) (e.g., a marker (e.g., a triangular marker)) to the second position relative to the analog clock face (e.g., 804) (e.g., in response to detecting the first user input; when the graphical indicator is moved from the first position to the second position), the computer system (e.g., 600) generates (916) (e.g., via one or more tactile output generators that is in communication with the computer system) a tactile output (e.g., a tactile output sequence that corresponds to moving the graphical indicator to the second position). Generating the tactile output in conjunction with moving the graphical indicator (e.g., a marker (e.g., a triangular marker)) to the second position relative to the analog clock face provides feedback that the time counter has been initiated. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the graphical indication of the time (e.g., 810) (e.g., a time counter a digital counter) that has elapsed from the time when the first user input (e.g., 808) was detected to the current time (922), the computer system (e.g., 600) displays (924) a movement of the first clock hand (e.g., 802B) (e.g., rotating within the analog clock face) to indicate the current time (e.g., the "minute" of the current time). In some embodiments, in accordance with the first clock hand being aligned with (e.g., to point to; to be in line with) the second position of the graphical indicator (e.g., 806) (e.g., a marker (e.g., a triangular marker)) within the analog clock face, the computer system generates (926) (e.g., via one or more tactile output generators that is in communication with the computer system) a tactile output (e.g., a tactile output sequence that corresponds to the first clock hand being aligned with the second position of the graphical indicator). In some embodiments, the computer system does not move the graphical indicator (e.g., the graphical indicator remains at (e.g., stays fixed to) the second position relative to the analog clock face) while the computer system moves the first clock hand relative to the analog clock face to indicate the current time.

In some embodiments, while displaying the graphical indication of the time (e.g., 810) (e.g., a time counter a digital counter) that has elapsed from the time when the first user input (e.g., 808) was detected to the current time (922), the computer system (e.g., 600) detects (928), via the one or more input devices (e.g., the first input device (e.g., 603) (e.g., a rotatable input device; a rotatable and depressible input device)), a second user input (e.g., 812 or 814) (e.g., a rotational input on the first input device; a continuation of the first user input (e.g., additional or continued rotation of the rotatable input mechanism)). In some embodiments, in response to detecting the second user input (930), the computer system adjusts (e.g., increasing or decreasing) (932) the graphical indication of the time in accordance with (e.g., based on an amount of, speed of, and/or direction of) the second user input. In some embodiments, in accordance with the second user input being in a first (e.g., clockwise) direction on the first input device, adjusting the graphical indication of the time includes increasing the displayed time based on the amount and/or speed of the input. In some embodiments, in accordance with the second user input being in a second (e.g., counter-clockwise) direction on the first input device, adjusting the graphical indication of the time includes decreasing the displayed time based on the amount and/or speed of the counter-clockwise input. Adjusting (e.g., increasing or decreasing) the graphical indication of the time in accordance with (e.g., based on an amount of, speed of, and/or direction of) the second user input while the time counter is running enables a user to adjust the running time counter in an convenient and efficient manner. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to (e.g., immediately after) detecting the first user input (e.g., 808), the computer system (e.g., 600) detects a third user input (e.g., 812 or 814) (e.g., that is a continuation of the first user input (e.g., in the same rotational direction); that is an input in a different (e.g., rotational) direction from the first user input). In some embodiments, in response to detecting the third user input, the computer system moves (e.g., slides; rotates) the graphical indicator (e.g., a marker (e.g., a triangular marker)) from the second position relative to the analog clock face (e.g., 804) to a third position relative to the analog clock face different from the second position. In some embodiments, the computer system adjusts the time displayed in the graphical indication of the time (e.g., 810) to include an offset from the elapsed time from when the first user input was detected to the current time, wherein the offset corresponds to a difference (e.g., in minutes) between the second position and the third position relative to the analog clock face. Adjusting the time displayed in the graphical indication of the time to include the offset from the elapsed time from when the first user input was detected to the current time enables a user to quickly and easily adjust the time displayed in the graphical indication of the time if an adjustment is needed without needing to re-initiate the time displayed in the graphical indication of the time. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, when the graphical indicator (e.g., 806) is moved from the second position to the third position, where the difference between the third position relative to the second position is an addition of (e.g., going forwards in time) a first amount of time (e.g., a first amount of minutes) relative to the analog clock face (e.g., 804), the offset corresponds to the addition of the first amount of time, and the time displayed in the graphical indication of the time includes the elapsed time from when the first user input (e.g., 808) was detected to the current time adjusted by the addition of the first amount of time. In some embodiments, when the graphical indicator (e.g., 806) is moved from the second position to the third position, where the difference between the third position relative to the second position is a subtraction of (e.g., going backwards in time) a second amount of time (e.g., a second amount of minutes) relative to the analog clock face, the offset corresponds to the subtraction of the second amount of time, and the time displayed in the graphical indication of the time includes the elapsed time from when the first user input was detected to the current time adjusted by the subtraction of the second amount of time (e.g., which can be a negative time).

In some embodiments, in response to detecting the third input, in accordance a determination that the third user input corresponds to an input (e.g., detected via a rotatable input device; detected via a rotatable and depressible input device) in a first direction (e.g., a clockwise direction), the computer system (e.g., 600) moving the graphical indicator (e.g., a marker (e.g., a triangular marker)) from the second position to the third position includes moving (e.g., sliding; rotating) the graphical indicator (e.g., 806) along (e.g., a dial region of) the analog clock face (e.g., 804) in a clockwise direction (towards the third position (e.g., where, based on a clockwise direction, the third position is ahead of the second position within the analog clock face) as the third user input (e.g., 814) is detected. In some embodiments, in response to detecting the third input, in accordance a determination that the third user input corresponds to an input (e.g., detected via a rotatable input device; detected via a rotatable and depressible input device) in a second direction (e.g., a counter-clockwise direction), the computer system moving the graphical indicator from the second position to the third position includes moving (e.g., sliding; rotating) the graphical indicator along (e.g., a dial region of) the analog clock face in a counter-clockwise direction towards the third position (e.g., where, based on a clockwise direction, the third position is behind the second position within the analog clock face) as the third user input is detected.

In some embodiments, the input (e.g., 812) in the first direction corresponds to a rotational input (e.g., detected via a rotatable input device; detected via a rotatable and depressible input device) in a first rotational direction (e.g., clockwise direction). In some embodiments, the input (e.g., 814) in the second direction corresponds to a rotational input (e.g., detected via a rotatable input device; detected via a rotatable and depressible input device) in a second rotational direction opposite the first rotational direction (e.g., counter-clockwise direction).

In some embodiments, while displaying the graphical indication of the time (e.g., 810) (e.g., a time counter a digital counter) that has elapsed from the time when the first user input (e.g., 808) was detected to the current time, the computer system (e.g., 600) detects, via the one or more input devices (e.g., a touch-sensitive surface), selection (e.g., 824) of (e.g., touch input on) the graphical indication of the time. In some embodiments, in response to detecting the selection of the graphical indication of the time, the computer system displays, via the display generation component (e.g., 602), a prompt (e.g., 826; an alert; a notification) that includes a first option (e.g., 826A; a first selectable user interface object; a first affordance) that, when selected, causes the computer system to continue counting, via the graphical indication of the time, the time that has elapsed from a time when the first user input was detected to a current time, and a second option (e.g., 826B; a second selectable user interface object; a second affordance) that, when selected, causes the computer system to cease (e.g., stop) counting, via the graphical indication of the time, the time that has elapsed from a time when the first user input was detected to a current time. In some embodiments, ceasing counting the time includes ceasing displaying the graphical indication of the time. In some embodiments, ceasing counting the time includes maintaining display of the graphical indication of the time and resetting (e.g., to "00:00") the time counted via the graphical indication of the time. Displaying the prompt that includes the first portion and the second option in response to detecting the selection of the graphical indication of the time enables a user to cause the computer system to continue or cease the counting in an easy and intuitive manner. Providing improved feedback enhances the operability of the device and makes the user-device interface more efficient (e.g., by helping the user to more easily read or view displayed content) which, additionally, reduces power usage and improves battery life of the device by enabling the user to use the device more quickly and efficiently.

In some embodiments, in response to detecting the first user input (e.g., 808), the computer system (e.g., 600) changes (e.g., modifies) a visual characteristic of (e.g., dims; changes color of (e.g., to be the same color as the graphical indicator and/or as the graphical indication of the time)) the first clock hand (e.g., 802B) to include a first visual characteristic (e.g., a dimmed color or visual state; the color of the graphical indicator and/or the graphical indication of the time). In some embodiments, the analog clock face (e.g., 804) includes a second clock hand (e.g., 802A) (e.g., the hour hand of the clock). In some embodiments, in response to detecting the first user input, the computer system changes (e.g., modifies) the visual characteristic of the second clock hand to include the first visual characteristic. Changing the visual characteristic of the first clock hand to include the first visual characteristic in response to detecting the first user input provides visual feedback that an operation (e.g., the counting) has been enabled, thereby enhancing the operability of the device and making the user-device interface more efficient (e.g., by helping the user to more easily recognize that the operation has been initiated) which, additionally, reduces power usage and improves battery life of the device by enabling the user to use the device more quickly and efficiently.

In some embodiments, after detecting the first user input (e.g., 808), the computer system (e.g., 600) detects (e.g., via a touch-sensitive surface of the one or more input devices) an input (e.g., a rotational input on the rotatable input device; a touch input such as a swipe or pinch input) directed to a rotatable input device (e.g., 603) of the one or more input devices. In some embodiments, in response to detecting the input directed to the rotatable input device, the computer system changes (e.g., modifies) the visual characteristic of (e.g., dims; changes the color of (e.g., to be the same color as the graphical indicator and/or as the graphical indication of the time)) the first clock hand (e.g., 802B) to include the first visual characteristic (e.g., a dimmed color or visual state; the color of the graphical indicator and/or the graphical indication of the time).

In some embodiments, in response to detecting the first user input (e.g., 808), the computer system (e.g., 600) changes (e.g., modifies) a shape of (e.g., changes a feature of; changes the size of; makes smaller; shrinks) the first clock hand (e.g., 802B) to be a first shape (e.g., a smaller, shrunk clock hand). In some embodiments, the analog clock face (e.g., 804) includes a second clock hand (e.g., 802A) (e.g., the hour hand of the clock). In some embodiments, in response to detecting the first user input, the computer system changes (e.g., modifies) a shape of (e.g., changes a feature of; changes the size of; makes smaller; shrinks) the second clock hand to be a second shape (e.g., a smaller, shrunk clock hand). Changing the shape of the first clock hand to be the first shape in response to detecting the first user input provides visual feedback that an operation (e.g., the counting) has been enabled, thereby enhancing the operability of the device and making the user-device interface more efficient (e.g., by helping the user to more easily recognize that the operation has been initiated) which, additionally, reduces power usage and improves battery life of the device by enabling the user to use the device more quickly and efficiently.

In some embodiments, while the graphical indicator (e.g., 806) (e.g., a marker (e.g., a triangular marker)) is displayed at the second position relative to the analog clock face, the computer system (e.g., 600) displays (e.g., continues to display), in the analog clock face (e.g., 804), a movement of the first clock hand (e.g., 802B) to indicate the current time (e.g., the "minute" of the current time). In some embodiments, while displaying the movement of the first clock hand, the computer system displays, in the analog clock face (e.g., 804) (e.g., in a dial region of the analog clock face), visual indicators (e.g., visual markers (e.g., tick marks), as shown in FIGS. 8G-8H) along a path of movement of (e.g., the tip of) the first clock hand as the first clock hand is moving (e.g., rotating) around the analog clock face (e.g., the visual indicators appear along the path of movement of the first clock hand as the first clock hand is moving circularly within the analog clock face). Displaying the visual indicators along the path of movement of (e.g., the tip of) the first clock hand as the first clock hand is moving (e.g., rotating) around the analog clock face provides visual feedback that the counting is on-going, thereby enhancing the operability of the device and making the user-device interface more efficient (e.g., by helping the user to more easily recognize that the operation has been initiated) which, additionally, reduces power usage and improves battery life of the device by enabling the user to use the device more quickly and efficiently.

In some embodiments, while concurrently displaying the movement of the first clock hand (e.g., 802B) and the visual indicators, in accordance with a determination that the visual indicators are already displayed along a full path of movement of (e.g., the tip of) the first clock hand (e.g., fully around the analog clock face (e.g., fully around a dial region of the analog clock face)), the computer system (e.g., 600) removes display of the visual indicators along the path of movement of (e.g., the tip of) the first clock hand (e.g., 802B) as the first clock hand is moving (e.g., rotating) around the analog clock face (e.g., 804) (e.g., as shown in FIG. 8I).

In some embodiments, in response to detecting the first user input (e.g., 808), the computer system (e.g., 600) moves the graphical indicator (e.g., 806) to the second position relative to the analog clock face (e.g., 804) such that the graphical indicator is aligned with the first clock hand (e.g., 802B) (e.g., such that the graphical indicator is pointing to or marking the position of the first clock hand; such that the graphical indicator is at the outer end of the first clock hand) and displays the graphical indication of the time (e.g., 810) (e.g., a time counter; a digital counter) but does not automatically initiate a counting of the time using the graphical indication of the time. In some embodiments, while displaying the graphical indication of the time, the computer system detects (e.g., via a touch-sensitive surface of the one or more input devices) an input (e.g., 816; a user's tap input) directed to confirming the initiation of the counting of the time (e.g., user selection of a confirm affordance (e.g., "set" affordance or "done" affordance)). In some embodiments, if the input directed to confirming the initiation of the counting of the time is not detected by the computer system for a predetermined time period (e.g., 5 seconds; 10 seconds; 30 seconds), the computer system moves the graphical indicator back to its previous position (the first position) relative to the analogic clock face.

Note that details of the processes described above with respect to method 900 (e.g., FIGS. 9A-9B) are also applicable in an analogous manner to the method described above and below. For example, method 700 optionally includes one or more of the characteristics of the various methods described above with reference to method 900. For example, a watch user interface as described with reference to FIGS. 6A-6H can include and be used to perform a counting operation as described with reference to FIGS. 8A-8M. For another example, method 1100 optionally includes one or more of the characteristics of the various methods described above with reference to method 900. For example, a device can use as a watch user interface either a user interface that includes an indication of time and a graphical representation of a character as described with reference to FIGS. 10A-10AC or a watch user interface as described with reference to FIGS. 8A-8M. For another example, method 1300 optionally includes one or more of the characteristics of the various methods described above with reference to method 900. For example, a device can use as a watch user interface either a time user interface as described with reference to FIGS. 12A-12G or a watch user interface as described with reference to FIGS. 8A-8M. For another example, method 1500 optionally includes one or more of the characteristics of the various methods described above with reference to method 900. For example, a background of a watch user interface as described with reference to FIGS. 8A-8M can be created or edited via the process for updating a background as described with reference to FIGS. 14A-14AD. For another example, method 1700 optionally includes one or more of the characteristics of the various methods described above with reference to method 900. For example, the process for changing one or more complications of a watch user interface as described with reference to FIGS. 16A-16AE can be used to change one or more complications of a watch user interface as described with reference to FIGS. 8A-8M. For brevity, these details are not repeated below.

FIGS. 10A-10AC illustrate exemplary user interfaces for enabling and displaying user interface using a character, in accordance with some embodiments. The user interfaces in these figures are used to illustrate the processes described below, including the processes in FIGS. 11A-11H.

FIG. 10A illustrates device 600 displaying user interface 1001 that concurrently includes indication of time 1002 and graphical representation 1000 of a first character displayed on background 1004. In some embodiments, representation 1000 of the first character corresponds to a graphical representation of a user associated with device 600 (e.g., a representation created or customized by a user).

In FIG. 10A, device 600 is in a first activity state (e.g., a locked state; a sleep state, a low-power state) in which display 602 is dimmed (e.g., at a lower brightness) compared to a "normal" operating state. In the first state depicted in FIG. 10A, device 600 displays fewer graphical elements than in the normal operating state (e.g., complication 1005A and complication 1005B shown in, e.g., FIG. 10B are not displayed in the first state). In accordance with device 600 being in the first activity state, device 600 displays graphical representation 1000 of the first character in a first visual state (e.g., a static visual state or an animated visual state) that corresponds to the first activity state. In the embodiment illustrated in FIG. 10A, the first visual state includes the showing the character with eyes shut (e.g., a character appears to be sleeping).

FIG. 10B illustrates device 600 in a second activity state (e.g., the normal operating state, an active state, a different activity state from the first activity state depicted in FIG. 10A) in which display 602 is not dimmed. In the second activity state, user interface 1001 concurrently displays indication of time 1002 and graphical representation 1000 of the first character on background 1004 (e.g., similar to FIG. 10A), as well as complications 1005A and 1005B that provide date and weather information, respectively. In accordance with device 600 being in the second activity state, device 600 displays graphical representation 1000 of the first character in a second visual state different, from the first visual state, that corresponds to the second activity state. In the embodiment illustrated in FIG. 10B, the second visual state shows the first character with eyes open (e.g., a neutral pose). In some embodiments, device 600 changes from the user interface in FIG. 10A to the user interface in FIG. 10B (or vice versa) in response to detecting a change in the activity state of device 600 (e.g., in response to detecting a change from the first activity state to the second activity state (or vice versa), respectively).

FIGS. 10C-10D illustrate device 600 in the second activity state (e.g., the normal or active activity state) and displaying the first character in a visual state that includes an animation in which representation 1000 of the first character alternates between a first position (e.g., head tilted to the left as depicted in FIG. 10C) and a second position (e.g., head tilted to the right as depicted in FIG. 10D). In some embodiments, representation 1000 alternates between the first position and the second position (e.g., at a periodic rate) to indicate the passing of time (e.g., from the first position to the second position every one second or 0.5 seconds, from the first position to the second position and back to the first position every two seconds or 1 second). In some embodiments, the animation is based on the character (e.g., different animations are displayed for different characters). In some embodiments, device 600 displays a gradual transition from a first animation of representation 1000 of the first character to a second (e.g., different) animation (e.g., device 600 interpolates (e.g., based on a last state of the first animation and a first state of the second animation) between the two animations to provide a smooth transition).

Figures 10E, 10F:
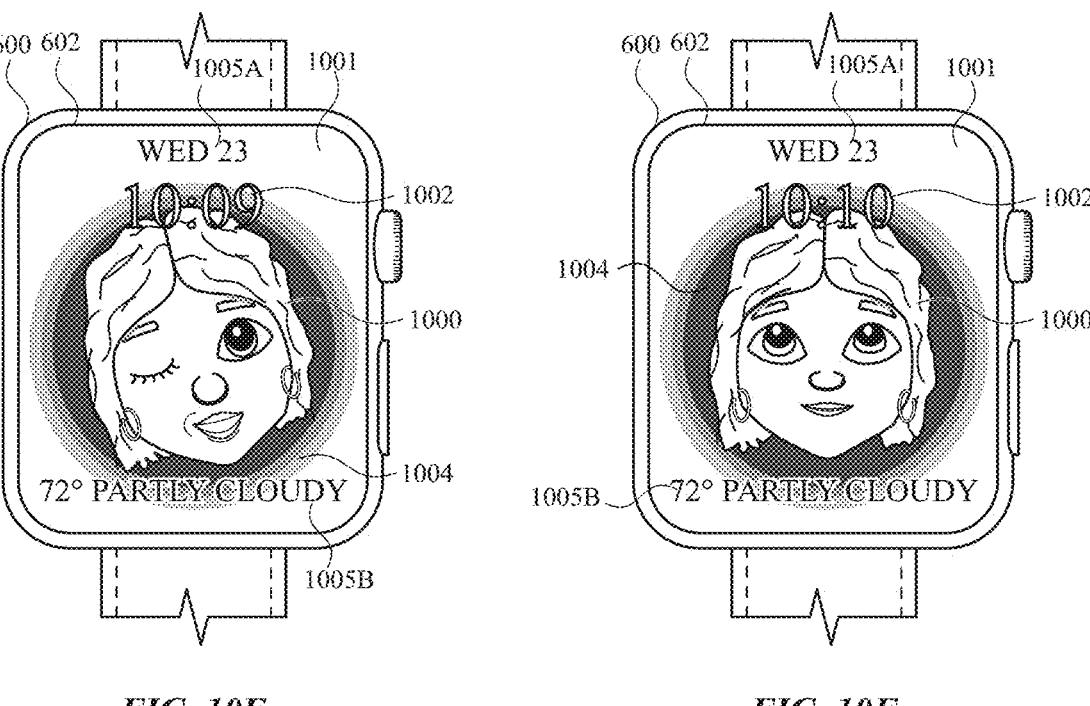
FIGS. 10A-10AC illustrate exemplary user interfaces for enabling and displaying a user interface using a character, in accordance with some embodiments.

In FIG. 10D, device 600 receives (e.g., detects) input 1006 (e.g., a tap at a location on display 602 that corresponds to representation 1000, a wrist raise). In response to receiving input 1006, device 600 displays representation 1000 with the first character in a different visual state (e.g., device 600 changes the visual state of the first character), as illustrated by FIG. 10E. For example, device 600 changes the display of visual representation 1000 to change the visual state of the first character in response to input 1006. In FIG. 10E, the first character is shown winking with an open mouth (e.g., a selfie pose), whereas in FIG. 10D the first character had both eyes open and mouth closed. In some embodiments, device 600 changes the display of visual representation 1000 to change the visual state of the first character without user input (e.g., device 600 changes the visual state in response to time-based criteria being met, device 600 automatically cycles through a set of predetermined visual states (e.g., device 600 displays representation 1000 with a visual state for a predetermined amount of time before changing to another visual state)).

In some embodiments, representation 1000 is displayed in a manner that indicates a change in time. For example, in FIG. 10F, indication of time 1002 shows that the time has changed to 10:10 from 10:09 in FIG. 10E. When (e.g., in response to) the time changing from 10:09 to 10:10, the first character looks or glances at indication of time 1002 (e.g., the head and/or eyes of representation 1000 move to appear as though the first character is looking at indication of time 1002). In some embodiments, representation 1000 indicates a change in time in response to a change in the minute of the current time. In some embodiments, representation 1000 indicates a change in time only in response to a change in the hour of the current time (e.g., from 10:59 to 11:00). In some embodiments, representation 1000 indicates a change in time (e.g., appears to look at indication of time 1002) when a predetermined time has been reached (e.g., the hour has changed, a quarter past the hour has been reached, half past the hour has been reached, 45 minutes past the hour has been reached).

Figures 10G, 10H:
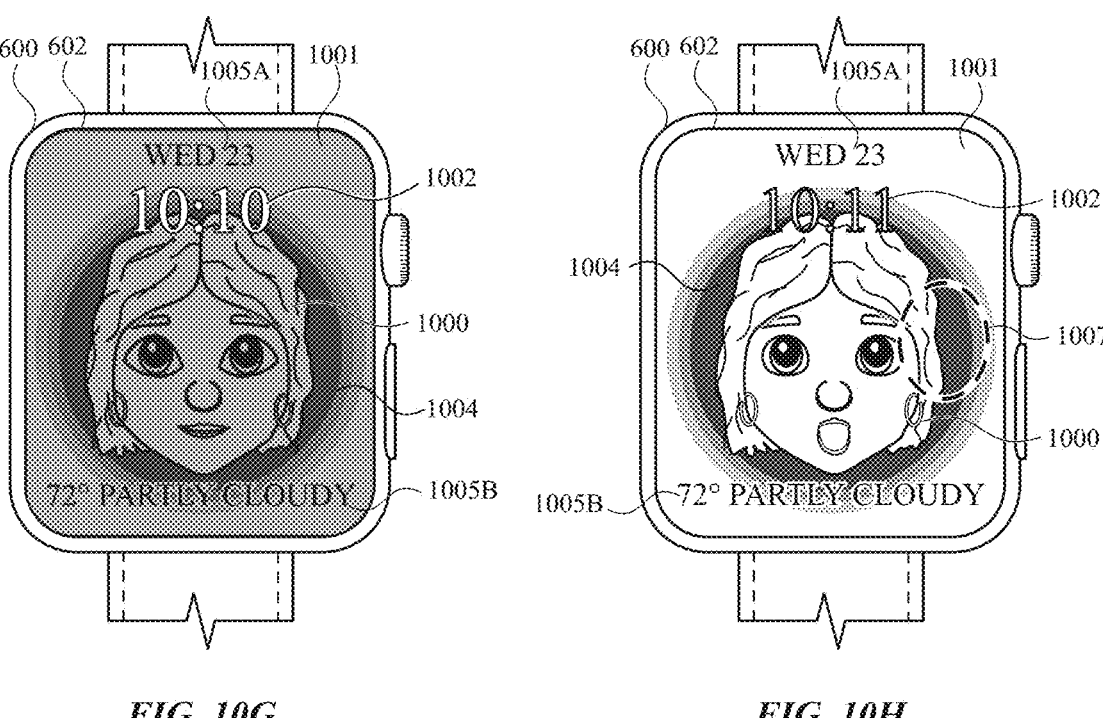
Figure 10I:
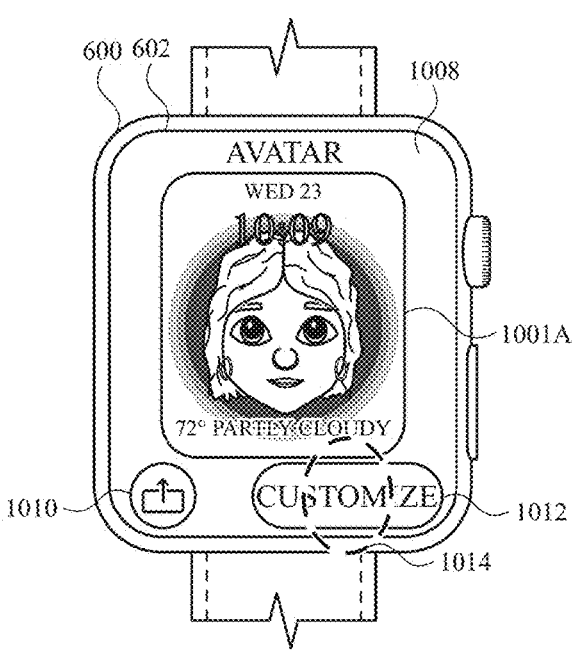
Figure 10J:
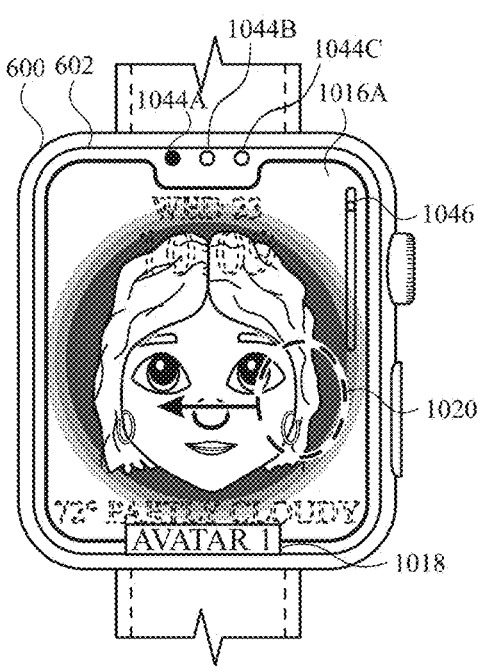
Figure 10K:
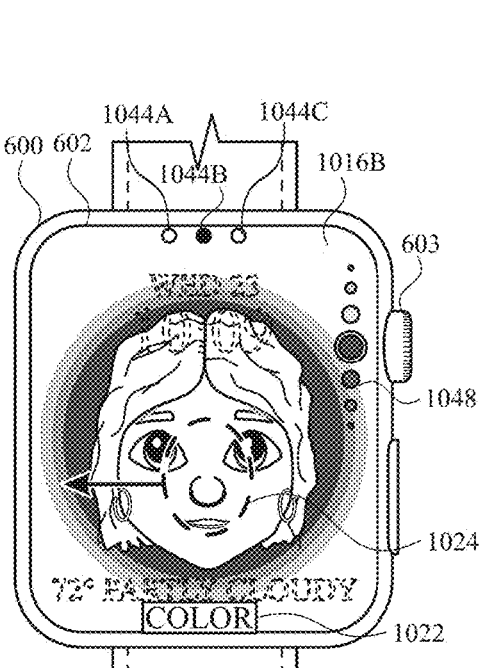
Figure 10L:
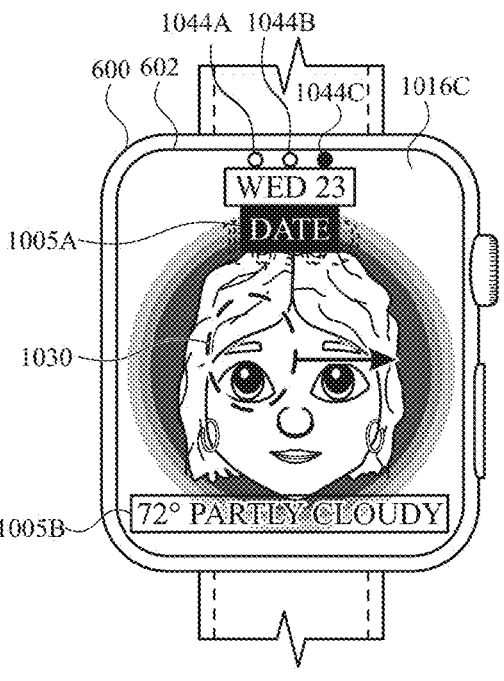
Figure 10Q:
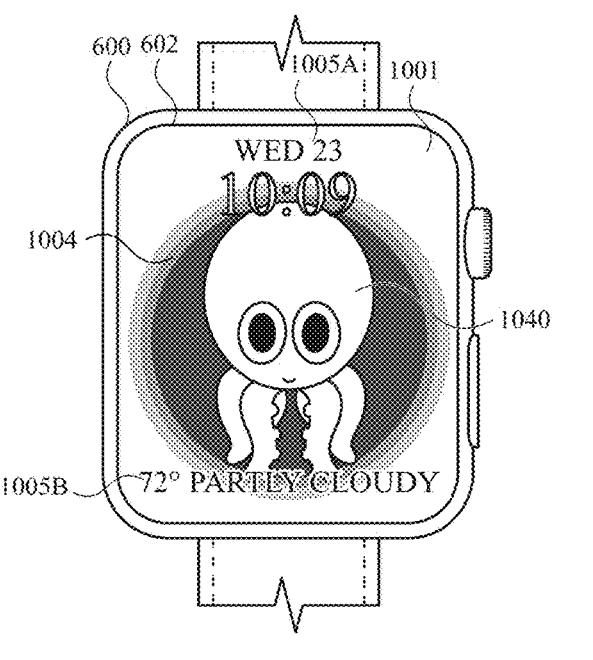
Figure 10R:
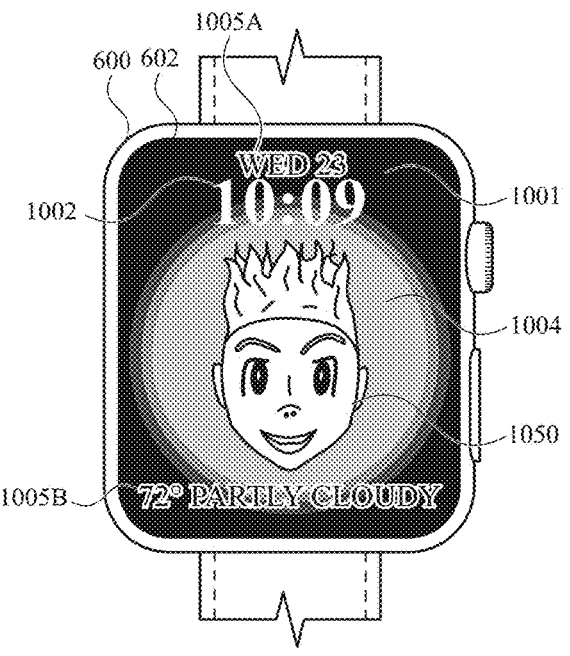
Figure 10S:
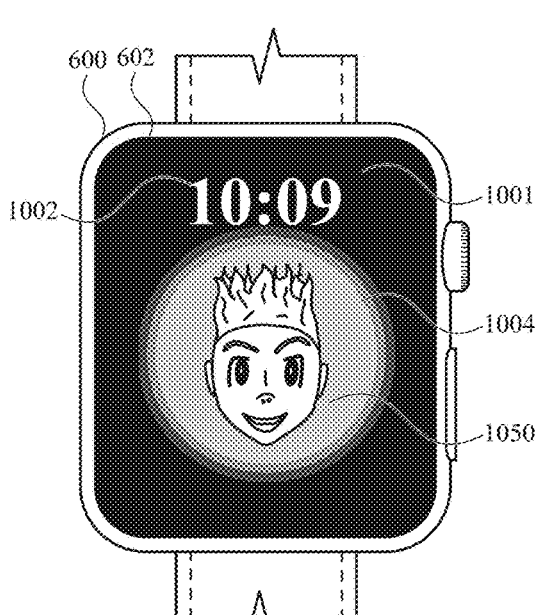
Figure 10T:
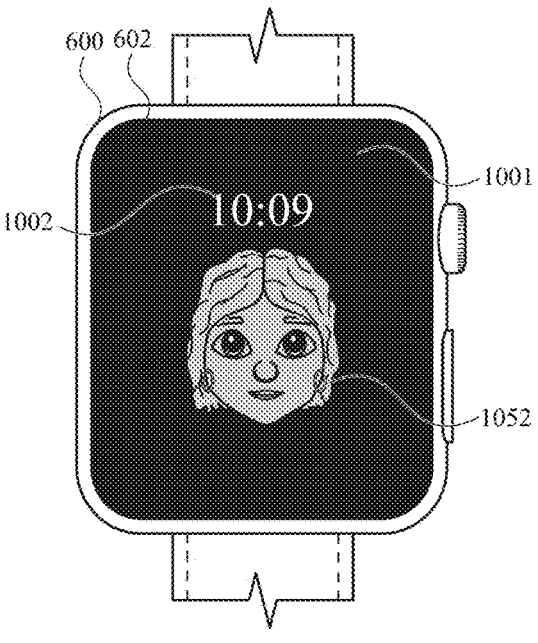
Figure 10X:
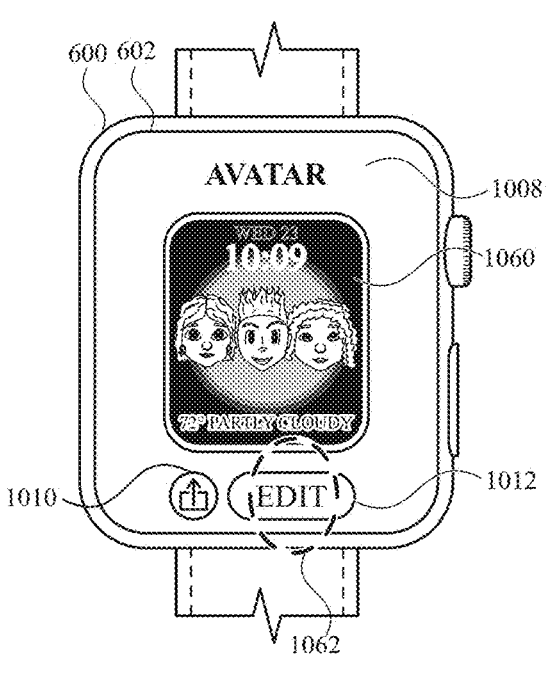
Figure 10Y:
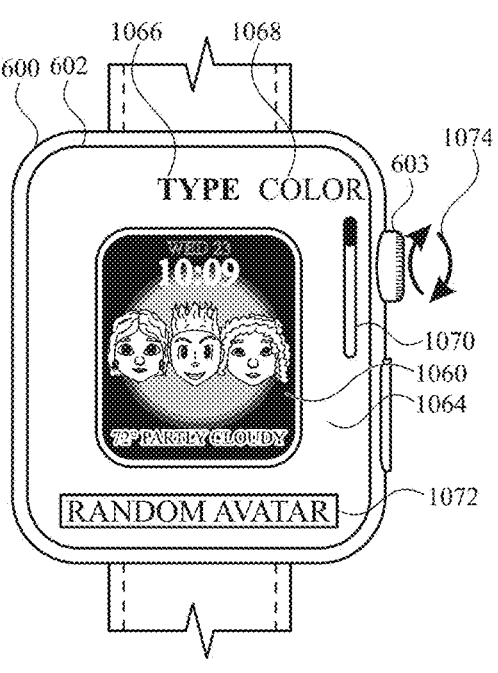
Figure 10Z:
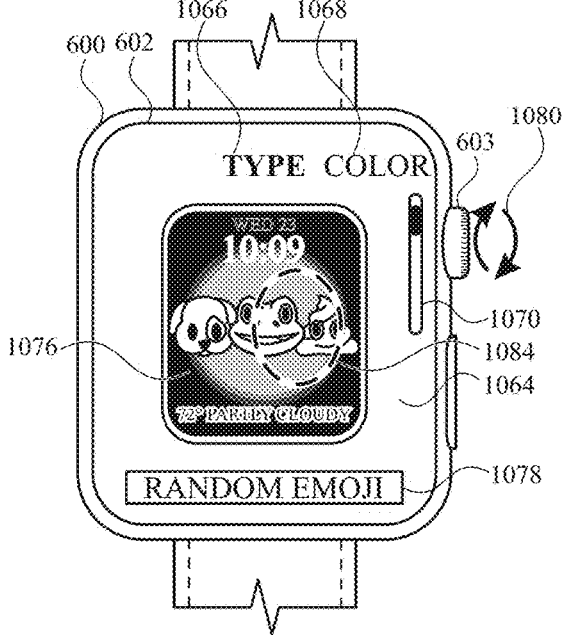
Figure 10A:
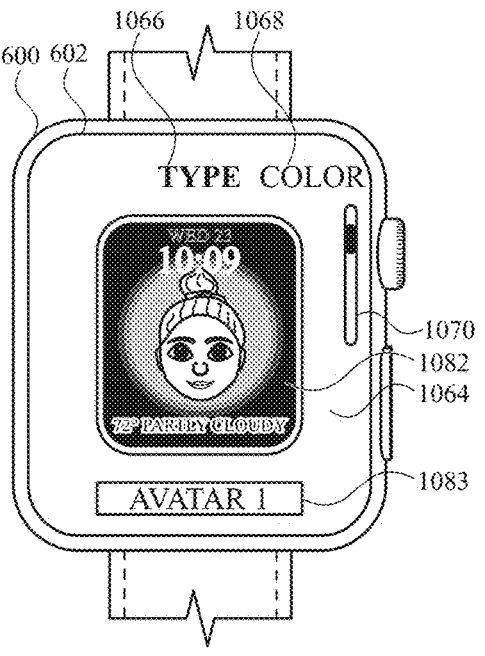
Figure 10A:
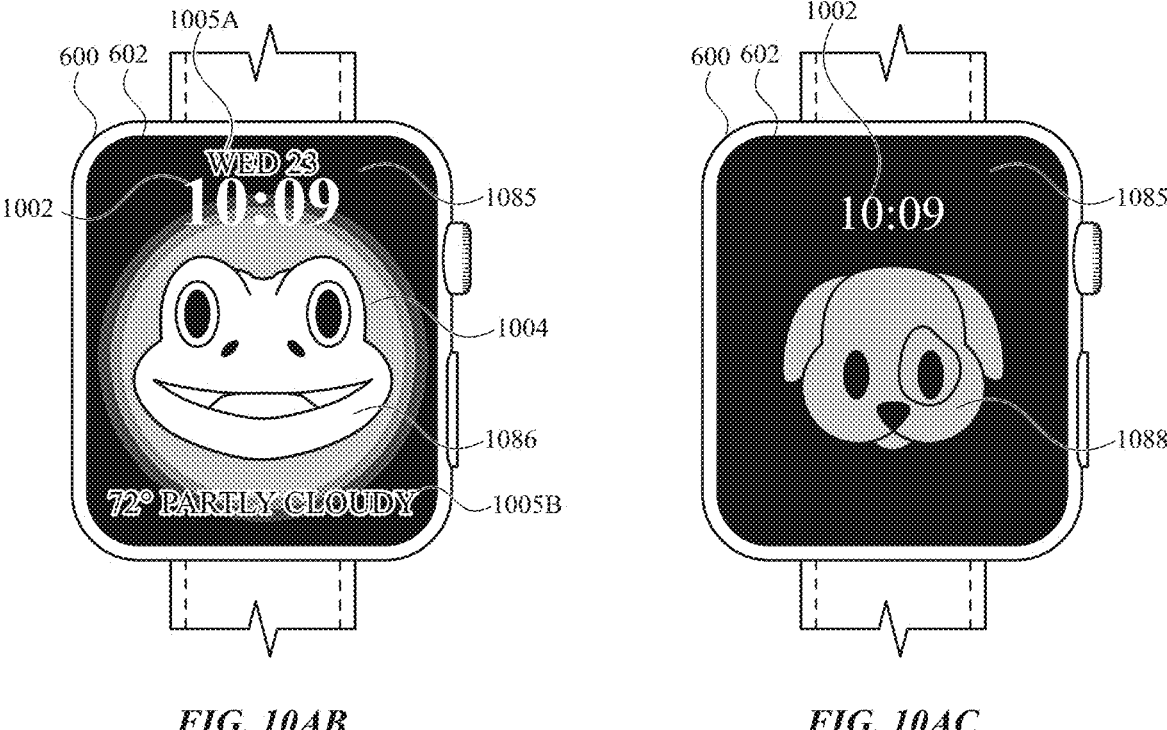
Figure 11F:
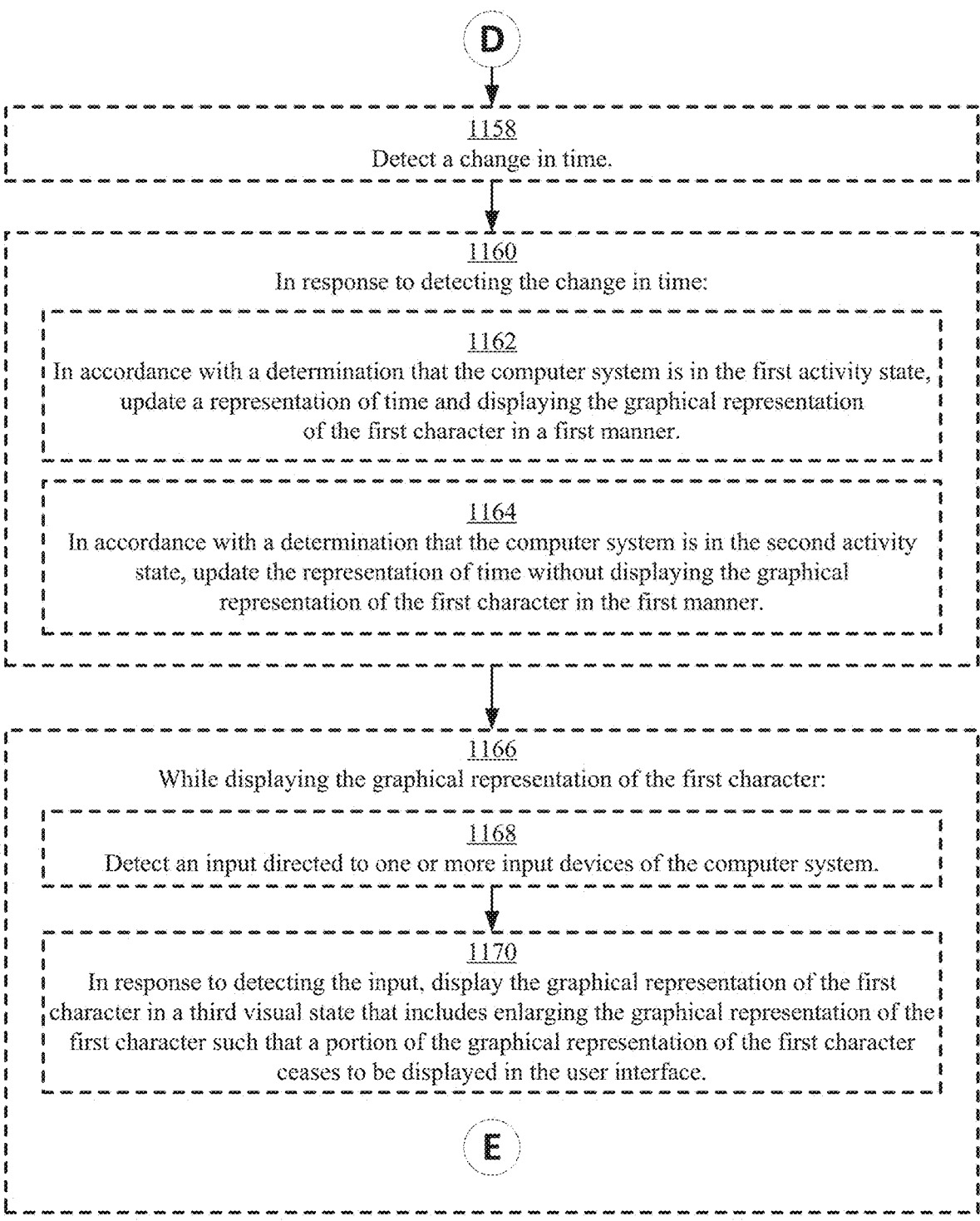
Figure 11G:
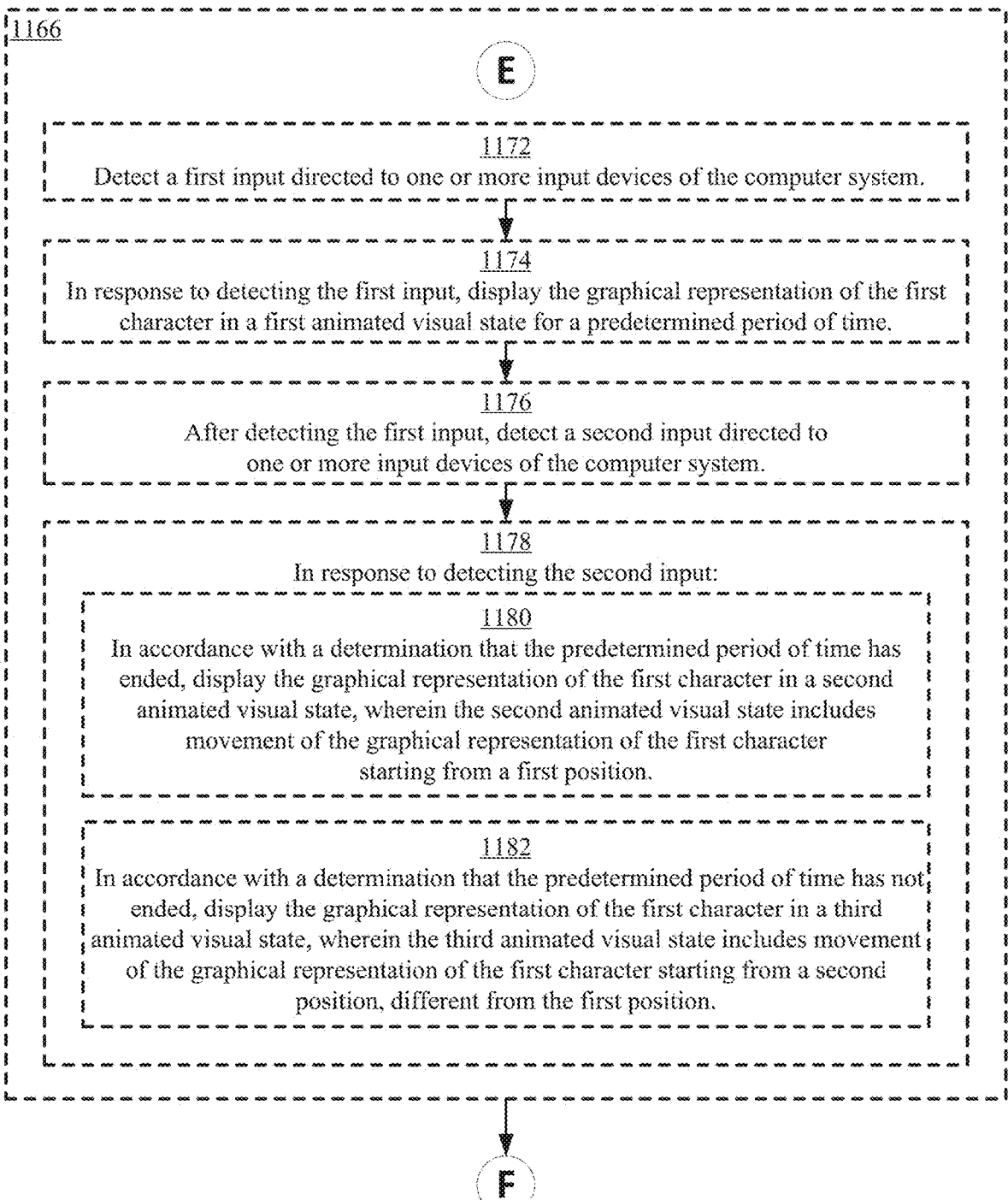

FIG. 10G illustrates device 600 in a third activity state (e.g., an inactive unlocked state, a low-power unlocked state) different from the first activity state in FIG. 10A and the second activity state in FIGS. 10B-10F. In the activity state depicted in FIG. 10G, device 600 displays indication of time 1002, graphical representation 1000 of the first character (e.g., in a visual state having a neutral body expression), and complications 1005A and 1005B on background 1004 (similar to the second activity state in, e.g., FIG. 10B); display 602 is dimmed compared to the second activity state (e.g., an active unlocked state) and brighter compared to the first activity state (e.g., a locked state). In the embodiment illustrated in FIG. 10G, representation 1000 shows the first character in the same visual state shown in FIG. 10B, where device 600 was in the second activity state (e.g., when device 600 changes from the second activity state to the third activity state, representation 1000 can maintain the visual state of the first character while changing the brightness of display 602).

FIG. 10H illustrates device 600 in a fourth activity state (e.g., a change-in-time state for predetermined intervals) different from the first activity state in FIG. 10A, the second activity state in FIGS. 10B-10F, and the third activity state in FIG. 10G. In the activity state depicted in FIG. 10H, in response to the time changing from 10:10 to 10:11, device 600 changes the visual state (e.g., changes the pose, displays a different animation) of the first character in representation 1000, where changing the visual state includes displaying the first character in representation 1000 to look (e.g., glance) at indication of time 1002, as illustrated by FIG. 10H. In some embodiments, device 600 is in the fourth activity state at predetermined time intervals (e.g., every 10 seconds; every 15 seconds; every 30 seconds; every minute; every 5 minutes).

In FIG. 10H, device 600 receives (e.g., detects) input 1007 (e.g., a touch on display 602 with a duration that exceeds a predetermined threshold, a touch on display 602 with a characteristic intensity that exceeds a predetermined threshold). In response to receiving input 1006, device 600 displays user interface 1008 shown in FIG. 10I. In some embodiments, user interface 1008 is a user interface of a user interface editing mode (e.g., in response to receiving input 1006, device 600 enters a user interface editing mode for editing one or more features of user interface 1001). User interface 1008 displays representation 1001A of user interface 1001 (e.g., a static, smaller-scale image of user interface 1001), share affordance 1010, and customize affordance 1012.

In FIG. 10I, device 600 receives (e.g., detects) input 1014 corresponding to a request to edit user interface 1001 (e.g., a tap at a location on display 602 corresponding to customize affordance 1012). In response to receiving input 1014, device 600 displays user interface 1016A shown in FIG. 10J. Paging dots 1044A-1044C indicate that user interface 1016A is the first in a sequence of three editing user interfaces. User interface 1016A provides the capability to change the character displayed on user interface 1001 (e.g., by swiping up or down on display 602 or rotating rotatable input mechanism 603). User interface 1016A displays de-emphasized (e.g., dimmed, greyed, blurred) representations of complications 1005A and 1005B, representation 1000 of the currently-selected character (e.g., the first character), character selection element 1046, and textual identifier 1018 of the currently-selected character. Character option selection element 1046 indicates the position of the currently selected option in a sequence of character options.

In FIG. 10J, device 600 receives input 1020 (e.g., a right-to-left swipe gesture on display 602). In response to receiving input 1020, device 600 displays user interface 1016B, which (as indicated by label 1022) provides the capability to change the color of background 1004 of user interface 1001. Paging dots 1044A-1044C are updated to indicate that user interface 1016B is the second in the sequence of three editing user interfaces. User interface 1016B includes color selection element 1048, which displays various color options for background 1004 of user interface 1001. The currently-selected color option is displayed in the middle of color selection element 1048 and at a larger size than the other color options. In some embodiments, a user can provide an input (e.g., rotation of rotatable input mechanism 603 or a vertical swipe gesture on display 602) to select a different color option, and device 600 updates color selection element 1048 and background 1004 accordingly in response to the input.

In FIG. 10K, device 600 receives (e.g., detects) input 1024 (e.g., a right-to-left swipe gesture on display 602). In response to receiving input 1024, device 600 displays user interface 1016C, which (as indicated by label 1022) provides the capability to change the information displayed by complication 1005A and complication 1005B. Paging dots 1044A-1044C are updated to indicate that user interface 1016C is the third in the sequence of editing user interfaces. While displaying using interface 1016C, a user can select a complication (e.g., by tapping on the complication) and edit the selected complication (e.g., by rotating rotatable input mechanism 603). Device 600 indicates that the complications can be edited by, e.g., outlining complication 1005A and complication 1005B. Upon selection of a complication, device 600 visually distinguishes (e.g., highlights, outlines, increases the brightness of) the selected complication relative to other complications.

In FIG. 10L, device 600 receives (e.g., detects) input 1030 (e.g., two left-to-right swipes on display 602, an input with a direction opposite of a direction of input 1024 in FIG. 10K). In response to receiving input 1030, device 600 displays (e.g., returns to) user interface 1016A. While displaying user interface 1016A, device 600 receives (e.g., detects) input 1032 (e.g., a rotation of rotatable input mechanism 603). In response to receiving input 1032, device 600 displays a different character option (e.g., the adjacent option in the sequence of character options) and updates character selection element 1046 accordingly, as shown in FIG. 10N. A character option can include only one character or a set of two or more characters. In FIG. 10N, the displayed character option includes a set of four characters identified as "Toy Box." In some embodiments, when a set of two or more characters is selected for display on user interface 1001, device 600 displays the characters of the set individually at different times (e.g., device 600 displays the characters according to a predefined sequence in response to user input (e.g., a wrist raise, a tap on display 602) or automatically cycles through the set of characters at predetermined time intervals).

In FIG. 10N, device 600 receives (e.g., detects) input 1036 (e.g., rotation of rotatable input mechanism 603, a continuation of input 1032). In response to receiving input 1034, device 600 displays a different character option (e.g., the next adjacent option in the sequence of character options) and updates character selection element 1046 accordingly, as shown in FIG. 10O. In FIG. 10O, the selected character option corresponds to representation 1040 of an octopus character (as indicated by identifier 1038).

While representation 1040 is designated as the selected character (e.g., while displaying user interface 1016A. 1016B, or 1016C after designating representation 1040), device 600 receives (e.g., detects) input 1042 corresponding to selection of the currently-displayed character option (e.g., a press of rotatable and depressible input mechanism 603). As shown in FIG. 10P, in response to receiving input 1042, device 600 displays user interface 1001 with a representation of a character different from the first character, and in particular, representation 1040 of the selected character option. In some embodiments, device 600 exits user interface editing mode in response to receiving input 1042. In some embodiments, in response to receiving input 1042, device 600 displays (e.g., returns to) user interface 1008 (shown in FIG. 10I) with an updated version of representation 1001A including a representation of the selected character (e.g., representation 1040), and then displays user interface 1001 with representation 1040 of the selected character option in response to receiving further input (e.g., a tap on representation 1001A, a press of rotatable and depressible input mechanism 603 or button 613 while displaying user interface 1008).

FIG. 10Q illustrates an example of representation 1040 of the octopus character in a visual state (e.g., a visual state different from the visual state shown in FIG. 10P) displayed while device 600 is in the second activity state (e.g., an active, unlocked state).

In some embodiments, representation 1000 of the first character is displayed concurrently with indication of time 1002 at a first time, and a representation of a second character (e.g., representation 1040 of the octopus character or representation 1000 of the first character) is displayed concurrently with indication of time 1002 at a second time different from the first time, where: in accordance with device 600 being in an activity state (e.g., an active state) at the second time, device 600 displays the representation of the second character in a visual state (e.g., representation 1000 of the first character in the visual state illustrated in FIG. 10B; representation 1040 of the octopus character in the visual state illustrated in FIG. 10P; representation 1040 of the octopus character in the visual state illustrated in FIG. 10Q); and in accordance with device 600 being in a different activity state (e.g., a locked state) at the second time, device 600 displays the representation of the second character in a different visual state (e.g., representation 1000 of the first character in the state shown in FIG. 10A; representation 1040 of the octopus character in the visual state illustrated in FIG. 10P, except with eyes closed; representation 1040 of the octopus character in the visual state illustrated in FIG. 10Q, except with eyes closed).

In some embodiments, electronic device 600 is configured to transition between characters in response to detecting a change in the activity state from a third activity state (e.g., a higher-power consumption mode and/or the second activity state) to a fourth activity state (e.g., a lower-power consumption mode and/or the first activity state). For example, when a set of two or more characters is selected for display on user interface 1001, as shown at FIG. 10N, electronic device 600 displays the characters of the set individually, and in response to a change in the activity state from the third activity state (e.g., a higher-power consumption state, a normal operating state, and/or the second activity state) to the fourth activity state (e.g., a lower-power consumption state, a sleep state, a locked state, and/or the first activity state), transitions from one character in the set to another character in the set. In some embodiments, electronic device 600 forgoes transitioning between characters in response to detecting a change in the activity state from the fourth activity state (e.g., a lower-power consumption mode) to the third activity state (e.g., a higher-power consumption mode). In some embodiments, electronic device transitions between characters in response to detecting a change in the activity state from the fourth activity state to the third activity state in addition to, or in lieu of, transitioning between characters in response to detecting a change in the activity state from the third activity state to the fourth activity state.

At FIG. 10R, electronic device 600 is in a third activity state (e.g., the second activity state, a normal operating state, and/or a higher-power consumption state) and displays user interface 1001 with a graphical representation 1050 of a second character (e.g., a character different from the first character corresponding to graphical representation 1000 and the octopus character corresponding to graphical representation 1040). User interface 1001 also includes time indicator 1002 and complications 1005A and 1005B. Additionally, user interface 1001 includes a default color (e.g., black) and background 1004 having one or more colors that are different from the default color (e.g., colors displayed by electronic device 600 in accordance with user inputs while second user interface 1016B is displayed at FIG. 10K). While user interface 1001 in FIGS. 10B-10F, 10H-10M, and 10O-10Q show the default color as lighter than background 1004 (e.g., white), user interface 1001 in FIGS. 10B-10F, 10H-10M, and 10O-10Q can alternatively display the default color as darker than background 1004 (e.g., black) as shown at FIGS. 10R-10W.

At FIG. 10R, in accordance with electronic device 600 being in the third activity state, electronic device 600 displays graphical representation 1050 of the second character in a third visual state (e.g., the second visual state and/or an animated visual state) that corresponds to the third activity state. In the embodiment illustrated in FIG. 10R, the third visual state includes the second character with eyes and mouth open (e.g., the second character is posing and appears awake (not asleep)).

FIG. 10S illustrates electronic device 600 in a transition state between the third activity state and a fourth activity state (e.g., the first activity state, a lower-power consumption state, a locked state, a sleep state) in which display 602 begins to dim as compared to FIG. 10R. At FIG. 10S, background 1004 and graphical representation 1050 are reduced in size as compared to FIG. 10R as the transition between third activity state and fourth activity state occurs. In some embodiments, graphical representation 1050 fades out, reduces in brightness, and/or dissolves in the transition between the third activity state and the fourth activity state. Electronic device 600 ceases to display complications 1005A and 1005B on user interface 1001. As shown in FIG.

10S, electronic device 600 displays time indicator 1002 with a reduced thickness and/or size during the transition between the third activity state and the fourth activity state.

At FIG. 10T, electronic device 600 is operating in the fourth activity state. At FIG. 10T, electronic device 600 displays graphical representation 1052 of a third character, different from the second character. Accordingly, during the transition between the third activity state and the fourth activity state, graphical representation 1050 ceases to be displayed on user interface 1001 and graphical representation 1052 is displayed on user interface 1001. In some embodiments, graphical representation 1050 fades out and/or dissolves as graphical representation 1052 fades in or is otherwise displayed on user interface 1001. As set forth above, the second character and the third character are included in the set of characters selected to be displayed on user interface 1001. In response to detecting the change between the third activity state and the fourth activity state, electronic device 600 transitions between display of the second character to display of the third character. At FIG. 10T, graphical representation 1052 displayed while electronic device 600 operates in the fourth activity state is dimmed (e.g., includes a reduced brightness) as compared to graphical representation 1050 displayed while electronic device 600 operates in the third activity state. In some embodiments, dimming the graphical representation 1052 indicates that electronic device 600 is in the fourth activity state. For example, graphical representation 1052 is illustrated in greyscale to indicate that graphical representation 1052 is faded and/or otherwise displayed at a reduced brightness when compared to graphical representation 1050 shown at FIG. 10R. Electronic device 600 ceases to display background 1004 on user interface 1001 when electronic device 600 is in the fourth activity state.

In accordance with device 600 being in the fourth activity state, device 600 displays graphical representation 1052 of the third character in a fourth visual state different, from third visual state, that corresponds to the fourth activity state. In the embodiment illustrated in FIG. 10T, the fourth visual state shows the third character with eyes open (e.g., a neutral pose). In some embodiments, the fourth visual state shows the third character with eyes closed such that the third character appears to be asleep. In some embodiments, the fourth visual state of the third character does not include movement and/or animations of the third character. Accordingly, electronic device 600 does not animate and/or does not cause graphical representation 1052 of the third character to move in response to changes in time (e.g., every minute, every fifteen minutes, every thirty minutes, every hour) and/or in response to user inputs.

At FIG. 10U, electronic device 600 operates in the third activity state (e.g., electronic device 600 detects a user input and/or a wrist raise gesture causing a transition from the fourth activity state to the third activity state) and displays user interface 1001 with graphical representation 1052 of the third character. As such, electronic device 600 does not replace graphical representation 1052 of the third character with a graphical representation of a different character upon transitioning from the fourth activity state to the third activity state. For example, electronic device 600 maintains display of the graphical representation 1052 of the third character in response to detecting a change from the fourth activity state to the third activity state. In some embodiments, electronic device 600 transitions display of graphical representation 1050 with graphical representation 1052 in response to detecting a change from the fourth activity state to the third activity state, but not in response to detecting a change from the third activity state to the fourth activity state. At FIG. 10U, user interface 1001 includes background 1004 (e.g., the same background as displayed at FIG. 10R) and complications 1005A and 1005B. Additionally, time indicator 1002 is displayed as having an increased thickness and/or size when compared to time indicator 1002 displayed while electronic device 600 operates in the fourth activity state shown at FIG. 10T.

At FIG. 10U, in accordance with electronic device 600 being in the third activity state, electronic device 600 displays graphical representation 1052 of the third character in the third visual state (e.g., the second visual state and/or an animated visual state) that corresponds to the third activity state. In the embodiment illustrated in FIG. 10U, the third visual state includes the third character with eyes and mouth open (e.g., the third character is posing and appears awake (not asleep)). In some embodiments, the third visual state of the third character includes periodic movement and/or animations of the third character. For example, electronic device 600 can animate and/or cause graphical representation 1052 of the third character to move in response to changes in time (e.g., every minute, every fifteen minutes, every thirty minutes, every hour) and/or in response to user input. In some embodiments, in response to detecting a change in the activity state from the third activity state to the fourth activity state, electronic device 600 displays user interface 1001 with a fourth character, different from the second character and the third character.

At FIG. 10U, while electronic device 600 is in the third activity state, electronic device 600 detects user input 1054 (e.g., a tap gesture) on user interface 1001. In response to detecting user input 1054, electronic device 600 causes display of graphical representation 1052 of the third character to move (e.g., causes a randomly selected or predetermined animation of graphical representation), as shown at FIG. 10V. At FIG. 10V, electronic device 600 displays an enlargement animation (e.g., zooms and/or increases a size) of graphical representation 1052 of the third character. In some embodiments, in response to the user input 1054, electronic device 600 ceases to display a portion of graphical representation 1052 on display 602. For example, at FIG. 10V, a lower portion of graphical representation 1052 of the third character (e.g., the cars and mouth of third character) appears to move off of display 602 and cease to be displayed by electronic device 600 for a predetermined period of time. Additionally, electronic device 600 causes display of graphical representation 1052 of the third character to cover and/or block at least a portion of complication 1005B for the predetermined period of time in response to user input 1052.

In some embodiments, electronic device 600 is configured to fluidly transition between different animations of graphical representation 1052 of the third character in response to user inputs. For example, at FIG. 10V, electronic device 600 detects user input 1056 on user interface 1001 while the lower portion of graphical representation 1052 of the third character is not displayed on display 602 (e.g., while electronic device 600 is causing an enlargement animation of graphical representation 1052). In response to detecting user input 1056, electronic device 600 displays a pose animation of graphical representation 1052 of the third character, as shown at FIG. 10W. In some embodiments, electronic device 600 displays a randomly selected animation (e.g., another pose animation and/or a different animation than the pose animation) of graphical representation 1052 of the third character in response to detecting user input 1056. At FIG. 10W, electronic device 600 displays graphical representation 1052 of the third character as winking and with an open mouth (e.g., the mouth is open wider than in FIG. 10U). In some embodiments, in response to user input 1056, electronic device 600 displays graphical representation 1052 of the third character in the pose depicted in FIG. 10W for a predetermined period of time before returning display of graphical representation 1052 of the third character to the third visual state, as shown at FIG. 10U. In some embodiments, electronic device 600 displays the animation of graphical representation 1052 in response to detecting user input 1056 after graphical representation 1052 returns to the position shown in FIG. 10U instead of while graphical representation 1052 is positioned as illustrated in FIG. 10V (e.g., while graphical representation 1052 is undergoing enlargement animation caused by user input 1054).

Turning back to FIG. 10U, electronic device 600 detects user input 1058 (e.g., a long press gesture) on user interface 1001. In response to detecting user input 1058, electronic device 600 displays user interface 1008 shown at FIG. 10X. As set forth above, in some embodiments, user interface 1008 is a user interface of a user interface editing mode. User interface 1008 displays representation 1060 of user interface 1001, share affordance 1010, and customize affordance 1012 (e.g., edit affordance). At FIG. 10X, representation 1060 of user interface 1001 includes multiple characters that are included in the set of characters configured to be displayed on user interface 1001. For example, electronic device 600 transitions display of user interface 1001 between individual graphical representations of the set of characters in response to detecting the change from the third activity state to the fourth activity state (and/or in response to detecting the change from the fourth activity state to the third activity state). As such, representation 1060 provides an indication that electronic device 600 transitions between displaying the characters in the set of characters when user interface 1001 is selected.

At FIG. 10X, electronic device 600 receives (e.g., detects) input 1062 corresponding to a request to edit user interface 1001 (e.g., a tap at a location on display 602 corresponding to customize affordance 1012). In response to receiving input 1062, electronic device 600 displays user interface 1064 shown at FIG. 10Y. User interface 1064 provides the ability to change the character and/or set of characters displayed on user interface 1001 (e.g., by swiping up or down on display 602 or rotating rotatable input mechanism 603). For example, user interface 1064 includes editing mode indicator 1066 (e.g., "Type") and additional editing mode user interface object 1068 (e.g., "Color"). In response to detecting user input (e.g., a swipe gesture on display 602), electronic device 600 adjusts display of user interface 1064 to a second page that provides the ability to change a color of background 1004. At FIG. 10Y, user interface 1064 displays representation 1060 of the currently-selected watch face user interface 1001 (e.g., a watch face user interface that displays the set of characters), watch face selection element 1070, and textual identifier 1072 of the currently-selected set of characters (e.g., "Random Avatar"). Watch face option selection element 1070 indicates the position of the currently selected option in a sequence of watch face options. At FIG. 10Y, electronic device 600 detects rotational input 1074 on rotatable input mechanism 603. In response to detecting rotational input 1074, electronic device 600 displays user interface 1064 with representation 1076 of a second watch face user interface that includes a second set of characters (e.g., animal-like characters and/or emojis) configured to be displayed on display 602, as shown at FIG. 10Z.

At FIG. 10Z, user interface 1064 includes textual identifier 1078 (e.g., "Random Emoji") to reflect representation 1076 of the second watch face user interface that includes the second set of characters. Additionally, electronic device 600 adjusts a position of watch face selection element 1070 in response to rotational input 1074. At FIG. 10Z, electronic device detects rotational input 1080 on rotatable mechanism 603. In response to detecting rotational input 1080, electronic device 600 displays user interface 1064 with representation 1082 of a third watch face that includes a single character configured to be displayed on display 602, as shown at FIG. 10AA. Accordingly, electronic device 600 displays representation 1060 and representation 1076 with multiple characters to indicate that the corresponding watch face user interface displays individual graphical representations of multiple characters when representation 1060 and/or representation 1076 are selected (e.g., via user input). Conversely, electronic device 600 displays representation 1082 with a single character to indicate that a corresponding watch face user interface displays a graphical representation of a single character when representation 1082 is selected. For example, the third watch face user interface does not transition between graphical representations of different characters in response to a change from the third activity state to the fourth activity state, in response to a user input, or after a predetermined amount of time. Rather, the third watch face user interface maintains display of a graphical representation of the single character, even as electronic device 600 changes from the third activity state to the fourth activity state. At FIG. 10AA, user interface 1064 also includes textual identifier 1083 (e.g., "Avatar 1") to identify the third watch face corresponding to representation 1082.

Turning back to FIG. 10Z, electronic device 600 detects user input 1084 (e.g., a tap gesture) corresponding to selection of representation 1076. In response to detecting user input 1084, electronic device 600 displays user interface 1085, as shown at FIG. 10AB. At FIG. 10AB, electronic device 600 is in the third activity state (e.g., a normal operating state, a higher-power consumption state) and user interface 1085 includes graphical representation 1086 of a fourth character (e.g., an animal-like emoji, such as a frog) in the third visual state. Additionally, user interface 1085 includes time indicator 1002, background 1004, and complications 1005A and 1005B.

At FIG. 10AC, electronic device 600 is in the fourth activity state (e.g., a locked state, a sleep state, a lower-power consumption state) and displays user interface 1085. As set forth above, representation 1076 in FIG. 10Z corresponds to a watch face user interface that includes a set of characters that includes more than one character (e.g., as opposed to a single character). Accordingly, in response to detecting a change from the third activity state to the fourth activity state, electronic device 600 ceases to display graphical representation 1086 of the fourth character (e.g., a frog character) and displays graphical representation 1088 of a fifth character (e.g., a dog character). At FIG. 10AC, electronic device 600 also ceases to display background 1004 and complications 1005A and 1005B because electronic device 600 operates in the fourth activity state. Further, at FIG. 10AC, user interface 1085 includes time indicator 1002 having a reduced thickness and/or size as compared to time indicator 1002 displayed at FIG. 10AB.

FIGS. 11A-11H are a flow diagram illustrating methods of enabling and displaying a user interface using a character, in accordance with some embodiments. Method 1100 is performed at a computer system (e.g., 100, 300, 500, 600) (e.g., a smart device, such as a smartphone or a smartwatch; a mobile device) that is in communication with a display generation component. Some operations in method 1100 are, optionally, combined, the orders of some operations are, optionally, changed, and some operations are, optionally, omitted.

As described below, method 1100 provides an intuitive way for managing user interfaces related to time. The method reduces the cognitive burden on a user for managing user interfaces related to time, thereby creating a more efficient human-machine interface. For battery-operated computing devices, enabling a user to manage user interfaces related to time faster and more efficiently conserves power and increases the time between battery charges.

At a first time, the computer system (e.g., 600) displays (1102), concurrently in a user interface (e.g., 1001) (e.g., a watch face user interface) displayed via the display generation component (e.g., 602), an indication of time (e.g., 1002) (e.g., the current time; the time set in the systems setting of the computer system) (1104), and a graphical representation of a first character (e.g., 1000, 1040) (e.g., an animated character; an emoji; an animated (e.g., 3D) emoji of an animal-like character; an animated (e.g., 3D) avatar-like emoji; an animated representation of a user of the computer system) (1106).

Displaying the graphical representation of the first character (e.g., 1000, 1040) includes (1106), in accordance with a determination that the computer system (e.g., 600) is in a first activity state (e.g., activity state in FIG. 10A, 10B 10C, 10D, 10E, 10F, 10G, 10H, 10P, or 10Q) (e.g., dimmed (e.g., but unlocked) state; locked state; time-passing state; detecting an input (e.g., tap input) state; time-change state), displaying the graphical representation of the first character in a first visual state (e.g., a neutral state; sleeping state; selfie state; a time change state; a tick tock state) that corresponds to the first activity state of the computer system (1108).

Displaying the graphical representation of the first character (e.g., 1000, 1040) includes (1106), in accordance with a determination that the computer system (e.g., 600) is in a second activity state (e.g., activity state in FIG. 10A, 10B 10C, 10D, 10E, 10F, 10G, 10H, 10P, or 10Q) (e.g., dimmed (e.g., but unlocked) state; locked state; time-passing state; detecting an input (e.g., tap input) state; time-change state) that is different from the first activity state, displaying the graphical representation of the first character in a second visual state (e.g., a neutral state; sleeping state; selfie state; a time change state; a tick tock state), different from the first visual state, that corresponds to the second activity state of the computer system (1110). Displaying the graphical representation of the first character in a different visual state based on an activity state of the computer system provides visual feedback about the current activity state of the computer system (e.g., without one or more user inputs directed to causing the computer system to indicate the activity state of the computer system). Providing improved visual feedback and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At a second time, after the first time, the computer system (e.g., 600) displays (1112), concurrently in the user interface (e.g., 1001) the indication of time (e.g., 1002) (e.g., the current time; the time set in the systems setting of the computer system) (1114), and a graphical representation of a second character (e.g., 1000, 1040) (e.g., an animated character; an emoji; an animated (e.g., 3D) emoji of an animal-like character; an animated (e.g., 3D) avatar-like emoji; an animated representation of a user of the computer system, the first character, a character different from the first character) (1116). In some embodiments, the second character is the same character as the first character. In some embodiments, the second character is a different character from the first character.

Displaying the graphical representation of the second character (e.g., 1000, 1040) includes (1116), in accordance with a determination that the computer system (e.g., 600) is in the first activity state (e.g., activity state in FIG. 10A, 10B 10C, 10D, 10E, 10F, 10G, 10H, 10P, or 10Q) (e.g., dimmed (e.g., but unlocked) state; locked state; time-passing state; detecting an input (e.g., tap input) state; time-change state), displaying the graphical representation of the second character in the first visual state (e.g., a neutral state; sleeping state; selfie state; a time change state; a tick tock state) that corresponds to the first activity state of the computer system (1118).

Displaying the graphical representation of the second character (e.g., 1000, 1040) includes (1116), in accordance with a determination that the computer system (e.g., 600) is in the second activity state (e.g., activity state in FIG. 10A, 10B 10C, 10D, 10E, 10F, 10G, 10H, 10P, or 10Q) (e.g., dimmed (e.g., but unlocked) state; locked state; time-passing state; detecting an input (e.g., tap input) state; time-change state) that is different from the first activity state (e.g., activity state in FIG. 10A, 10B 10C, 10D, 10E, 10F, 10G, 10H, 10P, or 10Q), displaying the graphical representation of the second character (e.g., 1000, 1040) in the second visual state (e.g., a neutral state; sleeping state; selfie state; a time change state; a tick tock state), different from the first visual state, that corresponds to the second activity state of the computer system (1120). Displaying the graphical representation of the second character in a different visual state based on an activity state of the computer system provides visual feedback about the current activity state (e.g., or a change in activity state) of the computer system (e.g., without one or more user inputs directed to causing the computer system to indicate the activity state or a change in activity state of the computer system). Providing improved visual feedback and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) concurrently displays or causes display of, in the user interface (e.g., 1001) (e.g., overlaid on the graphical representation of the first character and/or the graphical representation of the second character), one or more watch complications (e.g., 1005A, 1005B). In some embodiments, the one or more watch complications include a complication indicating a current date. In some embodiments, the one or more watch complications include a complication that includes text information (e.g., about the weather; about a calendar meeting). In some embodiments, the user interface also includes an editing tab (e.g., to access an editing page) for editing the one or more watch complications (e.g., changing one or more of the watch complications to a different type).

In some embodiments, at the second time (e.g., or immediately prior to the second time), the computer system (e.g., 600) detects (e.g., determines) (1122) a change in activity state of the computer system from the first activity state (e.g., activity state in FIG. 10A, 10B 10C, 10D, 10E, 10F, 10G, 10H, 10P, or 10Q) to the second activity state (e.g., activity state in FIG. 10A, 10B 10C, 10D, 10E, 10F, 10G, 10H, 10P, or 10Q) (e.g., a change in a display setting (e.g., getting dimmer; getting brighter) of the computer system; a change in a security state (e.g., device being locked or unlocked) of the computer system; a change in the current time (e.g., a change in the hour of the current time, a change in the minute of the current time, a change in the second of the current time); a change in a state of the computer system due to a detected user input and the computer system displaying (or causing display of)/providing a response to the user input and/or performing an operation due to the user input).

In some embodiments, displaying the graphical representation of the second character (e.g., 1000, 1040) in the second visual state includes displaying the graphical representation of the second character in the second visual state in response to detecting (e.g., determining) the change in activity state of the computer system from the first activity state (e.g., activity state in FIG. 10A, 10B 10C, 10D, 10E, 10F, 10G, 10H, 10P, or 10Q) to the second activity state (e.g., activity state in FIG. 10A, 10B 10C, 10D, 10E, 10F, 10G, 10H, 10P, or 10Q). In some embodiments, the second character is the same character as the first character (e.g., 1000, 1040). In some embodiments, the second character is a different character from the first character. Displaying the graphical representation of the second character in the second visual state in response to detecting (e.g., determining) the change in activity state of the computer system from the first activity state to the second activity state provides visual feedback about the change in activity state of the computer system (e.g., without one or more user inputs directed to causing the computer system to indicate the change in activity state of the computer system). Providing improved visual feedback and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first character is the same character as the second character (1124). In some embodiments, the first character is a different character from the second character (1126). In some embodiments, the first visual state or the second visual state is a static (e.g., not moving; not animated; not dynamic) visual state (1128). In some embodiments, the first visual state or the second visual state is an animated (e.g., moving; dynamic) visual state (1130).

In some embodiments, the first activity state (e.g., activity state in FIG. 10A, 10B 10C, 10D, 10E, 10F, 10G, 10H, 10P, or 10Q) corresponds to a state in which the user interface (e.g., 1001) is displayed at a lower brightness level than a designated brightness level (e.g., as compared to a standard brightens level, a brightness level of an active state), and the first visual state corresponds to a neutral body expression (e.g., a neutral state; a state or animation of the respective character (e.g., the first character and/or the second character) that reflects a neutral stance/image or motion). Displaying the representation of a character with the first visual state corresponding to the neutral body expression when/if first activity state corresponds to a state in which the user interface is displayed at a lower brightness level than a designated brightness level provides visual feedback that the current activity state of the computer system corresponds to the state in which the user interface is displayed at a lower brightness level than a designated brightness level (e.g., without one or more user inputs directed to causing the computer system to indicate the current activity state). Providing improved visual feedback and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first activity state (e.g., activity state of 1000 in FIG. 10A) corresponds to a locked state (e.g., where authentication (e.g., biometric authentication; passcode authentication) is required to unlock the computer system (e.g., 600)), and the first visual state includes a visual appearance that the first character (e.g., 1000, 1040) is asleep (e.g., a sleeping state; a state or motion of the respective character (e.g., the first character and/or the second character) that reflects a sleeping stance/image or motion). Displaying the representation of a character with the first visual state including the visual appearance that the first character is asleep when/if first activity state corresponds to a locked state provides visual feedback that the current activity state of the computer system corresponds to the locked state (e.g., without one or more user inputs directed to causing the computer system to indicate the current activity state). Providing improved visual feedback and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first activity state (e.g., activity state in FIG. 10C or 10D) corresponds to a state in which the indication of time (e.g., the current time; the time set in the systems setting of the computer system) is being displayed (e.g., the passing time is being displayed). In some embodiments, the first visual state corresponds to a respective motion (e.g., animation) repeating at a regular frequency time indication state (e.g., a state or motion of the respective character (e.g., the first character and/or the second character) indicating that time is passing or that time is ticking by (e.g., a tick tock state; a tick tock animation)), wherein the respective motion corresponds to a nodding motion by the first character (e.g., a back-and-forth motion of a head of the first character representing the nodding motion). Displaying the representation of a character corresponding to a respective motion (e.g., animation) repeating at a regular frequency time indication state, where the respective motion corresponds to a nodding motion by the first character, when/if first activity state corresponds to a state in which the indication of time is being displayed provides visual feedback that the current activity state of the computer system corresponds to the state in which the indication of time is being displayed (e.g., without one or more user inputs directed to causing the computer system to indicate the current activity state). Providing improved visual feedback and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the graphical representation of the first character (e.g., 1000, 1040) (e.g., and/or the second character) in the time indication state includes displaying the first character looking at the indication of time at a predetermined time interval (e.g., every 10 seconds; every 15 seconds; every 30 seconds; every minute; every 5 minutes).

In some embodiments, in accordance with a determination that the first character (e.g., 1000, 1040) corresponds to a first version (e.g., a first variant) of a first character type (e.g., an animated (e.g., 3D) emoji of an animal-like character; an animated (e.g., 3D) avatar-like emoji), the displayed glancing animation corresponds to a first type of glancing animation. In some embodiments, in accordance with a determination that the first character corresponds to a second version (e.g., a second variant) of the first character type (e.g., an animated (e.g., 3D) emoji of an animal-like character; an animated (e.g., 3D) avatar-like emoji) different from the first version, the displayed glancing animation corresponds to a second type of glancing animation (e.g., glancing in a different direction; glancing in a different manner) different from the first type of glancing animation.

In some embodiments, the first activity state (e.g., activity state in FIG. 10E) corresponds to detecting a touch (e.g., tap) input (e.g., a tap input detected via a touch-sensitive surface integrated with the display generation component), and the first visual state corresponds to a first type of motion state (e.g., static or dynamic) that is indicative of a posing gesture (e.g., posing for a selfie) (e.g., a selfie pose; a pose or motion of the respective character (e.g., the first character and/or the second character) that reflects a pose or motion of taking a selfie). Displaying the representation of a character corresponding to a first type of motion state (e.g., static or dynamic) that is indicative of a posing gesture when/if first activity state corresponds to detecting a touch (e.g., tap) input provides visual feedback that the current activity state of the computer system corresponds to detecting the touch (e.g., tap) input (e.g., without one or more user inputs directed to causing the computer system to indicate the current activity state). Providing improved visual feedback and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first activity state (e.g., activity state in FIG. 10F) corresponds to detecting that there has been a change in time (e.g., a certain time has been reached (e.g., the hour has changed; a quarter past the hour has been reached; half past the hour has been reached)), and the first visual state corresponds to a second type of motion state (e.g., static or dynamic) that is indicative of the change in time (e.g., a time change pose; a pose or motion of the respective character (e.g., the first character and/or the second character) that reflects a pose or motion indicating or acknowledging that the time has changed). Displaying the representation of a character corresponding to a second type of motion state (e.g., static or dynamic) that is indicative of the change in time when/if first activity state corresponds to the computer system detecting that there has been a change in time provides visual feedback that the current activity state of the computer system corresponds to the computer system detecting that there has been a change in time (e.g., without one or more user inputs directed to causing the computer system to indicate the current activity state). Providing improved visual feedback and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at the first time (e.g., and prior to the first time), displaying the user interface (e.g., 1001) includes displaying, in the user interface, the graphical representation of the first character (e.g., 1000, 1040). In some embodiments, at the second time after the first time (e.g., and prior to the second time but after the first time), displaying the user interface includes displaying, in the user interface, a transition (e.g., a gradual transition; a smooth transition) from the graphical representation of the first character to the graphical representation of the second character, wherein the second character is different from the first character. In some embodiments, at a third time after the second time (e.g., and prior to the third time but after the second time), displaying the user interface includes displaying, in the user interface, a graphical representation of a third character, wherein the third character is different from the first character and from the second character.

In some embodiments, the computer system (e.g., 600) displays, via the display generation component (e.g., 602), a second user interface that includes a plurality of selectable characters (e.g., 1016A) (e.g., including a plurality of animated (e.g., 3D) emojis of animal-like characters; a plurality of animated (e.g., 3D) avatar-like emojis). In some embodiments, the plurality of selectable characters are displayed in a first tab or first screen of the second user interface. Displaying the second user interface that includes the plurality of selectable characters enables a user to manage the characters that are displayed in the user interface with the indication of time and thus easily customize the user interface, thereby enhancing the operability of the device and making the user-device interface more efficient (e.g., by helping the user to provide proper inputs when operating/interacting with the device to customize the user interface) which, additionally, reduces power usage and improves battery life of the device by enabling the user to use the device more quickly and efficiently. In some embodiments, while displaying the second user interface, the computer system (e.g., 600) detects (e.g., via one or more input devices of the computer system, such as a touch-sensitive surface integrated with the display generation component) a selection of a third character of the plurality of selectable characters. In some embodiments, in accordance with (e.g., or in response to) detecting the selection of the third character, the computer system displays, via the display device, the user interface, wherein the user interface concurrently includes the indication of time (e.g., the current time; the time set in the systems setting of the computer system), and a graphical representation of the third character (e.g., different from the first character and from the second character).

In some embodiments, the computer system (e.g., 600) displays, via the display generation component (e.g., 602), a third user interface (e.g., 1016A) (e.g., the second user interface) that includes a graphical representation of a set of characters that includes two or more characters. In some embodiments, while displaying the third user interface, the computer system detects (e.g., via one or more input devices that is in communication with the computer system, such as a touch-sensitive surface integrated with the display generation component) an input corresponding to selection of the set of characters. In some embodiments, in accordance with (e.g., or in response to) detecting the selection of the set of characters, the computer system concurrently displays, in the user interface, the indication of time (e.g., the current time; the time set in the systems setting of the computer system), and a graphical representation of a respective character from the set of characters, wherein the respective character changes among the set of characters over time (e.g., one character from the subset of characters is (e.g., randomly) selected for display at a time).

In some embodiments, the representation of the first character (e.g., 1000, 1040) corresponds to a graphical representation of (e.g., an animation based on; a graphical representations that animates features of) a user associated (e.g., based on an account to which the computer system is logged into) with the computer system (e.g., 600) (e.g., an animated (e.g., 3D) avatar-like representation of the user of the computer system).

In some embodiments, the computer system (e.g., 600) displays, via the display generation component (e.g., 602), a fourth user interface (e.g., that includes a representation of a selected character (e.g., a selected animated (e.g., 3D) emoji of an animal-like character; a selected animated (e.g., 3D) avatar-like emoji). In some embodiments, the representation of the selected character is displayed in a second tab or second screen of the second user interface. In some embodiments, the second tab or second screen of the second user interface enables a user to customize (e.g., change a color of; change a background color of) the representation of the selected character and/or a background associated with the representation of the selected character.

In some embodiments, while displaying the representation of the selected character (e.g., 1000, 1040), detecting (e.g., via one or more input devices that is in communication with the computer system, such as a touch-sensitive surface integrated with the display generation component) an input (e.g., a rotational input on rotatable input device 603 in FIG. 10K; a scrolling input on a touch-sensitive surface integrated with the display generation component) directed to changing a visual characteristic (e.g., a background color; a background color theme).

In some embodiments, in response to detecting the input directed to changing the visual characteristic, the computer system (e.g., 600) changes (e.g., by transitioning through a plurality of selectable visual characteristics (e.g., selectable colors)) the visual characteristic (e.g., a color; a background color) from a first visual characteristic (e.g., a first color; a first background color) to a second visual characteristic (e.g., a second color; a second background color) different from the first visual characteristic.

In some embodiments, the computer system (e.g., 600) displays or causes display of, in the second user interface (e.g., 1016B; a second tab or second screen of the second user interface), a user interface element (e.g., 1048; a rotatable user interface element; a color wheel) for changing the visual characteristic (e.g., a color; a background color). In some embodiments, in response to (e.g., and while)

detecting the input directed to changing the visual characteristic, the computer system displays or causes display of a change in the selected visual characteristic via the user interface element for changing the visual characteristic (e.g., transition and/or rotating through selectable colors in the color wheel while the input is being detected). In some embodiments, the input directed to changing the visual characteristic is a rotational input (e.g., detected/received via a rotatable input device that is in communication with the computer system), and change in the selected visual characteristic includes scrolling/navigating through a plurality of different colors (e.g., scrolling through the color wheel) of the user interface element. In some embodiments, the computer system scrolls/navigates the user interface element (e.g., the color wheel) in a first direction in accordance with a determination that the rotational input is in a first direction (e.g., clockwise direction) and scrolls/navigates the user interface element (e.g., the color wheel) in a first direction in accordance with a determination that the rotational input is in a second direction (e.g., counter-clockwise direction).

The computer system (e.g., 600), at the second time (e.g., or immediately prior to the second time), detects (1132) (e.g., determines) a change in activity state of the computer system (e.g., 600) from the first activity state to the second activity state (e.g., a lower power consumption mode) (e.g., a change in a display setting (e.g., getting dimmer; getting brighter) of the computer system; a change in a security state (e.g., device being locked or unlocked) of the computer system; a change in a state of the computer system due to a detected user input and the computer system displaying (or causing display of)/providing a response to the user input and/or performing an operation due to the user input).

The computer system (e.g., 600), in response to detecting (1134) the change in activity state of the computer system (e.g., 600) from the first activity state to the second activity state, displays (1136), in the user interface (e.g., 1001), the graphical representation (e.g., 1052, 1088) of the second character (e.g., a transition animation causes the graphical representation of the first character to begin to fade, dissolve, and/or reduce in size and the graphical representation of the second character begin to be displayed at the same size as the first character) (e.g., the graphical representation of the second character is in the second visual state, such as a neutral state, a static state, and/or a sleeping state); and ceases (1138) to display, in the user interface (e.g., 1001), the graphical representation (e.g., 1050, 1086) of the first character, wherein the second character is different from the first character (e.g., the first character and the second character are different characters and are from a predetermined collection and/or set of characters).

In some embodiments, the computer system (e.g., 600) maintains display of the graphical representation (e.g., 1052, 1088) of the second character in response to detecting a change in activity state of the computer system (e.g., 600) from the second activity state to the first activity state. In some embodiments, the computer system (e.g., 600) transitions between the graphical representation (e.g., 1050, 1086) of the first character and the graphical representation (e.g., 1052, 1088) of the second character in response to detecting a change in the activity state from a lower power consumption mode to a higher power consumption mode, and maintains display of the currently displayed graphical representation (e.g., 1050, 1086) of the first character or the graphical representation (e.g., 1052, 1088) of the second character in response to detecting the transition from the higher power consumption mode to the lower power consumption mode.

Displaying the graphical representation of the second character and ceasing to display the graphical representation of the first character in response to detecting the change in activity state from the first activity state to the second activity state provides improved visual feedback about the current activity state of the computer system. Providing improved visual feedback improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 600), at a third time (e.g., after the second time and/or immediately prior to the third time), detects (1142) a change in activity state of the computer system (e.g., 600) from the second activity state to the first activity state; and in response to detecting the change in activity state of the computer system (e.g., 600) from the second activity state to the first activity state, maintains (1144) display, in the user interface (e.g., 1001), of the graphical representation (e.g., 1052, 1088) of the second character, wherein the graphical representation (e.g., 1052, 1088) of the second character includes an animated visual state (e.g., maintaining display of the graphical representation of the second character, but changing a visual state of the graphical representation of the second character in response to detecting the change in activity state from the second activity state to the first activity state).

Displaying the graphical representation of the second character in an animated visual state in response to detecting the change in activity state from the second activity state to the first activity state provides improved visual feedback about the current activity state of the computer system. Providing improved visual feedback improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 600), at a fourth time (e.g., after the third time and/or immediately prior to the fourth time), after (or while) displaying the second character in the animated visual state, detects (1146) a change in activity state of the computer system (e.g., 600) from the first activity state to the second activity state.

The computer system (e.g., 600), in response to detecting (1148) the change in activity state of the computer system (e.g., 600) from the first activity state to the second activity: displays (1150), in the user interface (e.g., 1001), a graphical representation of a third character, (e.g., a transition animation causes the graphical representation of the second character to begin to fade, dissolve, and/or reduce in size and the graphical representation of the third character begin to be displayed at the same size as the first character) (e.g., the graphical representation of the third character is in the second visual state, such as a neutral state, a static state, and/or a sleeping state); and ceases (1152) to display, in the user interface (e.g., 1001), the graphical representation (e.g., 1052, 1088) of the second character, wherein the third character is different from the first character and the second character (e.g., the first character, the second character, and the third character are different characters and are from a predetermined collection and/or set of characters).

Displaying the graphical representation of the third character and ceasing to display the graphical representation of the second character in response to detecting the change in activity state from the first activity state to the second activity state provides improved visual feedback about the current activity state of the computer system. Providing improved visual feedback improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at the first time, displaying, in the user interface (e.g., 1001), the graphical representation (e.g., 1050, 1086) of the first character includes displaying a graphical element (e.g., 1004) surrounding at least a portion of the first character (e.g., displaying the first character overlaid on the graphical element) (e.g., a background having a ring of color and/or multiple rings of color different from a color of user interface (e.g., a black color)) displayed in the user interface (e.g., 1001).

The computer system (e.g., 600), at the second time (e.g., or immediately prior to the second time), detects (1132) (e.g., determining) a change in activity state of the computer system (e.g., 600) from the first activity state to the second activity state (e.g., a lower power consumption mode) (e.g., a change in a display setting (e.g., getting dimmer; getting brighter) of the computer system; a change in a security state (e.g., device being locked or unlocked) of the computer system; a change in a state of the computer system due to a detected user input and the computer system displaying (or causing display of)/providing a response to the user input and/or performing an operation due to the user input).

The computer system (e.g., 600), in response (1134) to detecting the change in activity state of the computer system (e.g., 600) from the first activity state to the second activity state, decreases (1140) a brightness of a portion of the user interface (e.g., 1001) that included the graphical element (e.g., 1004) (e.g., fading the graphical element or displaying the graphical representation of the second character without the graphical element in the user interface) (e.g., a transition animation causes the graphical element to fade to a color that is closer to or the same as the color of a background portion of the user interface (e.g., black) in response to detecting the change in activity state of the computer system from the first activity state to the second activity state).

Decreasing the brightness of the portion of the user interface that included the graphical element in response to detecting the change in activity state from the first activity state to the second activity state provides improved visual feedback about the current activity state of the computer system. Providing improved visual feedback improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 600), while the computer system (e.g., 600) is in the first activity state (e.g., a higher power consumption mode), in response to a determination that a predetermined change in time has occurred (e.g., a minute has changed, an hour has changed, 15-minutes past the hour has been reached, 30-minutes past the hour has been reached; 45-minutes past the hour has been reached), displays (1154) the graphical representation (e.g., 1050, 1086) of the first character in a change-in-time visual state (e.g., time change pose; a pose or motion of the first character that reflects a pose or motion indicating or acknowledging that the time has changed).

The computer system (e.g., 600), while the computer system (e.g., 600) is in the second activity state (e.g., a lower power consumption mode), forgoes (1156) display of the graphical representation (e.g., 1052, 1088) of the second character in the change-in-time visual state when the predetermined change in time has occurred.

Displaying the graphical representation of the first character in the change-in-time visual state while the computer system is in the first activity state and forgoing display of the graphical representation of the second character in the change-in-state visual state while the computer system is in the second activity state provides improved visual feedback about the current activity state of the computer system. Providing improved visual feedback improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 600) detects (1158) a change in time (e.g., a minute has changed, an hour has changed, 15-minutes past the hour has been reached, 30-minutes past the hour has been reached; 45-minutes past the hour has been reached), and in response to detecting (1160) the change in time and in accordance with a determination that the computer system (e.g., 600) is in the first activity state (e.g., a higher power consumption mode), updates (1162) a representation of time (e.g., 1002) and displays the graphical representation (e.g., 1050, 1086) of the first character in a first manner (e.g., a visual state that includes animating the graphical representation of the first character in response to detecting the change in time).

The computer system (e.g., 600) detects (1158) a change in time (e.g., a minute has changed, an hour has changed, 15-minutes past the hour has been reached, 30-minutes past the hour has been reached; 45-minutes past the hour has been reached), and in response to detecting (1160) the change in time and in accordance with a determination that the computer system (e.g., 600) is in the second activity state (e.g., a lower power consumption mode), updates (1164) the representation of time (e.g., 1002) without displaying the graphical representation (e.g., 1050, 1086) of the first character in the first manner (e.g., displaying the graphical representation of the first character in a second manner (e.g., a static visual state) that is different from the first manner and/or forgoing any change in the graphical representation of the first character in response to detecting the change in time).

Displaying the graphical representation of the first character in the first manner and forgoing display of the graphical representation of the first character in the first manner depending on an activity state of the computer system provides improved visual feedback about the current activity state of the computer system. Providing improved visual feedback improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 600), while displaying the graphical representation (e.g., e.g., 1050, 1052, 1086, 1088) of the first character, detects (1166) an input (e.g., 1054)

directed to one or more input devices of the computer system (e.g., 600) (e.g., a touch input while the computer system is in the higher power consumption mode, or a digital crown rotation input while the computer system is in the higher power consumption mode); and in response to detecting the input (e.g., 1054), displays (1170) the graphical representation (e.g., e.g., 1050, 1052, 1086, 1088) of the first character in a third visual state that includes enlarging the graphical representation of the first character (e.g., increasing a size of the first character with respect to the user interface and/or the display generation component) such that a portion of the graphical representation of the first character ceases to be displayed in the user interface (e.g., 1001) (e.g., the first character increases and size and/or moves to cause a portion of the first character to appear to move off of the display generation component, such that the portion of the first character ceases to be displayed via the display generation component for a predetermined period of time).

Displaying the graphical representation of the first character in the third visual state provides improved visual feedback about the current activity state of the computer system. Providing improved visual feedback improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 600), while displaying the graphical representation (e.g., e.g., 1050, 1052, 1086, 1088) of the first character, detects (1172) a first input (e.g., 1054) directed to one or more input devices of the computer system (e.g., 600) (e.g., a touch input while the computer system is in the higher power consumption mode, or a digital crown rotation input while the computer system is in the higher power consumption mode).

The computer system (e.g., 600), in response to detecting the first input (e.g., 1054), displays (1174) the graphical representation (e.g., e.g., 1050, 1052, 1086, 1088) of the first character in a first animated visual state for a predetermined period of time (e.g., causing an animation of the graphical representation of the first character that lasts for a certain period of time, such as 1 second, 2 seconds, 3 seconds, 4 seconds, or 5 seconds).

The computer system (e.g., 600), after detecting the first input (e.g., 1054), detects (1176) a second input (e.g., 1056) directed to one or more input devices of the computer system (e.g., 600) (e.g., a touch input while computer system is in the higher power consumption mode, or a digital crown rotation input while the computer system is in the higher power consumption mode).

The computer system (e.g., 600), in response to detecting (1178) the second input (e.g., 1056) and in accordance with a determination that the predetermined period of time has ended (e.g., the animation caused by the first input has ended and the graphical representation of the first character is displayed in a default position), displays (1180) the graphical representation (e.g., e.g., 1050, 1052, 1086, 1088) of the first character in a second animated visual state (e.g., causing an animation of the graphical representation of the first character), wherein the second animated visual state includes movement of the graphical representation (e.g., e.g., 1050, 1052, 1086, 1088) of the first character starting from a first position (e.g., a default position of the graphical representation of the first character that is displayed when no user input is detected that causes an animation of the graphical representation of the first character).

The computer system (e.g., 600), in response to detecting (1178) the second input (e.g., 1056) and in accordance with a determination that the predetermined period of time has not ended (e.g., the animation caused by the first input is still occurring, such that the graphical representation of the first character is not in the default position), displays (1182) the graphical representation (e.g., e.g., 1050, 1052, 1086, 1088) of the first character in a third animated visual state (e.g., causing an animation of the graphical representation of the first character) (e.g., the second animated visual state where the graphical representation of the first character starts from a different position), wherein the third animated visual state includes movement of the graphical representation (e.g., 1050, 1052, 1086, 1088) of the first character starting from a second position (e.g., a position of the graphical representation of the first character that is not the default position and/or a position of the graphical representation of the first character that is along a predetermined path of movement of the first animated visual state), different from the first position.

Displaying the graphical representation of the first character in the second animated visual state or the third animal visual state depending on whether the predetermined time period has ended provides improved visual feedback about the current activity state of the computer system. Providing improved visual feedback improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 600) displays (1184), via the display generation component (e.g., 602), a fifth user interface (e.g., 1064) (e.g., the second user interface and/or the third user interface) for selecting between a first set of characters (e.g., 1060) that includes a plurality of user-customizable virtual avatars (e.g., a plurality of avatar-like emojis) and a graphical representation (e.g., 1076) of a second set of characters (e.g., a plurality of emojis of animal-like characters) that includes two or more predetermined characters that are not available in the first set of characters.

The computer system (e.g., 600), while displaying the third user interface (e.g., 1064), detects (1186) (e.g., via one or more input devices that is in communication with the computer system, such as a touch-sensitive surface integrated with the display generation component) an input (e.g., 1084) corresponding to selection of the first set of characters (e.g., 1060) or the second set of characters (e.g., 1076), and, in accordance with (e.g., or in response to) a determination that the input corresponds to selection of the first set of characters (e.g., 1060), the computer system (e.g., 600) concurrently displays (1188), in the user interface (e.g., 1001): the indication of time (e.g., 1002) (1190) (e.g., the current time; the time set in the systems setting of the computer system), and a graphical representation (e.g., 1050, 1052) (1192) of a currently selected character from the first set of characters (e.g., 1060), wherein the currently selected character is automatically changed between different characters in the first set of characters (e.g., 1060) when predetermined criteria are met (e.g., one character from the subset of characters is (e.g., randomly) selected for display over time, in response to detecting a change in activity state of the computer system, and/or in response to detecting a user gesture, such as a wrist raise and/or a tap gesture).

The computer system (e.g., 600), while displaying the third user interface (e.g., 1064), detects (1186) (e.g., via one or more input devices that is in communication with the computer system, such as a touch-sensitive surface integrated with the display generation component) an input (e.g., 1084) corresponding to selection of the first set of characters (e.g., 1060) or the second set of characters (e.g., 1076), and, in accordance with (e.g., or in response to) a determination that the input (e.g., 1084) corresponds to selection of the second set of characters (e.g., 1076), concurrently displays (1194), in the user interface (e.g., 1001): the indication of time (e.g., 1002) (1196) (e.g., the current time; the time set in the systems setting of the computer system), and a graphical representation (e.g., 1086, 1088) (1198) of a currently selected character from the second set of characters (e.g., 1076), wherein the currently selected character is automatically changed between different characters in the second set of characters (e.g., 1076) when the predetermined criteria are met (e.g., one character from the subset of characters is (e.g., randomly) selected for display over time, in response to detecting a change in activity state of the computer system, and/or in response to detecting a user gesture, such as a wrist raise and/or a tap gesture).

Displaying the fifth user interface for selecting between the first set of characters and the second set of characters enables a user to easily customize the watch face user interface, thereby enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1100 (e.g., FIGS. 11A-11H) are also applicable in an analogous manner to the methods described above and below. For example, method 700 optionally includes one or more of the characteristics of the various methods described above with reference to method 1100. For example, a device can use as a watch user interface either a watch user interface as described with reference to FIGS. 6A-6H or a user interface that includes an indication of time and a graphical representation of a character as described with reference to FIGS. 10A-10AC. For another example, method 900 optionally includes one or more of the characteristics of the various methods described above with reference to method 1100. For example, a device can use as a watch user interface either a watch user interface as described with reference to FIGS. 8A-8M or a user interface that includes an indication of time and a graphical representation of a character as described with reference to FIGS. 10A-10AC. For another example, method 1300 optionally includes one or more of the characteristics of the various methods described above with reference to method 1100. For example, a device can use as a watch user interface either a time user interface as described with reference to FIGS. 12A-12G or a user interface that includes an indication of time and a graphical representation of a character as described with reference to FIGS. 10A-10AC. For another example, method 1500 optionally includes one or more of the characteristics of the various methods described above with reference to method 1100. For example, a device can use as a watch user interface either a user interface that includes a background as described with reference to FIGS. 14A-14AD or a user interface that includes an indication of time and a graphical representation of a character as described with reference to FIGS. 10A-10AC. For another example, method 1700 optionally includes one or more of the characteristics of the various methods described above with reference to method 1100. For example, one or more characteristics or features of a user interface that includes an indication of time and a graphical representation of a character as described with reference to FIGS. 10A-10AC can be edited via the process for editing characteristics or features of a watch user interface as described with reference to FIGS. 16A-16AE. For brevity, these details are not repeated below.

FIGS. 12A-12G illustrate exemplary user interfaces for enabling and displaying an indication of a current time, in accordance with some embodiments. The user interfaces in these figures are used to illustrate the processes described below, including the processes in FIGS. 13A-13C.

Figure 12A:
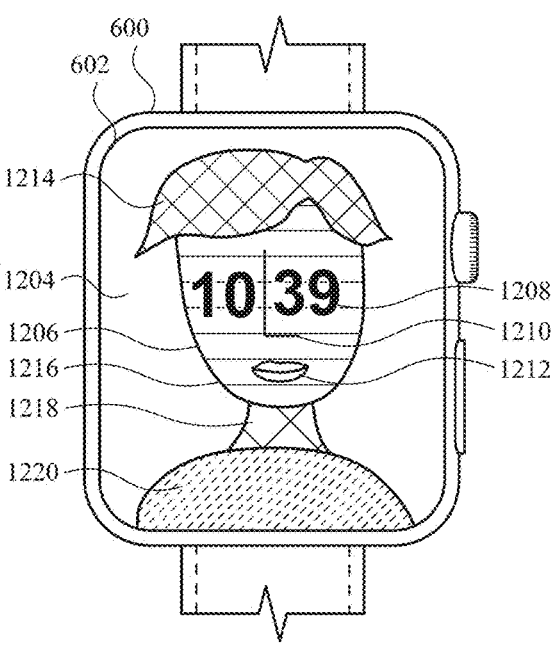

FIG. 12A illustrates device 600 displaying, via display 602, a time user interface 1204 (e.g., a watch user interface that includes an indication of a current time) that includes a face 1206 (e.g., a representation of a human face or a representation of an anthropomorphic face of a non-human character). As shown in FIG. 12A, face 1206 comprises a plurality of facial features, including a first facial feature 1208 (e.g., representing/indicative of the eyes; also referred to as eyes 1208), a second facial feature 1210 (e.g., also referred to as nose 1210), a third facial feature 1212 (e.g., also referred to as mouth 1212 (e.g., lips)), a fourth facial feature 1214 (e.g., also referred to as hair 1214), a fifth facial feature 1216 (e.g., also referred to as facial outline 1216 (e.g., including checks and/or jawline)), a sixth facial feature 1218 (e.g., also referred to as neck 1218), and a seventh facial feature 1220 (e.g., also referred to as shoulders 1220).

In FIG. 12A, eyes 1208 indicate a current time (e.g., the current time; the time set in the systems setting of device 600), where the shape of the eyes corresponds to the current time (e.g., the right eye is represented via a number or numbers that indicate the current hour, and the left eye is represented via numbers that indicate the current minute). As described in greater detail below, an animation (e.g., blinking motion) can be applied to eyes 1208 and/or a change in visual characteristic (e.g., change in color; change in font; change in style) can be applied to eyes 1208.

In FIG. 12A, eyes 1208, nose 1210, mouth 1212, hair 1214, facial outline 1216, neck 1218, and shoulders 1220, respectively, have a corresponding visual characteristic (e.g., a respective color (e.g., a respective line color or a respective fill color); a respective shape; a respective position). In some embodiments, one or more of the facial features 1208-1220 have the same corresponding visual characteristic (e.g., the same line or fill colors). For example, nose 1210 and mouth 1212 can have the same visual characteristic (e.g., the same color (e.g., the same line color or the same fill color)), while eyes 1208, hair 1214, facial outline 1216, neck 1218, and shoulders 1220 can have different visual characteristics (e.g., different colors (e.g., different line colors and/or different fill colors)). For another example, eyes 1208, mouth 1212, facial outline 1216, and shoulders 1220 can have the same visual characteristic (e.g., the same color (e.g., the same line color or the same fill color)) while nose 1210, hair 1214, neck 1218 can have different visual characteristics (e.g., different colors (e.g., different line colors and/or different fill colors)).

In some embodiments, a respective visual characteristic for a respective facial feature corresponds to a type of color. In some embodiments, the type of color is programmatically selected (e.g., determined), without user input, from a plurality of available colors by device 600. In some embodiments, an application process selects (e.g., programmatically determines) the color based on a color of device 600 (e.g., a color of a housing or case of device 600). In some embodiments, the application process selects the color based on usage history of a user of device 600 (e.g., based on a previous user-selected color or color scheme).

While displaying time user interface 1204 including face 1206, device 600 detects (e.g., determines) the satisfaction of a predetermined criteria for changing an appearance of time user interface 1204 (e.g., a change in the current time; a change in a state of device 600 due to a detected user input (e.g., a tap on display 602); detecting a movement of device 600 (e.g., caused by a user movement, such as a wrist-raise movement); a change in state or a change in mode of device 600 (e.g., transitioning to a sleep mode or sleeping state; transitioning from a locked state to an unlocked state)).

Figure 12B:
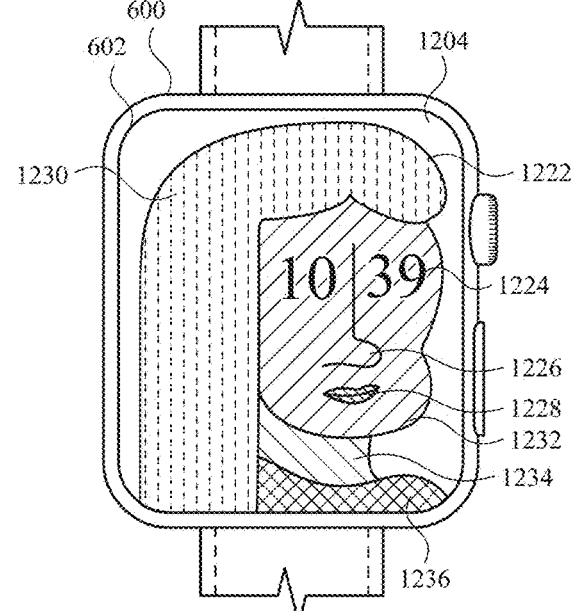

In some embodiments, in response to detecting the satisfaction of the predetermined criteria for changing an appearance of time user interface 1204, device 600 ceases display of face 1206 of FIG. 12A and displays a different type of face (e.g., a face where respective visual characteristics of all facial features have been changed), for example a face 1222 in FIG. 12B.

FIG. 12B illustrates device 600 displaying, via display 602, time user interface 1204 that includes (e.g., a representation of) face 1222 that is different from face 1206. As with face 1206, face 1222 comprises a plurality of facial features, including a first facial feature 1224 (e.g., eyes indicating the current time; also referred to as eyes 1224), a second facial feature 1226 (e.g., also referred to as nose 1226), a third facial feature 1228 (e.g., also referred to as mouth 1228 (e.g., lips)), a fourth facial feature 1230 (e.g., also referred to as hair 1230), a fifth facial feature 1232 (e.g., also referred to as facial outline 1232 (e.g., including checks and/or jawline)), a sixth facial feature 1234 (e.g., also referred to as neck 1234), and a seventh facial feature 1236 (e.g., also referred to as shoulders 1236).

In FIG. 12B, as with eyes 1208 of face 1206, eyes 1224 indicates a current time, where the shape of the eyes corresponds to the current time. In FIG. 12B, facial features 1224-1236 of face 1222 have respective visual characteristics (e.g., a respective color (e.g., line color or fill color); a respective shape; a respective position).

In some embodiments, ceasing display of face 1206 as in FIG. 12A and displaying face 1222 as in FIG. 12B includes displaying a gradual transition from face 1206 to face 1222 that includes transitioning a respective facial feature of face 1206 from having the corresponding visual characteristic, as in FIG. 12A, through a plurality of intermediate (e.g., temporary) states to a final state in which a corresponding respective facial feature of face 1222 has the corresponding visual characteristic, as in FIG. 12B, where the corresponding visual characteristic of a respective facial feature in FIG. 12A is different from the corresponding visual characteristic of the counterpart respective facial feature in FIG. 12B (e.g., hair 1214 of face 1206 has a different fill color and/or shape than hair 1230 of face 1222).

Figure 12C:
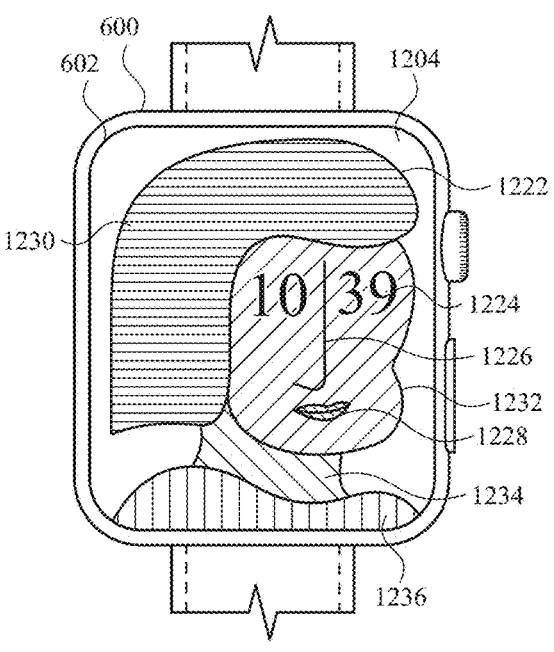

FIG. 12C illustrates device 600 displaying, via display 602, time user interface 1204 that includes face 1222, where face 1222 in FIG. 12C is different from face 1222 in FIG. 12B (e.g., a different version of the same face). In some embodiments, changing the appearance of time user interface 1204 includes changing a subset of the facial features of the displayed face without changing all of the facial features of the displayed face.

While displaying face 1222 as in FIG. 12B, device 600 detects (e.g., determines) the satisfaction of a predetermined criteria for changing an appearance of the time user interface. In some embodiments, in response to detecting the satisfaction of the predetermined criteria for changing an appearance of time user interface 1204, device 600 changes the appearance of time user interface 1204 by ceasing display of face 1222 as in FIG. 12B and displaying face 1222 as in FIG. 12C. In FIG. 12C, the predetermined criteria for changing the appearance of time user interface 1204 (e.g., as shown in the transition of time user interface 1204 from face 1206 in FIG. 12A to face 1222 in FIG. 12B and the transition of time user interface 1204 from face 1222 in FIG. 12B to face 1222 in FIG. 12C) includes a criterion that is satisfied when a predetermined time has elapsed (e.g., every minute; every 15 minutes; every 30 minutes; every hour). In some embodiments, the predetermined criteria for changing the appearance of time user interface 1204 (e.g., changing one or more facial features of the respective face in the time user interface) does not includes the criterion that is satisfied when the predetermined time has elapsed. In some embodiments, device 600 changes the appearance of time user interface 1204 (e.g., changes one or more facial features of the respective face in time user interface 1204) randomly and not based on when the predetermined time has elapsed.

In FIG. 12C, face 1222 includes the same visual characteristics for eyes 1224, mouth 1228, facial outline 1232, and neck 1234 as face 1222 of FIG. 12B. In FIG. 12C, face 1222 includes different visual characteristics for nose 1226, hair 1230, and shoulders 1236 from face 1222 in FIG. 12B (e.g., nose 1226 has a different shape, and hair 1230 has a different fill color in FIG. 12C as compared to FIG. 12B).

In some embodiments, ceasing display of face 1222 as in FIG. 12B and displaying (e.g., transitioning to) face 1222 as in FIG. 12C includes displaying a gradual transition from face 1222 in FIG. 12B to face 1222 in FIG. 12C that includes transitioning nose 1226, hair 1230, and shoulders 1236 from have their respective visual characteristic in FIG. 12B through a plurality of intermediate (e.g., temporary) states to a final state in which nose 1226, hair 1230, and shoulders 1236 have their respective visual characteristic in FIG. 12C.

Figure 12D:
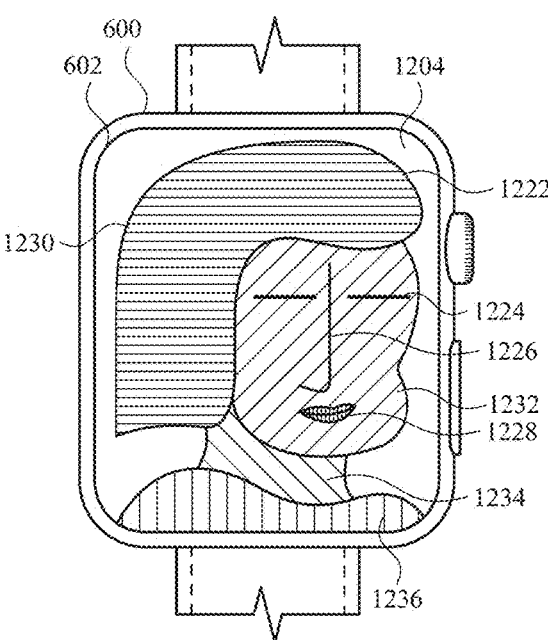

FIG. 12D illustrates device 600 displaying an animation (e.g., a blinking animation) using eyes 1224, while displaying face 1222. In some embodiments, displaying the animation via eyes 1224 includes ceasing display of at least a portion of eyes 1224, as shown in FIG. 12D, for a period of time (e.g., a brief moment; a fraction of a second; 1 second), then re-displaying the portion of eyes 1224 (e.g., as previously shown in FIG. 12C) after the period of time has elapsed. In some embodiments, the animation is a blinking animation of eyes 1224 that includes a temporary/brief movement or change in shape/form of eyes 1224 such that the first facial feature mimics the movement of a human eye blinking. In some embodiments, device 600 periodically displays the animation via eyes 1224 based on time (e.g., every 1 second, every 10 seconds, every 15 seconds, every 30 seconds, every 1 minute; every 5 minutes; every 30 minutes; every hour). In some embodiments, device 600 displays the animation via eyes 1224 non-periodically (e.g., not based on time; not in regular intervals; at random times; not based on a period change in time).

While displaying time user interface 1204 including face 1222 as shown in FIGS. 12C-12D, device 600 detects (e.g., determines) the satisfaction of a second predetermined criteria (e.g., a type of input; a change in activity state of device 600) for changing an appearance of time user interface 1204. In response to detecting the satisfaction of the second predetermined criteria for changing an appearance of time user interface 1204, device 600 ceases display of second face 1222, as shown in FIGS. 12C-12D, and displays face 1222 as shown in FIG. 12E.

In FIG. 12E, device 600 is in a different state (e.g., a reduced-power state) from FIGS. 12A-12D, in which device 600 changes one or more visual features of a displayed user interface while in the different state (e.g., device 600 dims/darkens the background or reverts from using a respective color to fill in a respective element/region of the user interface to using the respective color as an outline color of the respective element/region of the user interface).

In FIG. 12E, eyes 1224 (e.g., still) indicates the current time. In some embodiments, device 600 displays an animation via eyes 1224 (e.g., based on a change in the time or non-periodically).

In FIG. 12E, nose 1226 has a different visual characteristic than in FIGS. 12C-12D, where the different visual characteristic in FIG. 12E is a visually distinguished outline (e.g., borderline) for nose 1226, and the visually distinguished outline has a respective color (e.g., line color) that is based on a respective color used to fill nose 1226 in FIGS. 12C-12D (e.g., device 600 applies the color or tone (or a color similar to the color or tone) of the fill color of nose 1226 in FIGS. 12C-12D to the line color of nose 1226 in FIG. 12E). Similarly, mouth 1228, hair 1230, facial outline 1232, neck 1234, and shoulders 1236, respectively, have different visual characteristics than in FIGS. 12C-12D, where the respective different visual characteristics in FIG. 12E are visually distinguished outlines that have respective colors (e.g., line colors) that are based on (e.g., correspond to) respective colors used to fill (e.g., used as fill colors) mouth 1228, hair 1230, facial outline 1232, neck 1234, and shoulders 1236, respectively, in FIGS. 12C-12D (e.g., device 600 applies the color or tone (or a color similar to the color or tone) of the fill color of mouth 1228, hair 1230, facial outline 1232, neck 1234, and shoulders 1236, respectively, in FIGS. 12C-12D to the line color of mouth 1228, hair 1230, facial outline 1232, neck 1234, and shoulders 1236, respectively, in FIG. 12E).

While displaying face 1222 as in FIGS. 12C-12D, device 600 detects (e.g., determines) the satisfaction of a predetermined criteria for changing an appearance of the time user interface. In some embodiments, in response to detecting the satisfaction of the predetermined criteria for changing an appearance of time user interface 1204, device 600 changes the appearance of time user interface 1204 by ceasing display of face 1222 as in FIGS. 12C-12D and displaying face 1222 as in FIG. 12F. In FIG. 12F, the predetermined criteria for changing the appearance of time user interface 1204 includes a criterion that is satisfied when a predefined movement (e.g., of device 600) has been detected. In some embodiments, device 600 is a wearable device (e.g., a smartwatch), and the predefined movement criteria corresponds to a wrist-raise movement while device 600 is being worn.

In FIG. 12F, face 1222 includes the same visual characteristics for eyes 1224), hair 1230, facial outline 1232, neck 1234, and shoulders 1236 as face 1222 of FIGS. 12C-12D.

In FIG. 12F, face 1222 includes different visual characteristics (e.g., different color and/or different shape) for nose 1226 and mouth 1226 as compared to face 1222 in FIGS. 12C-12D.

While displaying face 1222 as in FIG. 12F, device 600 detects (e.g., determines) the satisfaction of a predetermined criteria for changing an appearance of the time user interface. In some embodiments, in response to detecting the satisfaction of the predetermined criteria for changing an appearance of time user interface 1204, device 600 changes the appearance of time user interface 1204 by ceasing display of face 1222 as in FIG. 12F and displaying face 1222 as in FIG. 12G. In FIG. 12G, the predetermined criteria for changing the appearance of time user interface 1204 includes a criterion that is satisfied when a change in state (e.g., a change in mode from one device state/mode to another device state/mode) of device 600 has been detected (e.g., it is determined that device 600 has undergone a change in state). In some embodiments, the change in state corresponds to device 600 transitioning to a sleep mode or sleeping state. In some embodiments, the sleep mode or sleep state corresponds to a state in which the display generation component is off. In some embodiments, the sleep mode or sleep state corresponds to a state in which device 600 is in a low-power state (e.g., in which display 602 is off). In some embodiments, the change in state corresponds to device 600 transitioning from a locked state to an unlocked state.

In FIG. 12G, face 1222 includes the same visual characteristics for eyes 1224, nose 1226, mouth 1228, hair 1230, neck 1234, and shoulders 1236 as face 1222 of FIG. 12F. In FIG. 12G, face 1222 includes a different visual characteristic for facial outline 1232 from face 1222 in FIG. 12F (e.g., facial outline 1232 has a different fill color in FIG. 12G than in FIG. 12F).

In some embodiments, face 1222 displayed in time user interface 1204 has a primary color scheme (e.g., a predominant color; a most-prevalent color). In some embodiments, the primary color scheme corresponds to the color of the facial outline 1232.

In some embodiments, the color of neck 1234 and/or the color of shoulders 1236 are based on the primary color scheme (e.g., neck 1234 is a slightly lighter shade of the color of facial outline 1232 or neck 1234 is a slightly darker shade of the color of facial outline 1232, as indicated in FIG. 12G). In some embodiments, the color of the second facial feature has a predetermined relationship to the color of facial outline 1232 for a plurality of different types of faces (e.g., face 1206; face 1222) (e.g., the neck is a predetermined amount lighter than the face for a plurality of different types of faces or the neck is a predetermined amount darker than the face for a plurality of different types of faces).

FIGS. 13A-13C are a flow diagram illustrating methods of enabling and displaying a user interface that includes an indication of a current time, in accordance with some embodiments. Method 1300 is performed at a computer system (e.g., 100, 300, 500, 600) (e.g., a smart device, such as a smartphone or a smartwatch; a mobile device) that is in communication with a display generation component. Some operations in method 1300 are, optionally, combined, the orders of some operations are, optionally, changed, and some operations are, optionally, omitted.

As described below, method 1300 provides an intuitive way for managing user interfaces related to time. The method reduces the cognitive burden on a user for managing user interfaces related to time, thereby creating a more efficient human-machine interface. For battery-operated computing devices, enabling a user to manage user interfaces related to time faster and more efficiently conserves power and increases the time between battery charges.

The computer system (e.g., 600) displays (1302), via the display generation component (e.g., 602), a time user interface (e.g., 1204) (e.g., a watch user interface that includes an indication of a current time) that includes a representation of a first face (e.g., 1206 or 1222) (e.g., a representation of a human face or a representation of an anthropomorphic face of a non-human character) having a first facial feature (e.g., 1208, 1224) (e.g., eyes) and a second facial feature (e.g., 1210, 1212, 1214, 1216, 1218, 1220, 1226, 1228, 1230, 1232, 1234, or 1236) (e.g., nose; mouth; hair; facial shape; neck; shoulders), wherein the first facial feature of the first face indicates a current time (e.g., the current time; the time set in the systems setting of the computer system) (1304), and the second facial feature of the first face has a first visual characteristic (e.g., a first color (e.g., a first line color or a first fill color); a first shape; a first position) (1306). Displaying the time user interface that includes the representation of the first face having the first facial feature and the second facial feature, where the first facial feature of the first face indicates a current time and the second facial feature of the first face has a first visual characteristic provides information about the current time while providing a user interface with features that do not relate to time, thereby enhancing the operability of the device and making the user-device interface more efficient (e.g., by including time information in an animated user interface) which, additionally, reduces power usage and improves battery life of the device by enabling the user to use the device more quickly and efficiently.

While displaying the representation of the first face (e.g., 1206 or 1222) (1308), the computer system (e.g., 600) detects (e.g., determining) (1310) the satisfaction of a predetermined criteria for changing an appearance of the time user interface (e.g., 1204) (e.g., a change in the current time (e.g., a change in the hour of the current time, a change in the minute of the current time, a change in the second of the current time); a change in a state of the computer system due to a detected user input (e.g., a tap input on the display generation component) and the computer system displaying (or causing display of)/providing a response to the user input and/or performing an operation due to the user input; detecting a movement of the computer system (e.g., caused by a user movement, such as a wrist-raise movement); a change in state or a change in mode of the computer system (e.g., transitioning to a sleep mode or sleeping state; transitioning from a locked state to an unlocked state).

In response to detecting the satisfaction of the predetermined criteria for changing an appearance of the time user interface (e.g., 1204) (1318), the computer system (e.g., 600) ceases (1320) to display the representation of the first face (e.g., 1206 or 1222) and displays (1322) a representation of a second face (e.g., 1206, 1222) having a first facial feature (e.g., 1208 or 1224) (e.g., eyes) and a second facial feature (e.g., 1210, 1212, 1214, 1216, 1218, 1220, 1226, 1228, 1230, 1232, 1234, or 1236) (e.g., nose; mouth; hair; facial shape; neck; shoulders), wherein the representation of the second face is different from the representation of the first face (1324), the first facial feature of the second face indicates a current time (1326), and the second facial feature of the second face has a second visual characteristic (e.g., a second color (e.g., a second line color or a second fill color); a second shape) different from the first visual characteristic (1328), and ceasing display of the representation of the first face and displaying the representation of the second face includes displaying a gradual transition from the first face to the second face that includes transitioning the second facial feature of the first face from having the first visual characteristic through a plurality of intermediate (e.g., temporary) states to a final state in which the second facial feature of the second face has the second visual characteristic (1330). In some embodiments, the computer system displays or causes display of an animation via the first facial feature (e.g., blinking of the displayed time if the first facial feature represents eyes) based on a change in the time or non-periodically. Ceasing to display the representation of the first face and displaying the representation of the second face having the first facial feature and the second facial feature provides feedback to a user that a predetermined criteria for changing the appearance of the time user interface has been satisfied. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second facial feature (e.g., 1210, 1212, 1214, 1216, 1218, 1220, 1226, 1228, 1230, 1232, 1234, or 1236) of the first face (e.g., 1206 or 1222) has the first visual characteristic and a first additional visual characteristic (e.g., if the first visual characteristic is a first line color, then a first fill color, a first shape, or a first position; if the first visual characteristic is a first fill color, then a first line color, a first shape, or a first position; if the first visual characteristic is a first shape, then a first line color, a first fill color, or a first position; if the first visual characteristic is a first position, then a first line color, a first fill color, or a first shape) different from the first visual characteristic. Displaying the second facial feature of the first face to have the first visual characteristic and the first additional visual characteristic different from the first visual characteristic limits burn-in effects on the display generation component (e.g., 602) that may occur when an image with the same visual characteristic is constantly displayed, which in turn enhances the operability of the device and, by reducing display burn-in, increases the lifetime of the display generation component and improved the battery life of the device.

In some embodiments, the second facial feature (e.g., 1210, 1212, 1214, 1216, 1218, 1220, 1226, 1228, 1230, 1232, 1234, or 1236) of the second face (e.g., 1206 or 1222) has the second visual characteristic and a second additional visual characteristic (e.g., if the second visual characteristic is a second line color, then a second fill color, a second shape, or a second position; if the second visual characteristic is a second fill color, then a second line color, a second shape, or a second position; if the second visual characteristic is a second shape, then a second line color, a second fill color, or a second position; if the second visual characteristic is a second position, then a second line color, a second fill color, or a second shape) different from the second visual characteristic. Displaying the second facial feature of the second face to have the second visual characteristic and the second additional visual characteristic different from the first visual characteristic limits burn-in effects on the display generation component (e.g., 602) that may occur when an image with the same visual characteristic is constantly displayed, which in turn enhances the operability of the device and, by reducing display burn-in, increases the lifetime of the display generation component and improved the battery life of the device.

In some embodiments, ceasing display of the representation of the first face (e.g., 1206, 1222) and displaying the representation of the second face (e.g., 1206, 1222) includes displaying a gradual transition from the first face to the second face that includes (e.g., concurrently/simultaneously with transitioning the second facial feature of the first face from having the first visual characteristic through a plurality of intermediate (e.g., temporary) states to a final state in which the second facial feature has the second visual characteristic) transitioning the second facial feature of the first face from having the first additional visual characteristic through a plurality of intermediate (e.g., temporary) states to a final state in which the second facial feature has the second additional visual characteristic. Changing a plurality of facial features (e.g., the first facial feature and the second facial feature) in response to detecting the satisfaction of the predetermined criteria for changing an appearance of the time user interface provides visual feedback that the predetermined criteria for changing an appearance of the time user interface has been satisfied. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first face (e.g., 1206 or 1222) has a third facial feature (e.g., 1210, 1212, 1214, 1216, 1218, 1220, 1226, 1228, 1230, 1232, 1234, or 1236) (e.g., nose; mouth; hair; facial shape; neck; shoulders) different from the second facial feature (e.g., 1210, 1212, 1214, 1216, 1218, 1220, 1226, 1228, 1230, 1232, 1234, or 1236) of the first face, wherein the third facial feature for the first face has a third visual characteristic (e.g., a third color (e.g., a third line color or a third fill color); a third shape; a third position). In some embodiments, the second face (e.g., 1206 or 1222) has a third facial feature (e.g., nose; mouth; hair; facial shape; neck; shoulders) different from the second facial feature of the second face, wherein the third facial feature for the second face has a fourth visual characteristic (e.g., a fourth color (e.g., a fourth line color or a fourth fill color); a fourth shape; a fourth position) different from the third visual characteristic. In some embodiments, ceasing display of the representation of the first face and displaying the representation of the second face includes displaying a gradual transition from the first face to the second face that includes transitioning the third facial feature of the first face from having the third visual characteristic through a plurality of intermediate (e.g., temporary) states to a final state in which the third facial feature has the fourth visual characteristic.

In some embodiments, the predetermined criteria for changing the appearance of the time user interface (e.g., changing one or more facial features of the respective face in the time user interface) includes a criterion that is satisfied when a predetermined time has elapsed (e.g., every minute; every 15 minutes; every 30 minutes; every hour) (1312). In some embodiments, alternatively, the predetermined criteria for changing the appearance of the time user interface (e.g., 1204) (e.g., changing one or more facial features of the respective face in the time user interface) does not includes the criterion that is satisfied when the predetermined time has elapsed. In some embodiments, the computer system (e.g., 600) changes the appearance of the time user interface (e.g., changes one or more facial features of the respective face in the time user interface) randomly and not based on when the predetermined time has elapsed. Ceasing to display the representation of the first face and displaying the representation of the second face having the first facial feature and the second facial feature in response to detecting the satisfaction of the predetermined criteria, where the predetermined criteria includes a criterion that is satisfied when a predetermined time has elapsed, provides visual feedback that the predetermined time has elapsed without requiring user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the predetermined criteria for changing the appearance of the time user interface (e.g., 1204) includes a criterion (e.g., a predefined movement criterion) that is satisfied when a predefined movement (e.g., of the computer system) has been detected (e.g., determined to have happened; resulting from a movement of the computer system (e.g., caused by a user of the computer system) (1314). In some embodiments, the computer system is a wearable device (e.g., a smartwatch), and the predefined movement criteria corresponds to a wrist-raise movement while the computer system is being worn. Ceasing to display the representation of the first face and displaying the representation of the second face having the first facial feature and the second facial feature in response to detecting the satisfaction of the predetermined criteria, where the predetermined criteria includes a criterion that is satisfied when a predefined movement (e.g., of the computer system) has been detected, provides visual feedback that the predefined movement has been detected. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the predetermined criteria for changing the appearance of the time user interface includes a criterion that is satisfied when a change in state (e.g., a change in mode from one device state/mode to another device state/mode) of the computer system (e.g., 600) has been detected (e.g., it is determined that the computer system has undergone a change in state) (1316). In some embodiments, the change in state corresponds to the computer system transitioning to a sleep mode or sleeping state. In some embodiments, the sleep mode or sleep state corresponds to a state in which the display generation component is off. In some embodiments, the sleep mode or sleep state corresponds to a state in which the computer system is in a low-power state (e.g., in which the display generation component is also off). In some embodiments, the change in state corresponds to the computer system transitioning from a locked state to an unlocked state. Ceasing to display the representation of the first face and displaying the representation of the second face having the first facial feature and the second facial feature in response to detecting the satisfaction of the predetermined criteria, where the predetermined criteria includes a criterion that is satisfied when a change in state (e.g., a change in mode from one device state/mode to another device state/mode) of the computer system has been detected, provides visual feedback that the a change in state of the computer system has been detected. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second facial feature (e.g., 1210, 1212, 1214, 1216, 1218, 1220, 1226, 1228, 1230, 1232, 1234, or 1236) of the second face (e.g., 1206 or 1222) has the second visual characteristic that is a first color used to fill the second facial feature of the second face (e.g., a background color or base color used to visually fill out the second facial feature of the second face). In some embodiments, while displaying the representation of the second face, the computer system (e.g., 600) detects (e.g., determining) the satisfaction of a second predetermined criteria (e.g., a type of input; a timeout of the computer system) for changing an appearance of the time user interface (e.g., 1204). In some embodiments, in response to detecting the satisfaction of the second predetermined criteria for changing an appearance of the time user interface, the computer system ceases to display the representation of the second face and displaying a representation of a third face having a first facial feature of the third face (e.g., eyes) and a second facial feature of the third face (e.g., nose; mouth; hair; facial shape; neck; shoulders), wherein the representation of the third face is different from the representation of the second face, the first facial feature of the third face indicates a current time, and the second facial feature of the third face has a third visual characteristic (e.g., a second color (e.g., a second line color or a second fill color); a second shape) different from the second visual characteristic, wherein the third visual characteristic is a visually distinguished outline (e.g., borderline) for the second facial feature of the third face having a respective color that is based on (e.g., the same as; the same tone as; similar to) the first color used to fill the second facial feature of the second face. In some embodiments, the computer system displays or causes display of an animation via the first facial feature (e.g., blinking of the displayed time if the first facial feature represents eyes) based on a change in the time or non-periodically.

In some embodiments, while displaying the representation of the second face (e.g., 1206, or 1222) having the first facial feature (e.g., 1208 or 1224) and the second facial feature (e.g., 1210, 1212, 1214, 1216, 1218, 1220, 1226, 1228, 1230, 1232, 1234, or 1236) in the time user interface (e.g., 1204), the computer system (e.g., 600) displays, via the first facial feature of the second face, an animation (e.g., a blinking animation) that includes ceasing display of at least a portion of the first facial feature of the second face for a period of time, and re-displaying the at least a portion of the first facial feature of the second face after the period of time has elapsed. In some embodiments, the animation is a blinking animation of the first facial feature that includes a temporary/brief movement or change in shape/form of the first facial feature such that the first facial feature mimics the movement of a human eye blinking. In some embodiments, the computer system periodically, based on time, (e.g., every 1 minute; every 5 minutes; every 30 minutes; every hour) displays the animation (e.g., blinking animation). Providing a blinking animation via the first facial feature (e.g., periodically, based on time) provides visual feedback about the change in time in an intuitive manner. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first facial feature (e.g., 1208, 1224) is an indication of a current time and the animation is a blinking animation where the current time is animated to look like blinking eyes (e.g., the hour and minute indicators are compressed vertically and then expand vertically).

In some embodiments, displaying, via the first facial feature (e.g., 1208, 1224) of the second face (e.g., 1206, 1222), the animation (e.g., blinking) includes non-periodically (e.g., not in regular intervals; at random times; not based on a period change in time) displaying, via the first facial feature of the second face, the animation.

In some embodiments, the second face (e.g., 1206 or 1222) (e.g., the main face portion of the second face) includes a primary color scheme (e.g., a predominant color; a most-prevalent color). In some embodiments, the second visual characteristic for the second facial feature (e.g., 1210, 1212, 1214, 1216, 1218, 1220, 1226, 1228, 1230, 1232, 1234, or 1236) (e.g., the neck; the neck and shoulder) of the second face is a second color that is based on (e.g., is the same as; is a similar tone as; is within a range of color variants of) the primary color scheme (e.g., the neck is a slightly lighter shade of the color of the face or the neck is a slightly darker shade of the color of the face) (1332). In some embodiments, the color of the second facial feature has a predetermined relationship to the color of the first facial feature for a plurality of different faces (e.g., the neck is a predetermined amount lighter than the face for a plurality of faces or the neck is a predetermined amount darker than the face for a plurality of faces).

In some embodiments, the second facial feature (e.g., 1210, 1212, 1214, 1216, 1218, 1220, 1226, 1228, 1230, 1232, 1234, or 1236) of the second face (e.g., 1206 or 1222) is selected from the group consisting of: hair, facial outline (e.g., including checks and/or jawline), nose, eyes, mouth (e.g., lips) neck, and shoulders (1334).

In some embodiments, the second visual characteristic for the second facial feature (e.g., 1210, 1212, 1214, 1216, 1218, 1220, 1226, 1228, 1230, 1232, 1234, or 1236) of the first face (e.g., 1206 or 1222) is a third color, and the second visual characteristic for the second facial feature (e.g., 1210, 1212, 1214, 1216, 1218, 1220, 1226, 1228, 1230, 1232, 1234, or 1236) of the second face (e.g., 1206 or 1222) is a fourth color different from the third color, wherein the fourth color is programmatically selected (e.g., determined), without user input, from a plurality of available colors by the computer system (e.g., 600) (1336). In some embodiments, the application process selects (e.g., programmatically determines) the fourth color based on a color of the computer system (e.g., a color of a housing or case of the computer system). In some embodiments, the application process selects (e.g., programmatically determines) the fourth color based on usage history of a user of the computer system (e.g., based on a previous user-selected color or color scheme). Programmatically selecting, without user input, colors for facial features of a displayed face provides a diverse range of characteristics that are displayed via the time user interface without requiring user input to enable the diverse range of characteristics. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1300 (e.g., FIGS. 13A-13C) are also applicable in an analogous manner to the methods described above and below. For example, method 700 optionally includes one or more of the characteristics of the various methods described above with reference to method 1300. For example, a device can use as a watch user interface either a watch user interface as described in FIGS. 6A-6H or a time user interface as described in FIGS. 12A-12G. For another example, method 900 optionally includes one or more of the characteristics of the various methods described above with reference to method 1300. For example, a device can use as a watch user interface either a watch user interface as described in FIGS. 8A-8M or a time user interface as described in FIGS. 12A-12G. For another example, method 1100 optionally includes one or more of the characteristics of the various methods described above with reference to method 1300. For example, a device can use as a watch user interface either a user interface with the indication of time and the graphical representation of a respective character as described in FIGS. 10A-10AC or a time user interface as described in FIGS. 12A-12G. For another example, method 1500 optionally includes one or more of the characteristics of the various methods described above with reference to method 1300. For example, a device can use as a watch user interface either a user interface with a background as described in FIGS. 14A-14AD and a time user interface as described in FIGS. 12A-12G. For another example, method 1700 optionally includes one or more of the characteristics of the various methods described above with reference to method 1300. For example, one or more characteristics or features of a time user interface as described with reference to FIGS. 12A-12G can be edited via the process for editing characteristics or features of a watch user interface as described with reference to FIGS. 16A-16AE. For brevity, these details are not repeated below.

FIGS. 14A-14AD illustrate exemplary user interfaces for enabling configuration of a background for a user interface, in accordance with some embodiments. The user interfaces in these figures are used to illustrate the processes described below, including the processes in FIGS. 15A-15F.

FIG. 14A illustrates device 600 displaying, via display 602, a first page (indicated by paging dot 1410) of an editing user interface 1406 for editing a respective user interface that includes content overlaid on the background. In some embodiments, the respective user interface is available to be used as a watch user interface on device 600 (e.g., a watch face that includes an indication of time and one or more watch complications overlaid on the background). In some embodiments, the user interface is a watch user interface, and the content includes an indication of the current time or current date. In some embodiments, editing user interface 1406 includes a plurality of pages that can be navigated, where a respective page enables editing of a different feature of a user interface, as described in greater detail below.

In FIG. 14A, editing user interface 1406 includes a background 1408 for a respective user interface, where background 1408 comprises a plurality of stripes (e.g., graphical lines across the background in a vertical or horizontal direction) including a stripe 1408A and a stripe 1408B. Stripe 1408A has a first visual characteristic (e.g., a first color; a first fill pattern) and stripe 1408B has a second visual characteristic (e.g., a second color; a second fill pattern) different from the first visual characteristic. In FIG. 14A, stripes of 1408A and 1408B are arranged in a first visual pattern of stripes (e.g., a first type of alternating color pattern, such as a repeating 2-color pattern).

In FIG. 14A, while displaying first page 1410 of editing user interface 1406, device 600 receives (e.g., detects) an input 1401 for changing the current page of editing user interface 1406. In some embodiments, input 1401 includes a gesture (e.g., a horizontal swipe on display 602 in a first direction). In response to receiving input 1401, device 600 displays a second page (indicated by paging dot 1412) of editing user interface 1406, as shown in FIG. 14B, where second page 1412 of editing user interface 1406 can be used to change a number of stripes (e.g., increase the number of stripes; decrease the number of stripes) of background 1408.

In FIG. 14B, while displaying second page (indicated by paging dot 1412) of editing user interface 1406 with background 1408 having stripes 1408A-1408B arranged in the first visual pattern of stripes, device 600 receives (e.g., detects) an input 1403 directed to changing (e.g., increasing) the number of stripes of background 1408, as shown in FIGS. 14B-14E. In some embodiments, input 1403 is a rotational input in a first direction (e.g., clockwise; up) on rotatable input mechanism 603 shown in FIGS. 14B-14E. In some embodiments, input 1403 is a touch input such as a swipe or pinch input.

In FIGS. 14B-14E, in response to (e.g., and while) receiving input 1403, device 600 displays an increase in the number of stripes for background 1408. The new stripes maintain the initial visual pattern of stripes 1408A and 1408B (e.g., maintain the initial alternating color pattern).

In FIG. 14C, in response to (e.g., and while) receiving input 1403, device 600 includes stripe 1408C in background 1408 (e.g., below stripe 1408B), where stripe 1408C moves onto display 602 from an edge (e.g., bottom edge) of display 602. In FIG. 14C, stripe 1408C has a same visual characteristic (e.g., color; fill pattern) as stripe 1408C. Device 600 decreases a size of displayed stripes (e.g., decreases the height or width) as a new stripe is added to background 1408.

In FIGS. 14D-14E, in response to (e.g., and while) continuing to receive input 1403, device 600 includes stripe 1408D in background 1408 (e.g., below stripe 1408C), where stripe 1408D moves onto display 602 from the same edge of display 602 as stripe 1408C. In FIGS. 14D-14E, stripe 1408D has a same visual characteristic as stripe 1408D (e.g., the same color and/or fill pattern as stripe 1408D). Device 600 automatically maintains the first visual pattern of stripes (e.g., alternating between two colors) as new stripes are added to background 1408. Device 600 continues to decrease the size of displayed stripes as new stripes are added to background 1408.

After FIG. 14E, device 600 continues receiving input 1403 and responds by increasing the number of stripes until twelve stripes 1408A-1408L are included in background 1408, while maintaining the first visual pattern, as shown in FIG. 14F.

FIG. 14F illustrates device 600 displaying, in second page 1412 of editing user interface 1406, background 1408 with stripes 1408A-1408L arranged in the first visual pattern of stripes. While displaying second page 1412 of editing user interface 1406 with background 1408 having stripes 1408A-1408L arranged in the first visual pattern of stripes, device 600 receives (e.g., detects) an input 1405 directed to changing (e.g., decreasing) the number of stripes of background 1408, as shown in FIG. 14F. In some embodiments, input 1405 has a direction (e.g., counter-clockwise; down) that is opposite of a direction of input 1403. In the embodiment illustrated in FIG. 14F, input 1405 is a rotational input on rotatable input mechanism 603 in a direction opposite the direction of input 1403. In some embodiments, input 1405 is a touch input such as a swipe or pinch input.

In response to receiving input 1405, device 600 displays, in editing user interface 1406, a decrease in the number of stripes for background 1408, where existing stripes move off of display 602 at the edge of display 602 (e.g., at the bottom of display 602). Device 600 increases the size of remaining stripes (e.g., increases the height or width) as a stripe is removed from background 1408.

As shown in FIG. 14G, in response to receiving input 1405, device 600 displays background 1408 with eight stripes 1408A-1408H, where stripes 1408A-1408H maintain the first visual pattern of stripes as in FIG. 14F.

In FIG. 14G, while displaying second page 1412 of editing user interface 1406 with background 1408 having stripes 1408A-1408H arranged in the first visual pattern of stripes, device 600 receives (e.g., detects) an input 1407 directed to selecting stripe 1408D. In some embodiments, input 1407 includes a tap input on stripe 1408D. In some embodiments, input 1407 includes a tap-and-hold input on stripe 1408D.

In some embodiments, in response to receiving input 1407, device 600 changes the current page in editing user interface 1406 to a third page (indicated by paging dot 1414) of editing user interface 1406, as shown in FIG. 14H. Third page 1414 provides an editing mode for changing a visual characteristic, such as a color, of the selected stripe.

In response to receiving input 1407 (e.g., and while displaying editing user interface 1406 in third page 1414), device 600 displays a visual indicator 1416 (e.g., a box) indicating that stripe 1408D has been selected (via input 1407). In some embodiments, visual indictor 1416 includes an indication 1418 of a current visual characteristic (e.g., the color) applied to the selected stripe.

In FIG. 14H, while displaying editing user interface 1406 with visual indicator 1416 indicating that stripe 1408D of background 1408 has been selected, device 600 receives (e.g., detects) an input 1409 directed to changing the current visual characteristic applied to stripe 1408D. In some embodiments, input 1409 is a rotational input on rotatable input mechanism 603 shown in FIG. 14H. In some embodiments, input 1409 is a touch input such as a swipe or pinch input.

In response to (e.g., and while) receiving input 1409, device 600 navigates (e.g., scrolls) through a plurality of selectable visual characteristics (e.g., selectable colors). While the selectable visual characteristics are being navigated, different selectable visual characteristics are applied to stripe 1408D and indicated via indication 1418 of visual indicator 1416 (e.g., the color of stripe 1408D and indication 1418 are updated during navigation to reflect the currently-selected visual characteristic).

In FIG. 14I, in response to (e.g., and while) receiving input 1409, device 600 changes the respective visual characteristic applied to stripe 1408D to a third visual characteristic (e.g., a third color; a third fill pattern) different from the second visual characteristic and indicates, via indication 1418 of visual indicator 1416, that the third visual characteristic is the currently-selected visual characteristic.

After FIG. 14I, device 600 continues detecting input 1409 directed to changing the current visual characteristic applied to stripe 1408D until device 600 changes the respective visual characteristic applied to stripe 1408D to a fourth visual characteristic (e.g., a fourth color; a fourth fill pattern), different from the second visual characteristic and the third visual characteristic, and indicates, via indication 1418 of visual indicator 1416, that the fourth visual characteristic is the currently-selected visual characteristic, as shown in FIG. 14J.

In FIG. 14J, while displaying stripe 1408D of background 1408 with the fourth visual characteristic applied, device 600 receives (e.g., detects) an input 1411. Input 1411 is first detected a location on display 602 corresponding to stripe 1408D and is moved towards a location on display 602 corresponding to stripe 1408G, where stripe 1408G has a different visual characteristic from stripe 1408D. In some embodiments, input 1411 is a touch-and-drag input from stripe 1408D to stripe 1408G.

In response to detecting input 1411, device 600 displays stripe 1408G with the visual characteristic of stripe 1408D (e.g., the visual characteristic from stripe 1408D is applied to stripe 1408G), as shown in FIG. 14K, and moves visual indicator 1416 to stripe 1408G from stripe 1408D. As shown in FIG. 14K visual indicator 1416 indicates that stripe 1408G has been selected (via input 1411) and indication 1418 indicates the visual characteristic of stripe 1408D has been applied to stripe 1408G.

In FIG. 14K, while displaying third page 1414 of the editing user interface, device 600 receives (e.g., detects) an input 1413 directed to returning editing user interface 1406 to second page 1412 (e.g., the editing mode for changing the number of stripes in the background). In some embodiments, input 1413 includes a gesture (e.g., a horizontal swipe on display 602 in a direction opposite a direction of input 1407). In response to receiving input 1413, device 600 displays second page 1412 of editing user interface 1406, as shown in FIG. 14L.

In FIG. 14L, background 1408 includes stripes 1408A-1408L, where stripes 1408A-1408L form a second visual pattern of stripes (e.g., an eight-color pattern, where stripes 1408A, 1408C, and 1408E have the first visual characteristic (e.g., the first color; the first fill pattern), stripes 1408B, 1408F, 1408H have the second visual characteristic (e.g., the second color; the second fill pattern), and stripes 1408D and 1408G have the fourth visual characteristic (e.g., the fourth color; the fourth fill pattern).

In FIG. 14L, while displaying background 1408 with stripes 1408A-1408L, device 600 receives (e.g., detects) an input 1415 directed to changing (e.g., decreasing) the number of stripes in background 1408. In some embodiments, input 1415 is a rotational input on rotatable input mechanism 603 shown in FIG. 14L. In some embodiments, input 1415 is a touch input such as a swipe or pinch input.

In response to receiving (e.g., detecting) input 1415 directed to decreasing the number of stripes of background 1408, where input 1415 is in the second direction (e.g., a counter-clockwise direction; a down direction), device 600 displays a decrease in the number of stripes for background 1408. Existing stripes move off of display 602 at the edge of display 602 (e.g., at the bottom of display 602). Device 600 increases the size of remaining stripes (e.g., increases the height or width) as a stripe is removed from background 1408.

Figures 14M, 14N, 14O, 14P:
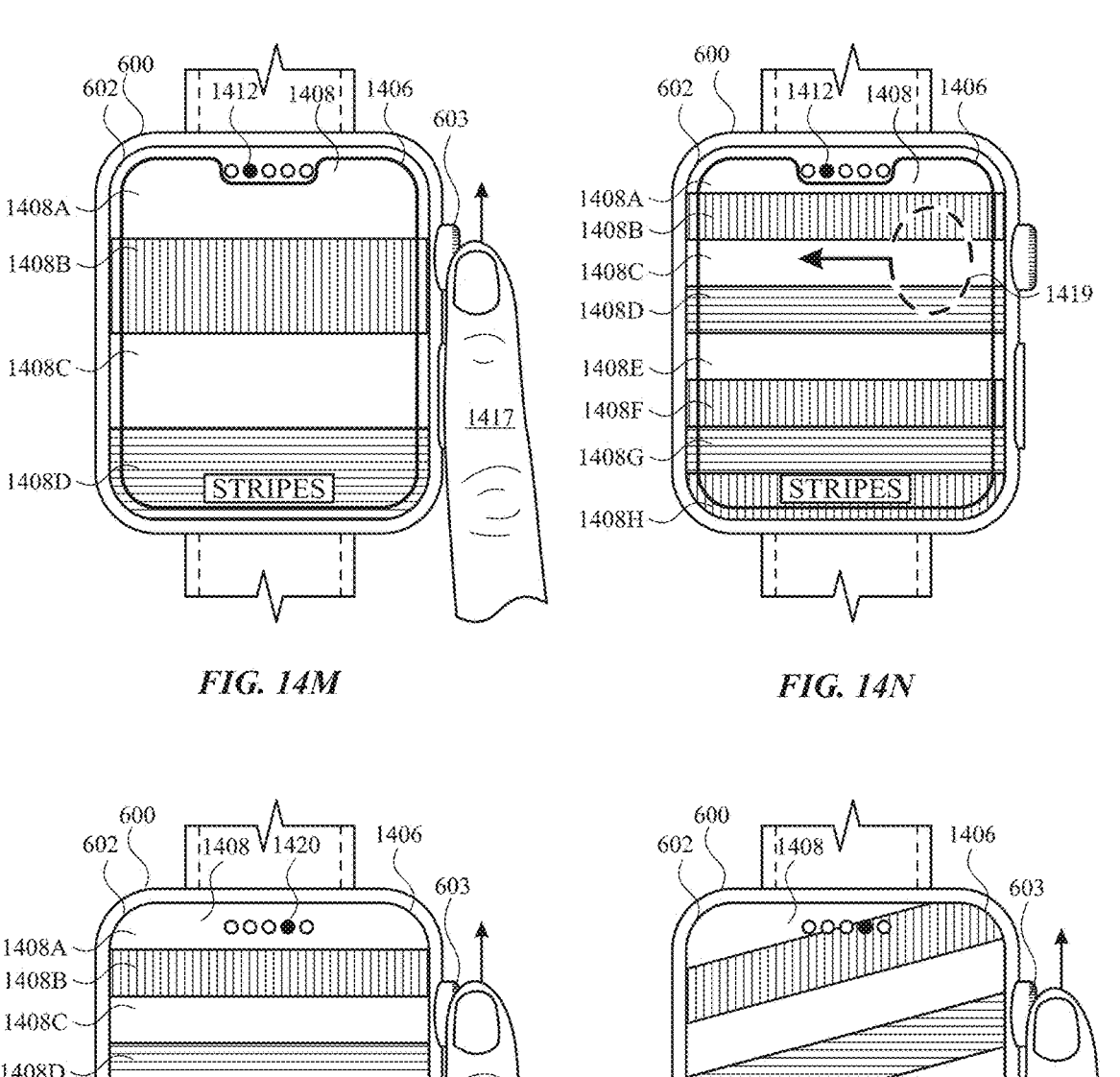
FIGS. 14A-14AD illustrate exemplary user interfaces for enabling configuration of a background for a user interface, in accordance with some embodiments.

In response to (e.g., after) receiving input 1415, device 600 displays background 1408 with four remaining stripes 1408A-1408D, as shown in FIG. 14M, as stripes 1408E-1408H have been removed from background 1408 by input 1415.

In FIG. 14M, background 1408 includes stripes 1408A-1408D, where stripes 1408A-1408D are arranged in a third visual pattern of stripes (e.g., a third type of alternating color pattern (e.g., a repeating 4-color pattern), where stripe 1408A and stripe 1408C have the first visual characteristic (e.g., the first color; the first fill pattern), stripe 1408B has the second visual characteristic, and stripe 1408D has the fourth visual characteristic.

In FIG. 14M, while displaying background 1408 with stripes 1408A-1408D, device 600 receives (e.g., detects) an input 1417 directed to changing (e.g., increasing) the number of stripes in background 1408. In some embodiments, input 1417 is a rotational input on rotatable input mechanism 603 shown in FIG. 14M. In some embodiments, input 1417 is a touch input such as a swipe or pinch input.

In response to receiving input 1417, where input 1417 is in the first direction (e.g., a clockwise direction; an up direction), device 600 displays an increase in the number of stripes for background 1408, where stripes are moved onto display 602 from the edge of display 602 (e.g., at the bottom of display 602). Device 600 decreases the size of stripes (e.g., decreases the height or width) as a stripe is added to background 1408.

In response to (e.g., after) receiving input 1417, device 600 displays background 1408 in editing user interface 1406 with eight stripes 1408A-1408H, as shown in FIG. 14N, where stripes 1408A-1408H have the second visual pattern of stripes as first described above with reference to FIG. 14L (e.g., instead of maintain the four-stripe visual pattern of stripes shown in FIG. 14M).

In some embodiments, in response to receiving an input directed to increasing the number of stripes (e.g., input 1417 in FIG. 14M) after receiving an input directed to decreasing the number of stripes (e.g., input 1415 of FIG. 14L), device 600 maintains the visual pattern of stripes from when the input directed to decreasing the number of stripes (e.g., input 1415 of FIG. 14L) was first detected. In some embodiments, in accordance with detecting one or more inputs (e.g., input 1415 in FIG. 14L, then input 1417 in FIG. 14M) directed to decreasing, then increasing, the number of stripes, device 600 maintains the visual pattern of stripes (e.g., the second visual pattern of stripes as in FIG. 14L) from prior to the one or more inputs being received.

In some embodiments, in response to receiving an input directed to decreasing the number of stripes (e.g., input 1415 in FIG. 14L), and subsequently receiving an input directed to increasing the number of stripes (e.g., input 1417 in FIG. 14M), device 600 re-displays stripes (e.g., stripes 1408E-1408H) in the background to include the same visual pattern of stripes (e.g., the second visual pattern of stripes as in FIG. 14L) from prior to the inputs being received if no other inputs are received by device 600 between receiving the two respective inputs (e.g., between receiving input 1415 and input 1417). For example, if there were no intervening operations received by device 600 between displaying background 1408 with the second visual pattern of stripes as in FIG. 14L to receiving input directed to increasing the number of stripes (e.g., input 1417 in FIG. 14M), device 600 re-displays stripes (e.g., stripes 1408E-1408H) in background 1408 to include the same visual pattern of stripes.

In some embodiments, in accordance with receiving an input directed to decreasing the number of stripes (e.g., input 1415 in FIG. 14L), and subsequently receiving an input directed to increasing the number of stripes (e.g., input 1417 in FIG. 14M), device 600 does not re-display stripes (e.g., stripes 1408E-1408H) in the background to include the same visual pattern of stripes (e.g., the second visual pattern of stripes as in FIG. 14L) from prior to the inputs being received (e.g., detected) if another input directed to performing an operation that does not include changing the number of stripes of the background is received by device 600 between receiving the two respective inputs (e.g., between receiving (e.g., detecting) input 1415 and input 1417). For example, if there is an intervening operation received by device 600 between displaying background 1408 with the second visual pattern of stripes as in FIG. 14L to receiving input directed to increasing the number of stripes (e.g., input 1417 in FIG. 14M), device 600 does not re-display stripes (e.g., stripes 1408E-1408H) in background 1408 to include the same visual pattern of stripes. In some embodiments, performing the operation includes displaying a user interface different from editing user interface 1406. In some embodiments, performing the operation includes editing a different aspect/feature of background 1408 (e.g., in a different page of editing user interface 1406) than changing the number of stripes of background 1408 (e.g., editing features of a watch face, such as watch face style or watch complications).

In some embodiments, if an input directed to performing an operation that does not include changing the number of stripes of the background is received by device 600 between receiving input 1415 to decrease the number of stripes and, subsequently, receiving input 1417 to increase the number of stripes, device 600 displays stripes 1408E-1408H to include the third visual pattern of stripes 1408A-1408D as in FIG. 14M (when the number of stripes is decreased) to stripes 1408A-1408H (when the number of stripes is increased).

In FIG. 14N, while displaying stripes 1408A-1408H in background 1408 with the second visual pattern of stripes, device 600 receives (e.g., detects) an input 1419 directed to changing the current page of editing user interface 1406 to a fourth page (indicated by paging dot 1420) (e.g., an editing mode for rotating the background). In some embodiments, input 1419 includes a gesture (e.g., a horizontal swipe on display 602). In response to receiving input 1419, device 600 displays fourth page 1420 of editing user interface 1406, as shown in FIG. 14O.

While displaying fourth page 1420 of editing user interface with background 1408 including stripes 1408A-1408H arranged in the second visual pattern of stripes, device 600 receives (e.g., detects) an input 1421 directed to rotating the stripes of background 1408. In some embodiments, input 1421 is a rotational input on rotatable input mechanism 603 shown in FIGS. 14O-14P. In some embodiments, input 1421 is a touch input such as a swipe, twist, or pinch input.

In FIG. 14P, in response to (e.g., and while) receiving input 1421, device 600 rotates stripes 1408A-1408B of background 1408 in accordance with input 1421 (e.g., background 1408 is rotated with the center of display 602 as the axis point for rotation). In some embodiments, if input 1421 is a rotational input in a clockwise direction, stripes 1408A-1408H of background 1408 are rotated in the clockwise direction. In some embodiments, if input 1421 is a rotational input in a counter-clockwise direction, stripes 1408A-1408H of background 1408 are rotated in the counter-clockwise direction. In some embodiments, stripes 1408A-1408H of background 1408 maintain a straight shape while being rotated, as shown in FIG. 14P.

In some embodiments, rotating background 1408 includes rotating background 1408 by predefined rotational increments (e.g., by 10 degree increments; by 15 degree increments; by 30 degree increments) with respect to a rotational axis point (e.g., the center of display 602). In some embodiments, rotating background 1408 includes changing (e.g., increasing; decreasing) a characteristic (e.g., thickness; size; area) of stripes 1408A-1408H of background 1408 as the background is being rotated in accordance with the input directed to rotating the stripes (e.g., input 1421).

Figure 14Q:
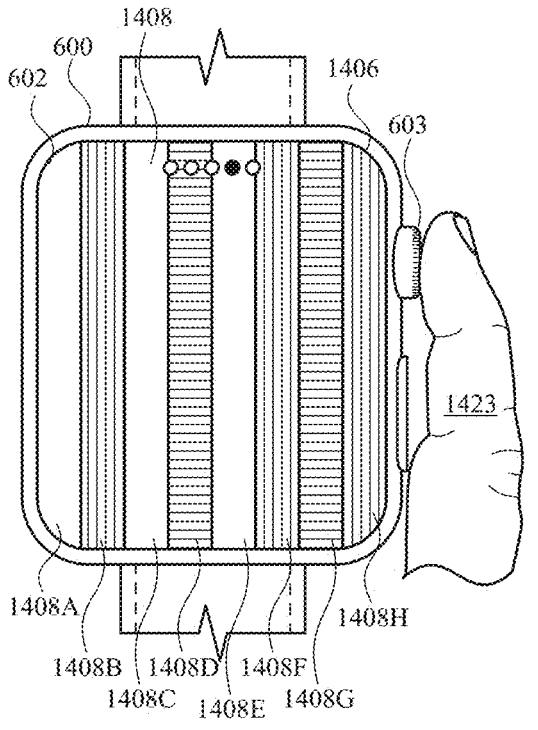

In response to (e.g., after) detecting input 1421, device 600 displays stripes 1408A-1408H of background 1408 rotated from a horizontal orientation, as in FIG. 14P, to a vertical orientation, as in FIG. 14Q. In some embodiments, stripes 1408A-1408H can be rotated to an intermediary angle between the horizontal and vertical orientations (e.g., by 1 degree increments, 2 degree increments, 5 degree increments, 10 degree increments; by 15 degree increments; by 30 degree increments).

In FIG. 14Q, while displaying stripes 1408A-1408H of background 1408 in the vertical orientation, device 600 receives (e.g., detects) an input 1423 directed to exiting editing user interface 1406. In some embodiments, input 1423 is directed to rotatable input mechanism 603 (e.g., a press input or a press-and-hold input at rotatable input mechanism 603), as in FIG. 14Q. In some embodiments, input 1423 is a touch input (e.g., a tap-and-hold input) on display 602.

In response to receiving input 1423 while displaying background 1408 as in FIG. 14Q, device 600 displays a user interface 1422 (e.g., a watch user interface) that includes background 1408 with stripes 1408A-1408H as the background of the user interface. In some embodiments, user interface 1422 is a watch user interface that includes background 1408 with stripes 1408A-1408H as the background of the watch user interface and an indication of time 1424 overlaid on background 1408.

Figure 14R:
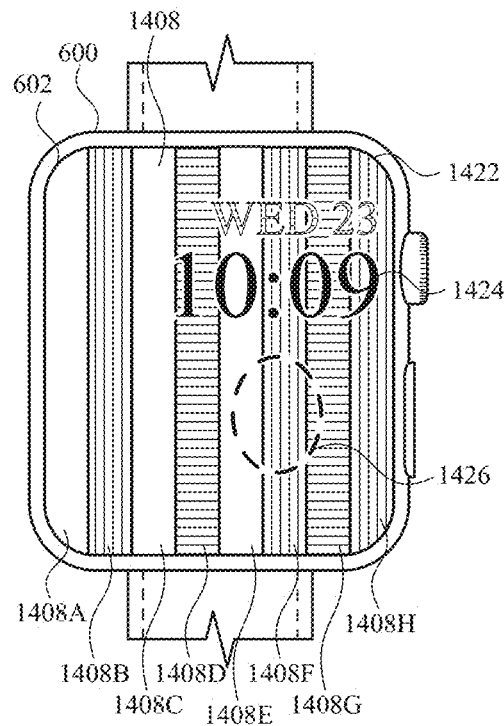

At FIG. 14R, electronic device 600 detects user input 1426 (e.g., a tap and hold gesture) on user interface 1422. In response to detecting user input 1426, electronic device 600 displays user interface 1428, as shown at FIG. 14S. At FIG. 14S, user interface 1428 includes representation 1430 of background 1408, watch user interface type indicator 1432 (e.g., "Stripes"), share affordance 1434, and edit affordance 1436. Representation 1430 of background 1408 includes stripes 1408A-1408H arranged in the vertical orientation and/or having a fourth visual pattern. In some embodiments, electronic device 600 is configured to display representations of different backgrounds for user interface 1422 and/or representations of additional user interfaces (e.g., different from user interface 1422) in response to detecting rotational input on rotatable input mechanism 603. At FIG. 14S, electronic device 600 detects user input 1438 (e.g., a tap gesture) corresponding to selection of edit affordance 1436. In response to detecting user input 1438, electronic device 600 displays editing user interface 1440 (e.g., a modified version of editing user interface 1406), at FIG. 14T.

At FIG. 14T, a first page of editing user interface 1440 includes representation 1430 of background 1408, first editing feature indicator 1442 (e.g., "Style"), second editing feature indicator 1444 (e.g., "Color"), and first style indicator 1446 (e.g., "Full Screen"). Representation 1430 of background 1408 includes stripes 1408A-1408H in the vertical orientation and/or having the fourth visual pattern. First editing feature indicator 1442 corresponds to a currently selected editing feature for background 1408 (e.g., "Style"), as indicated by first editing feature indicator 1442 being centered on display 602 and above representation 1430. At FIG. 14T, the currently selected editing feature relates to a format of a border (e.g., a shape of the border) in which background 1408 will be displayed on user interface 1422. First style indicator 1446 provides a first option for the currently selected editing feature and indicates the option as full screen (e.g., a border having a rectangular shape). In response to detecting selection of the full screen option (e.g., via a tap gesture or press gesture on rotatable input mechanism 603), electronic device 600 displays background 1408 in a full screen mode on display 602 (e.g., background 1408 occupies all or substantially all of display 602 and is displayed within a border having a shape of display 602, such as a rectangular shape or a square shape).

At FIG. 14T, electronic device 600 detects rotational input 1448 on rotatable input mechanism 603. In response to detecting rotational input 1448, electronic device 600 displays the first page of editing user interface 1440 with representation 1450 and second style indicator 1452 (e.g., "Circle"), as shown at FIG. 14U. Second style indicator 1452 corresponds to a second option for the currently selected editing feature and indicates the option as a circular mask (e.g., displaying background 1408 within a border having a circular shape). In some embodiments, the circular mask does not occupy the full screen of display 602. In response to detecting selection of the circular mask option (e.g., via a tap gesture or press gesture on rotatable input mechanism 603), electronic device 600 displays background 1408 within a circular shaped border on a portion of display 602. At FIG. 14U, representation 1450 of background 1408 maintains the vertical orientation of stripes 1408A-1408H in the circular shaped border. In some embodiments, in response to detecting rotational input 1448, electronic device 600 adjusts a size (e.g., a width and/or a thickness) of stripes 1408A-1408H displayed in representation 1450 of background 1408 (as compared to representation 1430) to enable stripes 1408A-1408H to fit within the circular shaped border of representation 1450. For example, in some embodiments, electronic device 600 reduces the size (e.g., the width and/or the thickness) of stripes 1408A-1408H displayed in representation 1450 (as compared to representation 1430) because the circular shaped border of representation 1450 includes a smaller width than the rectangular border of representation 1430.

At FIG. 14U, electronic device detects user input 1454 (e.g., a swipe gesture) on editing user interface 1440. In response to detecting user input 1454, electronic device 600 displays a second page of editing user interface 1440 for editing a second feature of background 1408, as shown at FIG. 14V. At FIG. 14V, electronic device displays a second page of editing user interface 1440 for editing the second feature of background 1408, as indicated by second editing feature indicator 1444 being centered on display 602 above representation 1450. Additionally, electronic device 600 displays third editing feature indicator 1456 (e.g., "Position") in response to detecting user input 1454 (e.g., electronic device 600 translates first editing feature indicator 1442, second editing feature indicator 1444, and third editing feature indicator 1456 in a direction associated with movement of user input 1454). The second page of editing user interface 1440 corresponds to an ability to adjust a color of one or more stripes 1408A-1408H of background 1408. At FIG. 14V, electronic device displays indication 1416 around stripe 1408A indicating that stripe 1408A is selected for editing. Additionally, electronic device 600 displays indication 1418 indicating a current color of stripe 1408A that is selected for editing (e.g., "White"). As set forth above, electronic device 600 adjusts the color of stripe 1408A in response to detecting rotational input on rotational input mechanism 603. For instance, the second page of editing user interface 1440 includes color selection element 1458, which includes indicators 1458A-1458D corresponding to different colors that may be designated to stripe 1408A (or another selected stripe 1408B-1408H).

Electronic device 600 is configured to adjust and/or change a position of indicator 1416 from stripe 1408A to one of stripes 1408B-1408H in response to detecting a tap gesture on one of stripes 1408B-1408H. At FIG. 14V (e.g., in response to detecting input 1454), representation 1450 of background 1408 is rotated when compared to representation 1450 of FIG. 14U so that stripes 1408A-1408H are in a horizontal orientation (e.g., stripes 1408A-1408H extend between the left and ride sides of display 602). As discussed below with reference to FIGS. 14AB and 14AC, in some embodiments, displaying representation 1450 such that stripes 1408A-1408H are in the horizontal orientation facilitates a user's ability to accurately select a particular stripe.

At FIG. 14V, electronic device 600 detects user input 1460 (e.g., a swipe gesture) on editing user interface 1440. In response to detecting user input 1460, electronic device 600 displays a third page of editing user interface 1440, as shown at FIG. 14W. The third page of editing user interface 1440 enables adjustment of an angle and/or position of background 1408, and thus the angle and/or position of stripes 1408A-1408H of background 1408. At FIG. 14W, electronic device displays third editing feature indicator 1456 as centered on display 602 above representation 1450 to indicate that the third page of editing user interface 1440 enables adjustment of the position of background 1408. Additionally, electronic device 600 displays fourth editing feature indicator 1462 (e.g., "Complications") in response to detecting user input 1460 (e.g., electronic device 600 translates first editing feature indicator 1442, second editing feature indicator 1444, third editing feature indicator 1456, and fourth editing feature indicator 1462 in a direction associated with movement of user input 1460).

At FIG. 14W (e.g., in response to detecting input 1460), electronic device 600 rotates representation 1450 of background 1408 back to the orientation (e.g., a vertical orientation) of background 1408 prior to displaying the second page (e.g., for editing color) of editing user interface 1440. In some embodiments, background 1408 is returned to the previous orientation because the second page of editing user interface 1440 for adjusting colors of stripes 1408A-1408H is no longer displayed (e.g., electronic device 600 does not detect and/or respond to user inputs on individual stripes 1408A-1408H when the second page of editing user interface 1440 is not displayed).

As set forth above, the third page of editing user interface 1440 enables adjustment of an angle and/or position of background 1408. The third page of editing user interface 1440 includes rotation indicator 1464 that provides a visual indication of an angle of background 1408 with respect to a rotational axis (e.g., the center of display 602). At FIG. 14W, electronic device detects rotational input 1466 on rotatable input mechanism 603. In response to detecting rotational input 1466 (and while receiving rotational input), electronic device 600 rotates representation 1450 with respect to the rotational axis, as shown at FIG. 14X.

At FIG. 14X, electronic device 600 updates rotation indicator 1464 to provide a visual indication of the new angle of background 1408 with respect to the rotational axis (e.g., 45 degrees). While electronic device 600 displays representation 1450 with stripes 1408A-1408H at an angle of 45 degrees with respect to the rotational axis, electronic device 600 can rotate representation 1450 of background 1408 to any suitable angle (e.g., any angle from 0 degrees to 360 degrees) with respect to the rotational axis. In some embodiments, electronic device 600 rotates representation 1450 to a particular angle in accordance with a detected amount of movement associated with rotational input 1466 (e.g., an amount of rotation of representation 1450 is based on an amount of detected movement or rotation associated with rotational input 1466). For example, electronic device 600 can continuously rotate representation 1450 while continuing to detect rotational input 1466 (e.g., the angle of rotation is selectable by a continuous input, such as continuous rotation of rotatable input mechanism 603). As set forth above, representation 1450 corresponds to background 1408 being displayed within a border that includes a circular shape. In response to rotational input 1466, electronic device 600 forgoes adjustment of a size (e.g., a thickness and/or a width) of stripes 1408A-1408H of representation 1450 because representation 1450 includes the circular border (e.g., rotating representation 1450 does not cause the lengths or widths of stripes 1408A-1408H to change because the diameter of the circular border remains constant). As discussed below, in some embodiments, electronic device 600 adjusts the size (e.g., thickness and/or width) of stripes 1408A-1408H in response to rotational input 1466 when background 1408 is displayed within a non-circular border.

At FIG. 14X, electronic device 600 detects user input 1468 (e.g., two swipe gestures) on editing user interface 1440. In response to detecting user input 1468, electronic device 600 displays the first page of editing user interface 1440 for adjusting the shape of the border in which background 1408 is displayed, as shown at FIG. 14Y. At FIG. 14Y, electronic device 600 displays representation 1450 with the updated position (e.g., an angle of 45 degrees) caused by rotational input 1466 (e.g., because the second page of editing user interface 1440 is not displayed). Additionally, at FIG. 14Y, electronic device 600 detects rotational input 1470 on rotatable input mechanism 603. In response to detecting rotational input 1470, electronic device 600 displays the first page of editing user interface 1440 with representation 1430 of background 1408 in the rectangular shaped border, as shown at FIG. 14Z.

Figure 14Z:
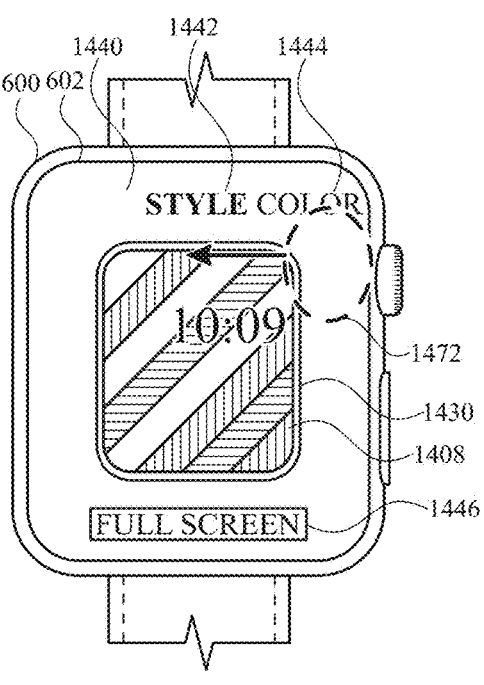
Figure 14A:
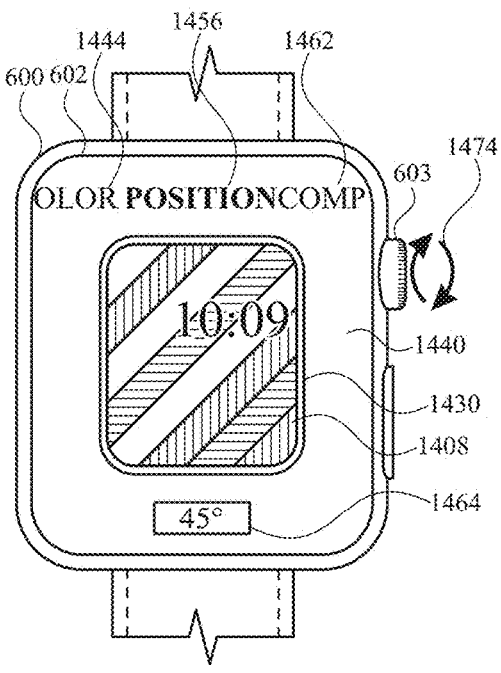
Figure 14A:
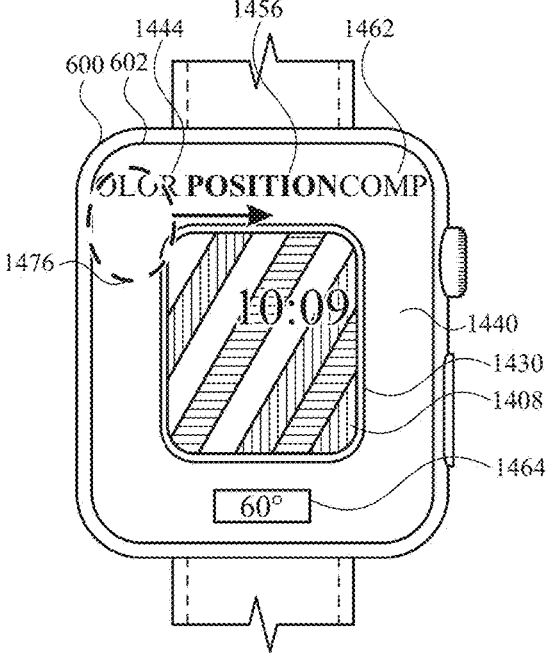
Figure 14A:
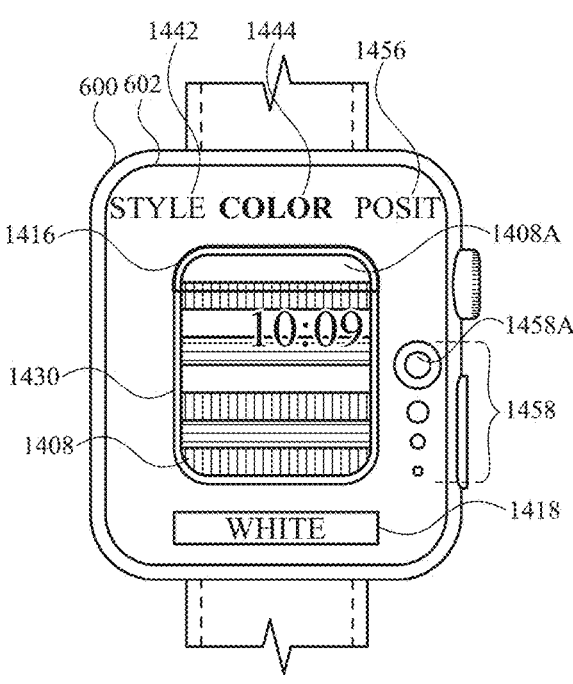

At FIG. 14Z, representation 1430 maintains the angle of representation 1450 caused by rotational input 1466 (e.g., an angle of 45 degrees). However, electronic device 600 adjusts a size (e.g., thickness and/or width) of stripes 1408A-1408H of representation 1430 when compared to representation 1450 at FIG. 14Y. Electronic device 600 adjusts the size (e.g., length, thickness, and/or width) of stripes 1408A-1408H to occupy the entire area defined by the rectangular shaped border, while maintaining the same number of stripes (e.g., and the same width for each stripe). In general, the width of the stripes varies with the dimension of background 1408 in the direction perpendicular to the length of the stripes (e.g., the stripes are wider when oriented horizontally than when oriented vertically because the vertical dimension of display 602 is larger than the horizontal dimension of display 602, and vice versa).

At FIG. 14Z, electronic device 600 detects user input 1472 (e.g., two successive swipe gestures) on editing user interface 1440. In response to detecting user input 1472, electronic device 600 displays the third page of editing user interface 1440 for adjusting the position of representation 1430, as shown at FIG. 14AA. At FIG. 14AA, electronic device 600 detects rotational input 1474 on rotatable input mechanism 603. In response to detecting rotational input 1474, electronic device 600 rotates representation 1430 (e.g., about the rotational axis) in accordance with an amount of movement and/or a direction of rotational input 1474, as shown at FIG. 14AB.

At FIG. 14AB, electronic device 600 displays representation 1430 with stripes 1408A-1408H at an angle of 60 degrees (e.g., relative to horizontal), as indicated by rotation indicator 1464. In response to rotational input 1474, electronic device 600 reduces a size (e.g., thickness and/or width) of stripes 1408A-1408H in addition to rotating stripes 1408A-1408H about the rotational axis. For example, in response to rotating stripes 1408A-1408H from an angle of 45 degrees to an angle of 60 degrees, electronic device 600 varies the lengths of stripes 1408A-1408H as needed to fit within rectangular border of representation 1430. Electronic device 600 also reduces the size (e.g., thickness and/or width) of stripes 1408A-1408H in order to maintain the same number of stripes 1408A-1408H (e.g., each with the same width) within the rectangular border of representation 1430. In some embodiments, electronic device 600 adjusts the size of stripes 1408A-1408H based on a detected amount of movement associated with rotational input 1474. For example, while electronic device 600 detects rotational input 1474 (e.g., continuously detects rotational input 1474), electronic device 600 gradually and/or continuously adjusts the size of stripes 1408A-1408H in response to continuing to detect rotational input 1474. In some embodiments, electronic device 600 adjusts the size of stripes 1408A-1408H based on a direction of rotational input 1474 (e.g., clockwise or counter-clockwise). For example, in response to detecting that rotational input 1474 is in a first direction, electronic device 600 reduces the size of stripes 1408A-1408H and, in response to detecting that rotational input 1474 is in a second direction, different from the first direction, electronic device 600 increases the size of stripes 1408A-1408H.

At FIG. 14AB, electronic device 600 detects user input 1476 (e.g., a swipe input) on editing user interface 1440. In response to detecting user input 1476, electronic device 600 displays the second page of editing user interface 1440, as shown at FIG. AC. As set forth above, the second page of editing user interface 1440 enables adjustment of colors of stripes 1408A-1408H. Electronic device 600 detects user input (e.g., a tap gesture) on a respective stripe in order to enable adjustment of the color of the respective stripe. As shown in FIG. 14AC (e.g., in response to detecting input 1476), electronic device 600 rotates representation 1430 when transitioning from the third page of editing user interface 1440 (shown at FIG. 14AB) to the second page of editing user interface 1440 (shown at FIG. 14AC). In some embodiments, electronic device 600 rotates representation 1430 when transitioning from any page of editing user interface 1440 to the second page of editing user interface 1440. In particular, electronic device 600 rotates representation 1430 to include the horizontal orientation of stripes 1408A-1408H. In some embodiments, when representation 1430 includes the horizontal orientation when displayed in the first page and/or the third page of editing user interface 1440, electronic device 600 maintains display of representation 1430 in the horizontal orientation when transitioning to the second page of editing user interface 1440. The horizontal orientation of representation 1430 can facilitate a user's ability to select a particular stripe of stripes 1408A-1408H by providing uniform targets for a user to select (e.g., via a tap gesture). As such, displaying representation 1430 in the horizontal orientation when electronic device 600 displays the second page of editing user interface 1440 can improve a user's ability to select stripes 1408A-1408H and adjust a particular stripe to a desired color.

FIG. 14AD illustrates examples of user interface 1422 after electronic device 600 ceases to display editing user interface 1440. FIG. 14AD includes first representation 1478 of user interface 1422 and second representation 1480 of user interface 1422 with background 1408 displayed within a circular border. Additionally, FIG. 14AD shows third representation 1482 of user interface 1422 and fourth representation 1484 of user interface 1422 with background 1408 displayed within a rectangular border (e.g., a full screen border that includes the shape of display 602). First representation 1478 and second representation 1480 include complications 1486, 1488, 1490, and 1492 positioned in corners of display 602 and outside of background 1408. Complications 1486, 1488, 1490, and 1492 may be selected and/or edited via user input in a fourth page of editing user interface 1440. Additionally, third representation 1482 and fourth representation 1484 include complications 1494 and 1496 overlaid on background 1408. Complications 1494 and 1496 can also be selected via user input in the fourth page of editing user interface 1440.

FIGS. 15A-15F are a flow diagram illustrating methods of enabling configuration of a background for a user interface, in accordance with some embodiments. Method 1500 is performed at a computer system (e.g., 100, 300, 500, 600) (e.g., a smart device, such as a smartphone or a smartwatch; a mobile device) that is in communication with a display generation component and one or more input devices (e.g., including a touch-sensitive surface that is integrated with the display generation component; a mechanical input device; a rotatable input device; a rotatable and depressible input device; a microphone). Some operations in method 1500 are, optionally, combined, the orders of some operations are, optionally, changed, and some operations are, optionally, omitted.

As described below, method 1500 provides an intuitive way for managing user interfaces related to time. The method reduces the cognitive burden on a user for managing user interfaces related to time, thereby creating a more efficient human-machine interface. For battery-operated computing devices, enabling a user to manage user interfaces related to time faster and more efficiently conserves power and increases the time between battery charges.

The computer system (e.g., 600) displays (1502), via the display generation component (e.g., 602), an editing user interface (e.g., 1406) for editing a background (e.g., 1408) of a user interface (e.g., a home/main user interface; a wake screen user interface; a lock screen user interface; a watch user interface; a watch face that includes an indication of time and one or more watch complications), wherein the user interface includes content (e.g., an indication of time; watch complications; icons; menus; folders) overlaid on the background (1504), and the editing user interface includes a representation of the background of the user interface that includes a first number of stripes (e.g., graphical lines across the background in a vertical or horizontal direction) that is greater than one (e.g., two or more stripes; an even number of repeating two stripes of different colors) (1506).

While displaying the editing user interface (e.g., 1406) (1512), the computer system (e.g., 600) detects (1514), via the one or more input devices, a first user input (e.g., 1403, 1405) (e.g., a rotational input on the rotatable input device; a touch input such as a swipe or pinch input).

In response to detecting the first user input (e.g., 1403) (1518), in accordance with a determination that the first user input corresponds to a first type of input (e.g., an input in a first direction (e.g., a clockwise rotational direction; a first vertical or horizontal direction)), the computer system (e.g., 600) displays (1522), in the user interface, a representation of an updated background (e.g., 1408) with a second number of stripes that is greater than the first number of stripes (e.g., add one or more additional stripes to the background (e.g., add one more stripe; add multiple stripes; add an even number of stripes; double the number of stripes); add one or more additional stripes to the background where the added stripes repeat a pattern (e.g., a repeating color pattern) of the original stripes). In some embodiments, updating the background with the second number of stripes that is greater than the first number of stripes includes moving (e.g., sliding) the new stripes onto the background from an edge of the display (e.g., 602).

In response to detecting the first user input (e.g., 1405) (1518), in accordance with a determination that the first user input corresponds to a second type of input different from the first type of input (e.g., an input in a second direction (e.g., a counter-clockwise rotational direction; a second vertical or horizontal direction)), the computer system (e.g., 600) displays (1524), in the user interface, the representation of the updated background (e.g., 1408) with a third number of stripes that is less than the first number of stripes (e.g., remove one or more stripes from the background (e.g., remove one stripe; remove multiple stripes); if the first number of stripes have a repeating pattern (e.g., a repeating color pattern), remove one or more stripes such that the pattern is maintained within the remaining stripes; if the first number of stripes do not have a repeating pattern (e.g., a repeating color pattern), remove one or more stripes from the background in one direction). In some embodiments, updating the background with the third number of stripes that is less than the first number of stripes includes moving (e.g., sliding) stripes out of the background off of an edge of the display. Changing the number of stripes in the background in accordance with the first user input enables a user to change the number of stripes in the background easily and in an intuitive manner. Providing improved control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 600) detects (1526) (e.g., subsequent to detecting the first input), via the one or more input devices, a second user input (e.g., 1423) (e.g., a request to exit or cease display of the user interface for editing the background).

In response to detecting the second user input (e.g., 1423) (1528), the computer system (e.g., 600) displays (1530), via the display generation component (e.g., 602), the user interface with the updated background (e.g., 1408). In some embodiments, the updated background includes the second number of stripes. In some embodiments, the updated background includes the third number of stripes. Displaying the user interface with the updated background in response to detecting the second user input enables a user to quickly and easily update the background of the current user interface. Providing improved control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface is a watch user interface (e.g., a watch face; a user interface that includes an indication of a current time; a clock user interface for a smartwatch) (1508). In some embodiments, the content is an indication of a current time or current date (1510).

In some embodiments, while displaying the editing user interface (e.g., 1406) (1512), the computer system (e.g., 600) displays (1516), in the editing user interface, a user interface (e.g., a tab (e.g., 1412) within the editing user interface) for editing (e.g., increasing or decreasing) a number of stripes of the representation of the background of the user interface, wherein the user interface for editing the number of stripes includes the representation of the background (e.g., 1408) of the user interface.

In some embodiments, the first number of stripes are arranged in a first visual pattern of stripes of different colors (e.g., a first type of alternating color pattern (e.g., a repeating 2-color pattern; a repeating 3-color pattern)), and second number of stripes are arranged in the first visual pattern of stripes of different colors (e.g., the first type of alternating color pattern (e.g., a repeating 2-color pattern; a repeating 3-color pattern)) (1522). Maintaining the first visual pattern of stripes when the number of stirpes in the background are increased enables efficient editing of a background that includes the number of stripes. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the representation of the updated background (e.g., 1408) with the third number of stripes, wherein the third number of stripes are arranged in a second visual pattern of stripes of different colors (e.g., a second type of alternating color pattern (e.g., a repeating 2-color pattern; a repeating 3-color pattern)) (1532), the computer system (e.g., 600) detects (1534), via the one or more input devices, a third user input (e.g., a rotational input on the rotatable input device; a touch input such as a swipe or pinch input). In some embodiments, in response to detecting the third user input (1536), the computer system displays (1538), in the user interface, the representation of the updated background with the first number of stripes, wherein the first number of stripes are arranged in the second visual pattern of stripes of different colors (e.g., a second type of alternating color pattern (e.g., a repeating 2-color pattern; a repeating 3-color pattern)). Arranging the first number of stripes in the second visual pattern of stripes of different colors (e.g., remembering the previous visual pattern of stripes) in response to detecting the third user input, where the number of stripes were first decreased, then increased via the third user input, enables efficient editing of a background that includes the number of stripes. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the representation of the updated background (e.g., 1408) with the third number of stripes, wherein the third number of stripes are arranged in a third visual pattern of stripes of different colors (e.g., a third type of alternating color pattern (e.g., a repeating 2-color pattern; a repeating 3-color pattern)), the computer system (e.g., 600) detects, via the one or more input devices, a fourth user input (e.g., a rotational input on the rotatable input device; a touch input such as a swipe or pinch input), wherein no other inputs were detected between displaying the representation of the updated background with the third number to detecting the fourth user input (e.g., there were no intervening operations on the computer system from updating the representation of the updated background to include the third number of stripes to detecting the fourth user input). In some embodiments, in response to detecting the fourth user input, displaying, in the user interface, the representation of the updated background with the first number of stripes, wherein the first number of stripes are arranged in the third visual pattern of stripes of different colors (e.g., the third type of alternating color pattern (e.g., a repeating 2-color pattern; a repeating 3-color pattern)). Arranging the first number of stripes in the third visual pattern of stripes of different colors (e.g., remembering the previous visual pattern of stripes) in response to detecting the fourth user input, where the number of stripes were first decreased, then increased via the fourth user input (e.g., and no intervening inputs were detected between the decreasing and increasing of the number of stripes), enables efficient editing of a background that includes the number of stripes. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Alternatively, in some embodiments, while displaying the representation of the updated background (e.g., 1408) with the third number of stripes, where the third number of stripes are arranged in the third visual pattern of stripes of different colors, the computer system (e.g., 600) detects one or more intervening inputs directed to causing display of a different user interface and/or causing display of a different page than a current page of the editing user interface, then detects the fourth user input. In some embodiments, in response to detecting the fourth user input, the computer system displays or causes display of, in the user interface, the representation of the updated background with the first number of stripes, where the first number of stripes are still arranged in the third visual pattern of stripes of different colors (e.g., the third type of alternating color pattern (e.g., a repeating 2-color pattern; a repeating 3-color pattern)).

In some embodiments, while displaying the representation of the updated background (e.g., 1408) with the third number of stripes, wherein the third number of stripes are arranged in a fourth visual pattern of stripes of different colors (e.g., a fourth type of alternating color pattern (e.g., a repeating 2-color pattern; a repeating 3-color pattern)), the computer system (e.g., 600) detects, via the one or more input devices, a user input directed to performing an operation that does not include changing the third number of stripes of the representation of the updated background to a different number of stripes. In some embodiments, performing the operation includes displaying a user interface different from the editing user interface. In some embodiments, performing the operation includes editing a different aspect/feature of the representation of the updated background than changing or other modifying the stripes within the representation of the updated background (e.g., editing features of a watch face (e.g., watch face style; watch complications) having the updated background as the background).

In some embodiments, in response to detecting the user input directed to performing the operation, the computer system (e.g., 600) ceases display of the representation of the updated background (e.g., 1408) (e.g., and exiting the user interface for editing the number of stripes and displaying (e.g., replacing display of the user interface for editing the number of stripes with) a different user interface for performing the operation that does not include changing the third number of stripes of the representation of the updated background to a different number of stripes).

In some embodiments, subsequent to ceasing display of the representation of the updated background (e.g., 1408), the computer system (e.g., 600) detects, via the one or more input devices, a fifth user input (e.g., a rotational input on the rotatable input device; a touch input such as a swipe or pinch input).

In some embodiments, in response to detecting the fifth user input, the computer system (e.g., 600) displays, in the user interface, the representation of the updated background (e.g., 1408) with the first number of stripes, wherein the first number of stripes are arranged in a fifth visual pattern of stripes of different colors (e.g., the fifth type of alternating color pattern (e.g., a repeating 2-color pattern; a repeating 3-color pattern)) that is different from the fourth visual pattern of stripes of different colors. Arranging the first number of stripes with the fifth visual pattern of stripes of different colors that is different from the fourth visual pattern of stripes of different colors in response to detecting the fifth user input, where the number of stripes were first decreased, then increased via the fifth user input, and there were intervening operations between the decreasing and increasing of the number of stripes, enables efficient editing of a background that includes the number of stripes by enabling a user to easily maintain the current visual pattern of stripes. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the editing user interface (e.g., 1406), the computer system (e.g., 600) detects, via the one or more input devices (e.g., a touch-sensitive surface that is integrated with the display generation component (e.g., 602)), an input (e.g., 1407; a press-and-hold input; a touch-and-hold input) directed to a first stripe (e.g., 1408D; a stripe of the first number of stripes of the representation of the background (e.g., 1408). In some embodiments, in response to detecting the input directed to the first stripe, the computer system displays, in the editing user interface, an indication (e.g., 1416) (e.g., a visual indication (e.g., a tab, a box) surrounding or within the selected stripe indicating that the stripe has been selected, and that it can be modified) that the first stripe is selected for editing (e.g., editing for a different visual characteristic (e.g., a different color)). Transitioning through different selectable colors in response to detecting the rotational input enables a user to quickly and easily transition through the different selectable colors. Providing improved control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the indication (e.g., 1416) that the first stripe is selected for editing, the computer system (e.g., 600) detects, via the one or more input devices (e.g., a rotatable input device; a rotatable and depressible input device), a rotational input (e.g., 1409) (e.g., a rotational input on the rotatable input device; a touch input such as a swipe or pinch input). In some embodiments, in response to (e.g., and while) detecting the rotational input, the computer system transitions from a first color to a second color different from the first color (e.g., such that the second color is now set as the current color for the first stripe). In some embodiments, the transition from the first color to the second color includes, while detecting the rotational input, transitioning from the first color, through a plurality of different colors), to the second color. In some embodiments, the first stripe is edited without editing other stripes of the first number of stripes. Displaying the indication that the second stripe is selected for editing in response to detecting the input corresponding to the drag gesture enables efficient editing of a respective stripe of the background. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the editing user interface (e.g., 1406) includes, in accordance with a determination that the editing user interface is in a first editing mode (e.g., an editing mode for changing the number of respective stripes in the background), the representation of the background (e.g., 1408) of the user interface includes displaying respective stripes in the background with visually distinguishable spaces between the respective stripes. In some embodiments, displaying the editing user interface includes, in accordance with a determination that the editing user interface is in a second editing mode (e.g., an editing mode for changing a visual characteristic, such as a color, of one or more stripes in the background; an editing mode for rotating the respective stripes in the background) different from the first editing mode, the representation of the background includes displaying the respective stripes in the background without visually distinguishable spaces between the respective stripes.

In some embodiments, while displaying the editing user interface (e.g., 1406), the computer system (e.g., 600) detects, via the one or more input devices (e.g., a touch-sensitive surface that is integrated with the display generation component), an input (e.g., 1411) on the representation of the background corresponding to a drag gesture (e.g., a finger touch drag gesture), wherein the drag gesture is detected across a plurality of stripes of the first number of stripes, beginning at an first stripe and ending at a second stripe (e.g., and including one or more stripes between the initial stripe and the final stripe). In some embodiments, in response to detecting the input corresponding to the drag gesture, the computer system displays, in the editing user interface, an indication (e.g., a visual indication (e.g., a tab, a box) surrounding or within the selected stripe indicating that the stripe has been selected, and that it can be modified) that the second stripe (e.g., the stripe that is displayed at a location that corresponds to a location in the user interface at which the drag gesture ended) is selected for editing (e.g., editing for a different visual characteristic (e.g., a different color)). Enabling the selection of a second stripe within the background using a drag gesture, where the drag gesture is detected beginning at the first stripe and ending at the second stripe, provides a convenient and intuitive method for selecting a different stripe in the background (e.g., without needing to provide additional controls for enabling selection of the second stripe). Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently In some embodiments, the computer system (e.g., 600) displays, via the display generation component (e.g., 602), the editing user interface (e.g., 1406) for editing the background of the user interface (e.g., including a respective number of stripes) in a second editing mode (e.g., an editing mode for rotating the stripes in the background; different from the current editing mode for changing the number of stripes in the background). In some embodiments, the while displaying the editing user interface for editing the background of the user interface, the computer system detects, via the one or more input devices (e.g., via a touch-sensitive surface that is integrated with the display generation component), an input (e.g., a swipe input (e.g., a horizontal swipe input)) directed to changing an editing mode. In some embodiments, in response to detecting the input directed to changing the editing mode, the computer system displays or causes display of the editing user interface in the second editing mode. Enabling quick and easy changing of an editing mode for editing a different feature/characteristic of a user interface, while maintaining display of the editing user interface (e.g., without needing to exit the editing user interface), enables the editing of user interfaces in an efficient manner and reduces the inputs required to edit the user interface. Reducing the number of inputs needed to perform an operation and providing improved control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, via the display generation component (e.g., 602), the editing user interface (e.g., 1406) for editing the background (e.g., 1408) of the user interface (e.g., including the respective number of stripes) in the second editing mode, the computer system detects, via the one or more input devices (e.g., a rotatable input device; a rotatable and depressible input device), a rotational input (e.g., a rotational input on the rotatable input device; a touch input such as a swipe or pinch input).

In some embodiments, in response to (e.g., and while) detecting the rotational input (e.g., 1415), the computer system (e.g., 600) rotates the representation of the background (e.g., 1408) (e.g., including the respective number of stripes) (e.g., rotating with the center of the display generation component as the axis point) in accordance with the detected rotational input. In some embodiments, if the rotational input is in a clockwise direction, the (stripes within) the representation of the background is also rotated in the clockwise direction. In some embodiments, if the rotational input is in a counter-clockwise direction, the (stripes within) the representation of the background is also rotated in the counter-clockwise direction. In some embodiments, the representation of the background, including its respective number of stripes, are rotated with the center of the display generation component as the axis point for the rotation. In some embodiments, the respective number of stripes of the representation of the background maintain their straight shape (e.g., maintain their straightness as stripes) while they are being rotated about the axis point. Rotating the representation of the background in accordance with the detected rotational input enables efficient editing of a feature/characteristic of the background. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, rotating the representation of the background (e.g., 1408) includes rotating the representation of the background by predefined rotational increments (e.g., 1 degree, 2 degree, 5 degree, by 10 degree increments; by 15 degree increments; by 30 degree increments) with respect to a rotational axis point (e.g., the center of the display generation component (e.g., 602)).

In some embodiments, rotating the representation of the background (e.g., 1408) includes changing (e.g., increasing; decreasing) a characteristic (e.g., thickness; size; area) of a respective stripe within the representation of the background as the representation of the background is being rotated in accordance with the rotational input (e.g., 1415).

In some embodiments, the computer system (e.g., 600) displays, via the display generation component (e.g., 602), the user interface with the updated background (e.g., 1408). In some embodiments, while displaying the user interface with the updated background (e.g., a watch user interface (e.g., watch face) with the updated background; a home user interface or main user interface with the updated background), the computer system detects, via the one or more input devices (e.g., a rotatable input device; a rotatable and depressible input device), a rotational input (e.g., 1415) (e.g., a rotational input on the rotatable input device; a touch input such as a swipe or pinch input). In some embodiments, in response to (e.g., and while) detecting the rotational input, the computer system rotates the updated background (e.g., with the center of the display generation component as the axis point) within the user interface in accordance with the detected rotational input. In some embodiments, if the rotational input is in a clockwise direction, the (stripes within) the updated background is also rotated in the clockwise direction. In some embodiments, if the rotational input is in a counter-clockwise direction, the (stripes within) the updated background is also rotated in the counter-clockwise direction. Enabling the updated background to be rotated based on the rotational input, where the direction of rotation of the updated background is based on direction of rotation of the input, provides an efficient and intuitive method for editing a feature of the updated background. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the content is a first complication. In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on the display. In some embodiments, complications occupy respective locations at particular regions of a watch face (e.g., lower-right, lower-left, upper-right, and/or upper-left). In some embodiments, the computer system (e.g., 600) displays the user interface with the updated background (e.g., 1408), wherein the first complication includes a primary color (e.g., a color that most visually prominent in the displayed respective complication) that is selected (by the computer system) based on a first color a first stripe of a plurality of stripes in the updated background (e.g., based on the color of the first-in-order stripe in the updated background; based on the color of the stripes that are most common in the updated background). Automatically applying (e.g., without user input) the primary color for the first complication based on the first color of the first stripe of the updated background provides efficient editing/configuration of features of the user interface. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) displays the user interface with the updated background (e.g., 1408), wherein the first complication includes a secondary color (e.g., a color that is second-most visually prominent in the displayed respective complication; a color that is not as visually prominent in the displayed respective complication than the primary color) that is selected (by the computer system) based on a second color from a second stripe, different from the first stripe, of the plurality of stripes in the updated background (e.g., based on the color of the second-in-order stripe; based on the color of the stripe(s) that is not the most common in the updated background). Selecting (e.g., automatically, without user input) the secondary color for the first complication based on the second color from the second stripe reduces the number of user inputs needed to create a respective user interface that includes the updated background. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, rotating the representation (e.g., 1430) of the background (e.g., 1408) includes changing a thickness (e.g., a width) of the first number of stripes (e.g., 1408A-1408H) within the representation (e.g., 1430) of the background (e.g., 1408) as the representation (e.g., 1430) of the background (e.g., 1408) is being rotated in accordance with the rotational input (e.g., 1474). In some embodiments, the thickness of the first number of stripes within the representation of the background are changed uniformly (e.g., each stripe of the first number of stripes changes by the same amount). In some embodiments, the thickness of the first number of stripes changes based on a length of the longest stripe of the first number of stripes on the representation of the background (e.g., the stripes stretch and reduce in thickness as the length of the longest stripe increases). In some embodiments, rotating the representation (e.g., 1430) of the background (e.g., 1408) includes maintaining the first number of stripes (e.g., 1408A-1408H) within the representation (e.g., 1430) of the background (e.g., 1408) (e.g., the thickness of the stripes changes in order to fit the first number of stripes within the shape of the background without changing the first number of stripes).

Changing the thickness of the first number of stripes as the representation of the background is being rotated in accordance with the rotational input enables a user to customize and/or adjust the background in an easy and intuitive manner. Providing improved control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation (e.g., 1430) of the background (e.g., 1408) is within a boundary having a first shape (e.g., a rectangle and/or a square). In some embodiments, the computer system (e.g., 600) displays, via the display generation component (e.g., 602), the editing user interface (e.g., 1440) for editing the background (e.g., 1408) of the user interface (e.g., 1422) (e.g., including a respective number of stripes) in a third editing mode (e.g., an editing mode for changing the representation of the background from a full screen mode to a partial screen mode (e.g., the partial screen mode displays the first number of stripes within a boundary having a different shape from a boundary of the full screen mode)). In some embodiments, while displaying the editing user interface (e.g., 1440) for editing the background (e.g., 1408) of the user interface, the computer system (e.g., 600) detects, via the one or more input devices (e.g., via a touch-sensitive surface that is integrated with the display generation component), an input (e.g., 1454, 1460, 1468, 1472, 1476) (e.g., a swipe input (e.g., a horizontal swipe input)) directed to changing an editing mode. In some embodiments, in response to detecting the input (e.g., 1454, 1460, 1468, 1472, 1476) directed to changing the editing mode, the computer system (e.g., 600) displays or causes display of the editing user interface (e.g., 1440) in the second editing mode.

In some embodiments, the computer system (e.g., 600), while displaying, via the display generation component (e.g., 602), the editing user interface (e.g., 1440) for editing the background (e.g., 1408) of the user interface (e.g., 1422) (e.g., including the respective number of stripes) in the third editing mode, detects, via the one or more input devices (e.g., a rotatable input device; a rotatable and depressible input device), an input (e.g., 1448, 1470) (e.g., a rotational input on the rotatable input device; a touch input such as a swipe or pinch input).

In some embodiments, the computer system (e.g., 600), in response to (e.g., and while) detecting the input (e.g., 1448, 1470), displays the representation (e.g., 1430, 1450) of the background (e.g., 1408) within a boundary having a second shape that is different from the first shape (e.g., the second shape is a circle, oval, and/or a round shape) and changes a thickness of the first number of stripes (e.g., 1408A-1408H) within the representation (e.g., 1430, 1450) of the background (e.g., 1408) (e.g., the first number of stripes is maintained when displaying the representation of the background in the boundary having the second shape, but the thickness of the first number of stripes is changed so that the first number of stripes fit evenly within the boundary having the second shape).

Displaying the representation of the background within a boundary having a second shape that is different from the first shape in response to detecting the input enables a user to customize and/or adjust the background in an easy and intuitive manner. Providing improved control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 600), while displaying the user interface (e.g., 1422), receives (1540) a request (e.g., 1426) to display a watch face (e.g., a request to turn on the display, a request to switch from one watch face to a stripes watch face, or a request to exit an editing mode) with a first arrangement of stripes (e.g., color, thickness, number, angle).

The computer system (e.g., 600), in response (1542) to the request (e.g., 1426) to display the watch face and in accordance with a determination that the first arrangement of stripes is displayed within a first boundary (e.g., a boundary having a first shape and first size), displays (1544) the first arrangement of stripes with a first width.

The computer system (e.g., 600), in response (1542) to the request (e.g., 1426) to display the watch face and in accordance with a determination that the first arrangement of stripes is displayed within a second boundary (e.g., a boundary having a second shape different from the first shape and/or a second size different from the first size) that is different from the first boundary, displays (1546) the first arrangement of stripes with a second width that is different from the first width.

Displaying the first arrangement of stripes with the first width or displaying the first arrangement of stripes with the second width based on a boundary of the first arrangement of stripes reduces a number of inputs needed by the user to customize the background. Reducing the number of inputs needed to customize the background enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 600), while displaying the user interface (e.g., 1422), receives (1540) a request (e.g., 1426) to display a watch face (e.g., a request to turn on the display, a request to switch from one watch face to a stripes watch face, or a request to exit an editing mode) with a first arrangement of stripes (e.g., color, thickness, number, angle).

The computer system (e.g., 600), in response (1542) to the request (e.g., 1426) to display the watch face and in accordance with a determination that the first arrangement of stripes is displayed at a first angle within a first boundary (e.g., a boundary having a first shape and a first size), displays (1548) the first arrangement of stripes with a first width.

The computer system (e.g., 600), in response (1542) to the request (e.g., 1426) to display the watch face and in accordance with a determination that the first arrangement of stripes is displayed at the first angle within a second boundary (e.g., a boundary having a second shape that is different from the first shape and/or a second size different from the first size) that is different from the first boundary, displays (1550) the first arrangement of stripes with a second width (e.g., the first width or a width different from the first width).

The computer system (e.g., 600), in response (1542) to the request (e.g., 1426) to display the watch face and in accordance with a determination that the first arrangement of stripes is displayed at a second angle that is different from the first angle within the first boundary, displays (1552) the first arrangement of stripes with the first width (e.g., the first boundary includes a circular shape such that the width of the first arrangement of stripes do not change based on an angle of the first arrangement of stripes).

The computer system (e.g., 600), in response (1542) to the request (e.g., 1426) to display the watch face and in accordance with a determination that the first arrangement of stripes is displayed at the second angle within the second boundary, displays (1554) the first arrangement of stripes with a third width that is different from the second width (e.g., the second boundary includes a non-circular shape such that the width of the first arrangement of stripes changes based on the angle of the first arrangement of stripes to fit the first arrangement of stripes evenly within the non-circular shaped boundary).

Displaying the first arrangement of stripes with the first width, the second width, or the third width based on the boundary and an angle of the first arrangement of stripes reduces a number of inputs needed by the user to customize the background. Reducing the number of inputs needed to customize the background enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 600), while displaying the editing user interface (e.g., 1440) for editing the background (e.g., 1408) of the user interface (e.g., 1422) (e.g., including a respective number of stripes) in a fourth editing mode (e.g., the second editing mode, an editing mode for rotating the stripes in the background; different from the editing mode for changing the number of stripes in the background), detects (1556), via the one or more input devices, an input (e.g., 1466, 1474) (e.g., rotational input on the rotatable input device) corresponding to a request to rotate the representation (e.g., 1430, 1450) of the background (e.g., 1408).

The computer system (e.g., 600), in response to detecting (1558) the input (e.g., 1466, 1474) and in accordance with a determination that the representation (e.g., 1450) of the background (e.g., 1408) is set to be displayed within a boundary of a first shape (e.g., a circle, an oval, and/or a round shape), rotates (1560) the representation of the background without adjusting a thickness of the first number of stripes (e.g., 1408A-1408H) within the representation (e.g., 1450) of the background (e.g., 1408) (e.g., rotating the representation of the background when displayed within the boundary having the first shape does not adjust a thickness of the first number of stripes).

The computer system (e.g., 600), in response to detecting (1558) the input (e.g., 1466, 1474) and in accordance with a determination (1562) that the representation (e.g., 1430) of the background (e.g., 1408) is set to be displayed within a boundary of a second shape (e.g., a square and/or a rectangle), rotates (1564) the representation (e.g., 1430) of the background (e.g., 1408) and adjusts (1566) (e.g., changing, increasing, decreasing) the thickness of the first number of stripes (e.g., 1408A-1408H) as the representation (e.g., 1430) of the background (e.g., 1408) is rotated.

Adjusting the thickness of the first number of stripes or forgoing adjusting the thickness of the first number of stripes based on a shape of the boundary of the background reduces a number of inputs needed by the user to customize the background. Reducing the number of inputs needed to customize the background enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 600), while displaying the editing user interface (e.g., 1440) for editing the background (e.g., 1408) of the user interface (e.g., 1422) (e.g., in an editing mode for rotating the representation of the background, in an editing mode for adjusting the first number of stripes, in an editing mode for adjusting the shape of the boundary of the representation of the background, and/or in an editing mode that is not for adjusting the color of a respective stripe of the first number of stripes), detects (1568) an input (e.g., 1454, 1476) corresponding to a request to display the editing user interface for editing the background of the user interface in a fifth editing mode (e.g., an editing mode for changing a color of a respective stripe of the first number of stripes).

The computer system (e.g., 600), in response to detecting the input (e.g., 1454, 1476), displays (1570), via the display generation component (e.g., 602), the editing user interface (e.g., 1440) for editing the background (e.g., 1408) of the user interface (e.g., 1422) (e.g., including a respective number of stripes) in the fifth editing mode (e.g., an editing mode for changing a color of a respective stripe of the first number of stripes), wherein displaying the editing user interface (e.g., 1440) for editing the background (e.g., 1408) of the user interface (e.g., 1422) in the fifth editing mode includes the computer system (e.g., 600), in accordance with a determination that the representation (e.g., 1430, 1450) of the background (e.g., 1408) is in a first position (e.g., a rotational position and/or an angular position where the first number of stripes do not extend horizontally (at a 0 degree angle and/or a 360 degree angle) across display generation component), rotating (1574) the representation (e.g., 1430, 1450) of the background (e.g., 1408) to a second position (e.g., a rotational position and/or an angular position where the first number of stripes extend horizontally (at a 0 degree angle and/or a 360 degree angle) across display generation component) and displaying (1576) the representation (e.g., 1430, 1450) of the background (e.g., 1408) in the second position (e.g., a rotational position and/or an angular position where the first number of stripes extend horizontally (at a 0 degree angle and/or a 360 degree angle) across display generation component) in the editing user interface (e.g., 1440) for editing the background (e.g., 1408) of the user interface (e.g., 1422) in the fifth editing mode.

The computer system (e.g., 600), in response to detecting the input (e.g., 1454, 1476), displays (1570), via the display generation component (e.g., 602), the editing user interface (e.g., 1440) for editing the background (e.g., 1408) of the user interface (e.g., 1422) (e.g., including a respective number of stripes) in the fifth editing mode (e.g., an editing mode for changing a color of a respective stripe of the first number of stripes), wherein displaying the editing user interface (e.g., 1440) for editing the background (e.g., 1408) of the user interface (e.g., 1422) in the fifth editing mode includes the computer system (e.g., 600), in accordance with a determination that the representation (e.g., 1430, 1450) of the background (e.g., 1408) is in the second position (e.g., a rotational position and/or an angular position where the first number of stripes extend horizontally (at a 0 degree angle and/or a 360 degree angle) across display generation component), maintaining (1578) display of the representation (e.g., 1430, 1450) of the background (e.g., 1408) in the second position (e.g., a rotational position and/or an angular position where the first number of stripes extend horizontally (at a 0 degree angle and/or a 360 degree angle) across display generation component) in the editing user interface (e.g., 1440) for editing the background (e.g., 1408) of the user interface (e.g., 1422) in the fifth editing mode.

Displaying the representation of the background in the second position while the computer system displays the editing user interface for editing the background of the user interface in the fifth editing mode facilitates a user's ability to select a particular stripe of the first number of stripes, which reduces a number of inputs needed by the user to customize the background. Reducing the number of inputs needed to customize the background enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the editing user interface (e.g., 1440) for editing the background (e.g., 1408) of the user interface (e.g., 1422) in the fifth editing mode includes, in accordance with a determination that the representation (e.g., 1430, 1450) of the background (e.g., 1408) is in a third position (e.g., a rotational position and/or an angular position where the first number of stripes do not extend horizontally (at a 0 degree angle and/or a 360 degree angle) across display generation component) (e.g., a position different from the first position and the second position), rotating the representation (e.g., 1430, 1450) of the background (e.g., 1408) to the second position (e.g., a rotational position and/or an angular position where the first number of stripes are in a predetermined orientation such as a horizontal orientation (at a 0 degree angle and/or a 360 degree angle), a vertical orientation, and/or another predetermined orientation) and displaying the representation (e.g., 1430, 1450) of the background (e.g., 1408) in the second position (e.g., a rotational position and/or an angular position where the first number of stripes extend horizontally (at a 0 degree angle and/or a 360 degree angle) across display generation component) in the editing user interface (e.g., 1440) for editing the background (e.g., 1408) of the user interface (e.g., 1422) in the fifth editing mode.

Displaying the representation of the background in the second position while the computer system displays the editing user interface for editing the background of the user interface in the fifth editing mode facilitates a user's ability to select a particular stripe of the first number of stripes, which reduces a number of inputs needed by the user to customize the background. Reducing the number of inputs needed to customize the background enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1500 (e.g., FIGS. 15A-15F) are also applicable in an analogous manner to the methods described above and below. For example, method 700 optionally includes one or more of the characteristics of the various methods described above with reference to method 1500. For example, a background for a user interface as described in FIGS. 14A-14AD can be used as the background for a watch user interface as described in FIGS. 6A-6H. For another example, method 900 optionally includes one or more of the characteristics of the various methods described above with reference to method 1500. For example, a background for a user interface as described in FIGS. 14A-14AD can be used as the background for a watch user interface as described in FIGS. 8A-8M. For another example, method 1100 optionally includes one or more of the characteristics of the various methods described above with reference to method 1500. For example, a device can use as a watch user interface either a watch user interface as described in FIGS. 10A-10AC or a user interface with a background as described in FIGS. 14A-14AD. For another example, method 1300 optionally includes one or more of the characteristics of the various methods described above with reference to method 1500. For example, a device can use as a watch user interface either a watch user interface as described in FIGS. 12A-12G or a user interface with a background as described in FIGS. 14A-14AD. For another example, method 1700 optionally includes one or more of the characteristics of the various methods described above with reference to method 1500. For example, one or more characteristics or features of a user interface that includes a background as described in FIGS. 14A-14AD can be edited via the process for editing characteristics or features of a watch user interface as described with reference to FIGS. 16A-16AE. For brevity, these details are not repeated below.

FIGS. 16A-16AE illustrate exemplary user interfaces for enabling configuration of a user interface (e.g., editing a watch user interface), in accordance with some embodiments. The user interfaces in these figures are used to illustrate the processes described below, including the processes in FIGS. 17A-17D.

FIG. 16A illustrates device 600 displaying, via display 602, a watch user interface 1606 that includes a time region for displaying a current time (e.g., a dial and clock hands indicate the current time) and one or more complication regions for displaying watch complications on watch user interface 1606. In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on display 602. In some embodiments, complications occupy respective locations at particular regions of watch user interface 1606 (e.g., lower-right, lower-left, upper-right, and/or upper-left). In some embodiments the complications are displayed at respective complication regions within watch user interface 1606.

In FIG. 16A, watch user interface 1606 includes a complication 1608 corresponding to a contactable users application, a complication 1610 corresponding to a calendar application, a complication 1612 corresponding to a weather application, and a complication 1614 corresponding to a moon phase application.

In FIG. 16A, while displaying watch user interface 1606, device 600 receives (e.g., detects) an input 1601 on watch user interface 1606. In some embodiments, input 1601 is a touch input (e.g., touch press input) on display 602. In some embodiments, input 1601 is a press-and-hold input on display 602. In response to detecting input 1601, device 600 displays a user interface 1616 that includes a representation 1618 of watch user interface 1606 and an edit affordance 1620 for initiating a process for editing watch user interface 1606, as shown in FIG. 16B.

In FIG. 16B, while displaying user interface 1616, device 600 receives (e.g., detects) an input 1603 directed to selecting edit affordance 1620. In response to detecting input 1603, device 600 displays, via display 602, a first page 1626 (e.g., a style page) of an editing user interface 1622, as shown in FIG. 16C, where editing user interface 1622 includes a representation 1624 of a layout of watch user interface 1606. In some embodiments, first page 1626 of editing user interface 1622 is for editing a style of watch user interface 1606.

In FIG. 16C, while displaying first page 1626 of editing user interface 1622, device 600 receives (e.g., detects) an input 1605 directed to changing the current page of editing user interface 1622 to a second page 1628 (e.g., an editing mode for editing a dial of watch user interface 1606). In some embodiments, input 1605 includes a touch gesture (e.g., a horizontal swipe on display 602) or a rotational input on rotatable input mechanism 603. In response to detecting input 1605, device 600 displays second page 1628 of editing user interface 1606 including representation 1624 of a layout of watch user interface 1606, as shown in FIG. 16D.

In FIG. 16D, while displaying second page 1628 of editing user interface 1622, device 600 receives (e.g., detects) an input 1607 directed to changing the current page of editing user interface 1622 to a third page 1630 (e.g., an editing mode for changing a color (e.g., a background color; a color scheme) of watch user interface 1606). In some embodiments, input 1607 includes a touch gesture (e.g., a horizontal swipe on display 602) or a rotational input on rotatable input mechanism 603. In response to detecting input 1607, device 600 displays third page 1630 of editing user interface 1606 including representation 1624 of a layout of watch user interface 1606, as shown in FIG. 16E. Features of third page 1630 of editing user interface 1622 are described in greater detail below with reference to FIGS. 16V-16X.

In FIG. 16E, while displaying third page 1630 of editing user interface 1622, device 600 receives (e.g., detects) an input 1609 directed to changing the current page of editing user interface 1622 to a fourth page 1632 (e.g., an editing mode for changing one or more complications of watch user interface 1606). In some embodiments, input 1609 includes a touch gesture (e.g., a horizontal swipe on display 602) or a rotational input on rotatable input mechanism 603. In response to detecting input 1609, device 600 displays fourth page 1632 of editing user interface 1606, as shown in FIG. 16F.

In FIG. 16F, device 600 displays, in fourth page 1632 of editing user interface 1622, complication previews 1634-1640 corresponding to complications 1608-1614 of watch user interface 1606, as shown in FIG. 16A. Complication preview 1634 corresponds to complication 1608 for the contactable users application, complication preview 1636 corresponds to complication 1610 for the calendar application. Complication preview 1638 corresponds to complication 1612 for the weather application, and complication preview 1640 corresponds to complication 1614 for the moon phase application.

In FIG. 16F, while displaying complication previews 1634-1640 in editing user interface 1622, device 600 receives (e.g., detects) an input 1611 directed to selecting complication preview 1634 corresponding to complication 1608 for the contactable users application. In some embodiments, input 1611 is a touch input on display 602. In response to detecting input 1611, device 600 displays, via display 602, a complication selection user interface 1642 for selecting a complication to be included in watch user interface 1606 (e.g., to replace complication 1608 in watch user interface 1606), as shown in FIG. 16G.

In FIG. 16G, complication selection user interface 1642 includes a first region 1644 corresponding to the contactable users application (e.g., because the selected complication preview corresponds to the contactable users application). Region 1644 includes a header/label indicating that the region corresponds to the contactable users application and a group of complication previews 1644A-1644E.

In some embodiments, a respective complication preview corresponds to a respective complication that is configured to display a respective set of information obtained from the respective application (e.g., information based on a feature, operation, and/or characteristic of the respective application). The respective complication preview includes a graphical representation of the respective complication displaying the first set of information (e.g., an exemplary representation of the respective complication with an example of the respective set of information).

In some embodiments, when the respective application is associated with a plurality of available complications, complication selection user interface 1642 includes a plurality of complication previews corresponding to the plurality of available complications. For example, in accordance with a determination that the plurality of available complications exceeds a predetermined number of available complications (e.g., more than 5 or 6 complications), device 600 displays a plurality of complication previews that correspond to respective complications of the plurality of available complication along with an affordance for showing one or more additional complication previews of complications in the plurality of available complications (e.g., the plurality of complication previews does not exceed the predetermined number). In FIG. 16G, complication previews 1644A-1644E corresponding to the predetermined number of available complications for the respective application (the contactable users application) are displayed along with affordance 1648 (e.g., a "show more" icon or button). In response to selection of affordance 1648, device 600 displays one or more additional complication previews that were not included in the plurality of complication previews as well as the complication previews that were included in the plurality of complication previews. In some embodiments, in accordance with a determination that the plurality of available complications does not exceed the predetermined number, complication selection user interface 1642 includes a complication preview for all of the available complications, without displaying the affordance (e.g., affordance 1648).

As mentioned, in FIG. 16G, complication selection user interface 1642 includes first region 1644 corresponding to the contactable users application, where the contactable users application is for managing information of a set of contactable users (e.g., user contacts stored in and/or accessible on device 600; user contacts stored in and/or accessible from an address book). A respective complication corresponding to the contactable users application corresponds to a respective contactable user of the set of contactable users. Complication previews 1644A-1644E correspond to respective complications (complication 1608) for five respective contactable users of the set of contactable users.

In some embodiments, in accordance with a determination that a first respective contactable user is a candidate contact (e.g., a favorite contact; a frequent contact; a primary contact) and that a second respective contactable user is not a candidate contact, device 600 displays a first respective complication preview corresponding to the first respective contactable user prior to a second respective complication preview corresponding to the second respective contactable user in the displayed order of the complication previews. In some embodiments, in accordance with a determination that the first respective contactable user is not a candidate contact and that the second respective contactable user is a candidate contact, device 600 displays the second respective complication preview corresponding to the second respective contactable user prior to the first respective complication preview corresponding to the first respective contactable user in the displayed order of the complication previews.

In some embodiments, if there are as many or more candidate contacts than the maximum number of complication previews that are concurrently shown in complication selection user interface 1642 for the contactable users application, as in FIG. 16G, all of the maximum number of complication previews that are shown (1644A-1644E) correspond to candidate contacts (e.g., listed in alphabetical order). In some embodiments, if there are fewer candidate contacts than the maximum number of complication previews that are concurrently shown, the candidate contacts are shown first (e.g., in alphabetical order) and regular contacts (non-candidate contacts) are shown for the remaining complication previews (e.g., separately in alphabetical order).

In FIG. 16G, device 600 displays a visual indication 1646 that complication preview 1644A corresponds to the currently-selected complication for complication 1608 in watch user interface 1606 (e.g., complication preview 1644A is highlighted and/or outlined compared to other complication previews). While displaying complication selection user interface 1642 with complication preview 1644A selected, device 600 receives (e.g., detects) an input 1613 directed to selecting complication preview 1644D. In some embodiments, input 1613 is a touch input on display 602. In some embodiments, input 1613 is a press input on rotatable input mechanism 603 after visual indication 1646 is moved to complication preview 1644D (e.g., via rotation of rotatable input mechanism 603).

In response to receiving input 1613, device 600 removes visual indication 1646 from complication preview 1644A and displays visual indication 1646 for complication preview 1644D, as shown in FIG. 16H, thereby indicating that the complication corresponding to complication preview 1644D has been selected to be used as the complication for complication 1608 in watch user interface 1606.

In FIG. 16H, while complication preview 1644D is selected, device 600 receives (e.g., detects) an input 1615 directed to an affordance 1650 for exiting complication selection user interface 1642 with the newly-selected settings. In some embodiments, input 1615 is a touch input on display 602. In response to receiving input 1615, device 600 displays fourth page 1632 (e.g., an editing mode for changing one or more complications of watch user interface 1606) of editing user interface 1622, where complication preview 1634 for watch user interface 1606 now corresponds to the contactable user corresponding to complication preview 1644D (instead of the contactable user corresponding to complication preview 1644A) in FIGS. 16G-16H, as shown in FIG. 16I.

In FIG. 16I, while displaying fourth page 1632 of editing user interface 1622, device 600 receives (e.g., detects) an input 1617 directed to selecting complication 1634. In some embodiments, input 1617 is a touch input on display 602. In response to detecting input 1617, device 600 displays first region 1644 of complication selection user interface 1642, as shown in FIG. 16J, where first region 1644 includes complication previews 1644A-1644E corresponding to complications for the contactable users application, as first described above with reference to FIG. 16G. As mentioned, first region 1644 of complication selection user interface 1642 includes affordance 1648 that, when selected, causes device 600 to display one or more additional complication previews that were not included in the plurality of complication previews (e.g., in addition to the complication previews that were included in the plurality of complication previews).

In FIG. 16J, while displaying first region 1644 corresponding to the contactable users application of complication selection user interface 1642, device 600 receives (e.g., detects) an input 1619 directed to selecting affordance 1648. In some embodiments, input 1619 is a touch input on display 602. In response to detecting input 1619 directed to affordance 1648, device 600 displays a contactable user selection user interface 1652, as shown in FIG. 16K.

In some embodiments, contactable user selection user interface 1652 includes a first region 1654 for candidate contacts (e.g., favorite contacts; frequent contacts; primary contacts), where first region 1654 includes complication previews 1644A-1644D. Complication previews 1644A-1644D each correspond to a respective contactable user that is designated (e.g., by a user of device 600) as a candidate contact. In some embodiments, contactable user selection user interface 1652 includes a second region 1656 for regular contacts (e.g., non-candidate contacts; non-favorite contacts), where second region 1656 includes complication previews 1644E and 1656A that correspond to respective contactable users that are not designated as candidate contacts. In some embodiments, contactable user selection user interface 1652 can be navigated (e.g., scrolled) to show, in second region 1656, additional complication previews corresponding to respective contactable users that are not designated as candidate contacts.

FIG. 16L illustrates device 600 displaying, via display 602, complication selection user interface 1642 with first region 1644 corresponding to complication previews for the contactable users application, as first described above with reference to FIG. 16G. While displaying first region 1644 of complication selection user interface 1642, device 600 receives (e.g., detects) an input 1621 directed to navigating (e.g., scrolling) complication selection user interface 1642. In some embodiments, input 1621 is a rotational input on rotatable input mechanism 603 shown in FIG. 16L. In some embodiments, input 1621 is a touch input such as a swipe or pinch input.

FIGS. 16M-16O illustrate complication selection user interface 1642 being navigated (e.g., scrolled) in response to input 1621. In FIG. 16M, in response to (e.g., and while) receiving input 1621, device 600 navigates complication selection user interface 1642 from first region 1644 (corresponding to a complication group for contactable users application complications) to a second region 1658 of complication selection user interface 1642, where second region 1658 corresponds to a complication group for a first third-party application In some embodiments, second region 1658 includes complication previews 1658A-1658E corresponding to respective complications that are configured to display, on watch user interface 1606, a respective set of information obtained from the first third-party application. One or more of complication previews 1658A-1658E can include a respective graphical representation of the respective complication displaying the respective set of information. Second region 1658 of complication selection user interface 1642 includes an affordance 1660 that, when selected, causes device 600 to display one or more additional complication previews that were not included in the plurality of complication previews corresponding to the first third-party application in second region 1658 of complication selection user interface 1642.

In FIG. 16N, in response to (e.g., and while) receiving input 1621, device 600 navigates complication selection user interface 1642 from second region 1658 (corresponding to a complication group for the first third-party application complications) to a third region 1662 and a fourth region 1664 of complication selection user interface 1642, where third region 1662 corresponds to a complication group for a second third-party application and fourth region 1664 corresponds to a complication group for a fitness application.

In some embodiments, third region 1662 includes complication previews 1662A-1662B corresponding to respective complications that are configured to display a respective set of information obtained from the second third-party application. One or more of complication previews 1662A-1662B can include a respective graphical representation of the respective complication displaying the respective set of information. In some embodiments, third region 1662 of complication selection user interface 1642 includes fewer than the predetermined number (e.g., 5 or 6) of complication previews that can be included for a respective region in complication selection user interface 1642, and thus no affordance (e.g., affordance 1648; affordance 1660) that, when selected, causes device 600 to display one or more additional complication previews for the respective application, is included.

In some embodiments, fourth region 1664 includes complication previews 1664A-1664B corresponding to respective complications that are configured to display a respective set of information obtained from the fitness application. One or more of complication previews 1662A-1662B can include a respective graphical representation of the respective complication displaying the respective set of information. In some embodiments, fourth region 1664 of complication selection user interface 1642 includes fewer than the predetermined number (e.g., 5 or 6) of complication previews that can be included for a respective region in complication selection user interface 1642, and thus no affordance (e.g., affordance 1648; affordance 1660) that, when selected, causes device 600 to display one or more additional complication previews for the respective application, is included.

In FIG. 16O, in response to (e.g., and after) receiving input 1621, device 600 navigates (e.g., scrolls) complication selection user interface 1642 to a fifth region 1666 of complication selection user interface 1642, where fifth region 1666 corresponds to a complication group for the weather application.

In some embodiments, fifth region 1666 includes complication previews 1666A-1666D corresponding to respective complications that are configured to display, on watch user interface 1606, a respective set of information obtained from the weather application. One or more of complication previews 1666A-1666D can include a respective graphical representation of the respective complication displaying the respective set of information. In some embodiments, fifth region 1666 of complication selection user interface 1642 includes fewer than the predetermined number (e.g., 5 or 6) of complication previews that can be included for a respective region in complication selection user interface 1642, and thus no affordance (e.g., affordance 1648; affordance 1660) that, when selected, causes device 600 to display one or more additional complication previews for the respective application, is included.

FIG. 16P illustrates device 600 displaying, via display 602, a watch user interface 1668 that is different from watch user interface 1606 first described above with reference to FIG. 16A. In FIG. 16P, watch user interface 1668 includes a complication 1670 corresponding to an activity application, complication 1672 corresponding to a calendar application, complication 1674 corresponding to a health application, complication 1676 corresponding to a fitness application, complication 1678 corresponding to a time application, complication 1680 corresponding to a weather application, complication 1682 corresponding to the weather application, and complication 1684 corresponding to the calendar application.

FIG. 16Q illustrates device 600 displaying, via display 602, fourth page 1632 (e.g., an editing mode for changing one or more complications of watch user interface 1606) of editing user interface 1622, including complication preview 1686 corresponding to complication 1670 for the activity application, complication preview 1688 corresponding to complication 1672 for the calendar application, complication preview 1690 corresponding to complication 1674 for the health application, complication preview 1692 corresponding to complication 1676 for the fitness application, complication preview 1694 corresponding to complication 1678 for the time application, complication preview 1696 corresponding to complication 1680 for the weather application, complication preview 1698 corresponding to complication 1682 for the weather application, and complication preview 1699 corresponding to complication 1684 for the calendar application.

In FIG. 16Q, while displaying fourth page 1632 of editing user interface 1622 for watch user interface 1668, device 600 receives (e.g., detects) an input 1625 directed to selecting complication preview 1688 corresponding to complication 1672 for the calendar application. In some embodiments, input 1625 is a touch input on display 602. In response to receiving input 1625, device 600 displays a sixth region 1697 of complication selection user interface 1642 corresponding to a complication group for the calendar application, as shown in FIG. 16R, where sixth region 1697 of complication selection user interface 1642 includes a complication preview 1697A.

In FIG. 16R, complication selection user interface 1642 includes complication preview 1697A in a first shape (e.g., a first layout; a first design; a first outline) that corresponds to how the corresponding complication will be displayed if applied to watch user interface 1668 at the location within watch user interface 1668 corresponding to the current location of complication 1688. In some embodiments, in accordance with a determination that the current watch user interface (e.g., watch user interface 1668) is of a first type (e.g., a watch user interface having a first type of layout, design, and/or configuration), a respective complication preview shown in the complication selection user interface (e.g., complication preview 1697A) includes a graphical representation of the corresponding respective complication in the first shape. In some embodiments, the shape for the respective complication preview is (e.g., at least partly) determined based on the layout, design, and/or configuration of the respective watch user interface for which the corresponding respective complication is to be used. In some embodiments, the shape for a respective complication preview is (e.g., at least partly) determined based on the respective complication region of the one or more complications within the respective watch user interface for which the respective complication is being used.

In FIG. 16Q, while displaying fourth page 1632 of editing user interface 1622 for watch user interface 1668, device 600 receives (e.g., detects) an input 1627 directed to selecting complication preview 1698 corresponding to complication 1682 for the weather application. In some embodiments, input 1627 is a touch input on display 602. In response to receiving input 1627, device 600 displays a region 1693 of complication selection user interface 1642 corresponding to a complication group for the weather application, as shown in FIG. 16S, where region 1693 of complication selection user interface 1642 includes complication previews 1693A-1693D.

In FIG. 16S, complication selection user interface 1642 includes complication previews 1693A-1693D in a second shape (e.g., a second layout; a second design; a second outline) that corresponds to how the corresponding complication will be displayed if applied to watch user interface 1668 at the location within watch user interface 1668 corresponding to the current location of complication 1698. In some embodiments, in accordance with a determination that the current watch user interface (e.g., watch user interface 1668) is of the first type, corresponding respective complication previews shown in the complication selection user interface (e.g., complication previews 1693A-1693D) include respective graphical representations of the corresponding respective complications in the second shape, different from the first shape. In some embodiments, the shape for the respective complication preview is (e.g., at least partly) determined based on the layout, design, and/or configuration of the respective watch user interface for which the corresponding respective complication is to be used. In some embodiments, the shape for a respective complication preview is (e.g., at least partly) determined based on the respective complication region of the one or more complications within the respective watch user interface for which the respective complication is being used.

In FIG. 16S, while displaying region 1693 of complication selection user interface 1642, device 600 receives (e.g., detects) an input 1631 directed to selecting complication preview 1693C. In some embodiments, input 1631 is a touch input on display 602. In response to receiving input 1631, device 600 visually indicates that complication preview 1693C has been selected, as shown in FIG. 16T (e.g., complication preview 1693C is outlined, highlighted, etc. compared to other complication previews to visually distinguish complication preview 1693C from other complication previews).

In FIG. 16T, while complication preview 1693C is selected, device 600 receives (e.g., detects) an input 1633 directed to affordance 1650 for exiting complication selection user interface 1642 with the newly-selected settings. In some embodiments, input 1633 is a touch input on display 602. In response to receiving input 1633, device 600 displays fourth page 1632 (e.g., an editing mode for changing one or more complications of watch user interface 1668) of editing user interface 1622, as shown in FIG. 16U, where complication preview 1698 for watch user interface 1668 now corresponds to complication preview 1693C selected in FIGS. 16S-16T.

In FIG. 16U, while displaying fourth page 1634 of editing user interface 1622, device 600 receives (e.g., detects) an input 1635 directed to changing the current page of editing user interface 1622 to third page 1630 (e.g., an editing mode for changing a color of watch user interface 1668). In some embodiments, input 1635 includes a gesture (e.g., a horizontal swipe on display 602; a rotational input on rotatable input mechanism 603). In response to detecting input 1635, device 600 displays third page 1630 of editing user interface 1622 including representation 1691 of a layout of watch user interface 1668, as shown in FIG. 16V.

In FIG. 16V, third page 1630 of editing user interface 1622 includes a navigable (e.g., scrollable) user interface element 1689 that includes a plurality of selectable colors (e.g., to be used as a background color for watch user interface 1668; to be applied as a color scheme to watch user interface 1668). In some embodiments, user interface element 1689 includes a color wheel with colors represented in selectable circles.

In FIG. 16V, while displaying third page 1630 of editing user interface 1622 including user interface element 1689, device 600 receives (e.g., detects) an input 1637. In some embodiments, input 1637 is a rotational input on rotatable input mechanism 603 shown in FIG. 16V. In some embodiments, input 1637 is a touch input such as a swipe or pinch input.

In response to (e.g., and while) receiving input 1637, device 600 navigates through the plurality of selectable colors in user interface 1689. In some embodiments, as the plurality of selectable colors are being navigated via user interface element 1689, device 600 indicates (e.g., by highlighting; by bolding; by visually emphasizing) the currently-selected color.

In some embodiments, in response to receiving input 1637, device 600 navigates through the plurality of selectable colors in user interface element 1689 to an end (e.g., top or bottom) of user interface element 1689, as shown in FIG. 16W. In some embodiments, user interface element 1689 includes, at the end of user interface element 1689, an indication 1687 that more colors are available for selection. In FIG. 16W, in response to reaching the end of user interface element 1689, device 600 displays an affordance 1685 that, when selected, causes display of the additional selectable colors.

In FIG. 16W, while displaying affordance 1685, device 600 receives (e.g., detects) an input 1639 directed to affordance 1685. In some embodiments, input 1639 is a touch input on display 602. In response to detecting input 1639, device 600 displays an additional color selection user interface 1683 that includes one or more groups (e.g., group 1681) of additional selectable colors (e.g., group 1681 including at least additional selectable colors 1681A-1681D), as shown in FIG. 16X. In some embodiments, additional color selection user interface 1683 can be navigated (e.g., scrolled) for more groups of additional selectable colors. In some embodiments, a group of colors includes similar colors (e.g., a similar range of colors; colors of a common shade or theme). In some embodiments, a group of colors includes colors from a common period (e.g., a particular season of a particular year). In some embodiments, the plurality of selectable colors included in user interface element 1689 corresponds to common colors and/or frequently used colors. In some embodiments, the plurality of additional selectable colors included in additional color selection user interface 1683 corresponds to less-common colors and/or less-frequently used colors.

Figures 16Y, 16Z:
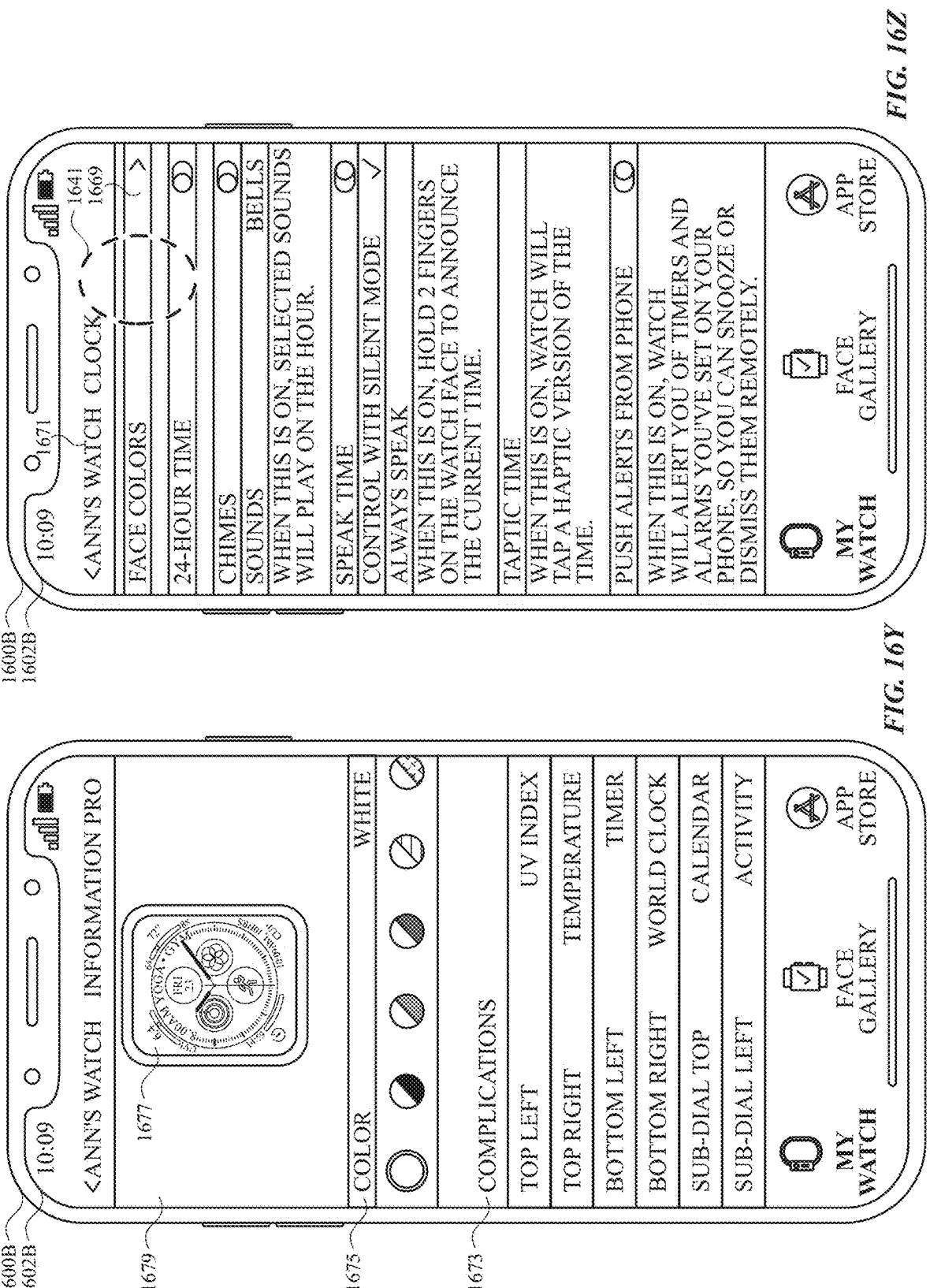
FIGS. 16A-16AE illustrate exemplary user interfaces for enabling configuration of a user interface, in accordance with some embodiments.
Figure 16A:
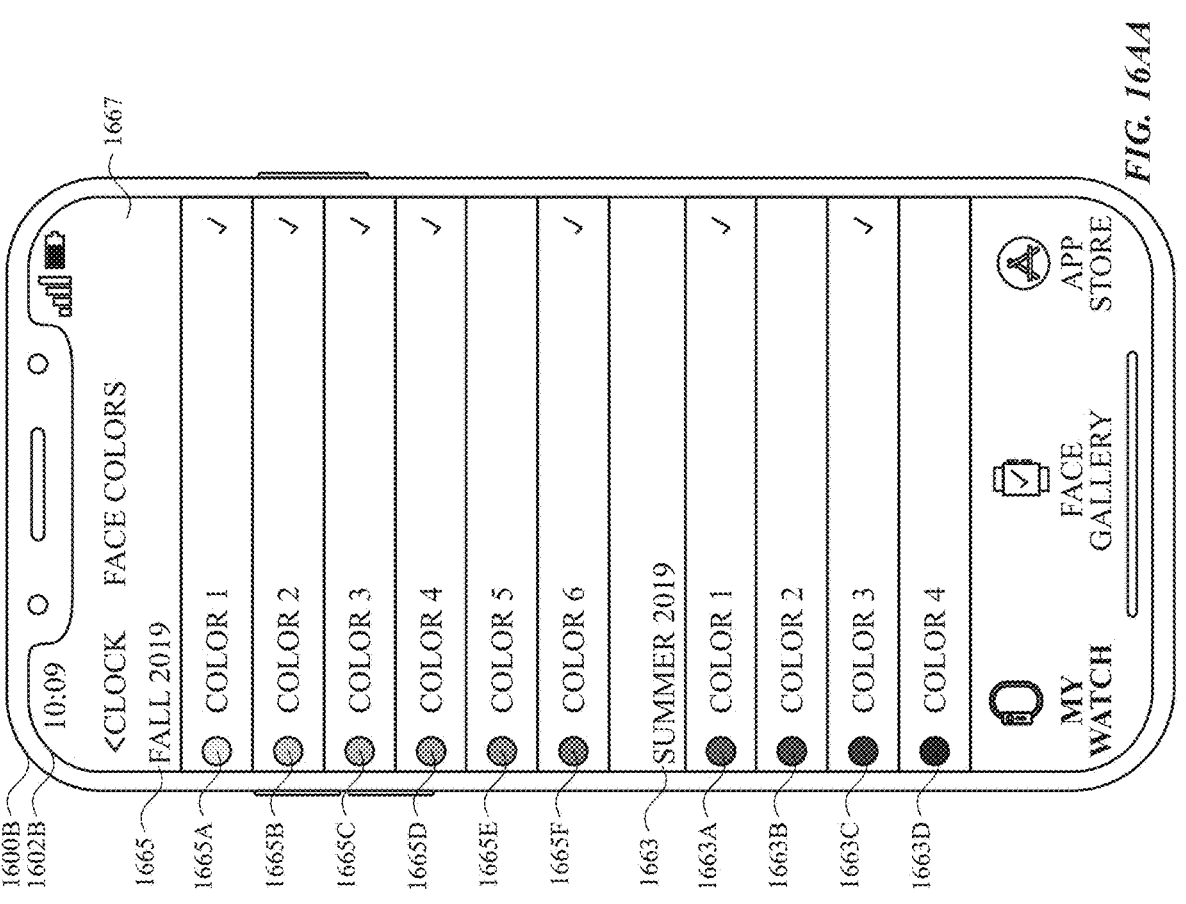
Figure 17B:
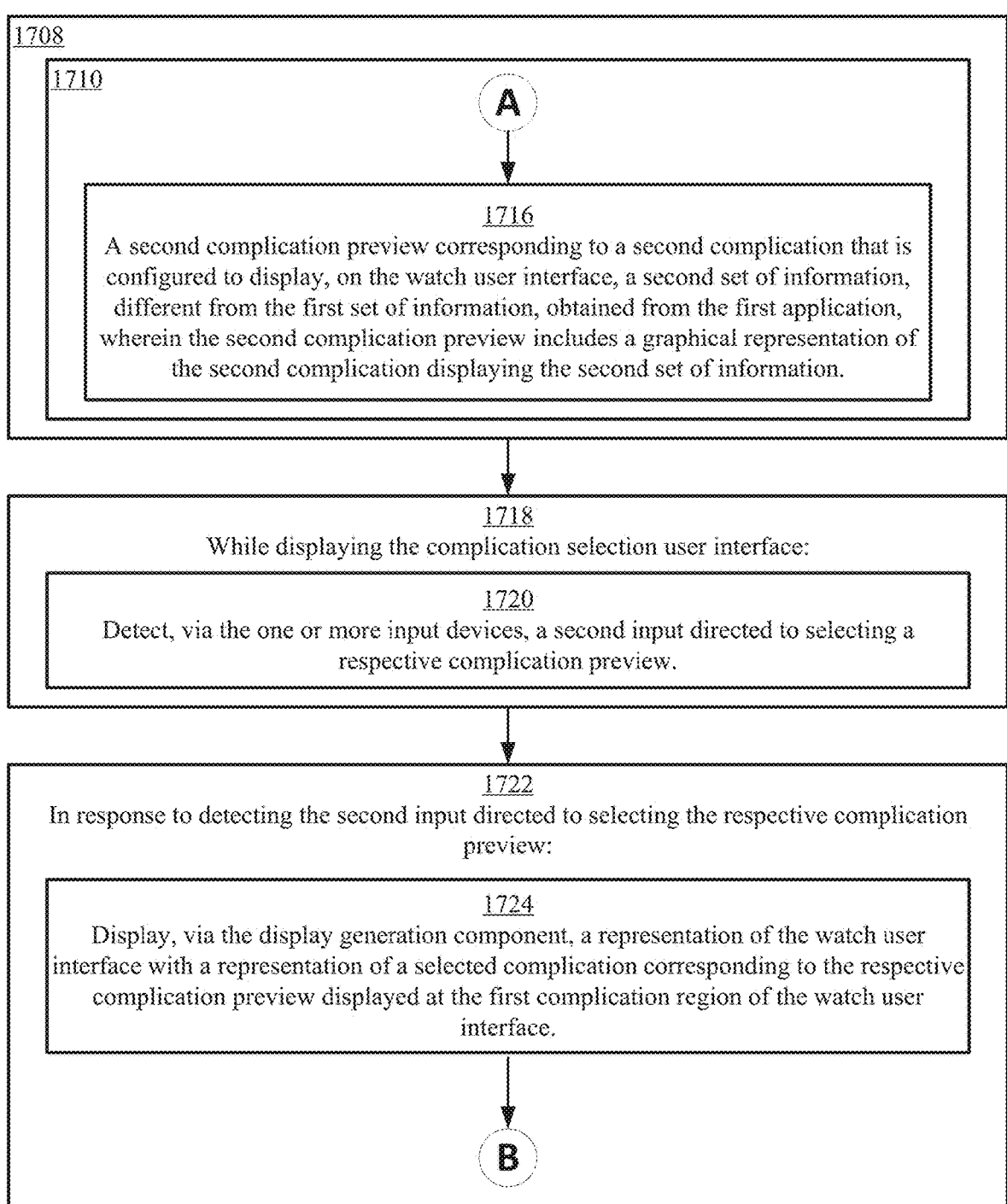
Figure 17C:
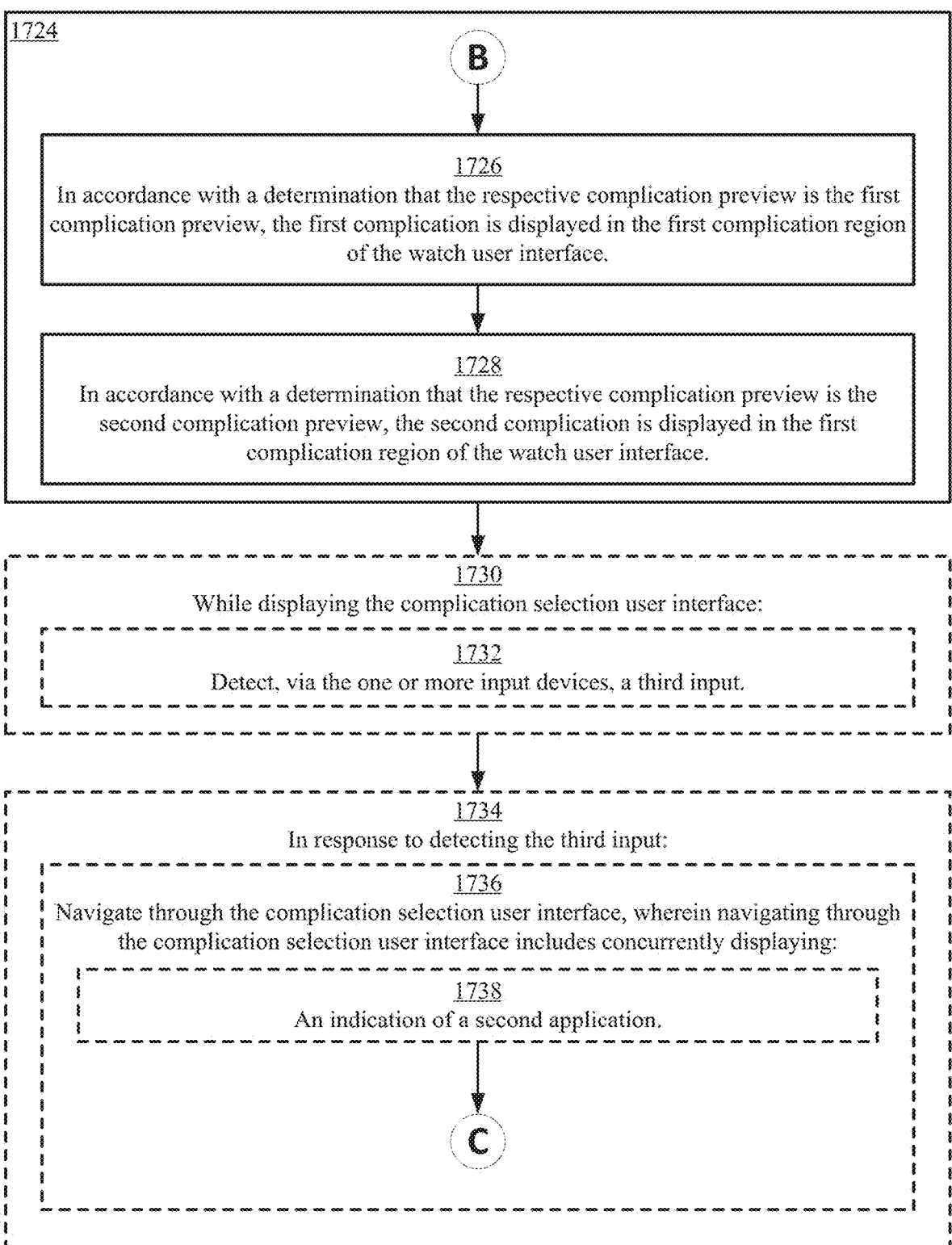

FIG. 16Y illustrates a second device 600B (e.g., a smartphone) displaying, via a display 602B, a first user interface 1679 of a companion application. In some embodiments, device 600B is paired with device 600. In some embodiments, the companion application on device 600B can be used to edit, configure, and/or modify settings or features of device 600 and/or applications that are installed on device 600.

In some embodiments, first user interface 1679 includes a watch user interface representation 1677 corresponding to a representation of a watch user interface (e.g., watch user interface 1668; a watch user interface that is currently selected to be used on device 600). In some embodiments, first user interface 1679 includes a colors region 1675 that includes a plurality of selectable colors that can be applied to the watch user interface (e.g., as a background color or for a color scheme). Similar to third page 1630 of editing user interface 1622 of device 600, a color can be selected from color region 1675 to be applied to the watch user interface. In some embodiments, first user interface 1679 includes a complications region 1673 that indicates and enables changes to the current complications that are selected for the watch user interface.

FIG. 16Z illustrates device 600B displaying, via display 602B, a second user interface 1671 of the companion application, where second user interface 1671 includes a selectable user interface element 1669 for managing/editing a color(s) of the watch user interface. In FIG. 16Z, while displaying second user interface 1671 of the companion application, device 600B receives (e.g., detects) an input 1641 directed to user interface element 1669. In some embodiments, input 1641 is a touch input on display 602B. In response to receiving (e.g., detecting) input 1641, device 600B displays, via display 602, an additional color selection user interface 1667 of the companion application, as shown in FIG. 16AA.

Similar to additional color selection user interface 1683 described above with reference to FIG. 16X, additional color selection user interface 1667 of FIG. 16AA includes one or more groups (e.g., groups 1665 and 1663) of additional selectable colors (e.g., group 1665 including additional selectable colors 1665A-1665F and group 1663 including at least additional selectable colors 1663A-1663D), as shown in FIG. 16AA. In some embodiments, additional color selection user interface 1667 can be navigated (e.g., scrolled) for more groups of additional selectable colors. In some embodiments, the plurality of selectable colors included in color region 1675 of first user interface 1679 of the companion application corresponds to common colors and/or frequently used colors. In some embodiments, the plurality of additional selectable colors included in additional color selection user interface 1667 of the companion application corresponds to less-common colors and/or less-frequently used colors.

FIG. 16AB-16AE, as described below, illustrate device 600 displaying, in region 1693 of complication selection user interface 1642, the complication previews 1693A-1693D for respective corresponding complications of the weather application, where the shape of each respective complication preview is automatically adjusted or modified.

In FIG. 16AB, complication previews 1693A-1693D corresponding to complications of the weather application are displayed with a first shape (e.g., a first layout; a first design; a first type of outline). In some embodiments, complication previews 1693A-1693D in the first shape, as in FIG. 16AB, correspond to a first complication region (e.g., the top-left-corner region, thus being the top-left-corner complication) of watch user interface 1668.

In FIG. 16AC, complication previews 1693A-1693D corresponding to complications of the weather application are displayed, in complication selection user interface 1642, with a second shape. In some embodiments, complication previews 1693A-1693D in the second shape, as in FIG. 16AC, correspond to a second complication region (e.g., the top-right-corner region, thus being the top-right-corner complication) of watch user interface 1668.

In FIG. 16AD, complication preview 1693B corresponding to a complication of the weather application is displayed, in complication selection user interface 1642, with a third shape. In some embodiments, complication preview 1693B in the third shape, as in FIG. 16AD, corresponds to a third complication region (e.g., the top-bezel region, thus being the top-bezel complication) of watch user interface 1668.

In FIG. 16AD, complication previews 1693C-1693D corresponding to complications of the weather application are displayed, in complication selection user interface 1642, with a fourth shape. In some embodiments, complication previews 1693C-1693D in the fourth shape, as in FIG. 16AD, correspond to a fourth complication region (e.g., one of the (e.g., 4 possible) inner-dial regions, thus being one of the inner-dial complications) of watch user interface 1668.

In FIG. 16AE, complication previews 1693A-1693D corresponding to complications of the weather application are displayed, in complication selection user interface 1642, with the fourth shape. In some embodiments, complication previews 1693A-1693D in the fifth shape, as in FIG. 16AE, correspond to the fourth complication region (e.g., one of the inner-dial regions) of watch user interface 1668. In some embodiments, as shown by complication preview 1693B as shown in FIG. 16AD and complication preview 1693B as shown in FIG. 16AE, the same complication for the same application can be include in a respective watch user interface with different shapes based on the type of the respective watch user interface and/or the respective complication region within the respective watch user interface for which the complication is being used.

As mentioned above, in some embodiments, the shape for the respective complication preview is (e.g., at least partly) determined based on the layout, design, and/or configuration of the respective watch user interface (e.g., watch user interface 1668) for which the corresponding respective complication is to be used. As also mentioned above, in some embodiments, the shape for a respective complication preview is (e.g., at least partly) determined based on the respective complication region of the one or more complications within the respective watch user interface for which the respective complication is being used.

FIGS. 17A-17D are a flow diagram illustrating methods of enabling configuration of a background for a user interface, in accordance with some embodiments. Method 1700 is performed at a computer system (e.g., 100, 300, 500, 600) (e.g., a smart device, such as a smartphone or a smartwatch; a mobile device) that is in communication with a display generation component and one or more input devices (e.g., including a touch-sensitive surface that is integrated with the display generation component; a mechanical input device; a rotatable input device; a rotatable and depressible input device; a microphone). Some operations in method 1700 are, optionally, combined, the orders of some operations are, optionally, changed, and some operations are, optionally, omitted.

As described below, method 1700 provides an intuitive way for managing user interfaces related to time. The method reduces the cognitive burden on a user for managing user interfaces related to time, thereby creating a more efficient human-machine interface. For battery-operated computing devices, enabling a user to manage user interfaces related to time faster and more efficiently conserves power and increases the time between battery charges.

In some embodiments, prior to displaying the watch face editing user interface (e.g., 1622), the computer system (e.g., 600) displays or causes display of the watch user interface (e.g., 1606, 1668) (e.g., a watch face). In some embodiments, the watch user interface includes a dial that indicates a current time. In some embodiments, the watch user interface includes one or more complications (e.g., 1608, 1610, 1612, 1614, 1670, 1672, 1674, 1676, 1678, 1680, 1682, 1684) corresponding to respective applications that indicate respective sets of information (e.g., a date; a calendar event; weather; contacts). In some embodiments, the complications are displayed at respective complication regions within the watch user interface.

In some embodiments, while displaying the watch user interface (e.g., 1606, 1668), the computer system (e.g., 600) detects an input (e.g., 1601, 1603) (e.g., a press input; a press-and-hold input) on the watch user interface. In some embodiments, in response to detecting the input on the watch user interface, the computer system displays or causes display of the watch face editing user interface (e.g., 1622).

The computer system (e.g., 600) displays (1702), via the display generation component (e.g., 602), a watch face editing user interface (e.g., 1622), wherein the watch face editing user interface includes a representation of a layout of a watch user interface (e.g., 1624) (e.g., a watch face; a user interface for a watch that includes an indication of a time and/or date) including a time region for displaying a current time and one or more complication regions for displaying complications on the watch user interface. In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that, when selected, launches a corresponding application. In some embodiments, a complication is displayed at a fixed, predefined location on the display. In some embodiments, complications occupy respective locations at particular regions of a watch face (e.g., lower-right, lower-left, upper-right, and/or upper-left).

While displaying the watch face editing user interface (e.g., 1622) (1704), the computer system (e.g., 600) detects (1706), via the one or more input devices, a first input (e.g., 1611, 1617) (e.g., a first user selection) directed to a complication region of the one or more complication regions (e.g., regions corresponding to complications 1608, 1610, 1612, 1614; regions corresponding to complications 1670, 1672, 1674, 1676, 1678, 1680, 1682, 1684) (e.g., a corner region (e.g., top-left, top-right, bottom-left, bottom-right); a bezel region).

In response to detecting the first input (e.g., 1611, 1617) directed to the complication region of the one or more complication regions (1708), the computer system (e.g., 600) displays (1710) a complication selection user interface (e.g., 1642).

Displaying the complication selection user interface (e.g., 1642) includes (1710) concurrently displaying an indication (e.g., label/header of region 1644, 1658, 1662, 1664, 1666) of (e.g., the name of; a graphical indication of; an icon corresponding to; a category of) a first application (e.g., an application that is installed on, can be launched on, and/or is accessible from the computer system) (1712), a first complication preview (e.g., 1644A-1644E) (e.g., a graphical preview of how the first complication would be displayed in the watch user interface) corresponding to a first complication that is configured to display, on the watch user interface (e.g., 1606, 1668), a first set of information obtained from the first application (e.g., information based on a feature, operation, and/or characteristic of the first application), wherein the first complication preview includes a graphical representation of the first complication displaying the first set of information (e.g., an exemplary representation of the first complication with an example of the first set of information) (1714), and a second complication preview (e.g., a graphical preview of how the second complication would be displayed in the watch user interface) corresponding to a second complication that is configured to display, on the watch user interface, a second set of information, different from the first set of information, obtained from the first application (e.g., information based on a feature, operation, and/or characteristic of the first application), wherein the second complication preview includes a graphical representation of the second complication displaying the second set of information (e.g., an exemplary representation of the second complication with an example of the second set of information) (1716). Displaying the complication selection user interface that includes the indication of the first application, the first complication preview, and the second complication preview (e.g., together in the same region of the complication selection user interface, displays as a group) enables a user to quickly and easily recognize that the first and second complication previews correspond to complications related to the first application, thereby enhancing the operability of the device and making the user-device interface more efficient (e.g., by helping the user to view related/associated items in the user interface together without needing to navigate to other portions of the user interface) which, additionally, reduces power usage and improves battery life of the device by enabling the user to use the device more quickly and efficiently.

While displaying the complication selection user interface (e.g., 1642) (1718), the computer system (e.g., 600) detects (1720), via the one or more input devices (e.g., via a rotatable input device (e.g., 603); via a touch-sensitive surface), a second input (e.g., 1613) directed to selecting a respective complication preview (e.g., 1644A-1644E).

In response to detecting the second input (e.g., 1613) directed to selecting the respective complication preview (e.g., 1644A-1644E) (1722), the computer system (e.g., 600) displays (1724), via the display generation component (e.g., 602), a representation of the watch user interface (e.g., as shown in FIGS. 16F and 16Q) with a representation of a selected complication corresponding to the respective complication preview displayed at the first complication region of the watch user interface (e.g., 1606, 1668).

In accordance with a determination that the respective complication preview is the first complication preview, the first complication is displayed in the first complication region of the watch user interface (e.g., 1606, 1668) (1726).

In accordance with a determination that the respective complication preview is the second complication preview, the second complication is displayed in the first complication region of the watch user interface (e.g., 1606, 1668) (1728). Displaying (e.g., automatically, without user input) a respective complication in a respective complication region of the watch user interface based on the selected complication preview enables a user to conveniently and efficiently manage and change complications of the watch user interface. Providing improved control options without cluttering the UI with additional displayed controls enhances the operability of the device.

In some embodiments, while displaying the complication selection user interface (e.g., 1642) (1730), the computer system (e.g., 600) detects (1732), via the one or more input devices (e.g., via a rotatable input device; via a touch-sensitive surface), a third input (e.g., 1621) (e.g., a rotational input on the rotatable input device (e.g., 603); a touch scrolling input on the touch-sensitive surface). In some embodiments, in response to detecting the third input (1734), the computer system navigates (e.g., scrolls) through the complication selection user interface (1736).

In some embodiments, navigating (e.g., scrolling) through the complication selection user interface (e.g., 1642) includes (1736) concurrently displaying an indication of (e.g., the name of; a graphical indication of; an icon corresponding to; a category of) a second application (e.g., an application that is installed on, can be launched on, and/or is accessible from the computer system) (1728), a third complication preview (e.g., 1634, 1636, 1638, 1640, 1686, 1688, 1690, 1692, 1694, 1696, 1698, 1699) (e.g., a graphical preview of how the third complication would be displayed in the watch user interface) corresponding to a third complication that is configured to display, on the watch user interface (e.g., 1606, 1668), a third set of information obtained from the second application (e.g., information based on a feature, operation, and/or characteristic of the second application), wherein the third complication preview includes a graphical representation of the third complication displaying the third set of information (e.g., an exemplary representation of the third complication with an example of the third set of information) (1740), and a fourth complication preview (e.g., a graphical preview of how the fourth complication would be displayed in the watch user interface) corresponding to a fourth complication that is configured to display, on the watch user interface, a fourth set of information, different from the third set of information, obtained from the second application (e.g., information based on a feature, operation, and/or characteristic of the second application), wherein the fourth complication preview (e.g., 1634, 1636, 1638, 1640, 1686, 1688, 1690, 1692, 1694, 1696, 1698, 1699) includes a graphical representation of the fourth complication displaying the fourth set of information (e.g., an exemplary representation of the fourth complication with an example of the fourth set of information) (1742). Displaying the indication of the second application, the third complication preview, and the fourth complication preview (e.g., together in the same region of the complication selection user interface; together as a group of complications corresponding to the second application) in accordance with navigating (e.g., scrolling) through the complication selection user interface provides easy and efficient access to different complications that are available for selection, as related complications (complications corresponding to the same application) are grouped together within the complication selection user interface. Providing improved visual feedback enhances the operability of the device and makes the user-device interface more efficient (e.g., by helping the user to view related/associated items in the user interface together without needing to navigate to other portions of the user interface) which, additionally, reduces power usage and improves battery life of the device by enabling the user to use the device more quickly and efficiently.

In some embodiments, navigating (e.g., scrolling) through the complication selection user interface (e.g., 1642) further includes ceasing display of the first complication preview (e.g., 1634, 1636, 1638, 1640, 1686, 1688, 1690, 1692, 1694, 1696, 1698, 1699) corresponding to the first complication and the second complication preview (e.g., 1634,

1636, 1638, 1640, 1686, 1688, 1690, 1692, 1694, 1696, 1698, 1699) corresponding to the second complication (e.g., and other complication previews corresponding to respective complications that are configured to display, on the watch user interface (e.g., 1606, 1668) (e.g., watch face), a respective set of information obtained from the first application) (1744). In some embodiments, ceasing display of the first complication preview and the second complication preview comprises moving the first complication preview and the second complication preview off of an edge of the display generation component as the complication selection user interface is navigated (e.g., scrolled).

In some embodiments, the indication of the first application, the first complication preview (e.g., 1634, 1636, 1638, 1640, 1686, 1688, 1690, 1692, 1694, 1696, 1698, 1699), and the second complication preview (e.g., 1634, 1636, 1638, 1640, 1686, 1688, 1690, 1692, 1694, 1696, 1698, 1699) are displayed in (e.g., grouped together in) a first region (e.g., 1644, 1658, 1662, 1664, 1666) of the complication selection user interface (e.g., 1642) (e.g., where the indication of the first application is a header/label for the group), and the indication of the second application, the third complication preview, and the fourth complication preview are displayed in (e.g., grouped together in) a second region of the complication selection user interface different from the first region (e.g., where the indication of the second application is a header/label for the group) (1746). Displaying the indication of the first application, the first complication preview, and the second complication preview together in the first region of the complication selection user interface and displaying the indication of the second application, the third complication preview, and the fourth complication preview together in the second region of the complication selection user interface enable a user to view and select from the available complications in an intuitive manner. Providing additional control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first application is associated with a plurality of available complications (e.g., 1608, 1610, 1612, 1614, 1670, 1672, 1674, 1676, 1678, 1680, 1682, 1684) that are configured to display information obtained from the first application, and the plurality of available complications include the first complication and the second complication. In some embodiments, displaying the complication selection user interface includes (e.g., 1642), in accordance with a determination that the plurality of available complications that are configured to display information obtained from the first application exceeds a predetermined number (e.g., 5, 6), the computer system (e.g., 600) displays a plurality of complication previews (e.g., the plurality of complication previews includes a number of complication previews that equals the predetermined number) that each correspond to a complication of the plurality of available complication, where the plurality of complication previews does not exceed the predetermined number, and a first selectable user interface object (e.g., 1648, 1660) (e.g., a first affordance; a "show more" icon/button) that, when selected, causes display of one or more additional complication previews (e.g., 1656A) that were not included in the plurality of complication previews (e.g., the one or more additional complication previews includes previews for all of the available complications that were not included in the plurality of complication previews). In some embodiments, displaying the complication selection user interface includes, in accordance with a determination that the plurality of available complications that are configured to display information obtained from the first application does not exceed the predetermined number, displaying a second plurality of complication previews (e.g., the second plurality of complication previews includes complication previews for all of the available complications that are configured to display information obtained from the first application) that each correspond to a complication of the plurality of available complication without displaying the first selectable user interface object. Displaying the plurality of complication previews that each correspond to a complication of the plurality of available complication, where the plurality of complication previews does not exceed the predetermined number, prevents cluttering of the complication selection user interface, thereby enabling a user to access the available complications in a quicker and more efficient manner. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first application corresponds to an application (e.g., a contactable users application) for managing information of a set of contactable users (e.g., user contacts stored in and/or accessible on the computer system (e.g., 600); user contacts stored in and/or accessible from an address book), the first complication (e.g., 1608) corresponds to a first contactable user of the set of contactable users, the second complication corresponds to a second contactable user of the set of contactable users, the first complication preview and the second complication preview are displayed in an order (e.g., a predetermined order; a selected order).

In some embodiments, displaying the complication selection user interface (e.g., 1642) includes, in accordance with a determination that the first contactable user is a user of a first type (e.g., a candidate contact, a favorite contact; a frequent contact) and that the second contactable user is not a user of the first type, the computer system (e.g., 600) displays the first complication preview prior to the second complication preview in the order. In some embodiments, displaying the complication selection user interface includes, in accordance with a determination that the first contactable user is not a user of the first type and that the second contactable user is a user of the first type, displaying the second complication preview prior to the first complication preview in the order. Displaying a complication preview corresponding to a candidate contact prior to displaying a complication preview corresponding to a non-candidate contact in the complication selection user interface provides a user with quicker and easier access to a respective complication preview corresponding to a candidate contact when navigating the complication selection user interface. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first application is the contactable users application, and the computer system (e.g., 600) displays or causes display of a maximum number of complication previews for the contactable users application in the complication selection user interface (e.g., 1642). In some embodiments, if there are as many or more candidate contacts (e.g., favorite contacts; frequent contacts) than the maximum number of complication previews that are concurrently shown in the complication section user interface for the contactable users application, all of the maximum number of complication previews that are shown correspond to candidate contacts (e.g., listed in alphabetical order). In some embodiments, if there are fewer candidate contacts than the maximum number of complication previews that are concurrently shown, the candidate contacts are shown first (e.g., in alphabetical order) and regular contacts are shown for the remaining complication previews (e.g., separately in alphabetical order).

In some embodiments, in accordance with a determination that the watch user interface (e.g., 1606, 1668) is of a first type (e.g., a watch face having a first type of layout, design, and/or configuration), the first complication preview includes the graphical representation of the first complication in a first shape (e.g., 1693A-1693D in FIG. 16AB) (e.g., a first layout; a first design; a first outline) and the second complication preview includes the graphical representation of the second complication in the first shape. In some embodiments, in accordance with a determination that the watch user interface is of a second type (e.g., a watch face having a second type of layout, design, and/or configuration), the first complication preview includes the graphical representation of the first complication in a second shape (e.g., 1693A-1693D in FIG. 16AC) (e.g., a second layout; a second design; a second outline) and the second complication preview includes the graphical representation of the second complication in the second shape, wherein the second shape is different from the first shape. In some embodiments, the type of shape (e.g., layout; design; outline) for complication previews are (e.g., at least partly) determined based on the layout, design, and/or configuration of the watch face for which the corresponding complications are to be used. Including, in the complication selection user interface, complication previews that include graphical representations of a respective complication in a respective shape, where the type of the respective shape is at least partly determined based on the layout, design, and/or configuration of the current watch user interface enables a user to conveniently preview, before selecting a particular complication for use, how a respective complication would appear when used in the watch user interface. Providing improved visual feedback and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the complication region (selected via the first input) of the one or more complication regions correspond to a first complication region, the first complication preview includes the graphical representation of the first complication in a third shape (e.g., 1693B in FIG. 16AD) (e.g., a third layout; a third design; a third outline) and the second complication preview includes the graphical representation of the second complication in the third shape. In some embodiments, in accordance with a determination that the complication region (selected via the first input) of the one or more complication regions correspond to a second complication region different from the first complication region, the first complication preview includes the graphical representation of the first complication in a fourth shape (e.g., 1693A-1693D in FIG. 16AE) (e.g., a fourth layout; a fourth design; a fourth outline) and the second complication preview includes the graphical representation of the second complication in the fourth shape, wherein the fourth shape is different from the third shape. In some embodiments, the type of shape (e.g., layout; design; outline) for complication previews are (e.g., at least partly) determined based on the respective complication region of the one or more complications within a watch face for which the respective complication is being used.

In some embodiments, displaying the complication selection user interface (e.g., 1642) further includes displaying the indication of the first application prior to (e.g., above; as a header) the first complication preview and the second complication preview (e.g., prior to all complication previews that are associated with the first application). In some embodiments, the indication of the first application is indicative of (e.g., represents; is the name for; is the header for) a complication preview group comprising the first complication preview and the second complication preview. Displaying the indication of the first application prior to the first complication preview and the second complication preview enables a user to quickly and easily recognize the corresponding application for the displayed compilations, thereby enhancing the operability of the device and making the user-device interface more efficient (e.g., by helping the user to more easily recognize and categorize the displayed complications) which, additionally, reduces power usage and improves battery life of the device by enabling the user to use the device more quickly and efficiently.

In some embodiments, while displaying the watch face editing user interface (e.g., 1622), the computer system (e.g., 600) displays, via the display generation component (e.g., 602) (e.g., at a top region of the display generation component), an indication (e.g., "DIAL" or "COLOR" in FIGS. 16V and 16W; an indication of a color editing user interface; an indication of a dial editing user interface) of an adjacent editing tab corresponding to an adjacent user interface that is different from a user interface for editing one or more complications of the watch user interface. In some embodiments, the editing interface different from the watch face editing user interface is configured to edit a different aspect/characteristic of the watch face other than the complications of the watch face. In some embodiments, while displaying the watch face editing user interface, the computer system detects, via the one or more input devices, a fourth input (e.g., a swipe input detected via a touch-sensitive surface that is integrated with the display generation component) directed to navigating to a different editing tab. In some embodiments, while displaying the watch face editing user interface, in response to detecting the fourth input, the computer system displays, via the display generation component, the adjacent user interface, the adjacent user interface for editing a characteristic (e.g., different aspect; different feature) of the watch user interface different from the one or more complications of the watch user interface. Providing, in the watch face editing user interface, adjacent editing tabs for editing different aspects/characteristics of the watch user interface enables a user to quickly and easily access the other editing tabs for editing the different aspects/characteristics (e.g., without needing to exit the watch face editing user interface). Providing improved control options and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) displays, via the display generation component (e.g., 602), a color editing user interface (e.g., 1630) (e.g., different from the watch face editing user interface). In some embodiments, the color editing user interface can be accessed via one or more swipe inputs from the watch face editing user interface (e.g., 1622) (e.g., the watch face editing user interface and color editing user interface are different tabs within a watch face editing mode). In some embodiments, the color editing user interface is accessed while the computer system is in watch face editing mode. In some embodiments, the color editing user interface is a tab within a plurality of (e.g., adjacent) tabs (e.g., style tab; dial tab; color tab; complication tab) that can be accessed while the computer system is in watch face editing mode. In some embodiments, the color editing user interface can be accessed via a companion application on a second computer system (e.g., a second electronic device, such as a smartphone) that is paired with the computer system. Providing the color editing user interface that can be accessed via one or more swipe inputs from the watch face editing user interface provides quick and easy access for editing colors of a current watch user interface that is being edited (e.g., without needing to exit the watch face editing user interface). Providing improved control options and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the color editing user interface (e.g., 1630) includes the representation of the layout of the watch user interface (e.g., 1624) displayed in a first color scheme based on a first color, and a first plurality of selectable colors (e.g., 1689) (e.g., displayed as navigable list of colors, with each color represented in a selectable circle) for the watch user interface (e.g., 1606, 1668) (e.g., a watch face), including the first color. Providing the representation of the layout of the watch user interface in the color editing user interface enables a user to easily view changes in color that are applied to the current watch user interface, thereby enhancing the operability of the device and making the color editing process more efficient (e.g., by enabling the user to more easily view the changes that are being made) which, additionally, reduces power usage and improves battery life of the device by enabling the user to use the device more quickly and efficiently. In some embodiments, the color editing user interface is used to edit/modify a color/color scheme of the (e.g., background of) the layout of the watch user interface. In some embodiments, the first color is the currently-selected color. In some embodiments, if the first color is the currently-selected color, the computer system (e.g., 600) indicates (e.g., by highlighting; by bolding; by visually emphasizing), in the first plurality of colors, that the first color is the currently-selected color.

In some embodiments, the computer system (e.g., 600) detects, via the one or more input devices (e.g., via a rotatable input device (e.g., 603); via a touch-sensitive surface), a fifth input (e.g., 1637) (e.g., a rotational input on the rotatable input device; a touch scrolling input on the touch-sensitive surface) directed to navigating (e.g., scrolling) through the first plurality of selectable colors (e.g., 1689). Enabling the plurality of selectable colors to be navigated (e.g., scrolled) via a rotational input on a rotatable input device provides an intuitive method for navigating through and selecting from the plurality of selectable colors. Providing improved control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the fifth input (e.g., 1637), the computer system (e.g., 600) navigates (e.g., scrolls) through the first plurality of colors (e.g., 1689) from the first color to a second color different from the first color. In some embodiments, the computer system also indicates (e.g., by highlighting; by bolding; by visually emphasizing), in the first plurality of colors, that the second color is now the currently-selected color. In some embodiments, in response to detecting the fifth input, the computer system displays the representation of the layout of the watch user interface (e.g., 1624) in a second color scheme based on the second color. Providing a color editing user interface that includes the representation of the layout of the watch user interface, where the displayed presentation of the layout of the watch user interface is adjusted based on a selected color scheme from the color editing user interface, enables a quick and easy method for editing the color scheme of the current watch user interface. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to detecting the fifth input (e.g., 1637), the computer system (e.g., 600) detects, via the one or more input devices (e.g., via a rotatable input device (e.g., 603); via a touch-sensitive surface), a sixth input (e.g., a continuation of the fifth input) directed to navigating (e.g., scrolling) through the first plurality of selectable colors (e.g., 1689). In some embodiments, in response to detecting the sixth input, the computer system navigates (e.g., scrolls) through the first plurality of colors to display a second selectable user interface object (e.g., 1685) (e.g., a second affordance; a "show more" icon/button). In some embodiments, the second selectable user interface object is displayed with (e.g., with the same shape/layout/design as) other colors in the first plurality of colors. In some embodiments, the second selectable user interface object is displayed as the last color in the list of the first plurality of colors. In some embodiments, the computer system detects, via the one or more input devices, an activation (e.g., selection) of the second selectable user interface object. In some embodiments, in response to detecting the activation of the second selectable user interface object, the computer system displays, via the display generation component, a second plurality of selectable colors for the watch user interface that is different from the first plurality of selectable colors. In some embodiments, the first plurality of colors include common colors and/or frequently used colors while the second plurality of colors include less-common colors and/or less-frequently used colors. Providing the second selectable user interface object which, when activated, causes display of the second plurality of selectable colors prevents cluttering of the plurality of selectable colors while also enabling a user to easily access additional selectable colors, the second plurality of selectable colors, that were not included in the plurality of selectable colors. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1700 (e.g., FIGS. 17A-17D) are also applicable in an analogous manner to the methods described above. For example, method 700 optionally includes one or more of the characteristics of the various methods described above with reference to method 1700. For example, a respective complication of a watch user interface as described with reference to FIGS. 6A-6H can be changed to a different complication via the process for managing complications described with reference to FIGS. 16A-16AE. For another example, method 900 optionally includes one or more of the characteristics of the various methods described above with reference to method 1700. For example, a respective complication of a watch user interface as described with reference to FIGS. 8A-8M can be changed to a different complication via the process for managing complications described with reference to FIGS. 16A-16AE. For another example, method 1100 optionally includes one or more of the characteristics of the various methods described above with reference to method 1700. For example, one or more characteristics or features of a user interface that includes an indication of time and a graphical representation of a character as described with reference to FIGS. 10A-10AC can be edited via the process for editing characteristics or features of a watch user interface as described with reference to FIGS. 16A-16AE. For another example, method 1300 optionally includes one or more of the characteristics of the various methods described above with reference to method 1700. For example, one or more characteristics or features of a time user interface as described with reference to FIGS. 12A-12G can be edited via the process for editing characteristics or features of a watch user interface as described with reference to FIGS. 16A-16AE. For another example, method 1500 optionally includes one or more of the characteristics of the various methods described above with reference to method 1700. For example, a respective complication of a watch user interface with a background as described with reference to FIGS. 14A-14AD can be changed to a different complication via the process for managing complications described with reference to FIGS. 16A-16AE. For brevity, these details are not repeated below.

FIGS. 18A-18J illustrate exemplary user interfaces for sharing a configuration of a user interface with an external device, in accordance with some embodiments. The user interfaces in these figures are used to illustrate the processes described below, including the processes in FIGS. 19A-19C.

At FIG. 18A, electronic device 600 (e.g., "Jane's Watch") displays watch face user interface 1800 on display 602. Watch face user interface 1800 includes graphical representation 1802 of a character (e.g., a first character in a set of characters configured to be displayed on watch face user interface 1800). In FIG. 18A, watch face user interface 1800 includes time indicator 1804 and complication 1806A (e.g., corresponding to a calendar application) and complication 1806B (e.g., corresponding to weather application). Watch face user interface 1800 includes a default color (e.g., black) and background 1808 having colors that are different from the default color (e.g., colors displayed by electronic device 600 in accordance with user inputs while an editing user interface is displayed by electronic device 600). At FIG. 18A, electronic device 600 detects user input 1850A (e.g., a long press gesture) on watch face user interface 1800. In response to detecting user input 1850A, electronic device 600 displays user interface 1810, as shown at FIG. 18B.

At FIG. 18B, user interface 1810 includes first representation 1800A of watch face user interface 1800 (e.g., corresponding to set or collection of avatar characters configured to be sequentially displayed on watch face user interface 1800) and second representation 1800B of an additional watch face user interface configured to be displayed by electronic device 600 (e.g., a watch face user interface corresponding to a set or collection of animal-like characters and/or emojis configured to be sequentially displayed on the watch face user interface). First representation 1800A of watch face user interface 1800 includes graphical representations of multiple characters (e.g., a collection and/or a set of characters) configured to be displayed on watch face user interface 1800 (e.g., displayed sequentially based on electronic device 600 detecting a change in activity state and/or a user input), as indicated by the multiple characters included on first representation 1800A. User interface 1810 includes watch face indicator 1812 that includes a name associated with watch face user interface 1800 (e.g., "Avatar"). User interface 1810 also includes share affordance 1814 and edit affordance 1816. At FIG. 18B, electronic device 600 detects user input 1850B (e.g., a tap gesture) on share affordance 1814. In response to detecting user input 1850B, electronic device 600 displays sharing user interface 1818, as shown at FIG. 18C.

At FIG. 18C, sharing user interface 1818 enables selection of a recipient for receiving information associated with watch face user interface 1800. For example, sharing user interface 1818 includes affordances 1820A-1820C corresponding to respective recipients (e.g., contactable users, information for which is stored in electronic device 600) for receiving information associated with watch face user interface 1800. At FIG. 18C, while electronic device 600 displays sharing user interface 1818 including affordances 1820A-1820C, electronic device 600 detects user input 1850C (e.g., a tap gesture) corresponding to selection of affordance 1820C corresponding to recipient Ann Smith or an external device associated with recipient Ann Smith. In response to detecting user input 1850C, electronic device 600 displays messaging user interface 1822 of a messaging application of electronic device 600, as shown at FIG. 18D.

At FIG. 18D, messaging user interface 1822 includes a message 1824 having representation 1826 of watch face user interface 1800. Messaging user interface 1822 includes indicator 1828 that indicates the recipient (e.g., Ann Smith) of message 1824. Additionally, messaging user interface 1822 includes send affordance 1830 for initiating transmission of message 1824. At FIG. 18D, electronic device 600 detects user input 1850D (e.g., a tap gesture) corresponding to selection of send affordance 1830. In response to detecting user input 1850D, electronic device 600 initiates a process for sending message 1824 to the selected recipient (e.g., external device 1832 (e.g., Ann's Watch)). Message 1824 includes representation 1826 of watch face user interface 1800. In addition to transmitting message 1824 and representation 1826, electronic device 600 also transmits data and/or information associated with watch face user interface 1800 to external device 1832. For example, electronic device 600 transmits information associated with a background of watch face user interface 1800 (e.g., color and/or size of background), a font of watch face user interface 1800 (e.g., a font for a date and/or time displayed by watch face user interface 1800), a position of a time indicator and/or complications of watch face user interface 1800, applications corresponding to complications of watch face user interface 1800, and/or customizations to complications of watch face user interface 1800 (e.g., colors and/or size of complications).

As discussed below, in some embodiments, electronic device 600 transmits information and/or data indicative of graphical representation 1802 of a character of watch face user interface 1800. In particular, electronic device 600 transmits information and/or data indicative of (e.g., that defines) graphical representation 1802 of the character of watch face user interface 1800 when watch face user interface 1800 is configured to display a graphical representation of a single character without transitioning between display of graphical representations of multiple characters. Electronic device 600 forgoes transmission of information and/or data indicative of graphical representation 1802 of a character of watch face user interface 1800 when watch face user interface 1800 is configured to transition between display of respective graphical representations for multiple characters (e.g., a set of predetermined characters and/or a collection of predetermined characters). For example, electronic device 600 transmits information associated with (e.g., that defines) a graphical representation of a character for watch face user interfaces that are configured to display a graphical representation of only a single character. In some embodiments, electronic device 600 forgoes transmission of information associated with any graphical representation of any character for watch face user interfaces that transition between display of graphical representations of multiple characters (e.g., in response to detecting a change in activity state of electronic device 600 and/or in response to user input). While electronic device 600 transmits and/or forgoes transmission of information associated with graphical representations of characters based on a type of watch face user interface (e.g., a single character watch face user interface or a collection of characters watch face user interface), in some embodiments, electronic device 600 transmits other data associated with watch face user interface 1800 (e.g., information related to background, fonts, and/or complications) regardless of whether information associated with a graphical representation of a character is transmitted or not.

At FIG. 18E, external device 1832 (e.g., Ann's Watch) receives message conversation 1824 and representation 1826 of watch face user interface 1800. For example, external device 1832 displays message conversation 1824 and representation 1826 in a messaging user interface 1831 on display 1833 of external device. Since watch face user interface 1800 includes graphical representations of multiple characters (e.g., watch face user interface 1800 is configured to transition between display of graphical representations of characters included in a collection of characters), external device 1832 does not receive information related to graphical representation 1802 and/or graphical representations of other characters associated with watch face user interface 1800. At FIG. 18E, external device 1832 detects user input

1834 (e.g., a tap gesture) corresponding to selection of representation 1826. In response to detecting user input 1834, external device 1832 displays user interface 1836, as shown at FIG. 18F.

At FIG. 18F, user interface 1836 includes representation 1838, watch face indicator 1840, and add watch face affordance 1842. At FIG. 18F, external device 1832 detects user input 1844 (e.g., a tap gesture) corresponding to selection of add watch face affordance 1842. In response to detecting user input 1844, external device 1832 adds a new watch face user interface to a watch face library of external device 1832 and displays watch face user interface 1846, as shown at FIG. 18G.

At FIG. 18G, external device 1832 displays watch face user interface 1846. Watch face user interface 1846 includes time indicator 1804 and complication 1806A (e.g., corresponding to a calendar application) and complication 1806B (e.g., corresponding to a weather application). Watch face user interface 1846 further includes a default color (e.g., black) and background 1808 having colors that are different from the default color (e.g., colors displayed by electronic device 600 in response to user inputs while an editing user interface is displayed by electronic device 600). As such, watch face user interface 1846 includes features that are the same as watch face user interface 1800. At FIG. 18G, time indicator 1804 and complication 1806A and complication 1806B of watch face user interface 1846 include a same position, font, and/or size as watch face user interface 1800. Additionally, background 1808 of watch face user interface 1846 includes a same color and/or size as watch face user interface 1800. As such, electronic device 600 transmits information related to watch face user interface 1800 to external device 1832 that is not indicative of graphical representation 1802 of watch face user interface 1800. Because watch face user interface 1800 is associated with a collection of graphical representations of multiple characters, electronic device 600 forgoes transmission of information associated with graphical representation 1802 and information associated with any other graphical representations of characters associated with watch face user interface 1800.

At FIG. 18G, watch face user interface 1846 includes graphical representation 1848 of a character that is different from graphical representation 1802 of the character of watch face user interface 1800 (e.g., since information defining the characters of watch face user interface 1800 is not provided). In some embodiments, watch face user interface 1846 is associated with a collection of graphical representations of characters that are included and/or stored on external device 1832, or stored in an account associated with external device 1832. In some embodiments, watch face user interface 1846 is associated with a collection of graphical representations of characters that are selected randomly from a library of characters (e.g., stored on external device 1832 and/or stored on another external device different from external device 1832 (e.g., a server)).

Turning back to FIG. 18B, electronic device 600 detects user input 1850E (e.g., a swipe gesture) on user interface 1810. In response to detecting user input 1850E, electronic device 600 translates first representation 1800A of watch face user interface 1800 and second representation 1800B of a second watch face user interface in a direction corresponding to user input 1850E, as shown at FIG. 18H. As a result of translating first representation 1800A and second representation 1800B, electronic device 600 displays third representation 1800C associated with a third watch face user interface, different from watch face user interface 1800 and second watch face user interface.

At FIG. 18H, second representation 1800B of the second watch face user interface includes multiple different characters (e.g., animal-like avatars and/or emojis) to indicate that the second watch face user interface associated with second representation 1800B is configured to transition between display of graphical representations of multiple characters. Accordingly, in response to detecting user input corresponding to selection of share affordance 1814, electronic device 600 initiates the process for transmitting data associated with the second watch face without including information associated with graphical representations of characters configured to be displayed on the second watch face user interface.

At FIG. 18H, electronic device detects user input 1850F (e.g., a swipe gesture) on user interface 1810. In response to detecting user input 1850F, electronic device 600 translates first representation 1800A, second representation 1800B, and third representation 1800C in a direction associated with user input 1850F, as shown at FIG. 18I. As a result of translating first representation 1800A, second representation 1800B, and third representation 1800C, electronic device 600 ceases to display first representation 1800A and displays fourth representation 1800D associated with a fourth watch face user interface, different from watch face user interface 1800, second watch face user interface, and third watch face user interface.

At FIG. 18I, third representation 1800C includes a graphical representation of a single character, thereby indicating that the third watch face user interface is configured to display a graphical representation of only a single character (e.g., regardless of electronic device 600 detecting a change in activity state and/or a user input). At FIG. 18I, electronic device 600 detects user input 1850G (e.g., a tap gesture) corresponding to selection of share affordance 1814 (e.g., to share third watch face user interface). In response to detecting user input 1850G, electronic device 600 initiates a process for sharing the third watch face user interface (e.g., because third representation 1800C is designated, as indicated by being in a center position on user interface 1810). For example, in response to detecting user input 1850G, electronic device 600 displays sharing user interface 1818. In response to detecting user input on an affordance associated with an external device of a recipient on sharing user interface 1818, electronic device 600 displays messaging user interface 1822. In response to detecting user input corresponding to selection of send affordance 1830, electronic device 600 initiates a process for transmitting information associated with the third watch face user interface (e.g., a background, a font, and/or complications) as well as information associated with (e.g., that defines) a graphical representation of the character of the third user interface.

At FIG. 18J, external device 1832 displays watch face user interface 1852 (e.g., in response to receiving the transmission from electronic device 600 and detecting user input corresponding to add watch face affordance 1842). At FIG. 8J, watch face user interface 1852 includes graphical representation 1854 of a character that is the same character displayed on third representation 1800C. Since third representation 1800C corresponds to a watch face user interface of electronic device 600 that is configured to display a graphical representation of a single character, electronic device 600 transmits information corresponding to the graphical representation of the single character to external device 632. In some embodiments, the information corresponding to the graphical representation of the single character includes a recipe that defines the graphical representation of the single character. In some embodiments, the recipe of the graphical representation of the single character includes information related to features of the character, such as skin color, hair type, hair color, hair length, nose type, nose size, mouth type, mouth size, lip color, eye color, eye type, eye size, eyebrow color, eyebrow size, eyebrow type, and/or accessories of the character (e.g., headwear, eyewear, earrings, nose rings, etc.). In some embodiments, the recipe of the graphical representation of the single character includes information related to animations that can be performed by the character either automatically (e.g., at predetermined intervals) and/or in response to user inputs. The information related to animations may be user defined (e.g., by a user of electronic device 600) such that the animations are specific to the character. In some embodiments, the information corresponding to the graphical representation of the single character includes an image and/or a video of the graphical representation of the character. In some embodiments, external device 1832 is configured to store and/or add graphical representation 1854 to a character library once watch face user interface 1852 is added to external device 1832. In some embodiments, external device 1832 is configured to edit the character associated with graphical representation 1854 after adding watch face user interface 1852 to external device 1832 and/or storing graphical representation 1854 to external device 1832 and/or to the character library of external device 1832.

FIGS. 19A-19C are a flow diagram illustrating methods for sharing a configuration of a user interface with an external device, in accordance with some embodiments. Method 1900 is performed at a computer system (e.g., 100, 300, 500, 600) (e.g., a smart device, such as a smartphone or a smartwatch; a mobile device) that is in communication with a display generation component (e.g., 602) (e.g., a display and/or a touchscreen). Some operations in method 1900 are, optionally, combined, the orders of some operations are, optionally, changed, and some operations are, optionally, omitted.

As described below, method 1900 provides an intuitive way for sharing a configuration of a user interface with an external device. The method reduces the cognitive burden on a user for sharing a configuration of a user interface with an external device, thereby creating a more efficient human-machine interface. For battery-operated computing devices, enabling a user to manage user interfaces related to time faster and more efficiently conserves power and increases the time between battery charges.

The computer system (e.g., 100, 300, 500, 600) displays (1902), via the display generation component (e.g., 602), a representation (e.g., 1800A-1800D) of a watch face user interface (e.g., 1800) (e.g., a watch face user interface that displays a single character without transitioning between multiple characters or a watch face user interface that transitions between display of multiple characters in a collection of characters) that is associated with one or more graphical representations (e.g., 1802) of respective characters (e.g., predetermined animated characters such as anthropomorphized animals, robots, or other objects or user-generated animated characters such as virtual avatars) (e.g., a recipe for a character that is included in the watch face user interface, the recipe including information related to features of the character, such as hair color, skin color, facial feature information, and/or accessory information) (e.g., a graphical representation of a single character when the watch face user interface is of a first type and graphical representations of a collection of characters when the watch face user interface is of a second type).

The computer system (e.g., 100, 300, 500, 600), while displaying the representation (e.g., 1800A-1800D) of the watch face user interface (e.g., 1800), detects (1904) an input (e.g., 1850A, 1850B, 1850C, and/or 1850D) (e.g., a long press gesture on display generation component, and optionally, a subsequent tap gesture on a share affordance and/or a contact displayed in response to the long press gesture) corresponding to a request to share the watch face user interface (e.g., 1800) with an external device (e.g., 1832).

The computer system (e.g., 100, 300, 500, 600), in response to detecting the input (1850A, 1850B, 1850C, and/or 1850D), initiates (1906) a process for sharing the watch face user interface (e.g., 1800) with the external device (e.g., 1832) and, in accordance with a determination that the watch face user interface (e.g., 1800) is associated with less than a threshold number of graphical representations (e.g., 1802) of respective characters (e.g., less than two characters, a single character) (e.g., a first watch face that does not transition between multiple characters), the process (1908) for sharing the watch face user interface (e.g., 1800) with the external device (e.g., 1832) includes sharing one or more characteristics of the watch face user interface (e.g., 1800) (e.g., background color, date/time font, date/time size, date/time placement, complication placement, complication type, and/or complication color) including transmitting a representation of one or more of the one or more graphical representations (e.g., 1802) of respective characters associated with the watch face user interface (e.g., 1800) (e.g., preparing and/or sending an electronic message to an address associated with the external device that includes a recipe for the respective characters of the watch face user interface, which enables a recipient associated with the external device to display graphical representations of the respective characters). In some embodiments, transmitting the representation of one or more of the one or more graphical representations of the respective characters associated with the watch face user interface includes sending data and/or information (e.g., without image data and/or multimedia data) associated with the one or more of the one or more graphical representations of the respective characters associated with the watch face user interface. In some embodiments, transmitting the representation of one or more of the one or more graphical representations of the respective characters associated with the watch face includes sending image data and/or multimedia data (e.g., video data) associated with the one or more of the one or more graphical representations of the respective characters associated with the watch face user interface.

The computer system (e.g., 100, 300, 500, 600), in response to detecting the input (e.g., 1850A, 1850B, 1850C, and/or 1850D), initiates (1906) a process for sharing the watch face user interface (e.g., 1800) with the external device (e.g., 1832) and, in accordance with a determination that the watch face user interface (e.g., 1800) is associated with greater than or equal to the threshold number of graphical representations (e.g., 1802) of respective characters (e.g., a collection of characters, two or more characters) (e.g., a second watch face that transitions between display of characters sequentially, and optionally, the transition between characters is in response to meeting a transition criteria (e.g., inactivity of and/or an absence of user inputs detected by the computer system for a predetermined period of time)), the process (1910) for sharing the watch face user interface (e.g., 1800) with the external device (e.g., 1832) includes sharing one or more characteristics of the watch face user interface (e.g., 1800) (e.g., background color, date/time font, date/time size, date/time placement, complication placement, complication type, and/or complication color) without transmitting a representation of the one or more graphical representations (e.g., 1802) of respective characters associated with the watch user interface (e.g., 1800) (e.g., preparing and/or sending an electronic message to an address associated with the external device that includes data associated with features of the watch face user interface other than the representation of the one or more graphical representations of the respective characters, such that the external device is configured to display graphical representations of one or more second characters, different from the graphical representations of respective characters of the watch face user interface).

Sharing one or more characteristics of the watch face user interface with or without transmitting a representation of one or more graphical representations of respective characters associated with the watch face user interface depending on a number of graphical representations of respective characters associated with the watch face user interface reduces an amount of data transmitted between the computer system and the external device. In particular, transmitting multiple representations of one or more graphical representations of respective characters associated with the watch face user interface consumes a relatively large amount of storage on external device and/or a relatively large amount of processing power of computer system. Reducing a size of a transmission improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation of one or more of the one or more graphical representations (e.g., 1802) of respective characters associated with the watch face user interface (e.g., 1800) (e.g., in accordance with the determination that the watch face user interface is associated with less than the threshold number of graphical representations of respective characters) includes transmitting information corresponding to one or more settings associated with characteristic features (e.g., settings set by a user of computer system that are associated with (e.g., define) visual characteristics of the respective character corresponding to the graphical representation) of the representation of one or more of the one or more graphical representations (e.g., 1802) of respective characters associated with the watch face user interface (e.g., 1800) (e.g., without transmitting image data (e.g., an image file) and/or multimedia data (e.g., a video file) associated with the representation of one or more of the one or more graphical representations of respective characters associated with the watch face user interface).

Sharing settings associated with characteristic features of the representation of one or more of the one or more graphical representations of respective characters associated with the watch face user interface without transmitting image data and/or multimedia data reduces an amount of data transmitted between the computer system and the external device. Reducing a size of a transmission improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, sharing the one or more characteristics of the watch face user interface (e.g., 1800) (e.g., background color, date/time font, date/time size, date/time placement, complication placement, complication type, and/or complication color) without transmitting a representation of the one or more graphical representations (e.g., 1802) of respective characters associated with the watch user interface (e.g., 1800) includes transmitting one or more graphical representation templates (e.g., blank and/or fillable graphical representations that do not correspond to the one or more graphical representations of respective characters associated with the watch face user interface) for one or more second graphical representations (e.g., 1848) of respective second characters, different from the one or more graphical representations (e.g., 1802) of respective characters of the watch face user interface (e.g., 1800) (e.g., the one or more second graphical representations of respective second characters are stored on external device).

Sharing one or more graphical representation templates instead of sharing the representation of the one or more graphical representations of respective characters associated with the watch face user interface reduces an amount data transmitted between computer system and external device. Reducing a size of a transmission improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 100, 300, 500, 600), while displaying the representation (e.g., 1800A-1800D) of the watch face user interface (e.g., 1800), detects (1912) a sequence of one or more inputs (e.g., 1850A) (e.g., a long press gesture on display generation component, and optionally, a subsequent tap gesture on an edit affordance) corresponding to a request to edit the watch face user interface (e.g., 1800).

The computer system (e.g., 100, 300, 500, 600), in response to detecting the sequence of one or more inputs (e.g., 1850A), displays (1941), via the display generation component (e.g., 602), a first user interface (e.g., 1810) for selecting between a first set of characters (e.g., 1800A) that includes a plurality of user-customizable virtual avatars (e.g., a plurality of avatar-like emojis and/or the respective characters associated with the watch face user interface) and a graphical representation (e.g., 1800B) of a second set of characters (e.g., a plurality of emojis of animal-like characters) that includes two or more predetermined characters that are not available in the first set of characters.

The computer system (e.g., 100, 300, 500, 600), while displaying the first user interface (e.g., 1810), detects (1916) (e.g., via one or more input devices that is in communication with the computer system, such as a touch-sensitive surface integrated with the display generation component) a third input corresponding to selection of the first set of characters (e.g., 1800A) or the second set of characters (e.g., 1800B).

The computer system (e.g., 100, 300, 500, 600), in accordance with (e.g., or in response to) a determination that the third input corresponds to selection of the first set of characters (e.g., 1800A), displays (1918) the representation (e.g., 1800A) of the watch face user interface (e.g., 1800) including a first graphical representation (e.g., 1802) of a currently selected character from the first set of characters.

The computer system (e.g., 100, 300, 500, 600), in accordance with (e.g., or in response to) a determination that the input corresponds to selection of the second set of characters (e.g., 1800B), displays (1920) the representation of the watch face user interface including a second graphical representation of a currently selected character from the second set of characters.

Displaying the first user interface for selecting between the first set of characters and the second set of characters enables a user to easily customize the watch face user interface, thereby enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 100, 300, 500, 600), while displaying the representation (e.g., 1800A-1800D) of the watch face user interface (e.g., 1800), detects (1922) a fourth input (e.g., 1850A) (e.g., a long press gesture on display generation component, and optionally, a subsequent tap gesture on an edit affordance) corresponding to a request to edit the watch face user interface.

The computer system (e.g., 100, 300, 500, 600), after detecting the fourth input (e.g., 1850A), displays (1924), via the display generation component (e.g., 602), a second user interface (e.g., 810) that includes a plurality of selectable characters (e.g., 1800A-1800D) (e.g., including a plurality of animated (e.g., 3D) emojis of animal-like characters; a plurality of animated (e.g., 3D) avatar-like emojis). In some embodiments, the plurality of selectable characters are displayed in a first tab or first screen of the second user interface. In some embodiments, the plurality of selectable characters includes selectable sets of characters.

The computer system (e.g., 100, 300, 500, 600), while displaying the second user interface (e.g., 810), detects (1926) (e.g., via one or more input devices of the computer system, such as a touch-sensitive surface integrated with the display generation component) a selection of a character of the plurality of selectable characters.

The computer system (e.g., 100, 300, 500, 600), in accordance with (e.g., or in response to) detecting the selection of the character, updates (1928) the representation of the watch face user interface to include a third graphical representation of the selected character (e.g., a graphical representation of a single character corresponding to the selected character and/or a graphical representation of a currently selected character from a selected set of characters).

Displaying the second user interface for selecting between a plurality of selectable characters enables a user to easily customize the watch face user interface, thereby enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The computer system (e.g., 100, 300, 500, 600), while displaying the representation (e.g., 1800A-1800D) of the watch face user interface (e.g., 1800), detects (1930) a fifth input (e.g., 1850A) (e.g., a long press gesture on display generation component, and optionally, a subsequent tap gesture on an edit affordance) corresponding to a request to edit the watch face user interface (e.g., 1800).

The computer system (e.g., 100, 300, 500, 600) displays (1932), via the display generation component (e.g., 602), a third user interface that includes a fourth graphical representation of a character of the one or more graphical representations of respective characters associated with the watch face user interface (e.g., 1800).

The computer system (e.g., 100, 300, 500, 600), while displaying the fourth representation of the character, detects (1934) (e.g., via one or more input devices that is in communication with the computer system, such as a touch-sensitive surface integrated with the display generation component) a sixth input (e.g., a rotational input on a rotatable input device or a rotatable and depressible input device; a scrolling input on a touch-sensitive surface integrated with the display generation component) directed to changing a visual characteristic of the character (e.g., hair color, skin color, facial feature information, and/or accessory information).

The computer system (e.g., 100, 300, 500, 600), in response to detecting the input directed to changing the visual characteristic, changes (1936) (e.g., by transitioning through a plurality of selectable visual characteristics (e.g., selectable features associated with hair color, skin color, facial feature information, and/or accessory information)) the visual characteristic (e.g., hair color, skin color, facial feature information, and/or accessory information) from a first visual characteristic (e.g., a first hair color, a first skin color, a first facial feature, and/or a first accessory) to a second visual characteristic (e.g., a second hair color, a second skin color, a second facial feature, and/or a second accessory) different from the first visual characteristic. In some embodiments, changing the visual characteristic to the second visual characteristic is performed prior to sharing the watch face user interface and, when the watch face user interface with the second visual characteristic is shared, a representation of the watch face user interface including the second visual characteristic, is shared.

Displaying the third user interface for changing the visual characteristic of the character enables a user to easily customize the watch face user interface, thereby enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation (e.g., 1800A-1800D) of the watch face user interface (e.g., 1800) includes a fifth graphical representation (e.g., 1802) of a character that corresponds to a graphical representation of (e.g., an animation based on; a graphical representations that animates features of) a user associated (e.g., based on an account to which the computer system is logged into) with the computer system (e.g., 100, 300, 500, 600) (e.g., an animated (e.g., 3D) avatar-like representation of the user of the computer system).

Displaying the representation of the watch face user interface having the fifth graphical representation of a character that corresponds to a graphical representation of the user associated with the computer system provides improved visual feedback related to an identity of the user of the computer system, and in some embodiments, the identity of the user sharing the watch face user interface. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, sharing the one or more characteristics of the watch face user interface (e.g., 1800) (e.g., background color, date/time font, date/time size, date/time placement, complication placement, complication type, and/or complication color) without transmitting a representation of the one or more graphical representations (e.g., 1802) of respective characters associated with the watch user interface (e.g., 1800) includes transmitting one or more graphical representation templates (e.g., blank and/or fillable graphical representations that do not correspond to the one or more graphical representations of respective characters associated with the watch face user interface) for one or more second graphical representations (e.g., 1848) of respective second characters stored on the external device (e.g., 1832), different from the one or more graphical representations of respective characters of watch face user interface (e.g., 1800), wherein the one or more second graphical representations (e.g., 1848) of respective second characters stored on the external device (e.g., 1832) includes a sixth graphical representation (e.g., 1848) of a character that includes one or more visual characteristics set by a user of the external device (e.g., 1832) (e.g., the one or more second graphical representations of respective second characters are stored on the external device and include customized visual characteristics set by a user of the external device). In some embodiments, the one or more characteristics of the watch face user interface are based on settings of the computer system and displayed on the external device despite the one or more second graphical representations of respective second characters being stored on external device.

Sharing one or more graphical representation templates instead of sharing the representation of the one or more graphical representations of respective characters associated with the watch face user interface reduces an amount data transmitted between computer system and external device. Reducing a size of a transmission improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, transmitting the representation of one or more of the one or more graphical representations (e.g., 1802) of respective characters associated with the watch face user interface (e.g., 1800) (e.g., in accordance with the determination that the watch face user interface is associated with less than the threshold number of graphical representations of respective characters) includes initiating a process for storing the representation of one or more of the one more graphical representations (e.g., 1802) of respective characters associated with the watch face user interface (e.g., 1800) on the external device (e.g., 1832) (e.g., in response to detecting user input corresponding to an add watch face affordance on external device, external device stores the representation of one or more of the one or more graphical representations of respective characters associated with the watch face user interface in a character library and/or an image library of external device).

Initiating the process for storing the representation of one or more of the one or more graphical representations of respective characters associated with the watch face user interface on the external device reduces a number of inputs needed by a user of the external device to store the particular character on the external device. In particular, the user of the external device may store the representation of one or more of the graphical representations of respective characters associated with the watch face user interface instead of providing a sequence of inputs to create the particular character. Reducing the number of inputs needed to store the particular character improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, initiating the process for storing the representation of one or more of the one or more graphical representations (e.g., 1802) of respective characters associated with the watch face user interface (e.g., 1800) on the external device (e.g., 1832) includes enabling, via the external device (e.g., 1832), an ability to change one or more visual characteristics (e.g., via an editing user interface) of the representation of one or more of the one or more graphical representations (e.g., 1802) of respective characters associated with the watch face user interface (e.g., 1800) (e.g., a user of the external device may access the representation of one or more of the one or more graphical representations of respective characters associated with the watch face user interface (e.g., via a character library, via an image library, via a watch face selection user interface, and/or via a watch face editing user interface) and request to enter an editing mode of the representation, such that the external device may receive user inputs and adjust visual characteristics of the representation based on the user inputs (e.g., the external device updates visual characteristics of the representation that were shared to external device via computer system)).

Enabling an ability on the external device to change one or more visual characteristics of the representation of one or more of the one or more graphical representations of respective characters associated with the watch face user interface reduces a number of inputs needed by the user of the external device to customize the character. In particular, the user of the external device may start with the representation of one or more of the one or more graphical representations of respective characters associated with the watch face user interface instead of creating the representation of the character via a sequence of user inputs. Reducing the number of inputs needed to customize the particular character improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1900 (e.g., FIGS. 19A-19C) are also applicable in an analogous manner to the methods described above. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A computer system configured to communicate with a display generation component and one or more input devices, the computer system comprising:

one or more processors; and memory storing one or more programs configured to be executed by the one or more processors, the one or more programs including instructions for:

concurrently displaying in a time user interface displayed via the one or more display generation components:

an indication of time, and a graphical representation of a first character having a first facial expression;

detecting, via the one or more input devices, a first input;

in response to detecting the first input, displaying, via the one or more display generation components, the graphical representation of the first character having a second facial expression different from the first facial expression while maintaining display of the indication of time;

after displaying the graphical representation of the first character having the second facial expression, automatically returning to concurrently displaying the indication of time and the graphical representation of the first character having the first facial expression;

after returning to concurrently displaying the indication of time and the graphical representation of the first character having the first facial expression, detecting, via the one or more input devices, a second input; and in response to detecting the second input, concurrently displaying in a time user interface displayed via the one or more display generation components:

an indication of time, and a graphical representation of a second character that is different from the first character.

2. The computer system of claim 1, wherein the first facial expression and the second facial expression include at least one of a mouth and eyes.

3. The computer system of claim 1, the one or more programs including instructions for:

detecting, via the one or more input devices, a second input with a duration that exceeds a predetermined threshold; and in response to detecting the second input with the duration that exceeds the predetermined threshold, displaying, via the one or more display generation components, an editing user interface for editing a character displayed in the time user interface.

4. The computer system of claim 1, the one or more programs including instructions for:

detecting, via the one or more input devices, a second input different from the first input; and in response to detecting the second input different from the first input, displaying, via the one or more display generation components, the graphical representation of the first character, having a third facial expression different from the first facial expression and the second facial expression.

5. The computer system of claim 1, wherein the graphical representation of the first character having the second facial expression is larger in size than the graphical representation of the first character having the first facial expression.

6. The computer system of claim 1, wherein displaying, via the one or more display generation components, the graphical representation of the first character having the second facial expression different from the first facial expression includes ceasing to display, via the one or more display generation components, a portion of the graphical representation of the first character having the first facial expression.

7. The computer system of claim 1, wherein:
the graphical representation of the first character having the first facial expression is displayed in a first animated visual state; and/or
the graphical representation of the first character having the first facial expression is displayed in a second animated visual state.

8. The computer system of claim 1, wherein the graphical representation of the first character having the second facial expression is displayed at a first time, the one or more programs including instructions for:
in response to determining that a predetermined amount of time from the first time has elapsed, displaying, via the one or more display generation components, the graphical representation of the first character having a third facial expression, different from the first facial expression and the second facial expression.

9. The computer system of claim 1, the one or more programs including instructions for:
detecting, via the one or more input devices, a wrist raise gesture; and
in response to detecting the wrist raise gesture, changing the graphical representation of the first character having the first facial expression to a graphical representation of a second character that is different from the first character.

10. The computer system of claim 1, wherein the indication of time and the graphical representation of the first character having the first facial expression are concurrently displayed in the time user interface while the computer system is in a first power state, the one or more programs including instructions for:
detecting a transition from the first power state to a second power state that is different from the first power state; and
in response to detecting the transition from the first power state to the second power state, changing the graphical representation of the first character having the first facial expression to a graphical representation of a second character, wherein the second character is different from the first character.

11. The computer system of claim 10, the one or more programs including instructions for:
while the computer system is in the second power state, detecting, via the one or more input devices, a second input; and
in response to detecting the second input:
transitioning the computer system to the first power state; and
displaying, via the one or more display generation components, the graphical representation of the second character having a third facial expression different from the first facial expression and the second facial expression.

12. The computer system of claim 1, wherein the first input is a tap input.

13. A method, comprising:
at a computer system that is in communication with one or more display generation components and one or more input devices:
concurrently displaying in a time user interface displayed via the one or more display generation components:
an indication of time, and
a graphical representation of a first character having a first facial expression;
detecting, via the one or more input devices, a first input;
in response to detecting the first input, displaying, via the one or more display generation components, the graphical representation of the first character having a second facial expression different from the first facial expression while maintaining display of the indication of time;
after displaying the graphical representation of the first character having the second facial expression, automatically returning to concurrently displaying the indication of time and the graphical representation of the first character having the first facial expression;
after returning to concurrently displaying the indication of time and the graphical representation of the first character having the first facial expression, detecting, via the one or more input devices, a second input; and
in response to detecting the second input, concurrently displaying in a time user interface displayed via the one or more display generation components:
an indication of time, and
a graphical representation of a second character that is different from the first character.

14. A non-transitory computer-readable storage medium storing one or more programs configured to be executed by one or more processors of a computer system that is in communication with a display generation component and one or more input devices, the one or more programs including instructions for:
concurrently displaying in a time user interface displayed via the one or more display generation components:
an indication of time, and
a graphical representation of a first character having a first facial expression;
detecting, via the one or more input devices, a first input;
in response to detecting the first input, displaying, via the one or more display generation components, the graphical representation of the first character having a second facial expression different from the first facial expression while maintaining display of the indication of time;
after displaying the graphical representation of the first character having the second facial expression, automatically returning to concurrently displaying the indication of time and the graphical representation of the first character having the first facial expression;
after returning to concurrently displaying the indication of time and the graphical representation of the first character having the first facial expression, detecting, via the one or more input devices, a second input; and in response to detecting the second input, concurrently displaying in a time user interface displayed via the one or more display generation components:

an indication of time, and a graphical representation of a second character that is different from the first character.

15. The method of claim 13, wherein the first facial expression and the second facial expression include at least one of a mouth and eyes.

16. The method of claim 13, further comprising:

detecting, via the one or more input devices, a second input with a duration that exceeds a predetermined threshold; and in response to detecting the second input with the duration that exceeds the predetermined threshold, displaying, via the one or more display generation components, an editing user interface for editing a character displayed in the time user interface.

17. The method of claim 13, further comprising:

detecting, via the one or more input devices, a second input different from the first input; and in response to detecting the second input different from the first input, displaying, via the one or more display generation components, the graphical representation of the first character, having a third facial expression different from the first facial expression and the second facial expression.

18. The method of claim 13, wherein the graphical representation of the first character having the second facial expression is larger in size than the graphical representation of the first character having the first facial expression.

19. The method of claim 13, wherein displaying, via the one or more display generation components, the graphical representation of the first character having the second facial expression different from the first facial expression includes ceasing to display, via the one or more display generation components, a portion of the graphical representation of the first character having the first facial expression.

20. The method of claim 13, wherein:

the graphical representation of the first character having the first facial expression is displayed in a first animated visual state; and/or the graphical representation of the first character having the first facial expression is displayed in a second animated visual state.

21. The method of claim 13, wherein the graphical representation of the first character having the second facial expression is displayed at a first time, further comprising:

in response to determining that a predetermined amount of time from the first time has elapsed, displaying, via the one or more display generation components, the graphical representation of the first character having a third facial expression, different from the first facial expression and the second facial expression.

22. The method of claim 13, further comprising:

detecting, via the one or more input devices, a wrist raise gesture; and in response to detecting the wrist raise gesture, changing the graphical representation of the first character having the first facial expression to a graphical representation of a second character that is different from the first character.

23. The method of claim 13, wherein the indication of time and the graphical representation of the first character having the first facial expression are concurrently displayed in the time user interface while the computer system is in a first power state, further comprising:

detecting a transition from the first power state to a second power state that is different from the first power state; and in response to detecting the transition from the first power state to the second power state, changing the graphical representation of the first character having the first facial expression to a graphical representation of a second character, wherein the second character is different from the first character.

24. The method of claim 23, further comprising:

while the computer system is in the second power state, detecting, via the one or more input devices, a second input; and in response to detecting the second input:

transitioning the computer system to the first power state; and displaying, via the one or more display generation components, the graphical representation of the second character having a third facial expression different from the first facial expression and the second facial expression.

25. The method of claim 13, wherein the first input is a tap input.

26. The non-transitory computer-readable storage medium of claim 14, wherein the first facial expression and the second facial expression include at least one of a mouth and eyes.

27. The non-transitory computer-readable storage medium of claim 14, the one or more programs including instructions for:

detecting, via the one or more input devices, a second input with a duration that exceeds a predetermined threshold; and in response to detecting the second input with the duration that exceeds the predetermined threshold, displaying, via the one or more display generation components, an editing user interface for editing a character displayed in the time user interface.

28. The non-transitory computer-readable storage medium of claim 14, the one or more programs including instructions for:

detecting, via the one or more input devices, a second input different from the first input; and in response to detecting the second input different from the first input, displaying, via the one or more display generation components, the graphical representation of the first character, having a third facial expression different from the first facial expression and the second facial expression.

29. The non-transitory computer-readable storage medium of claim 14, wherein the graphical representation of the first character having the second facial expression is larger in size than the graphical representation of the first character having the first facial expression.

30. The non-transitory computer-readable storage medium of claim 14, wherein displaying, via the one or more display generation components, the graphical representation of the first character having the second facial expression different from the first facial expression includes ceasing to display, via the one or more display generation components, a portion of the graphical representation of the first character having the first facial expression.

31. The non-transitory computer-readable storage medium of claim 14, wherein:

the graphical representation of the first character having the first facial expression is displayed in a first animated visual state; and/or the graphical representation of the first character having the first facial expression is displayed in a second animated visual state.

32. The non-transitory computer-readable storage medium of claim 14, wherein the graphical representation of the first character having the second facial expression is displayed at a first time, the one or more programs including instructions for:

in response to determining that a predetermined amount of time from the first time has elapsed, displaying, via the one or more display generation components, the graphical representation of the first character having a third facial expression, different from the first facial expression and the second facial expression.

33. The non-transitory computer-readable storage medium of claim 14, the one or more programs including instructions for:

detecting, via the one or more input devices, a wrist raise gesture; and in response to detecting the wrist raise gesture, changing the graphical representation of the first character having the first facial expression to a graphical representation of a second character that is different from the first character.

34. The non-transitory computer-readable storage medium of claim 14, wherein the indication of time and the graphical representation of the first character having the first facial expression are concurrently displayed in the time user interface while the computer system is in a first power state, the one or more programs including instructions for:

detecting a transition from the first power state to a second power state that is different from the first power state; and in response to detecting the transition from the first power state to the second power state, changing the graphical representation of the first character having the first facial expression to a graphical representation of a second character, wherein the second character is different from the first character.

35. The non-transitory computer-readable storage medium of claim 34, the one or more programs including instructions for:

while the computer system is in the second power state, detecting, via the one or more input devices, a second input; and in response to detecting the second input:

transitioning the computer system to the first power state; and displaying, via the one or more display generation components, the graphical representation of the second character having a third facial expression different from the first facial expression and the second facial expression.

36. The non-transitory computer-readable storage medium of claim 14, wherein the first input is a tap input.

* * * * *